May 12, 1959   F. A. MORRIS ET AL   2,886,642
AUTOMATIC TOLL TICKETING
Filed April 13, 1953   80 Sheets-Sheet 3

INVENTORS,
FRANK A. MORRIS
JAMES D. CONFELD
HOWARD L. FOOTE
HOWARD S. GLEASON
BY
Att'y

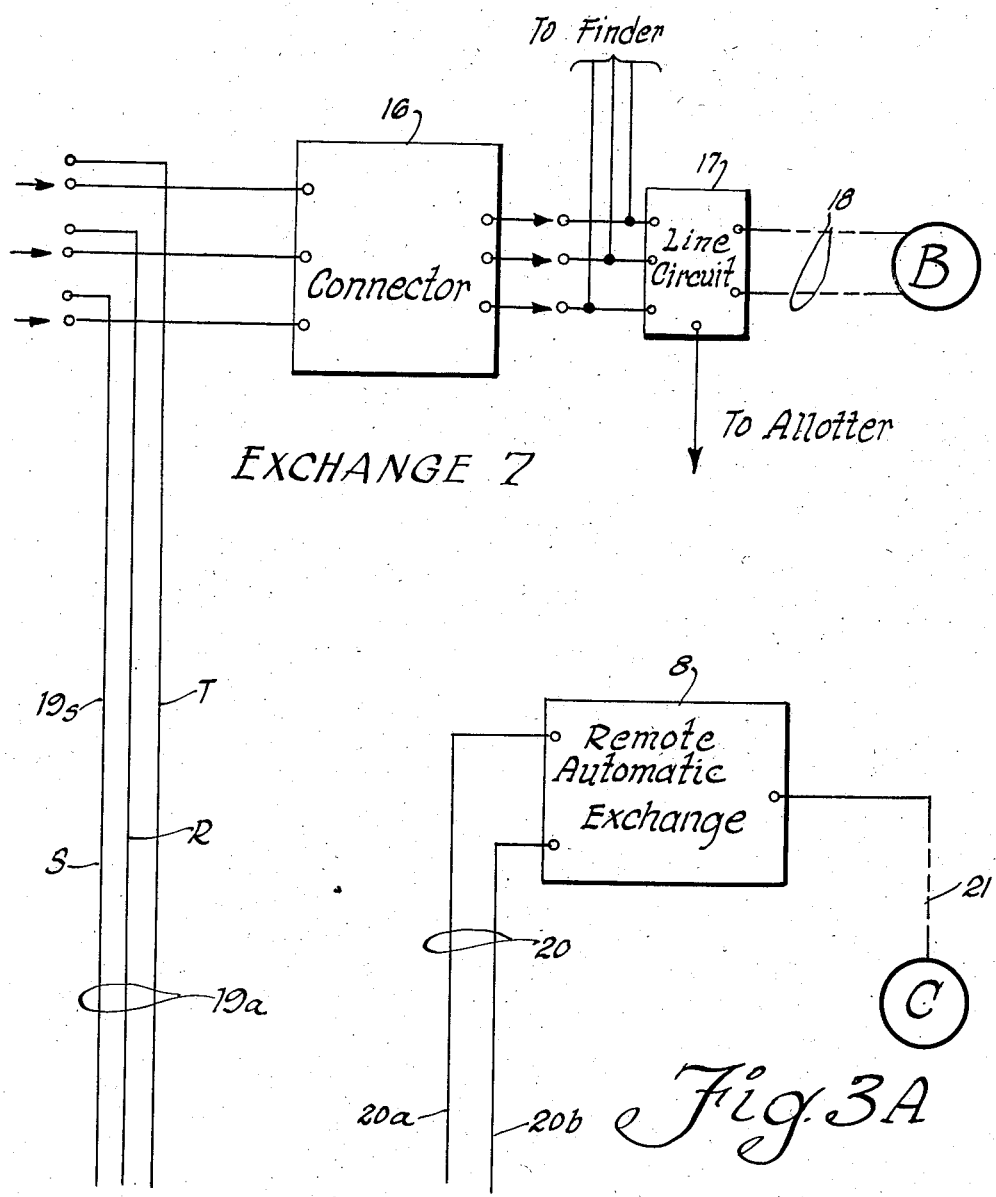

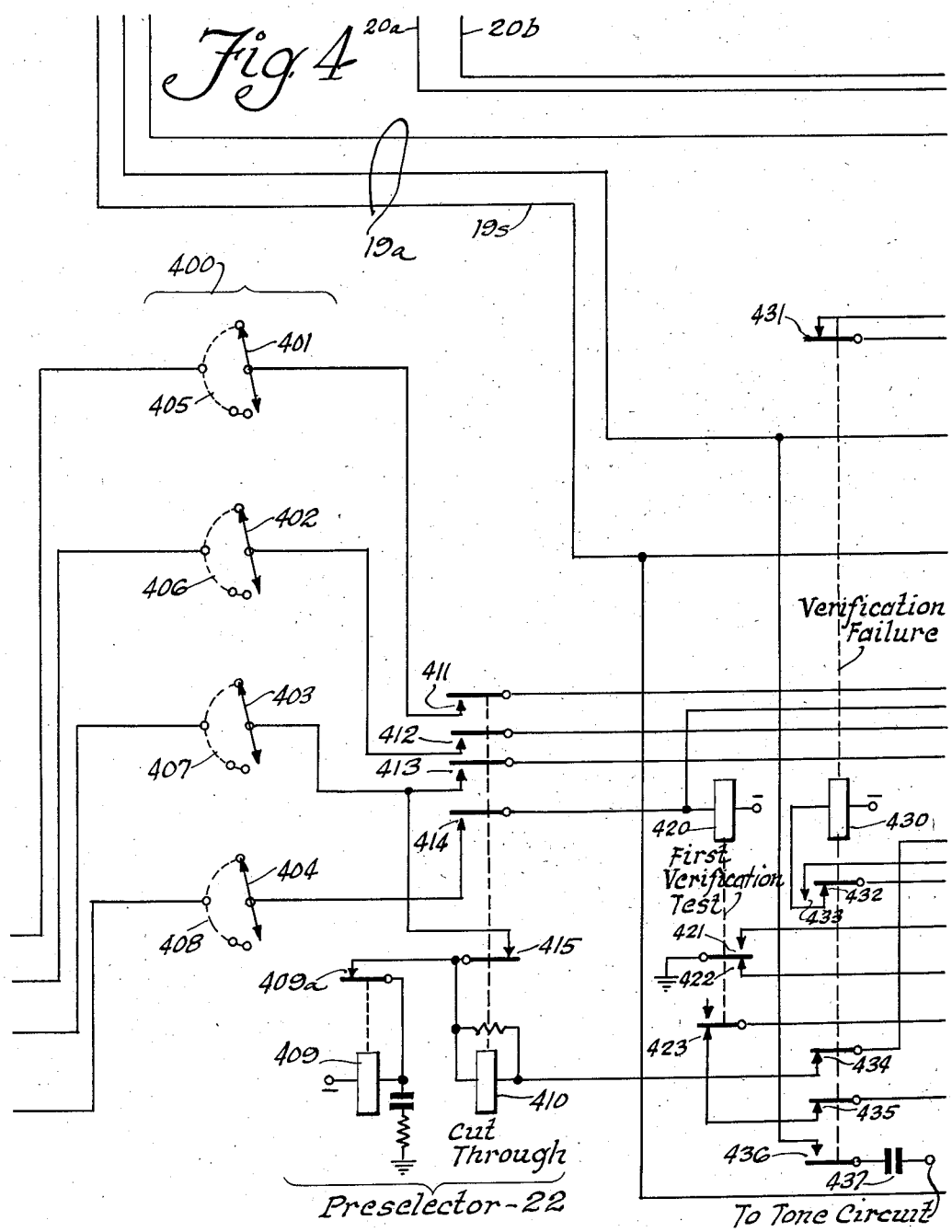

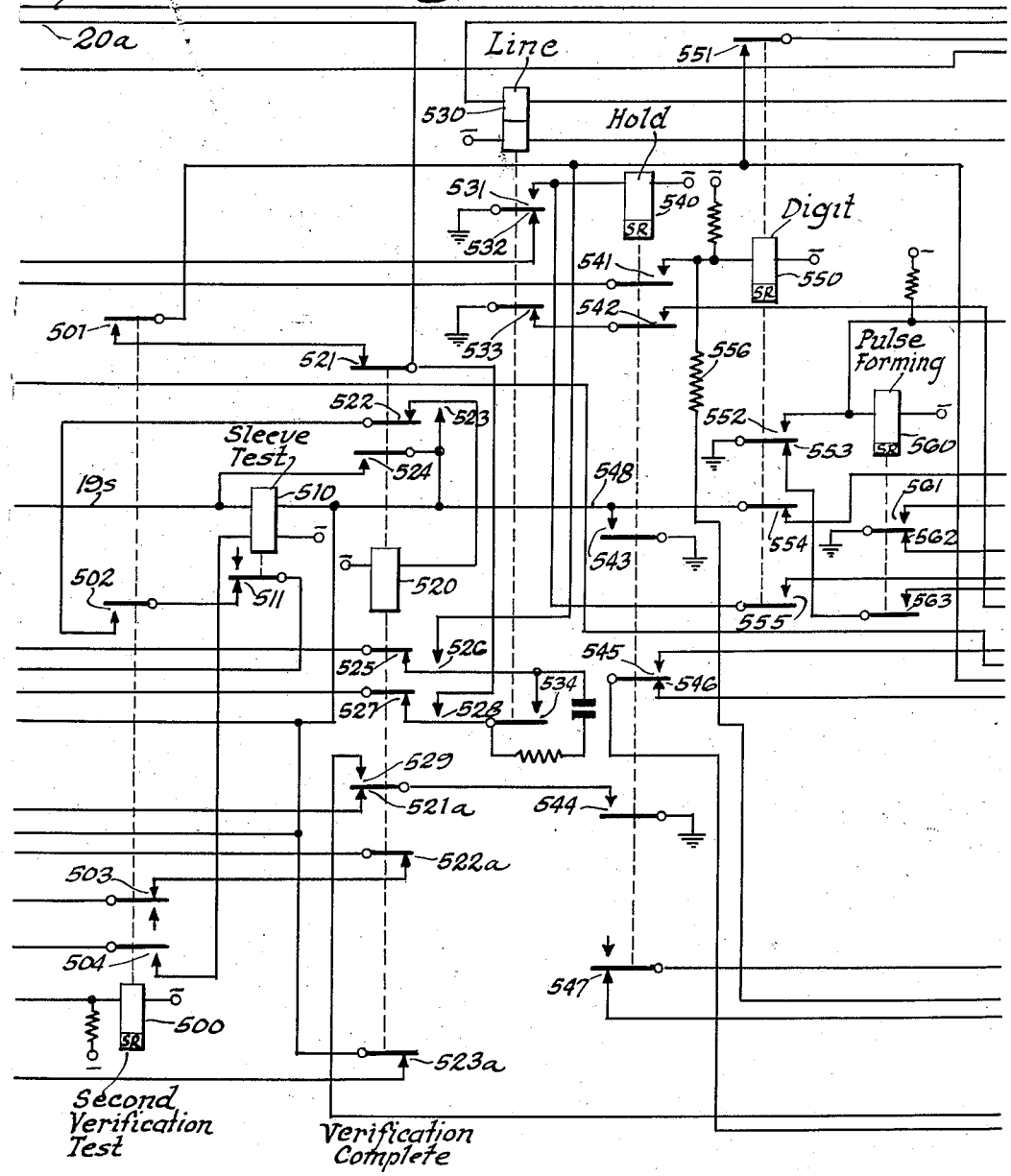

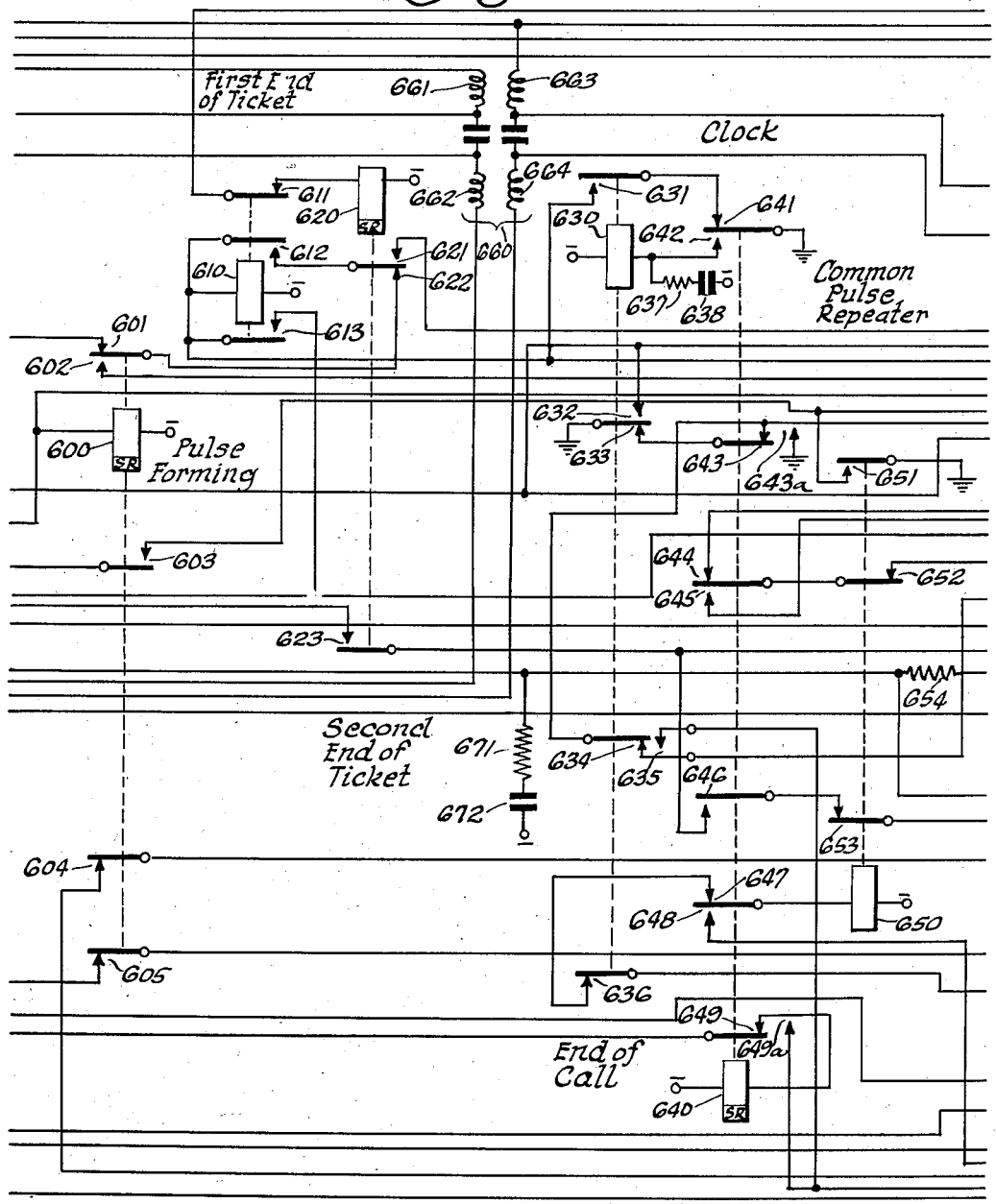

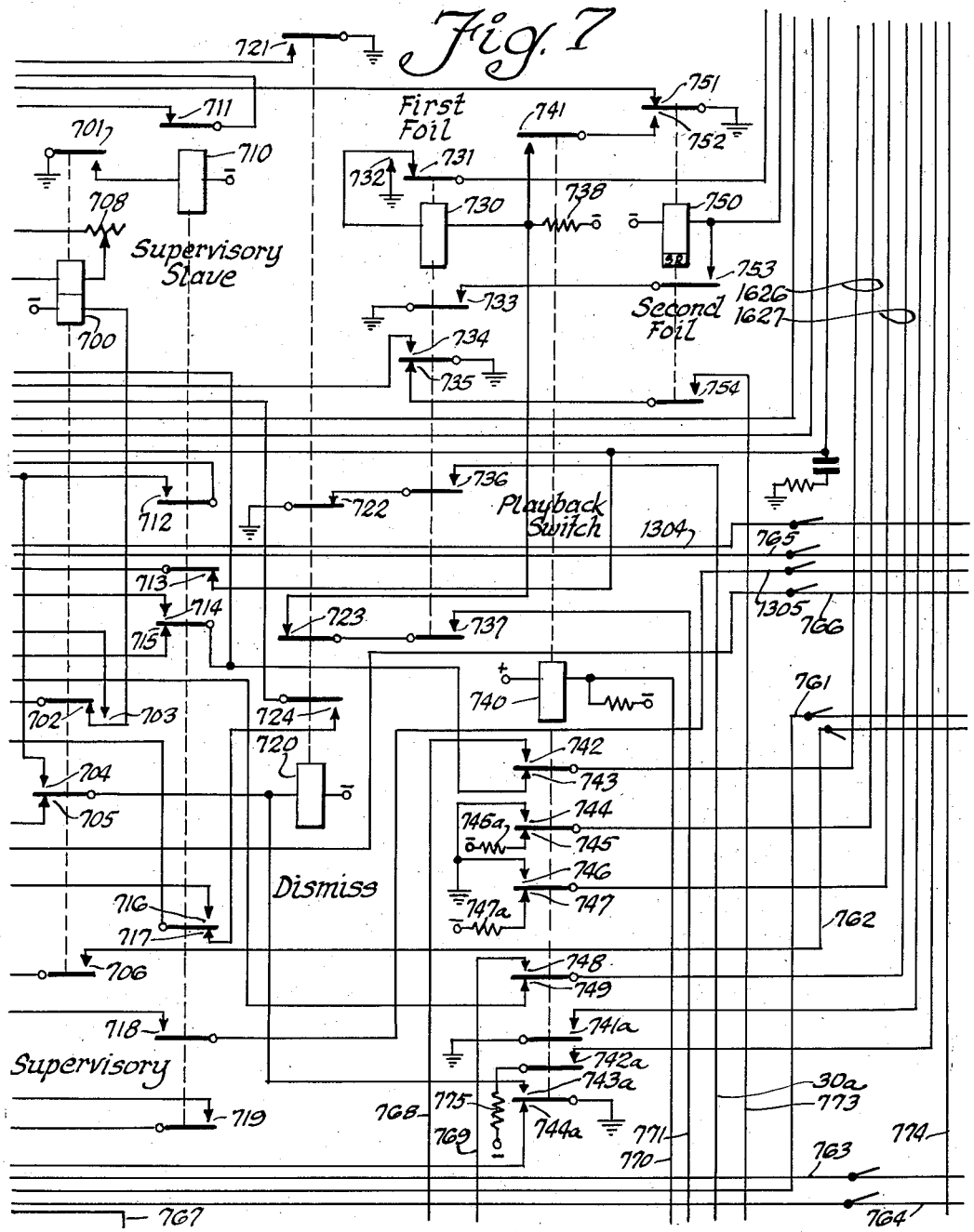

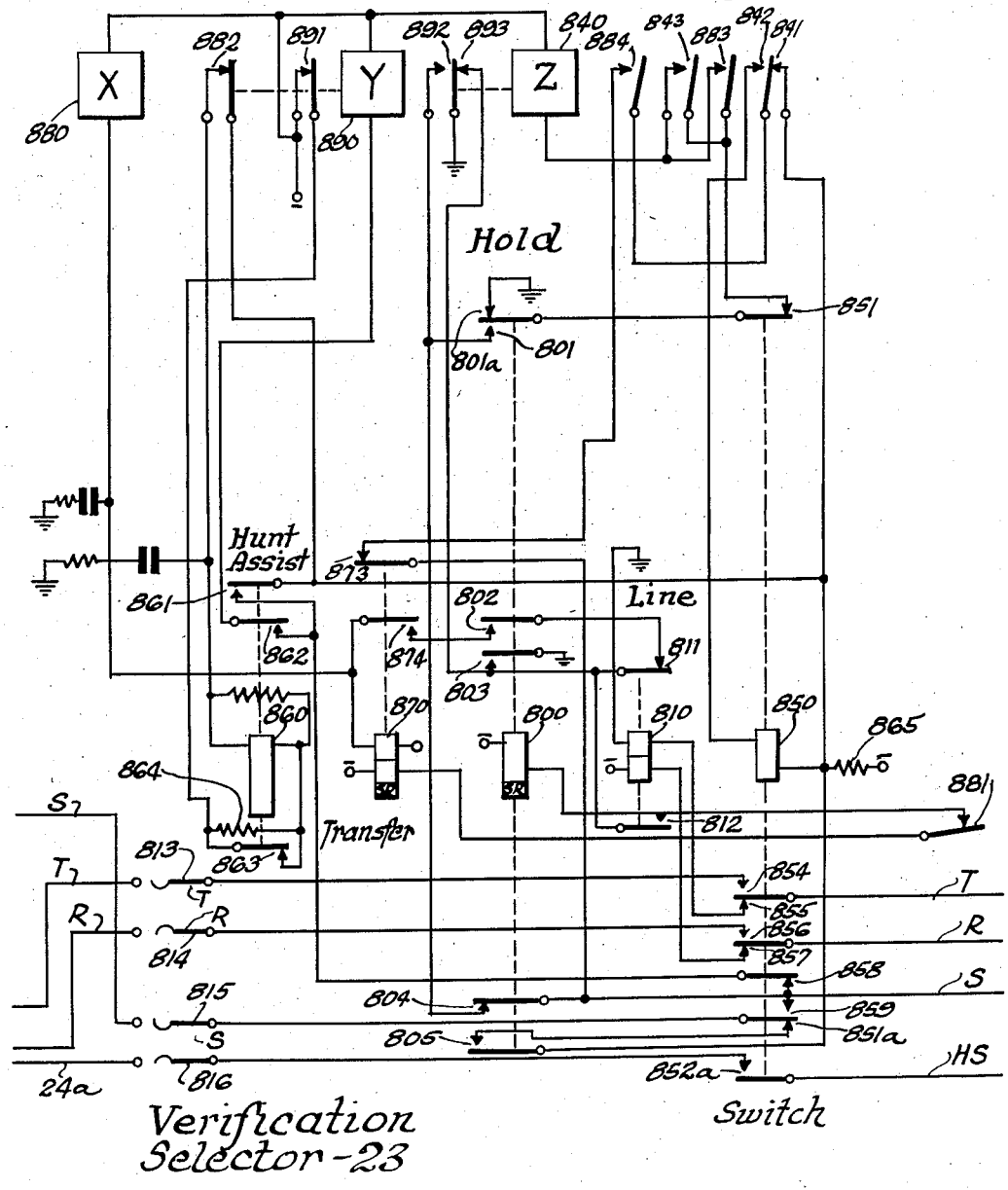

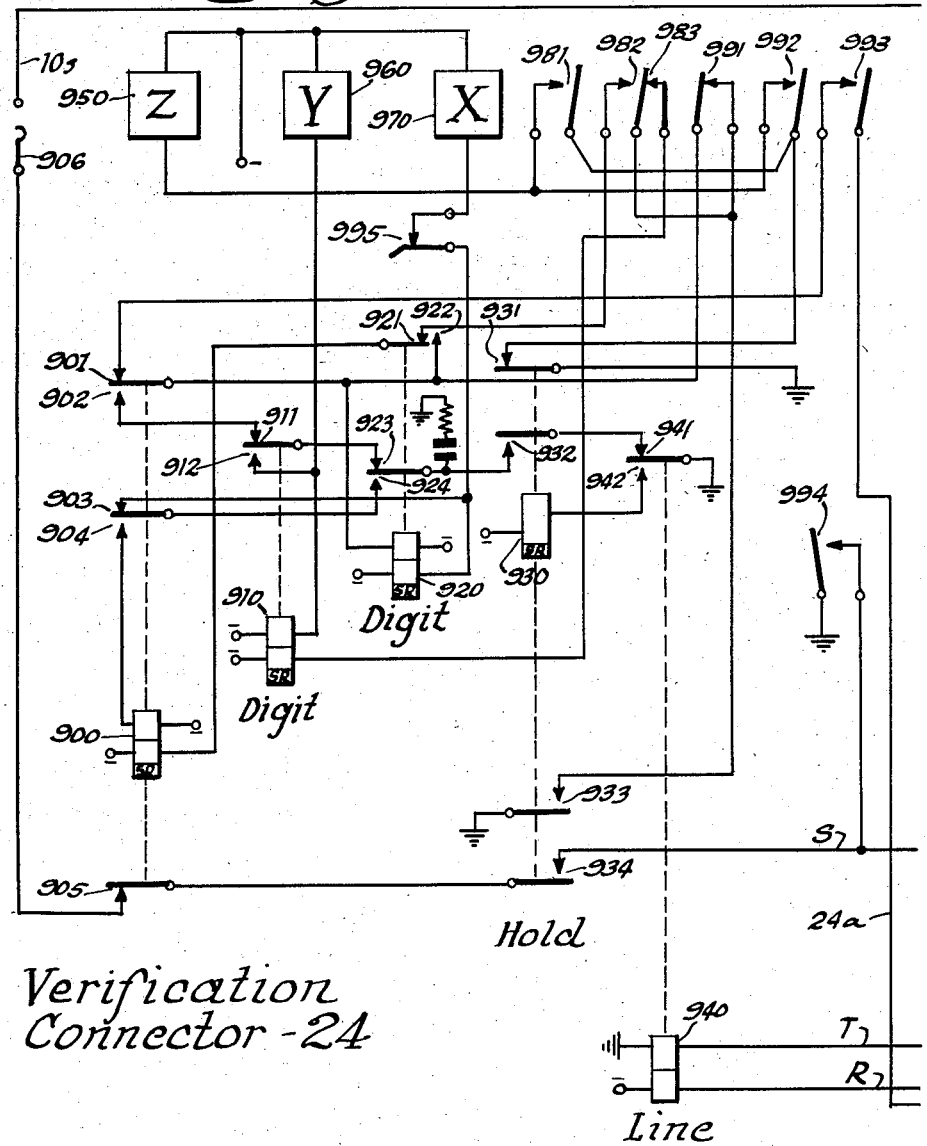

May 12, 1959

F. A. MORRIS ET AL 2,886,642

AUTOMATIC TOLL TICKETING

Filed April 13, 1953

SCANNING CIRCUIT -28

INVENTORS,
FRANK A. MORRIS
JAMES D. CONFELD
HOWARD L. FOOTE
HOWARD S. GLEASON

BY

J. L. Bowes

Atty

May 12, 1959

F. A. MORRIS ET AL 2,886,642

AUTOMATIC TOLL TICKETING

Filed April 13, 1953

CLOCK & CALENDAR CIRCUIT-27

INVENTORS,
FRANK A. MORRIS
JAMES D. CONFELD
HOWARD L. FOOTE
HOWARD S. GLEASON

BY

Att'y

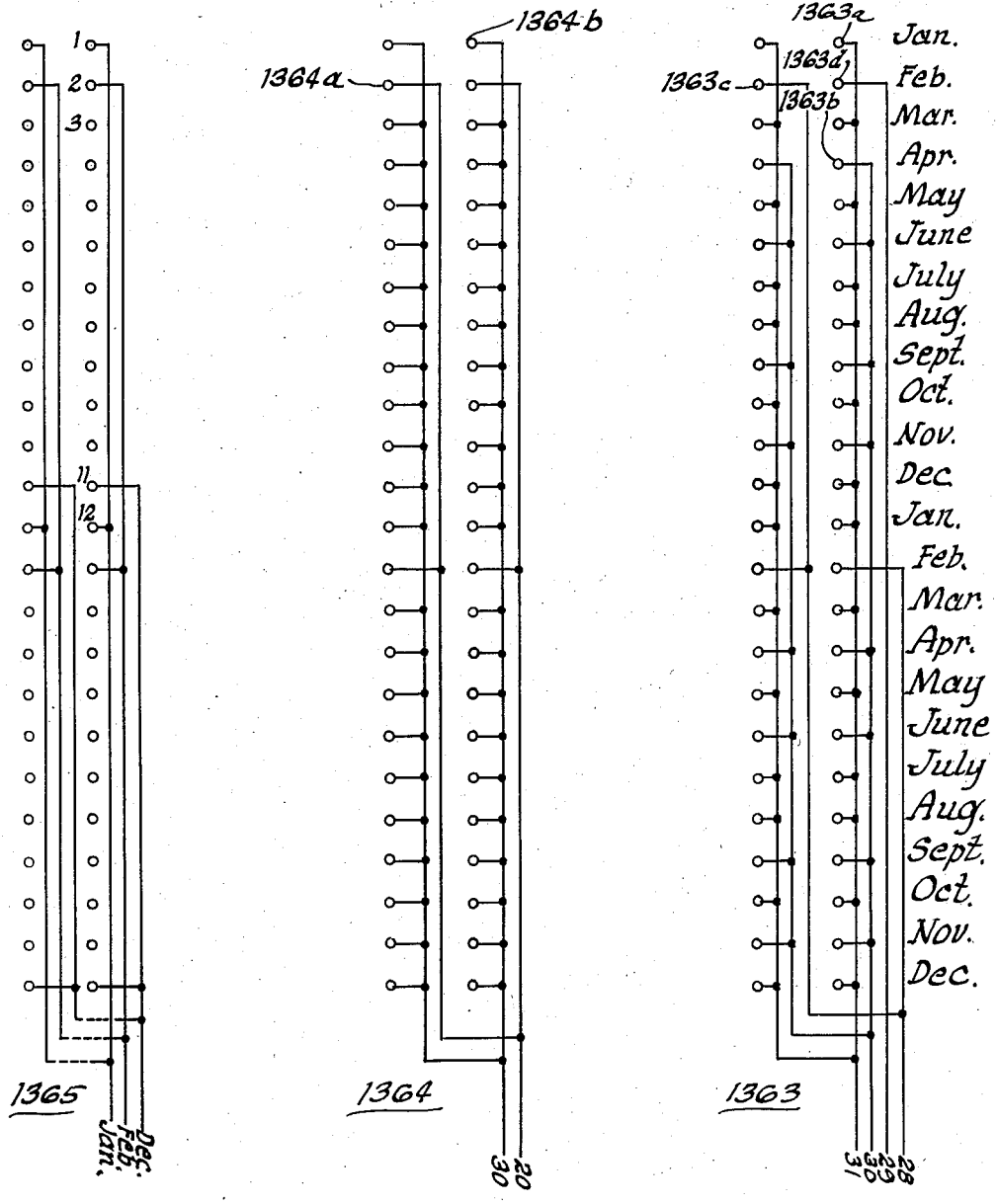

CLOCK & CALENDAR CIRCUIT-27

INVENTORS,
FRANK A. MORRIS
JAMES D. CONFELD
HOWARD L. FOOTE
HOWARD S. GLEASON

BY T. L. Bowes
Att'y

PLAYBACK CONTROL CIRCUIT -30

INVENTORS,
FRANK A. MORRIS
JAMES D. CONFELD
HOWARD L. FOOTE
HOWARD S. GLEASON
BY
T. L. Bower
Att'y

PLAYBACK CONTROL CIRCUIT - 30

May 12, 1959 F. A. MORRIS ET AL 2,886,642
AUTOMATIC TOLL TICKETING
Filed April 13, 1953 80 Sheets-Sheet 23

DESTINATION RELAY CIRCUIT-2150

INVENTORS,
FRANK A. MORRIS
JAMES D. CONFELD
HOWARD L. FOOTE
HOWARD S. GLEASON
BY
Att'y

DESTINATION RELAY CIRCUIT - 2150

STEERING CIRCUIT -37

STEERING CIRCUIT—37

INVENTORS,
FRANK A. MORRIS
JAMES D. CONFELD
HOWARD L. FOOTE
HOWARD S. GLEASON
BY J. L. Bowes
Att'y

STEERING CIRCUIT-37

INVENTORS,
FRANK A. MORRIS
JAMES D. CONFELD
HOWARD L. FOOTE
HOWARD S. GLEASON
BY J. L. Bowes
Att'y

SUBSCRIBER DIGIT COUNTING CHAINS 2600-2607

May 12, 1959　　F. A. MORRIS ET AL　　2,886,642
AUTOMATIC TOLL TICKETING
Filed April 13, 1953　　80 Sheets-Sheet 30

ELAPSED TIME COUNTER-3000

INVENTORS,
FRANK A. MORRIS
JAMES D. CONFELD
HOWARD L. FOOTE
HOWARD S. GLEASON
BY
Atty

ELAPSED TIME COUNTER-3000

COST COMPUTER -39

COST COMPUTER -39

TENS & UNITS HOURS COUNTER - 3600

TENS & UNITS MINUTES COUNTER-3900

May 12, 1959 F. A. MORRIS ET AL 2,886,642
AUTOMATIC TOLL TICKETING
Filed April 13, 1953 80 Sheets-Sheet 42

Counting Chain - 4000

TENS & UNITS MINUTES COUNTER-3900

INVENTORS,
FRANK A. MORRIS
JAMES D. CONFELD
HOWARD L. FOOTE
HOWARD S. GLEASON
BY J. L. Bowes
Att'y Tens Months Counting Chain-4100
MONTHS COUNTER-4200

May 12, 1959

F. A. MORRIS ET AL 2,886,642

AUTOMATIC TOLL TICKETING

Filed April 13, 1953

MONTHS COUNTER-4200

INVENTORS,
FRANK A. MORRIS
JAMES D. CONFELD
HOWARD L. FOOTE
HOWARD S. GLEASON

BY J. L. Bower

Att'y

May 12, 1959     F. A. MORRIS ET AL     2,886,642
AUTOMATIC TOLL TICKETING

Filed April 13, 1953                       80 Sheets-Sheet 45

Counting Ring - 4300

MONTHS COUNTER - 4200

INVENTORS,
FRANK A. MORRIS
JAMES D. CONFELD
HOWARD L. FOOTE
BY    HOWARD S. GLEASON

Att'y

TENS & UNITS DAYS COUNTER-4500
Tens Days Counting Chain-4400

May 12, 1959     F. A. MORRIS ET AL     2,886,642
AUTOMATIC TOLL TICKETING

TENS & UNITS DAYS COUNTER - 4500

INVENTORS,
FRANK A. MORRIS
JAMES D. CONFELD
HOWARD L. FOOTE
HOWARD S. GLEASON
BY J. L. Bowes
Att'y Tens & Units Days Counter - 4500
Units Days Counting Chain - 4600

May 12, 1959   F. A. MORRIS ET AL   2,886,642
AUTOMATIC TOLL TICKETING
Filed April 13, 1953   80 Sheets-Sheet 50

PRINTING CONTROL CIRCUIT-35

INVENTORS,
FRANK A. MORRIS
JAMES D. CONFELD
HOWARD L. FOOTE
HOWARD S. GLEASON
BY J. L. Bower
Att'y May 12, 1959 F. A. MORRIS ET AL 2,886,642
AUTOMATIC TOLL TICKETING
Filed April 13, 1953 80 Sheets-Sheet 53

STEPPING SWITCH -5100

INVENTORS,
FRANK A. MORRIS
JAMES D. CONFELD
HOWARD L. FOOTE
BY HOWARD S. GLEASON

Atty

May 12, 1959  F. A. MORRIS ET AL  2,886,642
AUTOMATIC TOLL TICKETING
Filed April 13, 1953  80 Sheets-Sheet 54

STEPPING SWITCH - 5100

INVENTORS,
FRANK A. MORRIS
JAMES D. CONFELD
HOWARD L. FOOTE
HOWARD S. GLEASON
BY
Att'y

May 12, 1959  F. A. MORRIS ET AL  2,886,642
AUTOMATIC TOLL TICKETING
Filed April 13, 1953  80 Sheets-Sheet 55

STEPPING SWITCH - 5100

INVENTORS,
FRANK A. MORRIS
JAMES D. CONFELD
HOWARD L. FOOTE
HOWARD S. GLEASON
BY J. L. Bowers
Atty May 12, 1959  F. A. MORRIS ET AL  2,886,642
AUTOMATIC TOLL TICKETING
Filed April 13, 1953  80 Sheets-Sheet 56

STEPPING SWITCH-5100

INVENTORS,
FRANK A. MORRIS
JAMES D. CONFELD
HOWARD L. FOOTE
HOWARD S. GLEASON
BY J. L. Bower
Att'y

STEPPING SWITCH - 5100

May 12, 1959   F. A. MORRIS ET AL   2,886,642
AUTOMATIC TOLL TICKETING
Filed April 13, 1953   80 Sheets-Sheet 58

STEPPING SWITCH-5100

INVENTORS,
FRANK A. MORRIS
JAMES D. CONFELD
HOWARD L. FOOTE
HOWARD S. GLEASON
BY
Atty

STEPPING SWITCH - 5100

*Fig. 58* — STEPPING SWITCH — 5100

STEPPING SWITCH -5100

May 12, 1959 F. A. MORRIS ET AL 2,886,642
AUTOMATIC TOLL TICKETING
Filed April 13, 1953 80 Sheets-Sheet 63

STEPPING SWITCH - 5100

INVENTORS,
FRANK A. MORRIS
JAMES D. CONFELD
HOWARD L. FOOTE
HOWARD S. GLEASON
BY
Att'y

STEPPING SWITCH - 5100

May 12, 1959    F. A. MORRIS ET AL    2,886,642
AUTOMATIC TOLL TICKETING
Filed April 13, 1953    80 Sheets-Sheet 65

STEPPING SWITCH -5100

INVENTORS,
FRANK A. MORRIS
JAMES D. CONFELD
HOWARD L. FOOTE
HOWARD S. GLEASON
BY
Att'y

STEPPING SWITCH - 5100

Fig. 65 STEPPING SWITCH-5100

DECODING RELAY CIRCUIT-7000

May 12, 1959 F. A. MORRIS ET AL 2,886,642
AUTOMATIC TOLL TICKETING
Filed April 13, 1953 80 Sheets-Sheet 72

DECODING RELAY CIRCUIT-7000

INVENTORS,
FRANK A. MORRIS
JAMES D. CONFELD
HOWARD L. FOOTE
HOWARD S. GLEASON
BY
Att'y

May 12, 1959     F. A. MORRIS ET AL     2,886,642
AUTOMATIC TOLL TICKETING
Filed April 13, 1953     80 Sheets-Sheet 73
INTERNAL PRINTER CONTROL CIRCUIT-7100
*Fig. 71*
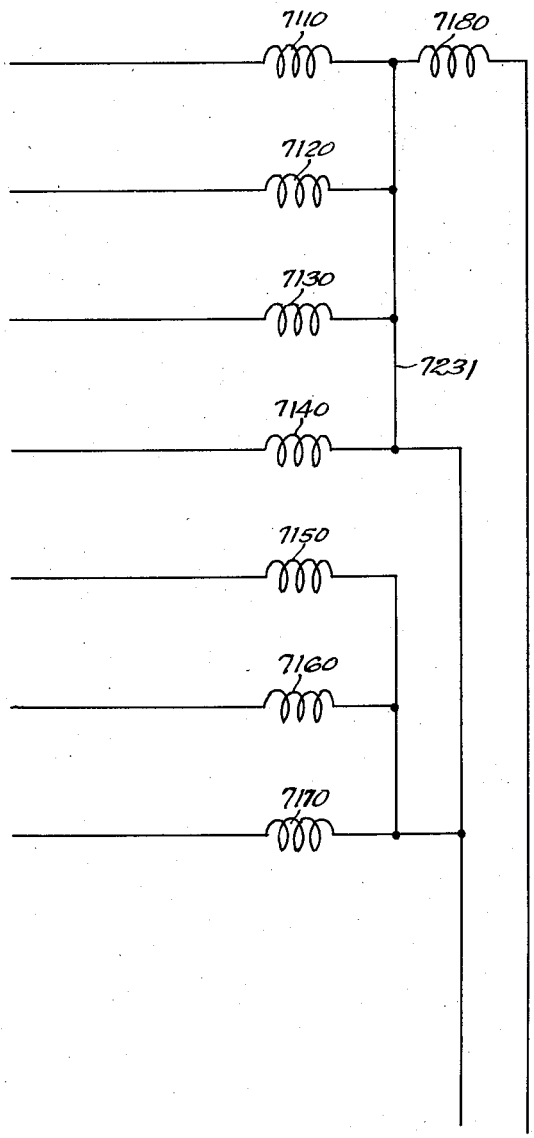
Clutch Cam
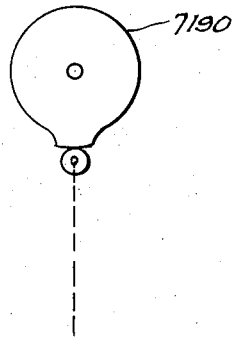
INVENTORS,
FRANK A. MORRIS
JAMES D. CONFELD
HOWARD L. FOOTE
HOWARD S. GLEASON
BY
*T. L. Bowes*
Att'y May 12, 1959     F. A. MORRIS ET AL     2,886,642
AUTOMATIC TOLL TICKETING Filed April 13, 1953                              80 Sheets-Sheet 74

INTERNAL PRINTER CONTROL CIRCUIT - 7100

INVENTORS,
FRANK A. MORRIS
JAMES D. CONFELD
HOWARD L. FOOTE
HOWARD S. GLEASON

BY

Atty

| CHARACTERS | PERMUTATION SLIDES ||||||| RELAY OPERATION |
| --- | --- | --- | --- | --- | --- | --- | --- | --- |
| | 7110 | 7120 | 7130 | 7140 | 7150 | 7160 | 7170 | |
| 1 | + | | | | | | | 6700 |
| 2 | | + | | | | | | 6710 |
| 3 | | | + | | | | | 6720 |
| 4 | | | | + | | | | 6730 |
| 5 | | | | | + | | | 6740 |
| 6 | | | | | | + | | 6900 |
| 7 | | | | | | | + | 6910 |
| 8 | | | | | + | + | | 6920 |
| 9 | | | | | + | | + | 6930 |
| 0 | | | | | | + | + | 6940 |
| A | + | | | | + | | | 6700 + 6740 |
| B | + | | | | | + | | " + 6900 |
| C | + | | | | | | + | " + 6910 |
| D | + | | | | + | + | | " + 6920 |
| E | + | | | | + | | + | " + 6930 |
| F | + | | | | | + | + | " + 6940 |
| G | | + | | | + | | | 6710 + 6740 |
| H | | + | | | | + | | " + 6900 |
| I | | + | | | | | + | " + 6910 |
| J | | + | | | + | + | | " + 6920 |
| K | | + | | | + | | + | " + 6930 |
| L | | + | | | | + | + | " + 6940 |
| M | | | + | | + | | | 6720 + 6740 |
| N | | | + | | | + | | " + 6900 |
| O | | | + | | | | + | " + 6910 |
| P | | | + | | + | + | | " + 6920 |
| Q | | | + | | + | | + | " + 6930 |
| R | | | + | | | + | + | " + 6940 |
| S | | | | + | + | | | 6730 + 6740 |
| T | | | | + | | + | | " + 6900 |
| U | | | | + | | | + | " + 6910 |
| V | | | | + | + | + | | " + 6920 |
| W | | | | + | + | | + | " + 6930 |
| X | | | | + | | + | + | " + 6940 |
| Y | + | + | | | | | | 6700 + 6710 |
| Z | + | | + | | | | | " + 6720 |
| — | + | | | + | | | | " + 6730 |
| * CR | | + | | + | | | | 6710 + 6730 |

\* Carriage Return

Fig. 73

May 12, 1959     F. A. MORRIS ET AL     2,886,642
AUTOMATIC TOLL TICKETING

Filed April 13, 1953     80 Sheets-Sheet 76

Fig. 74

INVENTORS,
FRANK A. MORRIS
JAMES D. CONFELD
HOWARD L. FOOTE
HOWARD S. GLEASON

BY J. L. Bowes
Att'y

May 12, 1959  F. A. MORRIS ET AL  2,886,642
AUTOMATIC TOLL TICKETING
Filed April 13, 1953  80 Sheets-Sheet 77

Fig. 75

INVENTORS,
FRANK A. MORRIS
JAMES D. CONFELD
HOWARD L. FOOTE
HOWARD S. GLEASON
BY J. L. Bowers
Att'y May 12, 1959 F. A. MORRIS ET AL 2,886,642
AUTOMATIC TOLL TICKETING
Filed April 13, 1953 80 Sheets-Sheet 78
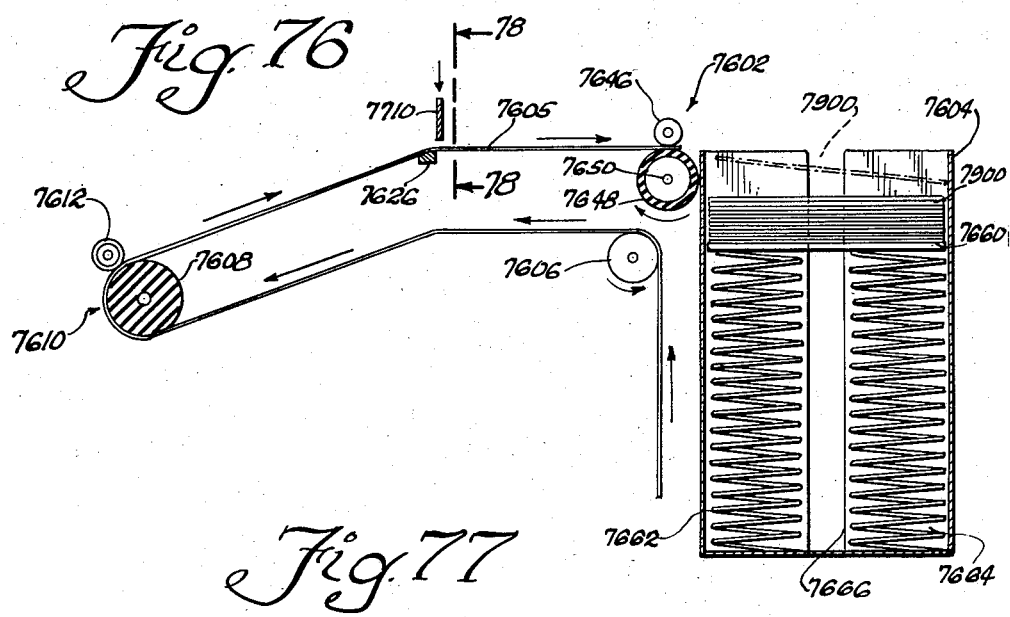
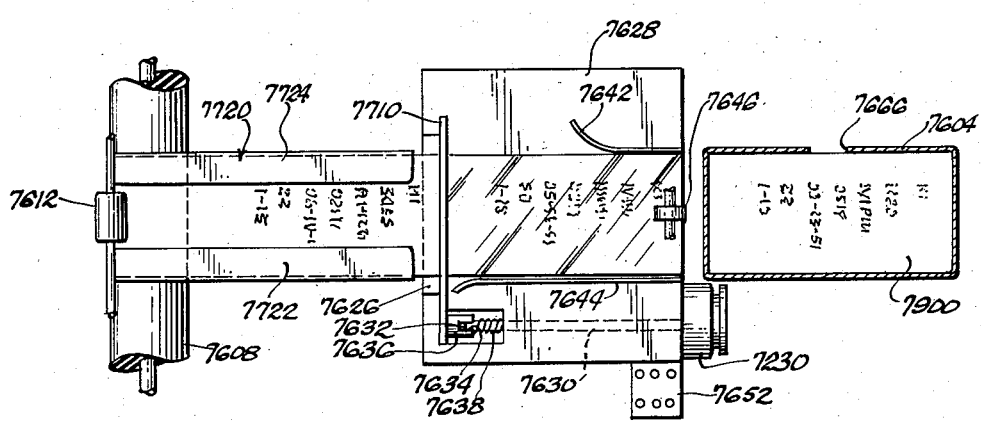
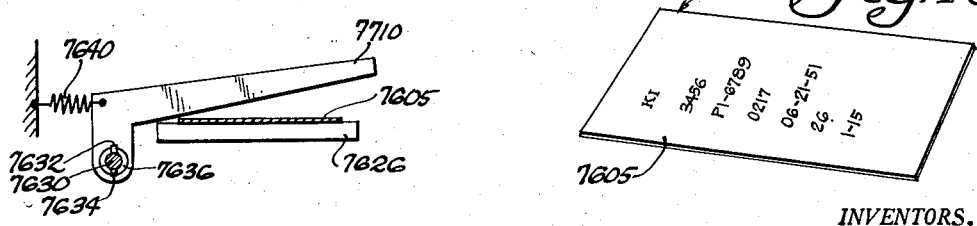
INVENTORS,
FRANK A. MORRIS
JAMES D. CONFELD
HOWARD L. FOOTE
HOWARD S. GLEASON
BY
J. L. Bowes
Att'y

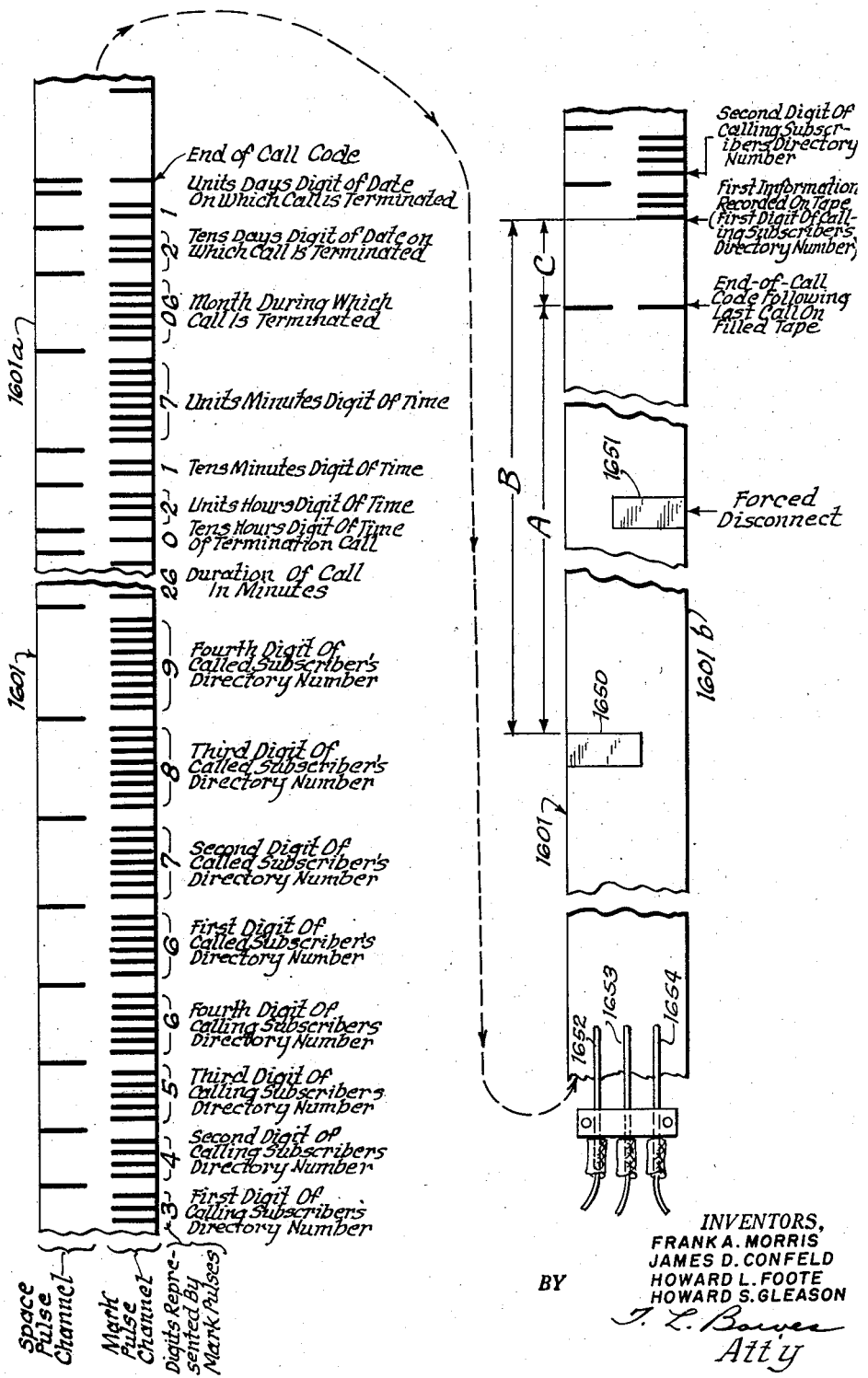

May 12, 1959     F. A. MORRIS ET AL     2,886,642
AUTOMATIC TOLL TICKETING
Filed April 13, 1953     80 Sheets-Sheet 80

INVENTORS,
FRANK A. MORRIS
JAMES D. CONFELD
HOWARD L. FOOTE
HOWARD S. GLEASON
BY
Att'y

United States Patent Office 2,886,642
Patented May 12, 1959

1

2,886,642

AUTOMATIC TOLL TICKETING

Frank A. Morris and James D. Confeld, Rochester, Howard L. Foote, Fairport, and Howard S. Gleason, East Rochester, N.Y., assignors, by mesne assignments, to General Dynamics Corporation, a corporation of Delaware Application April 13, 1953, Serial No. 348,202

52 Claims. (Cl. 179—7.1)

This invention relates to an automatic toll ticketing system for use in conjunction with an automatic telephone system, and, more particularly, to such a toll ticketing system in which records are produced of data pertaining to toll calls.

The growth of suburban areas contiguous to metropolitan areas has produced a large increase in the volume of calls placed from both areas which must be handled on a toll charge basis. In accordance with conventional telephone practice, these toll calls are handled by a special group of operators who complete these calls and record certain items of information relating to the calls in order to provide a basis for billing the subscriber for use of the toll facilities. These items, which are recorded either manually or semi-automatically, may include the identification of the calling and calling subscribers, the time of completing and terminating the call, the duration of the call, the date of completing the call, and the charge to be assessed for the call.

Prior systems for automatically collecting and printing these items of information in order to obviate the need for the large number of toll operators are capable of accomplishing this result only by the use of large amounts of electromagnetically operated switching, registering, and printing equipment. This equipment, in addition to being relatively slow in operation so as to unduly increase the holding time of the toll trunks, is costly to build, install and maintain, and occupies an excessive amount of floor and rack space in the exchange offices. Some of these prior systems produce a printed ticket having the desired information thereon immediately following the termination of the toll call to which the information pertains and thereby require a large amount of printing equipment in order to provide adequate service during the periods of the day when the toll traffic is the heaviest.

Accordingly, one object of this invention is to provide a new and improved automatic toll ticketing system for producing a record of the items of information pertaining to telephone calls.

It is another object of the invention to provide an improved automatic toll ticketing system of the character described in which the toll calls to be ticketed are routed through toll trunk circuits having calling line vertification switches associated therewith through which connections must be routed back to the calling lines before the trunk circuits are conditioned to repeat switch directing impulses over their associated interoffice trunks.

According to a further object of the invention, the verification switch trains are dial controlled from the calling substations of the system, and each train thus set up is equipped with facilities for automatically answering back to the trunk circuit with which it is associated after it has received the full complement of digits designating a particular calling line.

A further object of the invention is the provision of an automatic toll ticketing system primarily utilizing electronic components in order to reduce the operating time of the system and the space occupied by the equipment.

Another object of this invention is the provision of a toll ticketing system having separate and independent intelligence and control circuits.

Another object of this invention is to provide an improved toll ticketing system in which information relating to a plurality of calls is stored and subsequently utilized to produce a plurality of records.

Another object of this invention is to provide an improved toll ticketing system in which a single recorder registers all of the information pertaining to toll connections completed over a single toll trunk.

Another object of the invention is to provide an automatic toll ticketing system in which stored information pertaining to a plurality of toll calls may be utilized at random to produce a series of printed tickets, each bearing information relating to a single call.

It is another object of the invention to provide an improved trunk recorder for storing items of information pertaining to toll calls on a magnetic tape.

Another object is to provide an improved toll ticketing system in which all of the information pertaining to toll calls is stored and utilized in decimal code form.

Another object is to provide an improved toll ticketing system in which all of the information pertaining to a particular toll call is stored in a single register means.

A still further object is to provide a register individual to a toll trunk which is first controlled by a manually actuated dialing device and is thereafter controlled by duration of call timing means and date and time of call indicating means.

It is still another object of the invention to provide improved facilities for automatically transferring information from a trunk circuit through which a toll call is extended to a trunk recorder individually associated with the trunk circuit and for controlling the advancement of the recording medium in the recorder on a step-by-step basis so that a minimum amount of recording medium is used in the handling of each toll call.

According to a further object of the invention, improved facilities are provided for discretely marking off on the recording medium of each trunk record each digit of information recorded thereon, for automatically advancing the tape on a step-by-step basis as the recording operation progresses, and for discretely marking on the recording medium the beginning and end of the information pertaining to each call.

It is still another object of the invention to provide facilities for automatically advancing the recording medium a predetermined amount after all of the information pertaining to a call is recorded thereon, thereby to provide a time interval between successive call playback operations during which certain control operations may take place in the playback and printing facilities.

Another object of this invention is to provide an improved toll ticketing system in which certain of the digits dialed by the subscriber are simultaneously utilized to extend the connection and to actuate the trunk recorder to store the digits.

In accordance with a still further object of the invention, time and date information are automatically fed to the trunk recorders through their associated trunk circuits immediately following the termination of successfully completed calls through the trunk circuits.

According to still another object of the invention, improved facilities are provided in each trunk circuit for first automatically releasing the switch train through which a call is extended to the trunk circuit and for then guarding the trunk circuit against seizure during the period when time and date of call termination information is being fed through the trunk circuit to the trunk recorder.

Another object of this invention is the provision of improved automatic playback and printing facilities which sequentially seize the trunk recorders to produce printed records of the information stored therein.

It is another object of the invention to provide a toll ticketing system of the character described, in which the record tapes of the trunk recorders are driven at high speed during each record playback operation and the information released therefrom pertaining to each call is temporarily stored in registers from which it is released to the printing facilities.

In accordance with a further object of the invention, electronic digital registers capable of accepting signals in the form of pulses having low signal-to-noise ratio and delivered thereto at very high speeds are used for temporary storage of information on each call during each playback and printing operation.

In accordance with a still further object of the invention, the information is temporarily stored in the electronic digital registers in decimal digit form and is released to the printing facilities in permutation code form.

Another object is to provide automatic toll ticket printing facilities which are rendered inoperative to print the information stored in a trunk recorder with which the facilities are associated unless the recorder contains all of the information essential to the production of a complete toll ticket.

Another object of this invention is to provide a printer for producing toll tickets in which the printer itself controls the sequential transmission of the registered information to the printer.

It is still another object of the invention to provide an improved automatic toll ticketing system in which the trunk recorders are cleared of the information stored therein by playback and printing facilities which are normally only operated for a short period during a given time period and when operating seize the trunk recorders in sequence and clear all of these recorders of the information stored therein.

A still further object is the provision of an automatic toll ticketing system in which facilities are provided for initiating operation of a ticket printer on an emergency basis when a particular registering means is filled with information pertaining to a plurality of toll calls.

Another object of this invention is to prevent further operation of the ticket printing facilities following the failure of these facilities to produce a complete toll ticket during one complete playback operation of a trunk recorder with which these facilities are operatively associated.

Another object of this invention is the provision in an automatic toll ticketing system of a printer which is selectively operated in accordance with the settings of electronic registers.

Another object is to provide a toll ticketing system in which the data relating to an individual toll ticket is registered in decimal numerical form before the initiation of a printing operation.

Another object of this invention is to provide a toll ticketing system in which means are provided for simultaneously producing an indication of the calling exchange and entering a manifestation of a monetary value in a computer associated with a ticket printer.

Another object of this invention is the provision of a control circuit for a ticket printer in which a plurality of registers are sequentially rendered effective to receive intelligence and are thereafter simultaneously rendered effective for the release of the stored intelligence.

Another object of this invention is the provision of a control circuit for a ticket printer in which a plurality of individual decimal numerical registers are sequentially rendered operative to receive intelligence in a first predetermined order and in which the information is removed from these registers in a second predetermined order.

It is a further object of the invention to provide an improved toll trunk circuit having embodied therein facilities for carrying out the control functions required incident to calling line verification, recordation of the data on each call successfully handled by the circuit and playback of the information stored in the associated trunk recorder to the playback and printing facilities, in addition to performance of the functions normally required of a conventional toll trunk circuit of the impulse repeating type.

It is another and more specific object of the invention to provide a simple and reliable arrangement for minimizing the recording of transients by the trunk recorders and for preventing transients developed during playback operations from being registered as authentic signal pulses in the electronic digital registers.

More generally, it is an object of the invention to provide an automatic toll ticketing system which is of relatively low cost and yet is reliable in operation and is inexpensive to maintain.

Other objects and advantages of the present invention will become apparent from the ensuing description of an illustrative embodiment thereof in the course of which reference is had to the accompanying drawings in which:

Figs. 3 and 3a are a three-wire block diagram showing certain components of the telephone system illustrated in Fig. 1;

Figure 3:
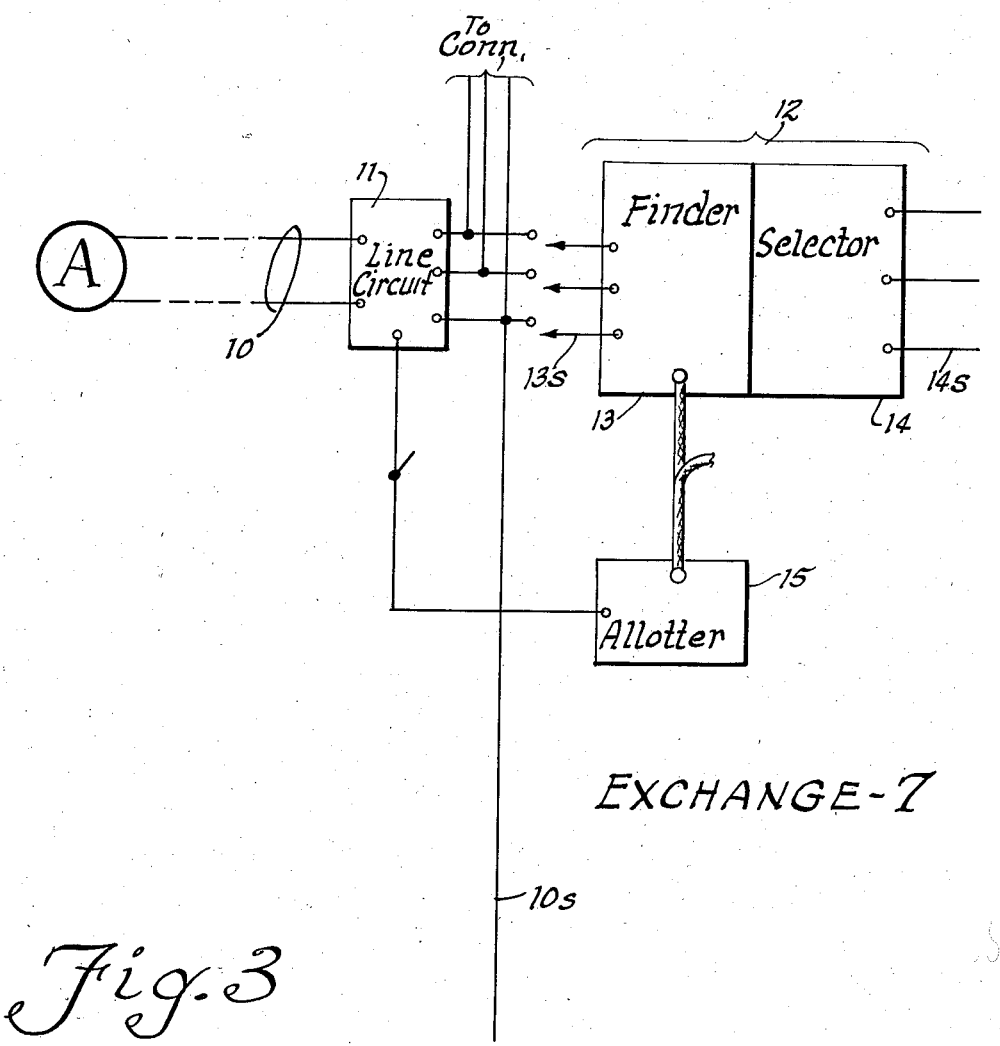
Figure 10:
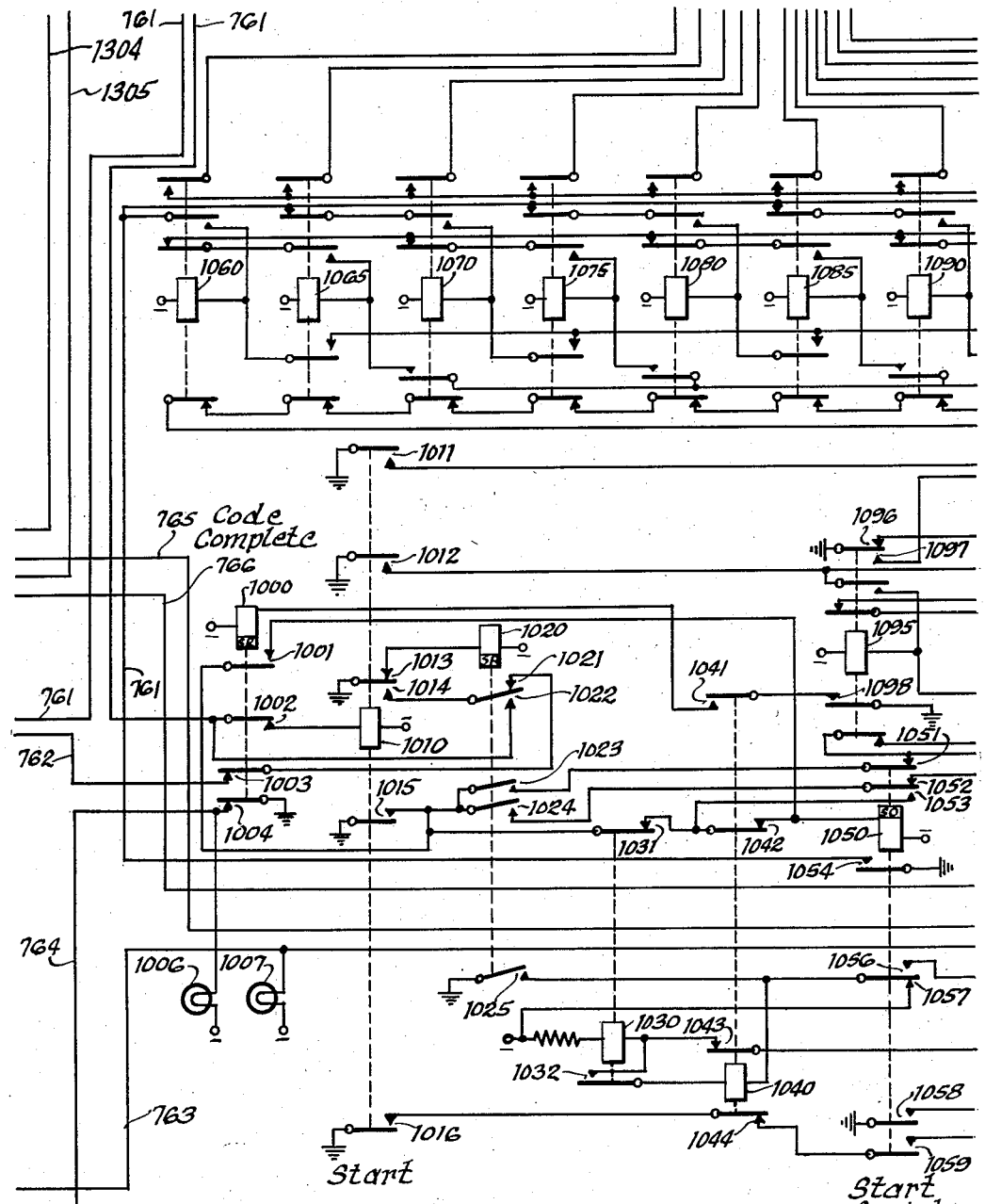
Figure 11:
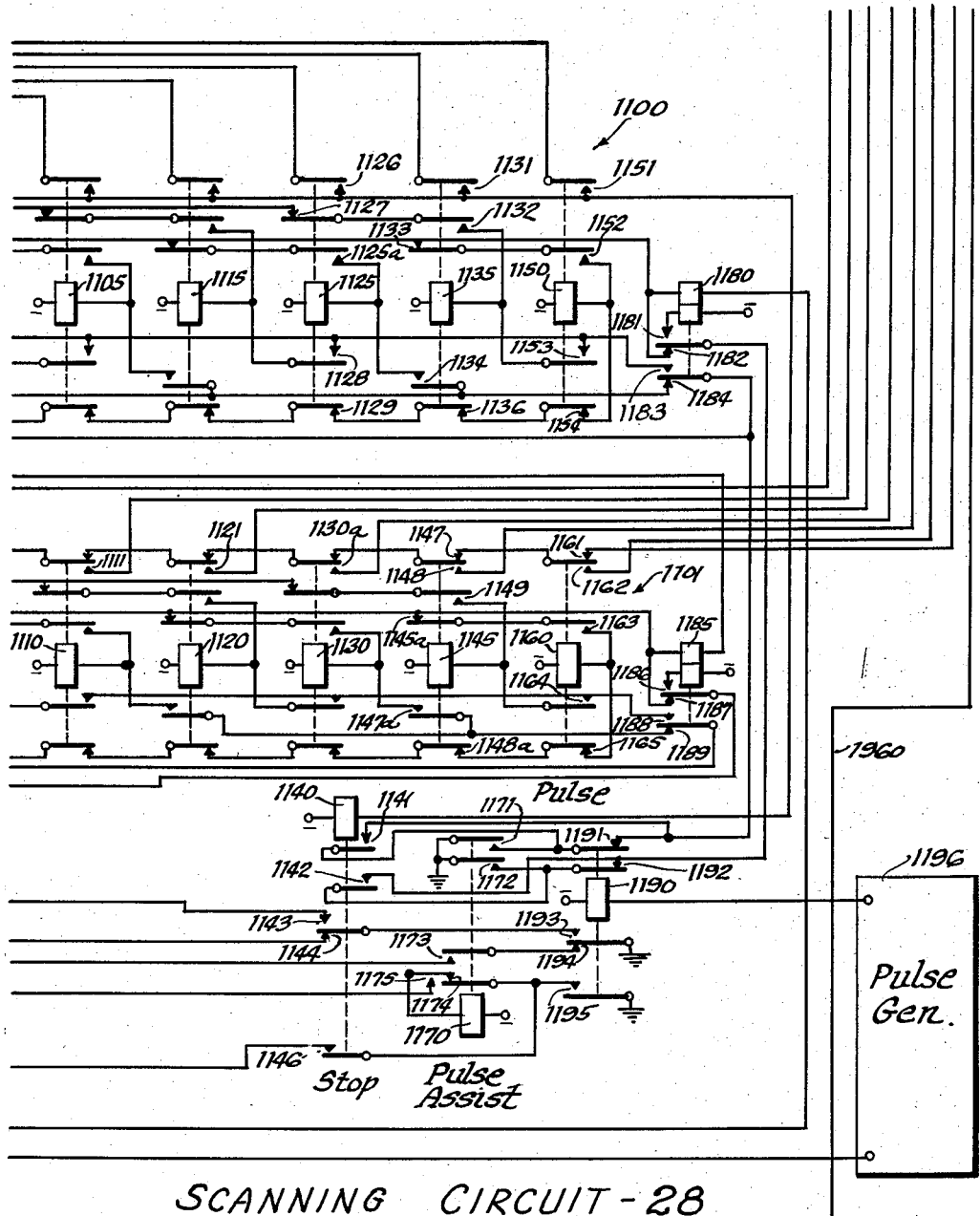
Figure 12:
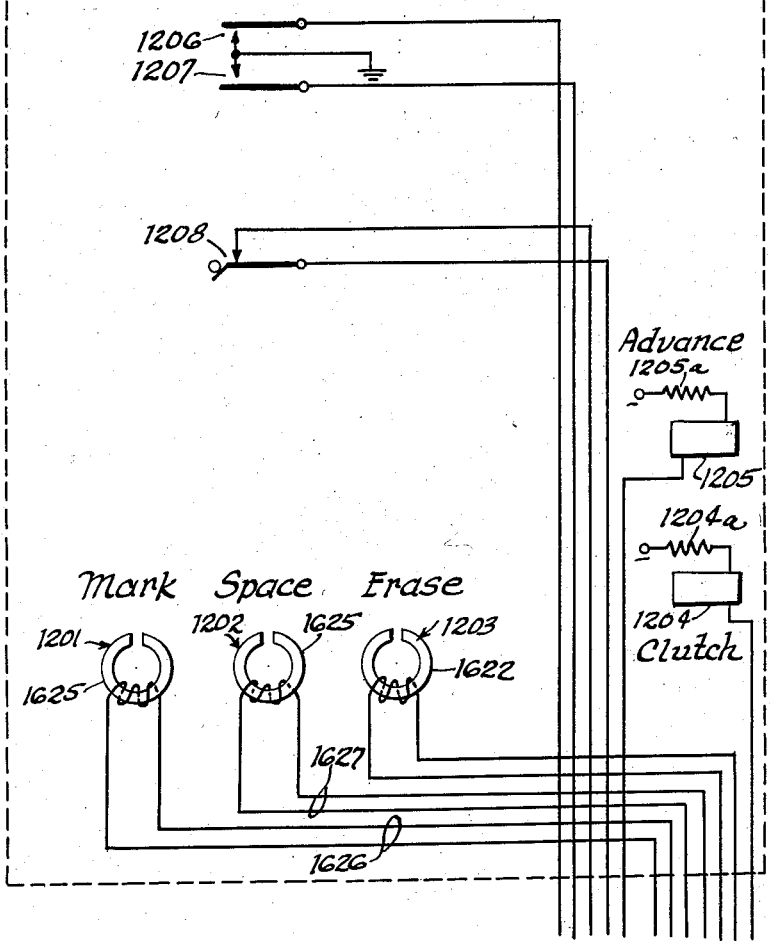
Figure 13:
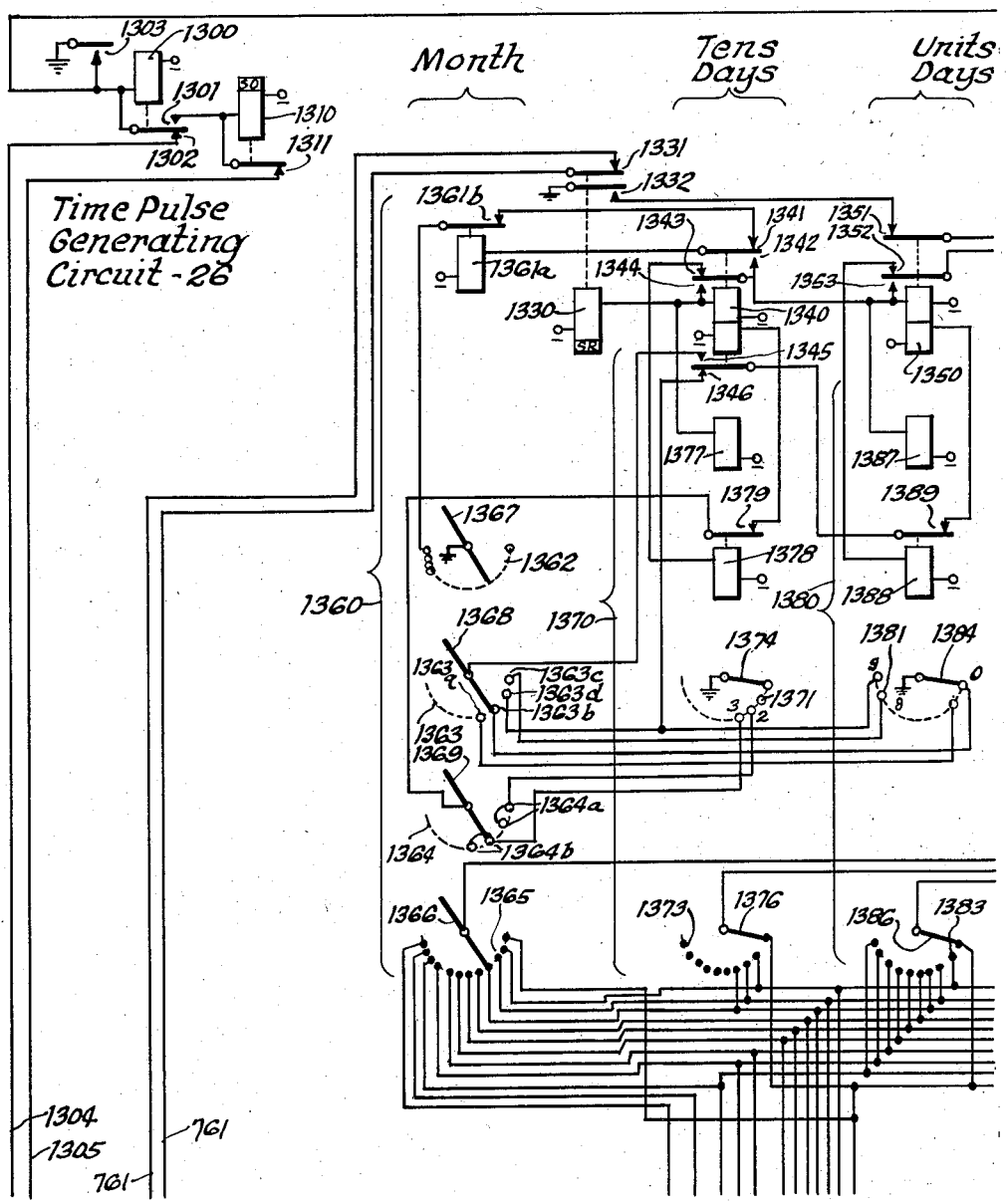
Figure 14:
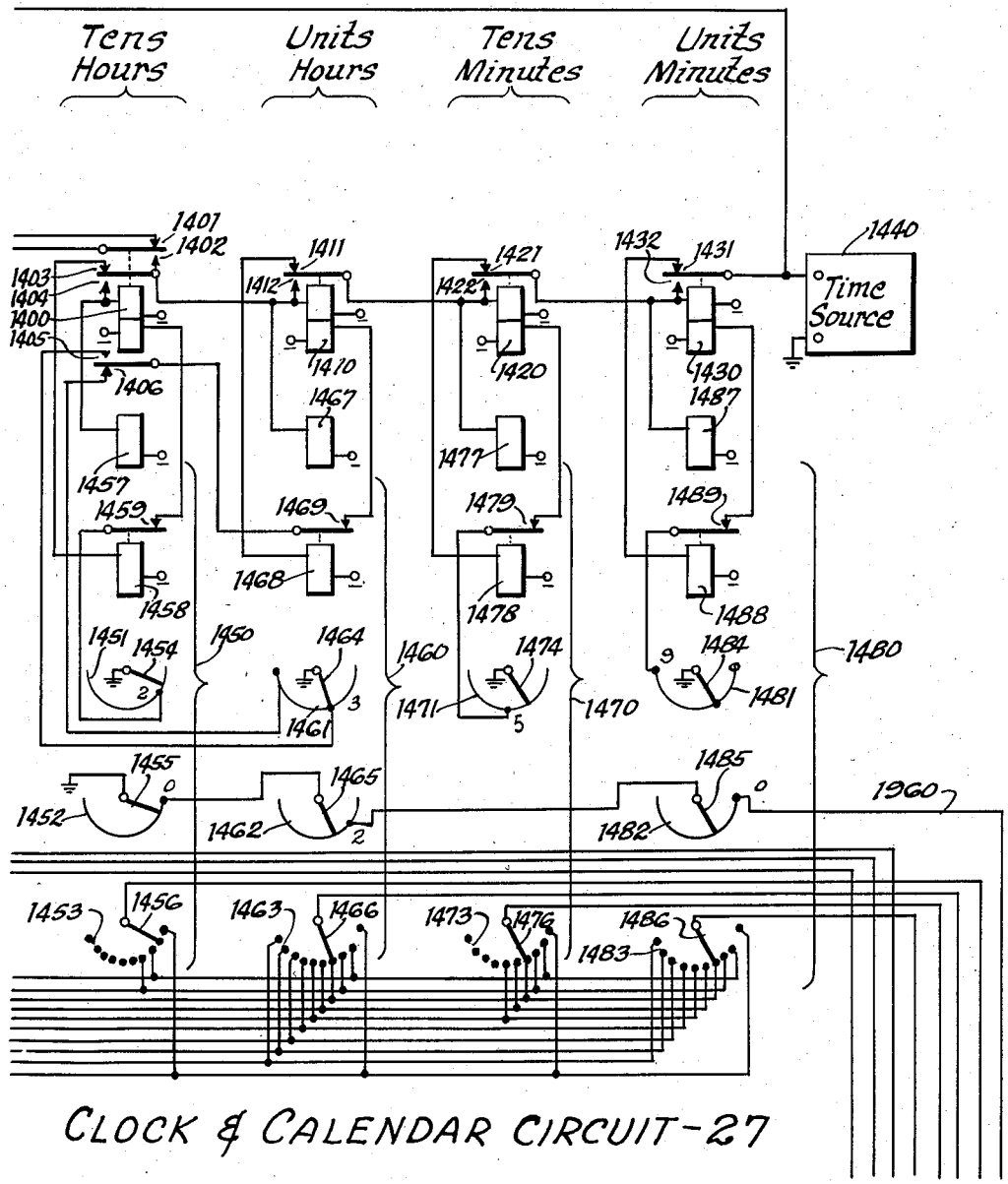
Figure 15:
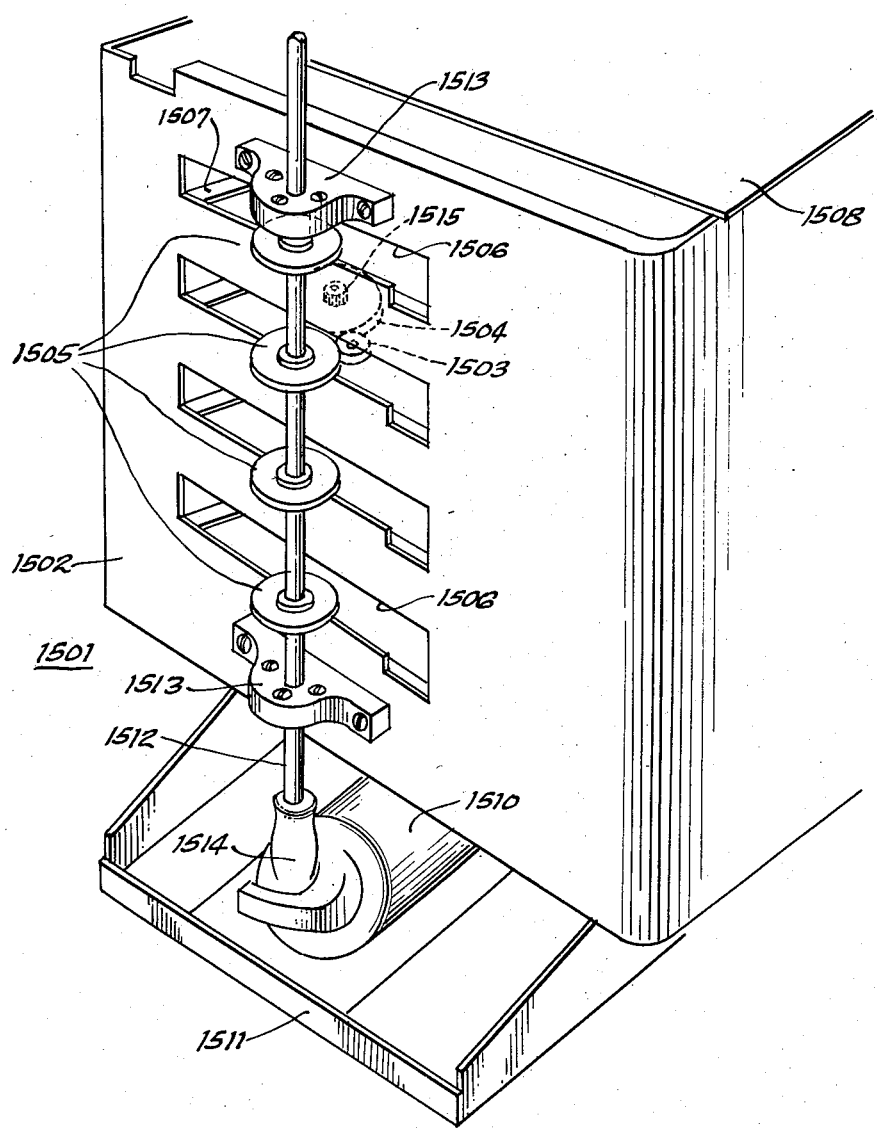
Figure 16:
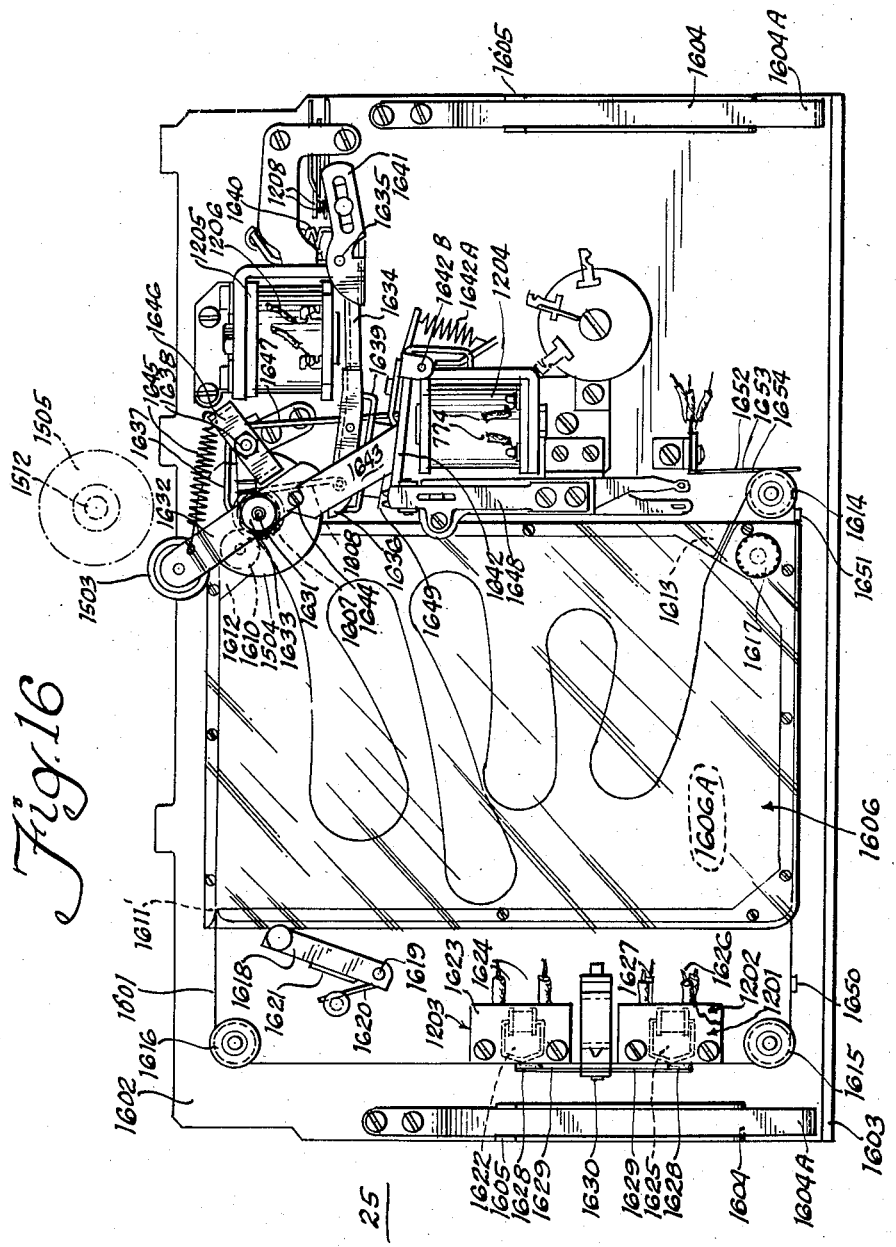
Figure 17:
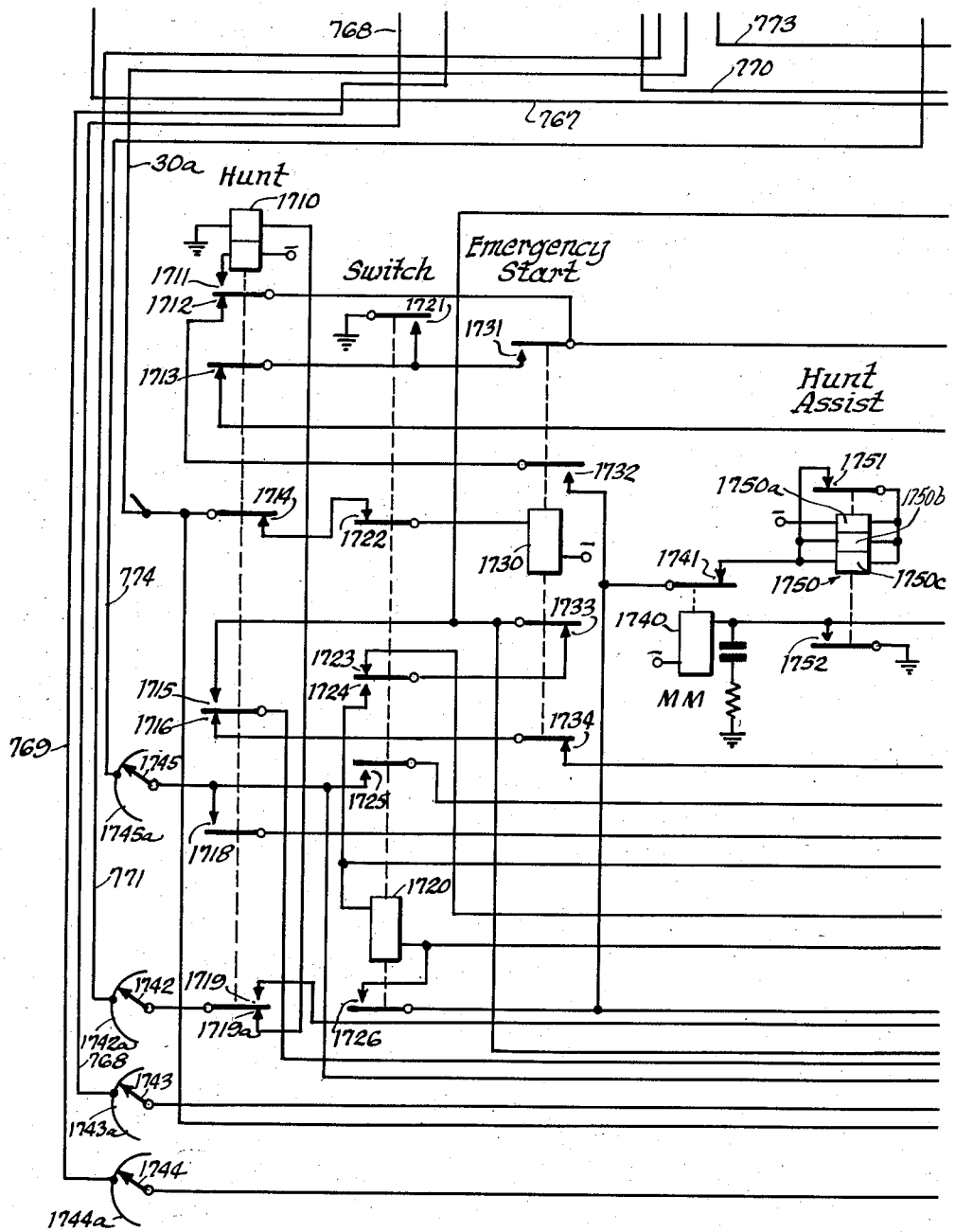
Figure 18:
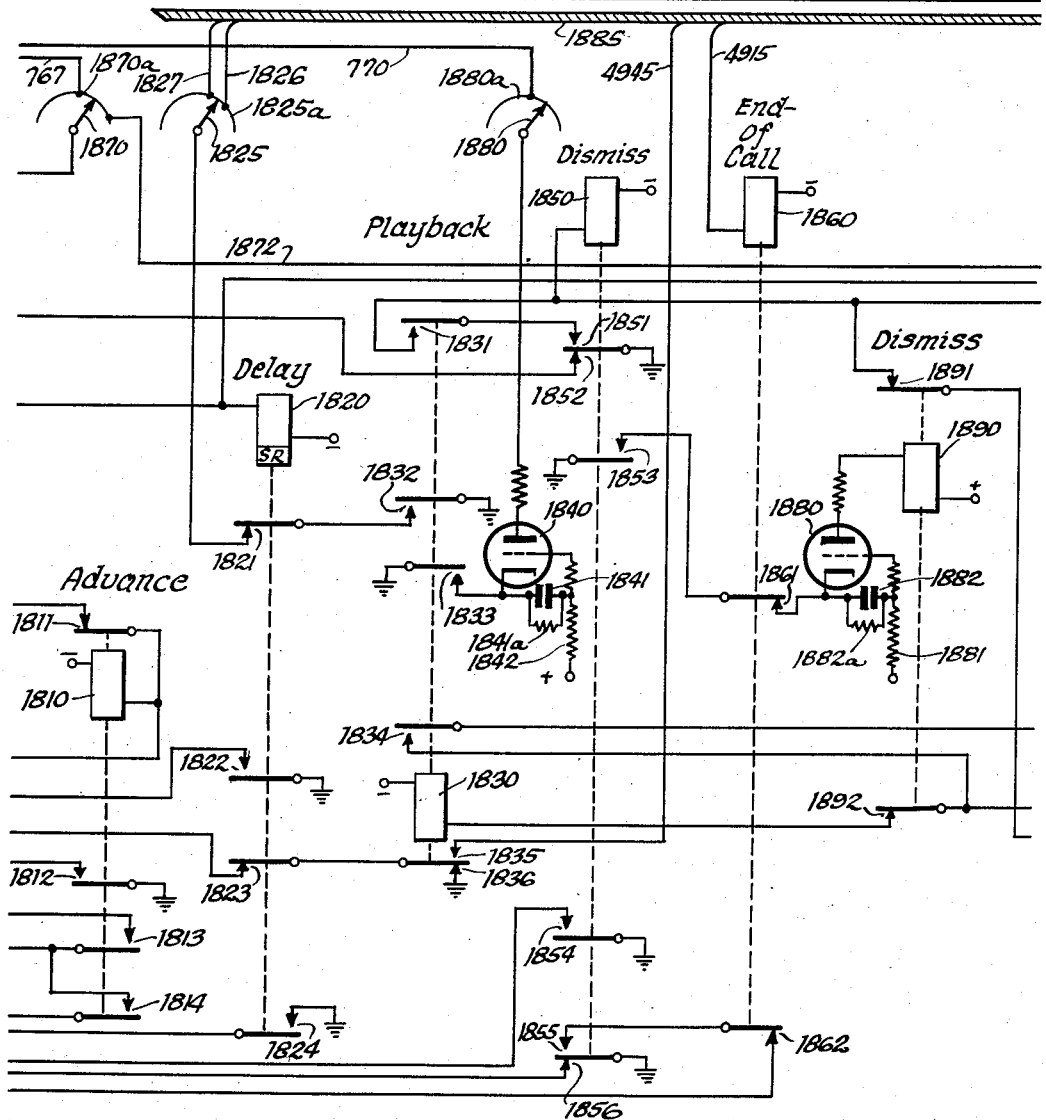
Figure 19:
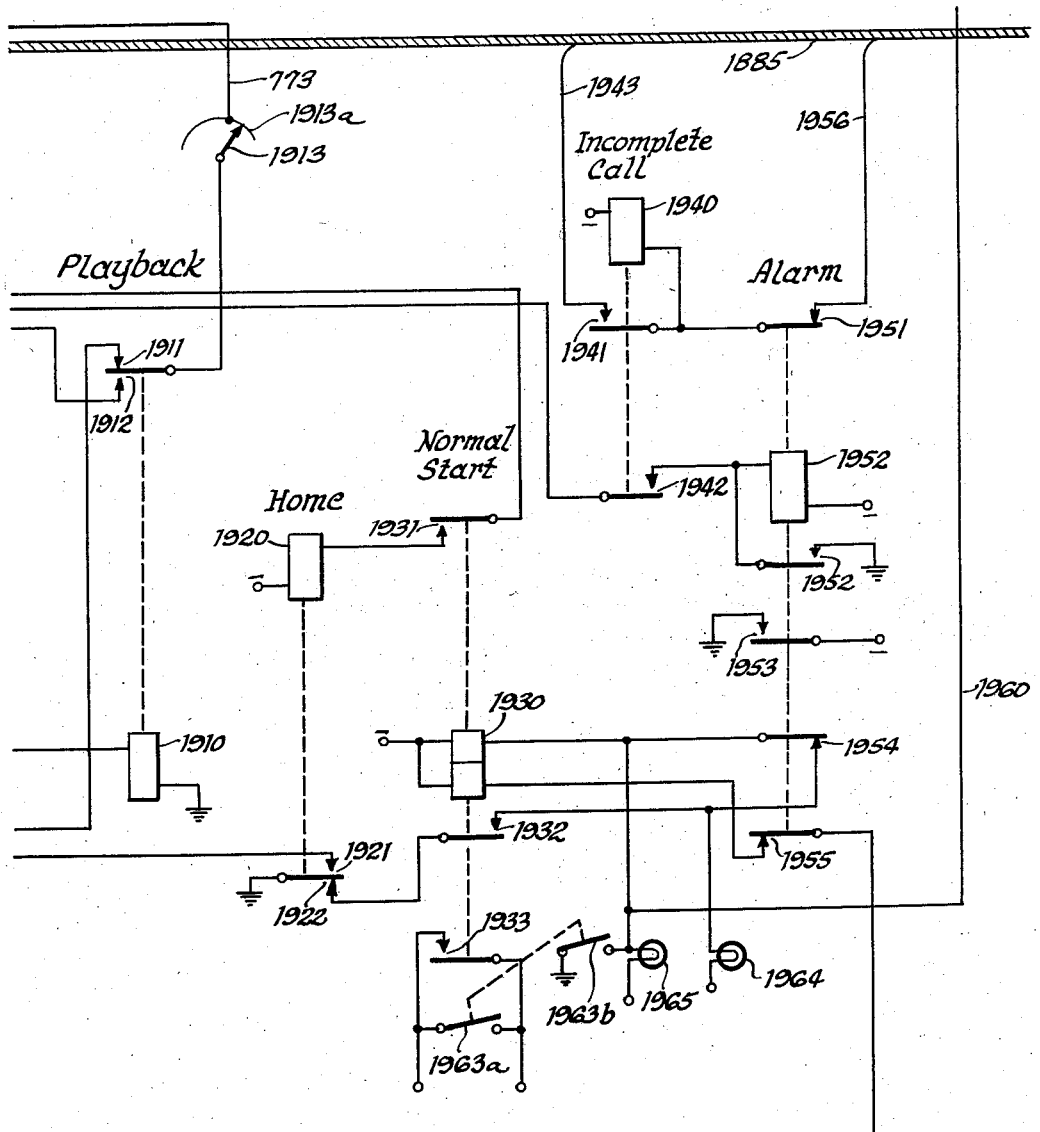
Figure 20:
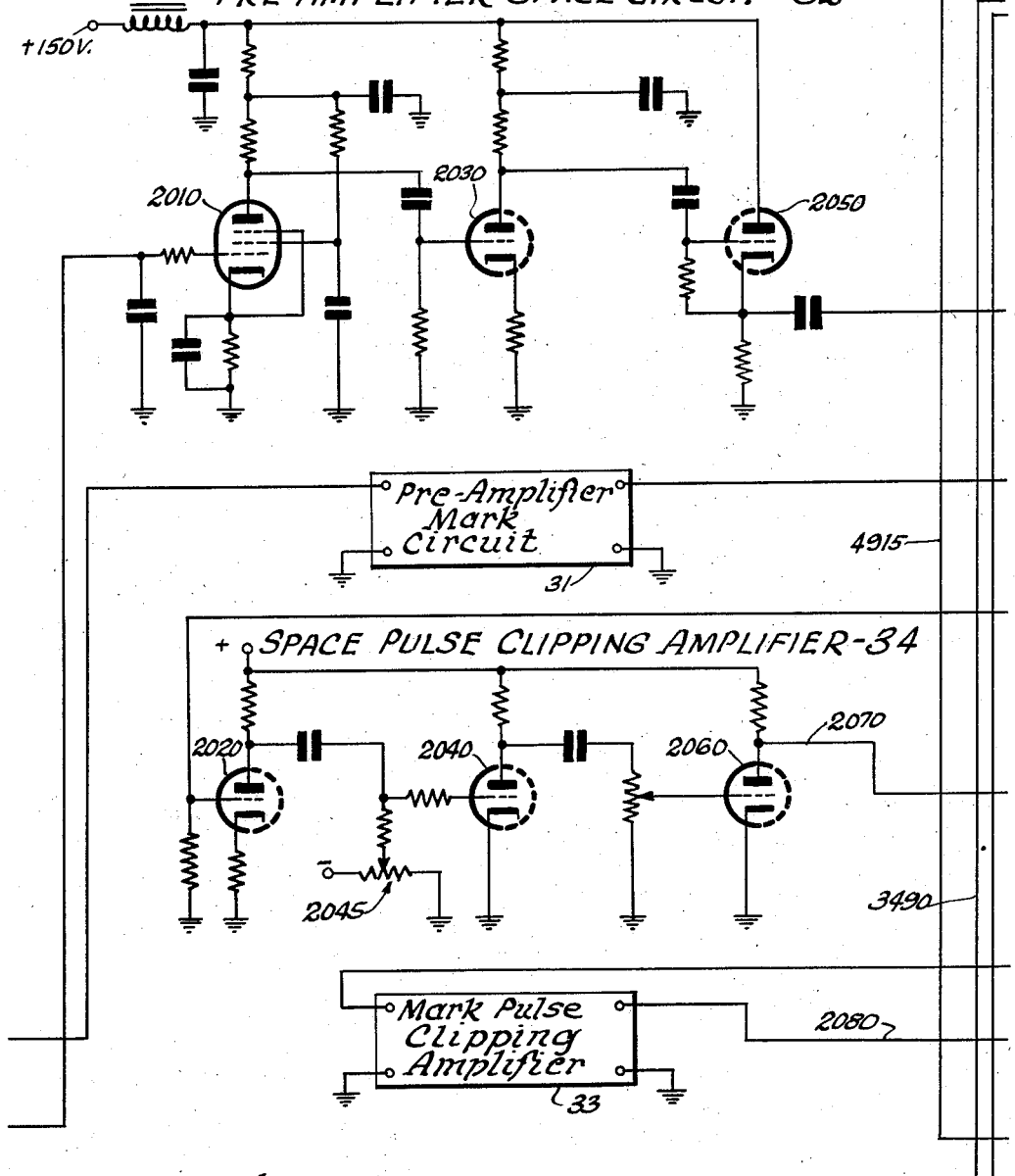
Figure 23:
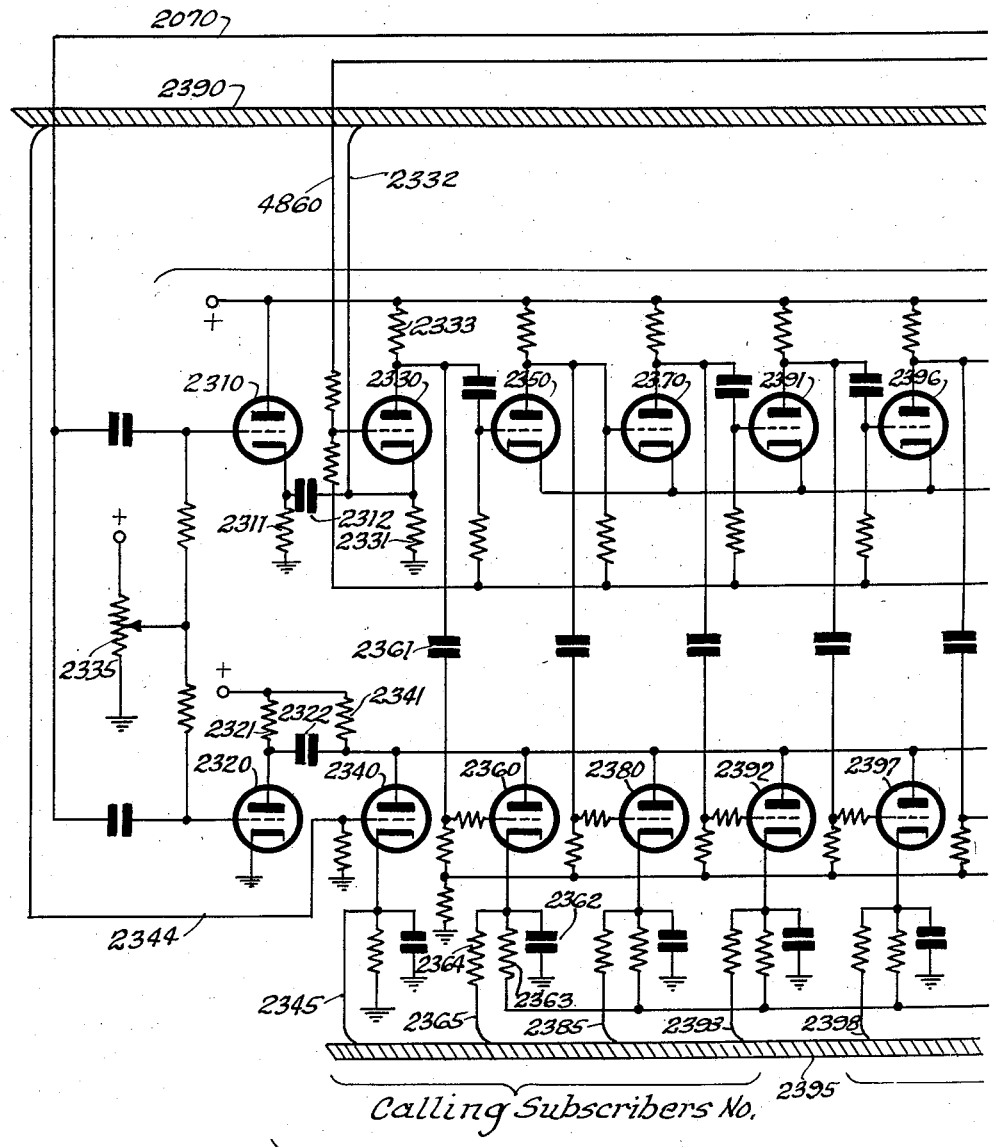
Figure 24:
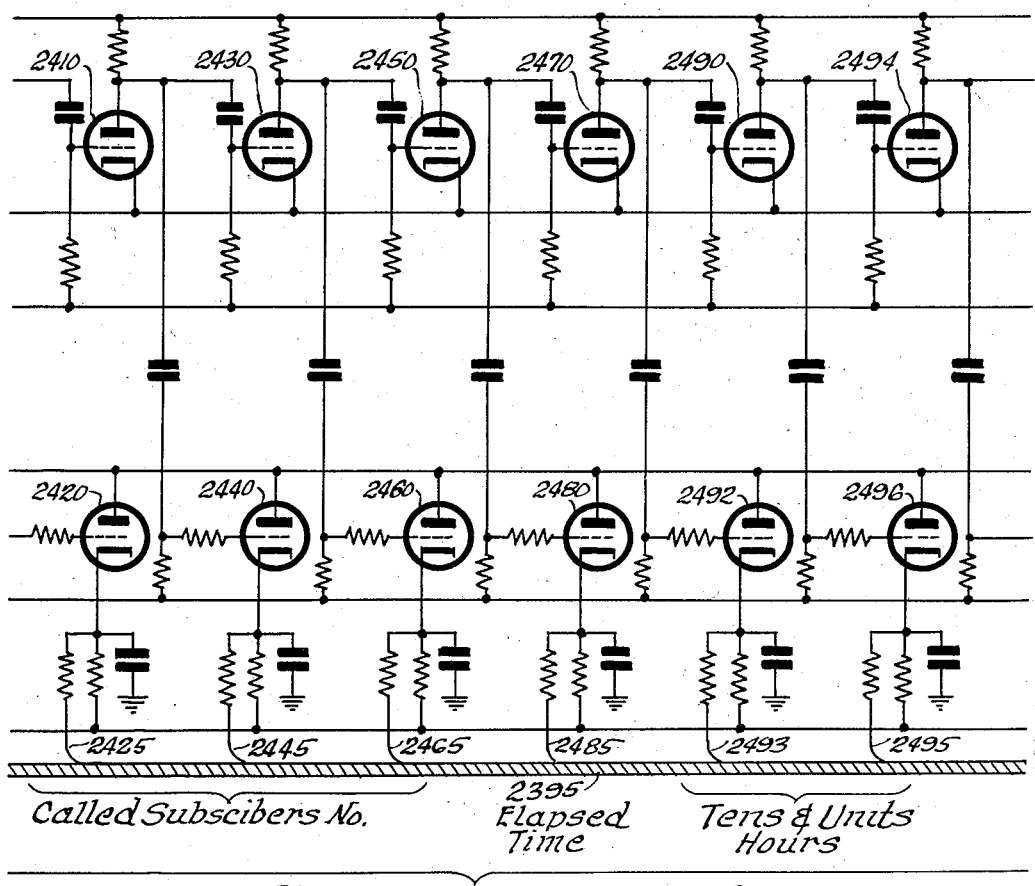
Figure 25:
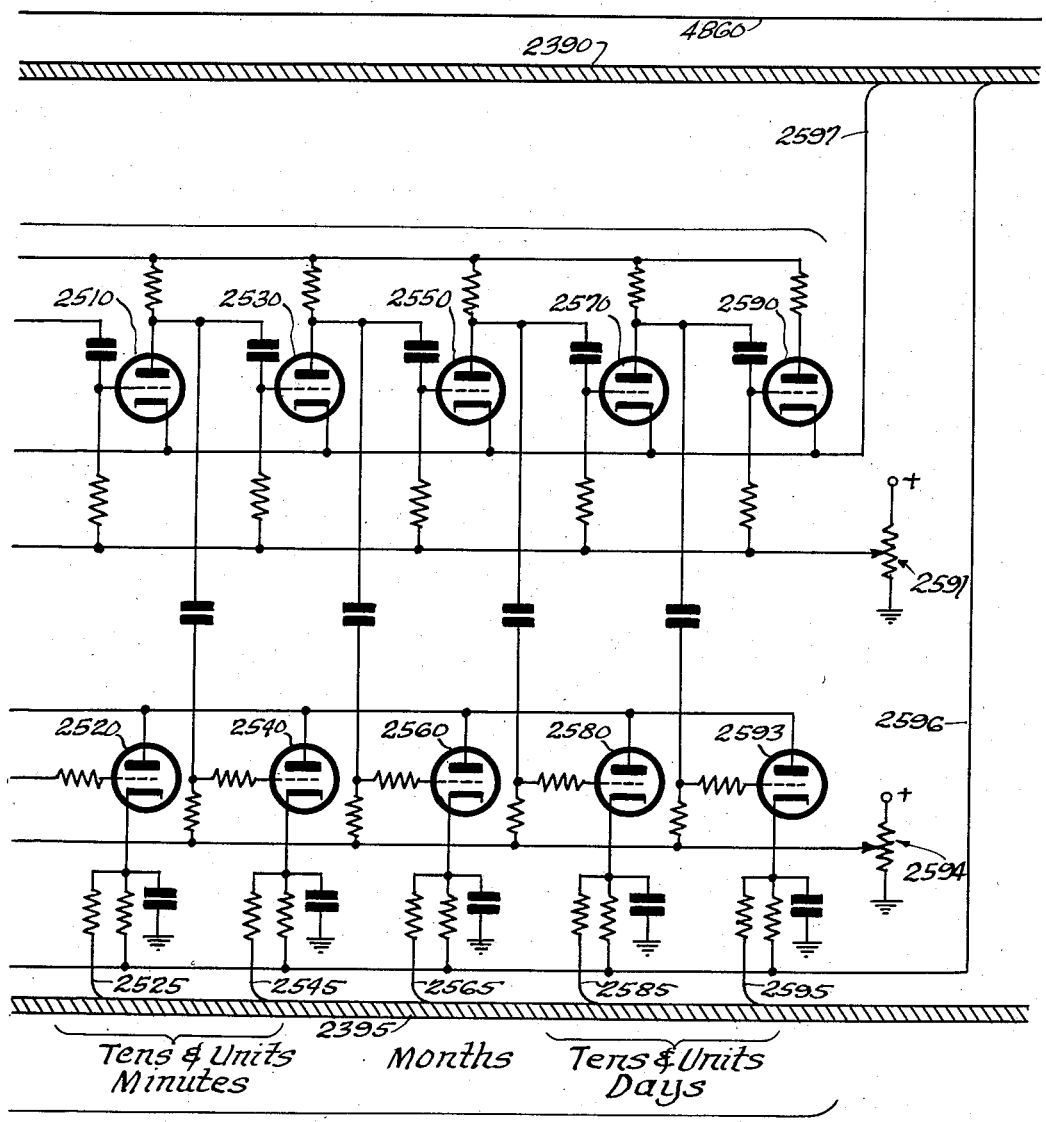
Figure 26:
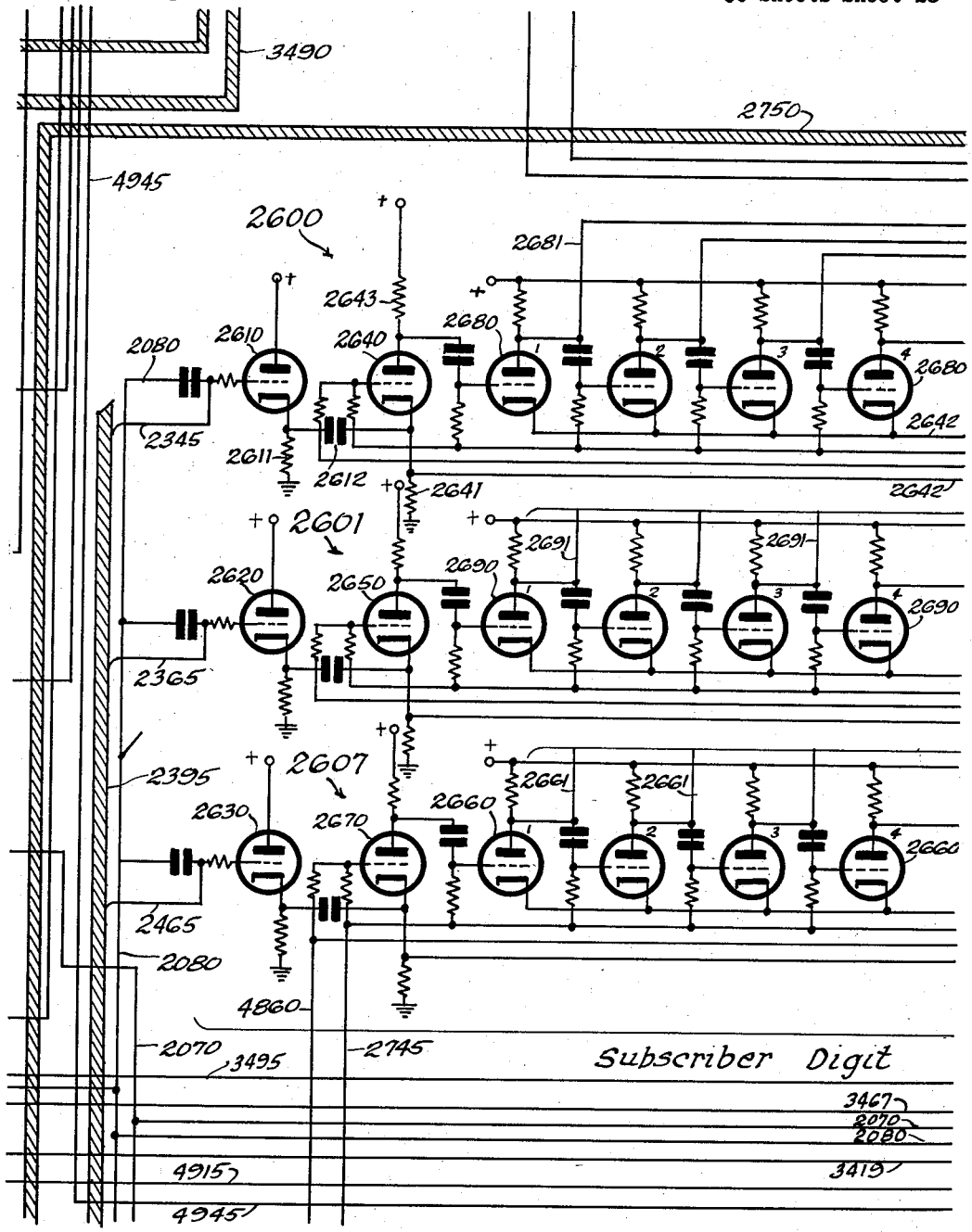
Figure 27:
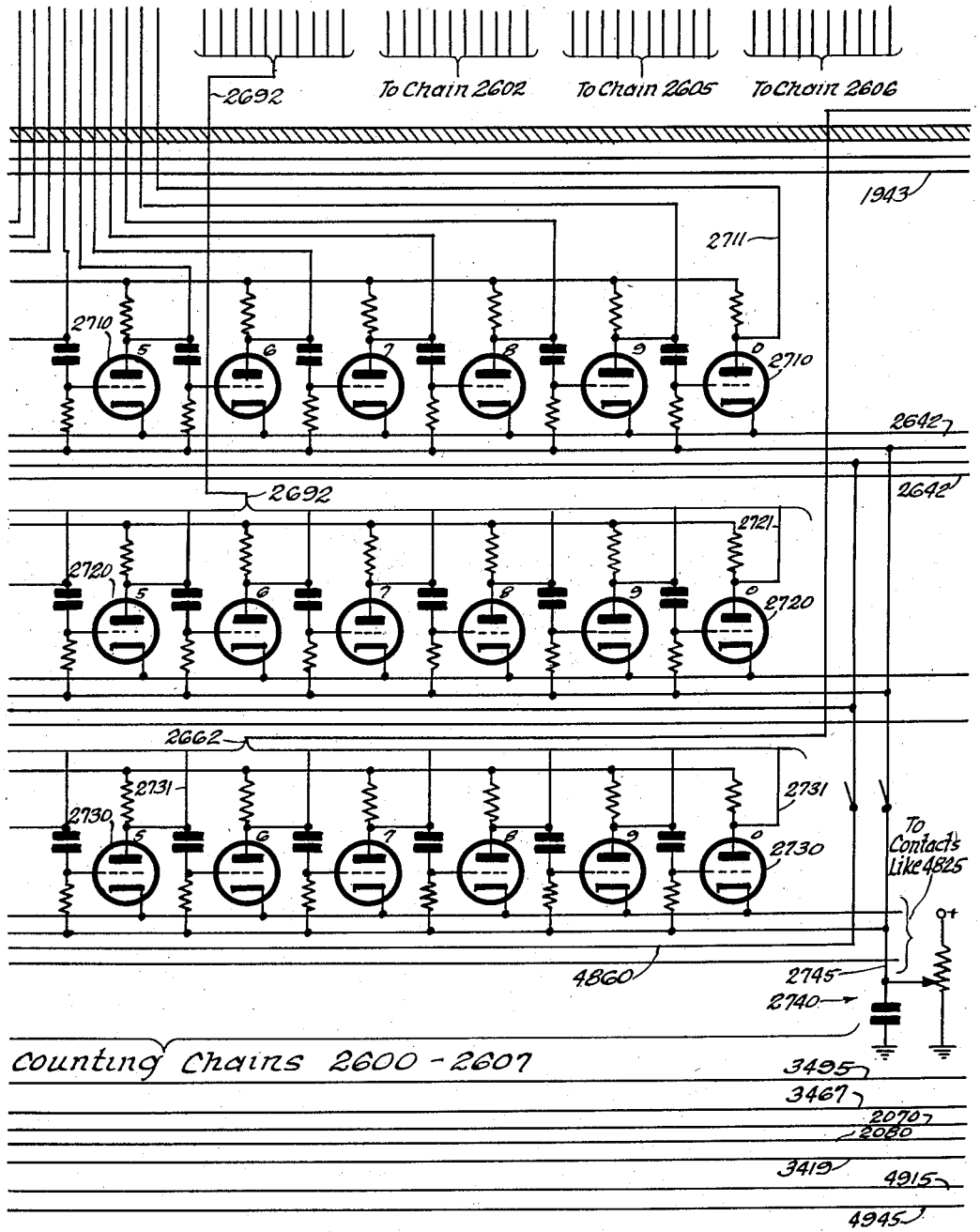
Figure 28:
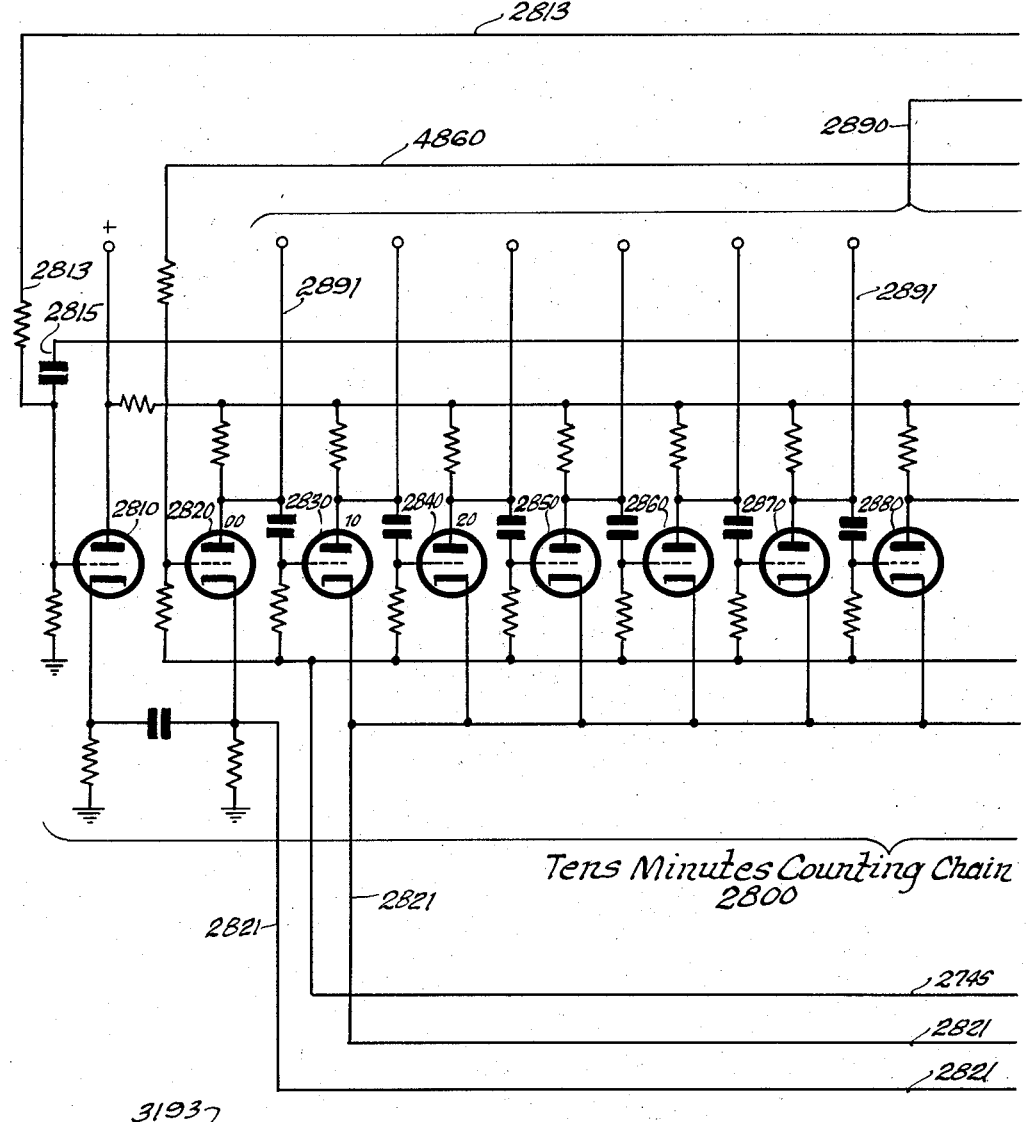
Figure 29:
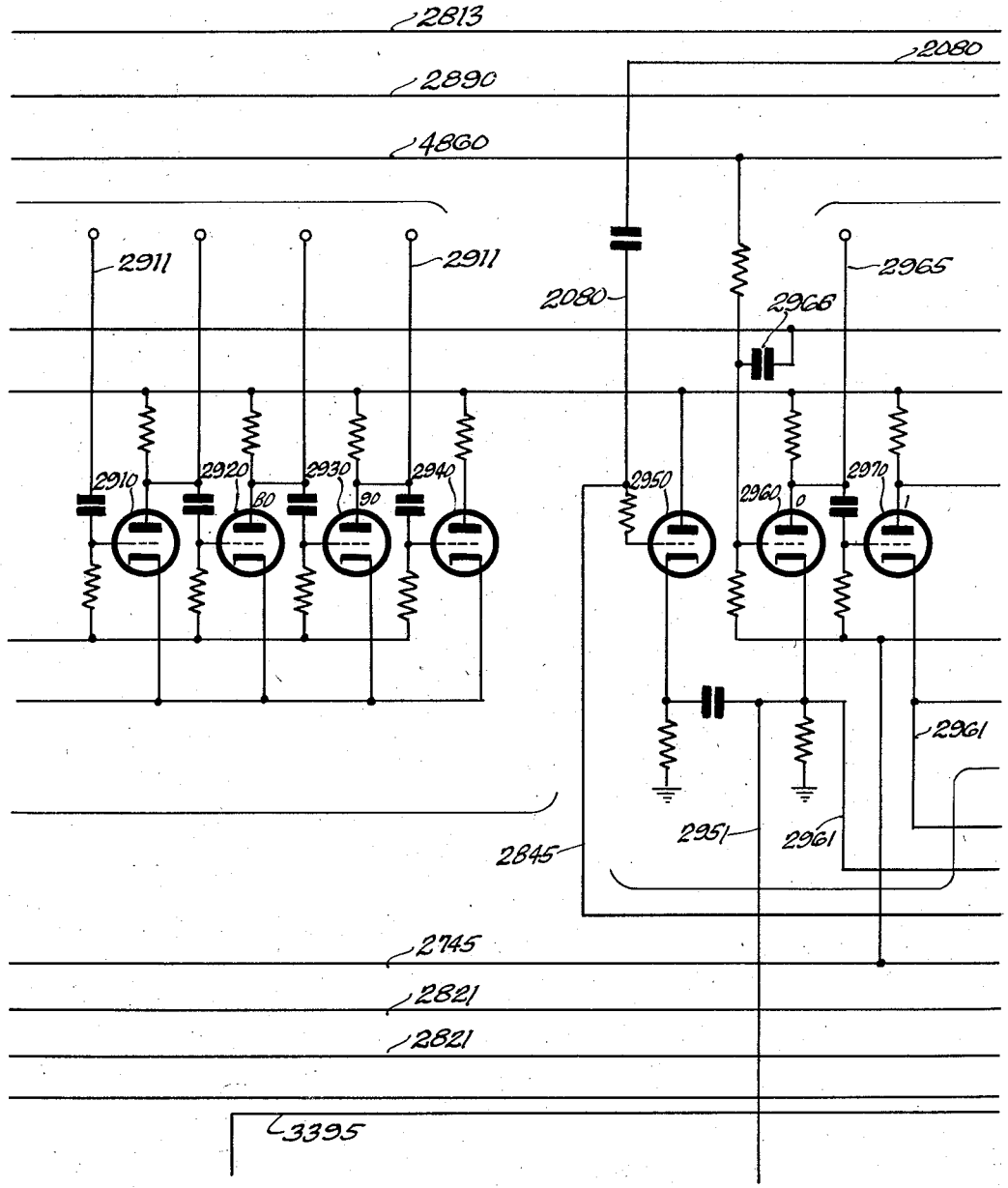
Figure 30:
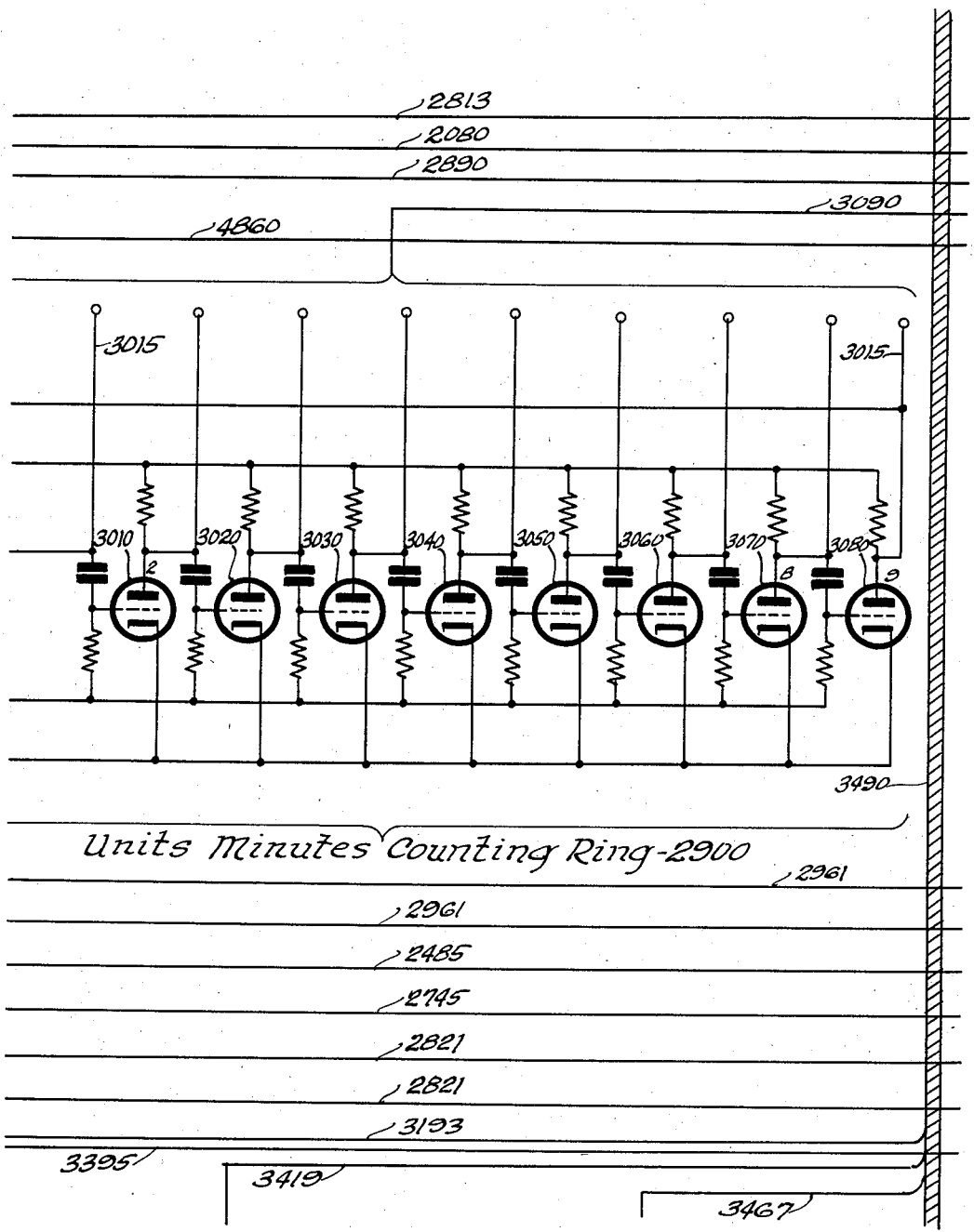
Figure 35:
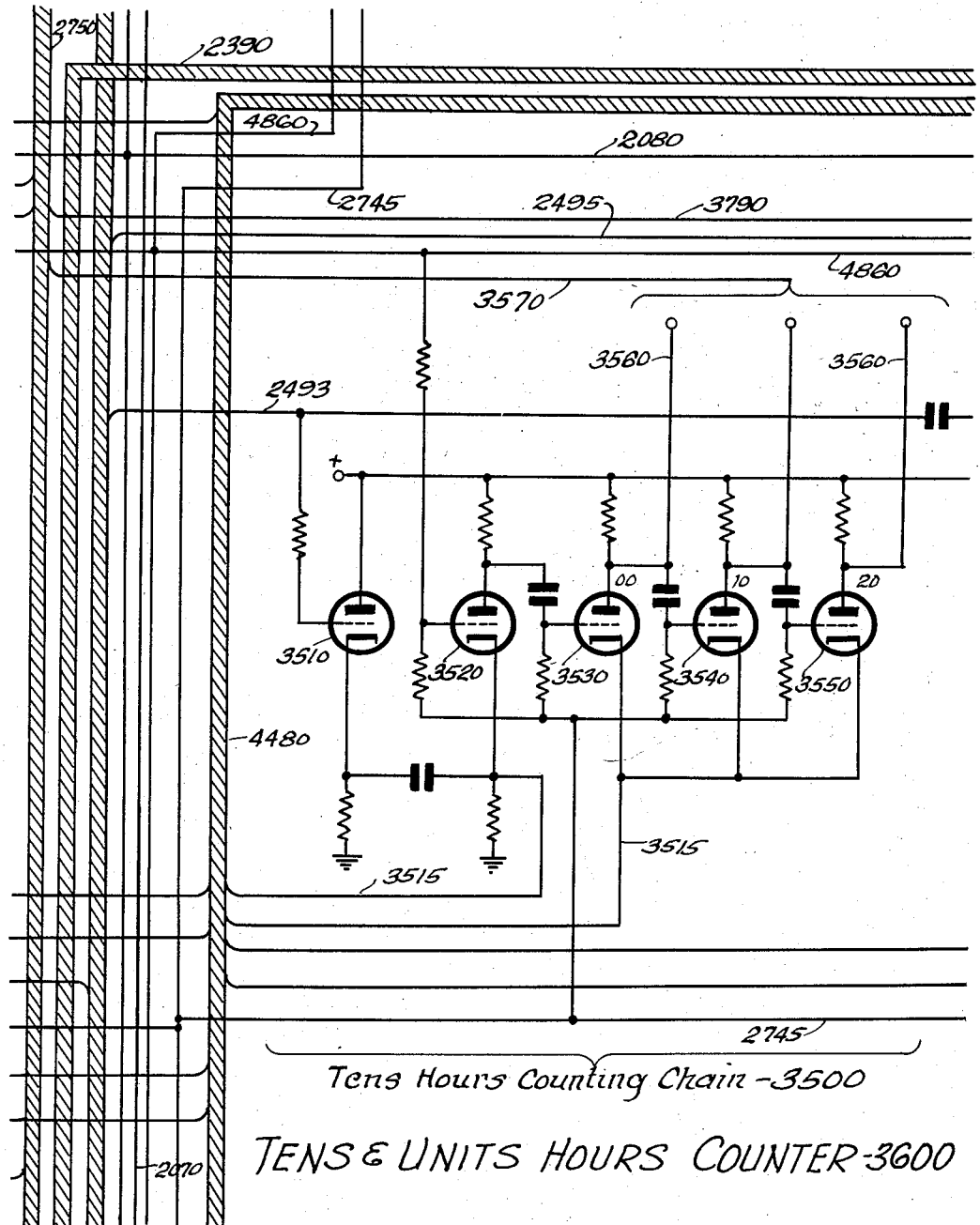
Figure 36:
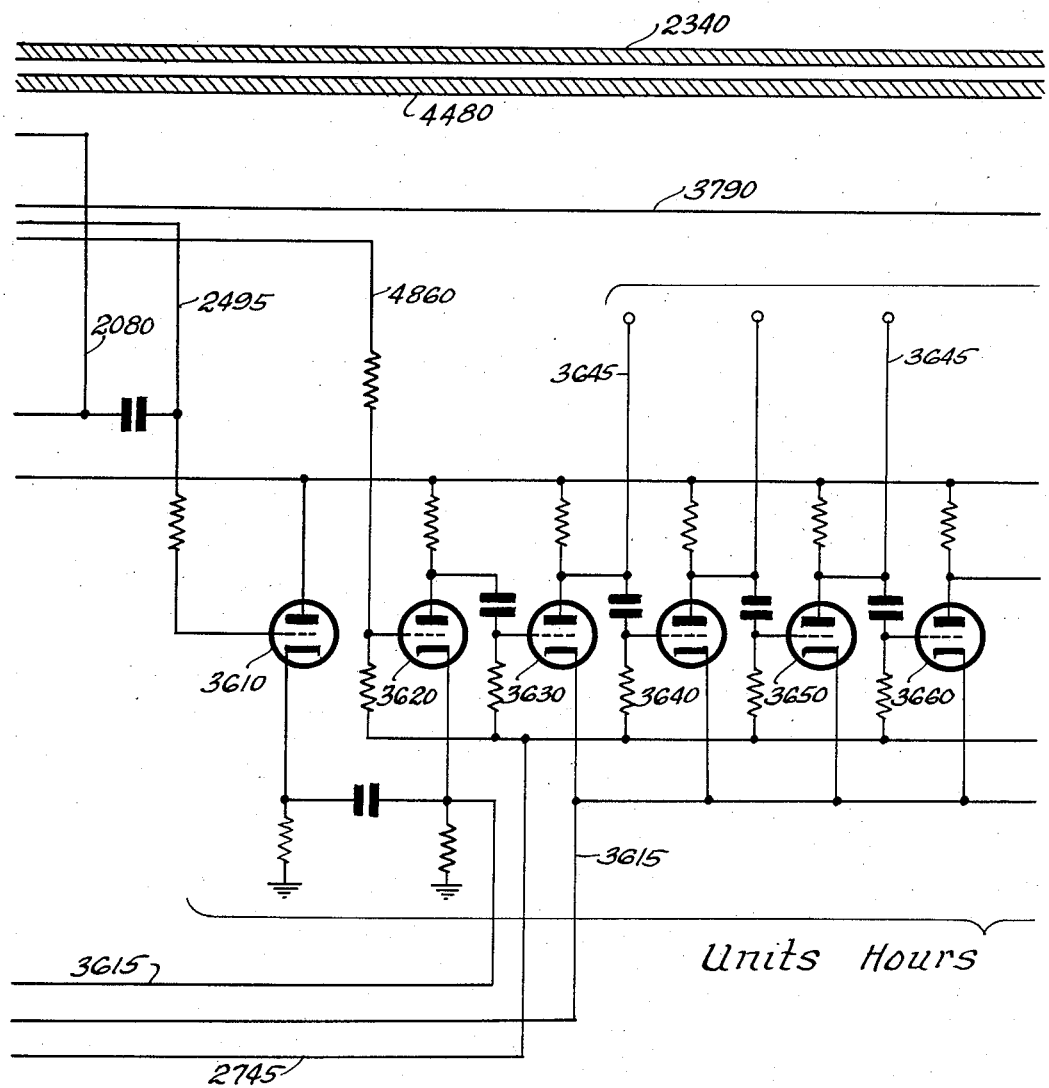
Figure 37:
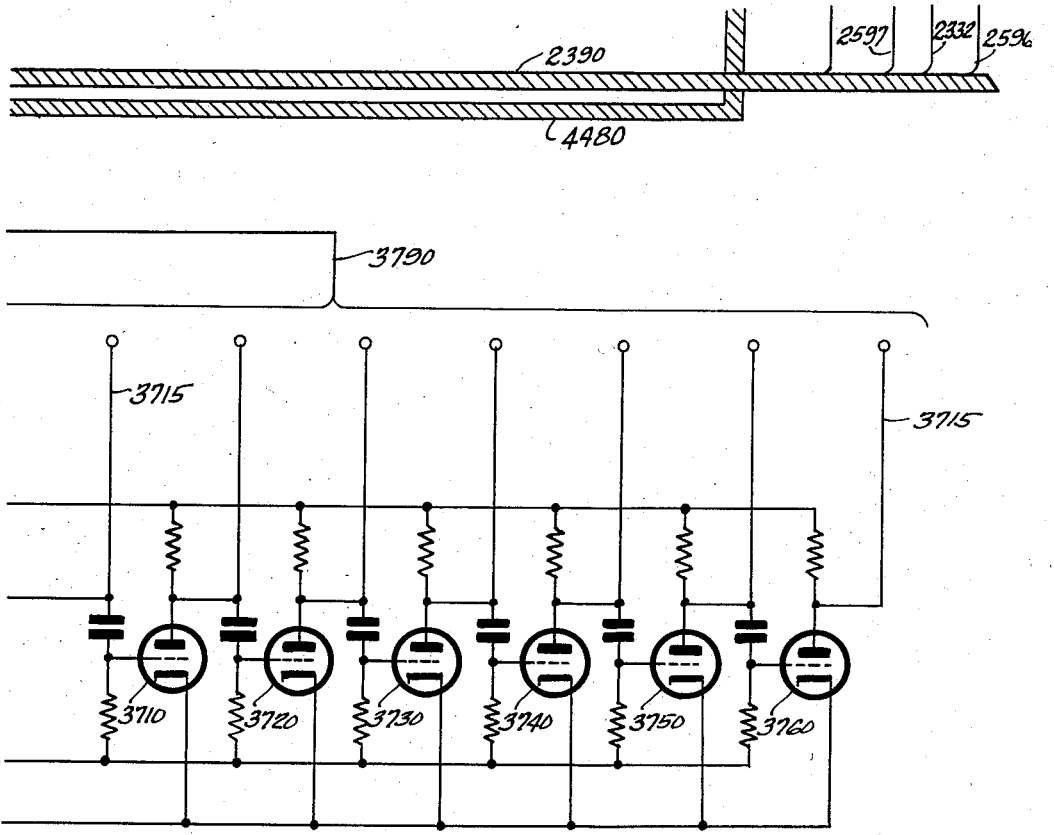
Figure 38:
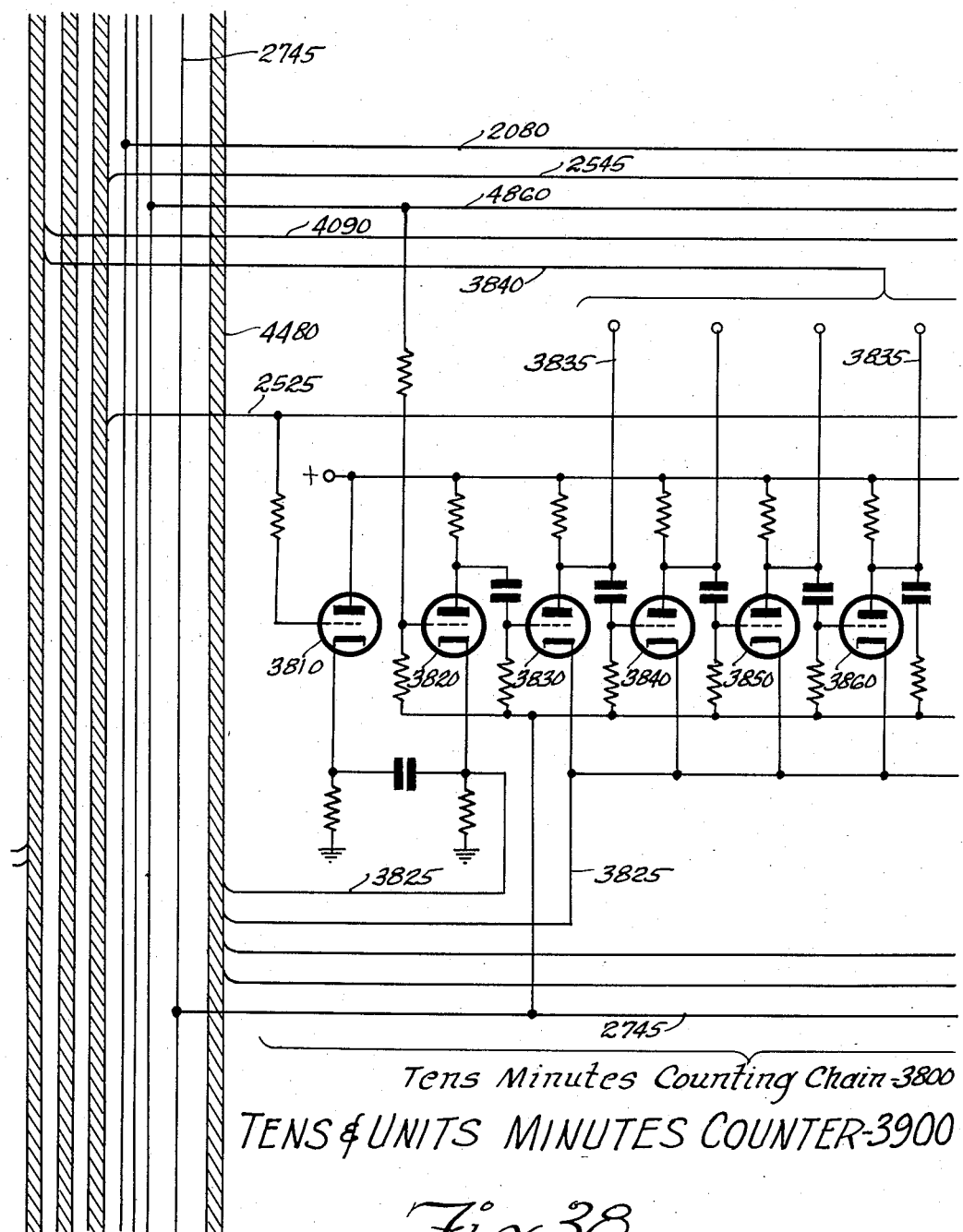
Figure 39:
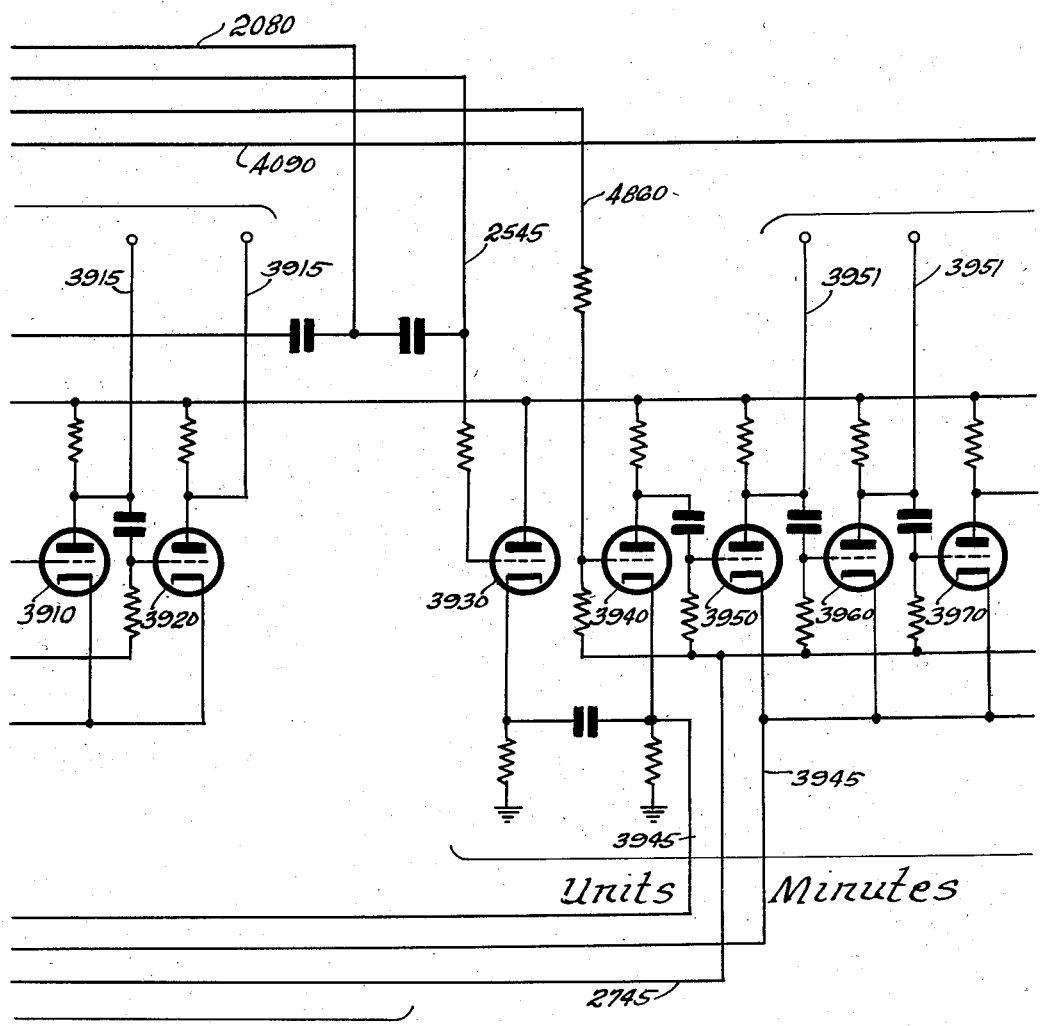
Figure 40:
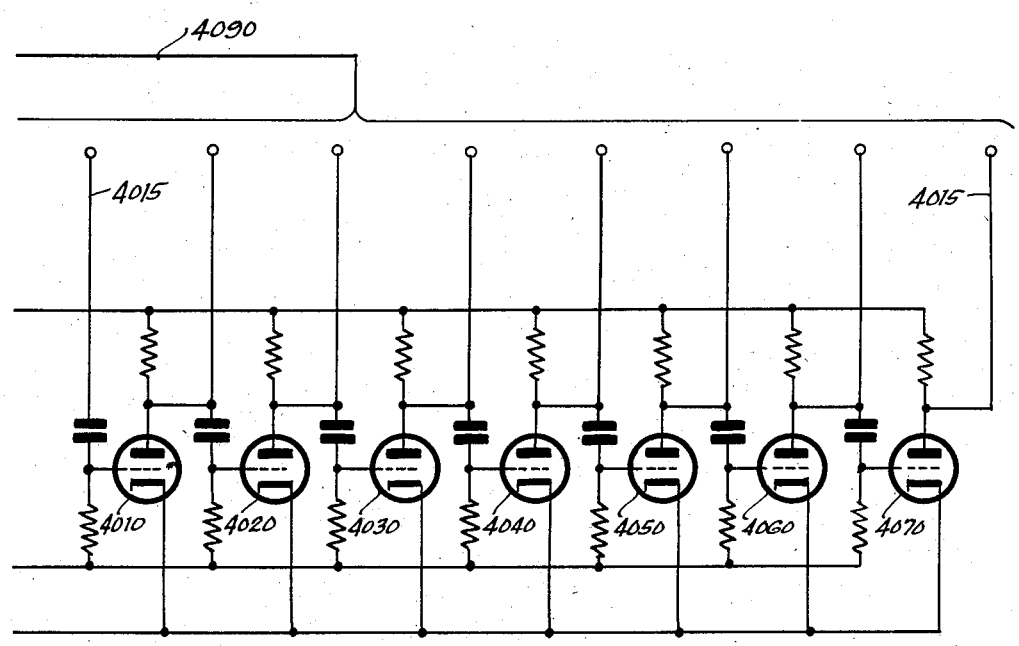
Figure 41:
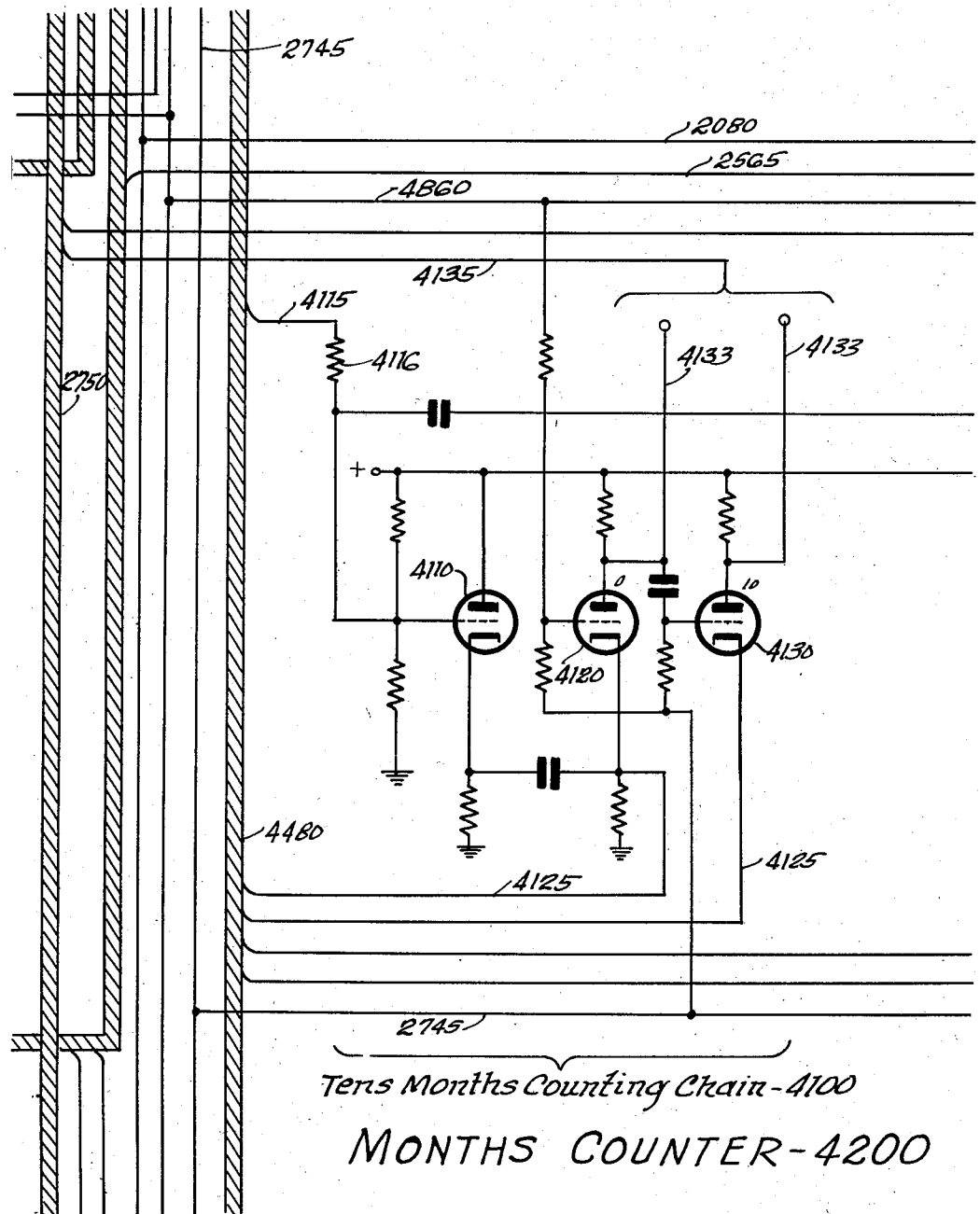
Figure 42:
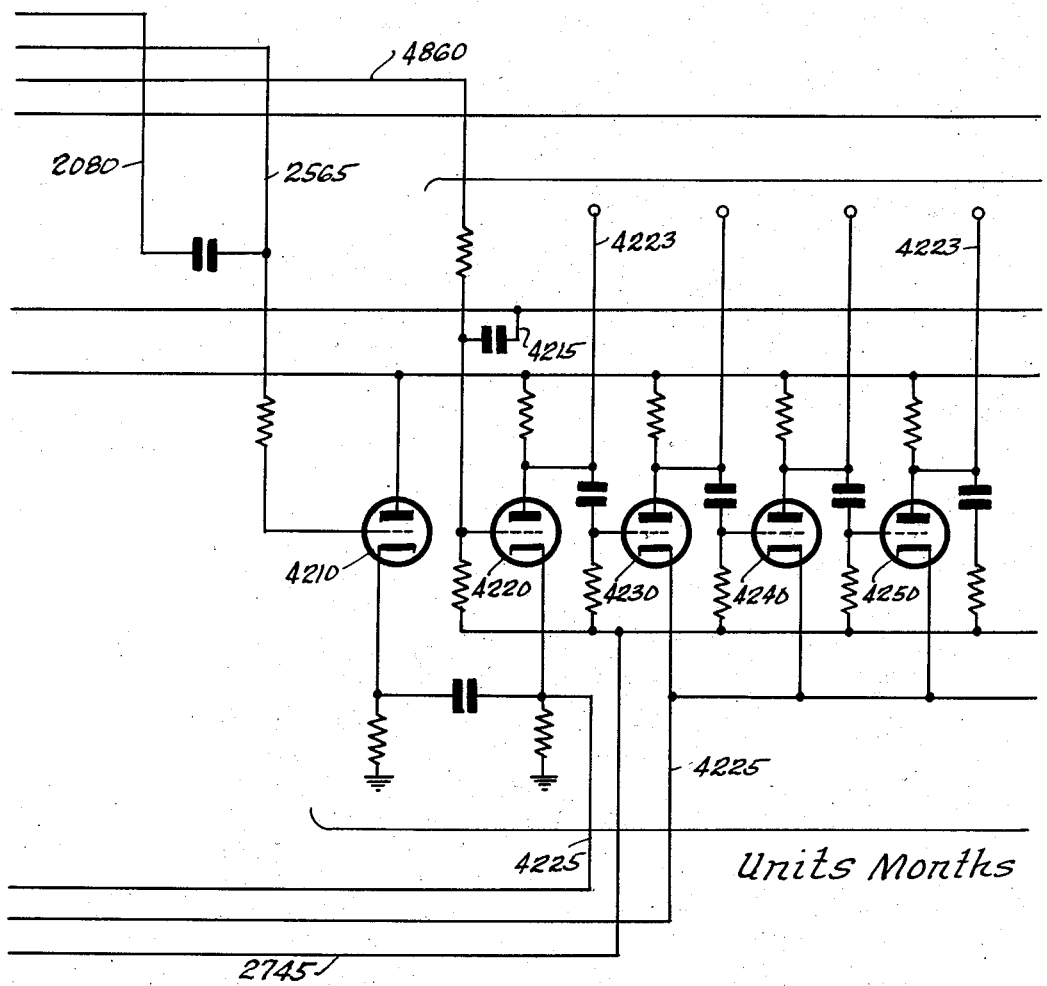
Figure 43:
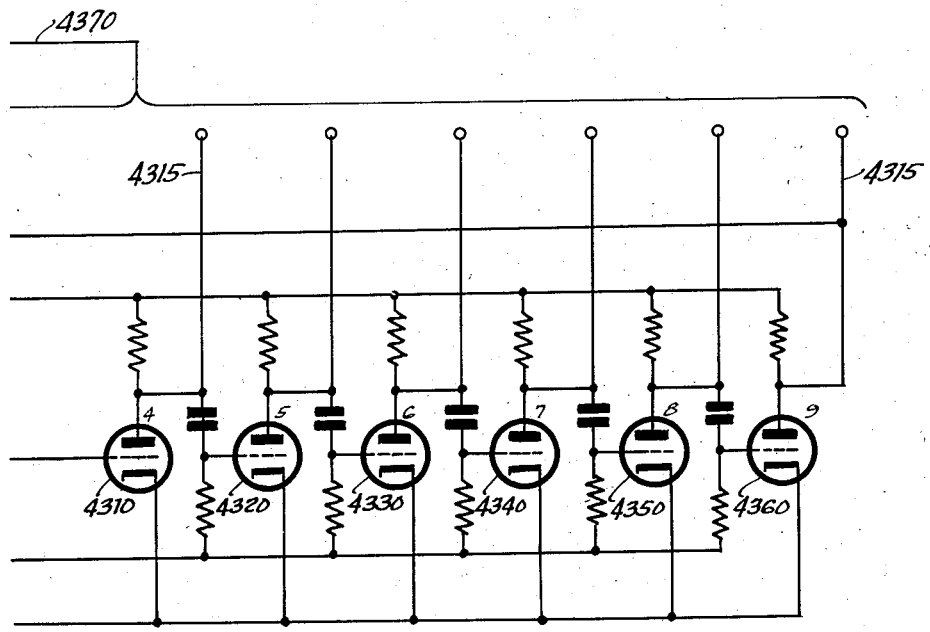
Figure 44:
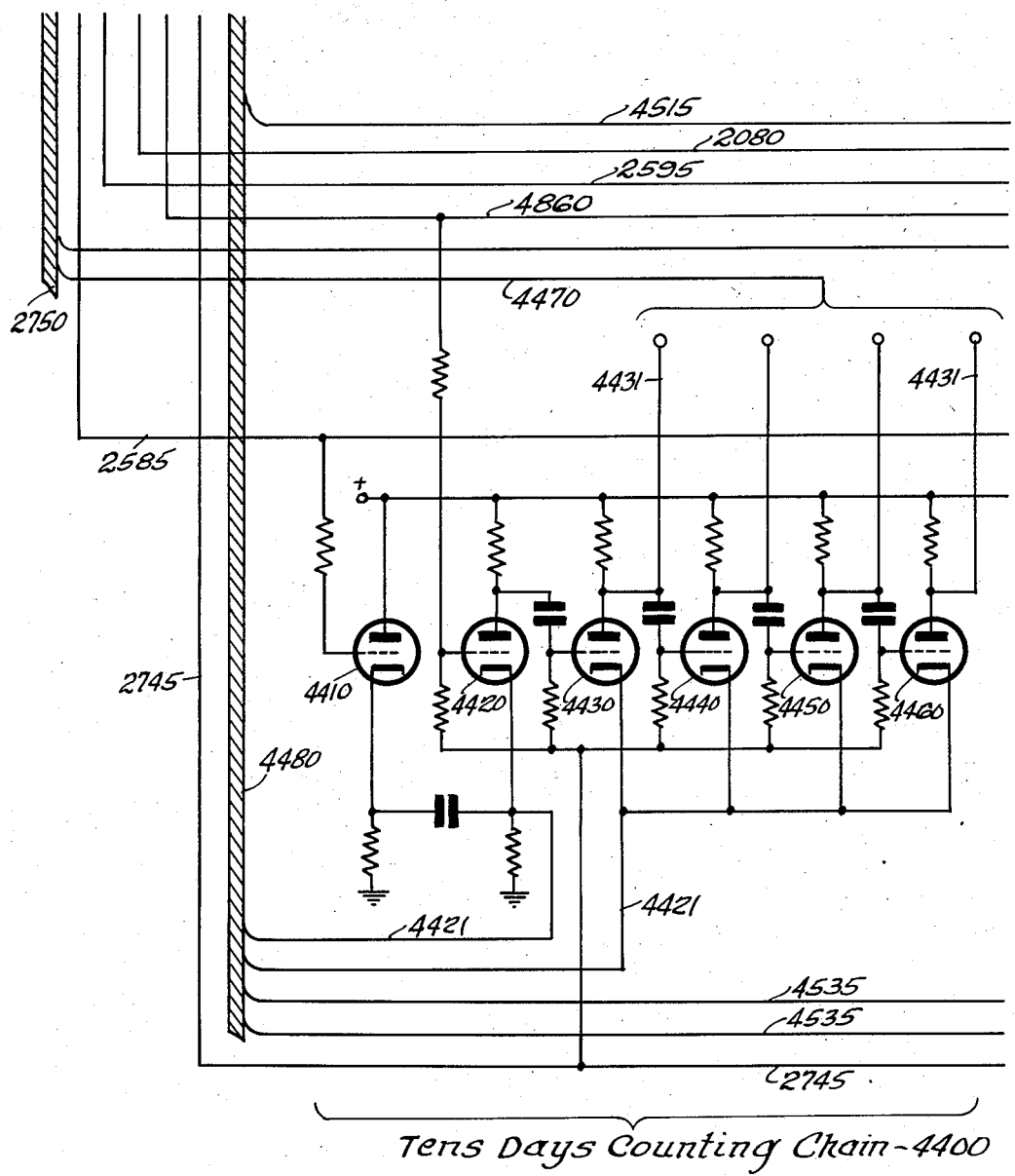
Figure 45:
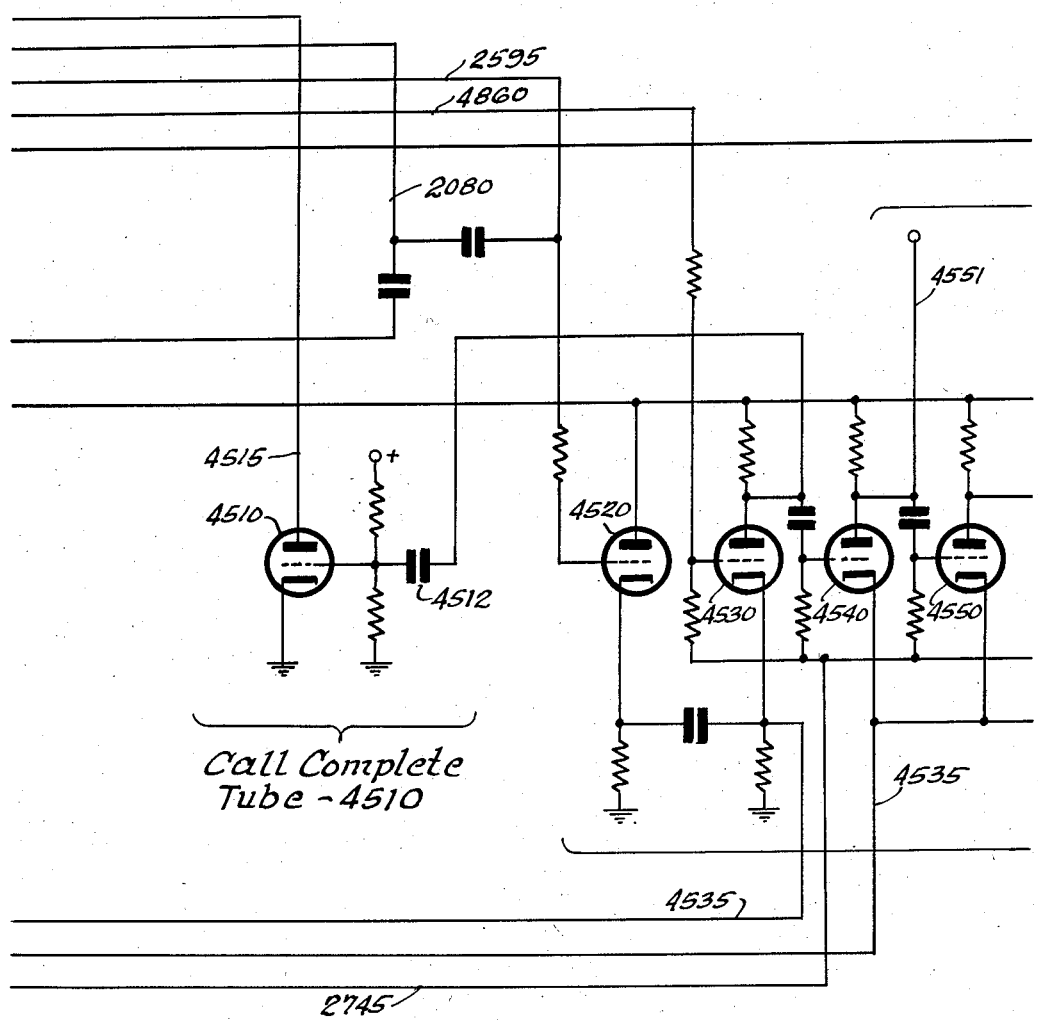
Figure 46:
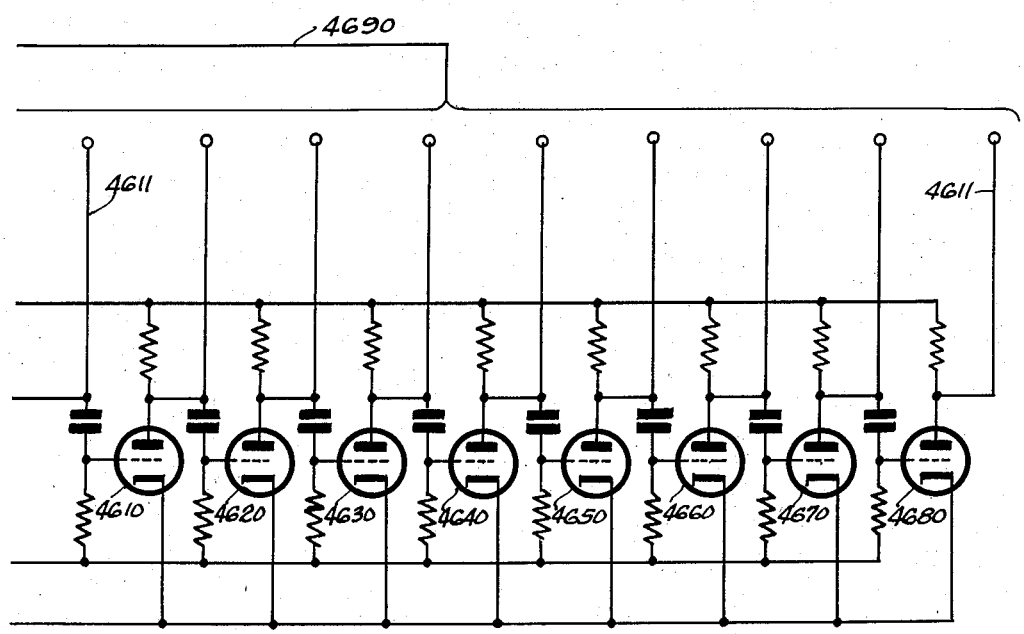
Figure 47:
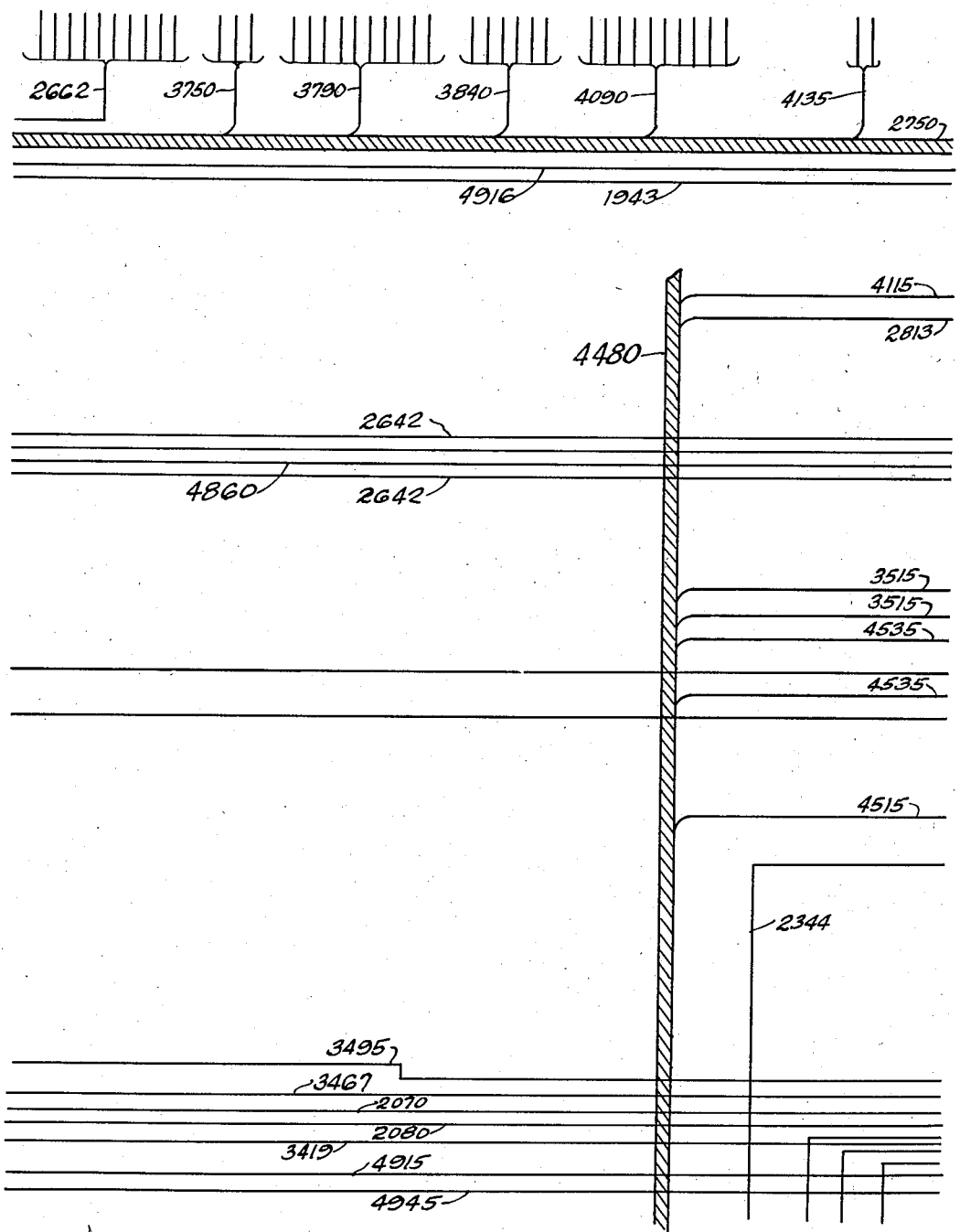
Figure 72:
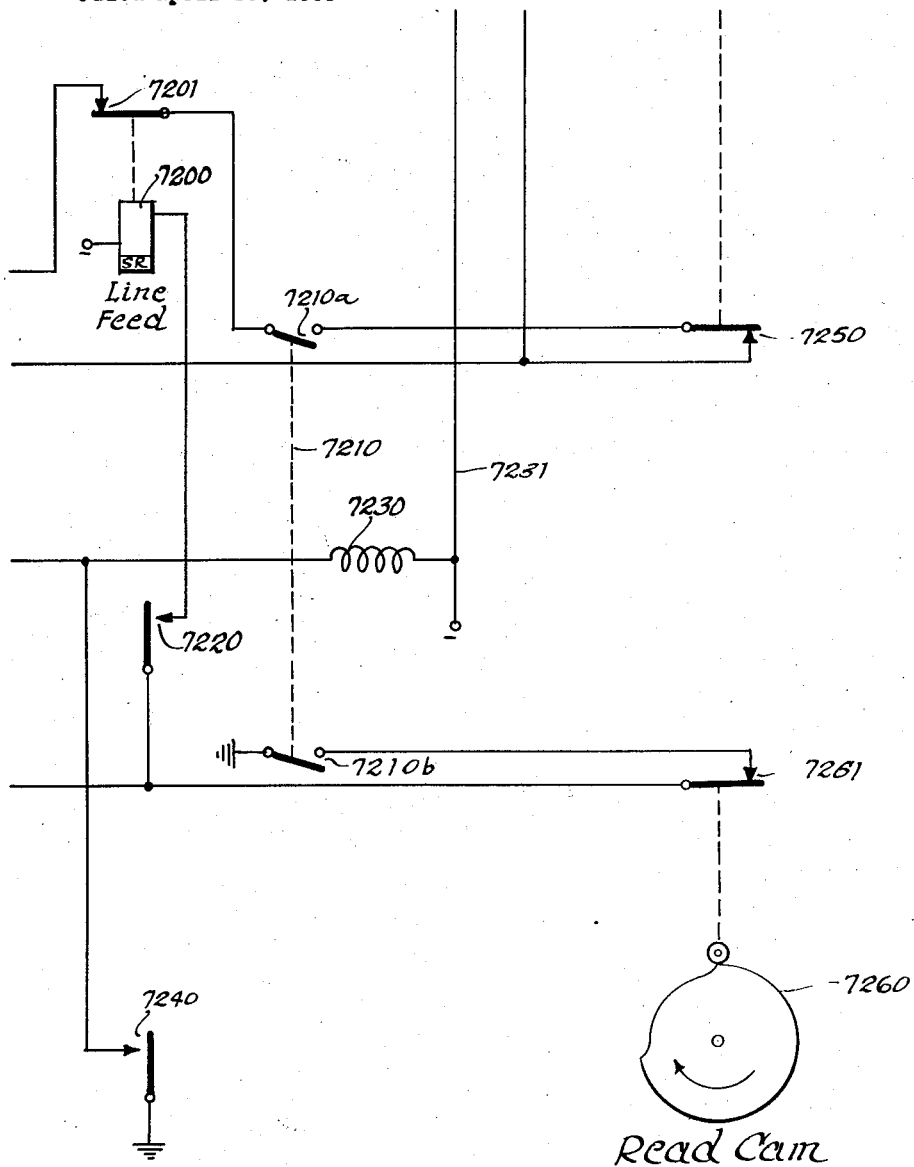

Figs. 4 to 7, inclusive, illustrate a one-way trunk circuit comprising a portion of the automatic toll ticketing system shown in Figs. 3 and 3a;

Fig. 8 is a schematic drawing of a verification selector;

Fig. 9 is a schematic drawing of a verification connector;

Figs. 10 and 11 illustrate the details of the clock and calendar scanning circuit embodied in the system;

Fig. 12 is a schematic drawing illustrating the circuit components of a magnetic trunk recorder;

Figs. 13 and 14 illustrate the details of the clock and calendar circuit;

Fig. 13A is a table showing the manner in which the contacts of the months stepping switch shown in Fig. 13 of the drawings are interconnected with each other;

Fig. 15 is a fragmentary perspective view of one of a multiple unit assembly of tape-type trunk recorder units and illustrates particularly the continuous drive by which the recorders are adapted selectively to be driven continuously during playback or reproduce operations;

Fig. 16 is a top plan view of only one of the trunk recorders;

Figs. 17 to 19, inclusive, show details of the playback control circuit;

Fig. 20 is a schematic diagram of a preamplifier and clipping amplifier for amplifying and forming the pulses delivered thereto from the trunk recorders;

Figs. 23 to 25, inclusive, illustrate the details of the steering circuit;

Figs. 26 and 27 illustrate the details of an electronic register for storing information representative of the digital designation of the calling and called subscribers;

Figs. 28 to 30, inclusive, illustrate the details of an electronic register for storing information representative of the duration of a toll call;

Figs. 31 to 34, inclusive, illustrate the details of a circuit for calculating the toll charge to be assessed for a particular call;

Figs. 35 to 37, inclusive, illustrate the details of an electronic register for storing information relating to the tens and units hours designation of the time at which a call is terminated;

Figs. 38 to 40, inclusive, illustrate the details of an electronic register for storing information relating to the tens and units minutes of the time at which the call is terminated;

Figs. 41 to 43, inclusive, illustrate the details of a register for storing the designation of the month during which the call is terminated;

Figs. 44 to 46, inclusive, show the details of a circuit for registering the tens and units days designation of the time at which a particular call is terminated;

Figs. 21, 22 and 47 to 70, inclusive, illustrate the details of a printing control circuit for operating a printer;

Figs. 71 and 72 are schematic diagrams showing a combined electrical and mechanical internal control circuit for the printer;

Fig. 73 is a table showing the manner in which the operation of the printing control circuit translates received information to selectively operate the printer to print numerical and alphabetical characters.

Figure 1:
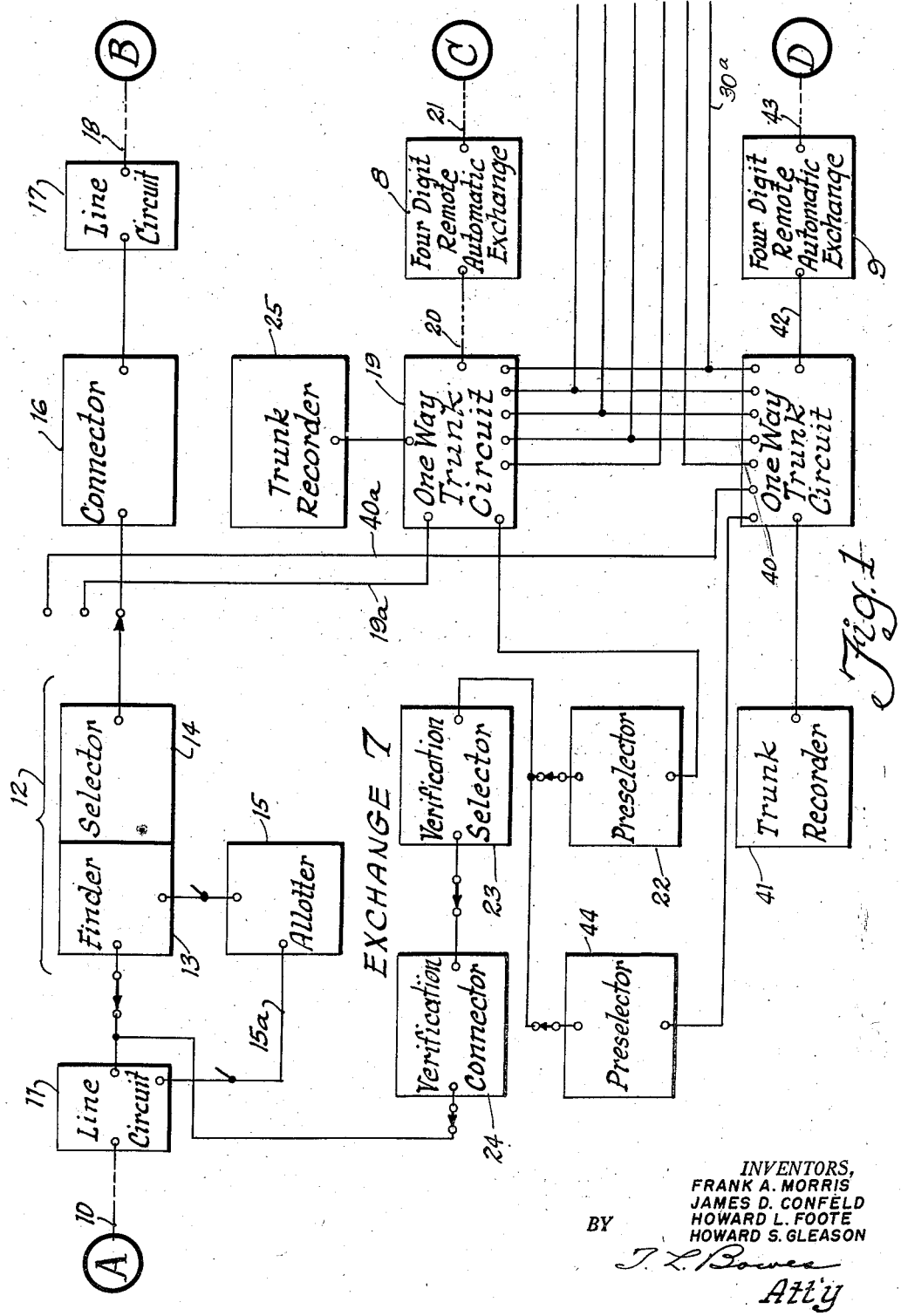
Figs. 1 and 2 are a one-wire block diagram of an automatic toll ticketing system embodying the present invention which is shown in conjunction with a conventional automatic telephone system.
Figure 2:
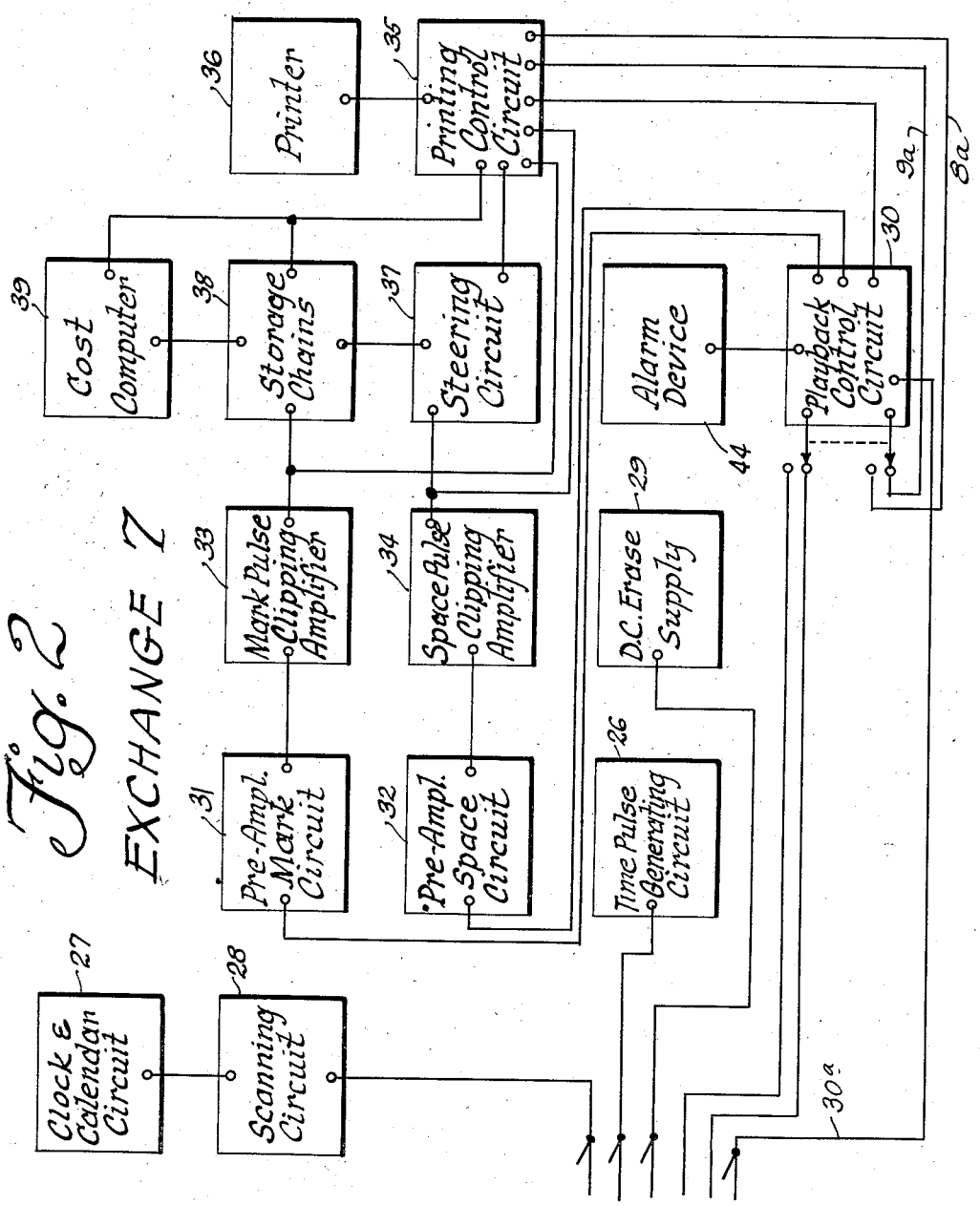

Figs. 74 and 75 illustrate the manner of interconnecting the plurality of registers shown in Figs. 26 to 46, inclusive, of the drawings with a program switch included in the printing control circuit shown in Figs. 21, 22 and 47 to 70, inclusive;

Fig. 76 is a schematic sectional view of a means for severing paper tape applied to the printer to produce a toll ticket and for receiving these toll tickets;

Fig. 77 is a fragmentary top elevational view of the feeding and severing device shown in Fig. 76;

Fig. 78 is a fragmentary cross sectional view taken along line 78—78 in Fig. 76 of the drawings;

Fig. 79 is a plan view of a toll ticket including the items of information relating to a single toll call;

Fig. 80 is a schematic view of portions of the continuous magnetic tape utilized in the recorder unit shown in Fig. 16 of the drawings;

Fig. 81 is a block diagram showing the manner in which Figs. 3 to 14, and 17 to 72, inclusive, are positioned adjacent each other to form a complete circuit diagram of an automatic toll ticketing system forming one embodiment of this invention; and Fig. 82 is a block diagram disclosing the manner in which Figs. 1 and 2 are positioned adjacent each other to form a complete schematic showing of the general components of this invention.

Referring now to the drawings and more particularly to Figs. 1 and 2 thereof, the exchange network there illustrated, by way of example, comprises three fully automatic exchanges 7, 8 and 9 which are remotely situated with respect to each other so that toll charges are assessed on a time basis for the use of connections extending between the different exchanges. As illustrated in the drawings, each of the two exchanges 7 and 8 are what may be termed four-digit exchanges in that a maximum of four digits, including one digit for party selection, is required to establish connections between lines terminating at the same exchange. Each of the two exchanges 7 and 8 has an ultimate capacity of something less than one thousand subscriber lines, depending upon the number of groups of interoffice trunks which terminate in each exchange. The exchange 9 is also illustrated as being a four-digit automatic exchange in that a maximum of four digits is required to set up connections between subscriber lines served by this exchange. It will be understood, therefore, that this particular exchange has a subscriber line capacity of something less than one thousand lines, depending upon the number of groups of interoffice trunks which terminate in this exchange. The equipment provided in each of the three exchanges 7, 8 and 9 for subscriber line switching and trunk selection may be of the same type and further may be entirely conventional, although preferences as to the types of switching equipment employed are indicated in the following description. By way of example, the present improved automatic toll ticketing equipment forming the subject matter of the present invention is shown as being located entirely within the exchange 7. This exchange terminates several hundred subscriber lines, including the lines 10 and 18, which extend to the substations A and B, respectively, and is provided with first selectors which have access to groups of trunks extending to the two remote exchanges 8 and 9. These trunk groups respectively include the illustrated trunks 20 and 42. The remote exchange 8 is arranged to serve a number of subscriber lines including the line 21 extending to the subscriber substation C. Similarly, the remote exchange 9 is arranged to serve a number of subscriber lines including the line 43 extending to the subscriber substation D.

Referring now generally to the automatic switching equipment or apparatus provided in the exchange 7 to set up connections between the subscriber lines served by this exchange and to extend connections from the subscriber lines terminating at this exchange to the trunks extending to either of the two illustrated remote exchanges 8 and 9, it will be noted that each of the subscriber lines served by the exchange 7 terminates in a line circuit through which the lines are made accessible to the finders of finder-selector links. Thus, the lines 10 and 18 are respectively terminated in line circuits 11 and 17 in the exchange 7. The line 10, together with as many as ninety-nine other lines in the same one hundred line group are accessible to each of a group of finder-selector links including the link 12 which individually comprises a finder 13 and a selector 14. These links are adapted to be assigned to the use of calling lines to which they have access in a predetermined order through operation of an allotter 15 having a start conductor 15a which is multipled to the line circuits of the lines served by the associated group of finder-selector links in an entirely conventional manner. The selector 14, as well as each of the other selectors of the exchange 7, has access through its outlet contacts to several groups of connectors, one of which includes the connector 16 having access to the line circuit 17 which terminates the line 18. As will be understood, the connectors of each group each have access to as many as one hundred lines, the several groups being provided to permit access to be gained to any one of the several hundred lines terminating in the exchange 7. Preferably, the connectors 16, or those of certain groups, are equipped with code or harmonic ringing facilities in order to provide for selective party line ringing. As indicated above, the described components 11 to 17, inclusive, may be of any conventional type.

Referring now more particularly to the interoffice trunking facilities provided in the exchange 7, it is noted that in accordance with conventional practice the trunk circuits which terminate trunks extending to the remote exchanges 8 and 9 are rendered accessible to the subscriber lines served by this exchange through the outlet contacts of the selectors. More specifically, each of the trunk circuits, including the trunk circuit 19, which terminates a trunk, such as the trunk 20, extending to the remote exchange 8 is provided with a seizure trunk, such as the seizure trunk 19a, which is multipled to corresponding bank contacts in the ninth contact level or group in each of the selectors provided in the exchange 7, so that the trunks of this group are reached by subscribers served by the exchange 7 when the single digit 9 is dialed into the automatic switching equipment of this exchange. As indicated in Fig. 1 of the drawings, the trunk circuit 19 is of the one-way type in that it can only be used to extend connections through the automatic switching equipment of the exchange 8 on calls originating at subscriber substations served by the exchange 7. In similar manner, the trunks extending from the exchange 7 to the remote exchange 9 are individually terminated in the exchange 7 in one-way trunk circuits which are accessible to the selectors of the exchange 7 through the tenth contact levels thereof. Thus, the trunk 42 extending to the exchange 9 terminates in the exchange 7 in a trunk circuit 40 which is provided with a seizure trunk 40a multipled to corresponding bank contacts in the tenth contact level of each of the selectors provided in the latter exchange.

OPERATION OF THE SYSTEM GENERALLY

In order briefly to outline the mode of operation of the system as thus far described, it may be assumed that a call originating at the substation A and intended for the substation B is handled by the illustrated switching components 13, 14 and 16. The call is, of course, initiated by the calling subscriber lifting his hand set from its cradle to actuate the cradle switch at the substation A and thus close a calling loop circuit over the line 10 to the terminating line circuit 11 in the exchange 7. When this loop circuit is closed, the line circuit 11 operates to apply guarding ground potential to the sleeve conductor of the line multiple terminating at this line circuit and thus guard the line 10 against seizure on incoming calls. Also, incident to operation of the line circuit 11, the numerical identity of the calling line is marked in the bank contacts of the finders, including the finder 13, having access to this line. Coincident with these operations, the line circuit 11 functions to apply start ground potential to the common allotter start lead 15a. In response to the latter operation, the allotter 15 first functions to find an idle link in the group, including the link 12, having access to the calling line 10. Assuming that the link 12 is the first idle link tested by the allotter 15, the finder portion 13 of this link operates in conjunction with the allotter 15 to step the finding wipers thereof in two directions until these wipers are set on the contacts terminating the line multiple individual to the line 10. When the line finding operation is thus completed, the allotter 15 is dismissed and the calling loop circuit is extended from the line 10 through the finder 13 to the selector 14. In response to this operation, the selector 14 returns dial tone to the calling subscriber to indicate that the dialing operation may be started.

The first digit dialed at the calling substation produces a response in the selector 14 which results in the wipers of this selector being positioned opposite the level of bank contacts in which are terminated trunks extending to the connectors of the group having access to the called line 18 and including the connector 16. Thus, the particular group of one hundred lines which includes the called line 18 is selected by the selector 14 in response to the first digit dialed at the calling substation A. Also, during its response to the impulses of the first digit and more particularly to the first impulse received thereby, the selector 14 functions to terminate the transmission of the dial tone signal to the calling substation. During the inter-digit pause between the first and second digits, the selector 14 operates in the usual manner successively to test the idle or busy condition of the connectors having seizure trunks terminated in the selected contact level and positions its wipers on the outlet contacts thereof terminating the seizure trunk extending to the first idle connector in the selected group. Assuming that the connector 16 is thus selected by the selector 14, the latter unit, upon positioning its wipers on the bank contacts terminating the seizure trunk extending to this connector, automatically switches the calling loop circuit through to the connector. Incident to this operation, the connector 16 is conditioned to receive the impulses of the second and succeeding digits dialed at the calling substation.

The connector 16 responds to the impulses of the second digit by moving its wipers in one direction to position the same opposite the associated group of bank contacts terminating the sub-group of ten lines which includes the called line 18. During the inter-digit pause separating the second and third digits, the connector 16 is conditioned to drive its wipers in a second direction to select the particular desired line. Accordingly, when this third digit is dialed at the calling substation, the connector 16 responds by positioning its wipers on the bank contacts terminating the line multiple of the line 18. Thus, the called line is selected. Since the exchange 7 is indicated as being a four-digit exchange, it will be understood that a fourth digit must be dialed at the calling substation in order to condition the connector 16 to transmit ringing current over the called line after the busy test operation is completed in this connector.

Depending upon the circuitry employed in the connector 16, this connector may perform the required line busy test operation either concurrently with reception of the fourth or ring digit by this connector from the calling substation A, or after the dialing operation is completed. In any event, the purpose of the busy test operation is that of determining the idle or busy condition of the called line 18. Assuming that this line tests busy, i.e., that ground potential is present on the sleeve lead of the line multiple, busy tone is returned to the calling subscriber from the connector 16 and no talking circuit is completed to the tip and ring talking conductors of the line multiple. Under these circumstances, the tandem related switching units 13, 14 and 16, along with the line circuit 11, are automatically released and guarding ground potential is removed from the sleeve conductor of the line multiple individual to the line 10 when the calling subscriber replaces his hand set on the cradle of the instrument provided at the calling substation A.

Assuming that the calling line 18 tests idle at the time it is selected by the connector 16 in the manner explained above, the connector automatically applies guarding ground potential to the sleeve lead of the line multiple individual to the calling line 18, thereby to guard this line against subsequent seizure by other connectors in the group having access thereto. Substantially coincident with this operation, the connector 16 functions to transmit ringing current over the calling line 18 for the purpose of exciting the ringer provided at the called substation B. Concurrently with transmission of ringing over the called line, the usual ring back tone signal is transmitted back over the calling loop circuit to signal the calling subscriber that the called substation is being rung.

When the call is answered at the called substation B, the connector 16 is automatically shifted into its talking setting wherein voice currents may be transmitted in either direction between the calling and called substations A and B, talking battery, so-called, being supplied to the calling and called ends of the connection from the connector 16. Thus the desired talking connection is set up between the two identified substations. Release of the described connection may be effected in two different ways, depending upon the circuitry of the connector 16. Thus, if this connector is wired for last party release response, the entire switch train comprising the switching components 13, 14 and 16 is held operated until the connection is released at both the calling and called substations. On the other hand, if the connector 16 is wired for calling party release response, the switch train is held operated until the connection is relinquished at the calling substation A. In any event, when the connector 16 is advised that the connection has been relinquished either at the calling substation A or at both the calling and called substations, this connector functions in the usual manner to remove holding ground potential from the sleeve conductor extending through the switch train, with the result that the components 11, 13, 14, 16 and 17 are all restored to normal in readiness to handle other calls.

Referring now generally to the manner in which interoffice toll calls originating on subscriber lines served by the exchange 7 are routed by way of the trunk circuits, including the circuit 19, and the trunks individually terminated in these circuits to the four-digit remote automatic exchange 8, and through the automatic switching equipment of this exchange to subscriber substations served by the latter exchange, it will be understood that if the above-described call initiated at the substation A is intended for the called substation C, for example, the first digit dialed at the calling substation will necessarily comprise nine impulses. The selector 14 in responding to these impulses, positions its wipers opposite the level of bank contacts terminating the seizure trunks extending to the trunk circuits which terminate the interoffice trunks extending to the exchange 8. During the inter-digit pause separating the first and second digits, the selector 14 automatically moves its wipers across the bank contacts of the selected level in order successively to test the trunk circuits to determine the idle or busy condition thereof and switches through to the first trunk circuit which tests idle. Assuming that the trunk circuit 19 is the first idle trunk circuit tested, the selector 14 upon positioning its wipers on the bank contacts terminating the seizure trunk 19a, switches the calling loop circuit to this trunk circuit. Incident to seizure of the trunk circuit in the manner just described, the connection is extended through the trunk circuit 19 and over the trunk 20 to the automatic switching equipment provided in the remote exchange 8. Incident to this cut-through operation in the trunk circuit 19, this trunk circuit is conditioned to repeat dial impulses to the verification switch train in the manner explained below for the purpose of verifying the identity of the calling line. The next four digits dialed at the calling substation are utilized to set the verification switch train. After the calling line verification test is successfully completed, the trunk circuit 19 is conditioned to repeat impulses over the trunk 20 to the switching equipment in the exchange 8. As a consequence, the next four digits dialed at the calling substation A are utilized to extend the connection through the automatic switching equipment of this exchange to the called line 21. Here again, if the called line tests busy, the usual busy tone signal is returned from the connector occupied by the calling line in the exchange 8 back over the trunk 20 and through the trunk circuit 19 and the link 12 to the calling line 10 to advise the calling subscriber that the desired connection cannot be obtained. On the other hand, if the called line 21 tests idle at the time it is selected through the switching equipment of the exchange 8, the connector occupied with the call in this exchange functions automatically to transmit ringing current over the called line to signal the called subscriber and to transmit the usual ring back tone signal back over the trunk 20 and the line 10 to signal the calling subscriber that the called substation is being rung. Assuming the call is answered at the called substation C, the connector occupied with the call in the exchange 8 responds to the call answering operation by transmitting a supervisory signal back over the trunk 20 which results in operation of the trunk circuit 19 to its talking setting, so that the desired two-way communication connection is established between the subscribers at the calling and called substations A and C. The described connection is released under the control of the calling subscriber in the manner more fully explained below.

The manner in which calls originating on the lines served by the exchange 7 may be routed over the trunks in the group including the trunk 42 to the remote automatic exchange 9 and through the switching equipment of the latter exchange to called subscriber lines such as the line 43 terminating thereat is exactly the same as described above with reference to the call originating on the subscriber line 10 and routed through the exchange 8 to the subscriber line 21. In this connection, it will be understood that if the above-described call originating at the substation A and extended to the link 12 is intended for the line 43, for example, terminating at the exchange 9, the first digit dialed at the calling substation A will comprise ten impulses instead of nine so that at the end of the digit the wipers of the selector 14 are positioned opposite the level of bank contacts at which are terminated the seizure trunks, including the trunk 40a, individual to the one-way trunk circuits which terminate the interoffice trunks, including the trunk 42, extending to the remote automatic exchange 9. Hence, during the trunk hunting operation of the selector 14 which occurs during the inter-digit pause between the first and second digits dialed at the calling substation, one of the trunk circuits in the selected group, such, for example, as the trunk circuit 40, is seized through the outlet contacts of the selector 14 to handle the call. Otherwise, the manner in which the call is routed through the switching equipment of the remote exchange 9 to the desired subscriber line served by this exchange, is exactly the same as described above with reference to the call originating at the substation A and routed through the exchange 8 to the substation C.

AUTOMATIC TOLL TICKETING FACILITIES

Referring now generally to the facilities provided in the exchange 7 for automatically ticketing the toll calls which may be extended from substations served by this exchange to substations served by the remote exchanges 8 and 9 in the manner just explained, it is first pointed out that each of the one-way trunk circuits terminating a trunk extending to each of the two identified remote exchanges has individually associated therewith a trunk recorder or storage device having the function of storing on a temporary basis complete information on each call handled by the associated trunk circuit. Thus, the illustrated trunk circuit 19 has individually associated therewith a trunk recorder or storage device 25, the details of which are diagrammatically illustrated in Figs. 15 and 16 of the drawings. Similarly, the one-way trunk circuit 40 which terminates the trunk 42 extending to the remote exchange 9 has individually associated therewith a trunk recorder or storage device 41 which is identical in construction and arrangement with the trunk recorder 25. Each of these recorders is of the magnetic tape type and is capable of storing complete information on a relatively large number of calls handled by the associated one-way trunk circuit. Preferably the call recording capacity of each trunk recorder is in excess of that required to store information on the calls handled by the associated trunk circuit during a twenty-four hour period with normal traffic conditions prevailing. The information recorded in each trunk recorder incident to the successful handling of a completed call by the associated trunk circuit includes the following:

(1) The numerical value in digit form of the directory number assigned to the calling substation at which the call is initiated.
(2) The numerical value in digit form of the directory number assigned to the called substation to which the call is routed.
(3) The elapsed time of the call.
(4) The month, day, hour and minute the call is terminated.
(5) An end-of-call signal which indicates that all information pertaining to the particular call has been recorded.

This information is recorded on an endless magnetic tape forming a part of each of the trunk recorders and each item of information, such as each digit of the calling subscriber's directory number, is recorded in decimal code form along one edge of the tape. Moreover, spacing symbols in the form of spacing pulses are recorded along the opposite edge of the tape to separate the different items of information pertaining to each call.

For the purpose of insuring honest use of the toll trunking facilities extending to the remote exchanges 8 and 9 by the subscribers served by the exchange 7, the above-mentioned dial controlled calling line verification equipment is provided. This equipment includes a plurality of verification selectors, including the selector 23, the details of which are illustrated in Fig. 8 of the drawings, and a plurality of groups of verification connectors one of which includes the connector 24, the details of which are shown in Fig. 9 of the drawings. The different groups of connectors are accessible to the selectors through different levels of bank contacts of the latter and the connectors of each group have access to the line circuits terminating the lines making up different one hundred line groups. Thus the verification connector 24 may, for example, be accessible to the verification selector 23 through the third level of outlet contacts of this selector and in turn may have access to the lines forming the one hundred line group which includes the illustrated line 10. In order to render the verification apparatus and more particularly the verification selectors accessible to the interoffice trunks, each of the one-way trunk circuits terminating one of these trunks is equipped with a preselector through which a connection may be established between the trunk circuit and an idle one of the verification selectors. Thus, the one-way trunk circuit 19 is provided with a preselector 22, the details of which are shown in Fig. 4 of the drawings, through the outlet contacts of which idle ones of the verification selectors may be operatively associated with the trunk circuit 19. A similar preselector 44 is provided as a part of the one-way trunk circuit 40 to permit verification selectors to be operatively associated with the trunk circuit 40 on calls handled by this trunk circuit.

For the purpose of recording the elapsed time of call information on the record tapes of the various trunk recorders, a time pulse generating circuit 26 is provided which has its pulse output terminals multipled to each of the trunk circuits. Date and time information is commonly supplied to the several trunk circuits and by way of these trunk circuits to the trunk recorders from a clock and calendar circuit 27, the details of which are illustrated in Figs. 13 and 14 of the drawings through a scanning circuit 28, the details of which are illustrated in Figs. 10 and 11 of the drawings. The ticketing facilities further comprise a direct current erase supply source 29 having its output terminals multipled to each of the trunk circuits terminating trunks extending to the two remote exchanges 8 and 9. This source is provided for the purpose of erasing the information magnetically recorded on the tapes of the trunk recorders after this information has been printed through operation of the equipment described below.

In order to translate the information recorded or stored on the magnetic tapes of the trunk recorders into printed tickets, playback facilities are embodied in the toll ticketing equipment which function in such manner that an individual ticket is printed for each toll card recorded in each of the trunk recorders. These facilities include a playback control circuit 30; an alarm device 44 for bringing in a major alarm in the event of failure of the toll ticketing equipment; a printing control circuit 35, which includes or has associated therewith a steering circuit 37 and a plurality of digit storage chains 38; and a printer 36. This printer may be of the commercial type sold under the name of "Flexowriter" by the Commercial Controls Corporation of Rochester, New York. As indicated in Fig. 2 of the drawings, the playback control circuit is equipped with a trunk circuit selecting switch having the function of successively associating the playback facilities with idle ones of the trunk circuits. This control circuit performs the function of associating the printing control circuit successively with the different trunk circuits and also of feeding the information stored in coded form on the magnetic tapes of the trunk recorders through the amplifier circuits 31, 32, 33 and 34 to the storage chains 38 of the printing control circuit 35. The mark and space clipping amplifiers 33 and 34 are provided to amplify and render uniform in amplitude the pulses delivered thereto from the trunk circuits after preamplification of these pulses by the appropriate one of the mark and space amplifier circuits 31 and 32. The pulses developed at the output sides of clipping amplifiers 33 and 34 are delivered to the storage chains 38 and a portion thereof are also used to control a cost computer circuit 39 having the function of converting the elapsed time of each call into dollars and cents. In order to provide for the successive storing of different items of information successively in the storage chains 38, the steering circuit 37 is provided. This circuit responds to space pulses delivered thereto through the space pulse clipping amplifier 34 and is arranged not only to control the successive storage of different digits in the different storage chains 38, but also to cause those pulses representative of elapsed time to be routed into the cost computer 39 at the appropriate point in each call playback operation.

OPERATION OF TOLL TICKETING FACILITIES GENERALLY

In order to explain the manner in which call information is recorded in the trunk recorders 25, 41, etc., incident to the routing of toll calls from lines served by the exchange 7 to subscriber lines served by the exchanges 8 and 9, the operations which occur incident to the handling of the above-described call from the substation A to the substation C may be considered by way of example. In this regard, it will be recalled from the preceding explanation that coincident with seizure of the trunk 20 extending to the remote exchange 8 the trunk circuit 19 is conditioned to repeat dial impulses to the verification switches so that the authenticity of the calling line may be verified. Calling line verification is accomplished as a result of the calling subscriber dialing his own directory number. In other words, subscribers served by the exchange 7 are instructed that before they can use the toll trunking facilities to establish connections to desired substations served by the remote exchanges, they must dial their own directory numbers before dialing the directory numbers assigned to the desired called substations. In the present case, the calling subscriber at the substation A after dialing the trunk selection digit, dials his own directory number into the trunk circuit 19. This trunk circuit repeats the impulses of each digit to the trunk recorder 25 and also repeats the impulses of each digit through the preselector 22 to the verification switching equipment. More specifically, each impulse of each digit is discretely recorded as a mark pulse on the tape of the recorder 25. At the end of each digit, the trunk circuit 19 functions to transmit a space signal to the trunk recorder which is likewise recorded on the recorder tape to indicate the end of the digit. Thus, groups of recorded mark pulses representing successive digits are separated on the tape by the space pulses recorded therebetween.

Incident to seizure of the one-way trunk circuit 19 by the selector 14, the preselector 22 functions automatically to associate the trunk circuit with an idle one of the verification selectors. Assuming that the verification selector 23 is seized by the preselector 22 incident to seizure of the trunk circuit 19, the first digit of the directory number assigned to the calling line 10, as repeated to the verification selector 23 through the preselector 22 from the trunk circuit 19, is utilized to move the wipers of this selector opposite the level of bank contacts in which are terminated the seizure trunks extending to the verification connectors of the group having access to the line circuit multiples terminating the lines of the one hundred line group which includes the calling line 10. During the inter-digit pause between this digit and the second digit of the calling subscriber's directory number, the selector 23 automatically and successively tests the switch trunks extending to the connectors until an idle connector is found. Assuming that the connector 24 is selected during this trunk hunting operation of the selector 23, the pulse repeating loop circuit from the trunk circuit 19 is switched through to the connector 24 by the selector 23 immediately the wipers of this selector are positioned on the contacts terminating the seizure trunk of this connector. The verification connector 24 responds to the second and third digits of the directory number assigned to the calling line 10 by successively selecting the sub-group of ten lines including the calling line and then the particular calling line itself. All that the verification connector is called upon to do is to establish a through connection between the sleeve lead path through the switches 23 and 24 and the sleeve lead path through the switches 13 and 14. In other words, a sleeve loop is established which extends from the trunk circuit 19 through the preselector 22, the verification selector 23, the verification connector 24, the line circuit multiple of the line 10, the finder 13, the selector 14 and the sleeve lead of the trunk 19a back to the trunk circuit 19. If this path is successfully completed, the one-way trunk circuit 19 recognizes that the calling subscriber has properly identified the line 10 as the calling line. On the other hand, if this sleeve loop is not completed, the trunk circuit 19 is informed that the calling line has not been properly identified.

At this point it may be noted that one of the important novel features of the verification train is the provision of facilities in the connector 24 (and in the other similar connectors) for answering back to the trunk circuit 19 to provide an indication that the required number of digits has been dialed into the connector to set the wiper of this connector on the outlet contact individual to the subscriber line designated by the directory number which has been dialed into the trunk circuit. Thus, the trunk circuit 19 is informed by the connector 24 as to when the line identification test should be started. The verification train is dismissed immediately the calling line verification test is completed regardless of whether this test is successful or not. Specifically, the trunk circuit 19, upon completing the verification test, removes holding ground from the sleeve lead extending to the selector 23, with the result that this selector and connector 24 are released. Thus, these switches are made available for use by the other trunk circuits.

Assuming that the above-described calling line verification test is not successful, the trunk circuit 19 refuses to establish a dial impulse repeating loop by way of the interoffice trunk 20 to the switching equipment in the remote exchange 8. Under such circumstances, the one-way trunk circuit 19 transmits a signal back over the calling loop circuit to indicate to the calling subscriber at the substation A that the call cannot be completed. It will thus be understood that unless the calling subscriber after dialing the single digit designating the group of trunks extending to the desired remote exchange correctly dials his own directory number, the trunk circuit 19 will not permit the connection to be extended to the called substation. The calling subscriber, upon receiving the described signal, is expected to release the connection. When this occurs, the line circuit 11 and link 12, are, of course, released. Also in response to the on-hook signal received from the calling substation, the trunk circuit transmits an end-of-call signal, i.e., coincident mark and space pulses to the trunk recorder 25. Recording of these pulses without recording the other information which is always recorded incident to the successful completion of a call establishes that the call under consideration was unsuccessful so that it is disregarded during the playback operation described below. In other words, the information recorded by the trunk recorder, being incomplete, is recognized as such by the playback facilities and is disregarded by these facilities so that no ticket is printed for the call. After the end-of-call signal is transmitted to the recorder, the trunk circuit transmits several advance pulses to the recorder to advance the tape thereof in preparation for the recording of data pertaining to the next call handled by the trunk circuit 19. Following transmission of the advance pulses, the trunk circuit 19 is released.

Assuming now that the calling line verification test is successfully completed in the manner explained above, the trunk circuit 19 is automatically conditioned to repeat dial impulses by way of the trunk 20 to the automatic switching equipment in the remote exchange 8. The impulses of these digits are repeated by the trunk circuit 19 over the trunk 20 to the switching equipment in the exchange 8 with the result that this equipment functions to select the called line 21. These digits are also recorded in the trunk recorder 25 following the digits representing the directory number assigned to the calling line. Thus, after the dialing operation is completed at the calling substation, full information on the identity of the calling and called lines is recorded in the trunk recorder 25.

Following the described operations, nothing further occurs in the trunk circuit 19 until the call is answered at the called substation C. In response to the call answering operation at the substation C, the trunk circuit 19 functions to associate the time pulse generating circuit 26 with the recorder 25 so that pulses are fed to the recorder 25 and recorded in the mark position along the tape of this recorder for the duration of the call. When the called subscriber at the substation C hangs up to conclude the call, nothing occurs except that the trunk circuit 19 functions to interrupt the transmission of time pulses from the time pulse generating circuit 26 to the trunk recorder 25, thereby to terminate the call timing operation.

When the calling subscriber hangs up, the trunk circuit 19 opens the loop extending by way of the trunk 20 to the remote exchange 8, with the result that the switching equipment in the exchange 8 occupied with the call is released. Coincident with this operation, the trunk circuit 19 removes holding ground from the sleeve lead of the trunk 19a for an interval long enough to effect release of the line circuit 11, the finder 13 and the selector 14, and then restores ground to this lead to guard the trunk circuit against seizure on another call before it has completed its recording operation. Substantially coincident with release of the line circuit 11 and the link 12, the trunk circuit 19 transmits a space pulse to the recorder 25 to mark the end of the elapsed time measuring operation, and then operatively associates the scanning circuit 28 with the trunk recorder 25. As a consequence, the scanning circuit 28, as controlled by the setting of the clock and calendar circuit 27, feeds pulses to the recorder 25 in decimal digit form which identify in succession the month, day, hour and minute the call is terminated. The pulses making up the digits representing this information are recorded as mark pulses on the record tape of the recorder 25, and each digit is marked off from its succeeding digit by the transmission of a space pulse to the trunk recorder from the trunk circuit 19 during the intervals separating the digits.

After a full complement of time and date digits have been transmitted from the scanning circuit 28 to the trunk recorder 25 by way of the trunk circuit 19, the trunk circuit automatically records an end-of-call signal on the tape of the recorder. As explained above, this end-of-call signal is in the form of coincident mark and space pulses recorded along opposite edges of the recording tape. After the end-of-call signal is recorded on the record tape of the recorder 25, the trunk circuit 19 automatically transmits five or six tape advance pulses to the recorder so that the record tape is advanced an interval to space the coded information on the call just considered from the information recorded on the tape incident to the handling of a succeeding call by the trunk circuit 19. After the described tape advance operation is completed, the trunk circuit 19 removes guarding ground potential from the sleeve lead of the trunk 19a to render the trunk circuit accessible for use on other calls and otherwise restores itself to normal.

As will be understood from the above explanation, if the called line 21 served by the remote exchange 8 is busy at the time the described call is routed thereto or if the substation C is unattended so that the call is not answered, time pulses and the described time and date digits are not recorded on the record tape of the recorder 25. However, the end-of-call signal is recorded and the record tape is spaced following abandonment of the call at the calling substation in the same manner as in the case of a successfully completed call. Absence of the date, time and elapsed time of call information from the record thus formed on the tape of the recorder 25 is recognized by the playback facilities which respond to this absence by refusing to print a ticket for the call.

The manner in which additional calls are handled by the trunk circuit 19 and information concerning these calls is recorded by the trunk recorder 25 is exactly the same as explained above. Morevoer, the other trunk circuits provided in the system and their respective associated trunk recorders operate in identical fashion to record information on calls to the remote exchanges 8 and 9 handled by these trunk circuits. It will be understood, therefore, that each trunk recorder may have recorded therein information on a large number of toll calls at the time the associated trunk circuit becomes operatively associated with the playback facilities under the control of the playback control circuit 30.

Under normal circumstances, the playback and ticket printing facilities are only rendered operative to convert the information stored in the trunk recorders into printed tickets on a periodic basis, say once during each twenty-four hour period. While these facilities are normally active, the playback control circuit functions sequentially to associate the trunk circuits with the translating and printing facilities. Referring now more particularly to the manner in which the playback operation is performed, it is pointed out that when the wipers of the sequence switch in the playback control circuit 30 are positioned on the contacts terminating the conductors extending to the trunk circuit 19, a busy test is first performed in the playback control circuit to determine whether or not the trunk circuit 19 is engaged with a call. If this trunk circuit is occupied with a call, it tests busy to the playback control circuit 30 so that the sequence switch of this control circuit is automatically advanced to the position corresponding to the next trunk circuit. Assuming that the trunk circuit 19 is idle at the time it is thus tested by the playback control circuit 30, the playback control circuit seizes the trunk circuit and thus operatively associates the trunk circuit with the translating and printing facilities. Incident to such seizure, guarding ground potential is applied to the sleeve lead of the trunk 19a in the circuit 30, thereby to guard the trunk circuit against seizure through the finder-selector links of the exchange 7. Coincident with this operation, separate pulse signal transmission paths are established through the trunk circuit 19 and the playback control circuit 30 between the mark and space heads of the trunk recorder 25 and the input terminals of the two preamplifier circuits 31 and 32. At the same time, the clutch drive magnet of the recorder 25 is energized through the trunk circuit 19 from the playback control circuit 30, thereby to establish a driving connection through which the record tape of the recorder 25 is driven forwardly back to its normal or start position. When the clutch magnet of the recorder 25 is energized in the manner indicated above, the tape of this recorder is driven in the forward direction by the playback drive facilities. In this connection and as noted above, tape driving facilities including a common drive shaft and a common motor are employed to drive the record tapes of the trunk recorder during the playback operation thereof. It should also be noted if more than twenty-two trunk circuits are required in the exchange 7 to handle the interoffice traffic, duplicate playback control circuits are provided for operatively associating different groups of the trunk recorders with the translating and printing facilities one at a time. In such case, a preferential chain circuit is utilized sequentially to activate the two playback control circuits.

When the playback control circuit 30 seizes the trunk circuit 19 in the manner just explained, it also places marking ground potential upon the destination lead 8a extending to the printing control circuit 35. This destination lead is provided to indicate operative association of the playback control circuit 30 with trunk circuits terminating those trunks which extend from the exchange 7 to the exchange 8, to supply the computer 39 with rate information for establishing charges for the calls placed between these exchanges, and to supply data relating to the designation of these exchanges. To this end, the destination lead 8a is multipled to those contacts of the sequence switch in the playback control circuit 30 which are engageable by the destination wiper of this sequence switch and correspond to trunk circuits terminating trunks extending from the exchange 7 to the exchange 8. In similar manner, the destination lead 9a is provided to indicate operative association of the playback facilities with trunk circuits terminating trunks extending from the exchange 7 to the exchange 9. Thus the destination lead 9a is multipled to the contacts of the sequence switch in the playback control circuit 30 which are engageable by the destination wiper of this switch and correspond to trunk circuits terminating trunks extending from the exchange 7 to the exchange 9.

When the destination lead 8a is grounded in the playback control circuit 30 in the manner just explained, the printing control circuit 35 and the cost computer 39 are advised that the playback facilities are operatively associated with a trunk circuit terminating a trunk extending from the exchange 7 to the exchange 8. Coincident with grounding of the identified destination lead, the playback control circuit functions to reset all of the storage chains 38 to normal. The purpose of effecting a chain resetting operation at this time is that of clearing the chains of any false registrations which may have been spuriously accumulated therein as a consequence of pulses developed at the output terminals of the amplifiers 33 and 34 incident to the switching of the input terminals of the amplifier circuits 31 and 32 from trunk circuit to trunk circuit by the sequence switch of the playback control circuit 30.

When the record tape in the recorder 25 is driven back to its start position, contacts are closed in the recorder 25 to advise the trunk circuit 19 and the playback control circuit 30 that the recorder 25 is now ready to release the information stored therein to the translating facilities. More specifically, when the indicated trunk recorder contacts are closed a circuit is established for exciting the erase head of the recorder 25 from the erase supply source 29. Also incident to closure of the identified contacts in the trunk recorder 25, the control circuit 30 transfers control of the drive clutch magnet in the recorder 25 from itself to the printing control circuit 35. After these operations are completed, the equipment is fully conditioned to transfer the information stored or recorded on the record tape of the recorder 25 from this recorder to the storage chains 38.

The information recorded on the record tape of the recorder 25 is released to the playback facilities on a call-by-call basis. In this regard, it will be recalled that the first record of a successfully completed call handled by the trunk circuit 19 which is recorded on the record tape of the recorder 25 comprises four successive digits, each containing from one to ten pulses, representing the directory number of the calling subscriber line 10, four successive digits representing the directory number of the called subscriber, a series of time pulses designating the elapsed time of the call, a digit from one to twelve pulses designating the month, and a series of six digits of from one to ten pulses each, designating the day, hour and minute that the call was completed. Each of the described digits, together with the elapsed time pulses, are recorded as mark pulses on the record tape of the recorder 25 and the digits are separated by space pulses also recorded on the record element of the recorder 25. Further, the last digit of the time-of-call data is followed by the described end-of-call signal.

During the record playback operation, the record element in the recorder 25 is, of course, driven by the common drive facilities commonly associated with the group of trunk recorders including the recorder 25. At the very start of this operation, an end-of-call signal, i.e., coincident mark and space pulses, is first released by the trunk recorder 25. This signal is utilized in the printing control circuit 35 to effect certain control operations therein, including that of setting the steering circuit so that the first set of mark pulses transmitted by the recorder 25 will be registered in the first storage chain 38. As the mark pulses on the record tape of the recorder 25 are reproduced by the mark pulse of this recorder, they are transmitted through the trunk circuit 19 and the playback control circuit 30 to the input terminals of the preamplifier circuit 31. These pulses are amplified through the mark pulse preamplifier circuit 31 and impressed upon the input terminals of the mark pulse clipping amplifier 33. In the amplifier 33, the mark pulses are further amplified and clipped to uniform amplitude. These uniform amplitude pulses as they appear at the output terminals of the amplifier 33 are impressed upon the input circuits of all of the storage or counting chains 38, but are only registered in the particular storage chain which has been conditioned to receive mark pulses by the steering circuit 37. Specifically, the first digit of the first call recorded on the record tape of the recorder 25 is stored in the first storage chain 38, the second digit is stored in the second storage chain, and so on. The transfer of the repeated mark pulses of different digits from storage chain to storage chain is effected by the steering circuit 37 in its response to space pulses received from the trunk recorder 25. More specifically, the space pulses recorded on the record element of the recorder 25 are transmitted through the trunk circuit 19 and the playback control circuit 30 and are impressed upon the input terminals of the preamplifier circuit 32. These pulses are amplified through the space pulse preamplifier circuit 32 and impressed upon the input terminals of the space pulse clipping amplifier 34. After amplification through the latter amplifier, the space pulses are impressed upon the steering circuit 37. The steering circuit responds to each space pulse transmitted thereto by effecting a storage chain transfer operation in the manner explained below. It will thus be understood that all of the digits, together with the elapsed time of call pulses, recorded on the record element of the recorder 25 as a result of the particular call under consideration, are successively stored in different ones of the storage chains 38. After the digits representative of the directory numbers assigned to the calling and called subscriber lines have been registered in the storage chains 38, the steering circuit 37 acts to condition the cost computer 39 to accept and register the elapsed time-of-all pulses which are repeated to the playback facilities from the trunk recorder 25 immediately following the last digit of the directory number assigned to the called subscriber line. The cost computer circuit 39 accepts these elapsed time-of-call pulses, but when the next space pulse is received by the steering circuit 37, this circuit acts to disable the cost computer circuit 39 against accepting any further pulses. Incident to the receipt of the elapsed time-of-call pulses, the cost computer circuit 39, having pre-viously been advised by the printing control circuit 35 as to the destination of the call, computes the cost of the call in decimal code form.

When the next end-of-call signal, represented by coincident mark and space pulses, is received by the printing control circuit 35, this circuit is able to determine whether or not the call was successfullly completed and hence whether or not a ticket should be printed on the call. Thus, the ground marking on the destination lead 8a informs the printing control circuit 35 regarding the number of digits which must be received by the printing control circuit for the call to be successful. If less than this number of groups of pulses is actually received and registered in the storage chains 38, the printing control circuit is instantly advised that the call was not successful and hence that no ticket should be printed. Under such circumstances, the printing control circuit 35 immediately clears the storage chains 38, restores the steering circuit 37 to normal and recloses the operating circuit for the drive clutch magnet in the trunk recorder 25 to initiate a new call playback operation.

As indicated above, when the end-of-call signal is received by the printing control circuit 35, this circuit immediately deenergizes the drive clutch magnet of the recorder 25 to arrest the movement of the record tape in this recorder. Assuming that the number of groups of impulses registered in the storage chains 38 indicates that the call was successfully completed, the ticket printing operation is initiated immediately after the end-of-call signal is received by the printing control circuit 35. More specifically, when this signal is received, certain control relays in the printing control circuit 35 operate to initiate operation of a scanning switch which functions sequentially to scan the storage chains 38 and the storage chains of the cost computer 39, and to transfer the information registered therein into permutation code form which is fed to the permutation magnets of the printer 36. Thus, each time a storage chain 38 is read, the permutation magnets of the printer 36 are correspondingly excited, following which the printer prints the information registered in these magnets and then answers back to the scanning switch in the printing control circuit 35 advising this switch to take another step. This sequence of operations is repeated until all information registered in the storage chains 38 and the cost computer 39 is printed by the printer 36. Upon completion of the printing operation, the scanning switch of the printing control circuit 35 is automatically stepped to its home or normal position, the storage chains 38 are cleared or reset to normal, and the steering circuit 37 and cost computer circuit 39 are reset to normal. After these resetting operations are completed, the printing control circuit 35 recloses the operating circuit for the drive clutch magnet of the recorder 25 to restart movement of the record tape in the recorder 25 and thus initiate a new call playback operation.

The described call playback operations are repeated in the exact manner just described until the record tape in the recorder 25 has been cleared of all information recorded thereon. In this regard, it will be understood that immediately after the record tape passes by the combined recording and reproducing heads of the recorder 25, it passes by the erase head of this recorder so that the magnetic pulses impressed thereon are erased. Complete clearing of the record tape in the recorder 25 is indicated by movement of the tape back to its start position to effect reclosure of the start position contacts in the recorder. In response to this operation, the printing control circuit 35 measures off a predetermined time delay interval during which the drive clutch magnet of the recorder 25 is held energized to effect continued movement of the record tape in this recorder for a distance sufficient to permit recording of the date and time information of a very long call in the manner more fully explained below. After this delay interval is measured off, the printing control circuit 35 deenergizes the drive magnet of the recorder 25 to stop tape movement in the recorder, releases the trunk circuit 19, and effects advancement of the sequence switch in the playback control circuit 30 to the setting corresponding to the next idle trunk circuit. Incident to the release of the trunk circuit 19, an end-of-call signal is recorded on the record tape to insure normalizing of the translating and printing facilities at the start of the next playback operation involving the trunk recorder 25.

The end-of-call signal is followed by the usual tape advance operation. Also, incident to release of the trunk circuit 19, guarding ground potential is removed from the sleeve lead of the trunk 19a, thereby to render the trunk circuit accessible to the selectors of the exchange 7.

As indicated above, the playback and ticket printing facilities are normally associated with the trunk circuits on a periodic basis and then are sequentially connected with the trunk circuits through the step-by-step operation of the trunk circuit sequence switch embodied in the playback control circuit 30. If for any reason, however, the recording capacity of any one of the trunk recorders should be nearly exhausted before the record tape thereof is cleared of information recorded thereon by the playback facilities in the manner just described, facilities are provided for immediately bringing the playback facilities into operative association with such a recorder. Thus, if this condition arises in the trunk recorder 25, for example, while a call through the trunk circuit 19 is in progress, the record tape of this recorder is advanced to close contacts in the recorder which results in operation of the trunk circuit 19 to prepare a circuit for applying ground potential upon the emergency start conductor 30a and also to prepare a circuit for marking the trunk circuit as busy to the selectors having access thereto after the calling progress is terminated. These circuits are completed in the trunk circuit 19 when the call in progress is terminated and the switch train occupied with the call is released. Grounding of the load 30a in the trunk circuit 19 has the effect of causing the playback control circuit 30 to associate the playback facilities with the trunk circuit 19 immediately after the playback operation, which may be in progress at the time the lead 30a is grounded, is completed. In other words, grounding of the lead 30a results in the setting up of preferential circuits which cause an interruption in the normal sequential association of the playback facilities with the trunk circuits and an immediate association of these facilities with the trunk circuit 19. Once the playback facilities are operatively associated with the trunk circuit 19, the playback operation required to clear the recorder 25 of the information stored therein is carried out in the exact manner explained above. In this regard, it will be understood that once the trunk recorder 25 is cleared of the information stored therein, and the trunk circuit 19 is restored to normal, ground potential is removed from the lead 30a.

As indicated above, the playback control circuit 30 as controlled by the printing control circuit 35 is provided with apparatus for energizing an alarm device 44 to bring in a major alarm in the event of a failure in the system. Such failure may be caused by defective tubes, wiring failures, failure of the recording and reproducing heads of a trunk recorder, etc. The arrangement is such that if no successfully completed calls are evidenced to the translating and printing facilities during playback of any one of the trunk recorder tapes, the printing control circuit 35 transmits a signal to this effect to the playback control circuit. The latter circuit upon receiving this signal, stops operating, locks up and energizes the alarm device 44 to signal the exchange attendant that trouble exists.

TRUNK RECORDER 25

Referring now more particularly to Fig. 15 of the drawings one of the multiple unit assemblies of the tape recorders is there indicated as a whole by reference character 1501. It comprises a housing 1502 in which may be mounted a plurality of tape-type trunk recorders such as the trunk recorder 25 illustrated in Fig. 16. The recorders have not been illustrated in Fig. 15 although a clutching idler 1503 and a capstan drive wheel 1504 forming part of one recorder have been illustrated in phantom to show the cooperative relation between these elements and one of the continuously rotating driving wheels 1505 rotatably mounted on the housing 1502. Each of the driving wheels 1505 is positioned adjacent an associated aperture 1506 providing access to the interior of the housing and enabling the driving and driven wheels to be brought into cooperative driving relation. The individual trunk recorders are adapted slidably to be mounted within the housing 1502 as upon guideways 1507 mounted at opposite sides of the housing although but a single guideway for each tape recorder is shown. If desired the housing may be closed in whole or in part by a cover 1508.

The drive wheels 1505 are, as indicated heretofore, driven at a constant speed and continuously for variable lengths of tape as by a synchronous motor 1510 suitably supported underneath the housing as upon a supporting frame indicated as a whole by reference character 1511. The drive wheels 1505 are mounted upon a generally vertically disposed drive shaft 1512 journalled in the vertically spaced apart bearing supports 1513 and the shaft is connected to the motor through suitable gearing mounted in housing 1514.

Before describing in detail the construction and operation of the trunk recorder, perhaps the general construction and operation should be reviewed briefly. In the main the recorder is of the magnetic type and includes an endless recording medium which may be a tape having a magnetic coating. The recorder comprises two main parts, these being a magazine in which a considerable length of the tape may be stored in random layer fashion and a base plate upon which are mounted various recording and reproducing means, tape sensing contact devices and selectively operable tape driving means whereby the tape can be driven intermittently during recording operations and in the same direction continuously for various lengths of tape for reproduce or playback operations. A detailed description of one of the tape trunk recorders will now be given in connection with Fig. 16.

One of the trunk recorders 25 is illustrated in some detail in Fig. 16. It has not been illustrated in complete detail but for additional details of construction reference may be had to the copending application of Howard Gleason, Serial No. 378,209, filed September 3, 1953, which application is assigned to the same assignee as the present application. The tape is indicated by reference character 1601 and the recorder is shown as including a base plate 1602 having a short upstanding vertical flange 1603 at one end to facilitate insertion and removal of the recorder relative to the housing 1502. The recorder is properly located and held in the housing by locking springs 1604 at the opposite sides of the base plate. These springs may have latching elements 1605 associated with complementary means in the housing to lock the recorder in place and adapt it to be unlocked upon depression of the front ends 1604–A immediately adjacent the upturned flange 1603.

The various operative parts of the recorder are mounted upon the base plate. These include a tape magazine 1606 which is detachably mounted upon the base plate; a pair of transversely (relative to the length of the tape) aligned record-reproduce transducing means 1201 and 1202 constituting the hereinafter named mark and space heads, respectively; the transducing means 1203 constituting an erase head; the movable clutching idler 1503 and associated capstan drive wheel 1504; means for intermittently driving the capstan which may take the form of a stepping magnet 1205 and an associated pawl 1608 for rotating a capstan 1607 intermittently each time the stepping magnet is energized; and a clutch magnet 1204 for moving the clutching idler 1503 to effect the continuous drive of the tape 1601 at a high speed. The magazine 1606 is provided with a chamber 1606A in which a considerable quantity of tape is stored in random layer fashion. The magazine is also provided with what may be termed a pinch roller 1610 holding the tape against the capstan 1607 so that when the latter is driven either intermittently or continuously, the tape is driven accordingly. The pinch roller 1610 is located at the upper right hand corner of the magazine as viewed in Fig. 16. It is mounted between the spaced apart outer walls of the magazine and at a region where the magazine is open to enable the pinch roller to come into contact with the capstan 1607. In effect, the tape is inside the magazine in the region of the pinch roller and capstan, since it enters the magazine at the entrance 1611 at the upper left hand corner of the magazine. A tape guiding and stripping element in the form of a generally triangular block 1612 is mounted within the magazine in cooperative relation with the pinch roller 1610. The magazine may, if desired, be made of transparent plastic material.

A portion of the tape is located outside of the magazine so that it can be brought into cooperative relation with the various transducer heads. The tape leaves the magazine through a narrow exit passageway 1613 at the lower right hand corner of the magazine. It thereafter goes around a tape guide roller 1614 and thence to the left to another tape guide roller 1615, during which passage the tape is outside of the magazine but guided by a channel at the exterior of the magazine. From the guide roller 1615 the tape goes past the transducers to another guide roller 1616 from which it goes back into the magazine through the entrance 1611.

The magazine is movably mounted on the base and it is biased for movement in a clockwise direction about the lower right hand corner in order resiliently to hold the pinch roller 1610 against the capstan 1607. The pivotal mounting is provided by a knob 1617 passing through a transverse opening in the magazine and which is adapted to be threadedly secured in the base plate. The upper left hand corner of the magazine is resiliently biased toward the capstan by an arm 1618 pivotally mounted on a pin 1619 and forced in a clockwise direction by a spring 1620 having a portion coiled around the pin and a portion 1621 bearing against the back of the arm.

The tape is adapted selectively to be acted upon by the record-reproduce and erase means. The erase means 1203 comprises a single magnetic core indicated diagrammatically at 1622 and mounted within a suitable housing 1623 secured to the base plate. The core extends across the full width of the tape so as to erase or condition substantially the entire width of the tape. As indicated heretofore, the erasing or conditioning means is of the direct current type which effectively saturates the tape and includes a winding supplied with current through the conductors 1624.

The record-reproduce head is similar to the erase head, but it includes a pair of aligned electromagnets each including a core 1625, and is adapted selectively to be supplied with recording signals to be recorded. Each electromagnet cooperates with one-half of the tape, thus providing two recording channels. Only one of the electromagnets has been shown but the two are adapted to be supplied with signal currents through the two pairs of conductors 1626 and 1627. As earlier indicated, the record-reproduce electromagnets are used for both recording and reproduction in well known manner.

The tape is held against the transducer heads by the pressure pads 1628 mounted upon the spring arms 1629 supported upon suitable movable, spring biased supporting structure 1630 mounted upon the base plate.

The capstan 1607 is adapted, as heretofore indicated, to be selectively driven either intermittently or continuously. It is driven intermittently during the recording operation and continuously during playback, the continuous drive being effective to drive the tape for certain lengths as determined by certain controls to be described hereinafter. The capstan 1607 forms part of what may be termed a capstan assembly including the capstan itself, the drive wheel 1504, and a ratchet gear 1515 (see Fig. 15) operatively associated with the pawl 1608. The assembly is rotatably mounted upon a shaft 1631 supporting also the movable idler 1503 which is mounted at the free end of a pivotally movably mounting lever 1632. The assembly and lever are held on the shaft 1631 by suitable means which may include a nut 1633.

The intermittent drive of the tape and capstan is effected by the advance magnet 1205 which is adapted to be energized periodically in response to input signals, as will be described hereinafter, supplied to the magnet through the associated conductors. The advance magnet includes an armature 1634 pivotally movable about an axis determined by a pin 1635. The free end 1636 of the armature is connected to the pawl 1608 whereby movement of the armature between its retracted and operated positions results in oscillation of the pawl to move the ratchet wheel and thus the capstan. The movement is very fast and short and the arrangement is such that the signals to be recorded are supplied and recorded while the tape is stationary. Overshooting of the ratchet wheel and capstan are prevented by a stop pawl 1637 mounted on shaft 1638.

The armature 1634 has associated with it a stationary stop 1639 and a biasing spring 1640 for returning it to its retracted position. The advance magnet is energized only briefly and in operating it opens a pair of interrupter springs 1208 through the contact operating arm 1641 extending rearwardly from the armature. These interrupter springs are utilized for the control purpose described below.

When it is desired to reproduce or playback the record, the clutch magnet 1204 is energized through its associated conductors 774. When energized, it attracts its armature 1642 to render effective the continuous drive. The continuous drive is rendered effective through movement of a control lever 1643 connected to and moving with the armature. As the control lever 1643 moves down, it moves downwardly a latching portion 1644 at its upper end, which movement permits movement of the clutching idler 1503 in a clockwise direction, this movement being effected by a spring 1645, one end of which is connected to the clutching idler supporting lever 1632 and the other to a rotatably adjustable stop 1646 mounted on shaft 1638. The movement of the clutching idler effectively engages idler 1503 with both the continuously rotating driving wheel 1505 and the capstan drive wheel 1504. In order to maintain the idler normally disengaged from the capstan drive wheel 1504 but to permit it to engage it upon operation of the clutch magnet 1204, the lever 1632 is so constructed as to have a slight longitudinal movement which occurs when the lever 1643 is moved downwardly upon movement of the armature 1642. When the armature moves back up, the latching portion 1644 cams the lever 1632 upwardly to disengage the idler 1503. The armature 1642 is moved back up to its unoperated position by its biasing spring 1642A connected to the rear end of the armature, whereby it biases the armature for clockwise movement about the axis determined by pivot shaft 1642B.

Energization of the clutch magnet also renders ineffective the stop pawl 1637. This is accomplished through an upwardly extending link 1647, the lower end of which is connected to the armature 1642 and the upper end of which is connected to the stop pawl 1637 so that the latter is moved slightly upon energization of the clutch magnet 1204, thereby to retract the pawl from engagement with the ratchet wheel. Also, the stepping magnet 1205 cannot be energized when the clutch magnet is energized, thus making it impossible to render both drives operative at the same time. To prevent simultaneous energization of the advance magnet a switch, indicated generally by reference character 1648 is placed in series with the winding of the advance magnet 1205. The switch 1648 is opened by a cam portion 1649 at the front end of the armature 1642 when the armature is attracted upon energization of the clutch magnet.

From the foregoing detailed description, it is apparent that the endless tape 1601 may be readily moved as desired either intermittently for recording and continuously for playback. Specifically, the tape is moved intermittently only when signals are to be recorded, and these signals are recorded while the tape is stationary, and the continuous drive is preferably quite rapid so that the playback can be effected in a short period of time. The tape is also an endless one and it may be provided with suitable contacts or conductive portions such as those shown diagrammatically and indicated by the reference characters 1650 and 1651 (see also Fig. 80) providing certain control operations, as described later. The contacts are adapted to be sensed, so to speak, by a plurality of flexible wires 1652, 1653, and 1654 (Fig. 80) engaging the tape at the guide wheel 1614. The wires 1652 and 1653 are adapted to complete a circuit through the conductive portion 1650 to form foil contact points shown as 1206 (Fig. 12) and the wires 1653 and 1654 are adapted to complete a circuit through the conductive portion 1651 to provide foil contact points designated as 1207 (Fig. 12). These foil contact points are connected to the one-way trunk circuit 19 through suitable conductors, as shown in Fig. 12. Physically, conductive portions 1650 and 1651 may be in the nature of foil contacts or some conductive material incorporated in the tape.

OPERATIONAL DETAILS OF THE TRUNK CIRCUIT 19 AND THE LINE VERIFICATION FACILITIES

As indicated above, the detailed circuitry of the trunk circuit 19 and the preselector 22 is illustrated in Figs. 4, 5, 6 and 7 of the drawings, the details of the verification selector 23 are illustrated in Fig. 8 of the drawings, and the details of the verification connector 24 are illustrated in Fig. 9 of the drawings. In the interests of simplifying the disclosure, the individual circuit components of the four units 19, 22, 23 and 24 will be described below in terms of the functions which they respectively perform. More specifically, the operational details of the system components 19, 23 and 24 can best be explained with reference to the above-described call from the substation A to the substation C.

Referring now more particularly to Figs. 4, 5, 6 and 7 of the drawings, when the above-described loop circuit is extended through the link 12 to the trunk circuit 19, a circuit is completed for energizing the line relay 530. This circuit includes the ring and tip conductors of the line 10, the ring and tip conductors of the seizure trunk 19a, the windings 661 and 662 of the repeating coil 660, and the contacts 751 of the second foil relay 750. When energized in this circuit, the relay 530 closes its contacts 531 to complete an obvious circuit for energizing the slow-to-release hold relay 540. At its contacts 532, the relay 530 opens a point in the incomplete operating circuit for the digit relay 550. At its contacts 533, the relay 530 opens a point in one of the available circuits for energizing the mark head 1201 of the trunk recorder 25. At its contacts 534, the relay 530 prepares a loop circuit to the particular line verification selector which has been preselected for use by the preselector 22 in the manner described below. In this connection, it may be assumed that the verification selector 23 and the verification connector 24 are employed for calling line verification purposes in the handling of the call under consideration.

When energized in response to operation of the line relay 530, the hold relay 540 closes its contacts 541 to prepare the operating circuit for the digit relay 550. At its contacts 542, the relay 540 prepares one of the circuits for transmitting mark pulses to the mark pulse recording head 1201 of the trunk recorder 25. At its contacts 543, the relay 540 completes a path for applying ground potential to the master ground conductor 548, thereby to prepare a number of relay holding circuits which are described in detail below. Ground potential as applied to the conductor 548 is extended through the upper winding of the sleeve test relay 510 to the sleeve conductor of the seizure trunk 19a thereby to provide a circuit for maintaining the energization of the operated relays in the line circuit 11, the finder 13, and the selector 14. In this regard, it is noted that the resistance of the upper winding of the relay 510 is sufficiently high relative to the parallel resistance of the relays excited in series therewith as to effect operation of the relay 510 in response to operation of the hold relay 540. In operating, the relay 510 opens its contacts 511 to open a point in the incomplete operating circuit for the verification complete relay 520.

At its contacts 546, the relay 540 opens a point in one of the operating circuits for the first end of call ticket relay 610. At its contacts 545, the relay 540 completes the operating circuit for the dismiss relay 720, this circuit extending from ground by way of the contacts 744a, the contacts 545, the contacts 705 and the winding of the relay 720 to battery. At its contacts 544, the relay 540 completes the operating circuit for the cut-through relay 410 of the preselector 22, this circuit extending from ground by way of the contacts 544, the contacts 521a, the contacts 434, the winding of the relay 410, the contacts 409a, and the winding of the switch stepping magnet 409 to battery. At its contacts 547, the relay 540 opens a point in the operating circuit for the clock relay 640.

When energized in series with the cut-through relay 410 in the manner just described, the stepping magnet 409 is insufficiently energized to operate. Accordingly, the wipers of the preselector switch 400 are not advanced. The relay 410, however, operates when energized in series with the magnet 409. In operating, the relay 410 opens its contacts 415 to interrupt a point in the operating circuit for the stepping magnet 409. At its contacts 411 and 412, the relay 410 completes a local loop circuit between the trunk circuit 19 and the verification selector 23 and in so doing completes the operating circuit for the line relay 810 in the verification selector, this circuit extending from ground through the upper winding of the relay 810, the contacts 855, the wiper 401 and engaged contact in the contact set 405, the contacts 411, 525, 534, 527 and 412, the wiper 402 and engaged contact in the contact set 406, the contacts 857 and the lower winding of the relay 810 to battery. At its contacts 413, the relay 410 completes a path for applying ground potential to the sleeve conductor of the seizure trunk individual to the verification selector 23, this path extending from the master ground conductor 548 by way of the contacts 413, and the wiper 403 and its engaged contacts in the contact set 407 to the sleeve conductor of the indicated seizure trunk. At its contacts 414, the relay 410 prepares a circuit for energizing the first verification test relay 420.

The dismiss relay 720, upon operating in response to operation of the hold relay 540, closes its contacts 721 to complete the operating circuit for the second end-of-ticket relay 620, this circuit extending from ground by way of the contacts 721 and 611 and the winding of the relay 620 to battery. At its contacts 722, the relay 720 opens a point in the incomplete path for applying ground potential to the lead 30a extending to the playback control circuit 30. At its contacts 723, the relay 720 opens a point in certain operating circuits described below. At its contacts 724, the relay 720 prepares one of the operating circuits for the first end-of-ticket relay 610.

When energized in response to operation of the dismiss relay 720, the second end-of-ticket relay 620 closes its contacts 621 to prepare the locking circuit for the first end-of-ticket relay 610. At its contacts 622, the relay 620 opens a point in one of the locking circuits for the relay 600. At its contacts 623, the relay 620 prepares a circuit for transmitting space pulses to the space pulse head 1202 of the trunk recorder 25.

When ground potential is applied to the master ground conductor 548 through operation of the hold relay 540, a circuit is also completed for energizing the slow-to-release second verification test relay 500, this circuit extending from ground by way of the contacts 543, the conductor 548, the contacts 523a, 435 and 423, and the winding of the relay 500 to battery. When energized in this circuit, the relay 500 closes its contacts 501 to complete a loop circuit over the trunk 20 to the switching equipment in the remote automatic exchange 8. This loop circuit may be traced locally in the exchange 7 as extending from the trunk conductor 20a by way of the contacts 521, 501, the winding 664 of the repeat coil 660, the upper winding of the electropolar supervisory relay 700, the potentiometer resistor 708, and the repeat coil winding 663 to the trunk conductor 20b. When the described loop circuit is completed over the trunk 20 to the remote exchange 8, switching equipment is seized in this exchange in the usual manner and conditioned to respond to dial impulses repeated thereto from the trunk circuit 19.

In operating, the relay 500 also closes its contacts 502 to prepare the operating circuit for the vertification complete relay 520. At its contacts 503, the relay 500 opens a point in the operating circuit for the vertification failure relay 430. At its contacts 504, the relay 500 completes a locking circuit for the sleeve test relay 510, this circuit extending from ground by way of the contacts 422 and 504 and the lower winding of the relay 510 to battery.

*Operation of vertification switch train*

When seized from the trunk circuit 19 in the manner just explained, the selector 23 is immediately conditioned to respond to dial impulses repeated thereto by the line relay 530 of the trunk circuit. Specifically, the line relay 810, upon operating, opens its contacts 811 to interrupt a point in the incomplete locking circuit for the slow-to-release transfer relay 870. At its contacts 812, the relay 810 completes the operating circuit for the slow-to-release hold relay 800, this circuit extending from ground by way of the off-normal springs 893, the contacts 812, and the winding of the relay 800 to battery. At its contacts 812, the relay 810 also completes a circuit through the off-normal springs 881 for energizing the lower winding of the relay 870.

In operating, the hold relay 800 closes its contacts 801 to prepare certain circuits described below. At its contacts 802, the relay 800 prepares the circuit for transmitting repeated dial impulses to the X magnet 880 of the switch mechanism. At its contacts 803, the relay 800 closes a locking circuit for itself and the relay 870 through the contacts 812. At its contacts 804, the relay 800 opens a point in certain circuits described below. At its contacts 805, the relay 800 prepares a shunting path for the operating winding of the switching relay 850.

The relay 870, upon operating, closes its contacts 874 to prepare a circuit for energizing its own upper winding in parallel with the X magnet 880. At its contacts 873, the relay 870 opens a point in the operating circuit for the switching relay 850.

Following operation of the relays 810, 800 and 870 in the vertification selector 23, this selector is conditioned to respond to the impulses making up the first digit of the directory assigned to the calling substation A. Moreover, the trunk circuit 19 is at this time fully conditioned to repeat the impulses of the digits making up the calling subscriber's directory number both to the verification switch train and to the trunk recorder 25. Neglecting for the moment the manner in which the impulses are recorded in the recorder 25, it is pointed out that the line relay 530 in following the impulses transmitted to the trunk circuit 19 from the substation A, opens and closes its contacts 534 to repeat the impulses over the above-described loop circuit to the verification selector 23. Thus, the line relay 810 in the verification selector is caused to follow the impulses making up the first digit of the directory number assigned to the calling substation A. Upon releasing at the beginning of the open circuit period of the first impulse in each digit of the calling subscriber's directory number, the relay 530 opens its contacts 531 to interrupt the operating circuit for the hold relay 540. At its contacts 532, the relay 530 completes the prepared operating circuit for the digit relay 550, this circuit extending from ground by way of the contacts 532, 431 and 541, and the winding of the digit relay 550 to battery.

Upon operating, the digit relay 550 closes its contacts 551 to shunt the repeat coil windings 663 and 664 and the upper winding of the electro-polar relay 700 out of the loop circuit established by way of the trunk 20 to the remote automatic exchange 8. At its contacts 552, the relay 550 completes an obvious circuit for energizing the advance pulse forming relay 560. The latter relay, in operating, closes its contacts 561 to complete an obvious circuit for energizing the relay 600. Sequential operation of the relays 550, 560 and 600 in the manner just described is concerned more particularly with the transmission of space pulses to the recorder 25 and accordingly will be described later. It is noted, however, that due to the slow-to-release characteristics of these relays, they remain operated for the duration of each digit and sequentially restore during the inter-digit pause between succeeding digits. The hold relay 540 is also slow-to-release and accordingly remains operated during each impulse repeating operation performed in the trunk circuit 19.

As indicated above, the line relay 810 in the verification selector 23 follows the impulses of the first digit dialed into the trunk circuit 19. Each time this relay releases at the start of the open circuit period of an impulse, it opens its contacts 812 to interrupt the operating and locking circuits for the hold relay 800. However, the latter relay is of the slow-to-release type and accordingly remains operated during impulsing. At its contacts 811, the relay 810 completes the prepared holding circuit for the transfer relay 870, this circuit extending from ground by way of the contacts 803, 811, 802 and 874, and the upper winding of the relay 870 to battery. At its contacts 811, the relay 810 also completes the operating circuit for the "X" magnet of the switching mechanism each time it restores, this circuit extending from ground by way of the contacts 803, 811, 802 and 874, and the winding of the "X" magnet 880 to battery. Each time the "X" magnet 880 is thus energized, it steps the wipers 813 to 816, inclusive, one step in the "X" direction, so that at the end of the digit the enumerated wipers are left standing opposite the level or group of bank contact wires in which are terminated the conductors of the seizure trunks individual to the verification connectors having access to the lines of the 100 line group which includes the calling subscriber line 10. Immediately these wipers are stepped off-normal during the open circuit period of the first impulse repeated to the selector 23, the off-normal springs 881 are opened to interrupt the above-described operating circuit for the digit relay 870. Due to the slow-to-release characteristic of this relay, however, and the continuing intermittent energization of its upper winding, it remains operated for the duration of the digit. When the switch wipers are moved off-normal, the off-normal springs 883 are also closed to prepare the operating circuit for the release magnet 840. The off-normal springs 884 are also closed to prepare the operating circuit for the hunt assist relay 860.

Shortly following the end of the first digit dialed into the trunk circuit 19 and repeated to the selector 23, the transfer relay 870 restores and opens its contacts 874 further to interrupt the above-traced circuit for energizing its own upper winding in parallel with the "X" magnet 830. At its contacts 873, the relay 870 completes the prepared operating circuit for the hunt-assist relay 860, this circuit extending from the grounded sleeve conductor of the seizure trunk incoming to the selector 23 by way of the contacts 873, the off-normal springs 884 and 841, the pulsing springs 882, the winding of the relay 860, the contacts 863 and the pulsing springs 891 to battery. When energized in this circuit, the relay 860 operates and closes its contacts 861 to complete a parallel energizing circuit for itself which by-passes the springs 841 and 884, and the contacts 873. At its contacts 863, the relay 860 opens the path shunting the resistor 864 and thereby includes this resistor in the energizing circuit for the relay 860. At its contacts 862, the relay 860 completes the prepared circuit for energizing the "Y" magnet 890, this circuit extending from the grounded sleeve conductor of the seizure trunk incoming to the selector 23 by way of the contacts 858 and 862, and the winding of the magnet 890 to battery.

When energized in the above-traced circuit, the "Y" magnet 890 steps the wipers 813 to 816, inclusive, one step in the "Y" direction and thus moves these wipers into engagement with the bank contact wires terminating the conductors of the seizure trunk extending to the first connector of the selected group. At the impulsing springs 882 and 891, which are directly operated in response to energization of the "Y" magnet 890, this magnet interrupts the above-described operated and holding circuit for the hunt-assist relay 860. This latter in restoring opens its contacts 862 to deenergize the "Y" magnet 890.

Incident to off-normal movement of the switch wipers 813 to 816, inclusive, in the "Y" direction, the off-normal springs 841 are opened to interrupt the initially completed operating circuit for the hunt-assist relay 860. Concurrently, the off-normal springs 842 are closed to prepare the operating circuit for the switch relay 850. The off-normal springs 883 are also closed to prepare a parallel circuit for energizing the release or "Z" magnet 840.

Further operation of the selector 23 depends upon the idle or busy condition of the connector with which the selector 23 is associated through its wipers 813 to 816, inclusive. Assuming that this connector is busy at the time it is selected in the manner just explained, ground potential is present upon the sleeve conductor of its seizure trunk so that an alternative circuit is completed for energizing the hunt-assist relay in response to deenergization of the "Y" magnet 890 in the manner explained above. This alternative energizing circuit for the relay 860 extends from the grounded wiper 815 by way of the contacts 851a and 805, the contact springs 882, the winding of the relay 860, the contacts 863 and the contact springs 891 to battery. When energized in this alternative circuit, the relay 860 operates to perform the functions described above, including that of again energizing the "Y" magnet 890, thereby to effect operation of the switching mechanism to advance the wipers 813 to 816, inclusive, a second step. As will be apparent, the hunt-assist relay 860 and the "Y" magnet 890 continue to interact and advance the wipers of the switch mechanism step-by-step until such time as these wipers are advanced to engage contacts terminating the conductors of a seizure trunk leading to an idle connector in the selected group. Assuming that the connector 24 is the first available idle connector in the selected group, this connector is marked idle through the absence of ground potential upon the sleeve conductor of the seizure trunk extending thereto. In this regard, it would be noted that throughout the described trunk hunt operation, ground potential is maintained upon the sleeve wiper 815 of the selector 23 to shunt down the switch relay 850 in a path which extends from the right terminal of the relay 850 by way of the contacts 805 and 851a, the grounded wiper 815, the grounded sleeve conductor of the seizure trunk incoming to the selector 23, the contacts 873 and the off-normal springs 884 and 842 to the left terminal of the switch relay 850. When, however, the wipers of the selector 23 are advanced to engage the contacts terminating the seizure trunk extending to the idle verification connector 24, this short-circuiting path is broken at the wiper 815, permitting the switch relay 850 to be energized in a circuit which extends from the grounded sleeve conductor of the seizure trunk individual to the selector 23 by way of the contacts 873, the off-normal springs 884 and 842, the winding of the relay 850 and the resistor 865 to battery. When energized in this circuit, the relay 850 immediately operates and opens its contacts 851 to interrupt the incomplete circuit for energizing the release or "Z" magnet 840. At its contacts 855 and 857, the relay 850 opens the previously-traced loop circuit over which the line relay 810 is energized from the trunk circuit 19. At its contacts 854 and 856, the relay 850 extends the local loop circuit from the trunk circuit 19 by way of the tip and ring wipers 813 and 814 to the terminals of the line relay 940, thereby to energize the latter relay in the verification connector 24. At its contacts 858, the relay 850 opens a point in the above-traced circuit for energizing the "Y" magnet 890 as well as a point in the described alternative circuit for energizing the hunt-assist relay 860. At its contacts 851a, the relay 850 opens the previously-traced test circuit over which the hunt-assist relay 860 is energized, and a point in the above-described path for short-circuiting the winding of the switch relay 850. At its contacts 859, the relay 850 connects the sleeve conductor of the seizure trunk individual thereto through the sleeve wiper 815 to the sleeve conductor of the seizure trunk individual to the verification connector 24, thereby to mark this connector as busy to the other verification selectors. At its contacts 852a, the relay 850 prepares the circuit, described below and including the wiper 816, over which the connector 24 answers back to the trunk circuit 19 after this connector has received its full complement of digits from the trunk circuit.

Following operation of the switch relay 850, the line relay 810 and the hold relay 800 are sequentially released in the order named. Release of these relays is without effect at this time, it being noted, however, that the hold relay 800, upon restoring, closes its contacts 801a further to prepare the operating circuit for the release or "Z" magnet 840.

When the local loop circuit is extended to the verification connector 24 through the selector 23 from the trunk circuit 19, to effect energization of the line relay 940 in the manner explained above, this relay closes its contacts 942 to complete an obvious circuit for energizing the slow-to-release hold relay 930. The hold relay 930, upon operating, opens its contacts 931 to open a point in the incomplete operating circuit for the release or "Z" magnet 950 of the switching mechanism embodied in the connector. At its contacts 932, the relay 930 prepares certain operating and locking circuits described below. At its contacts 933, the relay 930 completes the operating circuit for the slow-to-release digit relay 920, this circuit extending from ground by way of the contacts 933, the off-normal springs 991 and the upper winding of the relay 920 to battery. At its contacts 933, the relay 930 also completes the operating circuit for the slow-to-release digit relay 910, this circuit extending from ground through the contacts 933, the off-normal springs 983, the lower winding of the relay 910 to battery. At its contact 934, the hold relay 930 connects the sleeve lead of the seizure trunk incoming to the connector 24 through the contacts 905 to the sleeve wiper 906 of the connector switching mechanism.

The relay 910, upon operating, closes its contacts 912 to prepare a circuit for transmitting pulses to its own upper winding and the winding of the "Y" magnet 960 in parallel. At its contacts 911, the relay 910 opens a point in an alternative operating circuit for the digit relay 920. The digit relay 920, upon operating, opens its contacts 921 to interrupt the incomplete operating circuit for the relay 900. At its contacts 922, the relay 920 prepares certain circuits described below. At its contacts 923, the relay 920 opens a point in the circuit for transmitting pulses to the "Y" magnet 960 and the upper winding of the digit relay 910 in parallel. At its contacts 924, the relay 920 prepares a circuit for transmitting pulses to the "X" magnet 970 and to its own lower winding in parallel.

Following operation of the four relays 940, 930, 920 and 910 to perform the circuit switching operations just described, the connector 24 is conditioned to accept impulses repeated thereto from the trunk circuit 19. In this regard, it will be understood that the line relay 940 follows these impulses by restoring during the open circuit period of each such impulse and reoperating at the beginning of the closed circuit period of each impulse. Upon releasing at the beginning of the open circuit period of each impulse of the first digit repeated to the connector 24, the relay 940 completes the above-mentioned circuit for transmitting impulses to the "X" magnet 970 and the lower winding of the digit relay 920 in parallel, this circuit extending from ground by way of the contacts 941, 932 and 924 to the contacts 903, where it divides, one branch extending through these contacts and the lower winding of the relay 920 to battery, and the other branch extending through these contacts, the off-normal springs 995 and the winding of the "X" magnet 970 to battery. It will thus be understood that the "X" magnet 970 receives one pulse for each impulse of the first digit repeated to the connector 24 from the trunk circuit 19. In responding to these pulses, the "X" magnet 970 moves the wipers of the switching mechanism step-by-step in the "X" direction to a position opposite the level or group of bank contact wires in which are terminated the sleeve conductors individual to the lines of the ten line sub-group which includes the calling line 10. Incident to the described off-normal movement of the switch wipers, the "X" off-normal springs 991, 992 and 993 are operated. At the springs 993, a path is prepared for impressing ground potential upon the control lead 24a of the seizure trunk individual to the connector 24. At the springs 992, the operating circuit for the release magnet 950 is prepared. At the contact springs 991, the above-described operating circuit for the digit relay 920 is interrupted. Due to continued intermittent energization of its lower winding, however, the relay 920 remains operated throughout the digit by virtue of the slow-to-release characteristic thereof. The hold relay 930 is also slow-to-release, and accordingly remains operated during impulsing.

Shortly after the end of the first digit transmitted to the connector 24, the digit relay 920 releases and opens its contacts 924 to interrupt the above-described path for transmitting impulses to its own lower winding and the winding of the "X" magnet 970 in parallel. At its contacts 923, the relay 920 further prepares the above-mentioned circuit for transmitting the impulses of the second digit repeated to the connector 24 to the "Y" magnet 960 and the upper winding of the digit relay 910 in parallel. At its contacts 921, the relay 920 reprepares the operating circuit for the relay 900. The connector 24 is now conditioned to accept the impulses of the second digit transmitted thereto from the trunk circuit 19.

As indicated above, the impulses of the next digit are repeated to the "Y" magnet 960 and the upper winding of the digit relay 910. More specifically, the line relay 940 upon restoring during the open circuit period of each impulse of this digit closes the described parallel circuit, this circuit extending from ground by way of contacts 941, 932 and 923 to the contacts 912 where it divides, one branch extending through these contacts and the upper winding of the relay 910 to battery, and the other branch extending through the same contacts and the winding of the magnet 960 to battery. Each time the "Y" magnet 960 is energized in this circuit, it steps the wipers of the switching mechanism one step in the "Y" direction so that at the end of the digit these wipers are left standing in engagement with the particular bank contact wires corresponding to the calling line 10. More specifically, the sleeve wiper 906 of the switch mechanism is left standing in engagement with the sleeve conductor of the bank multiple at which is terminated the sleeve conductor of the line multiple individual to the calling line 10, assuming that the directory number assigned to the calling substation A has been correctly dialed into the trunk circuit 19.

When the wipers of the switching mechanism in the connector 24 are moved off-normal in the "Y" direction, the "Y" off-normal springs 981, 982, 983 and 995 are operated. At the off-normal springs 995, a point is opened in the above-traced operating circuit for the "X" magnet 970. At the off-normal springs 981, a parallel point is closed in the operating circuit for the release or "Z" magnet 950. At the off-normal springs 983, the above-described operating circuit for the digit relay 910 is interrupted. Due to continued intermittent energization of the upper winding of the digit relay 910, however, this relay remains operated for the duration of the digit by virtue of the slow-to-release characteristic thereof. At the off-normal springs 982, the above-mentioned operating circuit for the relay 900 is completed. This circuit extends from ground by way of the contacts 933, the off-normal spring 982, the contacts 921 and the lower winding of the relay 900 to battery. When energized in this circuit, the relay 900 opens its contacts 901 to open a point in the incomplete path for applying marking ground potential to the control conductor 24a of the seizure trunk individual to the connector 24. At its contacts 902, the relay 900 prepares an alternative circuit for transmitting pulses to the upper winding of the digit relay 920 when the third digit is repeated to the verification connector 24 from the trunk circuit 19. At its contacts 903, the relay 900 opens a point in the above-described circuit for transmitting impulses to the "X" magnet 970 and the lower winding of the digit relay 920 in parallel. At its contacts 904, the relay 900 prepares a holding circuit for itself. At its contacts 905, the relay 900 disconnects the sleeve wiper 906 of the switching mechanism embodied in the connector 24 from the sleeve conductor of the seizure trunk individual to this connector.

Shortly following the end of the second digit repeated to the connector 24 from the trunk circuit 19, the digit relay 910 releases and opens its contacts 912 to interrupt the above-described circuit for repeating impulses to the "Y" magnet 960 and its own upper winding in parallel. At its contacts 911, the relay 910 further prepares the above-mentioned circuit for repeating the impulses of the third digit transmitted to the connector 24 to the upper winding of the digit relay 920. Following release of the digit relay 910, the connector 24 is conditioned to receive the impulses of the third digit transmitted thereto, i.e. the final digit of the directory number assigned to the calling substation A.

Actually, the impulses of the final digits of the directory number assigned to the calling substation A are absorbed in the connector 24. More specifically, these impulses are repeated to the digit relay 920 through the back contacts 941 of the line relay 940 over a circuit which extends from ground by way of these contacts, the contacts 932, 923, 911 and 902, and the upper winding of the relay 920 to battery. When energized in response to the first pulse transmitted to its upper winding over the above-described circuit, the digit relay 920 reoperates.

Upon reoperating, the relay 920 first closes its contacts 922 to complete a locking circuit for itself, this circuit extending from ground by way of the contacts 933, the off-normal springs 982, the contacts 922 and the upper winding of the relay 920 to battery. After completing this locking circuit, the relay 920 opens its contacts 921 to interrupt the above-traced operating circuit for the slow-to-release relay 900. Concurrently with this operation, the relay 920 opens its contacts 923 to interrupt the above-traced circuit over which the first impulse of the third digit was transmitted to its own upper winding, and closes its contacts 924 to complete a circuit for transmitting the second and succeeding impulses of the third digit to the upper winding of the relay 900, this latter circuit extending from ground by way of the contacts 941, 932, 924 and 904, and the upper winding of the relay 900 to battery. Due to the slow-to-release characteristic thereof, the relay 900 remains operated for the duration of the third digit by virtue of intermittent energization of this upper winding during the second and succeeding impulses of the digit.

From the above explanation, it will be understood that the digit relay 920 is reoperated and locked operated at the beginning of the third digit repeated to the connector 24 from the trunk circuit 19, and that the relay 900 is held operated for the duration of this digit. Shortly following the end of the digit, the slow-to-release relay 900 restores and answers back to the trunk circuit 19 to advise this trunk circuit that a full complement of digits has been received by the connector 24. More specifically, the relay 900, upon releasing, completes a path for applying ground potential to the control conductor 24a of the seizure trunk individual to the verification connector 24, this path extending from ground by way of the contacts 933, the off-normal springs 982, the contacts 922 and 901 and the off-normal springs 993 to the conductor 24a. In releasing, the relay 900 also opens its contacts 904 further to interrupt its own holding circuit and closes its contacts 905 to complete the calling line verification test circuit described more fully below.

The remaining contact switching operations of the relay 900 effected incident to the release of this relay are without effect. As will be evident from the above explanation, the relays 940, 930 and 920 remain operated in the verification connector 24 after this connector has been operated to the particular setting designated by the numerical values of the three digits repeated thereto from the trunk circuit 19.

*Calling line verification test*

When the connector 24 answers back to the trunk circuit 19 that it has received its full complement of digits by applying ground potential to the conductor 24a, a circuit is completed for energizing the first verification test relay 420, this circuit extending from the grounded conductor 24a by way of the control wiper 816 of the switching mechanism in the selector 23, the contacts 852a, the wiper 404 and the contact engaged thereby in the contact set 408, the contacts 414 and the winding of the relay 420 to battery. When energized in this circuit, the relay 420 opens its contacts 423 to interrupt the above-traced operating circuit for the second verification test relay 500. At its contacts 422, the relay 420 interrupts the above-traced operating circuit for the sleeve test relay 510. At its contacts 421, the relay 420 prepares the operating circuit for the verification failure relay 430.

The purpose of having the connector 24 advise the trunk circuit 19 when it has received its full complement of digits is to initiate the calling line verification test and to start measurement of a time period during which the test must be successfully completed if it is to be successfully completed at all. This time period is measured by the release time of the slow-to-release relay 500. More specifically, if the directory number of the calling subscriber station has been correctly dialed into the trunk circuit 19 by the calling subscriber, a path is completed for short-circuiting the upper winding of the sleeve test relay 510 immediately after the relay 900 releases in the connector 24. This short-circuiting path extends from the right upper winding terminal of the relay 510 by way of the contacts 413, the wiper 403 and engaged contact of the contact set 407, the sleeve lead of the seizure trunk individual to the selector 23, the contacts 859, the sleeve wiper 815 and engaged contact wire of the switching mechanism in the selector 23, the sleeve lead of the seizure trunk individual to the connector 24, the contacts 934 and 905, the sleeve wiper 906 of the switching mechanism embodied in the verification connector 24 and its engaged bank contact wire, the sleeve lead 10s of the line multiple individual to the calling line 10, the sleeve wiper 13s of the finder 13 and its engaged bank contact, the sleeve path through the finder-selector link 12, the sleeve wiper 14s of the switching mechanism embodied in the selector 14 and its engaged contact, and the trunk conductor 19s of the seizure trunk 19a, to the left terminal of the upper winding of the sleeve test relay 510. Assuming that this shunting path is successfully completed, the relay 510 is immediately de-energized and restores. In releasing, the relay 510 closes its contacts 511 to complete the prepared operating circuit for the verification complete relay 520, this circuit extending from the grounded wiper 404 by way of the contacts 414, 511, 502 and 522, and the winding of the relay 520 to battery. When energized in this circuit, the relay 520 first closes its contacts 523 to complete a locking circuit for itself which includes the master ground conductor 548 and the contacts 543. After this circuit is completed, the relay 520 opens its contacts 522 to interrupt its own operating circuit. At its contacts 524, the relay 520 completes an obvious alternative path for short circuiting the upper winding of the sleeve test relay 510, thereby to prevent the latter relay from reoperating in response to release of a verification switch train in the manner explained below. At its make-before-break contacts 526 and 528, the relay 520 completes an alternative bridging path between the trunk conductors 20a and 20b for the purpose of maintaining the seized switching equipment of the remote automatic exchange 8 operated following release of the relay 500. This path extends from the trunk conductor 20a by way of the contacts 528, 534 and 526, the repeat coil winding 664, the upper winding of the supervisory relay 700, the resistor 708 and the repeat coil winding 663 to the trunk conductor 20b. After this path is completed, the relay 520 opens its contacts 525 and 527 to interrupt the loop circuit extending through the selector 23 to the connector 24. Also after completing the trunk conductor bridging path just traced, the relay 520 opens its contacts 521 to interrupt the path initially completed between these two trunk conductors. At its contacts 529, the relay 520 prepares one of the available operating circuits for the digit relay 550. At its contacts 521a, the relay 520 opens the previously traced operating circuit for the cut-through relay 410. At its contacts 522a, the relay 520 opens the prepared operating circuit for the verification failure relay 430, thereby to prevent the latter relay from operating in response to release of the second verification test relay 500. At its contacts 523a, the relay 520 opens another point in the operating circuit for the second verification test relay 500.

From the above explanation, it will be understood that when the verification complete relay 520 operates to perform the described switching operations, the trunk circuit 19 is advised that the calling line verification test has been successfully completed and that the calling subscriber is entitled to the desired connection through the remote automatic exchange 8. It will also be noted that incident to operation of the verification complete relay 520, a pulsing path including the pulsing contacts 534 of the line relay 530 is completed between the conductors 20a and 20b of the trunk 20 extending to the remote automatic exchange 8. Also incident to the operation of the verification complete relay 520, the verification switch train is conditioned for release. Specifically, the cut-through relay 410 is deenergized in response to operation of the relay 520 to open its contacts 521a. At the same time, the loop circuit extending to the connector 24 is opened at the contacts 525 and 527 of the relay 520 to deenergize the line relay 940 of this connector.

Shortly following full operation of the verification complete relay 520, the second verification test relay 500 restores. Release of the relay 500 is without effect. When the cut-through relay 410 restores, it opens its contacts 414 to interrupt the above-traced circuit for energizing the first verification test relay 420 and the verification complete relay 520. This results in release of the relay 420, but such release of this relay is without effect. At its contacts 411 and 412, the relay 410, upon restoring, opens two additional points in the loop circuit extending from the trunk circuit 19 to the verification connector 24. At its contacts 413, the relay 410 disconnects the sleeve conductor of the seizure trunk individual to the verification selector 23 from the master ground conductor 548 in the trunk circuit 19, and in so doing deenergizes the switch relay 850 in the verification selector 23. At its contacts 415, the relay 410 prepares the operating circuit for the operating magnet 409 of the preselector switch 400.

From the above explanation, it will be understood that if the calling subscriber has failed correctly to dial the digits of the directory number assigned to the calling substation A into the trunk circuit 19, the above-described verification test circuit or path over which the upper winding of the sleeve test relay 510 is short circuited, is not completed. Accordingly, the sleeve test relay 510 remains energized and does not restore in response to operation of the first verification test relay 420. As a consequence, the operating circuit for the verification failure relay 430 is completed in response to release of the second verification test relay 500 which occurs shortly following operation of the first verification test relay 420. Specifically, the operating circuit for the verification failure relay extends from ground by way of the contacts 421, 503, 522a, 432 and the winding of the relay 430 to battery. When energized in this circuit, the relay 430 first closes its contacts 433 to complete a locking circuit for itself which includes the grounded master ground conductor 548. After completing this locking circuit, the relay 430 opens its contacts 432 to interrupt its own operating circuit. At its contacts 431, the relay 430 opens a point in the operating circuit for the digit relay 550. At its contacts 434, the relay 430 interrupts the operating circuit for the cut-through relay 410, thereby to effect the release of the latter relay. At its contacts 435, the relay 430 opens another point in the operating circuit for the second verification test relay 500. At its contacts 436, the relay 430 completes a circuit for impressing a special tone signal voltage upon the ring conductor of the seizure trunk 19a. This circuit extends from the ungrounded or high potential terminal of a special tone signal voltage generator through the condenser 437 and the contacts 436 to the ring conductor of the trunk 19a. Completion of this circuit results in excitation of the receiver embodied in the hand set of the telephone instrument at the calling substation by the signal voltage derived from the special tone generator and reproduction of the tone to signal the calling subscriber that the desired connection cannot be obtained. Should one or more additional digits be dialed into the trunk circuit 19 by the calling subscriber in spite of the receipt of the described signal, the impulses of these digits are recorded by the trunk recorder 25 without recording space pulses between the digits. As a consequence, the record made on the unsuccessful call is marked as being unsuccessful through the absence of the requisite number of recorded digits. Disabling of the trunk circuit 19 against transmitting space pulses to the recorder 25 is effected through operation of the verification failure relay 430 to open the operating circuit for the digit relay 550 at its contacts 431, thereby to render the identified digit relay non-responsive to further impulses received from the line relay 530.

It will also be noted that when the second verification test relay 500 restores to effect operation of the verification failure relay in the manner described above, it also opens its contacts 501 to interrupt the above-traced loop circuit extending by way of the trunk 20 to the switching equipment in the remote automatic exchange 8. As a consequence, the switching equipment initially seized over the trunk 20 in the exchange 8 is released and rendered avilable for use in handling other calls. In this regard, it will be noted that with the verification complete relay 520 in its restored position, the line relay 530 is rendered completely ineffective to repeat impulses over the trunk 20, so that the dialing of additional digits following an unsuccessful calling line verification test cannot result in the extension of the connection beyond the trunk circuit 19.

As indicated above, the cut-through relay 410 is deenergized and restores in response to operation of the verification failure relay 430. In releasing the cut-through relay 410 performs the functions described above, including that of opening its contacts 412 and 411 to interrupt the loop circuit extending to the connector 24 and thus deenergize the line relay 940 in the verification connector 24.

*Release of the verification switch train*

When the line relay 940 is deenergized in the manner explained above, either in response to operation of the verification complete relay 520, or in response to release of the cut-through relay 410, or both, it opens its contacts 942 to deenergize the hold relay 930. The latter relay, upon restoring, opens its contacts 933 to deenergize the digit relay 920 which also restores. At its contacts 931, the relay 930 completes the prepared operating circuit for the release or "Z" magnet 950, this circuit extending from ground by way of the contacts 931, the parallel connected off-normal springs 992 and 981, and the winding of the magnet 950 to battery. When energized in this circuit, the magnet 950 immediately closes its associated contact springs 994 to apply ground potential to the sleeve conductor of the seizure trunk individual to the vertification connector 24, thereby to prevent this connector from being seized by a verification selector during the release period thereof. Also in response to operation of the release magnet 950, the switching mechanism embodied in the verification connector is restored to normal in the usual manner. When the switch mechanism release operation is fully completed, the off-normal springs 981, 982, 983, 991, 992, 993 and 995 are restored to their respective normal positions in the customary manner. Incident to this operation, these off-normal springs 981 and 992 are opened to deenergize the release magnet 950. When this release magnet is deenergized, it opens its contacts 994 to disconnect the sleeve lead of the seizure trunk individual to the connector 24 from ground, and thus mark this connector as idle. Following the release of the magnet 950, the connector 24 is fully restored to normal.

As indicated in the preceding paragraph, the operating circuit for the release magnet 950 extends through the off-normal springs 981 which are closed in response to off-normal movement of the switching mechanism in the connector 24 in the "Y" direction and through the parallel connected off-normal springs 992 which are closed in response to off-normal movement of the switch mechanism in the "X" direction. It will be understood, therefore, that the operating circuit for the release magnet 950 is prepared in response to any kind of off-normal movement of the switch mechanism embodied in the connector 24. Accordingly, this mechanism is restored to normal even though the verification train is released after a single digit has been repeated thereto from the trunk circuit 19. In other words, the switching mechanism of the verification connector cannot be left standing off-normal in response to abandonment of a call following seizure of this connector and partial dialing of the directory number assigned to the calling substation.

When ground potential is removed from the sleeve lead of the seizure trunk individual to the verification selector 23, in the manner explained above, the switch relay 850 of this selector is deenergized and restores. In releasing, the relay 850 closes its contacts 851 to complete the prepared circuit for energizing the release or "Z" magnet 840, this circuit extending from ground by way of the contacts 801a and 851, the parallel connected off-normal springs 843 and 883 and the winding of the magnet 840 to battery. When energized in this circuit, the release magnet 840 restores the switch mechanism of the selector 23 to normal in the customary manner. When energized, the magnet 840 also closes the contacts 892 to ground the sleeve lead of the seizure trunk individual to the selector 23 and thus mark this selector as busy during the release interval of the switching mechanism embodied therein. Incident to the release of this switching mechanism, the off-normal springs 841, 842, 843, 881, 883 and 884 are all restored to their normal settings. Opening of the off-normal springs 843 and 883 results in deenergization of the release magnet 840 in an obvious manner. When the magnet 840 is deenergized, the contacts 892 are opened to disconnect the sleeve lead of the seizure trunk individual to the selector 23 from ground and thus mark this selector as idle. Thus, the verification selector 23 is fully restored to normal. Following release of the verification selector 23, the entire verification switch train is restored to normal in readiness for further use.

*Operation of the preselector 22*

As will be evident from the above explanation, when the trunk circuit 19 is operatively associated with the verification selector 23, the cut-through relay 410 is operated to disable the trunk hunting facilities of the preselector 22. More specifically, with the cut-through relay 410 operated, the contacts 415 of this relay are opened so that the circuit for energizing the motor magnet 409 of the preselector switch 400 cannot be energized. During any period when the cut-through relay 410 is deenergized, however, the wipers of the switch 400 are automatically advanced each time ground potential is applied to the sleeve lead terminated at a contact of the contact set 407 with which the wiper 403 of this switch is standing in engagement. Thus when ground potential is applied to the wiper 403, the magnet 409 is energized in a circuit which includes this wiper and the contacts 415 and 409a. When energized in this circuit, the magnet 409 advances the wipers 401 to 404, inclusive, one step and opens its contacts 409a to interrupt its own operating circuit. If the sleeve lead of the seizure trunk terminated at the next set of contacts in the banks of the switch 400 is also marked with ground potential indicating that the verification selector to which the trunk extends is busy, the operating circuit for the magnet 409 is recompleted in response to the release of this magnet and reclosure of its contacts 409a. Accordingly, the magnet 409 is reoperated to advance the wipers of the switch 400 another step. The described step-by-step operation of the switch 400 continues until such time as the wiper 403 is operated to engage a contact terminating the sleeve lead of a seizure trunk extending to an idle one of the verification selectors. Moreover, the wipers of the switch 400 remain in the position to which they are advanced until such time as the verification selector corresponding to the setting of the switch 400 may be taken into use through another trunk circuit. It will thus be understood that the switch 400 of the preselector 22 may be operated intermittently to advance its wipers as the verification selectors to which this switch has access are taken into use from the various trunk circuits. Further, the wipers of the switch 400 are normally standing on contacts terminating the conductors of a seizure trunk extending to an idle verification selector.

*Recording dial impulses in the trunk recorder 25*

As indicated above, each impulse of each digit in the directory number assigned to the calling substation A is recorded in the trunk recorder 25. Further, space pulses are automatically recorded in this recorder to separate the various digits. Moreover, if the calling line verification test is successful when performed in the manner just explained, the digits of the directory number of the called substation C are also recorded in the trunk recorder next following the recording of the digits making up the directory number assigned to the calling substation.

Referring now more particularly to the manner in which these recording operations are performed, it is pointed out by way of example that each time the line relay 530 restores at the beginning of the open circuit period of each impulse of the first digit dialed into the trunk circuit 19, it closes its contacts 533 to complete a circuit for energizing the mark head 1201 of the recorder 25. This circuit may be traced as extending from ground by way of the contacts 533, 542, 715 and 743, the winding of the mark head 1201, the contacts 745 and the resistor 745a to battery. Each time this circuit is completed, the mark head makes a magnetic imprint upon the tape of the recorder 25 in the manner explained above.

Upon restoring at the beginning of the open circuit period of the first impulse of the first digit dialed into the trunk circuit 19, the line relay 530 also closes its contacts 532 to complete a circuit through the contacts 431 and 541 for energizing the digit relay 550. The latter relay in operating closes its contacts 552 to energize the pulse forming relay 560, and closes its contacts 555 to prepare a circuit for transmitting advance pulses to the advance magnet of the recorder 25. The relay 560, upon operating, closes its contacts 561 to energize the relay 600 in an obvious circuit and closes its contacts 563 to prepare a circuit for energizing the space head 1202 of the recorder 25. At its contacts 562, the relay 560 opens a point in an alternative path for transmitting advance pulses to the advance magnet 1205 of the recorder 25.

The relay 600, upon operating, closes its contacts 603 further to prepare the described alternative circuit for transmitting advance pulses to the advance magnet 1205 of the recorder 25. At its contacts 604 and 605, the relay 600 opens points in certain incomplete relay energizing circuits described below. At its contacts 601, the relay 600 opens a point in one of the energizing circuits for the relay 560. At its contact 602, the relay 600 prepares an alternative circuit for energizing itself.

From the above explanation, it will be understood that the three relays 550, 560 and 600 are operated in sequence at the beginning of each digit dialed into the trunk circuit 19 to identify the calling substation, remain operated throughout the digit due to the slow-to-release characteristics thereof, and restore in the order named shortly following the end of each digit during the inter-digit pause separating succeeding digits. With the digit relay 550 operated, the operating circuit for the advance magnet 1205 of the recorder 25 is completed in response to reoperation of the line relay 530 at the end of the open circuit period of each impulse. This circuit extends from ground by way of the contacts 531, 555 and 713, the winding of the advance magnet 1205 and the resistor 1205a to battery. Each time the advance magnet is energized in this circuit it advances the tape of the recorder 25 one step, thereby to position the tape for the recordation of a succeeding mark or space pulse thereon.

From the above explanation, it will be understood that as the impulses of the first digit of the directory number assigned to the calling substantion A are dialed into the trunk circuit 19, the mark head 1201 and the advance magnet 1205 are alternately energized in response to release and reoperation of the line relay 530. Thus, a series of marked pulses corresponding in number to the number of impulses in the digit are imprinted on the tape of the recorder 25 in spaced positions along one edge thereof. During the inter-digit pause separating the first and second digits of the directory number assigned to the calling substation, the three relays 550, 560 and 600 sequentially restore in the order named. The relay 550, in releasing prior to release of the relay 560, closes its contacts 553 to complete the prepared circuit for energizing the space head 1202 of the recorder 25, this circuit extending from ground by way of the contacts 553, 563, 623 and 749, the winding of the space head 1202, the contacts 747 and the resistor 747a to battery. When energized in this circuit, the space head 1202 produces a magnetic impression along that edge of the tape in the recorder 25 opposite the edge along which the marked pulses produced by the mark head 1201 are impressed upon the tape. Shortly following the completion of the described circuit for energizing the space head 1202 in the recorder 25, this circuit is interrupted at the contacts 563 of the relay 560 upon release of this relay. In releasing, the relay 560 also opens its contacts 561 to deenergize the relay 600 and closes its contacts 562 to complete the prepared alternative circuit for energizing the advance magnet 1205 of the recorder 25. This alternative circuit extends from ground by way of contacts 562 and 603, the winding of the advance magnet 1205 and the resistor 1205a to battery. When energized in this circuit, the advance magnet 1205 functions to advance the recorder tape in the manner explained above. Shortly following the energization of the advance magnet 1205, in response to release of the relay 560, the relay 600 restores and opens its contacts 603 to interrupt the described alternative circuit for energizing the advance magnet.

The manner in which the remaining three digits of the directory number assigned to the calling substation are recorded on the tape of the recorder 25 is exactly the same as explained above, it being pointed out that the pulses representative of each digit are separated on the record tape through the recording of a space pulse between the last pulse of each digit and the first pulse of the next succeeding digit. Moreover, if the calling line verification test is successfully completed in the manner explained above to effect operation of the verification complete relay 520, the digits of the directory number assigned to the called substation C are also recorded on the tape of the recorder 25 following the digits of the directory number assigned to the calling substation A in the exact manner explained above. On the other hand, if the calling line verification test fails, such that the verification failure relay 430 is operated instead of the verification complete relay 520 at the end of the test, the operating circuit for the digit relay 550 is locked open at the contacts 431 of the operated verification failure relay 430 to prevent the sequential operation of the three relays 550, 560 and 600 at the start of any addition digits which may be dialed at the calling substation following the dialing of those digits supposedly representing the identity of the calling substation. As a consequence, the impulses of any additional digits which may be dialed at the calling substation following operation of the verification failure relay 430 are recorded as a continuous string of pulses, without spacing therebetween, on the record tape of the recorder 25.

Assuming that the verification test is successful, the impulses of the digits making up the directory number assigned to the called substation C are repeated over the trunk 20 to the automatic switching equipment in the exchange 8 concurrently with the recording thereof on the record tape of the trunk recorder 25. More specifically, the digit relay 550 reoperates at the beginning of the open circuit period of the first impulse in each such digit and remains operated for the duration of the digit in the exact manner explained above. This relay in operating closes a direct metallic path between the conductors 20a and 20b of the trunk 20 which includes the pulsing contacts 534 of the line relay 530. More particularly, the pulse repeating path extends from the trunk conductor 20a by way of the contacts 528, the pulsing contacts 534, and the contacts 526, 551 and 711 to the trunk conductor 20b. Transmission of the repeated dial impulses over this path and the trunk 20 to the automatic exchange 8 results in extension of the connection through the switching equipment of this exchange to the called line 21 in the manner explained above. After the call is thus routed to the called subscribers line nothing further occurs in the trunk circuit 19 until the call is answered at the called substation C, assuming that the call is successfully completed.

*Recording duration of call pulses in the recorder 25*

If the call is successfully completed, the called party answer relay of the connector occupied with the call in the remote automatic exchange 8 is energized and operates when the call is answered at the called substation C. This relay, in operating, reverses the direction of current flow over the trunk conductors of the trunk 20 and hence, through the upper winding of the electro-polar relay 700. In this regard, it will be understood that the upper winding of the relay 700 is reinserted in the loop circuit extending over the trunk 20 to the remote exchange 8 in response to release of the digit relay 550 at the end of each digit of the directory number assigned to the called substation C. Accordingly, the upper winding of the relay 700 is included in the described loop circuit when the call is answered at the called substation.

In response to the described reversal in the direction of current flow through its upper winding, the relay 700 operates and closes its make-before-break contacts 703 to complete a circuit for fully energizing its lower winding, this circuit extending from ground by way of contacts 633, 643, 634 and 703, and the lower winding of the relay 700 to battery. When its lower winding is fully energized in this circuit, the relay 700 is rendered non-responsive to further reversals in the direction of current flow through its upper winding. After completing the described holding circuit for itself, the relay 700 opens its contacts 702 to interrupt the initially completed circuit for energizing its lower winding through the resistor 654. At its contacts 705, the relay 700 opens the initially completed operating circuit for the dismiss relay 720. Concurrently with the last-described operation, the relay 700 closes its contacts 704 to complete an alternative circuit for energizing the relay 720, this circuit extending from ground by way of the contacts 543, the master ground conductor 548, the contacts 554 and 704 and the winding of the relay 720 to battery. Completion of this circuit prevents the dismiss relay 720 from releasing in response to operation of the supervisory relay 700. At its contacts 706, the relay 700 prepares the incomplete operating circuit for the clock relay 640. At its contacts 701 the relay 700 completes an obvious circuit for energizing the supervisory slave relay 710.

The supervisory slave relay 710, upon operating, opens its contacts 711 further to interrupt the above-described path for bridging the pulsing contacts 534 of the line relay 530 directly across the conductors 20a and 20b of the trunk 20. At its contacts 713, the relay 710 opens a point in the above-described circuit for transmitting advance pulses to the advance magnet 1205 of the recorder 25. At its contacts 712, the relay 710 completes a parallel locking circuit for the dismiss relay 720, this circuit extending from ground by way of the contacts 633, 643, 712 and 704, and the winding of the relay 720 to battery. At its contacts 715, the relay 710 opens the above-traced circuit for transmitting mark pulses to the mark head 1201 of the recorder 25 under the control of the line relay 530. At its contacts 714, the relay 710 completes a circuit for periodically energizing the mark head 1201 of the recorder 25 under the control of the pulse forming relays 1300 and 1310. At its contacts 718, the relay 710 completes a circuit for periodically energizing the common pulse repeater relay 650 under the control of the pulse forming relays 1300 and 1310. The remaining circuit switching operations effected in response to operation of the supervisory slave relay 710 are without effect at this time.

Following operation of the supervisory slave relay 710, the trunk circuit 19 is conditioned to repeat mark pulses and tape advance pulses to the trunk recorder 25 from the mark and advance pulse forming relays 1300 and 1310. In this regard, it will be understood from the following explanation that the two relays 1300 and 1310 apply mark pulses of ground potential to the mark pulse lead 1304 at the rate of one pulse a minute and that each mark pulse applied to the conductor 1304 is followed by the application of an advance pulse also of ground potential to the advance pulse lead 1305. Each mark pulse impressed on the lead 1304 results in energization of the mark head 1201 over a circuit which includes the lead 1304, the contacts 644, 652, 714 and 743, the winding of the mark head 1201, the contacts 745 and resistor 745a to battery.

Each time an advance pulse appears on the lead 1305 following a mark pulse on the lead 1304, the common pulse repeater relay 650 is energized in a circuit which extends from the grounded lead 1305, the contacts 718, 636 and 647, and the winding of the relay 650 to battery. When energized in this circuit, the relay 650 opens its contacts 652 to interrupt the circuit traced immediately above for energizing the mark head 1201 of the recorder 25. At its contacts 653, the relay 650 opens one of the available circuits for energizing the space head 1202 of the recorder 25. At its contacts 651, the relay 650 completes an obvious circuit for energizing the advance magnet 1205. This circuit is interrupted in response to release of the relay 650 which occurs when the advance pulse impressed upon the lead 1305 is ended through operation of the relay 1310 in the manner explained below.

*Recording date and time information in the recorder 25*

From the above explanation it will be understood that as the connection is held completed between the calling substation A and the called substation C, duration of call pulses are recorded on the record tape of the trunk recorder 25 by virtue of periodic energization of the mark head 1201. Release of the connection at the called substation C has no effect on the setting of the trunk circuit 19. When, however, the connection is released at the calling substation A, the loop circuit extending from the calling line 10 through the link 12 to the trunk circuit 19 is interrupted, with the result that the line relay 530 is deenergized and restores. In releasing, the line relay 530 opens its contacts 531 to deenergize the slow-to-release hold relay 540 and closes its contacts 532 to effect sequential reoperation of the relays 550, 560 and 600 in the manner explained above. At its contacts 534, the line relay 530 opens the loop circuit extending by way of the trunk 20 to the remote exchange 8, thereby to effect release of the switching equipment occupied by the call in this exchange in the usual manner.

The hold relay 540, upon restoring, opens its contacts 541 to deenergize the digit relay 550. At its contacts 542, the relay 540 opens another point in the initially traced path for transmitting mark pulses to the recorder 25 under the control of the line relay 530. At its contacts 544 the relay 540 opens a point in the incomplete operating circuit for the cut-through relay 410. At its contacts 545, the relay 540 opens a point in the initially completed operating circuit for the dismiss relay 720. At its contacts 546, the relay 540 prepares a path for applying start ground potential to the start lead 761 extending to the scanning circuit 28. At its contacts 547, the relay 540 prepares the operating circuit for the clock relay 640.

At its contacts 543, the hold relay 540, upon restoring, disconnects the master ground conductor 548 from ground and thus removes holding ground potential from the sleeve lead of the seizure trunk 19a. As a result, the link 12 and the line circuit 11 occupied with the call are released in the usual manner. Also incident to the removal of ground potential from the master ground conductor 548, the vertification complete relay 520 is deenergized and restores. Release of this relay is without effect at this time.

When the digit relay 550 restores shortly following release of the hold relay 540, it opens its contacts 552 to deenergize the space pulse forming relay 560 and closes is contact 553 to transmit a space pulse to the space head 1202 of the trunk recorder 25 over the circuit traced above. Thus a space pulse is recorded on the record tape of the trunk recorder 25 to indicate that the call timing operation has been completed. At its contacts 555, he relay 550 opens another point in the initially completed path for transmitting advance pulses to the advance magnet 1205 of the trunk recorder. At its contacts 554, the relay 550 completes an alternative path for applying ground potential to the master ground conduction 548, this path extending from ground by way of the contacts 633, 643, 712 and 554 to the conductor 548. The reapplication of ground potential to the conductor 548 and through the upper winding of the sleeve test relay 510 to the sleeve lead 19s of the seizure trunk 19a serves to guard the trunk circuit 19 against seizure through any of the selectors provided in the exchange 7. Specifically, the trunk circuit 19 is guarded against seizure following the end of the call until such time as time and date information pertaining to the call have been transmitted to the trunk recorder 25 from the clock and calendar circuit 27 in the manner explained below. Restoration of ground potential to the master ground conductor 548 also results in sequential reoperation of the second verification test relay 500 and the sleeve test relay 510, these relays being reenergized over their initially traced operating circuits. However, reoperation of these two relays is without effect.

The relay 560, upon restoring, opens its contacts 561 to deenergize the relay 600 and recloses its contacts 562 to transmit an advance pulse to the advance magnet 1205 in the manner previously explained. At its contacts 563, the relay 560 opens the circuit for energizing the space head 1202 of the recorder 25, thereby to terminate the space pulse. The relay 600, upon restoring, closes its contacts 601 to prepare one of the operating circuits for the relay 560, and opens its contacts 602 further to interrupt one of the available locking circuits for the first end of ticket relay 610. At its contacts 603, the relay 600 opens the operating circuit for the advance magnet 1205 in the recorder 25. At its contacts 605, the relay 600 further prepares the operating circuit for the clock relay 640. At its contacts 604, the relay 600 completes the prepared path for impressing start ground potential upon the start conductor 761 extending to the scanning circuit 28, this path extending from ground by way of the contacts 744a, 546, 716 and 604 to the conductor 761. Following release of the pulse forming relay 600, the trunk circuit is conditioned to transmit to the recorder 25 a total of seven groups of mark pulses representative of the month, day, hour and minute the call was terminated.

The described groups of pulses are supplied to the recorder 25 through the trunk circuit 19 in sequence through operation of the scanning circuit 28 which functions in the manner explained below. More specifically, when ground potential is applied to the scanning circuit start conductor 761 in the manner just explained, operation of this circuit is initiated. In this regard, it will be understood that the start conductor 761 is multipled to each of the trunk circuits in the exchange 7 corresponding in purpose to the trunk circuit 19 so that an operating cycle of the scanning circuit may be in progress at the time the particular trunk circuit 19 is conditioned to receive time and date information from the clock and calendar circuit 27 through the scanning circuit 28. In any event, pulses representative of the date and time the call was terminated are not released to the trunk circuit 19 and from this circuit to the recorder 25 until the operating cycle of the scanning circuit which may be in progress at the time the relay 600 restores in the trunk circuit 19 is ended and a new operating cycle of this circuit is started. The purpose of thus releasing the groups of time and date pulses from the clock and calendar circuit 27 to the trunk circuit 19 in a predetermined order is to insure that these digits will be recorded on the tape of the recorder 25 in the correct order for printing during operation of the playback and printing facilities in the manner described below. In this regard, it will be understood from the following explanation that the seven groups of mark pulses released from the scanning circuit 28 to the trunk circuit 19 are respectively representative of tens hours, unit hours, tens minutes, unit minutes, the month of the year in which the call was made, tens days, and units days, and that these groups are released in the order named during an operating cycle of the scanning circuit 28. It will also be understood that the start of each operating cycle of the scanning circuit 28 is marked by the application of ground pulse to the pickup lead 762, that the end of each operating cycle of the scanning circuit 28 is marked by the removal of ground potential from the call-complete lead 764, that the pulses of each group of pulses representing time and date information released to the trunk circuit 19 from the clock and calendar circuit 27 through the scanning circuit 28 appear as ground pulses on the mark pulse conductor 765, that the transmission of each mark pulse over the conductor 765 is followed by the transmission of an advance pulse over the advance pulse lead 763, and that the pulses making up each group of pulses representing time and date information are followed by the application of a space pulse to the space pulse lead 766.

When a ground pulse is applied to the pickup lead 762 by the scanning circuit 28 next following release of the relay 600, the slow-to-release clock relay 640 is energized in a circuit which includes this pickup lead and the contacts 706, 605, 547 and 649. When energized in this circuit, the relay 640 first closes its contacts 649a to complete a locking circuit for itself which includes the grounded hold lead 764 extending to the scanning circuit 28. After completing this locking circuit, the relay 640 opens its contacts 649 to interrupt its own operating circuit. At its contacts 642, the relay 640 completes an obvious circuit for energizing the end-of-call relay 630. At its contacts 643a, the relay 640 completes an alternative path through the contacts 712 for applying ground potential to the master ground conductor 548 and in so doing completes an alternative holding circuit for the dismiss relay 720. Thereafter, the relay 640 opens its contacts 643 to interrupt the above-described path for applying ground potential to the conductor 548 and the above-described locking circuit for the dismiss relay 720. At its contacts 644, the relay 640 opens the above-described circuit for transmitting mark pulses to the mark head 1201 of the recorder from the time pulse forming relays 1300 and 1310. At its contacts 645, the relay 640 completes the prepared circuit for transmitting mark pulses to the mark head 1201 of the recorder from the scanning circuit 28. At its contacts 646, the relay 640 completes a circuit for transmitting space pulses appearing on space pulse lead 766 to the space pulse head 1202 of the recorder. At its contacts 647, the relay 640 opens the above-described circuit for energizing the common pulse repeater 650 in accordance with advance pulses impressed upon the lead 1305 by the pulse forming relays 1300 and 1310. At its contacts 648, the relay 640 completes a circuit for energizing the common pulse repeater relay 650 each time the scanning circuit 28 operates to impress an advance pulse upon the advance pulse lead 763.

The end-of-call relay 630, upon operating, closes its contacts 631 to prepare one of the operating circuits for the first end-of-ticket relay 610. At its contacts 632, the relay 630 completes a parallel path for applying ground potential to the master ground conductor 548 and in so doing completes an obvious parallel holding circuit for the dismiss relay 720. At its contacts 634 and 635, the relay 630 transfers the locking circuit for the supervisory relay 700 from ground at the contact 643a of the clock relay 640 to the grounded call-complete lead 764 extending to the scanning circuit 28. At its contacts 636, the relay 630 opens another point in the above-traced circuit for controlling the operation of the common pulse repeater relay 650 in accordance with recorder advance pulses applied to the conductor 1305 by the pulse forming relays 1300 and 1310.

Following operation of the clock relay 640 and the end-of-call relay 630 to perform the functions described above, the trunk circuit 19 is conditioned to transmit the digits received from the scanning circuit 28 to the trunk recorder 25. More specifically, each mark pulse impressed upon the mark pulse lead 765 in the scanning circuit 28 serves to energize the mark head 1201 of the recorder over a circuit which includes the lead 765 and the contacts 645, 652, 714, 743 and 745. As indicated, each mark pulse is followed by an advance pulse on the lead 763 which serves to energize the common pulse repeater relay 650 in a circuit which includes this lead and the contacts 648. Each time the relay 650 operates in response to the application of a ground pulse to the lead 763, it closes its contacts 651 to energize the advance magnet 1205 in an obvious circuit. At the end of each group of impulses repeated to the trunk circuit 19 from the scanning circuit 28 and more particularly following the transmission of the last advance pulse of the pulse group to the trunk circuit, the scanning circuit 28 functions to impress a space pulse upon the space pulse lead 766 and thus energize the space head 1202 of the recorder over a circuit which includes the lead 766 and the contacts 653, 646, 749 and 747. Each space pulse thus transmitted to the recorder 25 is, of course, followed by an advance pulse on the lead 763 which is repeated to the advance magnet 1205 through operation of the common pulse repeater relay 650. Thus, the last pulse transmitted from the scanning circuit 28 to the trunk circuit 19 is an advance pulse which is repeated to the advance magnet 1205 of the recorder 25 by the pulse repeater relay 650.

*Recording end-of-call signal and release of trunk circuit 19*

After all of the time and date digits have been registered in the trunk recorder 25 and a final advance pulse transmitted to the advance pulse magnet 1205, the scanning circuit 28 operates to disconnect the call-complete lead 764 from ground for an interval sufficiently long to effect the release of the relays 700 and 640 in the order named. The relay 700, upon restoring, opens its contacts 701 to deenergize the supervisory slave relay 710. At its contacts 704, the relay 700 deenergizes the dismiss relay 720. The resulting release of the two relays 710 and 720 is without effect.

The clock relay 640, upon restoring, opens its contacts 642 to interrupt the operating circuit for the end-of-call relay 630. The latter relay is very slow to release due to the effect of the shunting path comprising the resistor 637 and series condenser 638. Accordingly, the relay 640 in closing its contacts 641 completes a circuit through the contacts 631 for energizing the first end-of-ticket relay 610. At its contacts 643a, the relay 640 opens one path through which the master ground conductor 548 is connected to ground, thereby to render final release of the trunk circuit 19 controllable by the end-of-call relay 630. The remaining circuit switching operation effected in response to release of the clock relay 640 is without effect.

Upon operating, the relay 610 opens its contacts 611 to interrupt the operating circuit for the slow-to-release relay 620. At its contacts 612 and 613, the relay 610 completes circuits for simultaneously energizing the mark and space heads 1201 and 1202 of the recorder 25, thereby to record an end-of-call signal on the record tape. Specifically, the circuit for energizing the mark head 1201 extends from ground by way of the contacts 641, 631, 612, 621, 743, the winding of the head 1201, the contacts 745 and the resistor 745a to battery. The circuit for energizing the space head 1202 of the recorder 25 extends from ground by way of the contacts 641, 631, 613, 623, 749, the winding of the space head 1202, the contacts 747 and the resistor 747a to battery. These circuits are both simultaneously broken to terminate the end-of-call signal in response to release of the second end-of-ticket relay 620 which occurs shortly following operation of the relay 610. Specifically, the described circuit for energizing the mark head 1201 is broken at the contacts 621, and the circuit for energizing the space head 1202 is simultaneously broken at the contacts 623 when the relay 620 restores.

In releasing, the relay 620 also closes its contacts 622 to complete an alternative operating circuit for the space pulse forming relay 560, this circuit extending from ground by way of the contacts 641, 631, 612, 622 and 601 and the winding of the relay 560 to battery. When energized in this circuit, the relay 560 reoperates and closes its contacts 561 to again energize the relay 600. At its contacts 562, the relay 560 opens a point in the previously-traced circuit for transmitting advance pulses to the advance magnet 1205 of the recorder. At its contacts 563, the relay 560 completes the prepared locking circuit for the relay 610, this circuit extending from ground by way of the contacts 553, 563 and 613 and the winding of the relay 610 to battery.

The relay 600, upon reoperating, opens its contacts 601 to interrupt the above-traced alternative operating circuit for the relay 560 and closes its contacts 603 to reprepare the circuit for transmitting advance pulses to the advance magnet 1205 of the recorder. At its contacts 602, the relay 600 completes a locking circuit for itself, this circuit extending from the grounded left terminal of the relay 610 by way of the contacts 612, 622 and 602, the interrupter springs 1208 in the recorder 25, and the winding of the relay 600 to battery. Shortly following operation of the relay 600, the relay 560 releases and closes its contacts 562 to transmit a recorder advance pulse to the advance magnet 1205. At its contacts 561, the relay 560 also opens the operating circuit for the relay 600. However, the latter relay does not release until the advance magnet 1205 has fully advanced the record tape one step and opened the interrupter springs 1208. When these springs are opened, the relay 600 releases after an interval and opens its contacts 603 to terminate the advance pulse. In releasing, the relay 600 also opens its contacts 602 to interrupt the described locking circuit for itself and recloses its contacts 601 to recomplete the above-traced alternative operating circuit for the relay 560.

From the above explanation, it will be understood that the two relays 560 and 600 continue to operate and release in sequence so long as the first end-of-ticket relay 610 remains operated. During each operating cycle of these two relays, an advance pulse is transmitted to the advance magnet 1205 to advance the tape in the recorder 25 one step. The time interval during which advance pulses are thus successively transmitted to the advance magnet 1205 is measured by the release time of the end-of-call relay 630. Preferably, this release time is such that four or five advance pulses are transmitted to the advance magnet 1205 following the end-of-call signal. The purpose of thus advancing the tape a short distance between calls is that of providing a time interval in the tape playback operation, during which the playback and printing control facilities may be normalized and prepared to receive and correctly respond to the recorded pulses representative of data on the next succeeding call handled by the trunk circuit 19.

After four or five advance pulses have been transmitted to the recorder 25 through interaction of the two relays 560 and 600 in the manner just explained, the end-of-call relay 630 restores and opens its contacts 631 to open a common point in the above-traced circuits for energizing the relays 560 and 610. At its contacts 632, the relay 630 disconnects the master ground lead 548 from ground and in so doing removes ground potential from the sleeve conductor of the seizure trunk 19a, thereby to mark the trunk circuit 19 as idle in the bank contacts of the selectors having access thereto. The remaining contact switching operations performed incident to the release of the relay 630 have no effect at this time. If the relay 600 occupies its restored position at the time the relay 630 releases, the relay 610 is immediately deenergized and restores. On the other hand, if the two relays 560 and 600 are in the process of transmitting the final advance pulse to the advance magnet 1205 of the recorder, such that the relay 560 is operated, the relay 610 is held operated over its locking circuit until the advance pulse is completed, i.e. until the relay 560 restores. In any event, the relay 610 is deenergized and restores in response to release of the two relays 600 and 560, and the relay 600 is released in response to release of the relay 560. Following release of the relays 560, 610 and 600, the trunk circuit 19 is fully restored to normal in readiness to handle another interoffice call.

Data on additional calls successfully completed by way of the trunk circuit 19 is recorded in the recorder 25 in the exact manner explained above. In this regard, it will be understood from the preceding description that the tape of the recorder 25 has a sufficiently large capacity to record complete data on a large number of calls handled by the trunk circuit 19. This recorder, however, has no predetermined call recording capacity since the amount of tape length used up in recording the data pertaining to any particular call depends entirely upon whether the call was successfully completed and the length or duration of the call.

*Forced release of connection*

In the event the recording caacity of the tape in the recorder 25 is nearly used up in the course of recording the above-described data pertaining to a call being handled by the trunk circuit 19, this condition is indicated to the trunk circuit 19 through closure of the foil contacts 1206 in the recorder. When these contacts are closed, a circuit including the contacts 731 and the resistor 738 is completed for energizing the first foil relay 730. In operating, the relay 730 first closes it contacts 732 to complete an obvious locking circuit for itself and then opens its contacts 731 to interrupt its own operating circuit. At its contacts 733, the relay 730 prepares a locking circuit for the second foil relay 750. At its contacts 734, the relay 730 prepares a path for impressing ground potential on the sleeve conductor of the seizure trunk 19a after the trunk circuit 19 is released from the calling substation. At its contacts 735, the relay 730 opens a point in the path for impressing ground potential upon the foil lead 773 extending to the playback control circuit 30. At its contacts 736, the relay 730 prepares a path for impressing ground potential upon the emergency start lead 30a when the trunk circuit 19 is released at the end of the call in progress or is forcibly released in the manner explained below. At its contacts 737, the relay 730 prepares a path for impressing battery potential upon the lead 771 extending to the playback control circuit 30, thereby to mark the trunk circuit 19 and associated recorder 25 in the bank contacts of the trunk circuit preselecting switch of the playback control circuit as the trunk circuit and recorder which should be immediately associated with the playback and printing facilities.

Operation of the first foil relay 730 in the manner just explained does not interrupt the normal operation of the trunk circuit 19 in its performance of the functions described above with reference to a normal call. All operation of the relay 730 signifies is that the trunk circuit 19 and recorder 25 should be associated with the playback and printing facilities to clear the recorder of the data recorded therein immediately after the call in progress is ended. This is accomplished in the manner explained below. Should, however, the call in progress persist for a substantial interval of time after the first foil relay 730 is operated, continued tape advancement resulting from continued transmission of time and advance pulses to the recorder ultimately results in closure of the second foil contacts 1207. When these contacts are closed, an obvious circuit is completed for energizing the second foil relay 750. In operating, the relay 750 opens its contacts 751 to interrupt the previously-traced loop circuit over which the line relay 530 is being held energized from the calling substation. At its contacts 752, the relay 750 prepares a path for short circuiting the winding of the first foil relay 730. At its contacts 753, the relay 750 closes an obvious locking circuit for itself. At its contacts 754, the relay 750 prepares the path for impressing ground potential upon the lead 773 extending to the playback control circuit 30.

When the line relay 530 is forcibly deenergized in the manner just explained, it initiates the release of the trunk circuit 19 and the switch train occupied with the call in the exchange 7 as well as the switch train occupied with the call in the remote exchange 8 in the exact manner explained above. In this regard it will be understood from the following description of the playback and printing operations that even after the second foil contacts 1207 are closed in the recorder 25, sufficient unused tape remains in the recorder to permit the recording of the time and date information on the call in progress followed by the end-of-call signal. Incident to the release of the trunk circuit 19, in response to operation of the second foil relay 750, the dismiss relay 720 restores and completes a path through the contacts 722 and 736 for impressing ground potential upon the emergency start lead 30a extending to the playback control circuit 30. At its contacts 723, the relay 720 completes a path through the contacts 737 for impressing battery potential upon the marking lead 771 extending to the emergency marking set of contacts in the trunk circuit selecting switch of the playback control circuit 30.

From the preceding explanation, it will be understood that if the recording capacity of the tape in the trunk recorder 25 is used up while a call being handled by the trunk circuit 19 is in progress, either the first foil relay 730 is operated, or this relay and the second foil relay 750 are operated when the trunk circuit 19 is released. With the relay 730 operated, the playback and printing facilities are automatically associated with the trunk circuit 19 and trunk recorder 25 immediately after these facilities become available. Moreover, with the relay 730 operated a path is completed through the contacts 734 and 554 for impressing ground potential upon the sleeve conductor 19s of the seizure trunk 19a, thereby to guard the trunk circuit 19 against seizure through one of the selectors in the exchange 7. The manner in which the playback operation is carried out is explained more fully below.

*Release of trunk circuit on unsuccessful calls*

As will be evident from the preceding explanation, several situations may occur where a connection is extended to the trunk circuit 19 but the desired connection is not actually obtained by the calling subscriber. Thus, if the verification test is a failure, such that the verification failure relay 430 is operated at the conclusion of this test, the calling subscriber is prevented from obtaining the desired connection. Again, the called substation may not be attended at the time the call is initiated by the calling subscriber, in which case, the calling subscriber will abandon the call without the supervisory relay 700 having been operated. A further possibility is that the calling subscriber may abandon the call voluntarily at any point in the dialing operation which follows seizure of the trunk circuit 19.

In any one of the cases mentioned above, the trunk circuit 19, the verification switch train and the switch train preceding the trunk circuit are all automatically released when the calling subscriber abandons the call. Also, in any one of the cases mentioned, no duration of call impulses are transmitted to the recorder and no pulses representative of the time and date of the call are transmitted to the recorder. However, an end-of-call signal followed by a string of advance pulses is transmitted to the recorder. Thus in any one of the cases mentioned above, the relays 700 and 710 are not operated at the time the line relay 530 is deenergized to initiate release of the trunk circuit and the other switches involved in the connection. The relays 540, 620 and 720, and possibly the verification failure relay 430, are, however, operated in the trunk circuit 19. Accordingly, the line relay 530, upon releasing, opens its contacts 531 to deenergize the hold relay 540. The latter relay, upon releasing, closes its contacts 546 to complete an alternative circuit for energizing the first end-of-ticket relay 610. This circuit extends from ground by way of the contacts 744a, 546, 717 and 724, and the winding of the relay 610 to battery.

When energized in this alternative circuit, the relay 610 performs the functions described above, among which is that of deenergizing the slow-to-release relay 620 and that of preparing a circuit for energizing the pulse forming relay 560. In operating, the relay 610 also closes its contacts 612 and 613 to complete the previously-traced circuits for simultaneously transmitting mark and space pulses to the mark and space heads 1201 and 1202 of the recorder, thereby to record an end-of-call signal.

When the relay 620 restores following operation of the relay 610 it opens its contacts 621 and 623 to end the mark and space pulses and closes its contacts 622 to energize the pulse forming relay 560. The relay 560, upon operating, initiates the above-described cyclic interaction between itself and the relay 600 in the manner explained above, it being noted that an advance pulse is transmitted to the advance magnet 1205 of the recorder during each operating cycle of the two relays.

Cyclic interaction of the two relays 560 and 600 continues for an interval measured by the release time of the dismiss relay 720. In this regard, it will be noted that the operating circuit for the dismiss relay 720 is opened at the contacts 545 in response to release of the hold relay 540. With the trunk circuit 19 in the particular setting under consideration, the series connected resistor 671 and condenser 672 are bridged across the winding of the relay 720 through the contacts 705 so that this relay is rendered very slow to release. Accordingly, the two relays 560 and 600 are permitted to interact for an interval sufficient to transmit four or five advance pulses to the advance magnet 1205 of the recorder 25 before the dismiss relay 720 restores. When it does restore, the relay 720 opens its contacts 721 further to interrupt the operating circuit for the relay 620. At its contacts 724, the relay 720 opens a common point in the previously-traced alternative circuits for energizing the relays 610 and 560. Accordingly, the three relays 560, 600 and 610 are caused to release, if operated, in the exact manner explained above. Following the release of these relays, the trunk circuit 19 is fully restored to normal.

As far as the verification switch train which may be occupied with the unsuccessful call is concerned, it will be understood that release of the switches included in this train is effected in the manner explained above in response to the release of the line relay 530 to open its contacts 534. Release of the link, such for example as the link 12, occupied with the call in the exchange 7, is effected in response to release of the hold relay 540 to remove ground potential from the sleeve lead of the seizure trunk 19a at its contacts 543. Release of the switching equipment which may be occupied with the call in the remote exchange 8 is effected when the loop circuit extending by way of the trunk 20 to this exchange is interrupted in the trunk circuit 19 either through release of the line relay 530 or release of the second verification test relay 500.

*Trunk circuit operation during playback*

As indicated below, during normal operation of the playback and printing facilities, the trunk circuits and their associated trunk recorders are sequentially associated with these facilities through operation of the sequence switch embodied in the playback control circuit 30. When this sequence switch is stepped to the setting corresponding to the trunk circuit 19 during a normal operation cycle of the playback and printing facilities, the playback control circuit 30 first tests the trunk circuit 19 to determine whether this trunk circuit is busy or idle. If the trunk circuit is busy, ground potential is present on the sleeve lead 767, with the result that the sequence switch of the playback control circuit is automatically stepped to the setting corresponding to the next succeeding trunk circuit.

Assuming that the trunk circuit 19 is idle at the time it is selected by the sequence switch of the playback control circuit 30, the sleeve lead 767 is disconnected from ground and accordingly the playback control circuit is advised that the trunk circuit 19 is idle and may be operatively associated with the playback and printing facilities. In responding to this information, the playback control circuit 30 connects the clutch lead 774 to ground to complete a circuit through the resistor 1204a for energizing the clutch magnet 1204. Coincident with this operation, the playback control circuit 30 connects the sleeve lead 767 to ground to mark the seizure trunk 19a as busy in the bank contacts of the selectors having access thereto.

When the magnet 1204 is energized, it operates the associated clutch mechanism in the manner previously explained to start forward drive of the record tape in the trunk recorder 25 under the influence of the common drive facilities. This forward movement of the tape in the recorder 25 is quite rapid and soon results in momentary closure of the foil contacts 1206 to complete the above-traced operating circuit for the first foil relay 730. In operating, the relay 730 performs the circuit switching operations described above. More specifically, the relay 730 locks to ground through its make-before-break contacts 732 and closes its "X" contacts 737 to complete a path through the contacts 723 and the resistor 738 for impressing battery potential upon the lead 771 extending to the playback control circuit 30. At its contacts 736, the relay 730 connects the emergency start lead 30a to ground through the contacts 722, but this operation is without effect during a normal playback operation.

When negative battery potential is impressed upon the lead 771 in the manner just explained, certain relay operations occur in the playback control circuit 30 which immediately result in the application of ground potential to this lead in the playback control circuit. As a consequence, the winding of the relay 730 is short circuited through the contacts 737, 723 and 732, and this relay restores.

Shortly following release of the relay 730 in the manner just explained, the second foil contacts 1207 are momentarily closed to complete the prepared path through the contacts 735 for impressing ground potential upon the lead 773 extending to the playback control circuit 30. The remaining circuit switching operations resulting from operation of the second foil relay 750 are without effect. It will be noted that the second foil relay 750 is of the slow-to-release type, such that it remains operated for a short interval after the second foil contacts 1207 are opened in the recorder 25. Accordingly, ample time is provided to effect certain relay switching operations, described below, in the playback control circuit 30.

The playback control circuit 30 responds to the application of ground potential to the lead 773 by applying ground potential after a short interval to the lead 770 and thus completes the operating circuit for the switching relay 740. In operating, the relay 740 closes its contacts 741 to prepare an alternative path for short circuiting the winding of the first foil relay 730. At its contacts 743a, the relay 740 completes an obvious alternative operating circuit for the dismiss relay 720. At its contacts 741a and 742a, the relay 740 complete a circuit through the resistor 775 for energizing the erase head 1203 of the trunk recorder 25. At its contacts 743, 745, 747 and 749, the relay 740 disconnects the terminals of the mark and space heads 1201 and 1202 from the trunk circuit 19. At its contacts 742, 744, 746 and 748, the relay 740 completes circuits for transmitting the mark and space pulses recorded on the record tape of the recorder 25 and picked up by the mark and space heads 1201 and 1202 to the input terminals of the preamplifiers 31 and 32, respectively.

The dismiss relay 720, upon operating, closes its contacts 721 to complete the operating circuit for the second end-of-ticket relay 620. At its contacts 722, the relay 720 opens the above-traced path for connecting the emergency start lead 30a to ground in the trunk circuit 19. At its contacts 723, the relay 720 opens a second point in the above-described path for applying battery potential to the lead 771. At its contacts 724, the relay 720 prepares the previously-traced operating circuit for the first end-of-ticket relay 610.

The relay 620, upon operating, closes its contacts 621 and 623 to reprepare the previously-traced circuits for simultaneously energizing the mark and space heads 1201 and 1202 of the recorder to record an end-of-call signal. Following operation of the three relays 740, 720 and 620, the information recorded on the tape of the recorder 25 is played back to the playback and printing facilities in the manner explained below. In this regard, it will be understood that the three relays 740, 720 and 620 remain operated throughout the playback operation.

When the playback operation nears completion, the first foil contacts 1206 are momentarily closed to effect reoperation of the first foil relay 730. Shortly thereafter, the second foil contacts 1207 are momentarily closed to effect reoperation of the second foil relay 750. The latter relay, in operating, locks to ground through the contacts 753 and 733, and closes its contacts 752 to short circuit the winding of the first foil relay 730 through the contacts 741 and 732. The relay 730 now releases and closes its contacts 735 to transmit a ground pulse through the contacts 754 and over the lead 773 to the playback control circuit 30. In releasing, the relay 730 also opens its contacts 733 to deenergize the relay 750. As a result, the relay 750 restores shortly following restoration of the relay 730 and opens its contacts 754 to terminate the ground pulse on the lead 773. The playback control circuit 30 response to the ground pulse transmitted thereto over the lead 773 by removing ground potential from the clutch lead 774, thereby to deenergize the clutch magnet 1204 and stop the forward drive movement of the tape in the recorder 25. Substantially coincident with this operation, the playback control circuit disconnects the lead 770 from ground, thereby to deenergize the switching relay 740.

The relay 740, upon restoring, opens its contacts 741a and 742a to deenergize the erase head 1203, and opens its contacts 743a to interrupt the alternative operating circuit for the dismiss relay 720. At its contacts 744a, the relay 740 completes the previously-traced operating circuit for the first end-of-ticket relay 610.

The relay 610, upon operating, transmits an end-of-call signal to the recorder 25 and initiates cyclic operation of the two relays 560 and 600 to transmit a string of advance pulses to the advance magnet 1205 after the end-of-call signal is recorded on the record tape of the recorder 25, all in the manner previously explained. Here again, the period during which the two relays 560 and 600 continue to interact and transmit advance pulses to the recorder 25 is measured by the release time of the dismiss relay 720. Since the winding of this relay is at this time shunted by the resistance-capacitance path comprising the resistor 671 and he condenser 672, it is very slow to release. Accordingly, some four or five advance pulses are transmitted to the recorder 25 before the dismiss relay 720 restores. In releasing, the relay 720 opens its contacts 724 to deenergize the end-of-ticket relay 610 with the result that the cyclic operation of the two relays 560 and 600 is discontinued in the manner explained above. Following release of the relays 720, 620, 610, 600 and 560, the trunk circuit 19 is fully restored to normal. In this regard, it may be noted that guarding ground potential is removed from the sleeve lead 767 in the playback control circuit to mark the trunk circuit 19 as idle in the bank contacts of the selectors having access thereto coincident with deenergization of the switching relay 740.

As indicated above, if the record tape of the recorder 25 becomes nearly or completely filled while a call is in progress over a connection involving the trunk circuit 19, the first foil relay 730 is operated. It will also be recalled that the second foil relay 750 is operated to effect forced release of the connection in the event the recording capacity of the tape in the recorder 25 is completely used up. In either event, a path is completed through the contacts 722 and 736 for grounding the emergency start lead 30a extending to the playback control circuit 30 incident to the release of the trunk circuit 19 and more particularly in response to release of the dismiss relay 720. If the playback and printing facilities are not in use at the time the emergency start lead 30a is connected to ground, operation of the sequence switch in the playback control circuit 30 to hunt for and seize the trunk circuit 19 is immediately initiated. On the other hand, if the playback and printing facilities are engaged at the time the emergency start lead 30a is grounded in the trunk circuit 19, these facilities complete the playback and printing operation in progress, but immediately such operation is completed, the sequence switch of the playback control circuit 30 is directed to search for and seize the trunk circuit 19. With the emergency start lead 30a grounded, the trunk circuit testing facilities of the playback control circuit 30 are directed to test for the presence of battery potential upon the lead 771, rather than the absence of ground potential upon the sleeve lead 767. Once the trunk circuit 19 is found, the playback control circuit grounds the clutch sleeve 774 to energize the clutch magnet 1204 and thus initiate forward drive movement of the tape in the recorder 25 and grounds the lead 771 to short circuit the winding of the relay 730 and thus initiate sequential release of this relay and the relay 750. Forward movement of the tape in the recorder 25 continues until the foil contacts 1206 are again momentarily closed at which time the playback operation is initiated and continues to conclusion in the exact manner explained above.

TIME PULSE GENERATING CIRCUIT 26

As described above, the time pulse generating circuit 26 (Figs. 13 and 14) is associated with a selected one of the trunk recorders 25 in response to the receipt by its one-way trunk circuit 19 of answering supervisory signals from the called subscriber, thus indicating that the desired connection has been obtained. The time pulse generating circuit 26 provides the associated trunk recorder 25 with a series of pulses, each representative of one minute of elapsed time so that, when the circuit 26 is disconnected from the recorder 25 in response to the termination of the call, the magnetic tape 1601 in this recorder is provided with a series of mark pulses equal in number to the number of minutes the toll call endures.

The time pulse generating circuit 26 includes a mark pulse forming relay 1300 and an advance pulse forming relay 1310. The operating winding of the mark pulse forming relay 1300 is connected to the output of a time source 1440 which may be a conventional clock mechanism. At one minute intervals, the time source 1440 closes a pair of contacts to apply ground to the operating winding of the mark pulse forming relay 1300. This ground is also applied through a pair of normally closed contacts 1302 to the conductor 1304. As described above, the conductor 1304 is connected to the mark pulse head 1201 in the recorder 25 so that the application of ground from the time source 1440 to the conductor 1304 energizes the mark head 1201 to produce a local area of magnetization on the tape 1601 in the seized recorder 25.

The application of ground to the operating winding of the mark pulse forming relay 1300 operates this relay to open the contacts 1302 and to close a pair of contacts 1301. The opening of the contacts 1302 removes ground from the mark head 1201 in the associated trunk recorder 25 so that the recording current therethrough is interrupted. The closure of the contacts 1301 applies ground from the time source 1440 to the operating winding of the advance pulse forming relay 1310. Simultaneously therewith, the closure of the contacts 1301 also applies ground through a normally closed pair of contacts 1311 to the conductor 1305 which, as described in detail above, extends to the operating winding of the advance magnet 1205 in the associated trunk recorder 25. The application of ground through the contacts 1311 to the conductor 1305 energizes the advance magnet 1205 so that the magnetic tape 1601 in the seized recorder 25 is advanced a single step.

Following a time delay determined by the slow-to-operate characteristic of the relay 1310, this relay operates to open the contacts 1311. The opening of the contacts 1311 removes ground from the conductor 1305 so that the advance magnet 1205 in the associated recorder 25 is released, thereby to complete the single step advancement of this tape.

After a predetermined time, the time source 1440 removes ground from the operating winding of the relay 1300 and from the operating winding of the relay 1310 so that these relays release to open the contacts 1301 and close the contacts 1302 and 1311. The opening of the contacts 1301 conditions the advance pulse forming relay 1310 for another cycle of operation. The closure of the contacts 1302 and 1311 conditions the time pulse generating circuit 26 for sequentially applying ground to the conductors 1304 and 1305 to produce another cycle of operation wherein the mark head 1201 is energized and the advance magnet 1205 is thereafter energized to advance the magnetic tape 1601 in the associated trunk recorder 25 to the next recording position. A switch 1303 is provided to manually actuate the circuit 26 for purposes such as testing.

The time pulse generating circuit 26 is common to all of the one-way trunk circuits 19 which are located within a particular calling exchange, or located in a particular geographical location. In the event that a one-way trunk circuit 19 and trunk recorder 25 are associated with the time pulse generating circuit 26, during the interval of time following the operation of the mark pulse forming relay 1300 and before the operation of the advance pulse forming relay 1310, the magnetic tape 1601 in the associated recorder 25 is merely advanced an additional step, and does not impair the accuracy of the timing of the toll call.

CLOCK AND CALENDAR CIRCUIT 27

The clock and calendar circuit 27 (Figs. 13 and 14), provides a continuous indication of the date and time of day, and this information is selectively supplied to one of the trunk recorders 25 by the scanning circuit 28 in response to the termination of a toll call so that, following the group of mark pulses representing the duration of the toll call, the magnetic tape 1601 is provided with seven groups of mark pulses representing the time and date at which this toll call is terminated. The clock and calendar circuit 27 is common to all of the one-way trunk circuits 19 and their associated trunk recorders 25 provided in a particular calling exchange. The circuit 27 also applies ground at a selected time to the playback control circuit to initiate a normal cycle of operation thereof.

More particularly, the clock and calendar circuit 27 includes a units minutes register 1480, a tens minutes register 1470, a units hours register 1460, a tens hours register 1450, a units days register 1380, a tens days register 1370 and a months register 1360, which are intermittently and sequentially operated under the control of the time source 1440. Each of these registers, with the exception of the months register 1360, manifests a single digit in the respective denominational columns of the date and time notations provided by the clock and calendar circuit 27. The months register 1360 provides an indication of the numerical designation of the month in which the toll call is completed, and includes means for not only manifesting the digit in the units denominational column, but also in the tens denominational column if the month is either October, November, or December, i.e., numerically designated as 10, 11 or 12, respectively.

More particularly, the units minutes register 1480 includes a steering relay 1430, a "minor" switch having a reset magnet 1487, a motor magnet 1488, and wipers 1484, 1485 and 1486, which engage contact banks 1481, 1482 and 1483 respectively. The ground pulses provided by the time source 1440, at one minute intervals, are applied through a pair of normally closed contacts 1431 to operate the motor magnet 1488. The operation of the motor magnet 1488 opens a pair of contacts 1489 and conditions the wipers 1484, 1485 and 1486 for moving a single step. Assuming that the wipers 1484, 1485 and 1486 are in engagement with the first contacts in the contact banks 1481, 1482 and 1483, the termination of the first ground pulse from the time source 1440 releases the motor magnet 1488 to advance the wipers 1484, 1485 and 1486 to the second contacts in the banks 1481, 1482 and 1483 which are representative of an elapsed time of one minute. This sequential operation and release of the motor magnet 1488 sequentially advances the wipers 1484, 1485 and 1486 to engage the successively arranged contacts forming the contact banks 1481, 1482 and 1483. In response to the receipt of the ninth ground pulse from the time source 1440, the wipers 1484, 1485 and 1486 are conditioned for advancement into engagement with the contacts manifesting the elapse of nine minutes or, numerically, the tenth contact in each of the contact banks 1481, 1482 and 1483. When the motor magnet 1488 is release to advance these wipers into engagement with the "9" manifesting contacts, the contacts 1489 are closed so that ground is applied from the grounded wiper 1484 through the "9" manifesting contact and the closed contacts 1489 to the lower operating winding of the steering relay 1430. In response to the application of ground to this operating winding, the relay 1430 is operated to open the contacts 1431 and close a pair of contacts 1432.

The tenth pulse applied from the time source 1440 is applied through the now closed contacts 1432 to operate the reset magnet 1487 so that the wipers 1484, 1485 and 1486 are returned under spring action into engagement with the contacts manifesting "0," that is, the first contacts in the first contact banks 1481, 1482 and 1483. The application of ground to the closed contacts 1432 also energizes the upper operating winding of the steering relay 1430 so that this relay remains operated when the wipers 1484, 1485 and 1486 are returned to their home position in response to the operation of the reset magnet 1487. When the ground pulse is terminated by the time source 1440, the upper operating winding of the steering relay 1430 is deenergized so that the relay 1430 releases to reclose the contacts 1431 and to open the contacts 1432. The removal of ground from the contacts 1432 permits the steering relay 1430 to release inasmuch as, the movement of the wiper 1484 to its normal home position removes ground from the lower operating winding of this relay.

Accordingly, the wiper 1484 and the contact bank 1481 cooperate to provide a means for resetting the units minutes register 1480, in response to the receipt of ten ground pulses from the time source 1440, thus indicating completion of ten minutes. The wiper 1486 selectively engages one of the contacts in the contact bank 1483, which are designated "0" and "1"–"9," inclusive, when considered from right to left in Fig. 14, in accordance with the magnitude of the units minutes digit of clock time. The contact bank 1483 is interconnected with the steering circuit 28, so that the information manifested by the selective positioning of the wiper 1486 is available to this circuit for subsequent transmission to the associated trunk recorder 25. The wiper 1485 and contact bank 1482 form a portion of a circuit for initiating a normal cycle of operation of the playback control circuit 30 as described hereinafter.

Simultaneously with the application of ground to the closed contacts 1432, which ground represents the tenth pulse transmitted from the time source 1440, this ground is also applied through a pair of normally closed contacts 1421 to the operating winding of a motor magnet 1478 forming a portion of the tens minutes register 1470. In addition to the motor magnet 1478, the tens minutes register 1470 includes a steering relay 1420, a reset magnet 1477, and a pair of wipers 1474 and 1476 which selectively engage contacts in a pair of contact banks 1471 and 1473, respectively. In response to the receipt and termination of a ground pulse from the time source 1440, representing the completion of ten minutes of elapsed time, the stepping magnet 1478 is operated to move the wiper 1474 from engagement with the first contact, manifesting "0" ten minutes, into engagement with the second contact in the contact bank 1471 which manifests the digit "1." The operation of the stepping magnet 1478 also opens a pair of interrupter contacts 1479 controlled thereby.

This sequential operation of the stepping magnet 1478 in response to the receipt of every tenth pulse applied to the units minutes register 1480 continues until such time as five of these pulses are received by the motor magnet 1478. In response to the completion of this fifth pulse, the wipers 1474 and 1476 are moved into engagement with contacts representing an elapsed time of 50 minutes. At this time, the grounded wiper 1474 is connected to the lower operating winding of the steering relay 1420, through the "5" representing contact in the bank 1471 and the closed contacts 1479. The application of ground to the operating winding of the steering relay 1420 opens the contacts 1421 and closes a pair of contacts 1422. Thereupon, when the sixtieth pulse is generated by the time source 1440, this is applied through the closed contacts 1432, indicating nine units minutes have elapsed, and the closed contacts 1422, indicating that fifty or five tens minutes have elapsed, to operate the reset magnet 1477. The operation of the reset magnet 1477 returns the wipers 1474 and 1476 into engagement with the first contact in the contact banks 1471 and 1473, representing "0." Simultaneously with the operation of the reset magnet 1477, the sixtieth ground pulse generated by the time source 1440 is applied to the operating winding of the reset magnet 1487 in the units minutes register 1480 to operate this magnet to reset the wipers 1484, 1485 and 1486 to their normal home position representing "0" units minutes.

The contacts forming the contact bank 1473 are designated "0" and "1" to "5," inclusive, when considered from right to left in Fig. 14, and the selective engagement of the wiper 1474 with one of these contacts manifests the magnitude of the digit in the tens minutes denominational column in the notation of the time at which a call is terminated.

The units hours register 1460 is energized in response to the resetting of the tens minutes register 1470. More particularly, after the contacts 1422 are closed in response to the generation of fifty pulses by the time source 1440, the sixtieth ground pulse is applied through a pair of normally closed contacts 1411 of a steering relay 1410 in the units hours register 1460 to operate a motor magnet 1468. The motor magnet 1468 in the units hours register 1460 controls the sequential operation of a plurality of wipers 1464, 1465 and 1466 which selectively and sequentially engage the contacts forming a plurality of contact banks 1461, 1462 and 1463, respectively. The units hours register 1460 also includes a reset magnet 1467 which, when operated, returns the wipers 1464, 1465 and 1466 to their normal home position in engagement with a contact representing "0" units hours.

The motor magnet 1468 is operated to advance the wipers 1464, 1465 and 1466, and to open a pair of interrupter contacts 1469, simultaneously with the receipt of sixty pulses by the units minutes register 1480 and the receipt of six pulses by the tens minutes register 1470. The stepping magnet 1468 is sequentially operated and released to advance the wipers 1464, 1465 and 1466 until, following the receipt of nine pulses from the tens minutes register 1470, the grounded wiper 1464 is moved into engagement with the tenth contact in the bank 1461, which contact represents an elapsed period of time equal to nine hours. At this time, ground is applied from the wiper 1464 through the "9" manifesting contact in the bank 1461, through a pair of normally closed contacts 1406 and the closed contacts 1469 to energize the lower operating winding of the steering relay 1410. The steering relay 1410, in opening, closes a pair of contacts 1412 and opens the contacts 1411.

The opening of the contacts 1411 prevents the motor magnet 1468 from being energized in response to the receipt of the next pulse from the tens minutes register 1470. The closure of the contacts 1412 applies the next pulse received from the tens minutes register 1470, representing an elapsed time of ten hours, to the operating winding of the reset magnet 1467 so that this magnet is operated to return the wipers 1464, 1465 and 1466 to their normal home position under spring action. The application of ground to the contacts 1412 also energizes the upper operating winding of the steering relay 1410 so that this relay is not released when the wiper 1464 is returned to its normal home position, thereby removing ground from the lower operating winding of the steering relay 1410.

The contacts forming the contact bank 1463 are designated "0" and "1" to "9," inclusive, when considered from right to left in Fig. 14, and the selective position of the wiper 1466 in engagement with one of these contacts manifests the magnitude of the digit in the units hours denominational column of the notation of the time of day. A single contact in the bank 1462 is connected to the wiper 1485 in the units minutes register 1480 to provide a portion of the circuit for initiating a cycle of normal operation of the playback control circuit 30.

The closure of the contacts 1412 also applies the tenth pulse received from the tens minutes register 1470, indicating that ten hours have elapsed, to the operating winding of a motor magnet 1458 in the tens hours register 1450 through a pair of normally closed contacts 1403. In addition to the motor magnet 1458, the tens hours register 1450 includes a steering relay 1400, a reset magnet 1457, and a plurality of wipers 1454, 1455 and 1456 which are sequentially advanced by the motor magnet 1458 to engage contacts forming a plurality of contact banks 1451, 1452 and 1453, respectively. The operation and release of the motor magnet 1458 opens and closes a pair of contacts 1459 and advances the wipers 1454, 1455 and 1456 out of engagement with the "0" representing home contact and into engagement with the second contact in the banks 1451, 1452 and 1453 which is representative of the digit "1" in the tens hours denominational column.

The next ten pulses received from the tens minutes register 1470, indicating the elapse of an additional ten hours, or a total elapsed time of twenty hours, operates the units hours register 1460 in the manner described in detail above, so that the wipers 1464, 1465 and 1466 are returned to their normal home contacts representing "0" units hours. The application of the second pulse to the tens hours register 1450 through the closed contacts 1412 operates the motor magnet 1458 so that the wipers 1454, 1455 and 1456 are moved into engagement with the third contacts in the contact banks 1451, 1452 and 1453, respectively. These contacts represent an elapsed time of two tens hours or twenty hours. The movement of the wiper 1454 into engagement with the "2" representing contact in the bank 1451 applies ground through the closed contacts 1459 to energize the lower operating winding of the steering relay 1400 thereby operating this relay to open the contacts 1401, 1403 and 1406, and to close the contacts 1402, 1404 and 1405.

The opening of the contacts 1401 performs no useful function at this time. The opening of the contacts 1406, together with the return of the wiper 1464 to its normal home position, interrupts the operating circuit for the lower winding of the steering relay 1410. The opening of the contacts 1403 prevents the next pulse transferred from the units hours register 1460 from operating the motor magnet 1458. The closure of the contacts 1404 conditions the reset magnet 1457 and the upper winding of the relay 1400 for operation in response to receipt of the next pulse from the units hours register 1460. The closing of the contacts 1405 prepares a circuit for operating the lower operating winding of the steering relay 1410 in the units hours register 1460 in response to the grounding of the fourth contact in the contact bank 1461 representing three units hours. The closure of the contacts 1402 prepares a path for energizing the units days register circuit 1380 in response to the receipt of pulses from the time source 1440 indicating a total elapsed time of twenty-four hours.

In response to the receipt and termination of the third pulse transmitted thereafter from the tens minutes register 1470, indicating a total elapsed time of twenty-three hours, the motor magnet 1468 is operated and released to advance the wipers 1464, 1465 and 1466 into engagement with the fourth contact in the contact banks 1461, 1462 and 1463, thus indicating that the magnitude of the digit represented in the units hours register 1460 is "3" and thereby indicating that twenty-three hours have elapsed. The movement of the wiper 1464 into engagement with the "3" manifesting contact in the bank 1461 applies ground through the closed contacts 1405 and 1469 to energize the lower operating winding of the steering relay 1410, so that this relay operates to close the contacts 1412 and to open the contacts 1411. The opening of the contacts 1411 disables the operating circuit for the motor magnet 1468 in the units hours register 1460, and the closure of the contacts 1412 prepares the operating circuit for the reset relay 1467 in the units hours register 1460 and for the reset magnet 1457 in the tens hours register 1450.

The next ground pulse produced by the time source 1440 transmitted through the closed contacts 1432, 1422, and 1412 i.e., the next ground pulse transmitted from the tens minutes register 1470, energizes and operates the reset magnet 1467, whereby the wipers 1464, 1465 and 1466 are returned to their normal home position in engagement with contacts representing "0" units hours. This ground pulse, representing the elapsed period of twenty-four hours, is also applied through the closed contacts 1404 to operate the reset magnet 1457 to return the wipers 1454, 1455 and 1456 to their normal home position in engagement with contacts representing "0" tens hours. In addition to operating the reset magnets 1457 and 1467, the twenty-fourth pulse applied to the units hours register 1460 energizes the upper operating winding of the steering relays 1400 and 1410 so that these relays remain operated when the wipers 1454 and 1464 are returned to their normal home positions as described hereinabove.

The contacts provided in the contact bank 1453 are designated "0," "1" and "2" when viewed from right to left in Fig. 14, and the position of the wiper 1456 with respect thereto determines the magnitude of the digit manifested in the tens hours column of the time notation. The wiper 1455 is grounded and selectively engages the "0" manifesting contact in the bank 1452 to apply ground to the wiper 1465 to form a portion of the circuit for energizing the playback control circuit 30 as described hereinafter.

Accordingly, the return of the wiper 1454 to its normal home position removes ground from the lower operating winding of the tens hours steering relay 1400 so that this relay is released when the ground pulse is terminated by the time source 1440. The return of the wiper 1464 to its normal home position deenergizes the lower operating winding of the steering relay 1410, so that this relay releases when the ground pulse is terminated by the timing source 1440. The release of the steering relays 1420 and 1430, which is also produced in response to the termination of the ground pulse representing an elapsed time of twenty-four hours, conditions the units minutes register 1480, the tens minutes register 1470, the units hours register 1460 and the tens hours register 1450 for another cycle of operation to indicate an elapsed time of twenty-four hours. Therefore, at the end of a twenty-four hour period, the plurality of wipers 1454, 1455, 1456, 1464, 1465, 1466, 1474, 1476, 1484, 1485 and 1486 are all returned to their normal home position, wherein these wipers engage contacts representing "0" in their respective denominational orders of the time notation at which a particular call is terminated. Also, in this normal position following the receipt of pulses representing an elapsed time of twenty-four hours, all of the steering relays are released together with their respectively associated motor magnets 1458, 1468, 1478, 1488 and reset magnets 1457, 1467, 1477 and 1487.

The operation of the steering relay 1400 in the tens hours register circuit 1450 in response to the receipt of pulses indicating an elapsed time of twenty-three hours also conditions the units days register circuit 1380 for operation. More particularly, when the steering relay 1400 is operated, the contacts 1402 are closed so that the ground pulse from the time source 1440 which operates the reset magnets in the tens hours, units hours, tens minutes, and units minutes register circuits is also applied through a pair of normally closed contacts 1352 to energize the operating winding of a motor magnet 1388. In addition to the motor magnet 1388, the units days register circuit 1380 includes a steering relay 1350, a reset magnet 1387, and a pair of wipers 1384 and 1386 which sequentially engage the plurality of contacts forming a pair of contact banks 1381 and 1383, respectively. The contact banks 1381 and 1383 each include ten contacts representing, when viewed from right to left in Fig. 13 of the drawings, "0" and the digits "1" to "9," inclusive.

The application of ground to the operating winding of the motor magnet 1388 through the contacts 1352, indicating an elapsed time of twenty-four hours, operates this magnet to open a pair of contacts 1389 and to condition the wipers 1384 and 1386 for movement into engagement with the second contact in the contact banks 1381 and 1383. When ground is removed from the operating winding of the motor magnet 1388 in response to the termination of the ground pulse of the time source 1440, this magnet releases to reclose the contacts 1389 and to advance the wipers 1384 and 1386 into engagement with the "1" manifesting contacts in the contact banks 1381 and 1383, respectively.

Thereafter, the units days register circuit 1380 is operated, as described hereinabove, in response to the receipt of a ground pulse through the tens hours register 1450 indicating that twenty-four hours or a single day has elapsed. In response to each of these pulses, the wipers 1384 and 1386 are advanced to engage the next successive contacts in the contact banks associated therewith. This operation continues until such time as the wipers 1384 and 1386 are moved into engagement with the last or tenth contacts in the banks 1381 and 1383, which contacts represents the digit "9." In response to moving the wiper 1384 into engagement with the "9" designated contact in the bank 1381, ground is applied through a pair of normally closed contacts 1346 and the contacts 1389 to energize the lower operating winding of the steering relay 1350 so that this relay operates to open the contacts 1352 and a pair of contacts 1351, and to close a pair of contacts 1353.

The opening of the contacts 1351 produces no useful function at this time. The opening of the contacts 1352 disables the operating circuit for the motor magnet 1388 in the units days register circuit 1380. The closure of the contacts 1353 conditions the reset magnet 1387 for operation in response to the next pulse applied to the units days register circuit 1380. When the next ground pulse is applied from the time source 1440 through the tens hours register circuit 1450, thus indicating an elapsed time of ten days, ground is applied to the operating winding of the reset magnet 1387 to operate this magnet. The operation of the magnet 1387 returns the wipers 1384 and 1386 to their normal home position in engagement with the contacts in the banks 1381 and 1383 representative of "0" units days. Simultaneously, the application of ground through the contacts 1353 energizes the upper operating winding of the steering relay 1350 so that this relay remains operated following the return of the wipers 1384 and 1386 to their normal home positions.

The ground applied through the closed contacts 1353 is also transmitted to the operating winding of a motor magnet 1378 in the tens days register circuit 1370 through a pair of normally closed contacts 1343. In addition to the motor magnet 1378, the tens days register circuit 1370 includes a steering relay 1340, a reset magnet 1377, and a pair of wipers 1374 and 1376 which are sequentially moved over the contacts forming a pair of contact banks 1371 and 1373, respectively. The contacts forming the bank 1373 are designated as "0" and "1" to "3," inclusive, when viewed from right to left in Fig. 13 and, together with the wiper 1376, provide a means for interconnecting the clock and calendar circuit 27 with the scanning circuit 28 so that the information manifested by the selective position of the wiper 1376 may be transmitted through the scanning circuit 28 to produce a group of mark pulses in the trunk recorded 25 in accordance with the position of the wiper 1376.

The application of ground through the normally closed contacts 1343 to the operating winding of the motor magnet 1378 operates this magnet to open a pair of contacts 1379 and to condition the wipers 1374 and 1376 for advancing in response to the termination of ground. When ground is removed from the operating winding of the motor magnet 1378, the contacts 1379 are reclosed and the wipers 1374 and 1376 are moved under resilient action into engagement with the second contacts in the banks 1371 and 1373, which contacts are representative of "1" tens days, or ten days. Accordingly, the tens days register circuit 1370 is selectively operated under the control of the completion of one cycle of operation of the units days register circuit 1380, thereby providing an indication in the tens days register circuit 1370 in response to an elapsed time equal to ten days.

The above-described cycle of operation in the units days register circuit 1380 is completed once again in response to the receipt of ten pulses received from the time source 1440 through the tens hours register circuit 1450, thereby indicating that an additional ten days have elapsed. In response to the receipt of these ten pulses, the units days register circuit 1380 permits a second pulse to be transmitted to the operating winding of the motor magnet 1378, thereby to operate this magnet. In response to the termination of this ground pulse, the motor magnet 1378 releases to close the contacts 1379 and to move the wipers 1374 and 1376 into engagement with the third contacts in the banks 1371 and 1373 which are designated by the digit "2." Simultaneously with the movement of the wipers 1374 and 1376 into engagement with the "2" designated contacts in the banks 1371 and 1373, the reset magnet 1387 in the units days register circuit 1380 is operated and released to return the wipers 1384 and 1386 into engagement with the first contacts in the contact banks 1381 and 1383, thereby representing "0" units days. The return of the wipers 1384 and 1386 to their normal home positions, together with the termination of the ground pulse provided by the time source 1440, releases the steering relay 1350 in the units days register circuit 1380 so that the contacts 1353 are reclosed to permit the motor magnet 1388 in the units days register circuit 1380 to be energized in response to the next pulse transmitted thereto through the tens hours register circuit 1450.

Accordingly, when the time source 1440 has transmitted a number of ground pulses separated from each other by time intervals of one minute, which are equal in number to an elapsed time of twenty days, the wiper 1374 is in engagement with the "2" designated contact in the contact bank 1371, the wipers 1384 and 1386 in the units days register circuit 1380 are in engagement with the "0" representing contacts in the banks 1381 and 1383, the wipers 1454, 1455 and 1456 in the tens hours register circuit 1450 are in engagement with the "0" representing contacts in the contact banks 1451 and 1453, the wipers 1464, 1465 and 1466 are in engagement with the "0" designating contacts in the contact banks 1461, 1462 and 1463, the wipers 1474 and 1476 are in engagement with the "0" representing contacts in the contact banks 1471 and 1473, and the wipers 1484, 1485 and 1486 are in engagement with the "0" representing contacts in the banks 1481, 1482 and 1483 in the units minutes register circuit 1480.

Referring now to the months register circuit 1360, this circuit includes a rotary stepping switch actuated by a motor magnet 1361a and having a plurality of wipers 1367, 1368, 1369 and 1366 which are adapted to selectively engage contacts forming a plurality of contact banks 1362, 1363, 1364 and 1365, respectively. The contact banks 1362, 1363, 1364 and 1365 each include fifty-two separate contact points which, as disclosed in Fig. 13a of the drawings, are divided into four groups of twelve contacts each, with the remaining four contacts (not shown) not being utilized. For convenience, in Fig. 13 of the drawings, the contact banks have been considerably simplified and merely disclose the functional operation performed by each of these contact banks, although the exact wiring to the contact banks is shown in Fig. 13a of the drawings.

As shown in Fig. 13a of the drawings, the first forty-eight contacts in the banks 1363, 1364 and 1365 are divided into four groups of twelve each. Each of these groups of twelve contacts represents the twelve months of the year, and one of the contact groups of twelve contacts is representative of a leap year. All of the contacts representing a particular month of the year, except February of leap year, are strapped together, and further, in bank 1363, all of the months of the year having a number of days therein designated by the same digit in the units denominational column are strapped together. For instance, all of the contacts representing the month of January, in the four groups of twelve contacts in the contact bank 1363 are strapped together, and further, these contacts are connected to like joined contacts representative of the months of March, May, July, August, October and December since all of these months are alike in including thirty-one days. Accordingly, all of the months having "1" as the last digit in the notation thereof, are joined together and connected to a common conductor. In Fig. 13 of the drawings, the plurality of contacts connected to the conductor designating a month having a notation with a "1" in the units denominational column are represented by the single contact 1363a in the contact bank 1363. The contact 1363a is connected to the "1" representing contact in the contact bank 1381 in the units days register circuit 1380.

Also, all of the contacts in the contact bank 1363 (Fig. 13a) representing months such as April, June, September and November, which include thirty days are joined together and connected to a common conductor. These commonly connected contacts are represented as contact 1363b in Fig. 13 of the drawings, and this contact is directly connected to the "0" designated contact in the contact bank 1381 in the units days register circuit 1380.

The three contacts in the contact bank 1363 representing the month of February in a normal year are connected to a common connector and, as shown in Fig. 13 of the drawings, the twenty-eight day months of February are represented by the contact 1363c which is connected to an "8" manifesting contact in the contact bank 1381 of the units days register circuit 1380. The single group of twelve contacts representing a leap year contains a contact representing a twenty-nine day month. This single contact is designated as 1363d in Figs. 13 and 13a of the drawings and is connected to the "9" manifesting contact in the contact bank 1381 in the units days register circuit 1380.

In the contact bank 1364 (Fig. 13a), the months of February, which include a number of days represented by the digit "2" in the tens denominational column, are represented by the contacts 1364a. These contacts are connected to the "2" manifesting contact in the contact bank 1371 of the tens days register circuit 1370.

The contacts in the bank 1364, other than those representing the month of February, are representative of months including the digit "3" in the tens days denominational column. These contacts are connected together and, as shown in Fig. 13 of the drawings, are designated as 1364b and are connected to the "3" manifesting contact in the contact bank 1371 in the tens days register circuit 1370. Accordingly, all of the contacts in the contact bank 1364 which represent months other than February and comprise thirty or thirty-one days in duration are connected to a single common conductor which is connected to the contact bank 1371 of the tens days register circuit 1370.

In the contact bank 1365 (Fig. 13a), all of the contacts representing like months are connected together and to a single output conductor which extends to the scanning circuit 28 so that the information selectively manifested by the position of the wiper 1366 is capable of being transmitted to the scanning circuit 28 to permit this information to be recorded in the associated trunk recorder 25. As shown in Fig. 13a of the drawings, the month of January is represented by the numerical character "1" and the month of December is represented by the numerical notation "12."

Assuming that the months register circuit 1360 is set in a position to indicate that the current month is February of a normal year, the wiper 1368 is in engagement with one of the contacts indicated by the reference numeral 1363c, and the wiper 1369 is in engagement with one of the contacts designated by the reference numeral 1364a. As described hereinabove, the receipt of two pulses from the time source 1440 through the closed contacts 1353 in the units days register circuit 1380 sequentially operates and releases the motor magnet 1378 in the tens days register circuit 1370 so that the grounded wiper 1374 is moved into engagement with the "2" designated contact in the bank 1371. The movement of the wiper 1374 into engagement with this contact indicates that a number of pulses have been received from the time source 1440 which represents the expiration of twenty days' time.

The movement of the wiper 1374 into engagement with the contact designated by the character "2" applies ground through this contact and through the contact 1364a, the wiper 1369, and the normally closed contacts 1379 to energize the lower operating winding of the steering relay 1340. The energization of this winding operates the steering relay 1340 to open contacts 1341, 1343 and 1346 and to close the contacts 1342, 1344 and 1345. The opening of the contacts 1341 disables the self energizing circuit for a motor magnet 1361a in the months register circuit 1360, but performs no useful function at this time. The opening of the contacts 1343 disables the operating circuit for the motor magnet 1378 in the tens days register circuit 1370, thereby indicating that the current month includes a number of days less than thirty since the movement of the wiper 1374 into engagement with the "2" designating contact in the contact bank 1371 operates the steering relay 1340 to disable the tens days register circuit 1370 from receiving additional pulses from the units days register circuit 1380.

The opening of the contacts 1346 disables the operating circuit for the lower winding of the steering relay 1350 in the units days register circuit 1380 so that this steering relay can only be operated under the control of the units days wiper 1368 in the months register circuit 1360. The disabling of the normal operating circuit for the steering relay 1350 and, accordingly, for the reset magnet 1387 in the units days register circuit 1380 transfers the control over this reset magnet to the months register circuit 1360 so that the units days register circuit 1380 can be reset to a "0" manifesting position only following the receipt of the number of pulses representative of the number of days comprising the current month, as indicated by the selective position of the wipers in the stepping switch forming the months register circuit 1360.

The closure of the contacts 1345 to interconnect the wiper 1368 with the contact bank 1381 of the units days register circuit 1380 prepares a circuit for initiating the resetting the units days register circuit 1380 in response to the receipt of the number of pulses representing the number of days comprising the current month. The closure of the contacts 1342 conditions the stepping magnet 1361a for operation following the receipt of a ground pulse representing the end of the last day of the month, that is, the twenty-eight days forming the current month of February in a normal year. The closure of the contacts 1344 conditions a circuit for operating the upper winding of the steering relay 1340 and the reset magnet 1377 in the tens days register circuit 1370, so that this circuit is reset to a "0" manifesting position following the receipt of the twenty-eighth pulse from the tens hours register circuit 1450, thereby indicating completion of the current month.

Thereafter, the receipt of eight pulses from the timing source 1440 through the tens hours register circuit 1450 sequentially advances the wipers 1384 and 1386 so that the wiper 1384 is moved into engagement with the contact designated by the character "8" in the contact bank 1381. The movement of the grounded wiper 1384 into engagement with this contact completes the operating circuit previously traced through the wiper 1368 and the closed contacts 1345 and 1389 to operate the steering relay 1350 by energizing the lower operating winding thereof. The operation of the steering relay 1350 opens the contacts 1351 and 1352 and closes the contacts 1353. The opening of the contacts 1351 produces no useful function at this time.

The opening of the contacts 1352 disables the energizing circuit for the motor magnet 1388 in the units days register circuit 1380. The closure of the contacts 1353 prepares the operating circuits for the reset magnets 1377 and 1387, the stepping magnet 1361a in the months register circuit 1360, and a stop relay 1330. Accordingly, the receipt of a pulse from the tens hours register circuit 1450, indicating the completion of an elapsed period of time equal to that manifested by the setting of the months register circuit 1360, completes the preparation of the units days register circuit 1380 and the tens days register circuit 1370 for being reset to a "0" manifesting position. The receipt of this pulse also completes the conditioning of the circuit for operating the stepping relay 1361a in the months register circuit 1360 to advance the wipers therein to the next contact in the contact banks associated therewith, thereby to represent that the date has changed to the next succeeding month, i.e., in the assumed example from the month of February to the month of March. This pulse also completes the conditioning of the stop relay 1330.

The next pulse applied from the tens hours register circuit 1450 indicates that an additional day's time has elapsed, i.e., the twenty-eighth day of February has been completed. This pulse is applied through the closed contacts 1402, 1353 and 1344 to simultaneously operate the reset magnets 1377 and 1387, and to lock up the steering relays 1340 and 1350 in the tens days register circuit 1370 and the units days register circuit 1380, respectively. The operation of the reset relay 1377 returns the wipers 1374 and 1376 to a normal home position in engagement with the contacts representing "0." The operation of the reset magnet 1387 returns the wipers 1384 and 1386 to their normal home position in engagement with the contact representing "0" in the contact banks 1381 and 1383.

This pulse from the tens hours register circuit 1450 is also applied through the closed contacts 1342 to operate the stepping magnet 1361a. In response to the termination of this pulse, the stepping magnet 1361a advances the wipers 1367, 1368, 1369 and 1366 into engagement with the next contact in the contact banks associated therewith. In accordance with the previous assumption that these wipers are positioned in engagement with contacts representing the month of February in a normal year, the sequential operation and release of the stepping magnet 1361a advances these wipers into engagement with the contacts representing the month of March. In this position, the wiper 1368 is in engagement with the contact 1362a which is connected to the "1" manifesting contact in the contact bank 1381, and the wiper 1369 is in engagement with a contact represented by the reference numeral 1364b which is connected to a "3" manifesting contact in the contact bank 1371.

It should be noted that the receipt of a number of pulses, equal in magnitude to the number of days forming the current month, does not reset the tens days and units days registers 1370 and 1380 and operate the months register circuit 1360, but merely conditions these circuits for operation. These circuits are operated in response to the receipt of a pulse from the tens hours register circuit 1450 indicating that an additional day has been completed, thereby moving the date into the next succeeding month. This is necessary inasmuch as the wipers 1376 and 1386 must remain in engagement with the contacts in the contact banks 1373 and 1383 which represent the correct day of the month until such time as this day has been terminated. If these register circuits were reset following the receipt of the pulse indicating that the twenty-eighth day of the month of February had been reached, the date selectively manifested by the clock and calendar circuit 27 during the twenty-eighth day of the month of February would produce an indication representing the zero day of March. Therefore, as described above, the tens days register circuit 1370 and the units days register circuit 1380 are reset in response to the receipt of a pulse through the tens hours register circuit 1450 which indicates the completion of the twenty-eighth day.

This pulse also operates the stepping magnet 1361a and the months register circuit 1360 so that the indication of the month provided by this register circuit is not changed to indicate the month of March until such time as the last day of February is completed. However, the use of this pulse representing the termination of the twenty-eighth day of the month of February for resetting the register circuits and for advancing the month register 1360 absorbs this pulse so that it cannot be used for energizing the operating winding of the motor magnet 1388 in the units day register circuit 1380 to produce the correct indication therein of the first day of the next succeeding month.

More particularly, the twenty-ninth pulse, assuming the month to be February of a normal year, resets the wiper 1384 to a position in which this wiper engages the "0" manifesting contact in the contact bank 1381 so that, following the movement of the wipers in the months register circuit 1360, when considered in conjunction with the tens and units days register circuits, the clock and calendar circuit 27 represents the month of March, and the zero day in the month of March. The correct indication in the clock and calendar circuit 27 at this time should be the first day of March wherein the wiper 1386 would be in engagement with the second contact in the contact bank 1383 which represents the digit "1."

To provide a means for correcting the manifestation in the units days register 1380, the pulse applied through the closed contacts 1344 for resetting the tens days register circuit 1370 is also applied to the slow-to-release stop relay 1330 so that this relay is operated to open a pair of contacts 1331 and to close a pair of contacts 1332. The closure of the contacts 1332 applies ground to the contacts 1351. When the units days steering relay 1350 and the tens hours steering relay 1400 are released, upon the termination of the twenty-ninth ground pulse, the contacts 1401, 1351 and 1352 are closed. The closing of these contacts completes a path from the grounded contacts 1332 to the operating winding of the motor magnet 1388, thereby to operate this relay to prepare the wipers 1384 and 1386 for movement into engagement with the second contacts in the contact banks 1381 and 1383 representing "1." Ground is applied through this circuit following the release of the steering relays 1350 and 1400 even though the ground pulse is simultaneously removed from the stop relay 1330 inasmuch as this relay is slow-to-release. The slow-to-release characteristic of this relay maintains the contacts 1333 closed until such time as the steering relays 1350 and 1400 are released to complete the path for operating the motor magnet 1388 in the units days register circuit 1380.

The operation of the stop relay 1330 to open the contacts 1331 interrupts the energizing circuit for the scanning circuit 28. The opening of the start conductor for the scanning circuit 28 prevents the seizure of the scanning circuit 28 to initiate an operation wherein the information manifested in the clock and calendar circuit 27 is transmitted to the trunk recorder 25. It is necessary to prevent the scanning circuit 28 from initiating an operation at this time inasmuch as it is desired to reset the months register 1360, the tens days register circuit 1370 and the units days register circuit 1380 before the initiation of this transmitting cycle so that no false indications are produced in the associated recorder 25 in the event that the resetting operations are not completed at the time the scanning operation is initiated. Following this predetermined time interval, the stop relay 1330 is released to close the contacts 1331 and to open the contacts 1332. The opening of the contacts 1332 interrupts the operating circuit for the winding of the motor magnet 1388 so that the wipers 1384 and 1386 are advanced to a position in engagement with the second contact in the contact banks 1381 and 1383. The closure of the contacts 1331 reestablishes the start circuit for the scanning circuit 28, so that this circuit may be seized by a trunk recorder 25 to initiate an operation wherein information represented by the selective positions of the wipers in the clock and calendar circuit 27 is transmitted to the seized recorder 25 in the form of a plurality of groups of mark pulses.

The clock and calendar circuit 27 operates in the manner described hereinabove during the month of March until such time as, following the receipt of the thirtieth pulse from the time source 1440 through the tens hours register circuit 1450, the wiper 1374 in the tens days register circuit 1370 is moved into engagement with the fourth contact in the contact bank 1371, which contact manifests the digit "3." The movement of the wiper 1374 into engagement with this contact completes a circuit for operating the steering relay 1340 extending through the grounded wiper 1374, the contact 1364b, the wiper 1368, and the contacts 1379.

The operation of the steering relay 1340 performs the same function as described hereinabove, at the completion of the month of February. This thirtieth pulse also resets the units days register circuit 1380 so that the wiper 1384 is positioned in engagement with the "0" contact in the contact bank 1381. Since the month of March includes thirty-one days, a circuit is not completed through the wiper 1368 at this time. However, in response to the thirty-first pulse transmitted through the tens hours register circuit 1450, the wiper 1384 is moved into engagement with the second contact in the bank 1381 representing the digit "1." This movement completes a circuit for operating the steering relay 1350 in the units days register circuit 1380 to condition this circuit for being reset in response to the next pulse received from the tens hours register circuit 1450. The thirty-second pulse received from the tens hours register circuit 1450 operates the stepping magnet 1361a in the months register circuit 1360, and also operates the reset magnets 1377 and 1387 to restore the wipers 1374, 1384, 1376 and 1386 to their normal positions in engagement with the first contacts in the contact banks associated therewith. The clock and calendar circuit 27 then completes a cycle of operation as described above in conjunction with the termination of the month of February including twenty-eight days and, incident to this cycle of operation, advances the wipers 1367, 1368, 1369 and 1366 into engagement with contacts representing the month of April. Following this cycle of operation ground is again applied from the closed contacts 1332 to the operating winding of the motor magnet 1388 in the units days register circuit 1380 so that the wipers 1384 and 1386 are advanced into engagement with the second contact in the contact banks associated therewith, which contacts are representative of the digit "1," thereby completing the cycle of operation whereby the clock and calendar circuit 27 changes from the manifestation of the thirty-first day of March to the first day of April.

In the contact bank 1362, the last four of the fifty-two contacts thereon are connected together and also connected to the operating winding of the stepping magnet 1361a through a pair of interrupter contacts 1361b and the normally closed contacts 1341. Since only forty-eight of the fifty-two contacts provided on the stepping switch are utilized to represent the months forming four separate years, the last four contacts on the contact banks are not used. In order to return the wipers 1367, 1368, 1369 and 1366 into engagement with the first contact in these banks following the passage of a time period of four years, ground is applied through the wiper 1367 to the forty-ninth contact and therethrough to the interrupter contacts 1361b and the contacts 1341 to operate the stepping magnet 1361a. The operation of this relay opens the contacts 1361b to interrupt the operating circuit for the stepping magnet 1361a, and thereby permits the wipers to advance a single contact. Thereafter, the ground applied to the next three contacts, i.e., contacts 50, 51 and 52 sequentially operates the stepping magnet 1361 to return the plurality of wipers into engagement with the first contacts in the contact banks 1362, 1363, 1364 and 1365.

The operation of the clock and calendar circuit 27 continues in the manner described above, so that at any particular given time, the position of the wipers 1366, 1376, 1386, 1456, 1466, 1476 and 1486 represent the month, tens days, units days, units hours, tens hours, tens minutes and units minutes notation of the date and time. In general, the clock and calendar circuit 27 operates to provide this continuous indication of time in the tens and units minutes register circuits 1470 and 1480 by serially operating a pair of stepping switches in response to the completion of one minute and ten minutes, respectively. In the tens hours and units hours circuits 1450 and 1460, the reset magnets are conditioned for being reset to a normal position in response to the twenty-fourth pulse transmitted thereto, thus representing the completion of twenty-four hours or one day.

The tens days register circuit 1370 and units days register circuit 1380 are provided with contact banks selectively interconnected through the months register circuit 1360. This selective interconnection provides the tens days and units days resetting magnets 1377 and 1387 with information pertaining to the time at which their respectively controlled wipers should be restored to the normal position, so that these register circuits may be reset following a time duration equal to the number of days comprising the current month. More particularly, the tens and units days register circuits 1370 and 1380 are conditioned for resetting in response to the receipt of pulses from the tens hours register circuit 1450 indicating that the last day of the month has been completed. The pulse produced by the time source 1440 and coupled to these circuits through the tens hours register circuit 1450 representing the initiation of the first day of the next month operates these register circuits to reset them to a normal position. Incident to this resetting operation, the stop relay 1330 disables the scanning circuit 28 and also feeds a single pulse to the operating winding of the motor magnet 1388 in the units days register circuit 1380 so that this circuit is operated to provide a manifestation of the first day of the month. Although only a description of the operation of the clock and calendar circuit 27 following the termination of the months February and March has been described in detail above, it is to be understood that the clock and calendar circuit 27 is reset under the control of the contacts 1363b, 1363d, 1364a and 1364b at the termination of the months comprising twenty-nine or thirty days in the manner described above in conjunction with the operation of this circuit during the months comprising twenty-eight and thirty-one days.

Also, the wipers 1455, 1465 and 1485 and a single contact in the banks 1452, 1462 and 1482, respectively, form a single continuous circuit for applying ground to a start conductor 1960 for initiating a normal cycle of operation of the playback control circuit 30. As shown, the clock and calendar circuit applies ground to the conductor 1960 for a one minute interval at 2:00 A.M. Obviously, the above-listed wipers and contact banks could be wired to ground the conductor 1960 at a plurality of selected times or at a time other than that shown.

SCANNING CIRCUIT 28

The scanning circuit 28 (Figs. 10 and 11) is common to all of the trunk circuits associated with a particular calling exchange and is interposed between an associated trunk recorder 25 and the clock and calendar circuit 27 so that, in response to the initiation of a cycle of operation thereof, the scanning circuit 28 provides this trunk recorder 25 with a plurality of groups of mark pulses representing the items of information pertaining to the date and time of terminating a toll call. More particularly, the scanning circuit 28 includes a relay counting chain 1100, which is connected to the information registering contact banks in the clock and calendar circuit 27. A steering circuit 1101 in the scanning circuit 28 sequentially grounds the wiper in the clock and calendar circuit 27 so that each cycle of the operation of the counting chain 1100 is controlled by only one of the wipers in the clock and calendar circuit 27. In response to this selective energization of one of the wipers in the clock and calendar circuit 27, the counting chain 1100 produces a group of mark pulses proportional to the numerical designation of the contact on which the grounded wiper is positioned. Thereafter, the steering circuit 1101 successively grounds the other wipers in the clock and calendar circuit 27 so that the counting chain 1100 produces a plurality of groups of mark pulses, the number of pulses in each group of which is proportional to the designation of the contact with which the grounded wiper is in engagement. Following the transmission of these items of information to the seized recorder 25, the operation of the scanning circuit 28 is terminated.

More particularly, as described hereinabove, the scanning circuit 28 is energized to initiate a cycle of operation in response to the application of ground to the start conductor 761 by the one-way trunk circuit 19 in response to the receipt of a signal from either the called or calling subscriber indicating that the call has been terminated. This ground is applied through the contacts 1331 in the clock and calendar circuit 27 and the normally closed contacts 1002 to the operating winding of a start relay 1010. The application of ground to the operating winding of the start relay 1010 operates this relay to close a plurality of contact 1011, 1012, 1014, 1015, and 1016, and to open a pair of contacts 1013. The closure of the contacts 1011 applies ground to the operating winding of a steering relay 1185 in the steering circuit 1101. The closure of the contacts 1012 applies ground to the steering relay circuit 1101 for a purpose which will be described more fully hereinafter. The closure of the contacts 1014 applies ground through a plurality of closed contacts 1021 and 1003 to the conductor 762. The application of ground to the conductor 762 operates the relay 640 in the one-way trunk circuit 19 so that this relay completes the paths for interconnecting the conductors 763, 765 and 766 with the repeater relay 650, the mark head 1201 and the space head 1202, respectively. The closure of the contacts 1015 applies ground to a plurality of open contacts 1023 and 1024 and to the operating winding of a start assist relay 1050 through a plurality of normally closed contacts 1031 and 1042. The closure of the contacts 1016 applies ground through a normally closed pair of contacts 1044 to an open pair of contacts 1059.

The application of ground to the operating winding of the start assist relay 1050, which is slow-to-operate, operates this relay after a predetermined period of time to open a plurality of contacts 1051, 1052 and 1057 and to close contacts 1053, 1054, 1056, 1058 and 1059. The opening of the contacts 1051 and 1052 produces no useful function at this time. The closure of the contacts 1053 conditions a locking circuit for the start assist relay 1050 extending from the now open contacts 1024. The closure of the contacts 1054 applies ground to the counting chain 1100. The closure of the contacts 1056 interconnects the now open contacts 1025 with a pair of contacts 1175. The opening of the contacts 1057 interrupts the circuit between the operating winding of a relay 1030 and the now open contacts 1025. The closure of the contacts 1058 applies ground to the upper operating winding of a steering relay 1180 in the counting chain 1100. The closure of the contacts 1059, when the start assist relay 1050 operates, completes a path for initiating operation of a pulse generator 1196 which extends from contacts 1016 through the normally closed contacts 1044. The application of ground to the start conductor of this generator initiates operation of the generator 1196 so as to begin the production of a plurality of ground pulses which are applied to the operating winding of a pulse forming relay 1190.

The opening of the contacts 1013 in response to the operation of the start relay 1010 breaks the energizing circuit for the normally operated and slow-to-release relay 1020 so that this relay releases to open the contacts 1021 and to close a plurality of contacts 1022, 1023, 1024 and 1025. The opening of the contacts 1021 removes the ground previously applied to the relay 640 which, as described in detail above, does not release because of the locking circuit completed through the closed contacts 649a. The closure of the contacts 1022 applies ground from the contacts 1014 through the normally closed contacts 1002 to complete a locking circuit for the start relay 1010 so that this relay remains operated when ground is removed from the start conductor 761.

The closure of the contacts 1023 produces no useful function, inasmuch as the contacts 1051 are opened by the prior operation of the start assist relay 1050. The closure of the contacts 1024 completes a locking circuit from ground through the closed contacts 1015 to maintain the start assist relay 1050 operated. This circuit extends from the grounded and closed contacts 1015 through the contacts 1024, 1053 and 1042 to the operating winding of the start assist relay 1050. The closure of the contacts 1025 applies ground to the operating winding of a relay 1040 which is not operated inasmuch as the winding of this relay is not connected to battery. The closure of the contacts 1025 also applies ground through the closed contacts 1056 to the open contacts 1175.

The operation of the start assist relay 1050, as described hereinbefore, completes the circuit for initiating operation of the pulse generator 1196. The first ground pulse produced by the generator 1196 is applied to the operating winding of the pulse relay 1190 to operate this relay thereby to open a plurality of contacts 1191, 1192 and 1194 and to close a plurality of contacts 1195 and 1193. The opening of the contacts 1191 and 1192 produces no useful function at this time. The opening of the contacts 1194 disconnects ground from a pair of open contacts 1173 which are connected to the advance pulse conductor 763.

The closure of the contacts 1193 applies ground through a pair of normally closed contacts 1144 to the mark pulse conductor 765. As described in detail hereinabove, the application of ground to the mark pulse conductor 765 energizes the mark head 1201 in the seized recorder 25 so that a single mark pulse is produced on the magnetic tape 1601 therein. The closure of the contacts 1195 applies ground to a pair of normally open contacts 1146 and produces no useful function at this time. However, the closure of the contacts 1195 also applies ground through a pair of normally closed contacts 1174 to the operating winding of a pulse assist relay 1170 to operate this relay.

The operation of the pulse assist relay 1170 closes a plurality of contacts 1171, 1172, 1173 and 1175 and opens the contacts 1174. The contacts 1174 and 1175 are arranged in a make-before-break construction so that the contacts 1175 are closed to complete a locking circuit for the pulse assist relay 1170, which extends from closed and grounded contacts 1025, before the operating ground is removed from the operating winding of the pulse assist relay 1170, due to the opening of the contacts 1174. Accordingly, the pulse assist relay 1170 remains operated at this time. The closure of the contacts 1173 connected to the advance pulse conductor 763 produces no useful function at this time inasmuch as the contacts 1194 are open to the operation of the pulse relay 1190.

The closure of the contacts 1171 and 1172 applies ground to the now open contacts 1191 and 1192 to prepare a circuit for operating the counting chain 1100. Accordingly, the operation of the pulse relay 1190 and the pulse assist relay 1170 applies a single mark pulse to the mark pulse conductor 765. Also, the sequential operation of these two relays conditions the counting chain 1100 for operation in response to the termination of the ground pulse applied to the operating winding of the pulse relay 1190 from the generator 1196.

The counting chain 1100, in addition to the steering relay 1180, includes a plurality of counting relays 1150, 1135, 1125, 1115, 1105, 1090, 1085, 1080, 1075, 1070, 1065, and 1060, the sequential operation of which is capable of selectively producing any number of pulses between one and twelve. The counting chain 1100 is connected to the output contact banks 1365, 1373, 1383, 1453, 1463, 1473 and 1483 in the clock and calendar circuit 27, and operates to selectively control the production of groups of mark pulses proportional in number to the numerical designation of the selectively engaged contact in the associated contact bank in the clock and calendar circuit 27. The counting chain 1100 is sequentially rendered effective to produce a group of mark pulses in accordance with the position of each of the sequentially grounded wipers in the clock and calender circuit 27. The order in which the pulses are produced under the control of the counting chain 1100 is controlled by the steering circuit 1101.

More particularly, in the normal condition of the steering circuit 1101, ground is applied through the uppermost contacts controlled by the plurality of relays in the steering circuit 1101 from a first pair of normally closed contacts 1096 to the wiper 1456 in the tens hours register circuit 1450. This ground is applied from the wiper 1456 through the contact with which this wiper is in engagement and to an uppermost contact controlled by one of the plurality of relays forming the counting chain 1100.

Since the wiper 1456 is normally connected to ground through the steering chain 1101, the first group of mark pulses produced under the control of the counting chain 1100 is representative of the tens digit of the notation of the hour at which the toll call is terminated. In order to obviate the necessity of providing A.M. and P.M. designations corresponding to the numerical portion of the hourly entry of time provided by the clock and calendar circuit 27, a twenty-four hour numerical notation is adopted for use in the clock and calendar circuit 27 and, accordingly, in the scanning circuit 28. As shown in the following table, 12:00 noon is represented by the numerical notation 1200 whereas 12:00 midnight is represented by the numerical notation 2400.

| Clock Time in Hours | Printed Time | Number of Pulses Representing Tens Hours Digit | Number of Pulses Representing Units Hours Digit |
|---|---|---|---|
| 1 A.M. | 0100 | 1 | 2 |
| 2 | 0200 | 1 | 3 |
| 3 | 0300 | 1 | 4 |
| 4 | 0400 | 1 | 5 |
| 5 | 0500 | 1 | 6 |
| 6 | 0600 | 1 | 7 |
| 7 | 0700 | 1 | 8 |
| 8 | 0800 | 1 | 9 |
| 9 | 0900 | 1 | 10 |
| 10 | 1000 | 2 | 1 |
| 11 | 1100 | 2 | 2 |
| 12 Noon | 1200 | 2 | 3 |
| 1 P.M. | 1300 | 2 | 4 |
| 2 | 1400 | 2 | 5 |
| 3 | 1500 | 2 | 6 |
| 4 | 1600 | 2 | 7 |
| 5 | 1700 | 2 | 8 |
| 6 | 1800 | 2 | 9 |
| 7 | 1900 | 2 | 10 |
| 8 | 2000 | 3 | 1 |
| 9 | 2100 | 3 | 2 |
| 10 | 2200 | 3 | 3 |
| 11 | 2300 | 3 | 4 |
| 12 Midnight | 2400 | 3 | 5 |

Accordingly, each notation representing the hour at which a toll call is terminated comprises a two digit notation, i.e., a tens hours digit and a units hours digit. The position of the wiper 1456 with respect to the contacts forming the contact bank 1453 represents the tens hours digit. As described hereinabove, when viewed from right to left in Fig. 14 of the drawings, the contacts forming the contact bank 1453 represent "0" and the digits "1" "2." The "0" designating contact in the contact bank 1453 is connected to the normally open contacts 1151 associated with the first counting relay 1150. The remaining contacts representing the digits "1" and "2" are connected to a plurality of normally open contacts 1131 and 1126, respectively.

As disclosed in the table above, the counting relay chain 1100 controls the production of a series of groups of mark pulses in accordance with the magnitude of the digits in the units and tens denomination column of the notation of the hour at which the toll call is terminated. The counting chain 1100 is so connected with the output contact banks in the clock and calendar circuit 27 that a single pulse is representative of "0," and the digits are represented by a group of pulses one greater in number than the magnitude of the digit to be manifested. More particularly, assuming that the call is terminated at 2:17 a.m., a "0" is to be entered in the tens hours denominational column of the notation of the time at which the call is terminated. Therefore, the "0" manifasting or first contact in the contact bank 1453 is connected to the normally open contacts 1151 controlled by the first relay in the counting chain 1100. Since the wiper 1456 is grounded at contacts 1096 through the uppermost contacts controlled by the relays forming the steering relay circuit 1101, the normally open contacts 1151 are grounded thereby to indicate that a single pulse representing "0" is to be produced by the scanning circuit 28.

Referring now to the pulse relay 1190 and the pulse assist relay 1170, as described hereinbefore, these two relays are sequentially operated in the order named in response to the application of a ground pulse to the operating winding of the pulse forming relay 1190 from the pulse generator 1196. Following the termination of this ground pulse, the pulse forming relay 1190 is released to reclose the contacts 1191, 1192 and 1194 and to open the contacts 1193 and 1195. The opening of the contacts 1193 removes ground from the mark pulse conductor 765 so that the mark head 1201 in the associated recorder 25 is deenergized, thereby completing the production of a single mark pulse representing "0." The closure of the contacts 1194 applies ground through the closed contacts 1173 to the advance pulse conductor 763 so that the pulse repeater relay 650 in the one-way trunk circuit 19 is operated to energize the advance magnet 1205 in the associated recorder 25, thereby to advance the magnetic tape 1601 therein to the next printing position. The grounding of the conductor 763 also energizes a lamp 1007 to indicate that the tape 1601 is being advanced. The opening of the contacts 1195 does not release the pulse assist relay 1170 inasmuch as this relay is held operated through the locking circuit provided by the closure of the contacts 1175.

The closure of the contacts 1191 applies ground from the closed contacts 1171 through the plurality of lowermost contacts including a plurality of contacts 1129, 1136 and 1154 to the operating winding of the first counting relay 1150. This application of ground operates the counting relay 1150 to close a plurality of contacts 1151, 1152 and 1153 and to open the contacts 1154. The closure of the contacts 1152 precedes the opening of the contacts 1154 and the closure of the contacts 1151 and 1153, and establishes a locking path for the operating winding of the first counting relay 1150. This locking path includes the closed contacts 1152, a normally closed pair of contacts 1133, a normally closed pair of contacts 1182, the now closed contacts 1192 and 1172. This circuit maintains the first counting relay 1150 operated when the contacts 1154 are opened to interrupt the operating circuit for this relay. The closure of the contacts 1153 interconnects the operating winding of a second counting relay 1135 with a normally open pair of contacts 1183.

The closure of the contacts 1151 applies ground from the grounded wiper 1456 in the tens hours register circuit 1450 to the operating winding of a stop relay 1140 to operate this relay. The operation of the stop relay 1140 terminates the counting action of the counting chain 1100 under the control of the information manifested in the tens hours register circuit 1450. Accordingly, the pulse forming relay 1190 and the pulse assist relay 1170 are sequentially operated and the pulse forming relay 1190 is then released to provide the seized trunk recorder with a mark pulse and an advance pulse prior to the operation of each of the counting relays in the counting chain 1100. In response to each of these mark and advance operations, a relay in the counting chain 1100 is operated. When the operated relay closes an uppermost contact controlled thereby, similar to the contacts 1151, which is connected to the grounded contact in the associated register circuit in the clock and calendar circuit 27, the counting operation of the chain 1100 under the control of this register is terminated. In other words, the pulse forming relay and the pulse assist relay 1170 transmit a mark pulse to the mark head 1201 in the seized recorder and, following this mark pulse, transmit an advance pulse to the advance magnet 1205 therein, and thereafter, the release of the pulse forming relay 1190 operates the counting chain 1100 to determine whether or not an additional pulse representing the next highest digit should be transmitted to the seized recorder 25.

The operation of one of the relays in the counting chain 1100 to close the contact, similar to the contacts 1151, which is connected to ground through the clock and calendar circuit 27, operates the stop relay to close a plurality of contacts 1141, 1142, 1143, 1146 and to open a pair of contacts 1144, thereby terminating the production of the group of mark pulses representing the tens hours digit in the time notation at which the call is terminated. The closure of the contacts 1141 and 1142 provides a shunt around the contacts 1191 and 1192, respectively, so that the operated relay in the counting chain 1100 is not released in response to the next operation of the pulse forming relay 1190.

Since a space pulse is to follow the group of mark pulses representing the first digit transmitted from scanning circuit 28 to the seized recorder 25, the closure of the contacts 1143 and the opening of the contacts 1144 prepares a circuit for energizing the space pulse conductor 766 and interrupts the circuit for energizing the mark pulse conductor 765, respectively. The closure of the contacts 1146 prepares a circuit for operating a relay 1030.

Following the operation of the stop relay 1140, to terminate the first cycle of counting action by the counting chain 1100, another pulse is applied from the generator 1196 to the operating winding of the pulse forming relay 1190. The relay 1190 in operating opens the contacts 1191, 1192 and 1194 and closes the contacts 1193 and 1195. The opening of the contacts 1191 and 1192 produces no useful function at this time inasmuch as the previous closure of the contacts 1141 and 1142 provides a direct shunt around these contacts from the closed and grounded contacts 1171 and 1172 to maintain the relay 1150 in the counting chain 1100 operated.

The opening of the contacts 1194 removes ground from the advance pulse conductor 763 so that the advance magnet 1205 in the seized recorder is released, thereby terminating the stepping movement of the magnetic tape 1601 in the associated recorder 25, and the lamp 1007 is extinguished. The closure of the contacts 1193 applies ground through the previously closed contacts 1143 to the space pulse conductor 766 which, as described hereinbefore, energizes the space pulse head 1202 to produce a local area of magnetization representing a space pulse immediately following the single pulse representing "0" tens hours.

The closure of the contacts 1195 applies ground through the closed contacts 1146 and the normally closed contacts 1043 to the operating winding of the relay 1030. This operates the relay 1030 to open the contacts 1031 and to close a pair of contacts 1032. The opening of the contacts 1031, although interrupting the primary operating path for the start assist relay 1050, does not release this relay inasmuch as the locking path therefore extending through the closed contacts 1042, 1053, 1023 and 1015 is still complete. The closure of the contacts 1032 applies ground to the operating winding of a relay 1040, the other side of which is also connected to ground through the closed contacts 1025 so that the relay 1040 does not operate.

After a predetermined period of time, the pulse generator 1196 terminates the ground pulse applied to the operating winding of the pulse forming relay 1190 so that this relay is released to close the contacts 1191, 1192 and 1194 and to open the contacts 1193 and 1195. The closure of the contacts 1191 and 1192 produces no useful function at this time inasmuch as the circuits therethrough are maintained complete through the contacts 1141 and 1142 closed under the control of the stop relay 1140. The opening of the contacts 1193 removes ground from the space pulse conductor 766 so that the energization of the space head 1202 is terminated, thereby completing the production of a space pulse immediately following the first group of mark pulses. The closure of the contacts 1194 applies ground through the closed contacts 1173 to advance pulse conductor 763 which, as described hereinbefore, operates the pulse repeater relay 650 to energize the advance magnet 1205 in the associated recorder 25 so that the magnetic tape 1601 in this recorder is advanced to the next recording position. The opening of the contacts 1195 removes the ground shunt from around the operating winding of the relay 1040 so that this relay is operated by a circuit extending from grounded battery through the operating winding of the relay 1030, the closed contacts 1032, the operating winding of the relay 1040, and thence to ground through the closed contacts 1025.

The operation of the relay 1040, in series with the operating winding of the relay 1030, closes a pair of contacts 1041 and opens the contacts 1042, 1043 and 1044. The closure of the contacts 1041 produces no useful function at this time. The opening of the contacts 1043 disconnects the operating windings of the relays 1030 and 1040 from the contacts 1146 controlled by the stop relay 1140. The opening of the contacts 1044 removes ground from the start conductor extending to the pulse generator 1196 so that the pulse generator is rendered inoperative until such time as the scanning circuit 28 is energized to produce a second series of mark pulses representing the units hours digit of the time notation at which the toll call was completed. The opening of the contacts 1042 releases the start assist relay 1050 inasmuch as the opening of this contact breaks the locking circuit for this relay.

Accordingly, in response to the operation of the stop relay 1140, the scanning circuit 28 is operated to provide a space pulse on the magnetic tape 1601 of the associated recorder 25 immediately following the group of mark pulses representing the tens hours digit, and thereafter to provide a circuit for energizing the advance magnet 1205 in this recorder, so that the magnetic tape therein is advanced to the next recording position to receive the first of a group of mark pulses representing the second digit to be recorded, i.e., the digit representing the units hours designation of the time at which the call was terminated.

The release of the start assist relay 1050 in response to the operation of the relay 1040 closes the contacts 1051, 1052 and 1057 and opens the contacts 1053, 1054, 1056, 1058 and 1059. The opening of the contacts 1059 interrupts the circuit for applying ground to the start conductor of the pulse generator 1196 in a second place so that the pulse generator 1196 cannot be reoperated in response to the release of the relay 1040 preceding the reoperation of the start assist relay 1050. The opening of the contacts 1058 removes ground from the upper operating winding of the steering relay 1180 in the counting chain 1100 but produces no useful function at this time. The opening of the contacts 1054 removes ground from a conductor in the counting chain 1100 and also produces no useful function at this time.

The opening of the contacts 1056, however, interrupts the locking circuit for the pulse assist relay 1170 so that this relay releases. The release of the pulse assist relay 1170 opens the contacts 1171, 1172 and 1173 and 1175 and closes the contacts 1174. The opening of the contacts 1171 produces no useful function at this time. The opening of the contacts 1173 removes ground from the advance conductor 763 and extinguishes the lamp 1007. The opening of the contacts 1175 opens the locking path for the pulse assist relay 1170 in a second position and thereby conditions the pulse assist relay 1170 for operation under the control of the pulse forming relay 1190 and the pulse generator 1196 during the production of the second group of mark pulses. The closure of the contacts 1174 does not reoperate the pulse assist relay 1170 inasmuch as the contacts 1195 are open.

The opening of the contacts 1172 removes ground from the locking circuit of the first counting relay 1150 so that this relay releases to open the contacts 1151, 1152 and 1153 and to close the contacts 1154. The opening and closing of these contacts in response to the release of the relay 1150 conditions the counting chain 1100 for controlling the operation of the scanning circuit 28 to produce the next group of mark pulses representing the second digit to be transmitted to the associated trunk recorder 25. Also, the opening of the contacts 1151 removes ground from the operating winding from the stop relay 1140 so that this relay releases to open the contacts 1141, 1142, 1143 and 1146 and to close the contacts 1144.

The opening of the contacts 1143 opens a circuit for applying ground to the space pulse conductor 766 which is not grounded because of the release of the pulse forming relay 1190. The closure of the contacts 1144 prepares a circuit for operating the mark pulse conductor 765 in response to the next operation of the pulse forming relay 1190. The opening of the contacts 1146 interrupts the circuit for operating the relay 1030 in response to the next operation of the pulse forming relay 1190.

Therefore, the release of the start assist relay 1050 immediately following the operation of the stop relay 1140 conditions the pulse forming relay 1190, the pulse assist relay 1170, the stop relay 1140, and the counting chain 1100 for operation under the control of the pulses transmitted from the generator 1196 during the production of the group of mark pulses representing the next item of information to be transmitted to the associated trunk recorder 25.

The steering relay circuit 1101 is operated in a step-by-step manner in response to each operation of the stop relay 1140 so that ground is removed from the wiper in the register circuit of the clock and calendar circuit 27 which controlled the foregoing production of the first group of mark pulses and, thereafter, is applied to the wiper associated with the register circuit in the clock and calendar circuit 27 designating the magnitude of the digit which is next to be transmitted by the scanning circuit 28. To accomplish this, in response to the release of the start assist relay 1050, the contacts 1051 and 1052 are closed. The closure of the contacts 1051 completes a circuit for operating a first relay 1160 in the steering relay circuit 1101. This circuit extends from ground through the closed contacts 1015, 1023 and 1051, the plurality of lowermost contacts controlled by the relays forming the steering relay chain 1101 including the contacts 1148a and 1165 to the operating winding of the relay 1160 and thence to grounded battery. The operation of the relay 1160 opens a plurality of contacts 1161 and 1165 and closes a plurality of contacts 1162, 1163 and 1164. The closure of the contacts 1163 completes a locking circuit for the first relay 1160 in the steering relay circuit 1101. This locking circuit extends from grounded battery through the operating winding of the relay 1160 through the closed contacts 1163, 1145a, 1187, 1052, 1024, 1015 and thence to ground.

The opening of the contacts 1165 interrupts the operating circuit for the relay 1160 but this relay does not release due to the completion of the locking circuit therefor upon closure of the contacts 1163. The closure of the contacts 1164 connects the operating winding of a second relay 1145 in the steering relay circuit 1101 to a normally open pair of contacts 1188 thereby to condition this relay for being operated in response to the termination of the production of the group of mark pulses representing the second digit of the time and date information. The opening of the contacts 1161 removes ground applied through the normally closed contacts 1096 and the remainder of the uppermost contacts controlled by the relays in the steering relay circuit 1101 from the wiper 1456 in the tens hours register circuit 1450 and thereby terminates the control of the scanning circuit 28 by this register circuit. The closure of the contacts 1162 applies ground to the wiper 1466 in the units hours register circuit 1460 so that the next cycle of operation of the counting chain 1100 is controlled in accordance with the selective position of this wiper to manifest the magnitude of the digit to be entered in the units hours denominational column of the time notation relating to this completed call. Accordingly, in response to the first operation of the stop relay 1140, the first relay 1160 in the steering relay circuit 1101 is operated to render the tens hours register circuit 1450 ineffective to control the operation of the scanning circuit 28 and to render the units hours register circuit 1460 effective to control the production of the next group of mark pulses.

Simultaneously with the closure of the contacts 1051 and 1052 to produce the first operation of the steering relay circuit 1101, the contacts 1057 are closed. The closure of the contacts 1057 applies ground to the battery terminal energizing the serially connected relays 1030 and 1040 and thereby provides a ground shunt around the operating coils of these relays. Therefore, the relays 1030 and 1040 release to close the contacts 1031, 1042, 1043 and 1044 and to open the contacts 1032 and 1041. The closure of the contacts 1043 prepares a circuit for operating the relay 1030 in response to the next operation of the stop relay 1140. The closure of the contacts 1044 completes a circuit to the open contacts 1059 which, upon closure thereof, initiates a new cycle of operation of the generator 1196. The opening of the contacts 1032 disconnects the operating winding of the relay 1040 from the operating winding of the relay 1030. The opening of the contacts 1041 produces no useful function at this time.

The sequential closure of the contacts 1031 and 1042 reestablishes not only the primary operating circuit but also prepares the locking circuit for the start assist relay 1050. The completion of the operating circuit for the relay 1050 operates this relay to open the contacts 1051, 1052 and 1057 and to close the contacts 1053, 1054, 1056, 1058 and 1059. The closure of the contacts 1053 completes the locking circuit for the start assist relay 1050. The closure of the contacts 1054 applies ground to a conductor in the counting relay chain 1100. The closure of the contacts 1058 applies ground to the upper operating winding of the steering relay 1180 in the counting chain 1100. The closure of the contacts 1056 prepares the locking circuit for the pulse assist relay 1170. The opening of the contacts 1957 removes the ground shunt from around the relay 1030 so that this relay may be operated in response to the application of ground thereto through the normally closed contacts 1043.

The opening of the contacts 1052 breaks the previously established locking circuit for the relay 1160 in the steering relay circuit 1101. However, the relay 1160 is not released in response to the opening of the contacts 1052 inasmuch as this relay is operated in series with the upper winding of a steering relay 1185 in the steering relay circuit 1101. This circuit extends from grounded battery through the operating winding of the relay 1160, the closed contacts 1163 and 1145a, the upper operating winding of the steering relay 1185, to ground at closed contacts 1011. In addition to maintaining the relay 1160 operated, this path operates the steering relay 1185 to open a plurality of contacts 1187 and 1189 and to close a plurality of contacts 1186 and 1188.

The closure of the contacts 1186 prepares a locking circuit extending through the lower operating winding of the relay 1185 to the now open contacts 1052. The closure of the contacts 1188 prepares a circuit for operating the relay 1145 in response to the next closure of the contacts 1051. The opening of the contacts 1187 interrupts the circuit extending to the upper operating winding of the steering relay 1185 so that upon reclosure of the contacts 1051 the relay 1160 is released. The opening of the contacts 1189 performs no useful function at this time.

The next digit of information to be transmitted to the seized trunk recorder 25, from the scanning circuit 28, is the units hours digit of the time notation at which the toll call was terminated. To prepare the scanning circuit 28 for transmitting a group of mark pulses representative of this digit, the previous operation of the steering relay circuit 1101 removed ground from the wiper 1456 in the tens hours register circuit 1450 and applied ground to the wiper 1466 in the units hours register circuit 1460. Assuming the example above, wherein the toll call was terminated at 2:17 a.m., the wiper 1466 is positioned in engagement with the third contact in the contact bank 1463, which contact is designated by the digit "2." As shown in the above table, the scanning circuit 28 produces three mark pulses to represent the digit "2." To accomplish this, the third contact representing the digit "2" in the contact bank 1463 is connected to a normally open pair of contacts 1126 controlled by a relay 1125 in the counting relay chain 1100.

Coincident with the reoperation of the start assist relay 1050, the contacts 1059 are closed to complete the application of ground to the start conductor of the pulse generator 1196. In response to the receipt of this ground pulse, the pulse generator 1196 produces a ground pulse which is applied to the operating winding of the pulse forming relay 1190 to operate this relay. In operating, the relay 1190 opens the contacts 1191, 1192 and 1194 and closes the contacts 1193 and 1195. The opening of the contacts 1191 and 1192 produces no useful function at this time. The closure of the contacts 1193 applies ground through the closed contacts 1144 to the mark pulse conductor 765 to reenergize the mark head 1201 to produce a single mark pulse. The opening of the contacts 1194 produces no useful function at this time. The closure of the contacts 1195 operates the pulse assist relay 1170 to close the contacts 1171, 1172, 1173 and 1175 and to open the contacts 1174. The opening of the contacts 1174 and the closure of the contacts 1175 breaks the operating circuit and completes the locking circuit for the pulse assist relay 1170 as described hereinabove. The closure of the contacts 1173 prepares an operating circuit for applying ground to the advance pulse conductor 763. The closure of the contacts 1171 and 1172 prepares a circuit for initiating another cycle of operation of the counting relay chain 1100 under the control of the units hours register circuit 1460.

Following a predetermined period of time, the pulse generator 1196 terminates the ground pulse applied to the pulse forming relay 1190 so that this relay releases to close the contacts 1191, 1192 and 1194 and to open the contacts 1193 and 1195. The opening of the contacts 1195 produces no useful function at this time inasmuch as the pulse assist relay 1170 is maintained operated through the locking circuit extending to the closed contacts 1175. The closure of the contacts 1194 applies ground to the advance pulse conductor 763 so that the advance magnet 1205 in the associated trunk recorder 25 is operated to step the magnetic tape 1601 therein to the next recording position. The opening of the contacts 1193 terminates the ground pulse applied to the mark pulse conductor 765.

The closure of the contacts 1191 completes the operating circuit for the first counting relay 1150 in the counting relay chain 1100, as described hereinabove, so that this relay operates to close the contacts 1151, 1152 and 1153 and to open the contacts 1154. The closure of the contacts 1152, as described hereinabove, completes a locking circuit for the first counting relay 1150 which extends through the closed contacts 1192 to ground through the closed contacts 1172. The closure of the contacts 1153 connects the operating winding of the second counting relay 1135 to the open contacts 1183. The opening of the contacts 1154 interrupts the energizing winding of the first counting relay 1150, but this relay does not release inasmuch as the closure of the contacts 1152 completes the locking circuit therefor. The closure of the contacts 1151 does not energize the stop relay 1140 inasmuch as ground is not applied to this contact by the clock and calendar circuit 27.

After a predetermined period of time, the pulse generator 1196 again applies ground to the operating winding of the pulse forming relay 1190 to operate this relay, thereby to close the contacts 1193 and 1195 and to open the contacts 1191, 1192 and 1194. The opening of the contacts 1194 terminates the application of the ground to the advance conductor 763, and the closure of the contacts 1193 applies ground to the mark pulse conductor 765 so that the mark head 1201 in the seized recorder 25 is reenergized to produce a second mark pulse in the group representing the magnitude of the digit in the units hours denominational column of the notation of the time at which this toll call was completed. The closure of the contacts 1195 produces no useful function inasmuch as the pulse assist relay 1170 is maintained operated through the locking circuit extending through the closed contacts 1175. The opening of the contacts 1191 removes ground from counting chain 1100. The opening of the contacts 1192 removes ground from one side of the upper operating winding of the steering relay 1180 in the counting chain 1100. The opening of the contacts 1192 also removes ground from the previously described locking circuit for the first counting relay 1150 in the counting chain 1100. However, this relay is not released in response to the opening of the contacts 1192 inasmuch as this relay operates in series with the upper operating winding of the steering relay 1180 so that the first counting relay 1150 is maintained operated and the steering relay 1180 is operated. This circuit extends from grounded battery at the operating winding of the first counting relay 1150 through the contacts 1152 and 1133 to the upper operating winding of the steering relay 1180 and to ground through the closed contacts 1058.

The operation of the steering relay 1180 closes the contacts 1181 and 1183 and opens the contacts 1182 and 1184. The closure of the contacts 1181 prepares a locking path for the lower operating winding of the steering relay 1180. The opening of the contacts 1182 interrupts, at another point, the locking circuit for the first counting relay 1150. The closure of the contacts 1183 prepares a path for operating the second counting relay 1135 through the now closed contacts 1153. The opening of the contacts 1184 disconnects the contacts 1191 from a common conductor in the counting chain 1100 and produces no useful function at this time.

Following a predetermined period of time, the pulse generator 1196 removes ground from the operating winding of the pulse forming relay 1190 so that this relay releases to close the contacts 1191, 1192 and 1194, and to open the contacts 1193 and 1195. The opening of the contacts 1195 removes ground from the pulse conductor 765, thereby terminating the second mark pulse on the magnetic tape 1601 of the seized recorder 25. The closure of the contacts 1194 applies ground to the advance conductor 763 so that the advance magnet 1205 in the seized recorder 25 is energized to advance the tape to the next recording position. The opening of the contacts 1195 produces no useful function at this time. The closure of the contacts 1191 operates the second counting relay 1135 through a circuit extending from grounded contacts 1171 through contacts 1191, 1183 and 1153.

The operation of the relay 1135 closes the contacts 1131, 1132 and 1134 and opens a pair of contacts 1136 and 1133. The closure of the contacts 1132 completes a locking circuit for the second counting relay 1135 which extends from grounded battery through the operating winding of the relay 1135, and through the closed contacts 1132 to the closed contacts 1054 controlled by the start assist relay 1050. The opening of the contacts 1133 breaks the locking circuit for the first counting relay 1150 so that this relay releases. The opening of the contacts 1133, in addition to breaking the locking circuit for the first counting relay 1150, also removes battery from the upper operating winding of the steering relay 1180.

However, this relay does not release at this time, inasmuch as the closure of the contacts 1192 simultaneous with the closure of the contacts 1191 applies ground through closed contacts 1172 and closed contacts 1181 to energize the lower operating winding of the steering relay 1180, thereby completing a locking circuit for maintaining this relay operated.

The closure of the contacts 1134 prepares an operating circuit for the third counting relay 1125 in the counting chain 1100, which operating circuit extends to the now open contacts 1184. The opening of the contacts 1136 produces no useful function at this time. The closure of the contacts 1131 also produces no useful function at this time inasmuch as this contact is not grounded by the clock and calendar circuit 27.

The pulse generator 1196 thereupon reapplies ground to the operating winding of the pulse forming relay 1190 so that this relay operates to open the contacts 1191, 1192 and 1194 and to close the contacts 1193 and 1195. The opening of the contacts 1194 terminates the application of ground to the advance pulse conductors 763 and the closure of the contacts 1193 reapplies ground to the mark pulse conductor 765, thereby to initiate the production of a third mark pulse on the magnetic tape 1601 in the associated recorder 25 representing the magnitude of the digit to be entered in the units hours denominational column of the time notation at which the toll call was terminated. The operating of the contacts 1195 produces no useful function.

The opening of the contacts 1192 breaks the locking circuit for the lower operating winding of the steering relay 1180 in the counting chain 1100 so that this relay releases to open the contacts 1181 and 1183 and to close the contacts 1182 and 1184. The opening of the contacts 1181 breaks the locking circuit or operating circuit for the steering relay 1180 in a second place. The closure of the contacts 1182 prepares a circuit for locking up the relay 1125 when this relay is operated. The opening of the contacts 1183 opens one operating path for alternate relays in the counting chain 1100. The closure of the contacts 1184 prepares a path for operating the counting relay 1125 in response to the next closure of the contacts 1191. Accordingly, the release of the steering relay 1180 conditions a path for operating the next successive relay in the counting chain 1100, and also prepares a locking path for maintaining the next operated relay in the counting chain 1100 operated.

Thereafter, the pulse generator 1196 removes ground from the operating winding of the pulse forming relay 1190 so that this relay releases to close the contacts 1191, 1192, 1194 and to open the contacts 1193 and 1195. The opening of the contacts 1193 and the closure of the contacts 1194 removes ground from the mark pulse conductor 765 and applies ground to the advance pulse conductor 763 so that the recorder 25 is conditioned for another cycle of operation to record the next pulse in the group of mark pulses representing the magnitude of the digit in the units hours denominational column of the time notation at which the call was terminated. The closure of the contacts 1191 applies ground through the closed contacts 1171, 1184 and 1134 to operate the third counting relay 1125 and thereby to close a plurality of contacts 1126, 1125a and 1128 and to open a plurality of contacts 1127 and 1129.

The closure of the contacts 1125a precedes the opening and closing of the other contacts controlled by the relay 1125 and completes a locking circuit for this relay. This circuit extends from grounded battery to the operating winding of the relay 1125 and thence through the closed contacts 1125a, 1118, 1182 and 1192 to ground through the contacts 1172. This circuit maintains the relay 1125 operated when the opening of the contacts 1127 under the control of the operation of the third counting relay 1125 interrupts the locking circuit for the second counting relay 1135 so that this relay releases and opens the contacts 1134 through which the third counting relay 1125 was operated. The opening of the contacts 1129 produces no useful function at this time. The closure of the contacts 1128 prepares an operating circuit for a fourth counting relay 1115.

The closure of the contacts 1126 completes this cycle of the counting chain 1100 inasmuch as the contacts 1126 are grounded through the wiper 1466 in the units hours register circuit 1460, thus indicating that the magnitude of the digit to be entered in the units hours denominational column of the time notation is "2." It should be recalled that the counting chain 1100 is operated so that three successive relays 1150, 1135 and 1125 are sequentially operated, thus indicating that the pulse forming relay 1190 has operated and released three times, thereby to produce three mark pulses on the magnetic tape 1601 in the associated recorder 25. As disclosed in the table above, three mark pulses in the units hours denominational column of the time notation represents a digit having a magnitude of "2." Accordingly, the operation of the third relay in the counting chain 1100, following the production of three mark pulses closes the contacts 1126 and terminates this cycle of counting operation by the chain 1100.

The closure of the contacts 1126 terminates this counting cycle by applying ground to the operating winding of the stop relay 1140 so that this relay is operated to close the contacts 1141, 1142, 1143 and 1146 and to open the contacts 1144. The closure of the contacts 1141 and 1142 maintains the third counting relay 1125 operated inasmuch as the closure of the contacts 1142 provides a shunt around the now closed contacts 1192. As described hereinabove, the closure of the contacts 1143 and the opening of the contacts 1144 prepare a path to the space pulse conductor 766 and interrupt the previously prepared path for the mark pulse conductor 765, respectively. The closure of the contacts 1146 prepares a path for operating the relay 1030.

When the pulse relay 1190 is next operated to open the contacts 1191, 1192 and 1194 and to close the contacts 1193 and 1195 under the control of the pulse generator 1196, ground is applied through the closed contacts 1143 to produce a space pulse on the magnetic tape 1601 in the recorder 25, thereby indicating that the completion of the second group of mark pulses representative of data from the clock and calendar circuit 27 has been completed. The opening of the contacts 1191 and 1192 does not affect the operation of the counting chain 1100 inasmuch as the previous closure of the contacts 1141 and 1142 maintains the locking path for the operated relay in this chain. The closure of the contacts 1195 operates the relay 1030.

When the ground pulse is terminated by the pulse generator 1196, the pulse forming relay 1190 releases to close the contacts 1191, 1192 and 1194 and to open the contacts 1193 and 1195. The opening of the contacts 1193 terminates the energizing circuit for the space head 1202 in the associated recorder 25, thereby completing the production of a single space pulse following the second group of mark pulses, and the closure of the contacts 1194 applies ground to the advance pulse conductor 763 so that the magnetic tape 1601 is advanced to the next recording position. The opening of the contacts 1195 removes the ground shunt from around the operating winding of the relay 1040 so that, as described in detail hereinabove, the relays 1030 and 1040 operate in series to close the contacts 1041 and to open the contacts 1042, 1043 and 1044. The opening of the contacts 1044 removes ground from the start conductor of the pulse generator 1196 so that this generator is stopped. The opening of the contacts 1042 breaks the locking circuit for the start assist relay 1050 so that this relay releases. The opening of the contacts 1043 and the closure of the contacts 1041 produce no useful function at this time.

The release of the start assist relay 1050 closes the contacts 1051, 1052 and 1057 and opens the contacts 1053, 1054, 1056, 1058 and 1059. The opening of the contacts 1054 and 1058 remove ground from two common locking circuits in the counting chain 1100 but produce no useful function at this time inasmuch as the third counting relay 1125 is maintained operated through the locking circuit extending to ground through the closed contacts 1182, 1142 and 1172. The opening of the contacts 1059 opens the operating circuits for the pulse generator 1196 in a second place. The opening of the contacts 1053 interrupts the locking circuit for the start assist relay 1050 at a second point.

The opening of the contacts 1056 breaks the locking circuit for the pulse assist relay 1170 so that this relay releases to open the contacts 1171, 1172, 1173 and 1175 and to close the contacts 1174. The opening of the contacts 1172 breaks the locking path for maintaining the third counting relay 1125 operated so that this relay releases, thereby conditioning the counting chain 1100 for another cycle of operation under the control of the clock and calendar circuit 27. The opening of the contacts 1175 interrupts the locking path for the pulse assist relay 1170 and the closure of the contacts 1174 completes an operating path for this relay. The opening of the contacts 1173 removes ground from the advance pulse conductor 763 to condition the advance magnet 1205 in the seized recorder 25 for another cycle of operation.

The closure of the contacts 1057 in response to the release of the start assist relay 1050 applies a ground shunt around the operating windings of the serially operated relays 1030 and 1040 so that these relays release to condition the scanning circuit 28 for another cycle of operation. Simultaneously with releasing the relays 1030 and 1040, the closure of the contacts 1051 and 1052 operates the second counting relay in the steering relay circuit 1101. The relay 1145 is operated over a circuit extending from ground at closed contacts 1015 through the contacts 1023, 1051, 1188, 1164 and through the operating winding of the relay 1145 to battery. The operation of the relay 1145 opens the contacts 1147, 1145a and 1148a and closes the contacts 1148, 1149 and 1147a.

The closure of the contacts 1149 completes a locking circuit for the relay 1145 which extends to the closed and grounded contacts 1012. The opening of the contacts 1145a interrupts the locking circuit for the first relay 1160 in the steering relay chain 1101 so that this relay releases. In releasing, this relay opens the contacts 1163 thereby removing battery from the previous circuit for serially operating the relays 1160 and 1185. However, the steering relay 1185 remains operated inasmuch as the closure of the contacts 1052 completes a locking circuit extending from grounded and closed contacts 1015, through the contacts 1024, 1052 and 1086, and the lower operating winding of the steering relay 1185. The release of the relay 1160 closes the contacts 1161 to condition a circuit for applying ground to the wiper 1456 in the tens hours register circuit 1450. However, ground is not applied to this wiper inasmuch as the previous operation of the second relay 1145 in the steering relay chain 1101 opens the contacts 1147, thereby removing ground from the contacts 1161.

The closure of the contacts 1148 simultaneously with the opening of the contacts 1148 applies ground to the wiper 1476 in the tens minutes register circuit 1470. The closure of the contacts 1147a prepares an operating circuit for a third relay 1130 in the steering relay circuit 1101. The opening of the contacts 1148a, interrupts the energizing circuit for the operating winding of the first counting relay 1160 so that this relay is not reoperated under the control of the start assist relay 1050.

The release of the relays 1030 and 1040, as described hereinabove, in response to the closure of the contacts 1057 reestablishes the operating circuit for the start assist relay 1050 so that this relay operates to open the contacts 1051, 1052 and 1057 and to close the contacts 1053, 1054, 1056, 1058 and 1059. The opening of the contacts 1051 serves no useful function at this time. The opening of the contacts 1052 removes ground from the lower operating winding of the steering relay 1185 so that this relay releases to open the contacts 1186 and 1188 and to close the contacts 1187 and 1189. The opening of the contacts 1186 opens the operating circuit for the lower operating winding of the steering relay 1185. The closure of the contacts 1187 prepares a locking circuit for the next unoperated relay in the steering relay chain 1101. The opening of the contacts 1188 breaks the operating circuit for the relay 1145 at a second place, and the closure of the contacts 1189 prepares a circuit for operating the relay 1130.

Accordingly, in response to the second operation of the stop relay 1140 to terminate the production of the group of mark pulses representing the units hours digit, the start assist relay 1050 is released and reoperated, thereby initiating another stepping operation in the steering relay circuit 1101 so that ground is removed from the wiper 1466 in the units hours register circuit 1460 and is applied to the wiper 1476 in the tens minutes register circuit 1470 whereby the next cycle of operation of the counting chain 1100 in the scanning circuit 28 is under the control of the tens minutes register circuit 1470 in the clock and calendar circuit 27. Therefore, the next group of pulses recorded on the magnetic tape 1601 in the associated trunk recorder 25 is representative of the magnitude of the digit to be entered in the tens minutes denominational column of the time notation at which this particular call was terminated. The stop relay 1140 is released in response to the release of the pulse assist relay 1170 so that the contacts 1141, 1142, 1143 and 1146 are opened and the contacts 1144 are closed thereby to condition the scanning circuit 28 for operation under the control of the tens minutes register circuit 1470 in the clock and calendar circuit 27.

As shown in the following table, the portion of the time notation relating to the time at which the toll call is completed, which is to be expressed in minutes, includes the notations "01" to "59," inclusive. The production of mark pulses to represent these numerical designations of clock time in minutes utilizes a single mark pulse to represent "0" and ten mark pulses to represent the digit "9." For instance, if the time of termination is twenty-one minutes after a particular hour, the wiper 1476 in the tens minutes register circuit 1470 is in engagement with the third contact in the contact bank 1473, and this contact is connected to the uppermost contacts 1126 controlled by the counting relay 1125, the operation of which indicates the production of three mark pulses. The same is true in the units minutes register circuit 1480. Again assuming that the call was terminated at twenty-one minutes after a given hour, the wiper 1486 is in engagement with the second contact in the contact bank 1483. This contact is connected to the contacts 1131, controlled by the second counting relay 1135, so that when this relay is operated following the production of two mark pulses by the pulse forming relay 1190 the stop relay 1140 is operated to terminate the production of mark pulses representing the magnitude of the digit in the units minutes denominational column.

| Clock Time in Hours | Printed Designation of Time in Minutes | Number of Mark Pulses Representing Tens Minutes Digit | Number of Mark Pulses Representing Units Minutes Digit |
|---|---|---|---|
| 1 | 01 | 1 | 2 |
| 2 | 02 | 1 | 3 |
| 3 | 03 | 1 | 4 |
| ⋮ | ⋮ | ⋮ | ⋮ |
| 10 | 10 | 2 | 1 |
| 11 | 11 | 2 | 2 |
| ⋮ | ⋮ | ⋮ | ⋮ |
| 20 | 20 | 3 | 1 |
| 21 | 21 | 3 | 2 |
| ⋮ | ⋮ | ⋮ | ⋮ |
| 30 | 30 | 4 | 1 |
| 31 | 31 | 4 | 2 |
| ⋮ | ⋮ | ⋮ | ⋮ |
| 40 | 40 | 5 | 1 |
| 41 | 41 | 5 | 2 |
| ⋮ | ⋮ | ⋮ | ⋮ |
| 50 | 50 | 6 | 1 |
| 51 | 51 | 6 | 2 |
| ⋮ | ⋮ | ⋮ | ⋮ |
| 59 | 59 | 6 | 10 |

In accordance with the assumption above, wherein this toll call is assumed to have terminated at 2:17 A.M., the third group of mark pulses represents the tens minutes digit "1." To represent this digit, the wiper 1476 in the tens minutes register circuit 1470 is positioned on the second contact in the contact bank 1473. This contact is directly connected to the now open contacts 1131 controlled by the second stepping relay 1135 in the counting chain 1100.

Following the closure of the contacts 1059, the pulse generator 1196 is reenergized to produce sequential operation and release of the pulse forming relay 1190. Under the control of the pulses produced by the relay 1190, the counting chain 1100 is operated, so that the first relay 1150 is operated and released, thereby indicating that a first mark pulse has been recorded on the magnetic tape 1601 in the associated recorder 25. Thereafter, the second counting relay 1135 in the counting chain 1100 is operated. The operation of this relay closes the contacts 1131 so that the stop relay 1140 is operated to terminate the production of the third group of mark pulses containing two discrete pulses representing a digit having a magnitude of "1" which is representative of the magnitude of the digit in the tens minutes denominational column of the time notation at which the call was terminated.

Following the operation of the second counting relay 1135, the pulse forming relay 1190, the pulse assist relay 1170, the relays 1030 and 1040, and the stop relay 1140 are operated and released and the start assist relay 1050 is released and then operated to complete the production of the third group of mark pulses followed by a single space pulse. During this operation, the release and subsequent reoperation of the start assist relay 1050 energizes the steering relay circuit 1101 so that the relay 1145 is released and the relay 1130 is operated. The operation of the relay 1130 closes a pair of contacts 1130a so that ground is applied through the closed contacts 1096 to the wiper 1486 in the units minutes register circuit 1480 of the clock and calendar circuit 27. Accordingly, following the production of the third group of mark pulses representing the tens minutes digit, the clock and calendar circuit 27 is rendered effective to control the operation of the scanning circuit 28 in accordance with the magnitude of the digit to be entered in the units minutes denominational column of the time notation at which the toll call was completed.

In accordance with the above assumption, wherein the time of termination of the call was set at 2:17 A.M., the wiper 1486 is in engagement with the eighth contact in the contact bank 1483, which contact manifests the digit "7." This contact is connected to the uppermost contact controlled by the counting relay 1080 in the counting chain 1100. Accordingly, when the pulse generator 1196 is again rendered effective in response to the operation of the start assist relay 1050 to close the contacts 1059, the counting chain 1100 is rendered effective to sequentially operate and release all of the relays 1150, 1135, 1125, 1115, 1105, 1090, 1085 and 1080, thereby indicating the production of eight mark pulses by the pulse forming relay 1190.

In response to the operation of the counting relay 1080 following the production of eight pulses representing the digit "7," the stop relay 1140 is operated to initiate a resetting cycle identical to that described above in conjunction with the description of the production of groups of mark pulses representing the tens hours, units hours, and tens minutes digits so that the fourth group of mark pulses is followed by a space pulse.

Incident to this resetting operation, the start assist relay 1050 is released and reoperated so that a relay 1120 in the steering circuit 1101 is operated to close a pair of contacts 1121. The closure of the contacts 1121 applies ground through the normally closed contacts 1096 to the wiper 1366 in the months register circuit 1360. As shown in the following table, the months are designated numerically by the designations "01" to "12," inclusive, which correspond to the months of January to December, respectively. Also, as shown in the following table, the magnitude of the digits forming the numerical designation is represented by an equal number of mark pulses. For instance, assuming the call to have been terminated on the twenty-first day of June, the printed representation of the month is "06" and this designation is recorded in the form of six separate mark pulses. As discussed hereinabove, during the month of June the wiper 1366 is in engagement with the sixth contact in the contact bank 1365, and, since this contact is to control the production of six mark pulses, it is connected to the uppermost contact controlled by the sixth relay in the counting chain 1100. This is distinguished from the production of the groups of mark pulses representing the time on which the call was completed inasmuch as a single pulse therein is utilized to represent "0," whereas in the months register circuit 1360 a single pulse represented by the first contact is utilized to represent the digit "1." Accordingly, the contact representing the month of June in the months register circuit 1360 is grounded under the control of the steering circuit 1101 and is connected to the uppermost contact controlled by the relay 1090.

| Month | Printed Designation of Month | Number of Pulses Representing Months Designation |
|---|---|---|
| January | 01 | 1 |
| February | 02 | 2 |
| March | 03 | 3 |
| April | 04 | 4 |
| May | 05 | 5 |
| June | 06 | 6 |
| July | 07 | 7 |
| August | 08 | 8 |
| September | 09 | 9 |
| October | 10 | 10 |
| November | 11 | 11 |
| December | 12 | 12 |

In response to the operation of the start assist relay 1050, following the actuation of the steering relay circuit 1101 to operate the relay 1120 thereby conditioning the months register circuit 1360 for controlling the operation of the scanning circuit 28, the pulse generator 1196 is rendered effective to operate the pulse forming relay 1190. The pulse forming relay 1190 is operated and released six times to ground the mark pulse conductor 765 six times. Coincident with these operations of the pulse forming relay 1190, the relays 1150, 1135, 1125, 1115, 1105 and 1090 in the counting relay chain 1100 are sequentially operated and released, thus indicating that six pulses have been produced by the pulse forming relay 1190. The operation of the counting relay 1090 closes the uppermost contact controlled thereby so that ground is applied to the operating winding of the stop relay 1140. The operation of the stop relay 1140 initiates a resetting operation of the scanning circuit 28, in the manner described above in detail, thereby to complete the production of the fifth group of mark pulses representing the month during which the toll call was terminated.

Coincident to this resetting operation, the start assist relay 1050 is released and reoperated. The release of the start assist relay 1050 operates the steering relay chain 1101 so that a relay 1110 is operated to close a pair of contacts 1111 controlled thereby. The closure of the contacts 1111 applies ground to the wiper 1376 in the tens days register circuit 1370 of the clock and calendar circuit 27. Coincident to this application of ground to the wiper 1376, the months register circuit 1360 is disabled from controlling the production of mark pulses by the scanning circuit 28.

The tens days register circuit 1370 and the units days register circuit 1380 are interconnected with the counting relay chain 1100 in the scanning circuit 28 in the same manner as the tens hours register circuit 1450, the units hours register circuit 1460, the tens minutes register circuit 1470 and the units minutes register circuit 1480, so that the magnitude of the digit to be manifested is represented by a group of mark pulses one greater in number than the numerical value of the digit to be entered. This is true inasmuch as a single mark pulse is utilized to represent "0." Accordingly, in view of the assumed date on which the call was completed, i.e. June twenty-first, the wiper 1376 is in engagement with the third contact in the contact bank 1373. This contact is directly connected to the contacts 1126 controlled by the third counting relay 1125.

Upon reoperation of the start assist relay 1050, the contacts 1059 are reclosed to initiate operation of the pulse generator 1196. In response to signals received therefrom, the pulse forming relay 1190 is operated and released three times to produce three ground pulses on the mark pulse conductor 765, thereby to control production of three mark pulses representing the digit "2" in the group of pulses recorded on the magnetic tape 1601 of the associated recorder 25 corresponding to the magnitude of the digit in the tens days denominational column of the notation of the date on which the toll call was completed. Coincident with the operation of the pulse forming relay 1190 to produce these mark pulses, the relays 1150, 1135 and 1125 in the counting relay chain 1100 are operated. In response to the operation of the relay 1125, the contacts 1126 are closed to apply ground to the operating winding of the stop relay 1140 so that this relay operates.

In response to the operation of the stop relay 1140, the scanning circuit 28 is reset to condition this circuit for the production of the seventh group of mark pulses representing the magnitude of the digit to be entered in the units days denominational column of the notation representing the date on which the toll call was terminated. As described hereinabove, the start assist relay 1050 is released during the resetting operations. The release of the start assist relay 1050 closes the contacts 1051, 1052 and 1057 and opens the contacts 1053, 1054, 1056, 1058 and 1059. The closure of the contacts 1051 and 1052 operates a relay 1095 in the steering relay circuit 1101.

The operation of the relay 1095 opens the contacts 1096 and closes the contacts 1097 and 1098. The opening of the contacts 1096 removes ground from the wiper 1376 in the tens days register circuit 1370, and the closure of the contacts 1097 applies ground to the wiper 1386 in the units days register circuit 1380. In accordance with the above assumption wherein this toll call was terminated on the twenty-first day of June, the wiper 1386 is in engagement with the second contact in the contact bank 1383, and this contact is connected to the normally open contacts 1131 controlled by the second counting relay 1135 in the counting chain 1100 thereby to control the scanning circuit 28 to produce two mark pulses in the group of mark pulses representing the magnitude of the digit to be entered in the units days denominational column.

The closure of the contacts 1098 prepares a circuit for operating a code complete relay 1000 thereby indicating that all of the items of information relating to the time and date on which a call is completed have been transmitted to the associated trunk recorder 25.

The following operation of the start assist relay 1050 opens the contacts 1051, 1052 and 1057 and closes the contacts 1053, 1054, 1056, 1058 and 1059. The closure of the contacts 1059 initiates operation of the pulse generator 1196. In response to pulses produced in the generator 1196, the pulse forming relay 1190 is operated and released two times thereby applying ground to the mark pulse conductor 765 to produce two discrete mark pulses on the magnetic tape 1601 in the recorder 25. Coincident with the production of the two mark pulses, the first counting relay 1150 in the counting chain 1100 is operated and released, and the second counting relay 1135 is operated to close the contacts 1131, 1132 and 1134 and to open the contacts 1133 and 1136. The closure of the contacts 1131 applies ground to the operating winding of the stop relay 1140 so that this relay operates to close the contacts 1141, 1142, 1143 and 1146 and to open the contacts 1144. Following the operation of the stop relay 1140, the pulse generator 1196 removes ground from the operating winding of the pulse forming relay 1190 so that this relay releases to close the contacts 1191, 1192 and 1194 and to open the contacts 1193 and 1195. The opening of the contacts 1193 removes ground from the mark pulse conductor 765, thereby terminating the production of the second mark pulse in the seventh group of mark pulses produced for recording information relating to the date and time of the completion of the toll call. The closure of the contacts 1194 applies ground to the advance pulse conductor 763 so that the advance magnet 1205 in the associated recorder 25 is energized to advance the magnetic tape 1601 therein to the next recording position.

Following the operation of the stop relay 1140 in response to the completion of the production of the last group of mark pulses representing items of information relating to the time and date of completing the call, the pulse generator 1196 applies ground to the operating winding of the pulse forming relay 1190 to operate this relay to open the contacts 1191, 1192 and 1194 and to close the contacts 1193 and 1195. The opening of the contacts 1192 and 1191 does not affect the operated relay in the counting chain 1100 inasmuch as the previous closure of the contacts 1141 and 1142 provides a shunt around these contacts. The closure of the contacts 1193 applies ground through the closed contacts 1143 to the space pulse conductor 766 so that a space pulse is recorded on the magnetic tape 1601 in the recorder 25 immediately following the last group of mark pulses representing the magnitude of the digit to be entered in the units days denominational column of the date notation. The opening of the contacts 1194 removes ground from the advance pulse conductor 763 thereby to condition this conductor for the receipt of the next group of advance pulses. The closure of the contacts 1195 applies ground through the closed contacts 1146 and 1043 to operate the relay 1030 to open the contacts 1031 and to close the contacts 1032.

At the termination of this pulse from the generator 1196, the pulse forming relay 1190 releases to close the contacts 1191, 1192 and 1194 and to open the contacts 1193 and 1195. The opening of the contacts 1193 removes ground from the space pulse conductor 766 so that the energization of the space head 1202 in the recorder 25 is terminated. The closure of the contacts 1194 connects ground to the advance pulse conductor 763 so that the magnetic tape 1601 is advanced to the next recording position. The closure of the contacts 1191 and 1192 produces no useful function at this time inasmuch as the contacts 1141 and 1142 have maintained the circuits to the counting chain 1100 complete during the operation of the pulse forming relay 1190.

The opening of the contacts 1195 removes the ground shunt from the operating winding of the relay 1040 so that this relay operates in series with the operating winding of the relay 1030, thereby to open the contacts 1042, 1043 and 1044 and to close the contacts 1041. The opening of the contacts 1044 removes ground from the start conductor to the pulse generator 1196 so that this generator is rendered inoperative. The opening of the contacts 1043 breaks the operating circuit for the relay 1030 extending to the contacts 1195 of the pulse forming relay 1190. The opening of the contacts 1042 interrupts the locking circuit for the start assist relay 1050.

The closure of the contacts 1041 applies ground through the closed contacts 1098 to the operating winding of a code complete relay 1000 to operate this relay. The relay 1000 in operating closes a pair of contacts 1001 and opens a plurality of contacts 1002, 1003 and 1004. The opening of the contacts 1004 removes ground from the conductor 764, thereby informing the one-way trunk circuit 19 that the information relating to the time and date of the termination of the call has been completely transmitted to the associated trunk recorder 25, and accordingly, initiates a dismissing operation in the one-way trunk circuit 19 so that the scanning circuit 28 and the clock and calendar circuit 27 are no longer associated with the trunk recorder 25 in the one-way trunk circuit 19. Also, the opening of the contacts 1004 removes ground from an electric lamp 1006 so that this lamp is extinguished, thereby indicating that the code has been completely transmitted to the trunk recorder 25.

The opening of the contacts 1003 interrupts the previously opened circuit to the conductor 762 so that, when the relay 1020 is reoperated, a ground pulse is not applied to this conductor. The closure of the contacts 1001 connects ground from the closed contacts 1015 to the operating winding of the start assist relay 1050 so that this relay remains operated even though the contacts 1042 are opened to interrupt the locking circuit for this relay.

The opening of the contacts 1002 opens the locking circuit for the start relay 1010 so that this relay releases to open the contacts 1011, 1012, 1014 and 1015 and to close the contacts 1013. The opening of the contacts 1011 removes ground from the upper operating winding of the steering relay 1185 to prevent the steering relay 1185 from being operated before the initiation of the next cycle of operation of the scanning circuit 28. The opening of the contacts 1014 interrupts the locking circuit for the start relay 1010 at a second point. The opening of the contacts 1015 removes ground from the contacts 1023, 1024, 1031, and from the operating winding of the start assist relay 1050 so that this relay releases. The closure of the contacts 1013 operates the relay 1020 so that the contacts 1023, 1024 and 1022 are opened and the contacts 1021 are closed. The operation of the relay 1020 places this relay in condition for the initiation of another cycle of operation in response to the seizure of the scanning circuit 28 by one of the one-way trunk circuits 19.

The opening of the contacts 1012 in response to the release of the start relay 1010 removes ground from the operating winding of the last relay 1095 in the steering relay circuit 1101 so that this relay releases to close the contacts 1096 and to open the contacts 1097 and 1098. The closure of the contacts 1096 applies ground to the wiper 1456 so that upon initiation of another cycle of operation of the scanning circuit 28, the wiper 1456 in the tens hours register circuit 1450 is grounded whereby the first group of mark pulses produced by the scanning circuit 28 will be controlled by the tens hours register 1450 in the clock and calendar circuit 27. The opening of the contacts 1097 removes ground from the wiper 1386 in the units days register circuit 1380, thereby terminating the control of this wiper over the production of mark pulses by the scanning circuit 28. The opening of the contacts 1097, in removing ground from the wiper 1386, also releases the stop relay 1140 to open the contacts 1141, 1142, 1143 and 1146 and to close the contacts 1144. The opening of the contacts 1098 removes ground from the operating winding of the code complete relay 1000 but, since the code complete relay 1000 is slow-to-release, it does not release at this time.

The opening of the contacts 1015 in response to the release of the start relay 1010 releases the start assist relay 1050 so that the contacts 1051, 1052 and 1057 are closed and the contacts 1053, 1054, 1056, 1058 and 1059 are opened. The closure of the contacts 1051 and 1052 does not affect the steering relay chain 1101 inasmuch as ground has been removed from these contacts because of the opening of the contacts 1015. The opening of the contacts 1053 opens at a second point, the locking circuit for the start assist relay 1050. The opening of the contacts 1054 and 1058 removes ground from the counting chain 1100 so that all of the relays therein are released to condition the counting chain 1100 for another cycle of operation in response to the next seizure of the scanning circuit 28 by one of the one-way trunk circuits 19. The opening of the contacts 1056 removes locking ground from the operating winding of the pulse assist relay 1170 so that this relay releases to open the contacts 1171, 1172, 1173 and 1175 and to close the contacts 1174. The opening of the contacts 1173 removes ground from the advance pulse conductor 763 thereby completing the advancing movement of the magnetic tape 1601 in the recorder 25. The opening of the contacts 1171, 1172 and 1175 and the closure of the contacts 1174 conditions the pulse forming circuit comprising the pulse relay 1190 and the pulse assist relay 1170 for another cycle of operation under the control of the pulse generator 1196 when the scanning circuit 28 is next seized by one of the one-way trunk circuits 19.

The closure of the contacts 1057 in response to the release of the start assist relay 1050 applies a ground shunt around the serially connected operating windings of the relays 1030 and 1040 so that these relays release to close the contacts 1031, 1042, 1043 and 1044 and to open the contacts 1032 and 1041. The release of these relays aids in preparing the scanning circuit 28 for another cycle of operation.

After a suitable time delay, the code complete relay 1000 is released to open the contacts 1001 and to close the contacts 1002, 1003 and 1004. The opening of the contacts 1001 opens at a second point, the locking circuit previously described extending to the operating winding of the start assist relay 1050. The closure of the contacts 1002 completes an operating circuit for the start relay 1010 so that this relay is operated in response to the application of ground to the start conductor 761 the next time one of the one-way trunk circuits 19 desires to receive information pertaining to the date and time of the termination of a toll call. The closure of the contacts 1003 prepares a circuit for applying a momentary ground to the conductor 762 to perform the functions described more fully hereinabove. The closure of the contacts 1004 applies ground to the conductor 764 so that the one-way trunk circuit 19 is conditioned for another cycle of operation as described in detail hereinabove. Also, the closure of the contacts 1004 lights the electric lamp 1006 to indicate that the resetting and dismissing of the scanning circuit 28 has been completed.

Accordingly, at this time the scanning circuit 28 is conditioned for another cycle of operation in response to the seizure thereof by one of the one-way trunk circuits 19 to produce seven groups of mark pulses in accordance with the various digits to be recorded on the magnetic tape 1601 of the trunk recorder 25 associated with the one-way trunk circuit 19 which seizes the scanning circuit 28. These groups of mark pulses represent the time and date at which the toll call is terminated and are produced under the selective control of the clock and calendar circuit 27.

In summary, the scanning circuit 28 includes the counting relay chain 1100 and the steering relay chain 1101 which cooperate under the control of the clock and calendar circuit 27 to produce a plurality of groups of mark pulses representing the items of information relating to the date and time of the termination of a toll call. More particularly, a single contact controlled by each of the relays forming the counting chain 1100 is selectively connected to like positioned contacts in the output contact banks associated with the plurality of registers forming the clock and calendar circuit 27. These contacts, when selectively closed in response to the production of a predetermined number of pulses, operate the stop relay 1140 in the scanning circuit 28 to terminate the production of the groups of mark pulses. Coincident with this termination of the production of the group of mark pulses, the steering relay circuit 1101 is energized to operate an additional relay therein to transfer the control over the counting chain 1100 from one of the registers in the clock and calendar circuit 27 to the register circuit wherein is registered the next item of information to be transferred to the associated trunk recorder 25. Obviously, the interconnection between the register circuits in the clock and calendar circuit 27 and the steering relay chain 1101 in the scanning circuit 28 may be varied so that the items of information stored in the register circuits of the clock and calendar circuit 27 may be transmitted to the associated trunk recorder 25 in any desired order. Also, although the digits manifested in the plurality of register circuits in the clock and calendar circuit 27 are represented by groups of mark pulses, as disclosed in the table hereinabove, any type of permutation code or decimal numerical code may be utilized in accordance with the varying demands of commercial application.

TYPICAL TAPE RECORD

As described above, the magnetic tape 1601 in the trunk recorder 25 controlled by the one-way trunk circuit 19 may be selectively magnetized in accordance with the items of information necessary for the production of printed toll tickets relating to the calls completed through the one-way trunk circuit 19. Fig. 80 of the drawings graphically illustrates a segment 1601*a* of the tape 1601 on which all of the mark and space pulses representative of all of the items of information necessary for controlling the production of a single toll ticket have been magnetically imprinted. Specifically, the segment 1601*a* has been marked with eight groups of mark pulses representing the directory numbers of the calling and called subscribers under the control of the one-way trunk circuit 19 and has been marked with a plurality of mark pulses equal in number to the elapsed minutes of the duration of the call under the control of the one-way trunk circuit 19 and the time pulse generating circuit 26. As shown, following the termination of the call, the clock and calendar circuit 27, together with the scanning circuit 28, magnetically imprints seven groups of mark pulses, representing the date and time at which the call is terminated, on the tape segment. Thereafter, the one-way trunk circuit 19 causes an end-of-call signal to be recorded on the tape segment, thereby to indicate that all of the items of information pertaining to this call have been recorded on the tape 1601.

The information shown on the tape segment 1601*a* relates to a telephone call placed under the following conditions. The call originated in exchange 7, which in printing is designated by the alphabetical "KI," and the call was placed by the subscriber identified by the directory number 3456. The call was extended to the subscriber having the directory number 6789 and located in the terminating exchange 8 which during the ticket printing is designated by the alphabetical character "PI." The call was twenty-six minutes long and was terminated at 2:17 a.m. on June twenty-first, 1951. The information relating to the designation of the calling and called offices and the year of the date is not stored on the magnetic tape 1601.

Considered from left to right along the tape segment 1601*a*, the first group of mark pulses includes three pulses which represent the first digit of the calling subscriber's directory number, i.e., 3. The next three groups of mark pulses comprising four, five and six mark pulses, respectively, designate the second, third and fourth digits of the calling subscriber's directory number. The fifth group of mark pulses shown on the segment of the magnetic tape 1601 identifies the first digit of the called subscriber's directory number and, as shown in Fig. 80 of the drawings, comprises six discrete mark pulses. The sixth, seventh and eighth groups of mark pulses represent the second, third and fourth digits of the directory number of the called subscriber and include seven, eight and nine pulses, respectively. The recording of these first eight groups of mark pulses is controlled by the one-way trunk circuit 19.

The ninth group of mark pulses shown on the segment of tape 1601 includes a plurality of mark pulses equal in number to the minutes of duration of the toll call completed between the two previously identified subscribers. As will be recalled, these pulses are recorded on the tape segment 1601*a* under the joint control of the trunk circuit 19 and the pulse generator 26. In accordance with the above assumption that the call was twenty-six minutes in length, the ninth group of mark pulses should include twenty-six discrete mark pulses but, for clarity, only the first and last pulses of the group of twenty-six mark pulses have been shown along the segment 1601*a* in Fig. 80 of the drawings.

The remaining groups of mark pulses recorded along the tape segment 1601*a* are recorded on the magnetic tape 1601 under the control of the clock and calendar circuit 27 and the scanning circuit 28. The first of the remaining pulse groups, i.e., the tenth group of mark pulses, represents the tens hours digit of the time at which the call was terminated. As illustrated, this tenth group includes a single mark pulse which represents "0." The eleventh group of mark pulses includes three mark pulses representing the digit "2" so that, when considered together, the tenth and eleventh groups of mark pulses represent the notation "02." This notation, as described above in conjunction with the clock and calendar circuit 27, identifies the hour that the call was terminated as 2:00 a.m. which is in accordance with the above assumption.

The twelfth group of mark pulses represents the tens minutes digit of the time at which the above-identified toll call was terminated and includes two mark pulses representing the digit "1." The thirteenth group of mark pulses includes eight pulses representing the digit "7" in the units minutes denominational column of the time notation at which the call is completed. When considered together, the twelfth and thirteenth groups of mark pulses indicate that the call was terminated at seventeen minutes after the previously identified hour, i.e., 2:17 a.m.

The fourteenth, fifteenth and sixteenth groups of mark pulses represent the date on which the toll call was terminated which, as described hereinbefore, is assumed to have been June twenty-first, 1951. The fourteenth group of mark pulses, which represents the month during which the call was terminated, includes six mark pulses and, as shown in the foregoing table, represents the month June which is designated by the decimal code notation "06." The fifteenth group of mark pulses includes three pulses representing the digit "2" in the tens days denominational column of the day on which the call was terminated. The last group of mark pulses, i.e. the sixteenth, includes two pulses representing the digit "1" in the units days denominational column of the decimal code representing the date on which the call was terminated. When considered together, the fourteenth, fifteenth and sixteenth groups of mark pulses indicate that the call was terminated on June twenty-first which, according to the decimal code employed, is numerically expressed as "0621."

Following the sixteenth group of mark pulses, the one-way trunk circuit 19 records the end-of-call code on the magnetic tape 1601 to indicate that all of the items of information pertaining to the above-described toll call have been recorded in the trunk recorder 25, and this end-of-call code is utilized by the printing control circuit 35 to interrupt the playback of the recorder 25, when seized, to permit the printer 36 to produce a permanent record of the items represented by the preceding sixteen groups of mark pulses.

PLAYBACK CONTROL CIRCUIT 30

The playback control circuit 30 sequentially searches for and seizes an idle trunk recorder 25 and its associated one-way trunk circuit 19 located in the call originating exchange 7. In response to seizing an idle trunk recorder 25 containing recorded items of information relating to a plurality of toll calls, the playback control circuit 30 places ground on the sleeve lead of the associated one-way trunk circuit 19 to guard this trunk circuit against seizure during a playback operation. In addition, the playback control circuit 30 interconnects the mark pulse head 1201 and the space pulse head 1202 with the plurality of storage chains 38 and the steering circuit 37, respectively, so that the information stored in the seized trunk recorder 25 may be utilized to control the operation of the printing control circuit 35, thereby to operate the printer 36 to produce a plurality of printed tickets containing information relating to the toll calls registered in the seized trunk recorder 25. The playback control circuit 30 also provides the printing control circuit 35 associated therewith with information pertaining to the exchange in which the called subscriber is located. Alarm means are provided in the playback control circuit to indicate when a trunk recorder 25 has been completely emptied of information, or completely played back, without producing a complete toll ticket. In addition to indicating this item of information, the alarm means in the playback control circuit 30 also disables this circuit from searching for and seizing any additional trunk recorders 25 and thereby prevents the loss of the information contained in these recorders in the event that either the printing control circuit 35 or the playback control circuit 30 is functioning improperly. After the items of information have been removed from the seized trunk recorder 25, the playback control circuit 30 is rendered operative to search for and seize an additional trunk recorder 25 containing other items of information pertaining to toll calls.

The playback control circuit 30 may be initiated to start a searching and seizing operation in any of a plurality of different ways. In the first of these, the playback control circuit 30 is actuated to initiate a cycle of operation in response to the receipt of a pulse from a timing means so that the circuit 30 may be selectively actuated to initiate a cycle of operation at predetermined periods of time. The playback control circuit 30 may be started in response to information received from the one-way trunk circuit 19 and trunk recorder 25 associated therewith, which indicates that this particular trunk recorder 25 is filled with information which must be removed before this trunk recorder can again be utilized to record additional items of information. Manual means are also provided for initiating the operation of the playback control circuit 30 to facilitate testing or checking the equipment prior to installation or during the operation thereof.

In a normal condition, that is prior to the initiation of the cycle of operation in any of the above-listed manners, the playback control circuit 30 normally includes a plurality of operated relays. An advance relay 1810 is maintained normally operated by an energizing circuit extending from a normally closed and grounded pair of contacts 1856 through a plurality of normally closed contacts 1716 and 1734 to the operating winding of the relay 1810. Since this relay is normally operated, a plurality of contacts 1812, 1813 and 1814 are normally closed and a pair of contacts 1811 is normally open. A switch relay 1720 is also normally operated by a circuit extending from the grounded battery terminal of a hunt-assist relay 1750, through normally closed contacts 1741 and 1814, the operating winding of relay 1720, and the closed contacts 1812 to ground. Since the switch relay 1720 is normally operated, a plurality of contacts 1721, 1724, 1725 and 1726 are closed and a pair of contacts 1722 and 1723 are opened. A slow-to-release delay relay 1820 is normally operated by a circuit extending from grounded battery at one terminal of the winding of the relay 1820 through a normally closed pair of contacts 1713 and the contacts 1721 closed by the operation of the relay 1720 to ground.

In addition, in the normal condition of the playback control circuit 30, a wiper 1870 is normally in engagement with a contact in the contact bank 1870a which is connected to a "dummy" trunk 1872. The remainder of the contacts in the contact bank 1870a, are interconnected by means of conductors similar to the conductor 767 with the sleeve lead of the plurality of one-way trunk circuits associated with a particular calling exchange.

Normal operation of the playback control circuit 30

To provide a means for selectively initiating a cycle of operation of the playback control circuit 30, the operating winding of a normal start relay 1930 is connected with ground through a conductor 1960 which extends to the "0" manifesting contact in the bank 1482 of the units minutes register 1480 in the clock and calendar circuit 27. In the clock and calendar circuit 27, the "0" manifesting contact in the bank 1482 is periodically grounded under the control of the tens hours register 1450, the units hours register 1460, and the units minutes register 1480. The normally grounded wiper 1455 in the tens hours register 1450 applies ground to the wiper 1465 when this wiper engages the "0" manifesting contact in the bank 1452 and the ground applied to the wiper 1465 is connected to the wiper 1485 when the wiper 1465 engages the "2" manifesting contact in the bank 1462. When the wiper 1485 engages the "0" manifesting contact in the bank 1482, ground is applied through the conductor 1960 to the upper operating winding of the normal start relay 1930. As shown in Fig. 14 of the drawings, ground is applied to the conductor 1960 at 2:00 a.m. although the interconnection of the contact banks 1452, 1462 and 1482 easily may be changed. This ground pulse is only one minute in duration inasmuch as following an elapsed time of one minute the wiper 1485 is moved into engagement with the second contact in the bank 1482.

Since the normal start relay 1930 is energized under the control of the clock and calendar circuit 27, it is possible to initiate the sequential searching and seizing operation of the playback control circuit 30 at any selected time. This time may be adjusted to coincide with a period when the traffic requirements on the one-way trunk circuits 19 are at a low level so that the seizure of the one-way trunk circuits 19 for the purpose of playing back information from the seized trunk recorders 25 will not interfere with the service rendered by a particular originating office such as the exchange 7. Although, as shown, the normal start relay 1930 is only energized once during each twenty-four hour period, it is possible to interconnect the conductor 1960 with other contacts associated with the contact banks 1452, 1462 and 1472, or with contact banks similar to these banks so that the cyclic operation of the playback control circuit 30 to remove items of information stored in the plurality of trunk recorders 25 may be initiated at any desired time, either longer or shorter than the twenty-four hour intervals. Obviously, if the traffic is very heavy and the trunk recorders 25 are filled with information in an interval of less than twenty-four hours, the operation of the playback control circuit 30 may be initiated more frequently, whereas if the traffic requirements are lower, the trunk recorders 25 may not need to be played back more often than once during every forty-eight hour interval. The application of ground to the conductor 1960 also lights an electric lamp 1965 to indicate that a cycle of operation has been started.

The operation of the normal start relay 1930, under the control of the clock and calendar circuit 27, closes a plurality of contacts 1931, 1932 and 1933 associated therewith. The closure of the contacts 1933 energizes a motor in the printer 36 so that this printer is conditioned for operation under the control of the information removed from a particular seized trunk recorder 25. The closure of contacts 1933 also energizes a drive motor 1510, which drives the shaft 1512 carrying the plurality of drive rollers 1505 so that, upon selective energization of one of the plurality of clutch magnets 1204 associated with the plurality of trunk recorders 25, the magnetic tape 1601 of the selected trunk recorder 25 is advanced to initiate the removal of information stored thereon. The closure of contacts 1932 completes an instantaneous locking circuit for the operating winding of the relay 1930 which extends through a pair of normally closed contacts 1954.

The closure of contacts 1931 energizes a home relay 1920. The energizing circuit for this relay extends from ground at the closed contacts 1812 through the closed contacts 1724, a normally closed pair of contacts 1733, the wiper 1870, the "dummy" trunk 1872, the closed contacts 1931 and through the operating winding of the home relay 1920 to grounded battery. Operation of the home relay 1920 opens the contacts 1922, thereby breaking the instantaneous locking circuit for the normal start relay 1930, and closes a pair of contacts 1921. The normal start relay 1930 does not release at this time, inasmuch as the ground provided by the clock and calendar circuit 27 is still maintained on the conductor 1960. The closure of the contacts 1921 places ground on the operating winding of a dismiss relay 1850 through a pair of normally closed contacts 1891. The dismiss relay 1850 is operated by the application of ground to the operating winding thereof to close a plurality of contacts 1851, 1853, 1854 and 1855 and to open a pair of contacts 1852 and 1856. Opening the contacts 1856 removes ground from the operating winding of the advance relay 1810 so that this relay releases to close a pair of contacts 1811 and to open a plurality of contacts 1812, 1813 and 1814. The opening of the contacts 1812 does not release the switch relay 1720 inasmuch as the closure of the contacts 1854 connects ground to the operating winding of this relay through the normally closed contacts 1733 and the closed contacts 1724. The opening of the contacts 1812 also does not remove ground from the "dummy" trunk 1872 since the closure of the contacts 1854 applies ground thereto.

The closure of the contacts 1853 grounds the cathode of a tube 1880 so that, after a predetermined interval of time determined by a resistor 1881 and a condenser 1882, a large enough voltage is built up on the condenser 1882 so as to fire the tube 1880 to operate a second dismiss relay 1890. A large resistor 1882a is shunted across the condenser 1882 to permit the charge thereon to leak off after the contacts 1853 are opened. The operation of the dismiss relay 1890 opens a plurality of contacts 1891 and 1892 controlled thereby. The opening of the contacts 1892 is of no interest at this time, but the opening of the contacts 1891 interrupts the circuit energizing the first dismiss relay 1850 so that this relay releases. Relay 1850 in releasing closes the contacts 1852 and 1856 and opens the contacts 1851, 1853, 1854 and 1855. The opening of the contacts 1854 removes ground from the operating winding of the switch relay 1720 so that this relay releases to open the contacts 1721, 1724, 1725 and 1726 and to close the contacts 1722 and 1723. The opening of the contacts 1721 releases the delay relay 1820 so that the contacts 1821 and 1823 are closed and the contacts 1822 and 1824 are opened. The release of the relay produces no useful function at this time. The opening of the contacts 1854 also removes ground from the "dummy" trunk 1872 and, accordingly, from the operating winding of the home relay 1920 so that this relay releases to open the contacts 1921 and to close the contacts 1922. The closure of the contacts 1922 reestablishes the locking circuit for the normal start relay 1930 so that this relay remains operated following the removal of ground from the conductor 1960 at the expiration of one minute under the control of the clock and calendar circuit 27. The closure of the contacts 1922 also lights an electric lamp 1964 to indicate that the start relay 1930 is locked up to initiate a cycle of operation of the circuit 30.

The closure of the contacts 1856, upon the release of the first dismiss relay 1850, operates the advance relay 1810 and also operates a motor magnet 1740 in parallel therewith to open a pair of contacts 1741. The energization of the advance relay 1810 closes the contacts 1812, 1813 and 1814 and opens the contacts 1811. The opening of the contacts 1811 breaks the energizing circuit for the motor magnet 1740 so that this magnet releases and, in doing so, advances a plurality of wipers 1742, 1743, 1744, 1745, 1870, 1825, 1880 and 1913 to engage the next contacts in a plurality of contact banks 1742a, 1743a, 1744a, 1745a, 1870a, 1825a, 1880a and 1913a, respectively. Like positioned contacts in the contact banks 1742a, 1743a 1744a, 1745a, 1870a, 1880a and 1913a are connected with the one-way trunk circuit 19 through the conductors 771, 768, 769, 774, 767, 770 and 773, respectively. The contacts in the contact bank 1825a are interconnected with the printing control circuit 35 through conductors similar to a pair of conductors 1826 and 1827, shown in Fig. 18 of the drawings. Although only a single contact in each of these contact banks is shown as being connected to the one-way trunk circuit 19, it should be understood that the remaining like positioned contacts in the plurality of contact banks are interconnected with trunk circuits similar to the one disclosed in Figs. 4 to 7 of the drawings in accordance with the number of additional one-way trunk circuits available in a particular calling exchange.

Accordingly, the operation of the dismiss relays 1850 and 1890, under the control of the home relay 1920, operates the motor magnet 1740 to advance the stepping switch controlled thereby a single step and thereby to move the plurality of wipers including the sleeve testing wiper 1870 off of its normal home position wherein this wiper engages a contact connected to the "dummy" trunk 1872. As the wiper 1870 is moved out of engagement with the contact connected to the "dummy" trunk 1872 the sequential searching operation for an idle trunk recorder 25 and the one-way trunk circuit 19 associated therewith is initiated. As explained in detail above, when the one-way trunk circuits 19 are busy, ground is applied to a conductor similar to the conductor 767, which is interconnected with the proper contact in the contact bank 1870a. Assuming that the next contact engaged by the wiper 1870 is connected to a busy one-way trunk 19, ground is applied through the wiper 1870 to the operating winding of the hunt-assist relay 1750. This circuit extends from the grounded contact in the contact bank 1870a, through the wiper 1870, the contacts 1733, 1723, 1813, 1814, 1741 and an operating winding 1750a of the relay 1750 to grounded battery.

The operation of the relay 1750 opens a pair of contacts 1751 and closes a pair of contacts 1752. The opening of the contacts 1751 removes the direct shunt from around a pair of non-inductive resistance windings 1750b and 1750c so that the parallel resistance provided by these two windings is inserted in series with the inductive operating winding 1750a of the hunt-assist relay 1750. The insertion of resistance in series with the inductive winding 1750a limits the current flowing therethrough and thereby limits the arcing present at the contacts 1741 when these contacts are open. The closure of the contacts 1752 applies ground to the operating winding of the motor magnet 1740 so that this magnet operates to open the contacts 1741.

The opening of the contacts 1741 breaks the operating circuit for the hunt-assist relay 1750 so that this relay releases to reclose the contacts 1751 and to open the contacts 1752 thereby breaking the energizing circuit for the motor magnet 1740. This sequential operation and release of the motor magnet 1740 steps the plurality of wipers 1742, 1743, 1744, 1745, 1825, 1870, 1880 and 1913 to the next adjacent contacts. If the wiper 1870 engages a contact grounded by the one-way trunk circuit associated therewith, thus indicating that this trunk circuit is busy, another cycle of operation of the hunt-assist relay 1750 and motor magnet 1740 is completed. This sequential operation of the magnet 1740 and the relay 1750 continues until such time as the wiper 1870 engages a contact connected to an idle trunk. At this time, no ground is applied to the operating winding of the hunt-assist relay 1750 so that this relay does not operate to advance the stepping switch controlled by the motor magnet 1740.

The ground present on the wiper 1870, which produces the sequential operation of the relay 1750 and motor magnet 1740 to advance the stepping switch to search for an idle trunk, also maintains the switch relay 1720 deenergized inasmuch as the ground applied to the wiper 1870 is applied through the contacts 1733, 1723 and 1813 to one side of the operating winding of this relay, thereby providing a ground shunt around the operating winding thereof. When the wiper 1870 is moved into engagement with a contact associated with an idle trunk, the shunting ground is removed from the operating winding of the switch relay 1720 and this relay is operated by a circuit extending from grounded closed contacts 1812 through the operating winding of the relay 1720, the contacts 1814, 1741 and 1751, and the winding 1750a to the battery terminal of the hunt-assist relay 1750. The operation of the switch relay 1720 closes the contacts 1721, 1724, 1725 and 1726 and opens the contacts 1722 and 1723. The hunt-assist relay 1750 is not operated in series with the switch relay 1720 inasmuch as the resistance in this circuit is too great to permit a sufficient flow of current through the winding 1750a to operate this relay.

The closure of the contacts 1726 provides a path for applying battery to the operating winding of the switch relay 1720 from the battery terminal of the hunt-assist relay 1750 and thereby maintains this relay operated in the event that the advance relay 1810 is released.

The closure of the contacts 1724 grounds the sleeve conductor 767 which is connected to the sleeve lead in the one-way trunk circuit 19. The application of ground thereto indicates that this trunk circuit together with its associated trunk recorder 25 have been seized for a playback operation by the playback control circuit 30. The circuit for applying ground to the conductor 767 extends from grounded and closed contacts 1812 through the closed contacts 1724 and 1733 to the wiper 1870 which is in engagement with the contacts to which are connected the conductor 767.

The closure of the contacts 1721 operates the delay relay 1820 through the normally closed contacts 1713. The operation of the delay relay 1820 opens the contacts 1821 and 1823, and closes the contacts 1822 and 1824. Opening the contacts 1821 and 1823 serves no useful function at this time as does the closure of the contacts 1824. However, the closure of the contacts 1822 applies ground to the wiper 1745 through the closed contacts 1725 so that this ground is applied through the clutch conductor 774 to the operating winding of the clutch magnet 1204 associated with the seized one-way trunk circuit 19 and trunk recorder 25.

The operation of the clutch magnet 1204 in the seized trunk recorder 25 moves the idler wheel 1503 of this trunk recorder into engagement with the drive wheel 1505 on the common shaft 1512 and with the capstan drive wheel 1504. This interconnection of the drive wheel 1505 with the capstan drive wheel 1504 advances the magnetic tape 1601 in the seized trunk recorder 25 to sequentially close the foil contacts 1206 and 1207. As explained in detail above, the sequential closure of the foil contacts 1206 and 1207 produces the sequential operation of the first foil relay 730 and the second foil relay 750.

The operation of the first foil relay 730 applies battery over the conductor 771 through the wiper 1742 to the upper operating winding of a hunt relay 1710 to operate this relay. Operation of the relay 1710 closes a plurality of contacts 1711, 1715, 1718, and 1719, and opens a plurality of contacts 1712, 1713, 1714, 1716 and 1719a. The closure of the contacts 1711 completes a locking circuit for the relay 1710 which extends from the grounded and normally closed contacts 1852. The opening of the contacts 1713 interrupts the circuit energizing the delay relay 1820 which is slow-to-release. In releasing, the relay 1820 closes the contacts 1821 and 1823, and opens the contacts 1822 and 1824. The opening of the contacts 1822 removes ground from the clutch lead 774, but the clutch magnet 1204 is not deenergized inasmuch as the lead 774 is connected to ground through the contacts 1718 which are closed by the operation of the hunt relay 1710.

The opening of the contacts 1716 releases the advance relay 1810 so that the contacts 1811 are closed and the contacts 1812, 1813 and 1814 are opened. The opening of the contacts 1812 does not release the switch relay 1720 inasmuch as ground is applied to the operating winding thereof, from the grounded, closed contacts 1856 through the contacts 1715, closed by operation of the hunt relay 1710 and the closed contacts 1733 and 1724.

Since the relay 1820, the operating circuit for which was broken by operation of the hunt relay 1710, is slow-to-release, the closure of the contacts 1719 in response to the operation of the hunt relay 1710 connects ground from the closed contacts 1824 to the seized one-way trunk circuit 19 through the conductor 771. The ground applied to this conductor produces the sequential release of the foil relays 730 and 750 in the manner described above in detail. Following the slow-to-release period of the delay relay 1820, the contacts 1824 are opened to remove ground from the conductor 771.

The sequential release of the relays 730 and 750 in the seized one-way trunk circuit 19 applies ground to the conductor 773 in the manner described above in the description of the operation of the one-way trunk circuit 19.

This ground operates a playback relay 1830 by means of a circuit extending from the grounded battery connected to one terminal of this relay through the operating winding thereof, the normally closed contacts 1892, a pair of normally closed contacts 1911 and thence, through the wiper 1913 to the grounded conductor 773. The operation of the playback relay 1830 closes a plurality of contacts 1831, 1832, 1833, 1834 and 1835, and opens a pair of contacts 1836. The closure of the contacts 1834 prepares a circuit for operating a second playback relay 1910. However, the second playback relay 1910 is not operated in response to the closure of the contacts 1834 since for the duration of the ground pulse existing at the normally closed contacts 1911 the ground at this point shunts the operating winding of the relay 1910 to ground.

The closure of the contacts 1832 connects ground through the closed contacts 1821 to the wiper 1825 associated with the destination contact bank 1825a in the stepping switch associated with the playback control circuit 30 so as to ground a conductor similar to the conductors 1826 and 1827 which are connected to the printing control circuit 35 through a cable 1885. The function produced by grounding one of these conductors is described more fully hereinafter in conjunction with the description of the printing control circuit 35. The grounding of one of the conductors 1826 or 1827 or conductors similar to these conductors provides the printing control circuit 35 with information pertaining to the one-way trunk circuit 19 and trunk recorder 25 which is seized by the playback control circuit 30, and accordingly instructs the printing control circuit 35 that all of the toll tickets which are to be produced under its control relate to calls terminating in a particular called exchange. This is true inasmuch as each of the one-way trunk circuits 19 to which the playback circuit 30 has access is capable of completing calls to only a single called exchange.

The closing of the contacts 1835 and the consequent opening of the contacts 1836 transfer the control over the energization of the clutch magnet 1204 in the seized recorder 25 to the printing control circuit 35. Accordingly, the closure of the contacts 1835 signifies that the searchng for and seizing of an idle one-way trunk circuit 19 and its associated trunk recorder 25 is completed and, further, that the seized recorder 25 is ready to transmit pulse representations of the recorded item of information to the storage chains 38 and the steering circuit 37. The transfer of the control of the clutch magnet 1204 to the printing control circuit 35 is accomplished by interconnecting the wiper 1745 with the printing control circuit 35 through a conductor 4945 and the cable 1885. The transfer of the control of this clutch magnet to the printing control circuit 35 is desirable so that the printing control circuit 35, which is provided with information relating to the completion of the production of a permanent record or toll ticket containing the items of information relating to a single toll call, can control the intermittent operation of the recorder 25 to transmit the information to be printed only when it can be utilized by the printer 36.

The removal of the ground from the wiper 1913 under the control of the foil relays 730 and 750 in the seized one-way trunk circuit 19 removes the ground shunt from the operating winding of the second playback relay 1910 so that this relay is operated in series with the operating winding of the first playback relay 1830 through a circuit extending from the battery terminal connected to the operating winding of the playback relay 1830 through the closed contacts 1892 and 1834 and thence through the operating winding of the relay 1910 to ground. Operation of the relay 1910 opens the contacts 1911 and closes a pair of contacts 1912 so that the next ground pulse applied to the wiper 1913 will be conducted to the operating winding of the first dismiss relay 1850.

The closure of the contact 1833 grounds the cathode of a tube 1840 and also connects one plate of a condenser 1841 to ground. The grounding of the cathode of the tube 1840 conditions this tube for being rendered conductive in response to the application of a sufficiently high voltage to the control electrode thereof. The grounding of one side of the condenser 1841 completes a circuit for charging this condenser which extends from positive battery through a resistance 1842. After a predetermined interval of time, as determined by the magnitude of the resistor 1842 and the magnitude of the condenser 1841, a sufficient charge is placed on the condenser 1841 to render the tube 1840 conductive. When the tube 1840 is fired, a path is completed from ground through the closed contacts 1833, the tube 1840, the wiper 1880, and the conductor 770 to the operating winding of the playback relay 740 in the seized one-way trunk circuit 19 so that this relay operates. The condenser 1841 is shunted by a resistor 1841a having a very high resistance to provide a path for removing the charge from the condenser 1841 before the contacts 1833 are reclosed.

The operation of the playback relay 740 in the seized one-way trunk circuit 19 closes the plurality of contacts controlled thereby, as explained in detail above, so that the mark pulse head 1201 and the space pulse head 1202 are connected to the conductors 768 and 769, respectively. The conductors 768 and 769 are connected with the inputs of the mark pulse preamplifier 31 and the space pulse preamplifier 32, through the wipers 1743 and 1744, respectively. These wipers are positioned upon the contacts connected to the conductors 768 and 769 associated with the seized one-way trunk circuit so that the preamplifiers 31 and 32 are selectively interconnected with only the reproducing heads 1201 and 1202 in the seized trunk recorder 25. This interconnection of the mark and space heads 1201 and 1202 with their respectively associated preamplifiers permits the information stored in the seized trunk recorder 25 to be reproduced and subsequently utilized by the printing control circuit 35 to control the production of a plurality of toll tickets corresponding in number to the number of complete toll calls for which information is available on the magnetic tape 1601 in the seized recorder 25.

The time delay provided by the resistor 1842 and the condenser 1841, which prevents the tube 1840 from firing for a predetermined period following the operation of the first playback relay 1830, is utilized to insure that the magnetic tape 1601 in the seized recorder 25 is properly positioned for a playback cycle of operation before the playback relay 740 is operated to interconnect the mark and space heads 1201 and 1202 with the mark pulse and space pulse preamplifiers 31 and 32, respectively. It is necessary to provide this time delay to insure that the tape 1601 has been advanced to such a position that the heads 1201 and 1202 are positioned adjacent that portion of the tape which immediately precedes the first information recorded on the tape, and thereby to insure that the heads are not positioned over that portion of the tape on which may be recorded the date and time information pertaining to the last toll call recorded on a filled magnetic tape 1601. More particularly, as shown schematically by tape segment 1601b in Fig. 80 of the drawings, the time delay provided before the firing of the tube 1840 is long enough that the magnetic tape 1601 is advanced a distance greater than that represented as A. The time delay provided by the tube 1840 and its associated controlling elements must be long enough to permit the tape 1601 to be advanced a distance greater than the physical length of the portion of the tape 1601 which is utilized for receiving date and time information following a forced disconnect operation when this tape is filled with items of information to initiate an emergency playback operation. The time delay provided by the tube 1840 must also be less than the time required for the tape segment 1601b to be advanced a distance represented as B (Fig. 80) so that the mark and space heads 1201 and 1202 are interconnected with their respective preamplifiers 31 and 32 before that portion of the tape 1601 is moved thereby which contains the first information which is to be reproduced from this tape. Accordingly, the time delay provided by the tube 1840 insures that the mark and space heads 1201 and 1202 are not interconnected with the remainder of the control circuit until such time as the magnetic tape 1601 associated therewith has been advanced to move the portion of the tape on which may be recorded the items of information relating to the time and date of a forcibly disconnected call beyond the heads 1201 and 1202, and also insures that these heads are interconnected to permit the transmission of the recorded items of information prior to the time at which that portion of the tape 1601 which contains the first recorded items is moved by these heads.

Since the control of the clutch magnet 1204 has been previously transferred to the printing control circuit 35, following the operation of the playback relay 740, the sequential removal of items of recorded or registered information in the seized trunk recorder 25 is started under the control of the printing control circuit 35 and continues until such time as all of the information recorded by a single seized recorder 25 is completed. At the end of each series of pulses representing the items pertaining to one toll call, either complete or incomplete, the printing control circuit 35 applies ground to a conductor 4915 to operate an end-of-call relay 1860. The operation of the end-of-call relay 1860 opens a pair of contacts 1861 and 1862 but produces no useful function during the normal cycles of operation of the playback control circuit 30.

In response to completion of the printing of the last toll ticket containing the last group of items of information registered on the magnetic tape 1601 in the seized recorder 25, the conductor 4945 is grounded so that the clutch magnet 1204 is energized. Energization of the clutch magnet 1204 produces an advancement of the magnetic tape 1601 in the seized trunk recorder 25 until such time as the two foil contacts 1206 and 1207 are reoperated to indicate that the end of this tape has been reached.

This sequential operation of the foil contacts 1206 and 1207 produces a corresponding sequential operation of the foil relays 730 and 750 in the seized one-way trunk circuit 19 in the manner described above in detail in conjunction with the explanation of the operation of this one-way trunk circuit.

Since the playback relay 740 in the seized one-way trunk circuit 19 is now operated, the sequential operation of the foil relays 730 and 750 produces the sequential release thereof to transmit a ground pulse to the wiper 1913 through the conductor 773. The application of ground to the wiper 1913 operates the first dismiss relay 1850 through a circuit extending from the grounded battery terminal of this relay through the operating winding thereof and the closed contacts 1912. Operation of the first dismiss relay closes the plurality of contacts 1851, 1853, 1854 and 1855 and opens the contacts 1852 and 1856.

The closure of the contacts 1851 completes a locking circuit for the first dismiss relay 1850 which extends through the closed contacts 1831. The opening of the contacts 1856 removes ground from the operating winding of the switch relay 1720, but this relay does not release inasmuch as the concurrent closure of the contacts 1854 applies ground to the operating winding of this relay through the closed contacts 1733 and 1724. The closure of the contacts 1855 completes a circuit for applying ground to the clutch conductor 774 which extends through the closed contacts 1855 and 1862 to the wiper 1745.

The opening of the contacts 1852 breaks the locking circuit for the hunt relay 1710 so that this relay releases to open the contacts 1711, 1715, 1718 and 1719 and to close the contacts 1712, 1713, 1714, 1716 and 1719a. The opening of the contacts 1718 removes the ground previously applied to the clutch lead 774 from the printing control circuit 35. However, ground is not removed from this conductor inasmuch as the previous closure of the contacts 1855 applies ground to this conductor. The closure of the contacts 1713 applies ground from the closed contacts 1721 to the operating winding of the delay relay 1820 so that this relay is operated to open the contacts 1821 and 1823 and to close the contacts 1822 and 1824. The opening and closing of the remainder of the contacts controlled by the hunt relay 1710 aids in conditioning the playback control circuit 30 for another cycle of operation.

The opening of the contacts 1821 removes ground from the wiper 1825 and, accordingly, from the conductor extending to the printing control circuit 35 thereby to indicate that the production of the toll tickets for calls extending to a particular called exchange has been terminated. The closure of the contacts 1822 applies ground to the clutch conductor 774, now grounded, through the closed contacts 1725. The opening of the contacts 1823 and the closure of the contacts 1824 aids in conditioning the playback control circuit 30 for an additional cycle of operation.

Referring back to the operation of the first dismiss relay 1850, the closure of the contacts 1853 applies ground through the normally closed contacts 1861 to the cathode of the tube 1880. The closure of the contacts 1853 also initiates the charging of the condenser 1882 through the resistor 1881 so that after a predetermined time delay the tube 1880 is rendered conductive to operate the second dismiss relay 1890. The operation of the second dismiss relay 1890 opens the contacts 1891 and 1892.

The opening of the contacts 1892 opens the circuit energizing the two playback relays 1830 and 1910 so that these relays release. The release of the playback relay 1830 opens the contacts 1831, 1832, 1833, 1834 and 1835 and closes the contacts 1836. The opening of the contacts 1831 breaks the operating or locking circuit for the dismiss relay 1850 so that this relay releases to open the contacts 1851, 1853, 1854 and 1855 and to close the contacts 1852 and 1856. The opening of the contacts 1833 in response to the release of the playback relay 1830 interrupts conduction through the tube 1840 and thereby releases the playback switch relay 740 in the seized one-way trunk circuit 19. The release of the playback relay 740 conditions the mark pulse head 1201 and the space pulse head 1202 to receive signals to be recorded from the one-way trunk circuit 19 as described more fully above.

The closure and release of the other contacts controlled by the playback relays 1830 and 1910 aids in conditioning the playback circuit 30 to search for and seize another idle one-way trunk circuit 19 and its associated trunk recorder 25.

The opening of the contacts 1854 removes ground from the operating winding of the switch relay 1720, and thereby releases this relay to open and close the contacts associated therewith inasmuch as the only complete operating circuit for this relay extends to ground through the contacts 1854.

The opening of the contacts 1855 together with the release of the relay 1720 to open the contacts 1725 removes ground from the clutch conductor 774 so that the movement of the tape 1601 in the seized recorder 25 is terminated. The opening of the contacts 1724 removes ground from the sleeve lead 767 to permit the one-way trunk circuit 19 to be seized for completing another toll call.

The opening of the contacts 1853 interrupts conduction through the tube 1880 so that the second dismiss relay 1890 is released. However, the release of the second dismiss relay 1890 and the operation of the other contacts controlled by the dismiss relay 1850 perform no particular function at this time other than to condition the playback circuit 30 for another cycle of operation to search for and seize an idle one-way trunk circuit 19.

Since the firing of the tube 1880 controls the sequential release of the playback relays 1830 and 1910 and the first dismiss relay 1850, the time delay introduced thereby provides a means for insuring that the magnetic tape as represented by tape segment 1601b (Fig. 80) is advanced under the control of ground applied to the clutch conductor 774 through a distance represented as B. By advancing the tape 1601 in the seized recorder 25 through a distance represented schematically by B before the clutch magnet 1204 is deenergized, an adequate length of the tape is advanced beyond the mark and space heads 1201 and 1202 to provide a length of tape 1601 for receiving the date and time information in the event that this tape becomes filled during the next cycle of recording operations thereby requiring a forced disconnect of the last toll call whose items of information are recorded on this particular tape. Accordingly, the time delay introduced by the circuit controlling the tube 1840 insures that a playback operation is not started until the tape has been advanced through a distance greater than that shown schematically as A, whereas the time delay introduced by the circuits controlling the tube 1880 insures an adequate length of tape following the closure of the foil contacts 1206 and 1207 to receive the date and time information pertaining to a forcibly disconnected call while maintaining an adequate spacing between the end-of-call code following the last call recorded on the tape 1601 and the position at which the mark and space heads 1201 and 1202 initiate a subsequent recording operation.

The closure of the contacts 1856, in response to the release of the dismiss relay 1850 energizes the motor magnet 1740 and the advance relay 1810 in parallel through a circuit extending from ground through closed contacts 1856, contacts 1760 and 1734 to the operating winding of the advance relay 1810 and through the contacts 1811 to the operating winding of the motor magnet 1740. After a very short time delay, the advance relay 1810 operates to open the contacts 1811, and thereby interrupts the circuit energizing the operating winding of the motor magnet 1740 so that this magnet releases to advance the plurality of wipers in the stepping switch associated with the playback control circuit 30 to the next succeeding contacts.

The sequential and alternate operation of the hunt-assist relay 1750 and the motor magnet 1740 is now initiated in the manner described above and continues until such time as the wiper 1870 is moved into engagement with a contact in the bank 1870a which is not connected to ground through a conductor similar to the conductor 767 shown in Fig. 18 of the drawings. When an ungrounded pair of contacts is engaged by the wiper 1870, the switch relay 1720 is again operated to terminate the hunting operation.

Thereafter, the sequential operation of the playback control circuit 30 continues in the same manner described above until all of the information in the seized trunk recorder 25 is removed and utilized in the printing control circuit 35 and printer 36 to produce a plurality of printed tickets containing the information stored on the magnetic tape 1601 in the seized recorder 25. This sequential operation is continued until such time as the wiper 1870 is returned into engagement with the contacts connected to the "dummy" trunk 1872. When the wiper 1870 moves into engagement with the contacts to which the "dummy" trunk 1872 is connected, ground is applied from the closed contacts 1812 through the contacts 1724, 1733, the wiper 1870, the "dummy" trunk 1872, and the closed contacts 1931 to the operating winding of the home relay 1920, thereby operating this relay to open the contacts 1922 and to close the contacts 1921. Opening the contacts 1922 breaks the locking circuit for the normal start relay 1930 so that this relay releases and the lamp 1965 is extinguished. There is no other ground applied to the operating winding of the normal start relay 1930 at this time inasmuch as ground has previously been removed from the conductor 1960 by the clock and calendar circuit 27.

The release of the normal start relay 1930 opens the contacts 1931, 1932 and 1933. Opening the contacts 1931 releases the home relay 1920 so that the contacts 1922 are reclosed and the contacts 1921 are opened. The reclosure of the contacts 1922 does not reoperate the normal start relay inasmuch as the contacts 1932 are now open. The opening of the contacts 1933 removes the energization from the drive motor 1510 associated with the plurality of trunk recorder 25 in the exchange 7 and also removes the energization from the motor in the printer 36 associated with the printing control circuit 35.

The opening of the contacts 1931 in addition to interrupting the operating circuit of the home relay 1920 places an open circuit on the wiper 1870 associated with the contact bank 1811. Since the wiper 1870 "sees" an open circuit when in engagement with the contacts to which the "dummy" trunk 1872 is connected neither the advance relay 1810 or the hunt-assist relay 1750 are operated to energize the motor magnet 1740, and, accordingly, the stepping switch in the playback control circuit 30 remains in this position until placed into operation again by an external control means such as the clock and calendar circuit 27.

In summary, the playback control circuit 30, when placed into operation in its normal manner, searches for and seizes an idle trunk and its associated trunk recorder 25, and retains control over the seized trunk and recorder until such time as all of the items of information stored therein have been removed and transferred to the printing control circuit 35, therein to control the sequential production of a plurality of toll tickets by the printer 36. During this searching and seizing operation, all of the one-way trunk circuits which are busy are ignored and the information is not removed therefrom inasmuch as the playback control circuit 30 is stepped in response to the receipt of information from a particular trunk circuit that it is busy. The playback control circuit 30 further functions to interconnect the mark head 1201 and the space head 1202 of each seized trunk recorder 25 with the printing control circuit 35, the steering circuit 37, and the storage chains 38, so that the recorded information may be utilized. The operation of the playback control circuit 30 also provides the printing control circuit 35 with information pertaining to the exchange to which the connections were extended.

The playback control circuit 30 controls the movement of the magnetic tape 1601 in the seized trunk recorder 25 until such time as this tape is moved into a position wherein further movement thereof would result in the transmission of mark and space pulses. At this time, the playback control circuit 30 transfers the control over the clutch magnet 1204 to the printing control circuit 35, so that this circuit, which controls the utilization of the information in the trunk recorder 25, is able to control the timed sequence in which information is supplied from the trunk recorder 25 to the printing control circuit 35 and printer 36.

*Emergency operation of the playback control circuit 30*

Under emergency operating conditions, the playback control circuit 30 is notified of the fact that a trunk recorder 25 associated with one of the one-way trunk circuits 19 in the originating exchange 7 has become filled with the items of information pertaining to toll calls, and that this particular recorder 25 is now unable to accept additional information. This means that the trunk circuit associated with this trunk recorder is also busy and is incapable of completing additional toll calls therethrough. In order to prevent the one-way trunk circuit associated with a filled trunk recorder 25 from being out of service for an undue length of time, means are provided whereby the playback control circuit 30 will search for and seize a filled trunk recorder 25 upon receipt of information from this trunk recorder indicating that it is no longer able to accept additional information. The playback control circuit 30 may be placed into operation in response to the receipt of emergency start information either when the wiper 1870 occupies the home position in which this wiper is in engagement with the contact to which the "dummy" trunk 1872 is connected, or the cycle of operation may be initiated immediately following the completion of a playback operation, if, at the time the emergency start information is received by the playback control circuit, this circuit is engaged in removing information from a seized recorder 25.

Assuming that the playback control circuit 30 is in a normal or home position with the wiper 1870 in engagement with the contact to which the "dummy" trunk 1872 is connected, the one-way trunk circuit 19 in response to the receipt of information that its associated trunk recorder 25 is filled with items of information, places ground on the start lead 30a, which is common to all of the one-way trunk circuits included in the exchange 7. The ground on the conductor 30a is coupled to the lower operating winding of the normal start relay 1930 through a conductor 1770. The application of ground to the winding of the normal start relay 1930 operates this relay to close the contacts 1931, 1932 and 1933. The closure of these contacts initiates a cycle of operation similar to that described when the normal start relay 1930 is operated under the control of ground applied thereto from the clock and calendar circuit 27 through the conductor 1960. This sequential operation includes the operation of the first dismiss relay 1850, the operation of the second dismiss relay 1890, and the consequent release of both of these.

In response to the release of the dismiss relay 1850, the motor magnet 1740 and the advance relay 1810 are energized in parallel and, thereafter, the operation of the advance relay 1810 to open the contacts 1811 interrupts the energization of the motor magnet 1740 so that the stepping switch is advanced a single step. Simultaneously therewith, the switch relay 1720 is released by the opening of the contacts 1854 to remove locking ground from the operating winding of this relay.

When the relay 1720 is released, the contacts 1721, 1724, 1725 and 1726 are opened and the contacts 1722 and 1723 are closed. The closure of the contacts 1722 connects ground on the start lead 30a to the operating winding of an emergency start relay 1730 to operate this relay.

The operation of the relay 1730 closes a pair of contacts 1731, 1732 and opens the contacts 1733 and 1734. The opening of the contacts 1733 prevents the operation of the hunt-assist relay 1750 and, consequently, the motor magnet 1740 under the control of the wiper 1870. The opening of the contacts 1734 prevents the operation of the advance relay 1810 so that the motor magnet 1740 cannot be energized under the control either of the advance relay 1810, and consequently, under the control of the dismiss relay 1850, or under the control of the wiper 1870 which may encounter contacts which are not grounded in moving off of the contacts to which the "dummy" trunk 1872 is connected.

The closure of the contacts 1731 connects ground to the operating winding of the delay relay 1820 so that this relay is operated even though the switch relay 1720 is released. The closure of the contacts 1732 interconnects the operating winding of the hunt-assist relay 1750 with ground so that this relay is operated. The operating circuit for the relay 1750 extends from the normally closed and grounded contacts 1852 through the closed contacts 1712, 1732, 1741 and 1751. The operation of the relay 1750 closes the contacts 1752 and opens the contacts 1751.

The closure of the contacts 1752 energizes the motor magnet 1740 so that this magnet operates to open the contacts 1741 to release the hunt-assist relay 1750. This alternate and sequential operation of the hunt-assist relay 1750 and the motor magnet 1740 continues until such time as the plurality of wipers are moved into engagement with the contacts connected to the one-way trunk circuit 19 with which is associated the trunk recorder 25 having a completely filled magnetic tape 1601.

As explained above in the detailed description of the operation of the one-way trunk circuit 19 under emergency start conditions, the conductor 771 is grounded at the same time that ground is applied to the emergency start conductor 30a. Therefore, when the stepping switch moves the plurality of wipers controlled thereby into engagement with the contacts in the plurality of contact banks associated with this switch, the wiper 1742 is moved into engagement with the contacts to which is connected the grounded conductor 771. Ground from this conductor is applied through the normally closed contacts 1719a to the operating winding of the hunt relay 1710. The energization of the hunt relay 1710 operates this relay to close the contacts 1711, 1715, 1718, and 1719 and to open the contacts 1712, 1713, 1714, 1716 and 1719a.

The opening of the contacts 1714 interrupts the energizing circuit for the emergency start relay 1730 so that this relay releases to close the contacts 1733 and 1734 and to open the contacts 1731 and 1732. The opening of the contacts 1731 interrupts the energizing circuit for the delay relay 1820 so that this relay releases to close the contacts 1821 and 1823, and to open the contacts 1822 and 1824.

The opening of the contacts 1732 interrupts the energizing circuit for the hunt-assist relay 1750, so that this relay may no longer be operated to sequentially energize the motor magnet 1740. The closure of the contacts 1733 and 1734 conditions the playback control circuit 30 for operation in the manner described above, when this circuit is next placed into operation under normal operating conditions.

The closing and the opening of the remainder of the contacts associated with the hunt relay 1710 perform the same functions described above in the description of the normal operation of the playback control circuit 30. Therefore, the playback control circuit 30 transfers the control of the clutch magnet 1204 to the printing control circuit 35, grounds a particular one of the conductors 1826 or 1827 or similar conductors thereto in order to inform the printing control circuit that all of the tickets to be printed under the control of the seized filled recorder 25 are completed to a particular called exchange, and interconnects the mark head 1201 and the space head 1202 with the space pulse preamplifier 32 and the mark pulse preamplifier 31 as described hereinabove. The sequential operation of the trunk recorder 25 to transmit the items of information stored therein to the storage chains 38 and the steering circuit 37 continues until such time as the magnetic tape 1601 in the seized trunk recorder 25 is advanced to the point at which the items of information pertaining to the last toll call recorded thereon is reached.

Normally, the end-of-call signal following the last group of mark pulses recorded on the magnetic tape 1601 is recorded thereon prior to the position on the tape at which the conductive spots or foils 1650 and 1651 are sequentially engaged by the wipers 1652, 1653 and 1654 to close the contacts 1206 and 1207. However, since this cycle of operation of the circuit 30 is assumed to have been initiated under the control of the emergency start circuit, the groups of pulses representative of the date and time of the termination of the last call recorded on a filled magnetic tape 1601 are positioned beyond the second foil 1651 for a distance indicated as A in Fig. 80 of the drawings. An end-of-call signal is recorded at position A to indicate that all of the items of information pertaining to the forcibly disconnected call have been recorded in the associated trunk recorder 25.

Under normal operating conditions, the end-of-call code pertaining to the last toll call recorded on the magnetic tape 1601 in an unfilled recorder 25 is transmitted to the printing control circuit 35 before the first foil contact 1206 is closed. However, as disclosed in Fig. 80 of the drawings, the end-of-call code in a filled recorder 25 is not transmitted to the printing control circuit 35 until such time as both of the contacts 1206 and 1207 have been sequentially closed, thus indicating that the end of magnetic tape 1601 in the seized recorder 25 has been advanced to the sensing position adjacent to the mark head 1201 and the space head 1202.

Referring now to Figs. 17, 18 and 19 of the drawings, under emergency start conditions, the movement of the foils 1650 and 1651 to produce sequential closing of the foil contacts 1206 and 1207 sequentially operates and releases the foil relays 730 and 750 in the manner described above in the detailed description of the one-way trunk circuit 19. As before, the sequential release of these two relays, thus indicating that the end of the magnetic tape 1601 has passed the sensing position, produces a ground pulse which is applied through the conductor 773, the wiper 1930, and the closed contacts 1912 to operate the first dismiss relay 1850.

The operation of the first dismiss relay 1850, to close the contacts 1851, 1853, 1854 and 1855, and to open the contacts 1852 and 1856 produces the same operational functions as described above under the subtitle of Normal Operation of the Playback Control Circuit 30, with the exception that the closure of the contacts 1853 does not immediately initiate conduction in the tube 1880 controlling the second dismiss relay 1890. The closure of the contacts 1853 does not produce the immediate firing of the tube 1880 to operate the second dismiss relay 1890, inasmuch as the transmission of the end-of-call code to the printing control circuit 35 under emergency operating conditions occurs following the transmission of the ground pulse which energized the first dismiss relay 1850. As explained above, this end-of-call code is transmitted to the printing control circuit 35 after an interval of time sufficient to move the tape 1601 through the distance indicated as A in Fig. 80 of the drawing. The end-of-call relay 1860 is operated under the control of the end-of-call code to open the contacts 1861 and 1862.

The opening of the contacts 1862 removes the only source of ground from the clutch lead 774 since the release of the hunt relay 1710 in response to the operation of the dismiss relay 1850 opens the contacts 1718, the switch relay 1720 also being released. The removal of ground from the clutch conductor 774 deenergizes the clutch magnet 1204 in the seized trunk recorder 25 so that the magnetic tape 1601 is not advanced beyond the position at which the end-of-call code is transmitted to the printing control circuit 35.

The opening of the contacts 1861 prevents further charging of the condenser 1882 and disconnects the cathode of the tube 1880 from ground so that this tube may not be rendered conductive. After a predetermined period of time control by the printing control circuit 35, the end-of-call relay 1860 is released, thus indicating that the items of information relating to the last toll call recorded on the trunk recorder 25 have been printed to provide a toll ticket. The release of the relay 1860 closes the contacts 1861 and 1862 to reinitiate the operation of the clutch magnet 1204 so that the tape 1601 is again advanced in the seized recorder 25. The closure of the contacts 1861 reestablishes a conductive path to the cathode of the tube 1880 and reinitiates the charging of the partially charged condenser 1882 through the resistance 1881. After the expiration of a period of time sufficient for the tape 1601 in the seized recorder 25 to be advanced a distance indicated as C in Fig. 80 of the drawings the tube 1880 fires to operate the second dismiss relay 1890. Operation of the relay 1890 opens the contacts 1891 and 1892 controlled thereby to initiate the dismissal of the seized recorder 25 including the removal of ground from the clutch conductor 714 to stop the movement of the tape 1601.

Accordingly, the operation of the end-of-call relay 1860 during a cycle of operation initiated by the application of ground to the emergency start conductor 30a interrupts the charging path for the condenser controlling the tube 1880 so that this tube may not be rendered conductive in response to the operation of the dismiss relay 1850 when the end of the magnetic tape 1601 is reached. The opening of the contacts 1861 in response to the operation of the relay 1860 prevents the playback control circuit 30 from dismissing the seized and previously filled recorder 25 until such time as a toll ticket has been produced by the printer 36 containing the items of information relating to this toll call. As shown in Fig. 80 of the drawings, the magnetic tape 1601 is advanced through the distance indicated as A following the closure of the contacts 1206 and 1207 and before the transmission of the end-of-call code and, consequently, prior to the operation of the end-of-call relay 1860. Thereafter, the tape 1601 is advanced through the distance represented as C in response to the release of the end-of-call relay 1860 following the production of the toll ticket thereby to reinitiate the charging of the condenser 1882. The total length of movement represented by the movements A and C is equal to the length of the movement indicated as B in Fig. 80 of the drawings so that the magnetic tape 1601 is positioned in the same relation to the mark head 1201 and the space head 1202 following a cycle of operation initiated under emergency conditions as those initiated under normal operating conditions by the clock and calendar circuit 27.

The opening of the contacts 1892 releases the serially operated playback relays 1830 and 1910 so that the first playback relay 1830 in releasing opens the contacts 1831 to remove locking ground from the operating winding of the first dismiss relay 1850. The dismiss relay 1850 then releases to open the contacts 1851, 1853, 1854 and 1855, and, to close the contacts 1852 and 1856. The closure of the contacts 1856 reenergizes the advance relay 1810 and the motor magnet 1740 in parallel, so that after the short interval of time required to open the contacts 1811, the motor magnet 1740 is released and advances the wipers to the next adjacent contacts. The operation of the advance relay 1810 also closes the contacts 1812, 1813 and 1814 associated therewith.

However, the switch relay 1720 is not operated in response to the operation of the advance relay 1810, inasmuch as the simultaneous operation of the advance relay 1810 and the release of the motor magnet 1740 advances the plurality of wipers to the next adjacent contacts. If the wiper 1870 engages a pair of grounded contacts, the hunt-assist relay 1750 is operated to energize the motor magnet 1740. Operation of the motor magnet 1740 opens the contacts 1741, so that the alternate operation of the hunt-assist relay 1750 and the motor magnet 1740 advances the plurality of wipers including the ground searching wiper 1872 to the normal home position in which all of the wipers except the ground searching wiper 1870 engage open contacts, and in which the wiper 1870 engages contacts connected to the "dummy" trunk 1872 to deenergize the home relay 1920. Energization of the home relay 1920 interrupts the locking circuit for the normal start relay 1930 and this relay releases to open the contacts 1931 thereby preventing further stepping of the stepping switch controlled by the motor magnet 1740. The release of the normal start relay 1930 also opens the contacts 1932 and 1933 so that the motors controlled thereby are released. Opening the contacts 1931 also removes the ground shunt around the operating winding of the switch relay 1720, so that this relay operates to close the contacts 1721, 1724, 1725 and 1726 and to open the contacts 1722 and 1723. The closure of the contacts 1721 reoperates the delay relay 1820 to close the contacts 1822 and 1824 and to open the contacts 1821 and 1823.

Accordingly, at the conclusion of an emergency playback operation, the playback control circuit 30 is conditioned for operation under the control of either of the clock and calendar circuit 27 or the emergency start conductor 30a. In this condition, the switch relay 1720, the delay relay 1820 and the advance relay 1810 are all operated to close and open their respectively associated contacts. It should be noted that when an emergency start takes place in the playback control circuit 30, this circuit searches for and seizes any one-way trunk circuits interconnected with contacts following the contact representative of the one-way trunk circuit and its associated recorder 25 which is filled for the purpose of initiating the emergency start of playback control circuit.

*Manually initiated operation of the playback control circuit 30*

It is sometimes desirable to manually actuate the playback control circuit 30 so as to check the operations of the circuit or the one-way trunk circuits 19 and trunk recorders 25, associated therewith. To this end, a manual switch controlling switch arm 1963a and 1963b is provided. Upon closure of this switch, the switch arm 1963a completes the circuit for operating the motor in the printer 36 and the common drive motor 1510. The closure of the switch arm 1963b operates the normal start relay 1930 to produce sequential operation of the playback control circuit 30, identical to that described above under the subtitle Normal Operation of the Playback Control Circuit 30.

*Alarm facilities in the playback control circuit 30*

The playback control circuit 30 is provided with a pair of relays 1940 and 1950 for the purpose of indicating that either the printing control circuit 35 or the playback control circuit 30 is not operating properly. This alarm is of major importance inasmuch as the magnetic tape 1601 in the seized trunk recorder 25 is erased during a playback operation so that if tickets are not produced in response to the first playback operation from the magnetic tape 1601, this information is permanently lost. To provide this alarm, an incomplete call relay 1940 is operated by the application of ground to a conductor 1956 which is connected to the playback control circuit 35 through the cable 1885. Ground is applied to this conductor in response to the seizure of a trunk recorder 25 so that this relay operates to close a plurality of contacts 1941 and 1942. The closure of the contacts 1941 interconnects the operating winding of the incomplete call relay 1940 with a conductor 1943 which extends to the printing control circuit 35 through the cable 1885. This conductor is normally grounded and remains grounded until such time as the printing control circuit 35 indicates that all of the information necessary to process a complete toll ticket has been received. At this time, ground is removed from the conductor 1943 so that the locking circuit for the incomplete call relay 1940 is broken. At this time, this relay releases to open the plurality of contacts 1941 and 1942.

However, if the printing control circuit 35 does not receive adequate information for producing a simple complete toll ticket during the playback of an entire tape 1601, ground remains on the conductor 1943 so that the incomplete call relay 1940 remains operated. Thereafter, when the hunt relay 1710 is released in response to dismissing a seized one-way trunk circuit 19 and its associated recorder 25 at the completion of the playback of the information stored on the magnetic tape 1601 therein, ground is applied through the closed contacts 1721, 1713 and 1942 to the operating winding of the alarm relay 1950. This relay is operated thereby to open a plurality of contacts 1951, 1954 and 1955 and to close a plurality of contacts 1952 and 1953.

The closure of the contacts 1952 completes a locking circuit for the alarm relay 1950 so that this relay remains operated. The opening of the contacts 1951 disconnects the incomplete call relay 1940 from the printing control circuit 35. The closure of the contacts 1953 energizes a major alarm, either of the visible or audible type to indicate that the preceding playback operation of the seized trunk recorder 25 failed to produce a single complete toll ticket, and thus indicates to the supervisory personnel that the toll ticketing facilities are operating improperly.

The opening of the plurality of contacts 1954 and 1955 breaks the energizing circuit for both of the operating windings of the normal start relay 1930 so that this relay may not be operated. By opening the operating circuits of the normal start relay 1930, it is impossible to initiate another cycle of operation of the playback control circuit 30 so that the toll ticketing facilities are rendered inoperative.

In summary, the playback control circuit 30 may be placed into operation at a selected time under the control of the clock and calendar circuit 27 to initiate a normal cycle of operation wherein all of the idle trunk recorders 25 located in the calling exchange 7 are played back so that the information stored therein may be utilized to control the production by the printer 36 of a plurality of toll tickets containing the items of information relating to each complete call. The playback control circuit 30 may also be placed into operation under the control of an emergency start condition wherein the cycle of operation is initiated by one of the trunk recorders 25 associated with the circuit 30 becoming filled with items of information relating to toll calls so that this recorder is no longer capable of registering these items. The provision of the emergency start circuit for the playback control circuit 30 reduces the "down" or busy time of the trunk circuit 19 to an absolute minimum. The playback control circuit 30 may also be placed in operation by manually controlled means to facilitate checking the automatic toll ticketing facilities. In addition, alarm means provided in the playback control circuit 30 render the ticket printing facilities, including the playback control circuit 30, the steering circuit 37, the storage chains 38, the printing control circuit 35, and the printer 36, incapable of searching for and seizing trunk recorders 25 whenever the seizure of any one of the trunk recorders 25 fails to produce a single toll ticket containing the items of information relating to one toll call.

PREAMPLIFIERS 31 AND 32 AND CLIPPING AMPLIFIERS 33 AND 34

The mark pulse and space pulse preamplifiers 31 and 32 are selectively interconnected with the mark and space reproducing heads 1201 and 1202, respectively, in a seized trunk recorder 25 by the playback control circuit 30. These preamplifiers amplify the low level pulses received from the mark and space heads 1201 and 1202 and couple the amplified signals to the input of the space pulse and mark pulse clipping amplifiers 34 and 33. The pulse clipping amplifiers 33 and 34 remove any base line disturbances which may be present in the pulses provided by the mark and space heads 1201 and 1202 and provide a very sharp and well defined pulse for subsequent use in the storage chains 38 and steering circuit 37.

More particularly, each of the preamplifier circuits 31 and 32 includes a pair of serially connected amplifier tubes 2010 and 2030. The input of the first amplifier 2010 is selectively interconnected with the space pulse head 1202 of a seized trunk recorder 25 through the wiper 1744 and the space pulse conductor 769. The signal applied to the conductor 769 by the space pulse head 1202 is coupled to the grid of the amplifier tube 2010 and coupled from the plate thereof to the grid of the amplifier tube 2030. The output from the amplifier tube 2030 is applied to the grid of a cathode follower tube 2050 and the output from the cathode of this tube is coupled through a pair of contacts 2202 in the printing control circuit 35 to the input of the space pulse clipping amplifier 34.

The output from preamplifier 32 is applied to the input grid of a triode 2020 which functions as a phase inverter and provides a small amplification of these signals. The output from the amplifier tube 2020 is applied to the grid of a clipping tube 2040. The grid of this tube is biased by a potentiometer 2045 so that only that portion of the incoming signals which is above a predetermined amplitude is transmitted by the tube 2040. In this manner, the base line disturbances are removed from the space pulses and the amplitude of the signal applied to the grid of a triode 2060 is clipped. The triode 2060 includes a grounded cathode and limits the space pulse applied to the grid thereof in addition to inverting the phase of the output of the tube 2040 to provide positive signals on a space pulse conductor 2070 connected to the plate of this tube.

The mark pulse preamplifier 31 and the mark pulse clipping amplifier 33 are identical to the space pulse preamplifier 32 and the space pulse clipping amplifier 34 disclosed in Fig. 20 of the drawings. The input of the mark pulse preamplifier 31 is obtained from the wiper 1743 so that this amplifier may be selectively interconnected with a mark head 1201 in a seized trunk recorder 25 whereby the pulses are applied through the mark pulse conductor 768 to the input grid of the first amplifier tube in the preamplifier circuit 31. The output of the mark pulse preamplifier 31 is coupled to the input of the mark pulse clipping amplifier 33 through a contact 2201 in the printing control circuit 35. The mark pulse clipping amplifier 33 supplies a positive signal to a mark pulse conductor 2080.

The interposition of the plurality of contacts 2201 and 2202 between the preamplifiers 31 and 32 and the clipping amplifiers 33 and 34 insures that no false pulses will be coupled to the output conductors 2070 and 2080 to produce any false indications in the steering circuit 37 or the storage chains 38. These contacts which are normally opened prevent transient voltages which may be picked up by the conductors or formed by stepping the wipers 1743 and 1744 over the associated contact banks 1743a and 1744a from being amplified in the preamplifier circuits and coupled through the clipping amplifier circuits to the output conductors 2070 and 2080. As will be described in detail hereinbelow, these contacts are closed under the control of the printing control circuit 35 so that the preamplifiers 31 and 32 are only connected with their associated clipping amplifiers 33 and 34 when the selected trunk recorder 25 has been seized by the operation of the playback control circuit 30.

STEERING CIRCUIT 37

The steering circuit 37 (Figs. 23, 24 and 25) is energized solely by the space pulses provided on the space conductor 2070 and utilizes the control information provided by these space pulses to direct the plurality of groups of mark pulses transmitted from the trunk recorder 25 during a playback operation to different ones of the individual storage chains 38. The steering circuit 37, in response to the receipt of each space pulse from the space conductor 2070, renders a selected one of the storage chains 38 effective to receive and register therein the group of mark pulses following the space pulse which selects the chain 38. The steering circuit 37, in addition to rendering a selected one of the storage chains 38 effective to receive a group of mark pulses, also renders the preceding storage chain 38 ineffective so that at any one time the steering circuit 37 maintains only one of the plurality of storage chains 38 in operative condition for receiving and registering therein one of the plurality of groups of mark pulses representative of the items of information pertaining to a particular toll call.

The steering circuit 37 comprises a counting chain 2300 and a phase inversion chain 2305. The counting chain 2300 is formed of a single drive tube 2310 and a plurality of cold cathode counter tubes 2330, 2350, 2370, 2391, 2396, 2410, 2430, 2450, 2470, 2490, 2494, 2510, 2530, 2550, 2570 and 2590. In a normal condition, all of the above listed cold cathode tubes are in a non-conductive state with the exception of the tube 2330 which is normally fired by the momentary application of a positive biasing voltage to the control electrode thereof through a conductor 4860 which extends to the printing control circuit 35. The control electrode of the drive tube 2310 is provided with a positive operating biasing voltage from a potentiometer 2335 and the control electrodes of the remaining tubes in the counting chain 2300 are provided with a normal operating bias by a potentiometer 2591.

The phase inversion chain 2305 comprises a drive tube 2320 and a plurality of other tubes 2340, 2360, 2380, 2392, 2397, 2420, 2440, 2460, 2480, 2492, 2496, 2520, 2540, 2560, 2580, and 2593. All of these tubes are normally in a non-conductive state with the exception of the tube 2340 which is normally rendered conductive by the momentary application of a positive biasing voltage to the control electrode thereof through a conductor 2344 which is connected to the printing control circuit 35 through the cable 2390. The control electrode of the drive tube 2320 is provided with a positive biasing voltage from the potentiometer 2335, and the control electrodes of the remaining tubes in the phase inversion chain 2305, with the exception of the normally fired tube 2340, are provided with a normal operating voltage from a potentiometer 2594. The cathodes of all of the tubes in the phase inversion chain 2305, with the exception of the tubes 2320 and 2340, are connected in common and to ground through a conductor 2596 which extends through the cable 2390 to the printing control circuit 35.

In general, the counting chain 2300 is sequentially operated to successively render each of the serially connected tubes forming the chain 2300 conductive in response to each space pulse applied to the control electrode of the drive tube 2310. As each tube in the chain 2300 is rendered conductive, the previously conductive preceding tube in this chain is rendered non-conductive to produce a positive pulse of voltage which is applied to the control electrode of a related tube in the phase inversion chain 2305 to render this tube conductive. The space pulse is also applied to the drive tube 2320 in the phase inversion chain 2305 simultaneously with its application to the control electrode of the drive tube 2310 in the counting chain 2300, and this application of the space pulse to the drive tube 2320 extinguishes any previously conductive tubes forming this chain so that only the tube selectively fired in response to extinguishing one of the tubes in the counting chain 2300 is conducting.

Each of the tubes forming the phase inversion ring 2305 is connected to the control electrode of a tube controlling the input to one of the storage chains 38 so that, when a particular one of the tubes forming the chain 2305 is energized, a positive voltage is applied to one of the storage chains 38 to render this chain responsive to the following group of mark pulses transmitted from the seized recorder 25. In this manner, the step-by-step operation of the counting chain 2300 and, accordingly, of the phase inversion chain 2305 sequentially renders a single selected storage chain 38 effective to receive and register the group of mark pulses following the space pulse which stepped the steering circuit 37.

The first item of information provided by a seized recorder 25 is a group of mark pulses representative of the first digit of the calling subscriber's directory number. Since the phase inversion tube 2340 is normally conducting, a positive bias is applied through a conductor 2345 and the cable 2395 to the control electrode of the input tube in the first storage chain 38 comprising the register means for the first digit of the calling subscribers number. This positive bias renders the first storage chain 38 effective to receive and store the first group of mark pulses to produce an electronic manifestation of the magnitude of the first digit of the directory number of the calling subscriber as described in detail hereinafter.

The next item of information provided by the seized magnetic recorder 25 is a space pulse separating the first and second groups of mark pulses. This space pulse is applied to the input electrode of the two drive tubes 2310 and 2320 through the space pulse conductor 2070. The application of this space pulse to the control electrode of the cold cathode drive tube 2310 renders this tube conductive to provide a large voltage drop across a cathode resistor 2311 due to the charging of a condenser 2312 through a resistor 2331. Since the tube 2310 is not provided with a plate resistor, substantially the full B+ voltage is applied across the resistor 2311. This voltage is also applied across the serially connected condenser 2312 and the resistor 2331 which is connected to the cathode of the first counting tube 2330.

The tube 2330 is normally conductive so as to provide a voltage drop across the resistor 2331 which is substantially smaller in magnitude than that produced by the charging of the condenser 2312. The voltage across the resistor 2331 is adjusted to be substantially less than that produced across the resistor 2311 by selecting proper values for the resistor 2331 and a plate resistor 2333. The application of this large voltage across the cathode resistor 2331 renders the tube 2330 non-conductive inasmuch as the voltage drop across this tube is insufficient to maintain conduction therethrough. The large voltage produced across the resistor 2311 also reduces the voltage applied across the drive tube 2310 so that this tube is extinguished.

The voltage drop across the cathode resistor 2311 of the drive tube 2310 is also applied to the cathodes of all of the tubes 2350, 2370, 2391, 2396, 2410, 2430, 2450, 2470, 2490, 2494, 2510, 2530, 2550, 2570 and 2590 through a conductor 2332, the cable 2390 and a conductor 2597. The conductors 2332 and 2597 are normally interconnected under the control of a relay in the printing control circuit 35. However, the application of this large voltage to the cathodes of all of the other tubes in the counting chain 2300 produces no effect at this time inasmuch as these tubes are not in a conductive state and the effect of the higher voltage placed on the cathodes thereof is merely to render these tubes less susceptible to conduction.

However, when the tube 2330 is extinguished, a large positive voltage is produced at the output anode thereof which is coupled to the control electrode of the next tube 2350 in the counting chain 2300, and also through a coupling condenser 2361 to the control electrode of the tube 2360 in the phase inversion chain 2305. The application of this positive voltage to the control electrode of the tube 2350 renders this tube conductive, and thereby produces a negative voltage pulse which is applied to the control electrode of the next succeeding tube 2370 in the counting chain 2300. This voltage is not effective to change the state of the tube 2370 inasmuch as the tube is already non-conductive and the negative pulse merely lowers the bias on the control electrode thereof.

The space pulse supplied to the control electrode of the drive tube 2310 in the counting chain 2300 is also applied to the control electrode of the drive tube 2320 in the phase inversion chain 2305. The application of this positive voltage to the control electrode of this tube fires this tube so that a large voltage drop is produced across its plate resistor 2321 by the charging current flowing through a resistor 2341 and a condenser 2322. The voltage drop across this resistor is practically equal to the B+ voltage inasmuch as the drop across the tube 2320 is negligible. This large voltage is applied across the plate resistor 2341 which is common to the output anodes of all of the tubes comprising the phase inversion chain 2305. There is a small voltage drop present across the plate resistor 2341 inasmuch as the tube 2340 is normally conductive, but the voltage applied across the plate resistor 2341 from the plate resistor 2321 is so large that the voltage applied across the conductive tubes 2340 and 2320 is lowered to the point at which conduction can no longer be sustained. When the tube 2340 is extinguished in response to the firing of the drive tube 2320, the positive voltage applied through the conductor 2345 to the control electrode of the input tube of the first storage chain 38 is removed so that this storage chain is no longer rendered responsive to the mark pulses transmitted thereto by the mark pulse conductor 2080.

The voltage coupled to the control grid of the tube 2360 through the coupling condenser 2361 in response to the extinguishing of the tube 2330 raises the bias on the control electrode of the tube 2360 so that this tube fires. In firing, the conduction through the tube 2360 and its associated cathode resistor 2363 produces a positive voltage which is applied through a conductor 2365 and the cable 2395 to the control electrode of the input tube to the storage chain 38 which is to receive the second group of mark pulses representing the second digit of the calling subscriber's number. Therefore, the receipt of the first space pulse steps the counting chain 2300 one step, and also steps the phase inversion chain 2305 one step so that the storage chain 38 which received the group of mark pulses representative of the first digit of the calling subscriber's number is rendered ineffective to receive any additional pulses and the storage chain 38 which is adapted to receive the second group of pulses representative of the second digit of the calling subscriber's number is rendered effective to store and register these pulses to produce an electronic manifestation of the magnitude of this digit.

The cathode resistors of all of the tubes comprising the phase inversion chain 2305, with the exception of the drive tube 2320, are provided with condensers connected in parallel therewith. The cathode resistor 2363 of the tube 2360 is provided with a condenser 2362, which is identical in function to the condensers provided for the other tubes of the phase inversion chain 2305. This condenser maintains the cathode bias on the tube 2360 during the de-ionization time thereof to prevent reignition of this tube after it has been extinguished in response to the firing of the drive tube 2320. Each of the output conductors similar to the conductors 2345 and 2365 is also provided with an isolation resistor similar to the resistor 2364 shown in conjunction with the tube 2360.

In response to the receipt of the second space pulse which is interposed between the groups of mark pulses representing the second and third digits of the calling subscriber's number, the drive tubes 2310 and 2320 are again simultaneously energized. The energization of the drive tube 2310 extinguishes the previously fired tube 2350 and initiates conduction through the tube 2370. The firing of the drive tube 2320 extinguishes the previously conductive tube 2360 and the tube 2380 is fired in response to the transmission of a positive pulse to the control electrode thereof when the tube 2350 is extinguished under the control of the drive tube 2310.

In response to the interruption of conduction through the tube 2360, the positive bias is removed from the control electrode of the input tube to the second storage chain 38 so that this chain is rendered ineffective to mark pulses transmitted thereto. The firing of the tube 2380 couples a positive biasing voltage through a conductor 2385 and the cable 2395 to the control electrode of the input tube associated with a third storage chain 38 so that this storage chain is rendered effective to receive the third group of mark pulses representing the third digit of the calling subscriber's number.

In the same manner, subsequent pulses received from the space pulse conductor 2070 produce simultaneous firing of the drive tubes 2310 and 2320 so that the tubes 2391, 2396, 2410, 2430 and 2450 are successively fired in the counting ring 2300. The sequential firing of these tubes and the consequent extinguishment of the tubes 2370, 2391, 2396, 2410 and 2430 successively energizes the tubes 2392, 2397, 2420, 2440 and 2460 in the phase inversion chain 2305. Simultaneously therewith, the successive operation of the drive tube 2320 in the phase inversion chain 2305 extinguishes the tubes 2380, 2392, 2397, 2420 and 2440. The sequential operation of the tubes 2392, 2397, 2420, 2440, and 2460 provides a momentary positive bias on a plurality of conductors 2393, 2398, 2425, 2445, 2465, respectively, to raise the bias on the control electrodes of the drive or input tubes in the plurality of storage chains 38 in which are registered the last digit of the calling subscriber's directory number and the four digits designating the called subscriber. These conductors are connected to the control electrodes of the input tubes of these storage chains 38 through the cable 2395.

The next space pulse received on the space pulse conductor 2070 produces simultaneous operation of the drive tubes 2310 and 2320 to extinguish the tubes 2450 and 2460, and to fire the tubes 2480 and 2470. Extinguishing the tube 2460 removes the positive bias from the control electrode of the input tube to the storage chain 38 which registers the fourth and last digit of the called subscriber's number and the operation of the tube 2480 places a positive bias on the input tube of another storage chain 38 in which are registered the mark pulses indicative of the duration of the toll call. This positive bias is applied to the control electrode of the input tube of this storage chain 38 through a conductor 2485 and the cable 2395.

The next two space pulses received from the space pulse conductor 2070 produce the sequential extinguishment of the tubes 2470 and 2490, and in response thereto, the sequential operation of the phase inverter tubes 2492 and 2496. The sequential operation of the tubes 2492 and 2496 applies an increased bias through a pair fo conductors 2493 and 2495 to the input of a pair of storage chains 38 in which are registered the groups of mark pulses representing the tens and units digits of the hour at which the toll call was terminated.

The next two space pulses received from the space pulse conductor 2070 extinguish the tubes 2494 and 2510 so that the phase inversion tubes 2520 and 2540 are sequentially fired.

The sequential energization of these tubes to cause them to become conductive produces positive biasing voltages which are applied through a pair of conductors 2525 and 2545 to the control electrodes of the input tubes in a pair of storage chains 38 in which are registered the tens and units digits of the minutes at which the toll call was terminated. These conductors are connected to the storage chains 38 through the cable 2395.

The next space pulse received extinguishes the tube 2530 so as to render the tube 2560 conductive to provide a positive bias which is applied to the control electrode of the drive or input tube of the storage chain 38 in which is registered the numerical designation of the month during which the toll call was terminated. This positive bias is supplied to this control electrode through a conductor 2565 and the cable 2395.

The next two space pulses received extinguish the tubes 2550 and 2570 successively to render the tubes 2580 and 2593 conductive. The sequential operation of these tubes produces a pair of positive biasing voltages which are applied to the control electrodes of each of a pair of storage chains 38. These storage chains are utilized to store the tens and units digits of the numerical description of the day upon which the toll call was terminated. The positive bias is applied to these control electrodes through a pair of conductors 2585 and 2595 which extend through the cable 2395.

Following the registration of the last or sixteenth group of mark pulses representing the units digit of the day on which the toll call was terminated, a space pulse is transmitted over the conductor 2070 and is applied to the control electrodes of the two drive tubes 2310 and 2320. This pulse renders the drive tube 2310 conductive so as to extinguish the previously fired tube 2590 which is the last of the serially connected tubes forming the counting chain 2300. This space pulse also renders the drive tube 2320 conductive so that the tube 2593 is rendered nonconductive. At this time, therefore, none of the tubes forming the counting chain 2300 and the phase inversion chain 2305 are conductive, and, since none of the tubes in the phase inversion chain 2305 are conducting, none of the storage chains 38 are effective to register mark pulses transmitted over the conductor 2080.

The next item of information transmitted from the seized recorder 25 is an end-of-call code signal comprising simultaneous mark and space pulses. The space pulse is applied to the control electrode of the drive tubes 2310 and 2320 but produces no useful function at this time inasmuch as all of the tubes are in a non-conductive state and, accordingly, there are no tubes to be extinguished thereby to produce a positive voltage for initiating conduction through one of the tubes in the phase inversion chain 2305. The mark pulse forming the other portion of the end-of-call code is applied to the mark pulse conductor 2080, but this pulse is not registered in any of the storage chains 38 since the non-conductive state of all of the tubes forming the phase inversion ring 2305 renders all of the input control means to these storage chains non-responsive to mark pulses.

The end-of-call code, however, is also applied to the printing control circuit 35 wherein it is utilized to initiate a cycle of operation of the printer 36 so that a printed ticket is produced containing the items of information previously registered in the storage chains 38 under the control of the steering circuit 37. Following the production of the toll ticket by the printer 36, the printing control circuit 35 operates a plurality of reset relays for the purpose of conditioning the storage chains 38 and the steering circuit 37 for another cycle of operation wherein the items of information pertaining to the next succeeding toll call are successively registered in the plurality of storage chains under the control of the steering circuit 37.

More particularly, the steering circuit 37 is reset under the control of the printing control circuit 35 by operating a relay to open the contacts normally interconnecting the conductors 2332 and 2597. The opening of these contacts disconnects the commonly connected cathodes of the counting tubes forming the counting chain 2300 from ground and from the cathode resistor 2331. The operation of the relays in the control circuit 35 also opens the contacts through which the conductor 2596 is normally connected to ground. The opening of these contacts disconnects the cathodes of the plurality of tubes forming the phase inversion chain 2305 from ground so that none of these tubes may be rendered conductive in response to the firing of the drive tube 2320 or the prime tube 2340.

To complete the preparation of the counting chain 2300 and the phase inversion chain 2305 for operation under the control of information representing the next succeeding toll call, a relay is operated in the printing control circuit 35 during the resetting operation which applies a positive biasing voltage to the conductors 4860 and 2344 to render the tubes 2330 and 2340 conductive. The firing of the tube 2330 conditions the tube for being extinguished in response to the next space pulse and the firing of the tube 2340 applies a positive bias on the control grid of the drive tube in the storage chain 38 in which are to be registered the next group of mark pulses, i.e., those representing the first digit of the directory number identifying the subscriber placing the next toll call recorded on the tape 1601.

Following the application of the biasing voltage to the control electrodes of the tubes 2330 and 2340, the reset relays in the printing control circuit 35 are released so that the commonly connected cathodes of the tubes in the counting chain 2300 are again connected to the cathode resistor 2331, and the commonly connected cathodes of the tubes in the phase inversion chain 2305 are again connected to ground to permit conduction therethrough. Since the cathodes of the tubes 2330 and 2340 are not connected to the commonly connected cathodes of the remaining tubes in the counting chain 2300 and the phase inversion chain 2305, the firing of these two tubes does not affect the non-conductive state of the remainder of the tubes in these two chains and, accordingly, prevents the next group of mark pulses representing the first digit of the calling subscriber's number from being applied to other than the correct storage chain 38.

It should be noted that the end-of-call code, although normally following the items of information pertaining to the tens and units digits of the day upon which the toll call was terminated, may be transmitted from the seized magnetic recorder 25 following the firing of the tube 2460 which renders effective the storage chain 38 for registering the last digit of the called subscriber's number. As described above, the end-of-call code is transmitted at this time if the called line is busy, or if for some other reason the call is not completed to the called subscriber's number. Since no ticket is to be printed for calls which are not completed, the transmission of the end-of-call code immediately following the group of mark pulses representing the last digit in the called subscriber's number initiates operation of the reset relays in the printing control circuit 35 so that the counting chain 2300 and the phase inversion chain 2305 are reset and conditioned for operation under the control of the information relating to the next succeeding toll call in the manner described above.

In summary, the steering circuit 37 is controlled solely by the space pulses provided by the space pulse conductor 2070 and utilizes these pulses to sequentially apply the sixteen groups of mark pulses representing information registered in the seized magnetic recorder 25 to the proper storage chains 38 in a selected sequence. The steering circuit 37 is provided with means under the control of the printing control circuit 35 for resetting this circuit to a normal condition both in response to the completion of the printing of each toll ticket including the items of information previously registered and in response to the transmission of an end-of-call code to the printing control circuit 35 following the receipt of the group of mark pulses representative of the last digit in the called subscriber's number when the call is not completed for one reason or another. Accordingly, the steering circuit 37 is reset to a normal operating condition, either following production of each complete toll ticket or in response to the receipt of an end-of-call code by the printing control circuit 35 signifying that the toll call was not completed.

CALLING AND CALLED SUBSCRIBER DIGIT COUNTING CHAINS 2600–2607

A plurality of subscriber digit counting chains, 2600 to 2607, inclusive (Figs. 26 and 27), form one type of the storage chains 38 and are adjusted to register the digits comprising the directory number of the calling and called subscribers. There are shown three complete subscriber digit counting chains, 2600, 2601, and 2607. The counting chain 2600 registers the first digit of the calling subscriber's number, the counting chain 2601 registers the second digit of the calling subscriber's number, and the counting chain 2607 registers the fourth digit of the called subscriber's number. The intervening counting chains, 2602 to 2606, inclusive, which register the third and fourth digits of the calling subscriber's number and the first, second and third digits of the called subscriber's directory number, are identical to those disclosed, and, for convenience, are not illustrated in the drawings.

These counting chains are sequentially rendered effective in the order listed above under the control of the steering circuit 37. The steering circuit 37 sequentially places a positive biasing voltage on the control electrode of each of the drive tubes in the plurality of counting chains 2600 to 2607, inclusive. The control electrodes of the drive tubes of all of the plurality of counting chains 2600 to 2607, inclusive, are also connected in common with the mark pulse conductor 2080 so that upon application of a positive bias to one of the control electrodes by the steering circuit 37 the following group of mark pulses is effective to sequentially energize a corresponding one of the counting chains to manifest one digit of the calling or called subscriber's number.

The counting chain 2600 which registers the first digit of the calling subscriber's number is similar to the counting chain 2300 in operation. This counter comprises a drive tube 2610, a prime tube 2640, and a plurality of cold cathode counting tubes 2680 and 2710. The counter tubes 2680 and 2710 are serially connected so as to be sequentially energized under the control of the drive tube 2610 and the prime tube 2640. The control electrode of each of the counting tubes and the prime tube 2640 is connected in common with a source of biasing potential 2740. The cathodes of all of the counter tubes 2680 and 2710 are connected to the cathode of the prime tube 2640 through a conductor 2642.

As described above in conjunction with the description of the operation of the steering circuit 37, the tube 2340 is normally in an operative condition so that a positive bias is applied to the conductor 2345. This conductor passes through the cable 2395 and is connected to the control electrode of the drive tube 2610. The application of this positive biasing voltage to the control electrode of the tube 2610 renders this tube effective to pulses received from the mark pulse conductor 2080. Also, as discussed above, the first group of mark pulses applied to the mark pulse conductor 2080 from the seized magnetic recorder 25 is representative of the first digit of the directory number of the calling subscriber.

As indicated in the description of the one-way trunk circuit 19, the information pertaining to the directory number of either the called or the calling subscriber is in the form of a number of pulses equal in magnitude to the digit to be manifested and with the "0" being manifested by ten successive pulses. Therefore, the first pulse in the group of pulses representing the first digit of the directory number of the calling subscriber, upon application thereof to the control electrode of the drive tube 2610, fires this tube to produce a large voltage drop across a cathode resistor 2611. This potential is coupled through a condenser 2612 to be applied across a cathode resistor 2641 in the cathode circuit of the normally conductive prime tube 2640. As described above in conjunction with the operation of the counting chain 2300, the application of this large voltage to the cathode of the prime tube 2640 results in the interruption of the conduction therethrough, and, accordingly, couples a positive voltage pulse to the control electrode of the first counting tube 2680. This tube is fired in response to the receipt of this positive voltage.

Thereafter, upon termination of the first pulse in the first group of mark pulses manifesting the first digit in the directory number of the calling subscriber, the second pulse of this group is received and applied to the control electrode of the drive tube 2610. This results in refiring this tube and applying another voltage across the cathode resistor 2641 to extinguish conduction in the tube 2680. The de-ionization of the tube 2680 results in a positive surge of voltage being applied to the control electrode of the second tube 2680 in the counting chain 2600 to fire this tube. This sequential operation is continued until such time as the last pulse in the first group of pulses representing the first digit of the directory number of the calling subscriber is received. This last pulse initiates conduction in one of the tubes 2680 or 2710 to electronically manifest the total number of pulses received.

It should be noted that, in the counting chain 2600, each of the tubes 2680 and 2710 is designated by a numerical digit appearing in the upper right-hand corner of each of these tubes. These digits correspond with the number of pulses required to energize the tube with which a particular numeral is associated, and, accordingly, the operation of any one of the tubes 2680 or 2710 indicates that the magnitude of the first digit in the directory number of the calling subscriber is that of the numeral associated with the fired tube. In the event that the first digit is "0," ten pulses are applied to the control electrode of the drive tube 2610 so that the last of the serially connected tubes 2710 is fired to manifest "0."

To provide a means for utilizing the information manifested by the selective operation of one of the plurality of tubes 2680 and 2710 in the counting chain 2600, the output anodes of these tubes are connected to similarly positioned contacts in a plurality of contact banks associated with a stepping switch 5100 in the printing control circuit 35 by means of a plurality of conductors 2681 and 2711, respectively. The manner in which the anodes of the plurality of tubes 2680 and 2710 in the counting chain 2600 are interconnected with the contacts of the stepping switch 5100 is illustrated in the chart shown in Figs. 74 and 75 of the drawings. As shown in Fig. 74, the conductors connected to the anodes of the tubes 2680 and 2710 designated by the digits "1" to "9," inclusive, and "0" are connected to like designated contacts forming the fifth stepping position of the stepping switch 5100.

Immediately following the completion of the operation of the counting chain 2600 under the control of the first group of mark pulses representing the first digit of the directory number of the calling subscriber, a space pulse is applied to the steering chain 37 so that, as described hereinbefore, the positive bias is removed from the conductor 2345 and applied to the conductor 2365. The removal of the positive bias from the conductor 2345 renders the counting chain 2600 ineffective. However, the tube in the chain fired under the control of the previous group of mark pulses remains conductive to manifest the first digit of the calling subscriber's directory number. The application of the positive bias to the conductor 2365 raises the bias on the control electrode of a drive tube 2620 in the counting chain 2601.

The counting chain 2601 operates in the same manner as the chain 2600 and is utilized to register the second digit of the directory number of the calling subscriber. The drive tube 2610 cooperates with a prime tube 2650 to control the sequential energization of a plurality of counting tubes 2690 and 2720 forming the counting chain 2601 in accordance with the second group of mark pulses.

When the control electrode of the drive tube 2620 is rendered effective, the pulses applied thereto by the mark pulse conductor 2080 intermittently operate this tube serially to render conductive the counting tubes 2690 and 2720. When the last mark pulse of the group representing the second digit of the directory number of the calling subscriber is received, a particular one of the tubes 2690 or 2720 is conducting in accordance with the number of pulses transmitted to the drive tube 2620 from the mark pulse conductor 2080. In order to utilize this electronically manifested information, the anode of each of the tubes 2690 and 2720 is connected to a contact in the contact bank of the stepping switch 5100 through conductors 2691 and 2721, respectively, and a cable 2692. As shown in Fig. 74 of the drawings, the anodes of the tubes 2690 and 2720 manifesting the digits "1" to "9," inclusive, and "0" are connected to like designated contacts in the contact decks 1 to 9, inclusive, and "0" in the sixth stepping position.

The counting chains 2602, 2603, 2604, 2605 and 2606, which register the information pertaining to the third and fourth digits of the directory number of the calling subscriber, and the first, second, and third digits of the directory number of the called subscriber are not shown in the drawings. However, these counting chains are identical to those disclosed in Figs. 26 and 27 of the drawings, and are sequentially rendered effective to receive mark pulses transmitted thereto over the mark pulse conductor 2080 in response to the sequential application of a positive biasing voltage to the conductors 2385, 2393, 2398, 2425, and 2445, respectively, under the control of the steering circuit 37. The information manifested by the selective operation of one of the tubes in each of the counting chains 2602, 2603, 2604, 2605, and 2606 is utilized by interconnecting the output anodes of all of the tubes forming these counting chains with like designated contacts in the ten contact banks of the stepping switch 5100. As shown in Fig. 74 of the drawings, the outputs of these counting chains are connected to the contacts forming the seventh, eighth, thirteenth, fourteenth, and fifteenth stepping positions, respectively.

The counting chain 2607 is adapted to receive the group of mark pulses representative of the fourth digit of the directory number of the called subscriber. The control electrode of a drive tube 2630 in the counting chain 2607 is rendered effective by the application of a positive biasing voltage to the conductor 2465 by the steering circuit 37. This eighth group of mark pulses received from the seized magnetic tape recorder 25 sequentially operates a prime tube 2670 and one of a plurality of counting tubes 2660 or 2730. One of these tubes is energized to provide an electronic manifestation of the magnitude of the fourth digit in the directory number of the called subscriber, and this information is made available to the printing control circuit 35 by interconnecting the output anodes of all of the tubes 2660 and 2730 with like designated contacts forming the sixteenth stepping position of the stepping switch 5100. A plurality of conductors 2661 and 2731 forming a cable 2662 are utilized for interconnecting the contact banks of the stepping switch 5100 with the anodes of the tubes 2660 and 2730, respectively.

The information electronically manifested or registered in the plurality of counting chains 2600 to 2607, inclusive, is utilized by the printing control circuit 35 to control the operation of the printer 36 in accordance with the current flowing through the single tube in each of these chains which is selectively rendered conductive as described hereinabove. To facilitate a larger flow of current through the tube selectively rendered conductive, the printing control circuit 35, when it is desired to operate the printer 36, operates a relay to connect the commonly connected cathodes of the counting tubes forming the counting chains 2600 to 2607, inclusive, to direct ground so that the current flow therethrough is increased due to the removal of the cathode resistor from their ground path.

Following the production of a printed toll ticket including all of the items electronically registered in the plurality of storage chains 38, the printing control circuit 35 resets the plurality of storage chains 38 including the counting chains 2600 to 2607, inclusive, to a normal condition. This is accomplished by operating a reset relay in the printing control circuit 35 which disconnects the commonly connected cathodes of the tubes forming the counting chains 2600 to 2607, inclusive, from ground so that the conductive tubes are extinguished, and by disconnecting the common cathode resistor from the commonly connected cathodes. Immediately thereafter, the printing control circuit 35 applies a momentary pulse of positive biasing voltage to the conductor 4680 which is connected to the control electrodes of all of the prime tubes in the counters 2600 to 2607, inclusive, to initiate conduction through these prime tubes. Thereafter, the printing control circuit 35 reconnects the cathodes of the prime tubes with the plurality of commonly connected cathodes of the counting tubes. Since the cathodes of the prime tubes are disconnected from the plurality of cathodes of the counting tubes during the time at which the positive bias is applied to the control electrodes thereof, there is no possibility of producing a false indication or manifestation of a particular digit inasmuch as the open circuit on the cathodes of all of the commonly connected tubes prevents any of these tubes from firing.

In general, the calling and called subscriber counting chains 2600 to 2607, inclusive, are selectively rendered effective in a predetermined sequence under the control of the steering circuit 37, and further, are selectively operated to manifest a particular digit in accordance with the digit in each of the denominational columns of the calling and called subscribers' directory numbers. This selective manifestation of a particular digit is accomplished by rendering a single tube in each of the counting chains 2600 to 2607 conductive in accordance with the number of pulses applied to the control electrode of the drive tube associated with each of these counting chains. In view of the inherent high speed at which electronic counting chains are capable of operating, there is no limitation on the speed at which the magnetic tape 1601 in the seized recorder 25 can be operated.

ELAPSED TIME COUNTER 3000

The elapsed time counter 3000 (Figs. 28, 29, and 30) is another type of tube register circuit referred to generally as the storage chains 38 and operates to provide an electronic manifestation or registration of the duration of the toll calls. To this end the elapsed time counter 3000 is provided with a pair of counting circuits similar in operation to the counting chain 2300 in the steering circuit 37, and also similar to the subscriber digit counting chains 2600 to 2607, inclusive. The elapsed time counter 3000 includes a units minutes counting ring 2900 and a tens minutes counting chain 2800.

The input electrode of the units minutes counting ring 2900 is interconnected with the mark pulse conductor 2080 so that the mark pulses applied to the control electrode of the input tube of the counting ring 2900 sequentially energizes this ring in accordance with the number of mark pulses received. The ninth group of mark pulses is applied to this control electrode and contains a plurality of discrete pulses equal in number to the minutes of the duration of a particular toll call. In addition to being formed in a closed ring, the output anode of the last tube in the ring 2900 is interconnected with the input control electrode of the tens minutes counting chain 2800 so that this counting chain is energized in response to a single complete cycle of operation of the units minutes counting ring 2900.

As explained above in the description of the operation of the steering circuit 37, the space pulse received by this circuit immediately following the group of mark pulses representing the fourth digit of the called subscriber's number fires the tube 2480 so that a positive biasing voltage is applied to the conductor 2485. This conductor is connected to the control electrode of a drive tube 2950 in the units minutes counting ring 2900. This application of a positive biasing voltage to the control electrode of the drive tube 2950 renders the elapsed time counter 3000 effective to receive the following group of mark pulses on the mark pulse conductor 2080. The units minutes counting ring 2900, in addition to the drive tube 2950, includes a prime tube 2960 and a plurality of counting tubes 2970, 3010, 3020, 3030, 3040, 3050, 3060, 3070, and 3080. It should be noted that the tube 2960, in addition to operating as a normally conductive prime tube also manifests "0." The remaining counting tubes manifest the digits "1" to "9," inclusive. As disclosed in conjunction with the counting chains 2600 to 2609, inclusive, the cathode resistor of the normally fired prime tube 2960 is connected to the commonly connected cathodes of the counting tubes by means of a conductor 2961. The conductor 2961 extends to the printing control circuit 35 through a cable 4480. The prime tube 2960 and the plurality of counting tubes in the units minutes counting ring 2900 each include a control electrode which is provided with a positive bias by means of the biasing control 2740, which bias is applied to the plurality of grids through the conductor 2745.

The application of the positive biasing voltage from the steering circuit 37 to the control electrode of the drive tube 2950 renders this drive tube responsive to the group of mark pulses on the mark pulse conductor 2080 representing the duration of a particular toll call. The receipt of these mark pulses by the drive tube 2950 sequentially energizes the plurality of counting tubes in the counting ring 2900 so that a particular one of these tubes is rendered conductive to manifest the total number of pulses received. In the event that the duration of the call exceeds nine minutes, the de-ionization of the "9" manifesting tube 3080 produces a positive pulse which is returned to the control electrode of the prime or "0" manifesting tube 2960 through a coupling condenser 2966. Therefore, the receipt of every tenth pulse by the drive tube 2950 results in rendering the prime tube 2960 conductive thereby to manifest "0." The positive pulse produced by de-ionizing the "9" manifesting tube 3080 in the units minutes counting ring 2900 is also coupled to the control grid of a drive tube 2810 in the tens minutes counting chain 2800 through a coupling condenser 2815.

The counting chain 2800, in addition to the drive tube 2810, includes a prime or "0" manifesting tube 2820, and a plurality of cold cathode counter tubes 2830, 2840, 2850, 2860, 2870, 2880, 2910, 2920, 2930, and 2940. The commonly connected cathodes of the plurality of counter tubes are connected to a cathode resistor in the cathode circuit of the prime tube 2820 through a conductor 2821 which extends to the printing control circuit 35 through the cable 4840. Also, the control electrodes of the prime tube 2820 and the remainder of the counting tubes comprising the counting chain 2800 are provided with positive bias from the potentiometer 2740 through the conductor 2745. The sequential application of positive pulses to the control electrode of the drive tube 2810 under the control of the completion of a cycle of operation of the units minutes counting ring 2900 produces a sequential energization of the tubes comprising the counting chain 2800 so that, at any particular given time, a single conductive tube in the units minutes counting ring 2900 and the tens minutes counting chain 2800 electronically manifest the total of the number of pulses received from the mark pulse conductor 2080 representing the duration of the toll call in minutes.

In order to make the information electronically manifested or registered in the elapsed time counter 3000 available to the printing control circuit 35, the output anodes of the tubes in the units minutes counting ring 2900 are interconnected with like designated contacts in the thirty-third stepping position (Fig. 75) of the stepping switch 5100 in the printing control circuit 35 through a plurality of conductors 2965 and 3015. These conductors are joined together to form a cable 3090 which extends to the printing control circuit 35 through a cable 2750. The output anodes of the plurality of tubes in the tens minutes counting chain 2800 are connected to like designated contacts forming the thirty-second stepping position (Fig. 75) of the stepping switch 5100 in the printing control circuit 35 through a plurality of conductors 2891 and 2911. These conductors are joined together to form a cable 2890 which extends to the printing control circuit 35 through the cable 2750.

The information electronically registered or manifested in the elapsed time counter 3000 is utilized by the printing control circuit 35 in the same manner as the information registered in the plurality of subscriber digit counting chains 2600 to 2607, inclusive, by operating control elements associated with the printer 36 in accordance with the flow of current through the tubes selectively rendered conductive. In order to provide an increased flow of current through the tubes rendered conductive, the printing control circuit 35, when it is desired to initiate the production of a printed toll ticket, operates a prepare-to-read relay which connects the commonly connected cathodes of the plurality of counting tubes in the units minutes counting ring 2900 and the tens minutes counting chain 2800 to ground thereby resulting in an increased flow of current therethrough.

In addition to grounding the commonly connected cathodes of the tubes forming the counting chain 2800 and the counting ring 2900, the printing control circuit 35 applies ground to a conductor 2813 which is connected to the control electrode of the drive tube 2810 in the counting chain 2800. The ground applied to the control electrode of this tube renders the drive tube 2810 insensitive to spurious voltages which may be coupled thereto and, accordingly, prevents the drive tube 2810 from operating during the time that the information manifested in the chain 2800 is being utilized by the printer 36, thereby to prevent any possibility of producing a false indication of the magnitude of the digit in the tens minutes denominational column of the numerical notation of the duration of the toll call.

Following the production of a printed ticket including the items previously registered in the storage chains 38, the printing control circuit 35 operates a plurality of reset relays to condition the elapsed time counter 3000 for another cycle of operation under the control of the next group of mark pulses representing the duration of the next succeeding call. The operation of the reset relays in the printing control circuit 35 disconnects the commonly connected cathodes of the tubes forming the units minutes counting ring 2900 and the tens units counting chain 2800 both from ground, so that the selectively energized tubes are extinguished, and from the common cathode resistors connected in the cathode circuits of the prime tubes. Also, during the resetting of the elapsed time counter 3000, ground is removed from the conductor 2813 so that the drive tube 2810 of the tens minutes counting chain 2800 is rendered effective to pulses received through the coupling condenser 2815.

In addition, the operation of the reset relays in the printing control circuit 35 applies a positive biasing potential to the conductor 4860 which extends to the control electrodes of the prime tubes 2820 and 2960. The application of this biasing voltage renders these two prime tubes conductive so that prior to the receipt of the next group of duration pulses on the conductor 2080, the tens minutes counting chain 2800 and the units minutes counting ring 2900 are reset to a normal operating condition representing an elapsed time of "00" minutes. The firing of the prime tubes 2820 and 2960 does not affect the non-conductive state of the remainder of the tubes forming the counting chain 2800 and the counting ring 2900 inasmuch as the commonly connected cathodes of the counting tubes are disconnected from the cathode resistors controlled by the prime tubes. Following a predetermined interval of time, the reset relays in the printing control circuit 35 are released to re-establish the conductive paths provided by the conductors 2821 and 2961 so that the commonly connected cathodes of the counting tubes are connected to the common cathode resistors in the cathode circuits of the prime tubes 2820 and 2960. The release of the reset relays also removes the positive biasing voltage from the conductor 4860 and thereby conditions the elapsed time counter 5000 for operation under the control of the next group of mark pulses representing the duration of the next succeeding toll call.

Accordingly, the printing control circuit 35, following the production of a permanent record containing the items of information pertaining to a particular toll call, conditions the elapsed time counter 3000 to receive the items of information pertaining to the next toll call. This resetting operation is accomplished by opening the leads 2821 and 2961 so that all of the counting tubes in the counting chain 2800 and counting ring 2900 are deionized. Further, the resetting operation of the printing control circuit 35 places a positive bias on the control electrodes of the two prime tubes 2820 and 2960 so that these tubes are rendered conductive whereby the first pulse received by the drive tubes associated with these prime tubes produces a deionization of the prime tubes and the establishment of conduction in the "1" and "10" manifesting tubes 2970 and 2830. Since the prime tubes 2960 and 2820 also function to manifest the cipher or "0," the application of positive bias to the control electrodes thereof in response to the completion of the printing of a toll ticket conditions the counting chain 2800 and the counting ring 2900 to manifest "0" in each of these counting chains, thus representing a total call duration of "00" minutes.

In summary, the elapsed time counter 3000 is rendered effective under the control of the steering circuit 37 by the application of a positive bias to the control electrode of the drive tube 2950 in the units minutes counting ring 2900. The application of this positive bias to the control electrode of the drive tube 2950 renders the counting ring 2900 effective to receive the group of mark pulses on the mark pulse conductor 2080 pertaining to the duration of a particular toll call. These received mark pulses sequentially energize the counting tubes comprising the counting ring 2900 and, if the duration of the call exceeds nine minutes, also selectively energize the tens minutes counting chain 2800 to sequentially render conductive a single counting tube therein. At the end of the group of mark pulses, if the duration of the call has exceeded nine minutes, a single tube is conducting in both the tens minutes counting chain 2800 and the units minutes counting ring 2900 to produce an electronic manifestation or registration of the total number of minutes of elapsed time in a particular toll call. If the duration of the call is less than nine minutes, only a single counting tube in the units minutes counting ring 2900 and the prime tube 2820 are rendered conductive to manifest the single digit representative of the duration of this particular toll call. The information provided by the electronic manifestation of the duration of the toll call produced by the elapsed time counter 3000 is connected to the stepping switch 5100 in the printing control circuit 35 and utilized hereinafter therein to produce a toll ticket providing a permanent record of the duration of this particular toll call.

The elapsed time counter 3000 is conditioned for transmitting the registered information and is reset under the control of the printing control circuit 35 so that, in a normal operating condition, the "0" manifesting tube 2960 in the units minutes counting ring 2900 and the "0" manifesting tube 2820 in the tens minutes counting chain 2800 are normally rendered conductive to manifest a total elapsed time of "00" minutes. The resetting operation also extinguishes any of the counting tubes which may have been rendered conductive by the preceding group of pulses so that the only tubes rendered conductive in the elapsed time counter 3000 are the two "0" manifesting tubes. Following the selective operation of the elapsed time counter 3000 to electronically manifest the duration of the toll call, the positive bias is removed from the conductor 2485 under the control of the steering circuit 37 so that this counter is no longer effective to receive and utilize pulses provided on the mark pulse conductor 2080.

COST COMPUTER 39

The cost computer 39 (Figs. 31–34) is provided with information relating to the exchange in which the called subscriber is located, and is also provided with information relating to the duration of each of the toll calls so that the cost computer 39 is enabled to produce an electronic manifestation of the total cost or charge to be assessed for each toll call. The cost computer 39 is rendered effective to calculate the cost of each toll call in response to the application of the positive biasing potential by the steering circuit 37 to the control electrode of the drive tube in the units minutes counting ring 2900 in the elapsed time counter 3000. Therefore, the pulses representative of the duration of the call are not only applied to actuate the elapsed time counter 3000, but also to energize the cost computer 39 in parallel with the counter 3000.

The cost computer 39 includes a base time counting chain 3100, a units cents counting ring 3300, a tens cents counting ring 3125, and a units dollars counting chain 3305. The cost computer 39 is provided with information pertaining to the exchange in which the called subscriber is located by the printing control circuit 35, and, more particularly, the base time counting chain 3100 is provided with information relating to the minimum base time period for which a predetermined minimum charge is to be assessed in accordance with the called exchange. The monetary portion of the cost computer 39 comprising the units cents counting ring 3300, the tens cents counting ring 3125 and the units dollars counting chain 3305 is provided with information relating to the monetary charge to be assessed for the predetermined minimum base time period primed into the base time counting chain 3100. This minimum cost information is primed into the units cents counting ring 3300 and the tens cents counting ring 3125 by selectively rendering a single tube in each of these two counters conductive under the control of the printing control circuit 35, thereby to manifest a predetermined minimum charge. The base time information which is primed into the base time counting chain 3100 and the minimum charge information which is primed into the units cents counting ring 3300 and the tens cents counting ring 3125 is applied to these components of the computer 39 to assess a minimum charge even though the duration of the call does not extend up to the full minimum base time period established in the base time counting chain 3100. This minimum charge which is primed into the cost computer 39 under the control of the printing control circuit 35 is varied in accordance with that portion of the duration of a particular call which is greater than the minimum base time period.

The minimum base time counting chain 3100 comprises a drive tube 3110, a prime tube 3130, and a plurality of counting tubes 3150, 3155, 3170, 3200 and 3230. The basic operating principles of the counting chain 3100 is similar to that described in detail above in conjunction with the counting chain 2600 and this operation is merely modified to adapt this basic type of counting chain for use as a minimum base time counter. The control electrodes of the plurality of cold cathode tubes forming the counting chain 3100 are provided with a positive biasing voltage from a potentiometer 3381. The cathode resistor of the prime tube 3130 is connected to the commonly connected cathodes of the remainder of the counting tubes in the counting chain 3100 through a conductor 3131 and a pair of normally closed contacts 3462.

To provide a means for pulsing the control electrode of the drive tube 3110, the cathode resistor of the prime tube 2960 in the units minutes counting ring 2900 is connected thereto through a conductor 2951. The voltages developed across the cathode resistor of the prime tube 2960 are applied through the conductor 2951 to produce the firing of the drive tube 3110 every time that the drive tube 2950 is fired. Accordingly, the cost computer 39 is energized in response to each mark pulse received at the control electrode of the drive tube 2950 in the elapsed time counter 3000. The first firing of the drive tube 3110 produces a large voltage drop across its cathode resistor so that the normally conductive prime tube 3130 is extinguished and the next serially connected counting tube 3150 is fired. The receipt of this first pulse to both fire the drive tube 3110 and the counting tube 3150 and to extinguish the prime tube 3130 indicates that one mark pulse has been received by the drive tube 2950 of the elapsed time counter 3000. The next mark pulse received by the drive tubes 2950 and 3110 extinguishes the counter tube 3150 and fires the counting tube 3155, thus indicating that the elapsed duration of a particular toll call is now two minutes.

Figure 31:
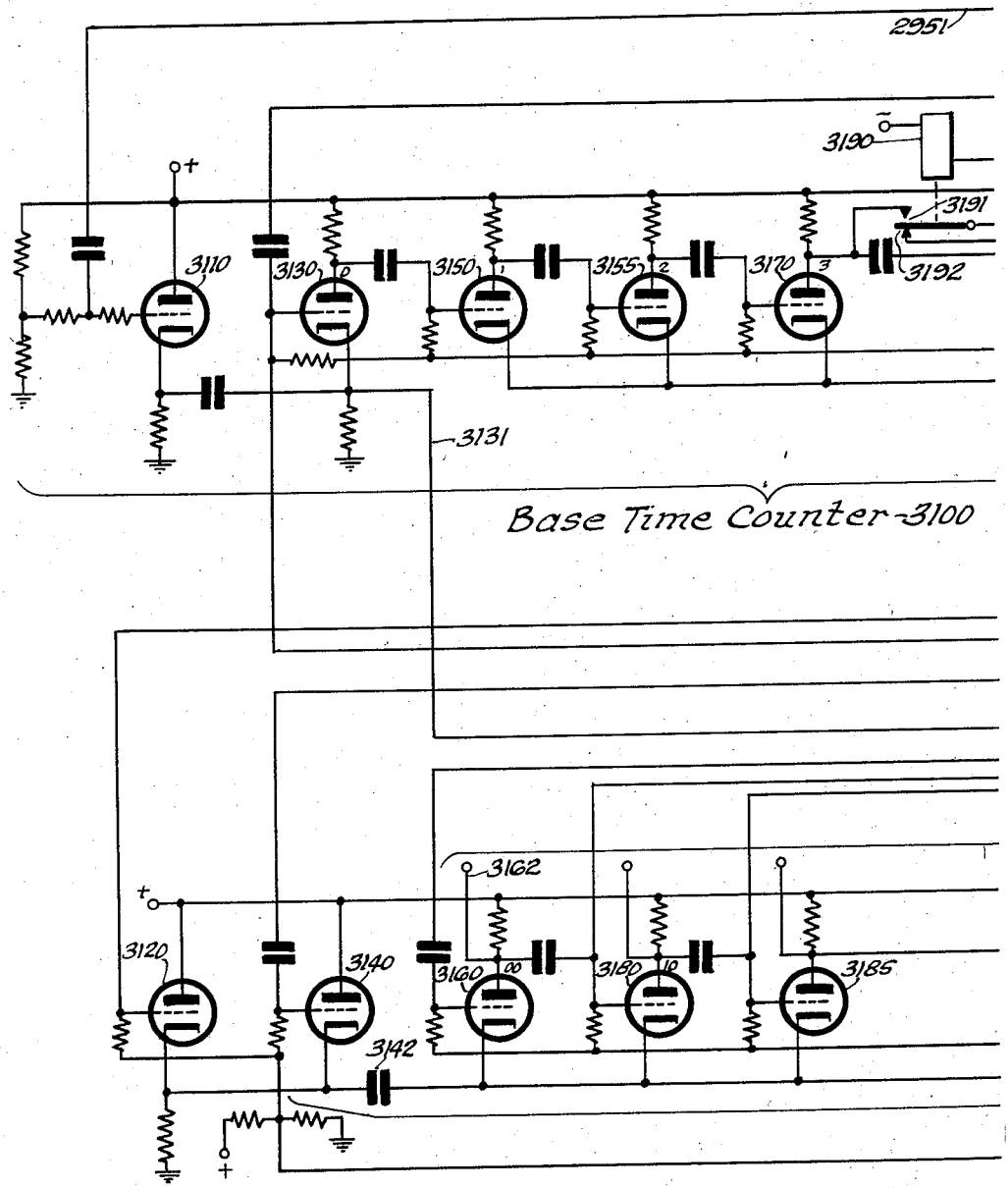
Figure 32:
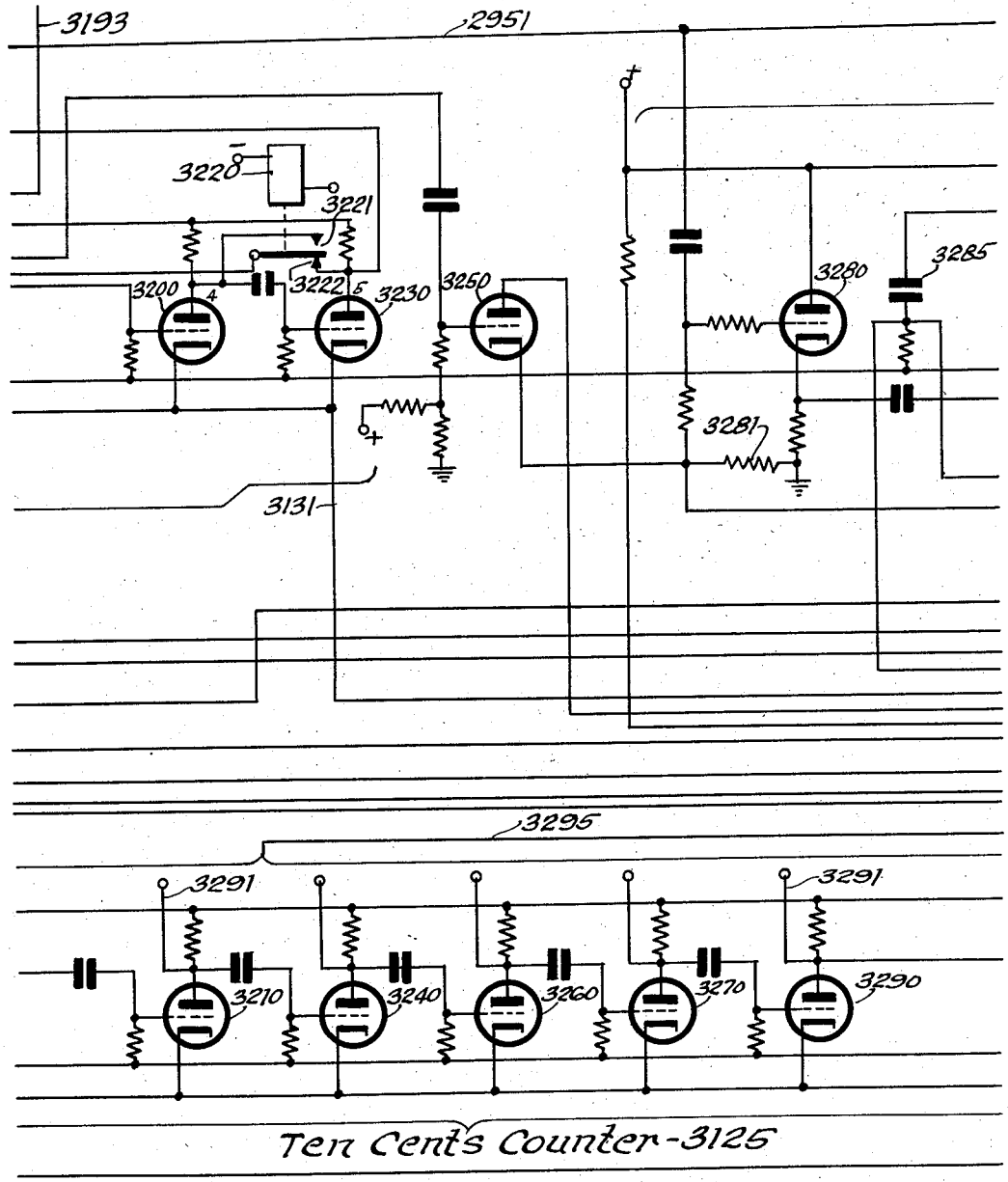
Figure 33:
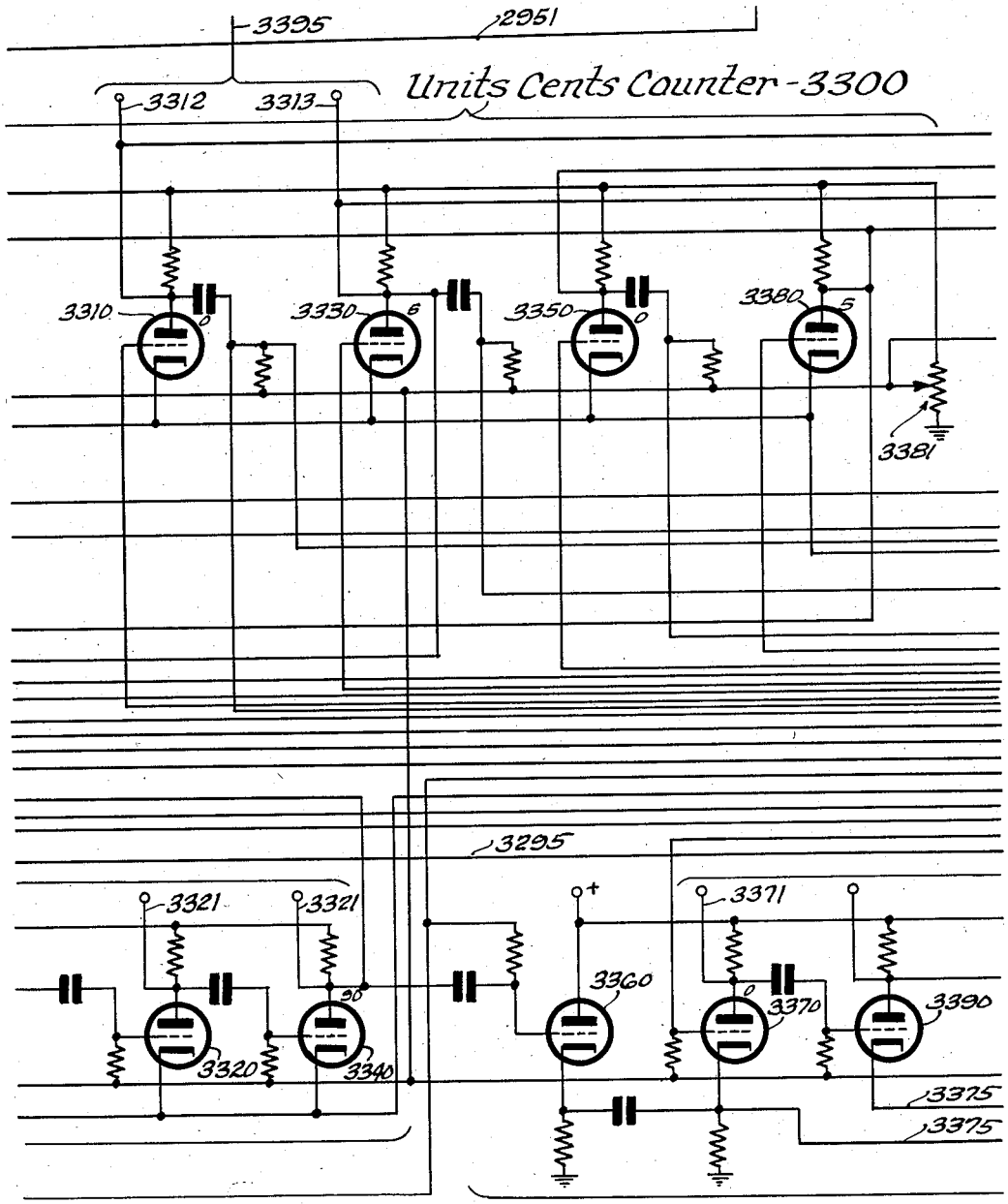
Figure 34:
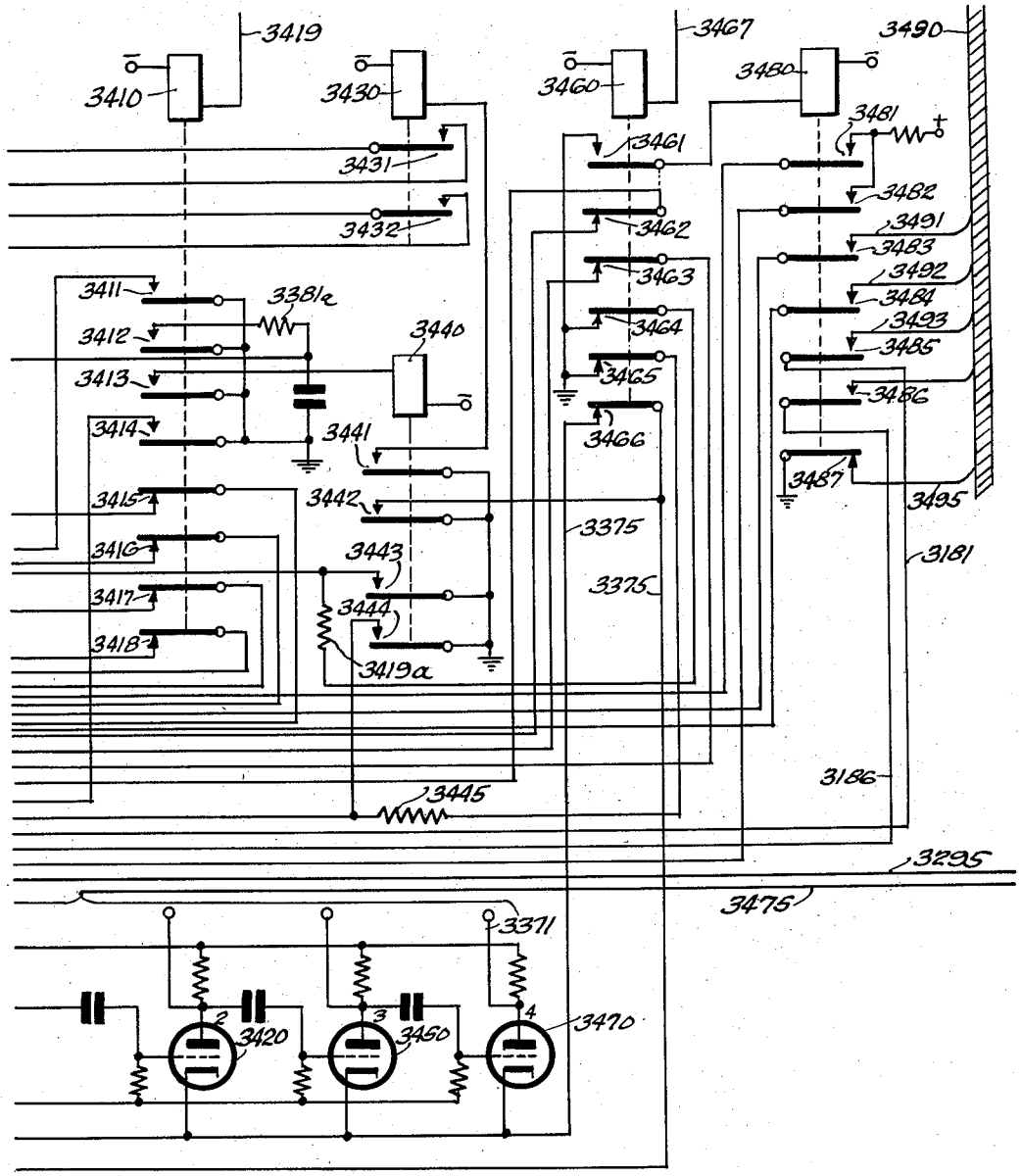

The remaining tubes of the counting chain 3100, i.e., tubes 3170, 3200, and 3230, are selectively controlled by a pair of relays 3190 and 3220 so that the length of the counting chain 3100 may be varied in accordance with the minimum base time assigned to calls extending to a particular called exchange. As shown in Figs. 31 and 32 of the drawings, neither of the relays 3190 or 3220 are operated so that in response to receipt of the third, fourth, and fifth mark pullses, the tubes 3170, 3200, and 3230 are sequentially fired. Accordingly, the minimum time counting chain 3100 with neither of the relays 3190 or 3220 operated is conditioned to receive five mark pulses representing a five minute minimum base time period assigned to a particular called exchange.

However, if the minimum base time period assigned to a particular called exchange is three minutes, the printing control circuit 35 grounds a conductor 3193 extending from the printing control circuit 35 to the cost computer 39 through a cable 3490. The application of ground to the conductor 3193 operates the relay 3190 to close a pair of contacts 3191 and to open a pair of contacts 3192. The relay 3190 is operated before any pulses are applied to the control electrode of the drive tube 3110 so that, as the tube 3170 is extinguished, the positive pulse of voltage at the output anode of this tube is applied through the closed contacts 3191 to the control electrode of a gate tube 3250. The opening of the contacts 3192 also interrupts all other operating paths for the gate tube 3250 so that this tube can be energized only from the output anode of the tube 3170, indicating a minimum base time period of three minutes.

The relay 3220 representing a four minute base time interval, although not shown as being connected with the printing control circuit 35, may be selectively operated by this control circuit to close a pair of contacts 3221 and to open a pair of contacts 3222. The opening of the contacts 3222 disconnects the control electrode of the gate tube 3250 from the output anode of the counting tube 3230. The closure of the contacts 3221 interconnects the control electrode of the gate tube 3250 with the output anode of the counting tube 3200. The counting tube 3200 is deenergized in response to the receipt of the fifth mark pulse by the drive tubes 2950 and 3110 so that the operation of the relay 3220 indicates that the minimum base period of time assigned to a particular called exchange is four minutes. Therefore, the counting length of the base time counting chain 3100 is variably extended or shortened to manifest a particular minimum base time period under the control of the printing control circuit 35 by sellectively operating either of a pair of relays 3190 or 3220. If the relay 3190 is operated, the minimum base time period assigned to a particular called exchange is three minutes; if the relay 3220 is operated, the minimum base time period assigned to a particular called exchange is four minutes; and if neither of these relays is operated, the assigned minimum base time period is five minutes.

The application of the positive voltage to the control electrode of the gate tube 3250 from the output anode of one of the tubes in the chain 3100 increases the bias on the control electrode of a drive tube 3280 in the units cents counting ring 3300 by firing the gate tube 3250. When the gate tube 3250 is rendered conductive, an increased flow of current passes through a cathode resistor 3281 to increase the positive bias supplied to the control electrode of the drive tube 3280. This application of positive bias to the control electrode renders the drive tube 3280 responsive to pulses coupled thereto from the cathode resistor of the drive tutbe 2950 through the conductor 2951.

Therefore, the base time counting chain 3100 renders the drive tube 3280 of the units cents counting ring 3300 responsive to pulses received from the drive tube 2950 of the elapsed time counter 3000 following a predetermined interval of time which is equal to the minimum base period of time for which an initial charge is assessed for each of the plurality of toll calls extended to a particular called exchange. Inasmuch as the relays 3190 and 3220 are operated by the printing control circuit 35 in response to the association of the printing control circuit 35 with a particular one-way trunk circuit capable of extending calls to only a single called exchange, these relays are operated before the removal of any of the recorded information from the seized trunk recorder 25 and remain operated until such time as the seized recorder 25 is dismissed.

In addition to the drive tube 3280 which is rendered responsive to pulses supplied thereto from the cathode resistor of the prime tube 2960, the units cents counting ring 3300 includes a plurality of counter tubes 3310, 3330, 3350, and 3380, which alternately manifest "0" and "5" in the order named. The control electrodese of the counting tubes 3310, 3330, 3350, and 3380 are connected to the source of positive biasing potential 3381 through the contacts 3415, 3416, 3417 and 3418, respectively. The cathodes of these tubes are connected to ground through a resistor 3419a and a pair of normally closed contacts 3464 so that the fundamental operation of the units cents counting ring 3300 is similar to that described above.

Since the control electrode of the drive tube 3280 is supplied with pulses, each representing a one minute interval in the duration of a particular toll call, counting tubes are provided for only manifesting "5" or "0," inasmuch as the charge for each minute of duration of a toll call above the minimum base time period is five cents. Accordingly, there is no need to provide additional counting tubes for manifesting digits other than "5" or the cipher. At the time the first pulses are transmitted to the cost computer 39 from the elapsed time counter 3000, one of the tubes 3310 or 3330 has been rendered conductive under the control of the printing control circuilt, as described hereinafter, to indicate the magnitude of the units cents digit of the minimum charge to be assessed for a toll call having a duration equal to the predetermined minimum base time primed into the minimum base time counting chain 3100.

The first effective pulse applied to the drive tube 3280 of the units cents counting ring 3300 fires the drive tube 3280 to extinguish the one of the tubes 3310 or 3330 which previously had been rendered conductive under the control of the printing control circuit 35. If the "0" manifesting tube 3310 is initially conducting the first pulse effective to fire the drive tube 3280 de-ionizes the counting tube 3310 and fires the "5" manifesting tube 3330. The second effective pulse received by the control electrode of the drive tube 3280 extinguishes the "5" manifesting tube 3330 and fires the "0" manifesting tube 3350. The third effective pulse applied to the units cents counting ring 3300 fires the "5" manifesting tub 3380 and the fourth pulse received extinguishes the tube 3380. The positive pulse produced at the anode of the extinguished tube 3380 is returned to the control electrode of the "0" manifesting tube 3310 through a coupling condenser 3285 so that this tube is fired to manifest "0" in the response to the receipt of four pulses from the elapsed time counter 3000. In this manner, the successive application of a plurality of positive voltage pulses to the control electrode of the drive tube 3280 from the elapsed time counter 3000 produces an alternate manifestation of either "0" or "5" and, accordingly, adds a five cent charge to the cumulative total carried in the units cents counting ring 3300 in response to the receipt of each pulse representing the expiration of one minute.

To provide a means for utilizing the cost information in the units cents denominational order, the output anodes of the "0" manifesting tubes 3310 and 3350 are interconnected through a pair of normally opened contacts 3431 and the plates of the "5" manifesting tubes 3330 and 3380 are interconnected through a pair of normally open contacts 3432. A pair of conductors 3312 and 3313 are interconnected with the output anodes of the "0" manifesting tubes 3310 and 3350 and the "5" manifesting tubes 3330 and 3380, respectively, and are joined to form a cable 3395 which extends to the printing control circuit 35 through the cable 2750. The conductors 3312 and 3313 are connected with contacts in the fifth and tenth contact banks in the thirty-eighth stepping position of the stepping switch 5100.

The ten cents countinng ring 3125, includes a pair of drive tubes 3120 and 3140, and a plurality of counter tubese 3160, 3180, 3185, 3210, 3240, 3260, 3270, 3290, 3320, and 3340. The plurality of counting tubes are connected with their cathodes in common, and the commonly connected cathodes in these counting tubes are connected to ground through a resistor 3445 and a pair of normally closed contacts 3465. The control electrodes of the plurality of counting tubes in the ten cents counting ring 3125 are provided with a positive bias from the potentiometer 3381. Also, the plurality of cathodes of the cold cathode counting tubes in the tens cents counting ring 3125 are connected to the cathode resistor of the drive tubes 3120 and 3140 through a coupling condenser 3142 so that the counting ring 3125 functions in a similar manner to that described above in conjunction with the operation of the elapsed time counter 3000, or the counting chain 2300 in the steering circuit 37.

When the first pulses are received on the control electrode of the drive tube 2950 in the elapsed time counter 3000, a single counting tube in the ten cents counting ring 3125 previously has been rendered conductive, in a manner described hereinafter, to manifest the digit in tens cents denominational column of the minimum charge to be assessed for the completion of the toll call. This charge is established for the minimum time period for which the length of the base time counting chain 3100 has been adjusted. To provide a means for energizing the tens cents counting ring 3125, the control electrode of the first drive tube 3120 is connected to the output anode of the "5" manifesting tube 3330 in the units cents counting ring 3300. Since the drive tube 3120 is energized in response to the interruption of conduction through the tube 3330, a positive pulse is applied to the control electrode of the drive tube 3120 following the receipt of two pulses by the drive tube 3280 in the units cents counting ring 3300 i.e. assuming that the tube 3310 is normally conductive. Therefore, the drive tube 3120 is rendered conductive in response to the receipt of two pulses thus signifying an additional charge of a single ten cents is to be added to the charge to be assessed for this particular call. Assuming that the "5" manifesting tube 3330 is primed on under the control of the printing control circuit 35, the receipt of a single effective pulse by the drive tube 3280 de-ionizes the tube 3330 and, accordingly, couples a positive voltage to the control electrode of the drive tube 3120 so that the tens cents counting ring 3125 is operated to manifest an additional charge of ten cents in accordance with the five cents added by the pulse received by the drive tube 3280 and the five cents previously manifested by the units cents counting ring 3300.

The control electrode of the second drive tube 3140 is connected to the plate of the second "5" manifesting tube 3380 so that, when this tube is extinguished, a positive pulse is applied to the control electrode of the drive tube 3140 to place this tube in a conductive state. Therefore, two drive tubes 3120 and 3140 are provided for the tens cents counting ring 3125 so that this counting ring is energized in response to the receipt of two pulses by the units cents counting ring 3300 or, alternatively, in response to a single pulse if a "5" manifesting tube is originally conducting, and thereafter upon the receipt of two additional pulses representative of a two minute interval or of an additional ten cents which is to be added to the cumulative total charge manifested by the cost computer 39. The firing of either of the drive tubes 3120 or 3140 selectively interrupts the conduction through any normally fired tube and, upon interruption of this conduction, fires the next succeeding tube in the serially connected tubes forming the tens cents counting ring 3125 in the manner described above. Therefore, the application of a positive voltage to the control electrode of either of the drive tubes 3120 or 3140 in response to the interruption of conduction through either of the "5" manifesting tubes 3330 or 3380 indicates that an additional ten cent charge is to be added to the cumulative total carried by the tens cents counting ring 3125.

This sequential energization of the drive tubes 3120 and 3140 sequentially advances the counting ring 3125 so that the counting tubes therein are fired and extinguished in order. When the last tube 3340 is extinguished, thus indicating that a cumulative total of one dollar has been entered into this counting ring, a positive pulse is coupled back to the control electrode of the "0" manifesting counting tube 3160 to render the tube 3160 conductive thereby to indicate that the digit in the tens cents denominational column of the total charge to be assessed for the call is "0."

In order to provide means for utilizing information electronically manifested or registered in the tens cents counting ring 3125, the plates of the plurality of counting tubes therein are connected to a plurality of conductors 3162, 3291 and 3321 which are joined together to form a cable 3295 which extends to the printing control circuit 35 through the cable 2750. These conductors interconnect the counting tubes in the ring 3125 with similarly designated contacts forming the thirty-seventh stepping position (Fig. 75) of the stepping switch 5100 in the printing control circuit 35.

Also, the interruption of conduction through the "9" manifesting tube 3340 produces a positive voltage which is applied to the control electrode of a drive tube 3360 in the units dollars counting chain 3305. The units dollars counting chain 3305, in addition to the drive tube 3360, includes a prime or "0" manifesting tube 3370, and a plurality of counting tubes 3390, 3420, 3450 and 3470. The control electrodes of the prime tube 3370 and of the counting tubes are provided with a positive bias from the potential source 3381. The cathodes of the counting tubes 3390, 3420, 3450 and 3470 are interconnected with the cathode resistor of the prime tube 3370 through a conductor 3375 and a pair of normally closed contacts 3466. Accordingly, the units dollars counting chain 3305 functions in the same general manner as described above.

In response to the receipt of a positive pulse on the control electrode of the drive tube 3360, the "0" manifesting tube 3370 is extinguished and the "1" manifesting tube 3390 is fired. Thereafter, the repeated application of pulses to the control electrode of the drive tube 3360 sequentially fires the counting tubes 3420, 3450 and 3470 to manifest the magnitude of the digit in the units dollars denominational column of the total charge to be assessed for a particular toll call.

The output anodes of the counting tubes and the prime tube 3370 are provided with conductors 3371 which are joined together to form a cable 3475 which cable extends to the printing control circuit 35 through the cable 2750. The output anodes of these tubes are connected to contacts on the first to fourth and tenth contact decks in the thirty-fifth stepping position (Fig. 75) of the stepping switch 5100 in the printing control circuit 35.

Accordingly, the monetary portion of the cost computer 39, including the units cents counting ring 3330, the tens cents counting ring 3125, and the units dollars counting chain 3305 provides a means for establishing a monetary charge to be assessed for a particular toll call in accordance with the minimum assigned duration of the call and for thereafter varying the established charge in accordance with the portion of the duration of the call which is greater than the minimum basic time period provided by the minimum time counting chain 3100. Since the cost computer 39 is energized in parallel with the elapsed time counter 3000, the cost computer 39 produces an electronic manifestation of a monetary charge to be assessed for a particular toll call at the same time that the elapsed time counter 3000 is registering the duration of this call.

The total charge to be assessed for a particular toll call is manifested in the monetary portion of the cost computer 39 by a single conductive tube in the units cents counting ring 3300, the tens cents counting ring 3125 and, perhaps, in the units dollars counting chain 3305. This information is utilized by the printing control circuit 35 by using the current flow through the tube selectively rendered conductive to operate control elements in the printer 36. When the information electronically manifested in the cost computer 39 is to be utilized by the printing control circuit 35, this circuit places ground on a conductor 3419 which extends to the cost computer 39 through the cable 3490. This ground operates a first prepare-to-read relay 3410 so that a plurality of contacts 3411, 3412, 3413, 3414, are closed and a plurality of contacts 3415, 3416, 3417, 3418 are opened.

Closing contacts 3411 grounds the biasing resistor 3281 so that the positive biasing voltage is removed from the control electrode of the drive tube 3280 in the units cents counting ring 3300 thereby to prevent spurious pulses from producing a false indication in the units cents counting ring 3330. The closure of the contacts 3412 grounds the tap on the potentiometer 3381 through a resistance 3381a so that the operating bias applied to the plurality of counting tubes in the base time counting chain 3100, the units cents counting ring 3300, the tens cents counting ring 3125 and the units dollars counting chain 3305 is reduced. By reducing the bias on these tubes it becomes difficult for these tubes to become ionized to give a false manifestation of the total cost in response to any spurious signals.

The closure of the contacts 3414 grounds the control electrodes of the drive tubes 3120, 3140 and 3360 associated with the tens cents counting ring 3125 and the units dollars counting chain 3305 so that these tubes are rendered non-responsive to pulses applied thereto, and, accordingly, prevents these tubes from being fired to produce a false indication in the counting chains controlled thereby. The opening of the contacts 3415, 3416, 3417 and 3418 disconnects the control electrodes of the counting tubes 3310, 3330, 3350 and 3380, respectively, from the output anode of the preceding tubes so that these tubes are disabled from operating.

The closure of the contact 3413 operates the second prepare-to-read relay 3440 to close a plurality of contacts 3441, 3442, 3443, and 3444. The closure of the contact 3442 grounds the conductor 3375 so that the cathodes of the plurality of counting tubes forming the units dollars counting chain 3305 are connected directly to ground, thereby by-passing the cathode resistor of the prime tube 3370. By connecting the cathodes of these tubes directly to ground, it is possible for the current flow through the conductive tube in the chain 3305 to exceed the value at which it was previously limited by the common cathode resistor, and thus permits a heavier flow of current for use in controlling the operation of the printer 36. The closure of the contact 3443 connects the cathodes of the counting tubes 3310, 3330, 3350 and 3380 in the units cents counting ring 3300 to ground, and thereby by-passes the common cathode resistor 3419, so that a heavier current flow through the conductive one of these tubes for use by the printing control circuit 35 is possible. The closure of the contact 3444 by-passes the common cathode resistor 3445 and connects the commonly connected cathodes of the plurality of tubes forming the tens cents counting ring 3125 directly to ground, so as to permit a greater flow of current through the conductive one of these tubes for use by the printing control circuit 35.

The closure of the contact 3441 completes an operating circuit for a third prepare-to-read relay 3430. This relay is thereby operated to close the pair of contacts 3431 and 3432. Closure of the contact 3432 interconnects the output anodes of the tubes 3380 and 3330, which tubes manifest "5." The closure of the contact 3431 interconnects the plates of the tubes 3310 and 3350, which tubes manifest "0." It is necessary to interconnect the plates of like designated tubes in the units cents counting ring 3300 inasmuch as only one of the like designated tubes is conductive at any particular time. It is not possible to interconnect these tubes during the counting operation inasmuch as firing one of the tubes would produce a corresponding voltage drop at the anode of the other tube designated by the same digit.

Accordingly, in response to the operation of the three prepare-to-read relays 3410, 3430 and 3440, the cost computer 39 is conditioned for transmitting the information represented by the electronic manifestation of the digits comprising the toll charge to the printing control circuit 35. The operation of these prepare-to-read relays not only conditions the tubes selectively rendered conductive capable of carrying a greater current for use by the printing control circuit 35, but also grounds the control electrode of the plurality of drive tubes and disconnects the control electrodes of the tubes in the units cents counting ring 3300 so that no false indications may be produced in the plurality of counters 3300, 3125 and 3305 in response to spurious signals.

*Resetting the cost computer 39*

The cost computer 39 includes a pair of relays 3460 and 3480 which are operated under the control of the printing control circuit 35 following the completion of the utilization of the information produced by the electronic manifestations in the cost computer 39 representative of the items of information pertaining to a particular toll call. The operation of the reset relay 3460 returns all of the tubes in the cost computer 39 to a non-conductive state and the operation of the prime relay 3480 together with the release of the relay 3460 selectively energizes a group of tubes in the cost computer 39 in accordance with the information which is to be primed into this cost computer. This information consists of setting the base time counter 3100 to a predetermined minimum base time period, and of setting the units cents counting ring 3300 and the tens cents counting ring 3125 to manifest a particular minimum base charge which is to be assessed for each call completed to a particular exchange.

As described above, the length of the base time counter chain 3100 is selectively adjusted in accordance with the minimum period of time for which a minimum charge is to be assessed. This minimum period of time is established in accordance with the exchange to which a toll call is extended and is selectively controlled by the printing control circuit 35. The units cents counting ring 3300 and the tens cents counting ring 3125 are provided with information pertaining to the predetermined minimum charge to be assessed for the minimum time period set in the base time counter 3100 by selectively rendering two tubes conductive to electronically manifest the magnitude of the digits in the units cents denominational column and the tens cents denominational column.

The reset relay 3460 is operated under the control of the printing control circuit 35 either at the end of each operation wherein a toll ticket is printed containing the items of information pertaining to each toll call or following the registration of items of information pertaining to an incomplete call by applying ground to a conductor 3467 which extends from the printing control circuit 35 to the cost computer 39 through the cable 3490. In addition to operating the reset relay 3460, the printing control circuit 35 removes ground from the conductor 3419 so that the first prepare-to-read relay 3410 is released and, thereafter, the second and third prepare-to-read relays 3440 and 3430 are sequentially released. The release of the relay 3410 opens the contacts 3411, 3412, 3413 and 3414 and closes the contacts 3415, 3416, 3417 and 3418.

The opening of the contacts 3411 removes ground from the control electrode of the drive tube 3280 so that this tube is rendered responsive to receive signals from the conductor 2951 when the gate tube 3250 is fired to provide a positive bias for this control electrode. The opening of the contacts 3412 removes the ground shunt from the potentiometer 3381 so that a positive bias is reapplied to the control electrodes of the plurality of counting tubes in the cost computer 39. The opening of the contacts 3414 removes ground from the control electrodes of the drive tubes in the tens cents counting ring 3125 and the units dollars counting chain 3305 so that these drive tubes are again rendered responsive to receive signals. The closure of the contacts 3415 connects the control electrode of the tube 3310 with the output anode of the tube 3380 and the closure of the contacts 3416, 3417 and 3418 interconnects the control electrodes of the tubes 3330, 3350 and 3380 with the output anodes of the tubes 3310, 3330 and 3500, respectively. Accordingly, the closure of the contacts 3415, 3416, 3417 and 3418 reconnects the counting tubes 3310, 3330, 3350, 3380 into a closed counting ring so that the units cents counting ring 3300 is conditioned for operation in response to the next series of effective pulses received at the control electrode of the drive tube 3280. The opening of the contacts 3413 removes the energization from the second prepare-to-read relay 3440 so that this relay releases to open the contacts 3441, 3442, 3443 and 3444. The opening of the contacts 3442 removes ground from the commonly connected cathodes of the counting tubes in the units dollars counting chain 3305. The opening of the contacts 3443 removes direct ground from the commonly connected cathodes of the tubes forming the units cents counting ring 3300. The opening of the contacts 3444 removes direct ground from the commonly connected cathodes of the counting tubes forming the tens cents counting ring 3125. The opening of the contacts 3441 disconnects ground from the operating winding of the third prepare-to-read relay 3430.

The release of the third prepare-to-read relay 3430 opens the contacts 3431 and 3432 so that the anodes of the two "0" manifesting tubes 3310 and 3350 are disconnected, and so that the anodes of the "5" manifesting tubes 3330 and 3380 are disconnected.

The reset relay 3460, which operates substantially simultaneously with the release of the first prepare-to-read relay 3410, opens a plurality of contacts 3462, 3463, 3464, 3465 and 3466 and closes a pair of contacts 3461. The opening of the contacts 3462 disconnects the prime tube 3130 in the base time counting chain 3100 from the commonly connected cathodes of the counting tubes in this counting chain so that the prime tube 3130 may be rendered conductive without affecting the non-conductive state of the plurality of tubes forming the counting chain 3100. Also, by opening the common cathode circuit formed by the conductor 3131 the tube in the base time counting ring 3100 which was selectively rendered conductive in response to the series of pulses on the conductor 2951 representing the preceding toll call is extinguished inasmuch as the cathode circuit of the counting tubes is now open. The base time counting chain 3100 was not disabled in response to the sequential operation of the plurality of prepare-to-read relays 3410, 3430 and 3440 inasmuch as the electronic manifestation produced in this counting chain is not utilized in the printing control circuit 35.

The opening of the contacts 3463 disconnects the anode of the gate tube 3250 from B+ voltage so that conduction through this tube is interrupted thereby conditioning this tube for operation under the control of the base time counting chain 3100.

The opening of the contacts 3464 disconnects the common cathode resistor for the counting tubes 3310, 3330, 3350 and 3380 in the units cents counting ring 3300 from ground. Since the release of the second prepare-to-read relay 3440 has removed the ground shunt from around the cathode resistor 3419, the cathodes of these tubes are completely disconnected from ground thereby extinguishing the conductive tubes in the ring 3300. The opening of the contacts 3465 disconnects the common cathode resistor 3445 from ground and, since the release of the second prepare-to-read relay 3440 has removed the ground shunt therefrom, the conductive tube in the counting ring 3125 is extinguished.

The opening of the contacts 3466 disconnects the cathode resistor of the prime tube 3370 from the plurality of counting tubes in the units dollars counting chain 3305. The opening of the contacts 3466 and the substantially concurrent opening of the contacts 3442 disconnect the cathodes of the counting tubes 3390, 3420, 3450 and 3470 from ground so that if one of these tubes is rendered conductive during the prior operation of the cost computer 39, this tube is extinguished to restore the units dollars counting chain 3305 to a normal condition.

The closure of the contacts 3461 applies ground to the operating winding of the prime relay 3480 to operate this relay. The prime relay 3480, in operating closes a plurality of contacts 3481, 3482, 3483, 3484, 3485, and 3486 and opens a pair of contacts 3487. The closure of the contacts 3481 applies a positive biasing voltage to the control electrode of the prime tube 3130 in the base time counting chain 3100 so that this tube is rendered conductive. The voltage transient produced by rendering the prime tubes 3130 conductive, does not affect the non-conductive state of the remainder of the tubes in the base time counting chain 3100 inasmuch as the cathode resistor of this tube is not connected to the commonly connected cathodes of these remaining tubes in the base time counting chain 3100.

The closure of the contacts 3482 applies a positive biasing voltage to the control electrode of the prime or "0" manifesting tube 3370 in the units dollars counting chain 3305. This application of a positive biasing voltage renders the tube 3370 conductive. However, the voltage transient produced by the firing of the tube 3370 does not affect the non-conductive state of the plurality of tubes forming the units dollars counting chain 3305 inasmuch as the previous operation of the reset relay 3460 interrupts the connection between the cathode resistor of the prime tube 3370 and the commonly connected cathodes of these remaining tubes.

The closure of the contacts 3483 and 3484 interconnects the conductors 3491 and 3492 to the control electrodes of the first "0" manifesting tube 3310 and the first "5" manifesting tube 3330 in the units cents counting ring 3300, respectively. The conductors 3491 and 3492 extend to the printing control circuit 35 through the cable 3490 and one of these conductors is selectively energized with a positive biasing voltage in accordance with the minimum charge to be established in the monetary portion of the cost computer 39. The application of a positive biasing voltage to either of these two conductors selectively conditions either the tube 3310 or the tube 3330 for being rendered conductive to manifest either "0" or "5" in the units cents denominational column of the minimum charge to be assessed for a particular toll call.

The closure of the contacts 3485 and 3486 selectively interconnects a pair of conductors 3181 and 3186 with a pair of conductors 3493 and 3494, respectively, which extend to the printing control circuit 35 through the cable 3490. The conductor 3181 is connected to the control electrode of the "1" manifesting tube 3180 in the tens cents counting ring 3125 and the conductor 3186 is connected to the control electrode of the "2" manifesting tube 3185 in this same counting ring. One of the conductors 3493 or 3494 is provided with a positive biasing voltage under the control of the printing control circuit 35 in accordance with the minimum charge to be assessed for a toll call having a minimum duration equal to the minimum base time set in the base time counting circuit 3100. If the minimum charge to be assessed includes the digit "1" in the tens cents denominational column, the conductor 3493 is provided with positive bias and this bias is applied through the conductor 3181 to the control electrode of the "1" manifesting tube 3180 to condition this tube for being rendered conductive. However, if the minimum charge to be assessed for a toll call having the duration equal to the minimum time set in the base time counter 3100 includes the digit "2" in the tens cents denominational column, the printing control circuit 35 applies a positive biasing voltage to the conductor 3494 and this positive bias is applied through the closed contacts 3486 and the conductor 3186 to the control electrode of the "2" manifesting tube 3185 in the tens cents counting ring 3125.

The opening of the contacts 3487 removes ground from a conductor 3495 which extends to the printing control circuit 35 through the cable 3490. The removal of ground from the conductor 3495 releases a relay in the printing control circuit 35 to prevent the magnetic tape 1601 in the seized trunk recorder 25 from being advanced until the conditioning or priming of the cost computer 39 has been completed.

After the resetting of the storage chains 38, ground is removed from the operating winding of the reset relay 3460 under the control of the printing control circuit 35. The removal of ground from the operating winding of this relay releases the relay so that contacts 3462, 3463, 3464, 3465 and 3466 are closed and the contacts 3461 are opened. The closure of the contacts 3462 completes the connection through the conductor 3131 between the cathode resistor of the prime tube 3130 and the plurality of counting tubes in the base time counting chain 3100. The closure of the contacts 3463 reestablishes the connection between the anode of the gate tube 3250 and the source of positive potential so that this gate tube is now conditioned for operation in response to a pulse received on the control electrode thereof. Accordingly, the closure of the contacts 3462 and 3463 conditions the base time counting chain 3100 for operation in accordance with the next group of pulses representative of the duration of the succeeding toll call, and also conditions the gate tube 3250 for operation in response to the receipt of a group of pulses equal in number to the minimum base time assigned to calls extending to a particular exchange.

The closure of the contacts 3464 connects the common cathode resistor 3419 to ground so that either the "0" manifesting tube 3310 or the "5" manifesting tube 3330 in the units cents counting ring 3300 is rendered conductive in accordance with the selective application of a positive biasing voltage to the control electrodes thereof under the control of the printing control circuit 35.

The closure of the contacts 3464 grounds the cathode resistor 3445 which is common to all of the tubes in the tens cents counting ring 3125, so that either the tube 3180 or the tube 3185 is fired in accordance with the selective application of the positive biasing voltage to the control electrodes thereof through either of the conductors 3181 or 3186. In addition to selectively rendering conductive the conditioned tube, the grounding of the common cathode resistor 3445 renders the tens cents counting ring 3125 effective for operation under the control of the units cents counting ring 3300 in response to the receipt of the group of pulses representing the duration of the next toll call.

The closure of the contacts 3466 establishes the connection through the conductor 3375 so that the cathode resistor of the "0" manifesting tube 3370 is connected to the commonly connected cathodes of the plurality of counting tubes forming the units dollars counting chain 3305. Accordingly, this chain is now conditioned for sequential operation under the control of the tens cents counting ring 3125.

The opening of the contacts 3461 breaks the energizing circuit for the prime relay 3480 so that this relay releases to open the contacts 3481, 3482, 3483, 3484, 3485, and 3486 and to close the contacts 3487. The opening of the contacts 3481 removes the positive bias from the prime tube 3130 in the base time counter 3100, which tube is now conducting. The opening of the contacts 3483 removes the positive bias from the "0" manifesting tube 3370 in the units dollars counting chain 3305, which tube is also conducting.

The opening of the contacts 3483 and 3484 removes the positive bias selectively applied to the control electrodes of the "0" manifesting tube 3310 and the "5" manifesting tube 3330 in the units cents counting ring 3300. One of these tubes is now conducting inasmuch as the prior closure of the contacts 3464 completed the cathode circuit for these tubes. The opening of the contacts 3485 and 3486 removes the positive bias selectively applied to the control electrodes of the "1" manifesting tube 3180 and the "2" manifesting tube 3185 in the tens cents counting ring 3125. One of these tubes is now conducting inasmuch as the prior closure of the contacts 3465 completed the cathode circuit for these tubes.

The closure of the contacts 3487 applies ground through the conductor 3495 and the cable 3490 to the relay previously released in the printing control circuit 35 to operate this relay. The operation of this relay in the printing control circuit 35 instructs the seized trunk recorder 25 that the resetting operation in the cost computer 39 has been completed, and that therefore the magnetic tape 1601 in the seized recorder 25 may be advanced to play back the plurality of items of information pertaining to the next toll call.

Accordingly, in the resetting operation, the operation of the reset relay together with the release of the prepare-to-read relays 3410, 3430 and 3440 opens the conductive path through any of the conducting tubes in the cost computer 39 to remove any electronic manifestation therein of items of information pertaining to the toll call for which a printed ticket has been produced. The operation and release of these relays also prepare the base time counting chain 3100, the units cents counting ring 3300, the tens cents counting ring 3125, and the units dollars counting chain 3305 for being conditioned for a succeeding cycle of operation. The operation of the prime relay 3480 under the control of the reset relay 3460 renders the prime tube 3130 in the base time counting chain 3100 and the prime or "0" manifesting tube 3370 in the units dollars counting chain 3305 conductive. The operation of the prime relay 3480 also places a positive biasing potential on the control electrodes on certain of the counting tubes in the units cents counting ring 3300 and the tens cents counting ring 3125 so that these tubes will be selectively rendered conductive in response to the release of the reset relay 3460 thereby completing the cathode circuits of these selectively biased tubes. The subsequent release of the reset relay 3460 interconnects the cathode resistors of the prime tubes 3130 and 3370 in the base time counting chain 3100 and the units dollars counting chain 3305 with the commonly connected cathodes of the counting tubes therein, thereby to condition these circuits for operation under the control of the items of information representing the duration of the next succeeding toll call. The release of the reset relay 3460 also grounds the common cathode resistor in the units cents counting ring 3300 and the tens cents counting ring 3125, so that the primed tubes therein are rendered conductive to electronically manifest the predetermined minimum charge to be assessed for the next succeeding toll call.

The release of the reset relay releases the prime relay 3480 so that the positive bias is removed from the plurality of control electrodes in the units cents counting ring 3300, the tens cents counting ring 3125, the base time counter 3100, and the units dollars counting chain 3305. Also, the release of the prime relay 3480 reoperates a relay in the printing control circuit 35 thereby indicating to this circuit that the priming and resetting operation in the cost computer 39 has been completed.

TENS AND UNITS HOURS COUNTER 3600

The tens and units hours counter 3600 comprises one type of the storage chains 38 and is operated by the tenth and eleventh groups of mark pulses to produce an electronic manifestation of the digits in the units and tens denominational columns of the notation representing the hour at which a particular toll call was terminated. The tens and units hours counter 3600 includes a tens hours counting chain 3500 and a units hours counting chain 3700 which are sequentially rendered responsive to pulses receiver on the mark pulse conductor 2080 under the control of the steering circuit 37, in the order named, immediately following the ninth group of mark pulses representing the duration of the toll call.

In response to the receipt of the space pulse immediately following the ninth group of mark pulses representing the duration of the toll call, the steering circuit 37 is energized to apply a positive biasing voltage to the conductor 2493 and to remove the positive biasing voltage from the conductor 2485 connected to the control electrode of the drive tube 2950 in the elapsed time counter 3000. The application of this positive biasing voltage to the conductor 2493 raises the bias on the control electrode of drive tube 3510 in the tens hours counting chain 3500. This counting chain includes, in addition to the drive tube 3510, a prime tube 3520 and a plurality of counter tubes 3530, 3540, and 3550 which respectively manifest "0" and the digits "1" and "2." The tubes forming the counting chain 3500 are interconnected in the same general circuit relationship as the subscriber digit counting chain 2600 and operate in the same general manner.

In a normal operating condition, the prime tube 3520 is rendered conductive by virtue of the application of a positive voltage to the control electrode thereof over the priming conductor 4860. The cathode resistor of the prime tube 3520 is normally connected to the commonly connected cathodes of the counting tubes 3530, 3540 and 3550 through a conductor 3515 which extends to normally closed contacts in the printing control circuit 35 through the cable 4480.

Accordingly, the application of the positive bias to the control electrode of the drive tube 3510 renders this tube responsive to the mark pulses applied to the conductor 2080 which are representative of the magnitude of the digit to be entered in the tens hours denominational column. As described above, this information is in the coded form in which a single pulse represents "0" and tens pulses represent the digit "9." Accordingly, the alternate firing and extinguishment of the drive tube 3510 in response to each mark pulse received from the conductor 2080 produces the sequential operation of the counting tubes 3530, 3540 and 3550 to produce an electronic manifestation of the digit to be entered in the tens hours denominational column of the notation representing the time at which a particular toll call is terminated. To provide a means for utilizing the information produced by this selective electronic manifestation, the output anodes of these tubes are provided with output conductors 3560 which are joined together to form a cable 3570 extending to the printing control circuit 35 through the cable 2750. These conductors connect these tubes to like designated contacts forming the eighteenth stepping position of the stepping switch 5100.

The space pulse immediately following the tenth group of mark pulses representing the tens hours digit energizes the steering circuit 37 to remove the positive bias from the conductor 2493, thereby rendering the tens hours counting chain 3500 non-responsive to the pulses applied to the mark pulse conductor 2080, and to apply a positive biasing voltage to the conductor 2495 thereby rendering the units hours counting chain 3700 responsive to the next succeeding group of mark pulses appearing on the conductor 2080.

The units hours counting chain 3700 includes a drive tube 3610 having a control electrode which is supplied with the positive biasing voltage from the conductor 2495. The counting chain 3700 also includes a normally conductive prime tube 3620 and a plurality of counting tubes 3630, 3640, 3650, 3660, 3710, 3720, 3730, 3740, 3750 and 3760 which manifest "0" and the digits "1" to "9," inclusive, respectively. The prime tube 3620 is normally rendered conductive by the application of a positive biasing voltage from the prime conductor 4860 to the control electrode thereof. The control electrodes of all of the tubes in the counting chain 3700, with the exception of the drive tube 3610, are provided with a normal operating biasing potential from the biasing conductor 2745. In this normal condition, the cathode resistor of the prime tube 3620 is connected to the commonly connected cathodes of the plurality of counting tubes in the counting chain 3700 through a conductor 3615, the cable 4480 and a pair of normally closed contacts in the printing control circuit 35.

In response to the receipt of the positive biasing voltage from the steering circuit 37 over the conductor 2495, the drive tube 3610 is alternately rendered conductive and non-conductive in response to the receipt of the pulses forming the eleventh group of mark pulses from the conductor 2080. This alternate operation of the drive tube 3610 sequentially energizes the counting tubes in the counting chain 3700 to provide an electronic manifestation of the magnitude of the digit in the units hours denominational column of the notation of the time at which a particular toll call is terminated. This information is made available to the printing control circuit 35 by connecting the output anodes of the plurality of counting tubes in the chain 3700 through a plurality of conductors 3645 and 3715 which are joined together to form a cable 3790 extending to the printing control circuit 35 through the cable 2750. As shown in Fig. 74 of the drawings, these output conductors connect the counting tubes with like designated contacts forming the nineteenth stepping position of the switches 1100. The information electronically registered in the tens and units hours counter 3600 is utilized in the same manner as the registered information in the elapsed time counter 3000 and the other storage chains 38 by operating a control element in the printer 36 in accordance with the flow of current through the conductive tube. When it is desired to operate the printer 36 under the control of the tens and units hours counter 3600, the conductors 3515 and 3615 are grounded under the control of the printing control circuit 35. This ground provides a direct shunt around the cathode resistors associated with the prime tubes 3520 and 3620 so that an increased flow of current is available for operating the printer 36. In addition, the grounding of the conductors 3515 and 3615 renders the tens hours counting chain 3500 and the units hours counting chain 3700 non-responsive to spurious voltages. Also, as described above, the normal biasing voltage on the conductor 2745 is reduced to render the counting tubes less sensitive to undesired voltages coupled to the control electrodes thereof.

When it is desired to reset the tens hours counting chain 3500 and the units hours counting chain 3700 following the utilization of the information provided therein in the form of a single conductive tube in each of these counting chains, the printing control circuit 35 operates a group of relays to break the circuit provided by the conductors 3515 and 3615. Opening the circuit provided by the conductors 3515 disconnects the commonly connected cathodes of the counting tubes in the chain 3500 from ground to extinguish the conducting tube. Opening the conductive path provided by the conductors 3615 disconnects the commonly connected cathodes of the tubes in the chain 3700 from ground.

After the opening of the conductive paths provided by the conductors 3515 and 3615, a positive biasing voltage is applied to the priming conductor 4860 so that the prime tubes 3520 and 3620 in the tens minutes counting chain 3500 and the units hours counting chain 3700 are rendered conductive. The firing of these two prime tubes does not affect the plurality of counting tubes in these counting chains inasmuch as the common cathode resistors of the prime tubes are disconnected from the cathodes of the remaining counting tubes in the counting chains. Thereafter, the printing control circuit 35 removes the positive biasing potential from the prime conductor 4860 and reestablishes the normally closed paths provided by the conductors 3515 and 3615 so that the tens hours counting chain 3500 and the units hours counting chain 3700 are conditioned for operation under the control of the next groups of mark pulses representative of the time of completing the next toll call.

Accordingly, the tens and units hours counter 3600 includes a tens hours counting chain 3500 which produces an electronic manifestation of the digit in the tens hours denominational column of the time at which a particular toll call is terminated in response to the receipt of the tenth group of mark pulses. The units hours counting chain 3700 produces an electronic manifestation in the form of a single conductive counting tube of the magnitude of the units hours digit in response to the receipt of the eleventh group of mark pulses.

TENS AND UNITS MINUTES COUNTER 3900

The tens and units minutes counter 3900 provides another one of the storage chains 38 and is utilized to produce an electronic manifestation or registration of the magnitude of the digits in the tens and units minutes denominational columns of the time at which a particular toll call is terminated. The counter 3900 includes a tens minutes counting chain 3800 and a units minutes counting chain 4000 which are sequentially energized in the order named under the control of the steering circuit 37.

The receipt by the steering circuit 37 of the space pulse immediately following the eleventh group of mark pulses representing the units hours digit energizes this circuit to remove the positive bias from the conductor 2495 thereby to render the units hours counting chain 3700 non-responsive to pulses applied to the mark pulse conductor 2080, and to apply a positive bias to the conductor 2525. The conductor 2525 is connected to the control electrode of a drive tube 3810 in the tens minutes counting chain 3800. The counting chain 3800 also includes a normally conductive prime tube 3820 and a plurality of counting tubes 3830, 3840, 3850, 3860, 3910 and 3920 which manifest "0" and the digits "1" to "5," inclusive.

The control electrodes of all of the counting tubes and the prime tube 3820 are provided with a normal positive operating bias from the biasing conductor 2745, and the prime tube 3820 is connected to the prime conductor 4860, which operates as described hereinafter, to render this tube conductive at the end of each cycle of operation. The cathode resistor of the prime tube 3820 is normally connected to the commonly connected cathodes of the plurality of counting tubes through a conductor 3825 to a pair of normally closed contacts in the printing control circuit 35 through the cable 4480.

After the application of the positive bias to the control electrode of the drive tube 3810, the twelfth group of mark pulses applied to the conductor 2080 alternately energizes and de-energizes the drive tube 3810 to sequentially operate the plurality of counting tubes comprising the counting chain 3800, thereby to produce an electronic manifestation of the magnitude of the digit to be entered in the tens minutes denominational column of the time of completing a particular toll call. This information is manifested in the form of a single conductive tube and is transmitted to the printing control circuit 35 by interconnecting the anodes of the counting tubes through a plurality of conductors 3835 and 3915 which are joined together to form a cable 3840 extending to the printing control circuit through the cable 2750. As shown in Fig. 74 of the drawings, the output conductors connect the anodes with like designated contacts forming the twentieth stepping position of the switch 5100.

The space pulse applied to the steering circuit 37 immediately following the twelfth group of mark pulses operates the steering circuit 37 to remove the positive bias from the conductor 2525 and to apply this positive bias to the conductor 2545 which is connected to the control electrode of a drive tube 3930 in the units minutes counting chain 4000. Therefore, in response to the receipt of this space pulse, the tens minutes counting chain 3800 is rendered non-responsive to mark pulses applied to the conductor 2080 and the units minutes counting chain 4000 is rendered responsive to this following thirteenth group of mark pulses to produce an electronic manifestation of the magnitude of the digit to be entered in the units minutes denominational column of the notation of the time at which a particular toll is completed.

In addition to the drive tube 3930, the units minutes counting chain 4000 includes a normally conductive prime tube 3940 and a plurality of counting tubes 3950, 3960, 3970, 4010, 4020, 4030, 4040, 4050, 4060 and 4070, which are adapted to manifest "0" and the digits "1" to "9," inclusive, respectively. The control electrodes of the plurality of counting tubes and the prime tube 3940 are provided with a normal operating bias from the conductor 2745, and the commonly connected cathodes of the plurality of counting tubes are connected to the cathode resistor of the prime tube 3940 through conductors 3945. These conductors extend to the printing control circuit 35 through the cable 4480 and, in the printing control circuit 35, are connected to each other by a pair of normally closed contacts.

After the control electrode of the drive tube 3930 is rendered responsive to the thirteenth group of mark pulses, the application of the group of pulses to the mark conductor 2080 alternately energizes and de-energizes this drive tube to sequentially operate the plurality of tubes comprising the units minutes counting chain 4000. At the time at which the last mark pulse in this group is received, a single counting tube is rendered conductive to electronically manifest or register the magnitude of the digit to be entered in this counting chain. In order to provide a means for making this information available to the printing control circuit 35, a plurality of conductors 3951 and 4015 are connected to the output anodes of the plurality of counting tubes. These conductors are joined together to form a cable 4090 which extends to the printing control circuit through the cable 2750. As shown in Fig. 74 of the drawings, these output conductors connect the anodes with like designated contacts forming the twenty-first stepping position of the switch 5100.

As described above in conjunction with the description of the operation of the tens and units hours counter 3600, the tens and units minutes counter 3900 is prepared for transmitting the information electronically manifested or registered therein to the printing control circuit 35 by operating a group of relays therein to ground the conductors 3825 and 3945 and to reduce the normal operating voltage applied to the conductor 2745. This operation of the printing control circuit 35 permits the selectively fired tubes in the chains 3800 and 4000 to carry a larger current and prevents these chains from being improperly operated to produce an incorrect electronic registration.

In response to the completion of the printing of a toll ticket by the printer 36 under the control of the printing control circuit 35, this circuit operates a relay to open the normally closed contacts through which are completed the conductive paths extending through the conductors 3825 and 3945. Opening these paths removes ground from the commonly connected cathodes of the counting tubes in the chains 3800 and 4000, so that conduction through the single tube operated in each of these chains is terminated, thereby clearing each of these chains of the registered information. Immediately following the termination of the conduction through the counting tubes, a positive biasing voltage is applied to the conductor 4860 so that the prime tubes 3820 and 3940 are rendered conductive. Thereafter the printing control circuit 35 releases the relays controlling the contacts in series with the conductors 3825 and 3945 so that the commonly connected cathodes of the plurality of tubes forming the counting chains 3800 and 4000 are reconnected to the cathode resistors of the prime tubes 3820 and 3940 to condition the tens and units minutes counter 3900 for another cycle of operation in response to the receipt of information pertaining to the next succeeding toll call.

Therefore, the tens and units minutes counter 3900 selectively produces an electronic manifestation in each of the tens and units minutes counting chains 3800 and 4000 in accordance with the pulses received over the mark pulse conductor 2080 in a sequence determined by the application of voltage to the conductors 2525 and 2545 by the steering circuit 37.

MONTHS COUNTER 4200

The months counter 4200 provides another type of the storage chains 38 and is selectively operated by the fourteenth group of mark pulses relating to a complete call which follows the group of mark pulses representing the magnitude of the units minutes digit. The months counter 4200 includes a units months counting ring 4300 and tens months counting chain 4100.

As illustrated in the table above, the months of the year are represented by the codal notations "01" to "12," inclusive, representing, respectively, the months January to December. The information pertaining to the numerical designation of the month is transmitted to the months counter 4260 by the fourteenth group of mark pulses and, as shown in Fig. 80, the month of June, which is designated as "06," is represented by a group of mark pulses including six pulses. When the space pulse immediately following the thirteenth group of mark pulses is applied to the steering circuit 37, the positive bias is removed from the conductor 2545 to render the units minutes counting chain 4000 ineffective, and a positive biasing voltage is applied to the conductor 2565.

This conductor is connected to the control electrode of a drive tube 4210 in the units months counting ring 4300 and, in addition to the drive tube 4210, the counting ring 4300 includes a prime or "0" manifesting tube 4220 and a plurality of counting tubes 4230, 4240, 4250, 4310, 4320, 4330, 4340, 4350 and 4360, which are adapted to electronically manifest the digits "1" to "9," inclusive. The commonly connected cathodes of this plurality of counting tubes are connected to a common cathode resistor in the cathode circuit of the prime tube 4220 through a pair of conductors 4225 which extend through the cable 4480 to normally closed contacts in the printing control circuit. The control electrodes of the plurality of counting tubes and the prime tube 4220 are provided with a positive operating bias by the conductor 2745. Also, the prime tube 4220 is rendered normally conductive by means of a positive voltage periodically applied to the prime conductor 4860 under the control of the printing control circuit 35.

Following the application of the positive gating potential to the control electrode of the drive tube 4210, the group of mark pulses representative of the designation of the month in which a particular toll call is terminated is applied to this drive tube to produce the sequential operation of the plurality of tubes comprising the counting ring 4300. If the month is designated by a number less than "10," the group of mark pulses selectively renders one of the counting tubes in the counting ring 4300 conductive.

However, if the month is designated by the numbers "10," "11" or "12," when the "9" manifesting tube 4360 is extinguished in response to the receipt of a tenth mark pulse, the positive voltage produced at the anode of this tube is coupled through a coupling condenser 4215 to the control electrode of the prime or "0" manifesting tube 4220 to render this tube conductive, thereby to manifest "0" in the units denominational column of the designation of the month in which the toll call is terminated. Simultaneously with applying the positive voltage to the control electrode of the tube 4220, this voltage is also applied to the control electrode of a drive tube 4110 in the tens months counting chain 4100.

In addition to the drive tube 4110, the tens months counting chain 4100 includes a "0" manifesting or prime tube 4120 and a "10" manifesting tube 4130. The cathode resistor of the prime tube 4120 is connected to the cathode of the tube 4130 through a pair of conductors 4125 which are connected by normally closed contacts in the printing control circuit 35. The conductors 4125 extend to the control circuit 35 through the cable 4480. The prime or "0" manifesting tube 4120 is normally rendered conductive in response to the momentary application of a priming voltage to the conductor 4860 under the control of the printing control circuit 35. Also, the control electrodes of the tubes 4120 and 4130 are provided with a normal positive operating bias by the conductor 2745.

In the event that the numerical notation of the month to be entered in the months counter 4200 is greater than nine, the completion of a single counting cycle of the units months counting ring 4300 produces a positive voltage which is applied to the control electrode of the drive tube 4110, thereby to render the prime tube 4120 non-conductive and to render the "10" manifesting tube 4130 conductive. This positive pulse is also applied to the control electrode of the "0" manifesting tube 4220 in the units months counting chain 4300 so that, in response to the receipt of the tenth mark pulse on the conductor 2080, the tubes 4130 and 4220 are fired, thereby to manifest the number "10." Thereafter, if the designation of the month is either 11 or 12, the tubes 4230 and 4240 in the units months counting chain are selectively operated to manifest these two numerical notations corresponding to the months November and December.

To provide a means for utilizing the information electronically manifested by the months counter 4200, the output anodes of the plurality of counting tubes in the units months counting ring 4300 are connected to output conductors 4223 and 4315. These conductors are grouped together to form a cable 4370 which extends to the printing control circuit 35 through the cable 2750. These conductors connect the anodes with like designated contacts forming the twenty-fourth stepping position of the switch 5100. The output anodes of the tubes 4120 and 4130 in the tens months counting chain 4100 are provided with a pair of output conductors 4133 which are grouped to form a cable 4135 extending to the printing control circuit 35 through the cable 2750. In the printing control circuit 35, these two conductors are connected to contacts in the first and tenth or "0" designated contact banks forming the twenty-third stepping position of the switch 5100.

The information electronically registered or manifested in the months counter 4200 is utilized by the printing control circuit 35 by drawing current through the tubes selectively rendered conductive. Accordingly, at the time at which the printing control circuit 35 desires to use this information, this circuit applies ground to the conductors 4225 and 4125 so that the cathodes of all of the manifesting tubes are connected directly to ground. This facilites drawing a heavier current through the tubes inasmuch as the cathode resistors of the prime tubes 4120 and 4220 are by-passed. Simultaneously with the application of ground to the conductors 4125 and 4225, a low resistance shunt is placed around the potentiometer supplying the positive operating bias to the conductor 2745 so that the positive bias on the plurality of tubes 4120, 4130, 4220, 4230, 4240, 4250, 4310, 4320, 4330, 4340, 4350 and 4360 is reduced. This reduction in the normal operating positive bias applied to the control electrodes of these tubes renders the tubes substantially non-responsive to spurious signals such as may be provided by the miscellaneous switching operations inherent in utilizing the information registered in the months counter 4200.

Also, the printing control circuit 35 applies ground to a conductor 4115 which is connected to the control electrode of the drive tube 4110 in the tens months counting chain 4100 through a relatively small resistance 4116. The application of ground through the conductor 4115 and the resistor 4116 disables the control electrode of the drive tube 4110 so that this tube is rendered non-responsive to transient voltages which may appear thereon due to the switching operations involved in utilizing the information registered in the months counter 4200. This ground is removed during the resetting operation so that after the resetting operation is completed, the drive tube 4110 is responsive to signals received from the "9" manifesting tube 4360.

Following the utilization of the information electronically manifested in the months counter 4200, the printing control circuit 35 conditions this counter for another cycle of operation under the control of a subsequent group of mark pulses relating to the next succeeding toll call. This resetting operation is accomplished by opening the normal closed contacts completing the conductive paths through the conductors 4125 and 4225. By opening these conductors, ground is removed from the plurality of counting tubes in the counting ring 4300 and the counting chain 4100, thereby rendering the selectively energized tubes non-conductive. Simultaneously with opening the circuits formed by the conductors 4125 and 4225, the printing control circuit 35 applies a positive priming voltage to the conductor 4860 so that the prime tubes 4120 and 4220 are rendered conductive. The tubes 4120 and 4220 may be rendered conductive at this time inasmuch as the cathodes of these tubes are connected to ground through their respectively associated cathode resistors. Thereafter, the printing control circuit 35 reestablishes the normally conductive paths through the conductors 4125 and 4225 so that the counting chain 4100 and the counting ring 4300 forming the months counter 4200 are conditioned for another cycle of operation identical to that described above.

TENS AND UNITS DAYS COUNTER 4500

The tens and units days counter (Figs. 44, 45 and 46) forms another type of the storage chains 38 and is utilized to provide an electronic registration of the tens and units days digits of the date on which the toll call was completed. The tens and units days counter 4500 includes a units days counting chain 4600 and a tens days counting chain 4400.

The space pulse immediately following the fourteenth group of mark pulses representing the month during which the call was terminated energizes the steering circuit 37 to remove the positive biasing voltage from the conductor 2565, thereby to render the months counter 4200 ineffective, and to apply a positive gating voltage to the conductor 2585. The conductor 2585 is connected to the control electrode of a drive tube 4410 in the tens days counting chain 4400. This counting chain also includes a prime tube 4420 and a plurality of counting tubes 4430, 4440, 4450 and 4460 which manifest the nations "00" and "10" to "30," inclusive. The cathode resistor of the prime tube 4420 is connected to the commonly connected cathodes of the plurality of counting tubes through a pair of conductors 4421 which are connected by normally closed contacts in the printing control circuit 35 and which extend thereto through the cable 4480. The control electrodes of the plurality of counting tubes and the prime tube 4420 are provided with a normal operating bias by the conductor 2745. The prime tube 4420, as will be described hereinafter, is normally rendered conductive by the application of a positive starting voltage to the prime conductor 4860.

After the positive gating voltage has been applied to the control electrode of the drive tube 4410, this tube is alternately energized and de-energized under the control of the group of mark pulses representing the magnitude of the tens days digit. This alternate operation of the drive tube 4410 de-energizes the prime tube 4420 and sequentially renders the counting tubes in the counting chain 4400 alternately conductive and non-conductive, thereby to manifest the magnitude of the digit to be entered.

The output anodes of the plurality of counting tubes in the counting chain 4400 are provided with output conductors 4431 which are grouped together to form a cable 4470. The cable 4470 extends to the printing control circuit 35 through the cable 2750, and the conductors forming this cable connect the anodes of the counting tubes with like designated contacts forming the twenty-sixth stepping position of the switch 5100.

The space pulse applied to the steering circuit 37 immediately following the fifteenth group of mark pulses energizes this circuit to remove the positive bias from the conductor 2585 and to apply a positive gating voltage to the conductor 2595. The conductor 2595 is connected to the control or starting electrode of a drive tube 4520 in the units days counting chain 4600.

In addition to the drive tube 4520, the chain 4600 includes a normally conductive prime tube 4530 and a plurality of counting tubes 4540, 4550, 4610, 4620, 4630, 4640, 4650, 4660, 4670 and 4680 which are adapted to manifest the "0" and the digits "1" to "9," inclusive. The commonly connected cathodes of the plurality of counting tubes are connected to a common cathode resistor in the cathode circuit of the prime tube 4530 through a pair of conductors 4535 which extends to the printing control circuit 35 through the cable 4480. This circuit is normally completed through a pair of normally closed contacts in the printing control circuit 35. The control electrodes of the plurality of counting tubes and of the prime tube 4530 are provided with a normal positive operating bias from the biasing conductor 2745. The prime tube 4530 is normally rendered conductive by the momentary application of a positive voltage to the conductor 4860.

Following the application of the positive gating voltage to the control electrode of the drive tube 4520, the sixteenth group of mark pulses applied to the conductor 2080 alternately energize and de-energize this tube so that this alternate operation sequentially operates the tubes comprising the counting chain 4600 to selectively render a particular one of these counting tubes conductive to manifest the magnitude of the units days digit. This information is made available to the printing control circuit by providing a plurality of output conductors 4551 and 4611 which are connected to the output anodes of the plurality of counting tubes in the chain 4600. These conductors are grouped together to form a cable 4690 which extends to the printing control circuit 35 through the cable 2750. In the printing control circuit 35, these conductors connect the anodes of the counter tubes with like designated contacts forming the twenty-seventh stepping position of the switch 5100.

Following the receipt of the two groups of mark pulses representing the tens and units digits of the day on which the toll call was completed, a single tube in the units days counting chain 4600 and a single tube in the tens days counting chain 4400 are conducting. This information is utilized in the printing control circuit by drawing current through a selectively energized tube in the counting chains 4400 and 4600. In order to facilitate a greater flow of current through these tubes, the printing control circuit grounds the conductors 4421 and 4535 to provide a direct ground path for the cathodes of these tubes. Simultaneously with the grounding of these conductors, the printing control circuit 35 lowers the normal operating voltage applied to the control electrodes of the plurality of counting tubes in the chains 4400 and 4600. This reduction in the normal operating voltage renders these tubes substantially non-responsive to spurious signals such as may be provided by the plurality of switching operations in the printing control circuit 35.

Immediately following the utilization of the information electronically manifested in the tens and units days counter 4500, the printing control circuit 35 reconditions this counter for operation under the control of the groups of mark pulses representing items of information pertaining to the next completed toll call. To accomplish this function, the printing control circuit opens the normally closed contacts establishing the conductive paths through the conductors 4421 and 4535 so that the plurality of commonly connected cathodes associated with the counting tubes in the chains 4400 and 4600 are disconnected both from ground and from the common cathode resistor. Thereafter, the printing control circuit applies a positive voltage to the priming conductor 4860 so that the prime tubes 4420 and 4530 are rendered conductive. The application of this voltage to render the prime tubes 4420 and 4530 conductive does not effect the non-conductive state of the remainder of the counting tubes in the counting chains 4400 and 4600 inasmuch as the common cathode resistor associated with these prime tubes is disconnected from the commonly connected cathodes. The removal of ground from the conductors 4421 and 4535 interrupts conduction through the selectively fired tubes so that all of the plurality of counting tubes in the chains 4400 and 4600 are returned to a normal non-conductive state.

Therefore, the tens and units days counter 4500 provides an electronic registration or manifestation of the magnitude of the tens and units days digits. Thereafter, the printing control circuit 35 conditions the counter 4500 to permit the information manifested therein to be utilized by the control circuit 35 and, following the utilization of this information, the counter 4500 is returned to a normal condition to be selectively operated under the control of the groups of mark pulses representing the next succeeding toll call.

CALL COMPLETE TUBE 4510

As described above, (Fig. 80) the last group of mark pulses pertaining to a single toll call which is recorded on the magnetic tape 1601 of the seized tape recorder 25 is the sixteenth group which relates to the magnitude of the units days digit. Therefore, when this item of information is properly registered in the tens and units days counter 4500, the printing control circuit 35 is provided with information indicative of this fact. The printing control circuit 35, when instructed that the last item of information pertaining to a particular toll call has been properly registered, is enabled to initiate the production of a printed ticket including the items of information pertaining to this complete call.

In order to provide a means for informing the printing control circuit 35 that the registration of items pertaining to a particular toll call has been completed, the call complete tube 4510 is provided. The control electrode of this tube is connected to the output anode of the prime tube 4530 in the units days counting chain 4600 through a coupling condenser 4512. The prime tube 4530 is rendered non-conductive in response to the receipt of the first mark pulse by the drive tube 4520 in the units days counting chain 4600. The receipt of this pulse indicates that information pertaining to the day on which a particular call was completed has been received by this counting chain, and thus indicates that all of the information pertaining to a particular call has been received by the storage chains 38.

The termination of the conduction through the prime tube 4530 applies a positive voltage through the condenser 4512 to fire the call complete tube 4510. Upon being rendered conductive, current flows through the call complete tube 4510 and a conductor 4515 which extends to the printing control circuit 35 through the cable 4480. The call complete tube 4510 remains conductive until such time as the printing control circuit 35 interrupts the source of operating voltage therefore, thus indicating that a printed ticket has been produced of the items of information pertaining to the toll call which initiated the operation of the call complete tube 4510. Interruption of conduction therethrough conditions this tube for operation under the control of items of information pertaining to the next succeeding toll call.

As described hereinabove, if the call is not completed for one reason or another, the trunk recorder 25 is only provided with the first eight groups of mark pulses comprising the four digits in the calling subscriber's directory number and the four digits comprising the called subscriber's directory number. When the eight groups of mark pulses relating to this incomplete call are transmitted to the steering circuit 37 and the storage chains 38, only the subscriber counting chains 2600 to 2607, inclusive, are operated, and thereafter an end-of-call signal is transmitted to the printing control circuit 35. Since the units days counting chain 4600 is not rendered effective during incomplete calls, the call-complete tube 4510 is not fired. Accordingly, when the end-of-call code following the items of information relating to the incomplete call is transmitted to the printing control circuit 35, this circuit is operated to initiate a cycle of resetting operations to remove the manifestations selectively produced in the subscriber digit counting chains 2600 to 2607, inclusive, and thereby to condition the toll ticketing facilities for operation under the control of the items of information representing the next succeeding call. Therefore, if the call complete tube 4510 has not been rendered conductive under the control of the items of information pertaining to a toll call, the transmission of the end-of-call code initiates a resetting operation of the printing control circuit to condition the toll ticketing facilities for another cycle of operation under the control of the items of information pertaining to the next succeeding toll call.

PRINTING CONTROL CIRCUIT 35

The printing control circuit (Figs. 21, 22 and 47 to 72, inclusive) operates generally to control the registration of information in the plurality of storage chains 38 and to control the operation of the cost computer 39 to calculate a charge to be assessed for a particular toll call. This circuit also controls the sequential removal and transmission of the information stored in the plurality of storage chains 38 to selectively control the operation of the printer 36 to produce a printed ticket including the items of information pertaining to a particular toll call. To accomplish this result, the printing control circuit 35 comprises a number of auxiliary circuits including a destination relay circuit 2150 (Figs. 21 and 22), the stepping or program switch 5100 (Figs. 51 to 66 inclusive), a decoding relay circuit 7000 (Figs. 69 and 70) and an internal printer control circuit 7100 (Figs. 71 and 72).

The destination relay circuit 2150 is selectively operated under the control of the playback control circuit 30 to provide information relating to the exchange to which the plurality of calls recorded on a particular tape are extended. This information is transmitted to the cost computer 39 in the form of selectively grounded and energized conductors, which, as described hereinbefore, prime the cost computer 39 with information pertaining to the minimum base period of time assigned to each completed call, and also prime the monetary portion of the cost computer 39 with information relating to the minimum charge to be assessed for a call having this predetermined duration. In addition, the destination relay circuit 2150 provides the stepping or program switch 5100 with information in the form of a group of selectively grounded conductors which represent the alphabetical designation of the called exchange. Obviously, since all of the calls recorded on the magnetic tape 1601 of a particular seized trunk recorder 25 are extended to a single called exchange, the information selectively established in the destination relay circuit 2150 under the control of the playback control circuit 30 in response to the seizure of a particular trunk recorder 25 is not changed until such time as the seized recorder 25 is released and another trunk recorder 25 is seized by the playback control circuit 30.

The destination relay circuit 2150 also includes a relay which is operated to selectively interconnect the mark and space preamplifiers 31 and 32 with the mark and space pulse clipping amplifiers 33 and 34 so that transient voltages produced by the stepping operations of the playback control circuit 30 are not transmitted to the plurality of storage chains 38. This relay also controls that portion of the printing control circuit 35 which controls the advance of the magnetic tape 1601 in the seized recorder 25 so that the printing control circuit 35 is not effective to control this tape until such time as the control circuit 35 is properly conditioned for a cycle of operation.

The stepping switch 5100 sequentially removes the information stored in the plurality of storage chains 38 and the cost computer 39 under the control of the printing control circuit 35 and transmits this information to the decoding relay circuit 7000 wherein this information, which is stored in the chains 38 and computer 39 in a decimal numerical form, is translated into a permutation code for selectively energizing the internal printer control circuit 7100 thereby to produce a printed ticket containing the items of information relating to a particular completed toll call.

*Destination relay circuit 2150*

The destination relay circuit 2150 (Figs. 21 and 22) includes a pair of destination relays 2120 and 2140 which are selectively operated under the control of the playback control circuit 30. As described hereinbefore, the wiper 1825 in the playback control circuit 30 selectively engages one of the contacts in the contact bank 1825a so that ground is applied to the operating winding of either of the relays 2120 or 2140 through the conductors 1826 or 1827 and the cable 1885 in accordance with the designation of the exchange to which connections are extended by the seized trunk circuit 19. Although the drawings only show the circuit details of a single trunk recorder 25 and its associated one-way trunk circuit 19, it should be understood that the playback control circuit 30 may be associated with any number of trunk recorders 25 and their associated one-way trunk circuits 19, each of which is capable of extending connections to a called exchange, either the same as or different than those shown in the drawings. All of the contacts in the contact bank 1825a which are representative of a particular called exchange apply ground to a single conductor to operate a selected destination relay corresponding to the called exchange. The single one-way trunk circuit 19 shown in Figs. 4, 5 and 6 of the drawings is assumed to be used for interconnecting the exchange 7, designated by the letters "KI," with a called exchange 8, designated by the letters "EB." Accordingly, when the wiper 1825 is moved into engagement with a contact in the contact bank 1825a representative of the called exchange "EB," ground is applied thereover to the conductor 1827 to operate the destination relay 2120. It should be understood that if additional one-way trunk circuits 19 are provided for interconnecting the two above listed exchanges, the movement of the wiper 1825 into engagement with any contact representative of the called exchange "EB" operates the destination relay 2120.

In a like manner, the movement of the wiper 1825 into engagement with any contact representative of a second called exchange, assumed to be designated by the alphabetical code "PI," applies ground through the conductor 1826 to the operating winding of the destination relay 2140 to operate this relay. Similarly, if more than one trunk circuit is provided for interconnecting the exchange "KI" with the called exchange "PI," movement of the wiper 1825 into engagement with any contact representative of this called exchange applies ground to the conductor 1826 to operate the relay 2140.

The operation of the destination relay 2120 under the control of the playback control circuit 30 closes a plurality of contacts 2121, 2125, 2126, 2127, 2222, 2223 and 2224. The closure of the contacts 2222 connects a positive biasing voltage to the conductor 3493 which extends to the cost computer 39 through the cable 3490. The conductor 3493 is adapted to be connected to the control electrode of the "10" manifesting tube 3180 in the tens cents counting ring 3125. The closure of the contacts 2223 connects a positive biasing voltage to the conductor 3492 which extends to the cost computer 39 through the cable 3490. The positive bias applied to the conductor 3492 is adapted to be applied to the "5" manifesting tube 3330 in the units cents counting ring 3300. Therefore, the closure of the contacts 2222 and 2223 provides the cost computer 39 with information pertaining to the minimum charge to be assessed for toll calls extending to the called exchange designated by the characters "EB."

Since the operation of the destination relay 2120 does not apply ground to any of the conductors controlling the operation of the relays 3190 and 3220 in the minimum base time counting chain 3100, the minimum charge of 15¢ represented by the selective closure of the contacts 2222 and 2223 is assessed for a call having a duration of five minutes or less. The duration is set at five minutes inasmuch as with neither of the relays 3190 and 3220 operated, the gate tube 3250 is operated following the receipt of five mark pulses representing a duration of five minutes.

The closure of the contacts 2125 applies ground to a conductor 2181 which extends through a cable 2180 to a contact in the first contact bank of the stepping switch 5100, and in the tenth stepping position thereof. The closure of the contacts 2224 applies ground through a conductor 2224a which extends to a contact in the ninth contact bank of the stepping switch 5100 in the tenth stepping position thereof. The closure of the contacts 2126 applies ground to a conductor 2182 which extends through the cable 2180 to a contact in the first contact bank of the stepping switch 5100 in the eleventh stepping position thereof. The closure of the contacts 2127 applies ground to a conductor 2127a which extends to a contact in the sixth contact deck of the stepping switch 5100 in the eleventh stepping position thereof. This application of ground to the conductors 2181, 2182, 2127a and 2224a selectively energizes the decoding relay circuit 7000 to control the internal printer control circuit 7100 to sequentially print the characters "EB" on a toll ticket containing items of information pertaining to the calls completed to this called exchange. The operation of the decoding circuit 7000 and the internal printer control circuit 7100 to convert the selective grounding of these conductors into the production of the printed alphabetical characters is described more fully hereinafter.

In the event that the seized trunk recorder 25 is associated with a one-way trunk circuit 19 interconnecting the calling exchange 7 designated by the alphabetical characters "KI" with a called exchange designated by the alphabetical characters "PI," the relay 2140 is operated under the control of the playback control circuit 30. The operation of this relay closes a plurality of contacts 2141, 2142, 2143, 2144, 2145, 2146, 2147 and 2241.

The closure of the contacts 2147 applies ground to the conductor 3193 which extends to the cost computer 39 through the cable 3490. The application of ground to the conductor 3193 operates the relay 3190 in the minimum base time counting chain 3100 to interconnect the control electrode of the gate tube 3250 with the output anode of the three minute counting tube 3170 so that following the receipt of three mark pulses representing a duration of three minutes, the gate tube 3250 is fired to render the units cents counting ring 3300 effective. Accordingly, the closure of the contacts 2147 in response to the operation of the "PI" designated destination relay 2140 conditions the minimum base time counting chain 3100 to fire the gate tube 3250 in response to a minimum time duration of three minutes.

The closure of the contacts 2145 applies a positive biasing potential to the conductor 3491 which is adapted to be connected to the control electrode of the "0" manifesting tube 3310 in the units cents counting ring 3300 of the cost computer 39. The closure of the contacts 2146 applies a positive biasing voltage to the conductor 3493 which extends to the cost computer 39 through the cable 3490. The positive biasing voltage applied to the conductor 3493 is adapted to be applied to the control electrode of the "10" manifesting tube 3180 in the tens cents counting ring 3125 of the cost computer 39. Accordingly, the selective closure of the contacts 2145 and 2146 in response to the operation of the "PI" destination relay 2140 provides the cost computer 39 with information that the minimum time period assigned to a call extending to this exchange is three minutes, and further provides the cost computer 39 with information that the minimum charge to be assesesed for a call of three minutes or less in duration is 10 cents.

The closure of the contacts 2142 applies ground to a conductor 2183 which extends through the cable 2180 to a contact in the third contact deck of the stepping switch 5100 in the tenth stepping position thereof. The closure of the contacts 2241 applies ground to a conductor 2241a which extends to a contact in the eighth contact deck of the stepping switch 5100 in the tenth stepping position thereof. The information provided by selectively grounding the conductors 2183 and 2241a is utilized by the decoding relay circuit 7000 and the internal printer control circuit 7100 to produce the printing of the character "P" on a printed toll ticket in a manner described more fully hereinafter.

The closure of the contacts 2143 applies ground to a conductor 2184 which extends through the cable 2180 to a contact in the second contact deck of the stepping switch 5100 in the eleventh stepping position thereof.

The closure of the contacts 2144 applies ground to a conductor 2144a which extends to a contact in the seventh contact deck of the stepping switch 5100 in the eleventh stepping position thereof. The information provided by the selective grounding of the conductors 2184 and 2144a is utilized by the decoding relay circuit 7000 and the internal printer control circuit 7100 in a manner more fully described hereinafter to produce a printed character "I" on the printed ticket immediately following the previously produced character "P" thereby to produce a printed record of the alphabetical designation of the destination code of the called exchange.

Figure 21:
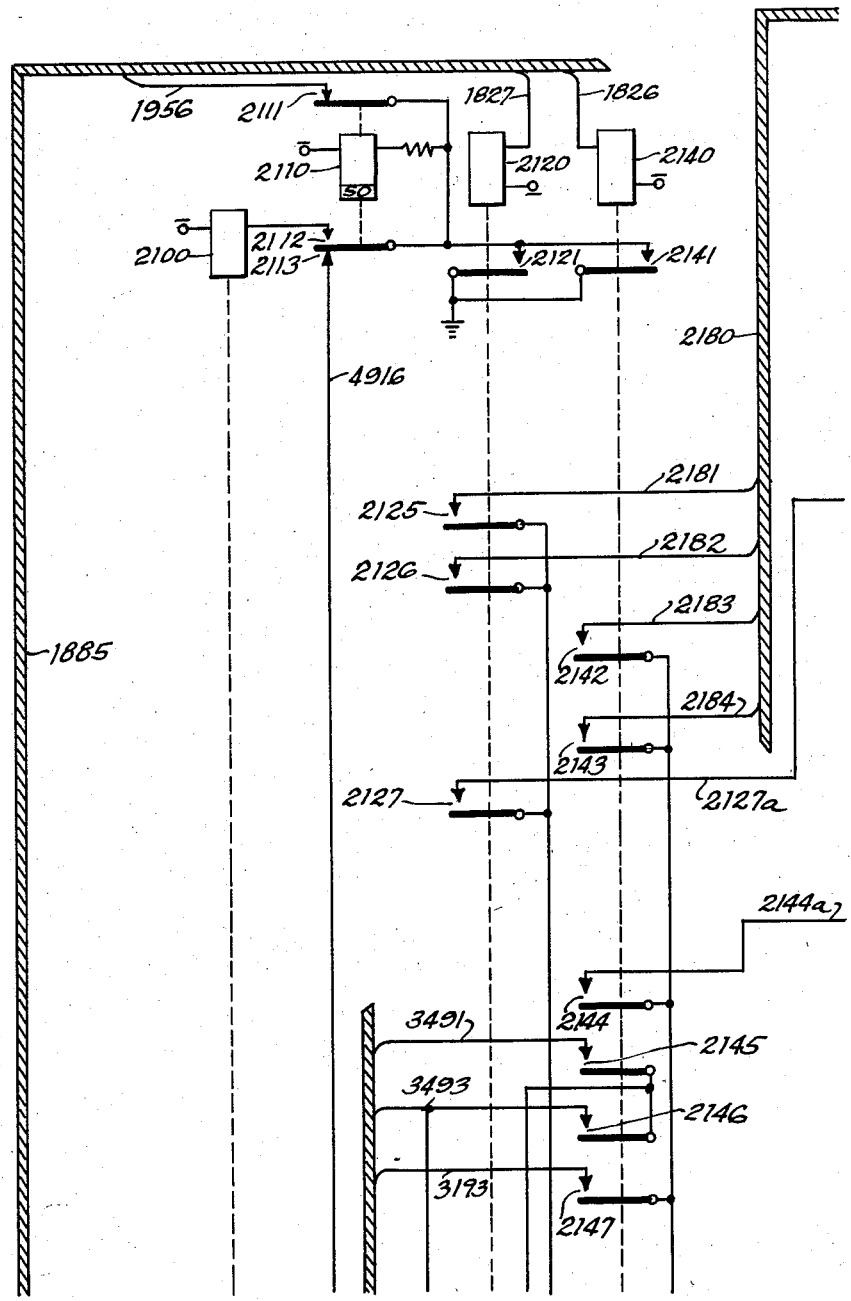
Figure 22:
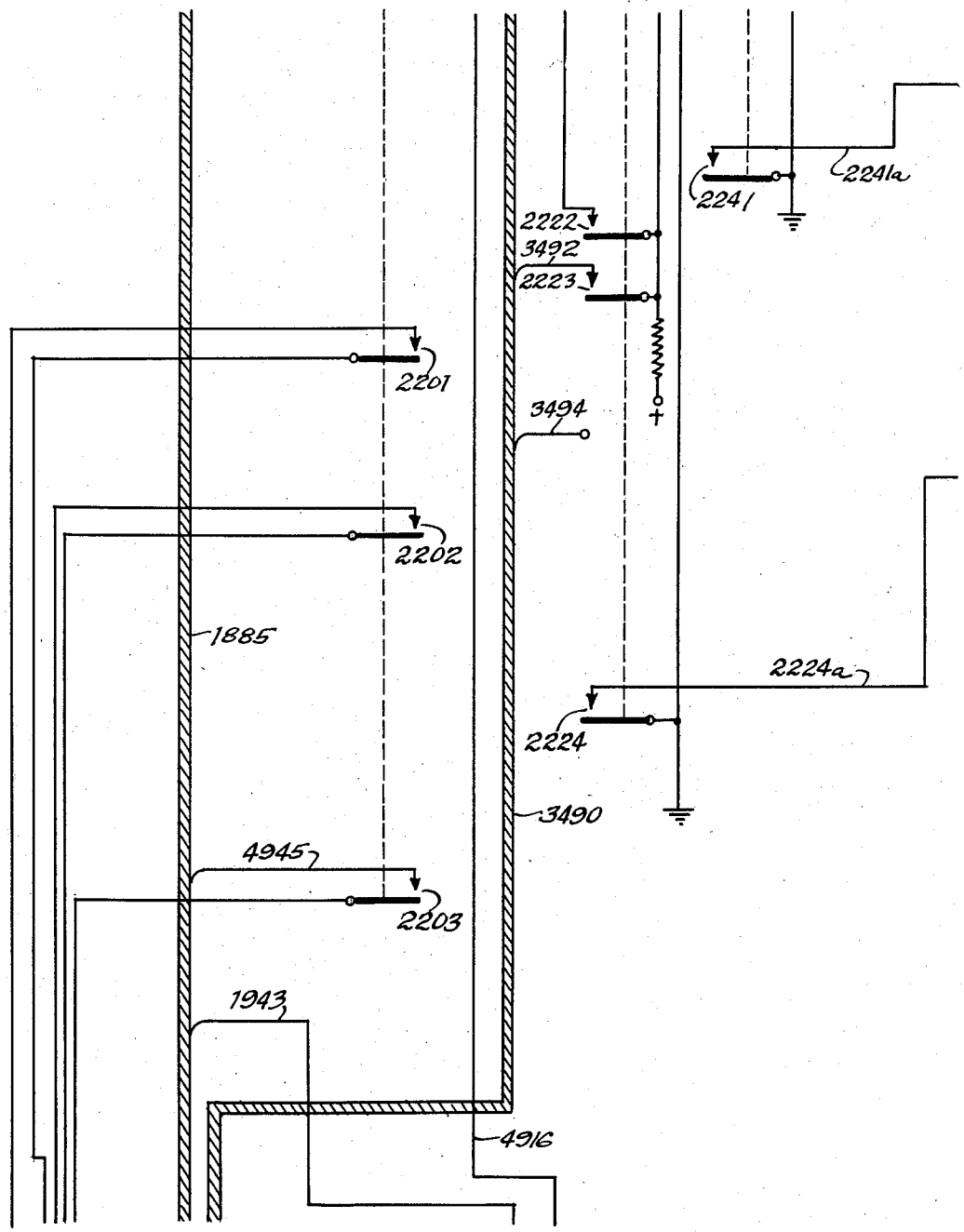

Although the two destination relays shown in Fig. 21 of the drawings provide the above described information both to the cost computer 39 and to the contact banks of the stepping switch 5100, it should be understood that the cost and base time information provided to the cost computer 39 can be varied in accordance with any of the requirements of commercial application. For instance, the operation of the destination relay 2120 designated by the alphabetical characters "EB" primes a minimum charge of 15 cents into the computer 39 for a call having a duration of five minutes or less. The contacts 223 could be adapted to interconnect battery with the conductor 3494 whereby the minimum charge to be assessed for a call having a duration of five minutes or less would be 25 cents. Obviously, the contacts controlled by the destination relay 2140 could be so interconnected with the source of positive biasing potential so that any selected charge could be assessed for a call having a selected base time.

Further, although the relay 3220 representing a minimum base time period of four minutes is not shown as being controlled by any of the contacts associated with the destination relays 2120 and 2140, it is to be understood that this relay could be controlled by any of the contacts controlled by these relays to provide a four minute base time period.

Likewise, although the selective closure of the contacts 2125, 2126, 2127, 2224, 2142, 2143, 2144 and 2247 provides the stepping switch 5100 with information relating to the alphabetical designation of the exchanges to which the calls are extended, the contacts controlled by these relays may be so interconnected with different designated contacts forming the tenth and eleventh stepping positions of the switch 5100 so as to provide information relating to exchanges designated by alphabetical characters other than those disclosed above. Accordingly, the circuits selectively grounded or connected to a source of positive voltage under the control of the designation relays may be so varied as to provide the cost computer 39 with different minimum time periods and costs and to provide the stepping switch 5100 with varying information relating to the alphabetical designations assigned to the exchanges to which the calls are extended by the one-way trunk circuits 19.

The closure of either of the contacts 2121 or 2141 in response to the selective operation of one of the destination relays 2120 or 2140 applies ground through the normally closed contacts 2111 and a conductor 1956 to the operating winding of the incomplete call relay 1940 in the playback control circuit 30. This relay is operated in response to the application of ground to the conductor 1956 and indicates to the playback control circuit 30 that one of the destination relays has been operated. The operation of the incomplete call relay 1940 closes the contacts 1941 so that the operating winding of this relay is connected to the normally grounded conductor 1943 which extends to the printing control circuit 35. This relay, as described hereinafter, remains operated until such time as ground is removed from the conductor 1943. Ground is removed from the conductor 1943 upon the completion of the registration of the item of information pertaining to a single toll call. Accordingly, the incomplete call relay 1940 is operated when the removal of information from a seized trunk recorder 25 is initiated, and, thereafter, is released in response to the completion of the registration of the item necessary to produce a single toll ticket whereby the incomplete call relay 1940 provides a means for indicating the failure of the ticket printing facilities as described hereinbefore.

The ground applied through the normally closed contacts 2111 is also applied to the operating winding of a slow-to-operate relay 2110 so that after a predetermined period of time this relay operates to open the contacts 2111 and 2113 and to close the contacts 2112. The opening of the contacts 2111 breaks the operating circuit for the incomplete call relay 1940 so that this relay is under the sole control of the conductor 1943 extending to the printing control circuit 35. Since the relay 2110 is operated in response to the operation of one of the destination relays and since this relay remains operated until the destination relays are released following the dismissal of the seized trunk recorder 25, the incomplete call relay 1940 may not be operated through the contacts 2111 until another trunk recorder is seized by the playback control circuit 30. Accordingly, the incomplete call relay 1940 is only capable of being operated once during the playback operation of each trunk recorder 25 and remains operated until such time as all of the information necessary to produce a single toll ticket is registered.

Also, the closure of one of the contacts 2121 or 2141 applies ground through the normally closed contacts 2113 and a conductor 4916 to the upper operating winding of an end-of-call relay 4910 in the printing control circuit 35. This application of ground operates the end-of-call relay to initiate a resetting operation of the printing control circuit 35 as described more fully hereinafter.

The closure of the contacts 2112 applies ground to the operating winding of a relay 2100 to operate this relay to close the contacts 2201, 2202 and 2203. The closure of the contacts 2201 interconnects the output of the mark pulse preamplifier 31 with the input of the mark pulse clipping amplifier 33. The closure of the contacts 2202 interconnects the output of the space pulse preamplifier circuit 32 with the input of the space pulse clipping amplifier 34. Since the relay 2100 is only operated after the predetermined period of time established by the slow-to-operate relay 2110, the operation of which is initiated by the operation of one of the destination relays 2120 or 2140, the preamplifier circuits 31 and 32 are not connected to the clipping amplifiers 33 and 34, respectively, until a period of time has passed which is sufficient to insure the absence of any transient voltages which would produce false indications in the storage chains 38 and in the steering circuit 37.

The closure of the contacts 2203 completes the circuit extending through the conductor 4945 from the printing control circuit 35 to the playback control circuit 30. As described hereinbefore, the conductor 4945 controls the energization of the clutch magnet 1204 in the seized trunk recorder 25, and accordingly, the time delay introduced before the closure of the contacts 2203 following the operation of one of the destination relays 2120 or 2140 in response to the seizure of a particular recorder 25 insures an adequate time for conditioning the printing control circuit 35 for operation.

The opening of the contacts 2113 interrupts the operating circuit for the end-of-call relay 4910 in the printing control circuit 35 and performs a function which will be described more fully hereinafter in conjunction with the description of the operation of the printing control circuit 35 preparatory to the printing of the toll tickets.

In summary, the destination relay circuit 2150 is operated in response to the seizure of a particular trunk recorder 25 associated with a one-way trunk circuit 19 extending to a particular called exchange and, in operating, provides the cost computer 39 with information relating to the minimum base time and the cost to be assessed therefore, for calls completed to the exchange represented by the selective operation of one of the destination relays 2120 or 2140. The destination relay circuit 2150 also provides the printing control circuit 35 and, more particularly, the stepping or program switch 5100 with information representing the alphabetical designation of the called exchange, which information is subsequently utilized to produce a printed record of the alphabetical designation of this called exchange. The circuit 2150 also initiates a resetting operation of the printing control circuit 35 prior to continued movement of the tape 1601 in the seized recorder 25 to condition the storage chain 38, cost computer 39, and steering circuit 37 for the receipt of the first groups of mark pulses.

The destination relay circuit 2150 interconnects the preamplifiers 31 and 32 with the clipping amplifiers 33 and 34 after a predetermined time delay sufficient to insure the absence of any undesired transient voltages, which may produce spurious indications in the storage chains 38 or the cost computer 39. In addition, the circuit 2150 operates the incomplete call relay 1940 in the playback control circuit 30 so that unless this relay is released in response to the completion of a printing of a ticket containing all of the necessary items of information pertaining to a single toll call prior to the release of the seized recorder 25, an indication is produced in the playback control circuit 30 representative of this fact, so that as described hereinabove, the playback control circuit 30 is disabled from initiating any additional cycles of operation.

*Operation of the printing control circuit 35 preparatory to printing a toll ticket*

The printing control circuit 35 is initially set in operation in response to the seizure of a trunk recorder 25 and its associated one-way trunk circuit 19 to reset and prime all of the plurality of storage chains 38 and the cost computer 39. Thereafter, the printing control circuit 35 initiates the movement of the magnetic tape 1601 in the seized trunk recorder 25 so that the items of information pertaining to a first toll call are sequentially registered in the plurality of storage chains 38 and utilized in the cost computer 39 to produce an indication of the total cost to be assessed for this call. Following the registration of these items of information, the printing control circuit 35 initiates sequential operation of the stepping switch 5100 to sequentially transfer the items of information manifested in the plurality of storage chains 38 and the cost computer 39 to operate the decoding relay circuit 7000. The operation of the decoding relay circuit 7000 produces selective and sequential energization of the internal printer control circuit 7100, whereby a printed ticket is produced by the printer 36 containing all of the items of information pertaining to the single toll call whose information has been removed from the magnetic tape 1601 of the seized trunk recorder 25. Thereafter, the printing control circuit 35 initiates a resetting and priming operation so that the plurality of storage chains 38 and the cost computer 39 are cleared of previous manifestations and conditioned for operation under the control of the groups of mark pulses representing the items of information pertaining to the next completed toll call.

Following the production of a plurality of toll tickets representing the items of information relating to all of the toll calls recorded in the seized trunk recorder 25, the printing control circuit 35 enables the playback control circuit 30 to dismiss the seized recorder 25 and search for another idle recorder 25 containing items of information which may be utilized to produce printed toll tickets. Concurrently with informing the playback control circuit 30 that the seized trunk recorder 25 may be released, the printing control circuit 35 resets and primes all of the plurality of storage chains 38 to condition them for a cycle of operation under the control of items of information recorded on the next seized recorder 25.

As described hereinabove, the playback control circuit 30 during the seizure of an idle trunk recorder 25 operates the playback relay 1830 to open the contacts 1836 and to close the contacts 1835. The opening of the contacts 1836 removes ground from the clutch magnet 1204 of the seized trunk recorder 25 and interconnects the operating winding of this clutch magnet through the closed contacts 1835 to the conductor 4945 which extends through the cable 1885 to the normally open contacts 2203.

Simultaneously with opening the contacts 1836 and closing the contacts 1835 to transfer the control over the clutch magnet 1204 of the seized recorder 25 to the printing control circuit 35, the operation of the playback relay 1830 closes the contacts 1832 to apply ground through the closed contacts 1821, the wiper 1825, and one of the conductors 1826 or 1827 extending from the contact bank 1825a to the destination relays 2120 and 2140 in the destination relay circuit 2150. In accordance with the above assumption that the sample call shown in Fig. 80 extends to the exchange 8 designated as "PI", ground is applied through the conductor 1826, and the cable 1885 to the operating winding of the "PI" destination relay 2140. This application of ground operates the relay 2140 to close the plurality of contacts controlled thereby.

The closure of the contacts 2141 controlled by the destination relay 2140 applies ground through the normally closed contacts 2113 and a conductor 4916 to the upper operating winding of the end-of-call relay 4910, to operate this relay. The operation of the end-of-call relay 4910 closes a plurality of contacts 4911, 4912 and 4913 and opens a pair of contacts 4914.

The closure of the contacts 2141 also applies ground through the closed contacts 2111, the conductor 1956 and the cable 1885 to operate the incomplete call relay 1940 in the playback control circuit 30. The operation of the incomplete call relay 1940 closes the contacts 1941 to interconnect the operating winding of this relay with the conductor 1943. Since the conductor 1943 is grounded under the control of the printing control circuit 35, the closure of the contacts 1941 completes a locking circuit for the relay 1940.

The operation of the end-of-call relay 4910 under the control of the selective operation of one of the destination relays in the destination relay circuit 2150 initiates a resetting and priming operation so that the steering circuit 37, storage chains 38, the cost computer 39 and the printing control circuit 35 are cleared of any previous indications. The closure of the contacts 4912 completes a locking circuit for the end-of-call relay 4910 which extends from a pair of normally closed and grounded contacts 4942. The closure of the contacts 4913 applies ground to the operating winding of the end-of-call relay 1860 in the playback control circuit 30 but the operation of the end-of-call relay 1860 produces no useful function at this time.

Following a predetermined period of time approximately equal to the time required for the completion of the resetting and priming operation initiated by the operation of the end-of-call relay 4910, the relay 2110 is operated to open the contacts 2111 and 2113 and to close the contacts 2112. The opening of the contacts 2111 removes ground from the conductor 1956 but the incomplete call relay 1940 is not released inasmuch as the locking circuit therefor has been completed by the closure of the contacts 1941. The opening of the contacts 2113 breaks the operating circuit for the upper operating winding of the end-of-call relay 4910, but this relay does not release inasmuch as the previous closure of the contacts 4912 completes a locking circuit therefor.

The closure of the contacts 2112 operates the relay 2100 to close the contacts 2201, 2202 and 2203. The closure of the contacts 2201 and 2202 interconnects the preamplifiers 31 and 32 with the clipping amplifiers 33 and 34. The closure of the contacts 2203 extends the circuit provided by the conductor 4945 from the playback control circuit 30 to the contacts 4914, now open in response to the operation of the end-of-call relay 4910. Since the time delay provided prior to the operation of the relay 2100 is approximately equal to the time necessary for completing the resetting and priming operations controlled by the circuit 35, the preamplifiers 31 and 32 are not interconnected with the clipping amplifiers 33 and 34 to permit the transmission of pulses to the steering circuit 37 and the storage chains 38, and the contacts 2203 are not closed to complete the interconnection of the clutch magnet 1204 in the seized recorder 25 with the printing control circuit 35 until such time as the toll ticketing facilities are conditioned for receiving the groups of mark pulses representing the items of information relating to the first toll call recorded on the tape 1601 of the seized recorder 25.

The closure of the contacts 4911 in response to the operation of the end-of-call relay 4910 initiates the resetting and priming operation of the printing control circuit 35. The closure of the contacts 4911 applies ground through normally closed contacts 4831 to the upper operating winding of a reset relay 4820 to operate this relay. Relay 4820 in operating, opens a plurality of contacts 4821, 4823, 4824, 4825, 4826, 4828, 4829, and 4821a, and closes a plurality of contacts 4822, 4827, and 4822a. The opening of contacts 4823 breaks the normally established circuit extending through the conductors 2642 so that the plurality of counting tubes 2680 and 2710 forming the counting chain 2600 wherein is normally registered the magnitude of the first digit of the calling subscribers directory number, are disconnected both from the cathode resistor 2641 of the prime tube 2640 and from ground. The opening of the contacts 4829 disconnects the commonly connected cathodes of the counting tubes 2690 and 2720 forming the counting chain 2601 from the common cathode resistor in the cathode circuit of the prime tube 2650 and from ground.

The opening of contacts 4825 breaks the normally established circuit extending through the conductors 3515 and the cable 4480 to the tens hours counting chain 3500. The interruption of this normally established circuit disconnects the common cathode resistor of the prime tube 3520 from the commonly connected cathodes of the plurality of counting tubes 3530, 3540 and 3550 and also removes ground from these cathodes. The opening of the contacts 4826 interrupts the normally established circuit extending through the conductors 4535 and the cable 4480 to the units days counting chain 4600. The interruption of this circuit disconnects the common cathode resistor of the prime tube 4530 from the commonly connected cathodes of the plurality of tubes forming this counting chain and also disconnects these cathodes from ground.

Figure 48:
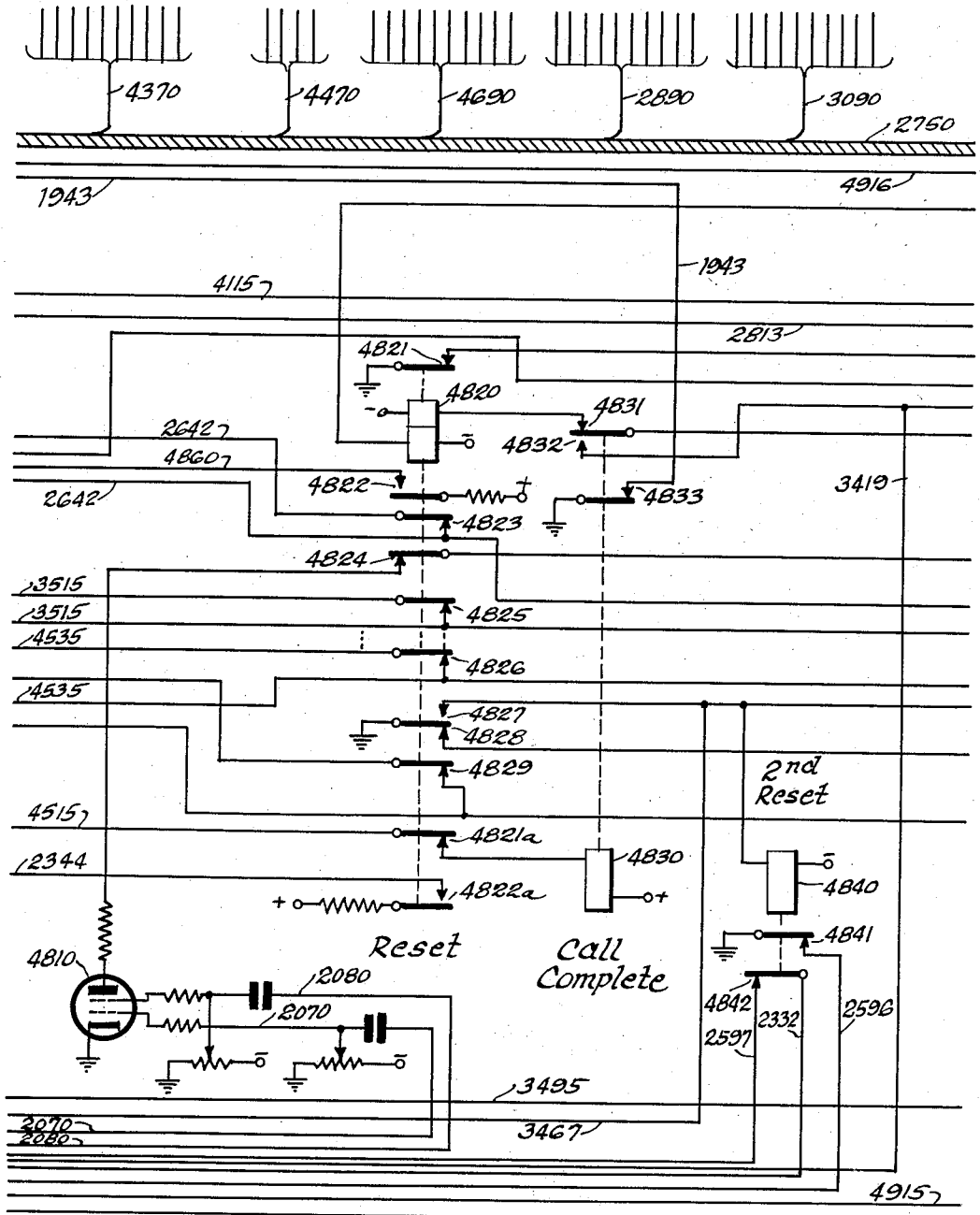

Although Fig. 48 of the drawings only discloses contacts 4823, 4829, 4925, and 4826 for interrupting the normally established connections between the common cathode resistor of the prime tubes and the commonly connected cathodes of the counting tubes forming the counting chains 2600, 2601, 3500 and 4600, it should be understood that similar contacts are provided under the control of the reset relay 4820 and a pair of other reset relays 4840 and 4930 for interrupting the normally established connection between the prime tubes and the commonly connected cathodes of the counting tubes in the counting rings or chains 2602, 2603, 2604, 2605, 2606, 2607, 2800, 2900, 3700, 3800, 4000, 4100, 4300 and 4400. In this manner, the operation of the reset relay 4820 disconnects the commonly connected cathodes from the common cathode resistor therefor to condition the prime tubes for being rendered conductive and for disconnecting these commonly connected cathodes from ground to render all of the counting tubes non-conductive.

The closure of the contacts 4822 applies a positive biasing voltage to the prime conductor 4860. This conductor extends to the control electrodes of all of the prime tubes in the storage chains 38 so that, upon application of a positive biasing voltage to this conductor, all of the prime tubes in the storage chains 38 are rendered conductive. As described hereinbefore, the application of the positive priming voltage to the control electrodes of the plurality of prime tubes does not affect the non-conductive state of the plurality of counting tubes forming these storage chains inasmuch as the cathodes of all of these tubes are disconnected from ground and from the common cathode resistors. Accordingly, the operation of the reset relay 4820 conditions all of the storage chains 38 for the receipt of information by removing any manifestations from these counting chains and by rendering the prime tubes of these chains normally conductive.

The closure of the contacts 4822a applies a positive biasing voltage to the conductor 2344 which extends to the steering circuit 37 through the cable 2390. The application of a positive biasing voltage to this conductor renders the first tube in the phase inversion chain conductive. By rendering this tube conductive, a positive biasing voltage is applied to the conductor 2345 extending to the control electrode of the drive tube 2610 in the counting chain 2600 so that this tube is rendered responsive to the first group of mark pulses.

The opening of the contacts 4821, 4828 and 4821a produces no useful function at this time. The closure of the contacts 4827 applies ground to the operating winding of the second reset relay 4840 to operate this relay.

The operation of the relay 4840 opens a plurality of contacts 4841 and 4842. The opening of the contacts 4841 removes ground from the conductor 2596 which extends to the steering circuit 37 through the cable 2390. The removal of ground from the conductor 2596 disconnects the commonly connected cathodes of some of the tubes forming the phase inversion chain from ground so that these tubes are rendered non-conductive, thus insuring that a positive biasing voltage is applied only to the control electrode of the drive tube 2610 in the counting chain 2600. The opening of the contacts 4842 disconnects the conductors 2597 and 2332 so that the normally established conductive path extending between the common cathode resistor and the plurality of commonly connected cathodes in the counting chain 2300 is disconnected. The interruption of this normally established circuit renders all of the tubes in the counting chain 2300 non-conductive. The prime tube in the counting chain 2300 was previously rendered conductive in response to the application of the positive biasing voltage to the prime conductor 4860. Accordingly, the operation of the first and second reset relays 4820 and 4840 conditions the steering circuit 37 for the receipt of the space pulses representing the first toll call whose information is registered on the magnetic tape 1601 of the seized trunk recorder 25. This resetting and conditioning is accomplished by interrupting the cathode circuits of all of the counting tubes and phase inversion tubes so that no false manifestations are produced thereby, and also by priming the control electrodes of the two prime tubes to render these tubes conductive, thereby resulting in the application of a positive biasing voltage to the control electrode of the drive tube 2610 in the counting chain 2600, which is adapted to receive the first group of mark pulses representing the magnitude of the first digit in the directory number of the calling subscriber.

Figure 49:
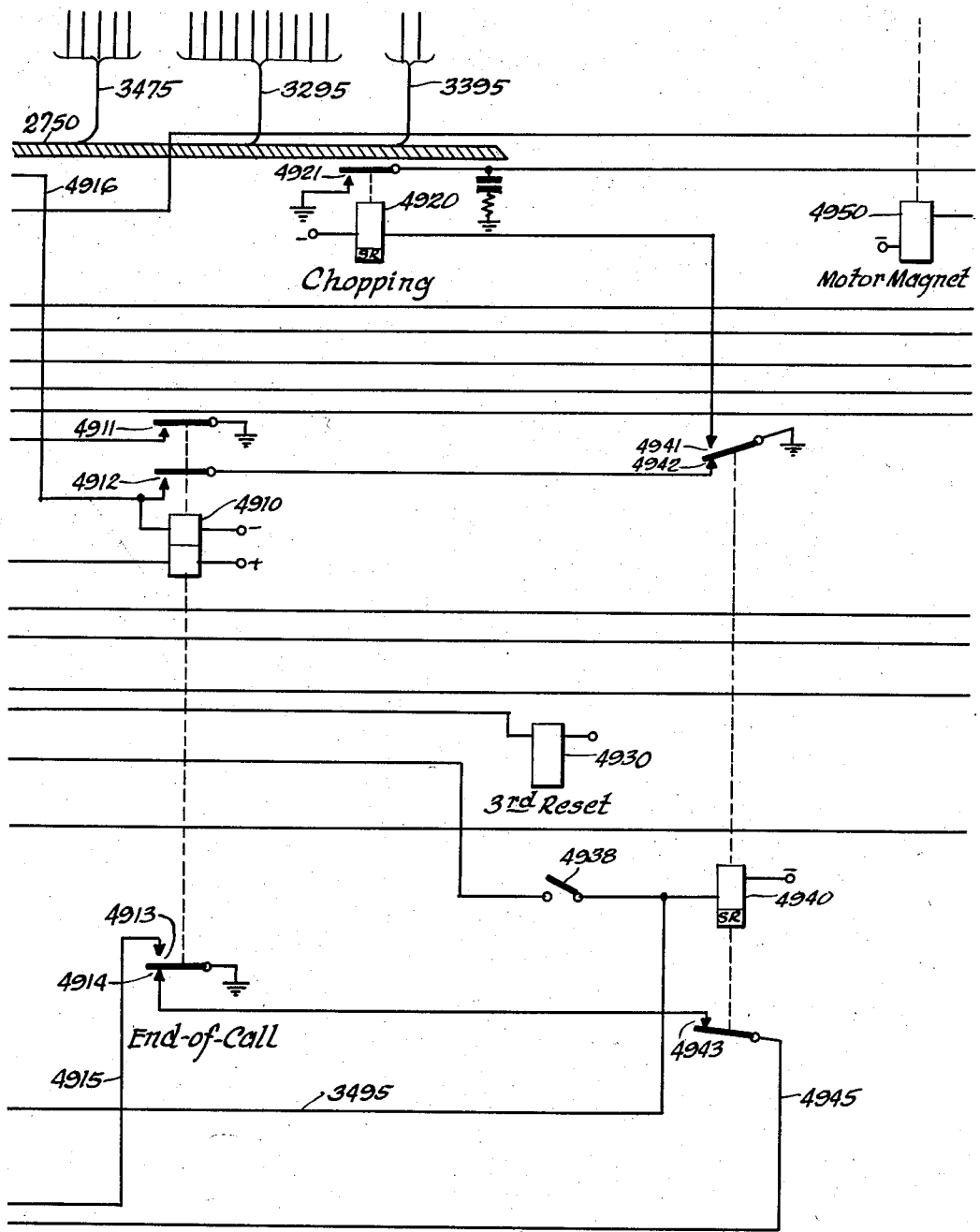
Figure 50:
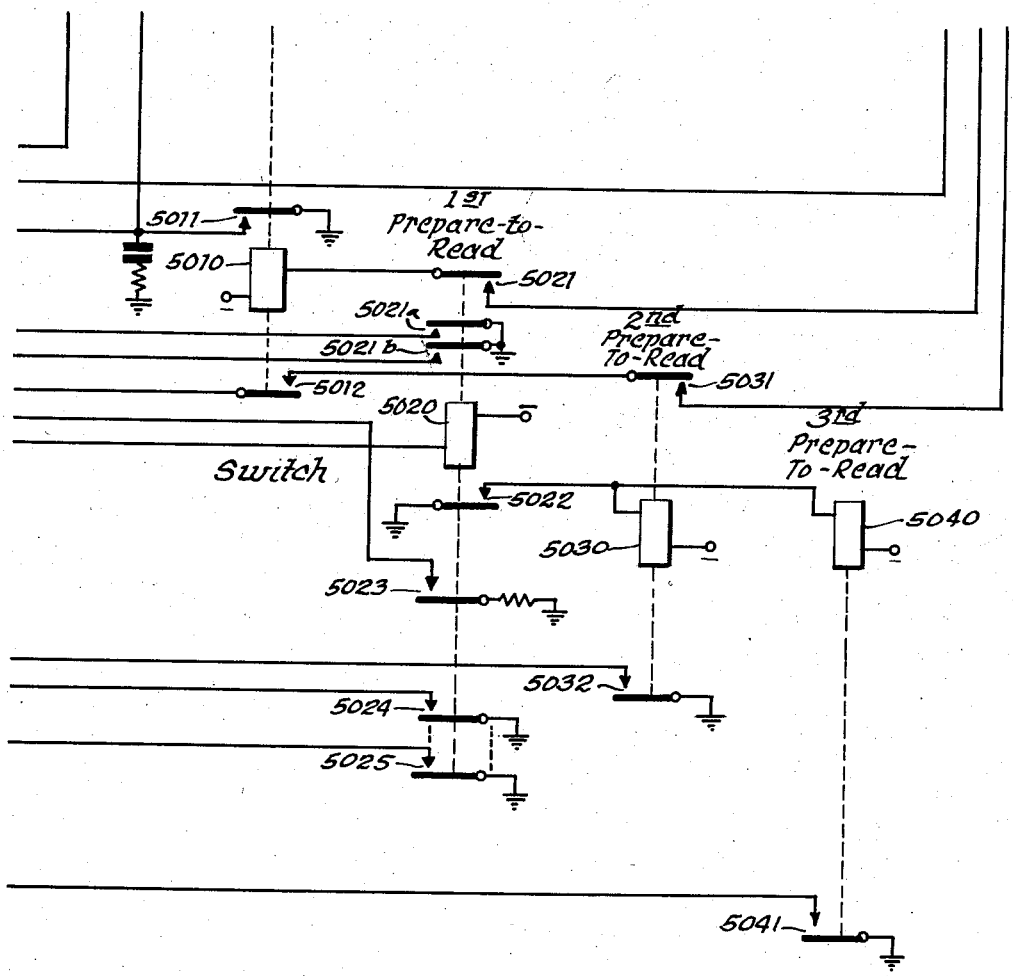
Figure 51:
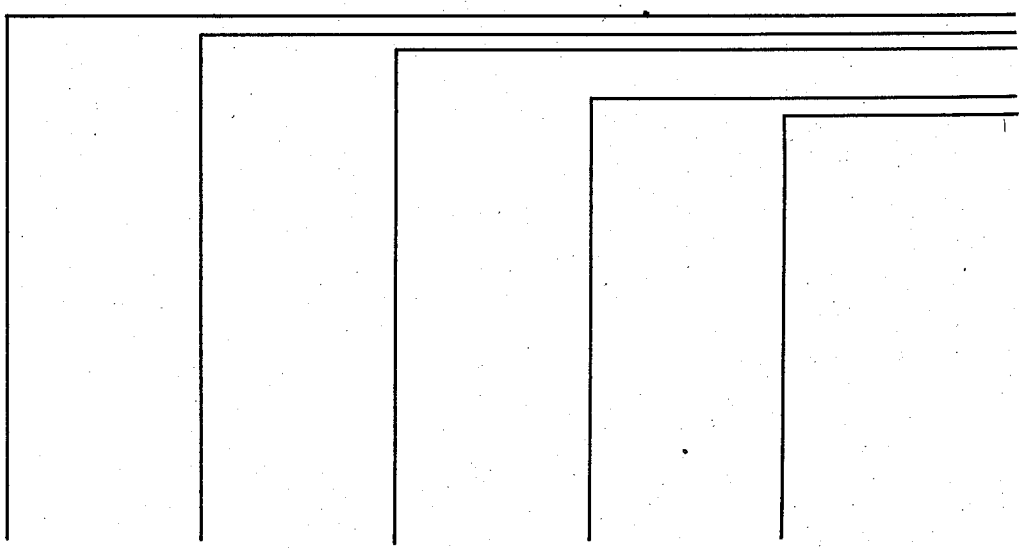
Figure 52:
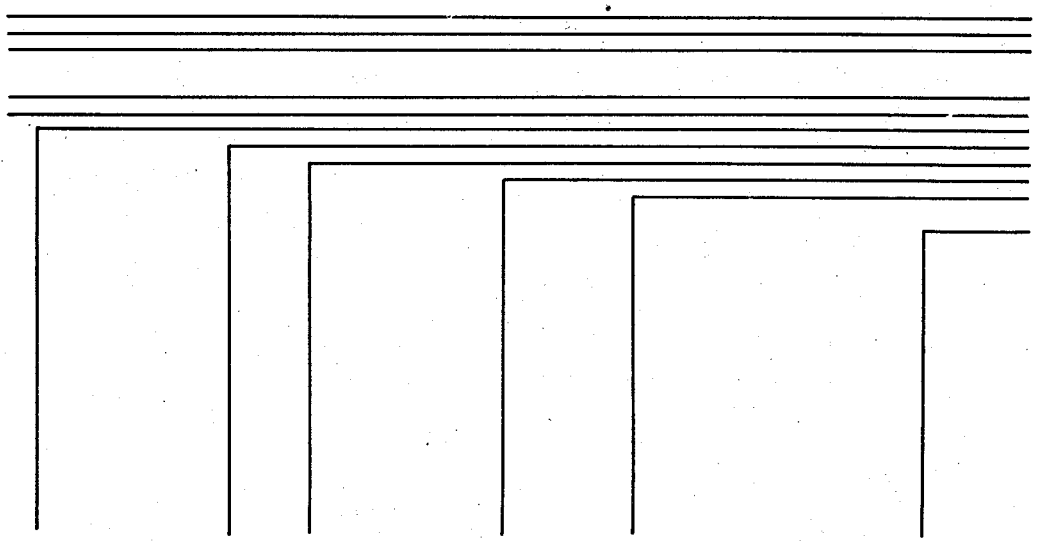
Figure 53:
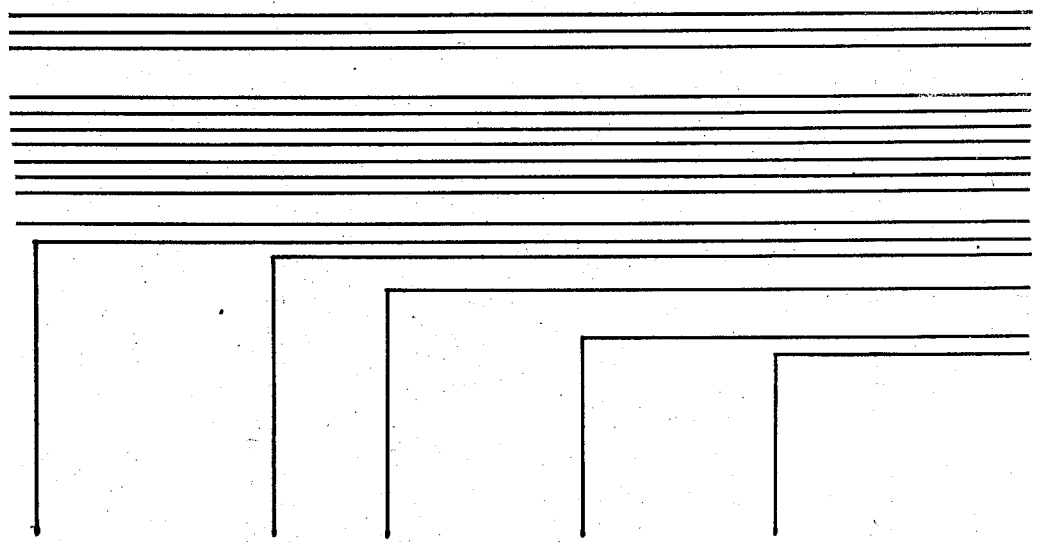

The closure of the contacts 4827 also applies ground to the operating winding of the third reset relay 4930 to operate this relay. As shown in Fig. 49 of the drawings, there are no contacts illustrated as being controlled by this relay, but it should be understood that the relay 4930 contains contact assemblies, and wiring thereto, similar to the contacts 4825 and 4826 to provide a means for interrupting the cathode circuits of the plurality of counting tubes in the storage chains 38. Also, the second reset relay 4840 may be provided with additional contacts connected similarly to the contacts 4825 and 4826 to provide a means for interrupting the normally established path between the common cathode resistors and the commonly connected cathodes of the plurality of tubes in the storage chains 38.

The closure of the contacts 4827 also applies ground to the conductor 3467. The application of ground to the conductor 3467 operates the reset relay 3460 in the cost computer 39, so that this relay closes and opens the plurality of contacts associated therewith to produce a resetting operation in the manner described hereinbefore in conjunction with the detailed description of the operation of the cost computer 39 during a resetting operation. The operation of the reset relay 3460 also operates the prime relay 3480 in the cost computer 39. In general, the sequential operation of the reset relay 3460 and the prime relay 3480 in the cost computer 39 removes any previous manifestations present in the computer 39 and thereafter, primes the monetary portion of the computer 39 with information relating to the minimum charge which is arbitrarily assessed for calls having a predetermined duration or less and which are completed to a particular called exchange. Assuming, as above, that the "PI" destination relay 2140 is operated, contacts 2147 are closed to ground the conductor 3193. Grounding the conductor 3193 operates the relay 3190 thereby to interconnect the control electrode of the gate tube 3250 with the output anode of the "3" manifesting tube 3170 thereby to indicate that the duration of the toll call extended to the "PI" exchange is three minutes in duration for a particular minimum charge.

The operation of the prime relay 3480 following the operation of the reset relay 3460 applies a positive biasing voltage to selected tubes in the units cents counting ring 3300 and the tens cents counting ring 3125 representing the minimum charge to be assessed for calls having a duration of three minutes or less. The operation of the "PI" destination relay 2140 closes the contacts 2145 and 2146 so that a positive biasing voltage is applied to the conductors 3491 and 3493. This biasing voltage is representative of "0" in the units cents denominational column and "10" in the tens cents denominational column. This voltage is applied to the control electrodes of the "0" manifesting tube 3310 and the "10" manifesting tube 3180 in response to the operation of the prime relay 3480. However, these tubes are not rendered conductive at this time, inasmuch as the cathode circuits of these tubes are open.

The operation of the prime relay 3480 also opens the contacts 3487 so that ground is removed from the conductor 3495. The removal of ground from the conductor 3495 releases a normally operated relay 4940. The relay 4940 is slow-to-release so that, after a predetermined interval of time, this relay releases to open the contacts 4942 and 4943 and to close a contact 4941. The opening of the contacts 4943 produces no useful function at this time inasmuch as ground has previously been removed from the clutch conductor 4945 by the opening of the contacts 4914. The closure of the contacts 4941 produces no useful function at this time. The opening of the contacts 4942 removes locking ground from the operating winding of the end-of-call relay 4910 so that this relay releases.

The end-of-call relay 4910 is released in response to the opening of the contacts 4942 inasmuch as ground has previously been removed from the conductor 4916 in response to the operation of the relay 2110 in the destination relay circuit 2150. The release of the end-of-call relay 4910 opens the contacts 4911, 4912, and 4913 and closes the contacts 4914. The closure of the contacts 4914 does not initiate movement of the magnetic tape 1601 in the seized recorder 25 inasmuch as the contacts 4943 are now open. The opening of the contacts 4912 breaks the locking circuit for the end-of-call relay 4910 in another position. The opening of the contacts 4913 interrupts the energizing circuit for the end-of-call relay 1860 to release this relay. The release of the end-of-call relay 1860 produces no useful function at this time, except insofar as this release conditions the printing control circuit 30 for operation.

The opening of the contacts 4911 interrupts the operating circuit for the reset relay 4820 so that this relay releases to close the contacts 4821, 4823, 4824, 4825, 4826, 4828, 4829, and 4821a, and to open the contacts 4822, 4827 and 4822a. The opening of the contacts 4822 removes the positive bias from the prime conductor 4860 and, accordingly, from the control electrodes of the plurality of prime tubes in the storage chains 38 and the counting chain 2300 in the steering circuit 37. The opening of the contacts 4822a removes the positive biasing voltage from the conductor 2344 and, accordingly, from the control electrode of the prime tube in the phase inversion chain 2305 of the steering circuit 37. The closure of the contacts 4823, 4825, 4826 and 4829, together with the similar contacts controlled either by the reset relay 4820 or the reset relays 4840 and 4930, reestablishes the normally conductive circuits between the plurality of commonly connected cathodes of the plurality of counting tubes forming the storage chains 38 with their respectively associated common cathode resistors so that these tubes are conditioned to be sequentially operated in response to the application of mark pulses to the control electrodes of their respectively associated drive tubes. The closure of the contacts 4828 produces no useful function. The closure of the contacts 4821, 4824 and 4821a re-establishes a normal circuit condition so that the printing control circuit 35 is conditioned for operation in response to signals representing the end of the transmission by the tape recorder 25, of items of information pertaining to a first toll call.

The opening of the contacts 4827 releases the second and third reset relays 4840 and 4930. The release of the relay 4840 closes the contacts 4841 and 4842. The closure of the contacts 4841 connects the commonly connected cathodes of the tubes forming the phase inversion ring 2305 to ground so that these tubes are conditioned for a cycle of operation under the control of the plurality of space pulses included in the items of information pertaining to the first toll call recorded in the seized trunk recorder 25. The closure of the contacts 4842 re-establishes the normally conductive circuit between the cathode resistor of the prime tube in the counting chain 2300 of the steering circuit 37 with the commonly connected cathodes of the counting tubes therein, thereby to condition this circuit for operation under the control of the sequentially applied space pulses included in the items of information pertaining to the first toll call recorded on the magnetic tape 1601 of the seized trunk recorder 25.

The opening of the contacts 4827 also removes ground from the conductor 3467 so that the reset relay 3460 in the cost computer 39 is released. The release of this relay establishes the normally conductive path to the plurality of counting tubes in the units cents counting ring 3300 and the tens cents counting ring 3125 so that the tubes with control electrodes to which are selectively applied the positive voltages representing the minimum charge to be assessed for the toll calls extending to the particular called exchange represented by the operated destination relay 2140, are operated to electronically manifest the predetermined minimum charge. As described above, the "10" manifesting tube 3180 in the tens cents counting ring 3125 and the "0" manifesting tube 3310 in the units cents counting ring 3300 are rendered conductive, thereby to electronically manifest a minimum charge of ten cents to be assessed for a toll call having a duration of three minutes and completed to a called subscriber in the exchange designated by the characters "PI."

Following the release of the reset relay 3460, the prime relay 3480 in the cost computer 39 is also released, thereby to open the contacts 3484 and 3485 to remove the priming voltage from the selected control electrodes. The release of the prime relay 3480 also closes the contacts 3487 to apply ground to the conductor 3495. The application of ground to the conductor 3495 reoperates the relay 4940 so that this relay closes the contacts 4943 and 4942 and opens the contacts 4941. The closing of the contacts 4942 reconditions the locking circuit for the end-of-call relay 4910, now interrupted at the normally opened contacts 4912. The closure of the contacts 4943 applies ground to the clutch conductor 4945 so that the clutch magnet 1204 in the seized trunk recorder 25 is energized to re-initiate the advancing movement of the magnetic tape 1601 therein. The opening of the contacts 4941 produces no useful function at this time.

This continuing advancement of the magnetic tape 1601 in the seized trunk recorder 25 selectively energizes the mark head 1201 to produce a series of impulses representing the magnitude of the first digit of the directory number assigned to the calling subscriber. This group of pulses is applied through the mark pulse preamplifier 31, the contacts 2201, now closed, and the mark pulse clipping amplifier 33 to the mark pulse conductor 2080. This first group of pulses appearing on the mark pulse conductor 2080 is applied in common to the control electrodes of all of the drive tubes in the storage chains 38. However, this group of mark pulses is only effective to operate the counting chain 2600 which is adapted electronically to manifest or register the magnitude of the first digit in the directory number of the calling subscriber. The counting chain 2600 is rendered responsive to this first group of mark pulses inasmuch as the resetting operation of the printing control circuit 35 conditions the steering circuit 37 to apply a positive bias to the conductor 2345 connected to the control electrode of the drive tube 2610. Thereafter, the plurality of storage chains 38 and the cost computer 39 are sequentially rendered effective to produce electronic manifestations which are representative of the items of information pertaining to the first toll call.

Assuming that the first call recorded on the magnetic tape 1601 in the seized recorder 25 includes the items of information recorded on the tape segment 1601a in Fig. 80 of the drawings, the first group of mark pulses includes three discrete pulses which, upon application to the control electrode of the drive tube 2610 in the subscriber digit counting chain 2600, produces the selective firing of the "3" manifesting tube 2680. The space pulse following the first group of mark pulses removes the positive bias from the control electrode of the drive tube 2610 and applies a gating voltage to the control electrode of the drive tube 2620 through the conductor 2365. Thereafter, the second group of mark pulses sequentially operates the counting chain 2601 to render the "4" manifesting tube 2690 conductive.

The fourth, fifth, sixth and seventh groups of mark pulses successively energize the counting chains 2602 to 2606, inclusive, to render tubes manifesting the digits 5, 6, 7 and 8, respectively, conductive. Following the seventh group of mark pulses, the positive biasing potential is removed from the conductor 2445 and a positive potential is applied to the conductor 2465 so that the subscriber digit counting chain 2607 is rendered responsive to the eighth group of mark pulses, which group represents the fourth digit of the directory number of the called subscriber. This eighth group of mark pulses includes nine discrete mark pulses so that, upon application thereof to the control electrode of the drive tube 3630, the "9" manifesting tube 2730 is rendered conductive. The space pulse following the eighth group of mark pulses operates the steering circuit 37 to remove the positive bias from the conductor 2465 and to apply this bias to the conductor 2485 which is connected to the control electrode of the drive tube 2950 in the units minutes counting ring 2900 of the elapsed time counter 3000.

The ninth group of mark pulses, as assumed hereinabove, includes 26 pulses which are applied to the control electrode of the drive tube 2950. These pulses produce two complete cycles of operation of the counting chain 2900 so that two pulses are coupled to the control electrode of the drive tube 2810 in the tens minutes counting chain 2800. These two pulses render the "20" manifesting tube 2840 conductive. The six remaining pulses in the ninth group of mark pulses sequentially operate the units minutes counting ring 2900 so that the "6" manifesting tube 3050 is rendered conductive. Accordingly, at this time a single tube in the tens minutes counting chain 2800 and a single tube in the units minutes counting ring 2900 are selectively rendered conductive to manifest the duration of the toll call, i.e., twenty-six minutes.

In addition to operating the elapsed time counter 3000, the group of twenty-six mark pulses representing the duration of the toll call operates the cost computer 39. More specifically, each time that the drive tube 2950 in the units minutes counting ring 2900 is operated, a positive pulse is coupled over the conductor 2951 to the control electrode of the drive tube 3110 in the base time counter 3100. The first three pulses applied thereto sequentially advance the counter 3100 so that, at the end of the third pulse, only the "3" minute manifesting tube 3170 is in a conductive condition. During the recording of duration information on the magnetic tape 1601, it is possible for the first duration pulse to be recorded thereon after an elapsed time of merely a few seconds and, in order to prevent the subscriber from being charged for a full one minute increment of elapsed time, the gate tube 3250 in the cost computer 39 is not fired to render the units cents counter 3300 responsive to the duration impulses until four mark pulses defining a full three minute base time increment have been received by the base time counter 3100. Accordingly, when the fourth mark pulse is supplied, the "3" minute manifesting tube 3170 is extinguished to supply a positive pulse through a coupling condenser to the control electrode of the gate tube 3250, thereby firing this tube to provide a positive enabling potential across the resistor 3281 for the control electrode of the drive tube 3280 in the units cents counter 3300.

When the fifth pulse in the group is applied to the drive tube 2950 in the units minutes counting ring 2900, the drive tube 3280 is rendered conductive to extinguish the "0" manifesting tube 3310 in the units cents counter 3300, which was primed into a conductive condition, as described above. Extinguishing the "0" manifesting tube 3310 fires the "5" manifesting tube 3330. When the sixth pulse is applied, the "5" manifesting tube 3330 is extinguished and the "0" manifesting tube 3350 is fired. Extinguishing the "5" manifesting tube 3330 provides a positive pulse which is coupled to the control electrode of the drive tube 3120 in the tens cents counter 3125, thereby extinguishing the "1" manifesting tube 3180 therein, which was primed into a conductive condition, as described above. Extinguishing the tube 3180 provides a positive pulse which fires the "2" manifesting tube 3185 in the tens cents counter 3125. Accordingly, the application of two mark pulses following the subtraction of the base time interval from the group of mark pulses pertaining to the duration of the call adds a ten cent increment to the initial charge primed into the cost computer 39 by advancing the tens cents counter 3125 to a condition representing a tens cents digit "2" and by advancing the units cents counter 3300 to a condition representing a units cents digit "0."

Thereafter, the remaining twenty mark pulses are supplied to the cost computer 39 to advance the units cents counter 3300 to a condition in which the "0" manifesting tube 3350 is in a conductive condition, to advance the tens cents counter 3125 to a condition in which the "2" manifesting tube 3185 is in a conductive condition, and to advance the units dollars counter 3305 to a condition in which the "1" manifesting tube 3390 is in a conductive condition. Considered jointly, these tubes provide a manifestation of a total charge of $1.20 which is to be assessed for the toll call. This represents the initial charge of ten cents which is to be assessed for the base time period of three minutes represented by the first four mark pulses on the tape 1601 and an overtime charge of $1.10 which is to be assessed at the rate of five cents for each one minute of overtime represented by the remaining twenty-two pulses in the group.

The space pulse following the ninth group of mark pulses energizes the steering circuit 37 to remove the positive potential from the conductor 2485 and to apply this potential to the conductor 2493 so that the tens hours counting chain 3500 in the tens and units hours counter 3600 is rendered responsive to receive the tenth group of mark pulses. As shown in Fig. 80 of the drawings, this tenth group of mark pulses includes a single mark pulse so that, in response to the application thereof to the control electrode of the drive tube 3510, the "0" manifesting tube 3530 is rendered conductive to electronically manifest "0" tens hours. Thereafter, the space pulse immediately following the tenth group of mark pulses is applied to the steering circuit 37 to remove the positive bias from the conductor 2493 and to apply a positive bias to the conductor 2495 thereby rendering the units hours counting chain 3700 responsive to the eleventh group of mark pulses. This eleventh group of mark pulses includes three pulses and operates the counting chain 3700 so that the "2" manifesting tube 3650 is rendered conductive to electronically manifest the digit "2."

Thereafter, the space pulse following the eleventh group of mark pulses removes the positive potential from the conductor 2495 and applies a positive potential to the conductor 2525 to render the tens minutes counting chain 3800 in the tens and units minutes counter 3900 responsive to the twelfth group of mark pulses. This twelfth group of mark pulses includes two pulses so that the "1" manifesting tube 3840 is rendered conductive. Thereafter, the space pulse following the twelfth group of mark pulses operates the steering circuit 37 to remove the positive voltage from the conductor 2525 and to apply a positive potential to the conductor 2545 thereby rendering the units minutes counting chain 4000 responsive to the thirteenth group of mark pulses. The thirteenth group of mark pulses, in the assumed call illustrated in Fig. 80 of the drawings, includes eight discrete pulses which, when applied to the control electrode of the drive tube 3930, render the "7" manifesting tube 4050 conductive.

The space pulse preceding the fourteenth group of mark pulses operates the steering circuit 37 to remove the positive potential from the conductor 2545 and to apply a positive potential to the conductor 2565 thereby rendering the months counter 4200 responsive to the fourteenth group of mark pulses. This group of mark pulses contains six discrete pulses so that the "6" manifesting tube 4330 in the units months counting ring 4300 is rendered conductive. Since the 14th group of mark pulses does not include a number of pulses greater than nine, the normal conductive "00" manifesting tube 4120 remains conductive so that, when considered together, the conductive tubes 4120 and 4330 manifest the coded designation of the month June, i.e., "06."

The space pulse preceding the fifteenth group of mark pulses removes the positive potential from the conductor 2565 and applies positive potential to the conductor 2585 thereby to render the tens days counting chain 4400 in the tens and units days counter 4500 responsive to the fifteenth group of mark pulses. This group of mark pulses includes three discrete pulses and successively operates the counting chain 4400 to render the "2" manifesting tube 4450 conductive. The space pulse following the fifteenth group of mark pulses operates the steering circuit 37 to remove the biasing potential from the conductor 2585 and to apply this potential to the conductor 2595 thereby to render the units days counting chain 4600 responsive to the sixteenth or last group of mark pulses shown on the tape segment 1601a. This group of pulses includes two discrete pulses so that the "1" manifesting tube 4550 is rendered conductive. When considered together, the conductive tubes 4450 and 4550 manifest the twenty-first day of the month registered in the months counter 4200.

The registration of the units day digit in the counting chain 4600 completes the registration of all of the items of information pertaining to a completed toll call. Incident to the firing of the tube 4550, the prime tube 4530 is rendered non-conductive and thereby provides a positive pulse which is coupled through the condenser 4512 to the control electrode of the call complete tube 4510. This positive pulse renders the call complete tube 4510 conductive so that ground is applied to the conductor 4515. The application of ground to the conductor 4515 operates a call complete relay 4830 to open a plurality of contacts 4831 and 4833 and to close a pair of contacts 4832.

The operation of the call complete relay 4830 in response to the firing of the call complete tube 4510 indicates to the printing control circuit 35 that all of the items of information relating to the first toll call whose information is recorded on the magnetic tape 1601 have been properly received and stored by the plurality of chains 38. This information is utilized by the printing control circuit 35 to initiate a printing cycle wherein the information stored in the plurality of storage chains 38, the cost computer 39 and the destination relay circuit 2150 is utilized to produce a single printed ticket containing the items of information pertaining to this call.

The opening of the contacts 4833 removes ground from the conductor 1943 to release the incomplete call relay 1940 in the playback control circuit 30. The locking circuit for the relay 1940 extends from the now opened contacts 4833 through the conductor 1943, the cable 1885, the closed contacts 1941 to the operating winding of the incomplete call relay 1940. The release of this relay indicates to the playback control circuit 30 that the magnetic tape 1601 in the seized recorder 25 has provided the printing control circuit 38 with adequate information to control the production of a single printed ticket. The release of the incomplete call relay 1940 prevents the operation of the alarm relay 1950 and thereby prevents this relay from disabling the playback control circuit 30 from searching for and seizing another trunk recorder 25. The incomplete call relay 1940 is not operated again during the removal of information from this seized trunk recorder 25 inasmuch as the operation of the relay 2110 in the destination relay circuit 2150 opens the contacts 2111 to prevent reoperation of the incomplete call relay 1940 until such time as another trunk recorder 25 has been seized to produce a reoperation of one of the destination relays 2120 or 2140.

The opening of the contacts 4831 disables the upper operating winding of the reset relay 4820 so that this relay cannot be operated in response to the operation of the end-of-call relay 4910. The closure of the contacts 4832 conditions an operating circuit for a first prepare-to-read relay 5020 in response to the operation of the end-of-call relay 4910.

As described hereinabove, an end-of-call code, comprising simultaneous mark and space pulses is recorded on the tape segment 1601a immediately following the sixteenth group of mark pulses. These simultaneous mark and space pulses are applied through the conductors 2070 and 2080 to the two starting electrodes of an end-of-call tube 4810. These two control electrodes are biased down so that the tube 4810 cannot be fired in response to a pulse appearing on either the space pulse conductor 2070 or the mark pulse conductor 2080. However, the simultaneous application of pulses to both of these conductors, that is, the application of an end-of-call signal renders the tube 4810 conductive.

In response to the firing of the end-of-call tube 4810, the end-of-call relay 4910 is operated through the normally closed contacts 4824 and the lower operating winding of this relay. The operation of the end-of-call relay 4910 closes the contacts 4911, 4912 and 4913 and opens the contacts 4914. The opening of the contacts 4914 removes ground from the operating winding of the clutch magnet 1204 in the seized trunk recorder 25, and thereby prevents a further advancement of the magnetic tape 1601 therein. The termination of the transmitting drive in the seized trunk recorder 25 in response to the receipt by the printing control circuit 35 of the end-of-call code prevents further information from being transferred to the steering circuit 37, the storage chains 38, and the cost computer 39 until such time as the printing control circuit 35 has utilized the previously stored information to produce a printed toll ticket.

The closure of the contacts 4913 applies ground to the operating winding of the end-of-call relay 1860 to operate this relay. The operation of the end-of-call relay 1860 in the playback control circuit 30 produces no useful function at this time.

The closure of the contacts 4912 reestablishes the locking circuit for the end-of-call relay 4910 so that this relay remains operated. The closure of the contacts 4911 applies ground through the closed contacts 4832 to the operating winding of the first prepare-to-read relay 5020 to operate this relay. Relay 5020 in operating, closes a plurality of contacts 5021, 5021a, 5021b, 5022, 5023, 5024 and 5025. The closure of the contacts 5022 operates a second prepare-to-read relay 5030 and a third prepare-to-read relay 5040.

The closure of the contacts 5023 places a low resistance shunt around the potentiometer 2740 so that the normal operating positive bias applied to the control electrodes of the plurality of counting tubes forming the storage chains 38 is reduced to such a point that these tubes are not responsive to spurious voltage pulses applied thereto. It is desirable to thus reduce the positive operating bias applied to this plurality of control electrodes to prevent the switching operations described hereinafter from operating the storage chains 38 to produce a false manifestation of the magnitude of the digits entered in each of these storage chains.

The operation of the second prepare-to-read relay 5030, closes a plurality of contacts 5031 and 5032. The operation of the third prepare-to-read relay 5040 closes a pair of contacts 5041. The closure of the contacts 5031 prepares an operating path from ground at the normally closed contacts 4821 which extends to the decoding relay circuit 7000.

The closure of the contacts 5032, 5041, 5024 and 5025 provides a direct ground shunt around the plurality of common cathode resistors provided for the plurality of counting tubes in the storage chains 38 and, as described hereinbefore, conditions this plurality of tubes for carrying a heavier current when it is desired to utilize the information electronically manifested in these storage chains. Although only a few grounding contacts have been shown, it is to be understood that the common cathode connections of all of the plurality of counting tubes forming the storage chains 38 are provided with similar contacts so that the cathodes of all of these counting tubes are connected directly to ground in response to the serial operation of the three prepare-to-read relays 5020, 5030 and 5040.

The closure of the contacts 5021a and 5021b grounds the conductors 4115 and 2813 respectively. The grounding of the conductor 2813 grounds the control electrode of the drive tube 2810 in the tens minutes counting chain 2800 of the elapsed time counter 3000, and the grounding of the conductor 4115 grounds the control electrode of the drive tube 4110 in the tens months counting chain 4100, so that these two counting chains are disabled from producing spurious indications therein in response to transient voltages which may be produced by the switching operations to be described hereinafter.

The closure of the contacts 4911 also applies ground to the conductor 3419 so that the prepare-to-read relays 3410, 3430, and 3440 in the cost computer 39 are sequentially operated to perform the functions described more fully hereinabove, wherein the cost computer 39 is conditioned for the removal of the information electronically manifested therein.

The closure of the contacts 5021, prepares an operating path for a switch relay 5010, the operation of which energizes a motor magnet 4950 for controlling the step-by-step operation of the stepping switch 5100.

Accordingly, the sequential operation of the three prepare-to-read relays 5020, 5030 and 5040 conditions the plurality of storage chains 38 and the cost computer 39 for the removal of information therefrom for use in producing a toll ticket containing all of the items of information electronically manifested therein. In addition, the operation of the first prepare-to-read relay 5020 completes a path for energizing the switch relay 5010 and the motor magnet 4950 of the stepping switch 5100 so that the items of information in the storage chains 38 and the cost computer 39 may be sequentially removed to operate the decoding relay circuit 7000 and the internal printer control circuit 7100.

At this time, the printing control circuit 35 has completed all of the necessary operations preparatory to initiating sequential operation of the stepping switch 5100 to successively transfer the registered items of information to the decoding relay circuit 7000 wherein the information is translated into the selective operation of one or a group of control elements in the internal printer control circuit 7100 which controls the operation of the printer 36. In general, the stepping switch 5100 is advanced in a step-by-step manner under the control of the motor magnet 4950 which is intermittently energized by the internal printer control circuit 7100. This control circuit energizes the motor magnet 4950 at fixed intervals of time to step the switch 5100 into engagement with the contacts forming different stepping positions so that the registered information is sequentially transferred to the decoding relay circuit 7000. The decoding relay circuit 7000 translates the information, which is registered in the storage chain 38 and the cost computer 39 in a decimal numerical form, into a coded form adapted for controlling the operation of the printer 36.

*Stepping switch 5100*

The stepping switch 5100 includes a plurality of contact decks 5420, 5440, 5800, 5820, 5840, 6200, 6220, 6240, 6600, 6620, and 6640, the contacts of which are engaged by the wipers 5430, 5450, 5810, 5830, 5850, 6210, 6230, 6250, 6610, 6630 and 6650, respectively. The banks 5440, 5800, 5820, 5840, 6200, 6220, 6240, 6600, 6620, and 6640 are used for transmitting information to the decoding relay circuit 7000 and are designated as "1" to "9," inclusive, and "0." The contact bank 5420 is used for control purposes as will be described hereinafter. Each of the information transmitting contact banks includes 42 contacts points or stepping positions in which the first of these acts as a home position. Since each of the 42 contact points in each of the contact decks is sequentially engaged by its associated wiper, the 42 contact points provide means for transmitting 42 separate items of information to the decoding relay circuit 7000, and, consequently, to produce 42 different printing or control operations by the printer 36.

As disclosed in Figs. 74 and 75 of the drawings, all of the contacts in each of the stepping positions of the switch 5100 are connected to the same source of information. For instance, in the fifth stepping position of the switch 5100, the fifth contact in each of the plurality of information transmitting contact banks is connected to the output anode of one of the counting tubes forming the counting chain 2600 wherein is registered the first digit of the calling subscriber's directory number. More particularly, the fifth contact in the first contact bank, i.e. bank 5440, is connected to the "1" manifesting tube 2680, and the fifth contact in the second contact bank, i.e. bank 5800, is connected to the "2" manifesting tube 2680 in the counting chain 2600. In a like manner, the fifth contacts in the third, fourth, fifth, sixth, seventh, eighth, ninth and zero contact banks, are connected to like designated manifesting tubes in the counting chain 2600. Therefore, when the wipers move into engagement with the ten contacts in the fifth stepping position of the switch 5600, the output of all of the counting tubes forming the counting chain 2600 are interconnected with the wipers of the stepping switch 5100. Since only a single tube is energized in any of the storage chains 38 at any given time, one of the contacts in the fifth stepping position is grounded so that ground is applied to the wiper in engagement therewith for the purpose of operating a relay in the decoding relay circuit 7000.

Certain of the contacts in the plurality of contact banks associated with the stepping switch 5100 are not provided with information from either the cost computer 39 or the plurality of storage chains 38. For instance, as shown in Fig. 74 of the drawings, it is desired to insert a carriage return operation of the printer 36 before producing a printed indication of the first digit of the directory number of the calling subscriber. Therefore, the fourth contacts in the second and fourth contact banks are wired directly to ground so that ground is applied to the wipers 5810 and 5850. The selective grounding of these two wipers controls the decoding relay circuit 7000 and the internal printer control circuit 7100 to produce a carriage return operation in the printer 36.

Other information such as the alphabetical designation of the called exchange, is coupled to the stepping switch 5100 by the selective operation of one of the destination relays 2120 or 2140. As described hereinabove in detail, the operation of one of these destination relays grounds a plurality of conductors and these conductors extend to contacts in the tenth and eleventh stepping positions of the switch 5100 (Fig. 74). In one of the examples shown, wherein the called exchange is designated by the alphabetical characters "EB," the tenth contacts in the first and ninth contact banks, i.e., contact bank 5440 and 6620, are grounded. In the eleventh stepping position, i.e., the eleventh contacts in the first and sixth contact banks, i.e., bank 5440 and 6220, are grounded. These grounded contacts operate the decoding relay circuit 7000 and the internal printer control circuit 7100 to operate the printer 36 to produce the character "E" and "B" when the wipers of the switch 5100 sequentially engage the contacts forming the tenth and eleventh stepping position.

In summary, therefore, the stepping switch 5100 together with its associated circuitry provides a means for selectively interconnecting the decoding relay circuit 7000, with the plurality of sources of information pertaining to a single toll call. The stepping switch 5100 selectively interconnects the decoding relay circuit 7000 with the cost computer 39, the storage chains 38, the destination relay circuit 2150, and selectively grounded contacts in the contact banks of the stepping switch 5100.

*Decoding relay circuit 7000*

The decoding relay circuit 7000 is interposed between the stepping switch 5100 and the internal control circuit 7100 of the printer 36. The purpose of the decoding relay circuit 7000 is to convert the information registered in the storage chains 38 and the cost computer 39 in a decimal numerical form into the selective operation of one or more of a plurality of permutation slide operating magnets 7110, 7120, 7130, 7140, 7150, 7160 and 7170 to control the operation of the printer 36. The decoding relay circuit 7000 in addition to receiving items of information from the storage chains 38 and the cost computer 39 receives certain information which is wired into the banks of contacts associated with the stepping switch 5100 and also utilizes this information to produce a selective operation of one or more of the plurality of permutation slide operating magnets in the control circuit 7100.

The decoding relay circuit 7000 decodes this information by selectively operating one or more of the relays comprising this circuit to selectively prepare one or more circuits extending to the magnets 7110, 7120, 7130, 7140, 7150, 7160 and 7170. The decoding relay circuit also completes a circuit for extending ground from the printing control circuit 35, through a portion of the internal printer control circuit 7100 to the prepared paths for operating the permutation slide magnets 7110, 7120, 7130, 7140, 7150, 7160 and 7170.

The decoding relay circuit 7000 includes a plurality of decoding relays 6700, 6710, 6720, 6730, 6740, 6900, 6910, 6920, 6930 and 6940 which are connected to the wipers 5450, 5810, 5830, 5850, 6210, 6230, 6250, 6610, 6630 and 6650 through a plurality of contacts 6715, 6815, 6825, 6835, 6945, 6905, 6915, 7025, 7035 and 7045, respectively. The operating windings of all of these decoding relays are connected at one side to grounded battery so that, when ground is applied to the wiper connected to the other side of these winding, these relays are operated.

As shown in Fig. 73 of the drawings, only a single decoding relay in the circuit 7000 is operated in response to information representative of a numerical character. Since all of the information stored in the plurality of storage chains 38 and the cost computer 39 is of a numerical nature, and since each of the numerically designated tubes therein is connected to like positioned contacts in different contact banks associated with the stepping switch 5100, a single decoding relay representative of a particular digit is operated in response to the movement of its associated wiper into engagement with a contact which is connected to a conductive tube in one of the storage chains 38 or the cost computer 39.

As disclosed in Fig. 73 of the drawings, more than one of the relays in the decoding circuit 7000 is operated in response to information represenative of either an alphabetical character or a control operation. It is possible to operate two of the relays in the decoding relay circuit 7000 in response to information representative of alphabetical characters or control operations inasmuch as this information is not received from one of the storage chains 38 or the cost computer 39, but is provided by prewiring certain of the contacts associated with the stepping switch 5100 to ground, or by selectively grounding these contacts under the control of the destination relays 2120 and 2140.

The decoding relay 6700, in operating, closes two pairs of contacts 6701 and 6702. The closure of the contacts 6701 connects the ground provided by the operation of the switch relay 5010 to a normally closed pair of contacts 7201 in the internal printer control circuit 7100. The closure of the contacts 6702 conditions a circuit for applying ground from a clutch contact 7250 through the contacts 6702 to the permutation slide operating magnet 7110.

The selective operation of the relays 6710, 6720, 6730, 6740, 6900 and 6910 selectively closes a group of circuit conditioning contacts 6711, 6721, 6731, 6741, 6901 and 6911, and a plurality of contacts 6712, 6722, 6732, 6942, 6902 and 6912, for preparing circuits for operating the slide magnets in the circuit 7100. The operation of the relay 6920 closes a pair of ground circuit conditioning contacts 6921 and a plurality of permutation slide controlling contacts 6922 and 6923. The decoding relay 6930, in operating, closes a pair of ground circuit conditioning contacts 6931 and a plurality of slide magnet operating contacts 6932 and 6933. The decoding relay 6940, in operating, closes a single pair of ground circuit conditioning contacts 6941 and a plurality of permutation slide magnet controlling contacts 6942 and 6943. Therefore, the operation of any one of the decoding relays 6700, 6710, 6720, 6730, 6740, 6900 and 6910 closes one pair of ground circuit conditioning contacts and one pair of slide magnet operating contacts, whereas the operation of any one of the three decoding relays 6920, 6930 and 6940, in addition to closing a single pair of ground circuit conditioning contacts, closes two pairs of contacts completing circuits extending to two permutation slide operating magnets in the control circuit 7100.

Accordingly, the decoding relay circuit 7000 converts information electronically manifested in the storage chains 38 and the cost computer 39 in the form of a decimal numerical notation into the selective conditioning of circuits for simultaneously operating one or more of the permutation slide operating magnets. Also, this decoding circuit translates information prewired to the banks of contacts of the stepping switch 5100 or manifested by contacts selectively grounded under the control of the destination relays into the selective operation of one or more than one decoding relay resulting in the operation of one or more of the permutation slide magnets in the internal printer control circuit 7100.

*Internal printer control circuit 7100*

The printer 36 utilized in the toll ticketing facilities is similar to conventional electric typewriters which may be selectively operated under the control of either a manual keyboard or a plurality of permutation slides. As shown, the printer 36 is selectively operated under the control of the plurality of permutation slides 7110, 7120, 7130, 7140, 7150, 7160 and 7170 to provide a plurality of printed tickets such as a ticket 7900 (Fig. 79), each of which include among others the items of information pertaining to one toll call which are selectively registered in the storage chains 38 and the cost computer 39, and thereafter, transmitted through the stepping switch 5100 and the decoding relay circuit 7000.

The printer 36 includes an internal control circuit 7100 (Fig. 71 and 72) which not only selectively prints the desired characters under the control of the registered information, but also controls the intermittent movement of the stepping switch 5100 so that the information is only transferred to the printer 36 at a speed at which this printer is able to utilize the information to produce a printed record. In general, the printer 36 includes seven permutation slides which are selectively operated under the control of the plurality of permutation slide operating magnets 7110, 7120, 7130, 7140, 7150, 7160 and 7170. These operating magnets are selectively energized under the control of the decoding relay circuit 7000 and when energized, release their respectively controlled permutation slides so that these slides move into released positions under the control of a spring means.

Simultaneously with operating a selected number of these permutation slide operating magnets, a clutch magnet 7180 is energized to engage a one revolution clutch. The operation of this clutch engages a drive roll (not shown) with a motor (not shown) so that this drive roll makes a single complete revolution before being declutched. During this complete cycle of rotation, the drive roll actuates a conventional type bar to print a single numerical or alphabetical character or to perform a control operation in accordance with the selective position of the permutation slides. Also during the single cycle of rotation, the drive roll mechanically returns all of the released permutation slides against the action of the spring means to a normal latched position so that these permutation slides may thereafter be selectively released to set up another character to be printed under the control of the decoding relay circuit 7000.

At the end of each cycle of revolution, a clutch cam 7190 and a read cam 7260 which are carried on the drive roll are moved to the positions shown in Figs. 71 and 72 of the drawings. In this normal position, the clutch cam 7190 closes a pair of contacts 7250 and the read cam 7260 closes a pair of contacts 7261. When the contacts 7261 are closed under the control of the read cam 7260, a circuit may be completed by the operation of the prepare-to-read relay 5020 for applying ground to the operating winding of the switch relay 5010 from a grounded and closed pair of contacts 7210b of a manually operated switch 7210 which is closed either manually or automatically to initiate operation of the printer 36. This application of ground operates the switch relay 5010 to interconnect the stepping switch 5100 with the decoding relay circuit 7000.

When the contacts 7250 are closed, ground is applied through from the contacts 7201 through a pair of contacts 7210a, the closed contacts 7250 to operate both the conditioned permutation slide operating magnets and the one revolution clutch magnet 7180. The application of ground to the contact 7201 is controlled by both the decoding relay circuit 7000, the second prepare-to-read relay 5030 and the switch relay 5010.

Since a cycle of operation of the printer 36 is initiated with the cams 7190 and 7260 in the positions shown in the drawings, the application of ground from the printing control circuit 35 through the control circuit 7100 to the decoding relay circuit 7000 grounds the selectively closed contacts therein to operate a selected group of the permutation magnets thereby to condition a particular type bar for movement under the control of the drive roll. Simultaneously with energizing the selected group of permutation magnets, the one-way clutch magnet 7180 is energized to connect the drive roll with the motor in the printer 36. The initial rotation of the drive roll opens the contacts 7261 so that the motor magnet 4950 is released and the stepping switch 5100 is advanced to advance the plurality of wipers into engagement with the contacts forming the next stepping position and to disconnect the stepping switch 5100 from the decoding relay circuit 7000.

Immediately following the opening of the contacts 7261, the cam 7190 is rotated to open the contacts 7250 whereby ground is removed from the permutation magnets and from the one-way clutch magnet. During the following revolution, the drive roll prints the selected character and returns the plurality of permutation slides to their normal locked position. Following the first quarter of the revolution, the read cam 7260 again closes the contact 7261 to operate the switch relay 5010, whereby the relays in the decoding relay circuit 7000 are operated in accordance with the information transferred thereto from the wipers of the stepping switch 5100 which are now in engagement with the contacts forming the next succeeding stepping position. The original movement of the wipers into engagement with the contacts does not operate the relays in the decoding relay circuit 7000 inasmuch as the path thereto is interrupted by the release of the switch relay 5010.

During the continuing rotation of the drive roll, the two cams 7260 and 7190 are rotated until such time as these cams are almost returned to their normal position. At this time, the clutch cam 7190 recloses the contacts 7250 so that the permutation magnets are reoperated in accordance with the information provided by the selective operation of the decoding relays in the decoding relay circuit 7000. At this time the clutch magnet 7180 is again energized so that the drive roll is connected through the one revolution clutch to the motor in the printer 36 to initiate a similar cycle of operation. It should be noted that if none of the relays in the decoding circuit 7000 are operated, ground is not applied to the clutch operating magnet 7180, as explained in more detail hereinafter. Therefore, a new cycle of operation is not initiated unless one of the relays in the decoding relay circuit 7000 is operated to indicate that an additional item of information is to be printed.

After the read cam 7260 moves past the normal or home position, in response to a reenergization of the one revolution clutch magnet 7180, the switch relay 5010 is released to interrupt the operating paths of the plurality of relays in the decoding circuit 7000 and to release the motor magnet 4950 to move the stepping switch 5100 an additional step, thereby to condition the stepping switch 5100 to transmit the next item of information to the decoding relay circuit 7000 in response to a reoperation of the switch relay 5010.

The internal printer control circuit 7100 is also provided with a carriage return relay 7200 which is selectively operated under the control of a switch 7220. The switch 7220 is closed to operate the slow-to-release relay 7200 in response to a carriage return movement of the carriage of the printer 36 wherein the carriage moves to the left marginal position. The carriage return movement of the printer 36 is also accompanied by a plurality of line feed operations whereby the tape material supplied to the printer 36 is advanced a distance equal to three lines. To insure that the operation of the printer 36 is not reinitiated until such time as the three line feed operations are completed, the relay 7200 remains operated for a time determined by its operating characteristics so that the contacts 7201 are held open. When the contacts 7201 are open, ground can not be applied to the one revolution clutch magnet 7180 or through the decoding relay circuit 7000 to the permutation slide operating magnets 7110, 7120, 7130, 7140, 7150, 7160 and 7170. Therefore, the operation of the slow-to-release relay 7200 in response to a carriage return operation insures that the paper feed operations coincident thereto are completed before the next cycle of operation of the printer 36 can be initiated.

In general, therefore, the internal printer control circuit 7100 selectively operates the printer 36 in accordance with the position of the plurality of permutation slides controlled by the magnets 7110, 7120, 7130, 7140, 7150, 7160 and 7170. The circuit 7100 includes the clutch magnet 7180 which is energized in response to the operation of one or more of the permutation slide operating magnets and, when operated, mechanically engages a one-revolution clutch so that the cams 7190 and 7260 are rotated through one complete cycle of revolution during which the selected character is printed and during which the released permutation slides are mechanically returned to their normal latched position.

As the read cam 7260 moves beyond its normal position shown in Fig. 72 of the drawings, ground is removed from the previously operated switch relay 5010 and motor magnet 4950 so that the motor magnet 4950 permits the plurality of wipers associated with the stepping switch 5100 to be moved into engagement with the contacts forming the next stepping position. After approximately one-quarter of a revolution, the switch relay 5010 and the motor magnet 4950 are operated under the control of the read cam 7260. The operation of the switch relay 5010 interconnects the wipers of the stepping switch 5100 with the operating windings of the decoding relays in the decoding relay circuit 7000 so that one or more of these relays are operated to prepare one or more paths for operating one or more of the permutation slide operating magnets in the internal printer control circuit 7100. The operation of the motor magnet 4950 prepares the wipers of the stepping switch 5100 for movement into engagement with the contacts forming the next adjacent stepping position. During the remainder of the single cycle of revolution, the drive roll prints the previously selected character and returns the permutation slides to their normal latched position. As the cam 7190 approaches its normal position shown in Fig. 71 of the drawings, ground is applied to the previously prepared circuits for operating selected ones of the slide operating magnets thereby to select the next character for printing. Also, this movement of the clutch cam 7190 applies ground to the operating winding of the clutch magnet 7180 to re-engage the one-revolution clutch for another cycle of revolution in which the internal printer control circuit 7100 operates as described above.

*Operation of the printing control circuit 35 during the printing of a toll ticket*

During the production of the toll ticket 7900 by the printer 36, the switch relay 5010 and the motor magnet 4950 are operated under the control of the internal printer control circuit 7100. The intermittent operation of these elements is initiated in response to the operation of the first and second prepare-to-read relays 5020 and 5030 which, as described hereinabove, conditions the plurality of storage chains 38 and the cost computer 39 for transmitting the information registered therein through the stepping switch 5100 to the decoding relay circuit 7000. In its normal position, the plurality of wipers associated with the stepping switch 5100 are in engagement with the contacts forming the first stepping position. Accordingly, the operation of the first prepare-to-read relay 5020 to close the contacts 5021 completes a circuit for applying ground to the operating winding of the switch relay 5010. This circuit extends from ground through the closed contacts 7210b, 7261, 5021 to and through the operating winding of the switch relay 5010 to grounded battery. The operation of the switch relay 5010 closes the contacts 6715, 6815, 6825, 6835, 6945, 6905, 6915, 7025, 7035, 7045, 5011 and 5012. The closure of the contacts other than the contacts 5011 and 5012 interconnect the wipers of the stepping switch 5100 with the operating windings of the decoding relays in the decoding relay circuit 7000.

Figure 58:
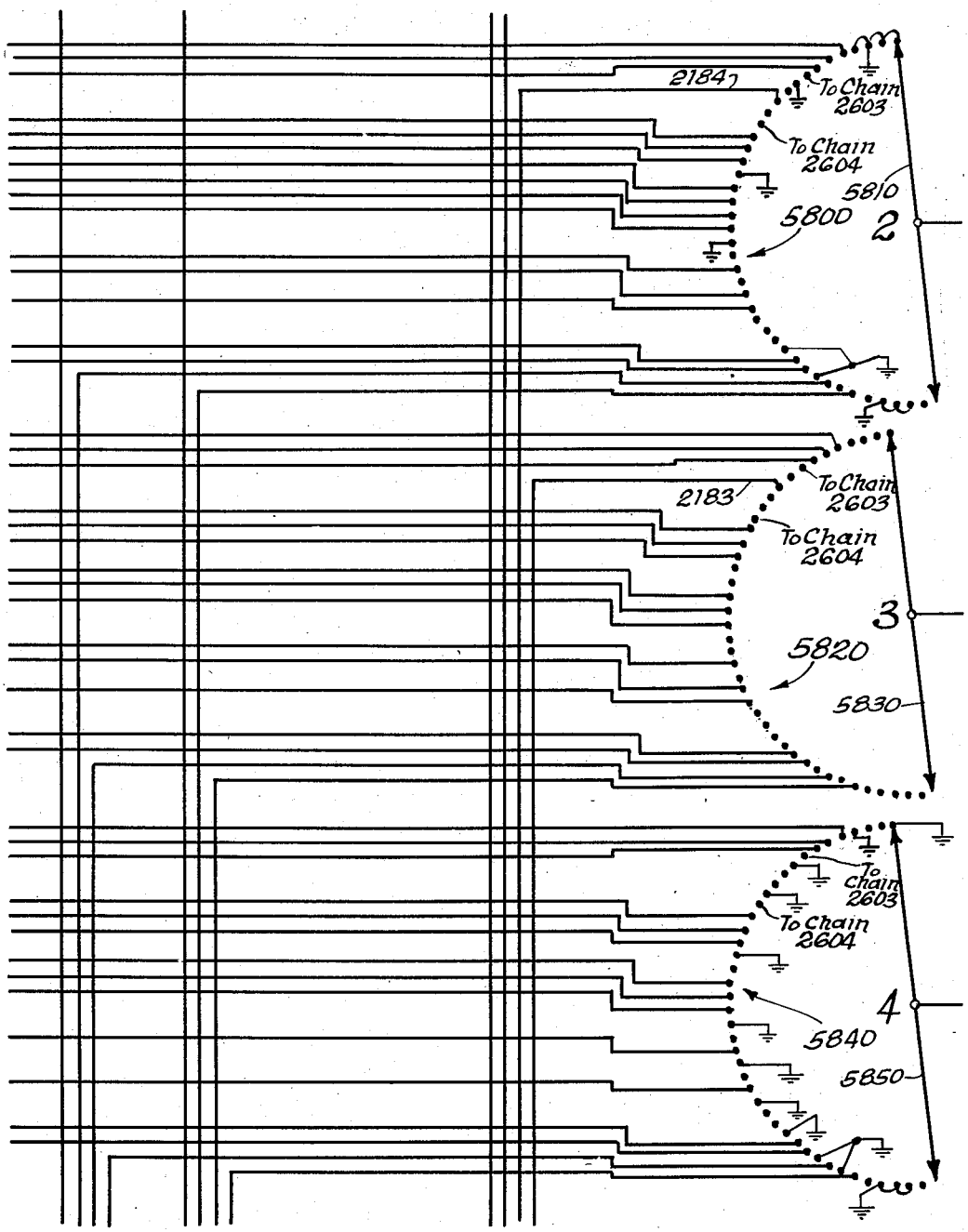
Figure 59:
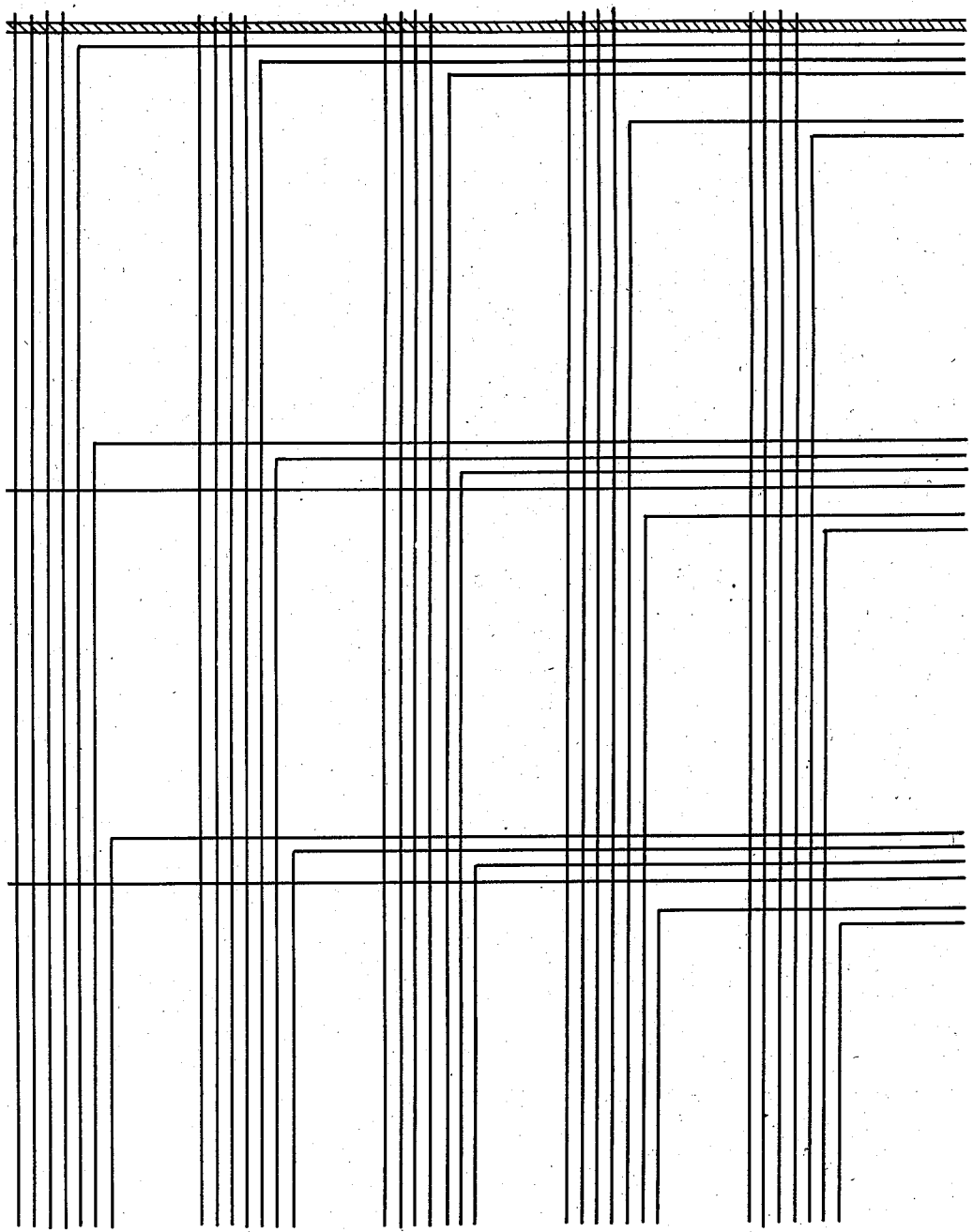
Figure 60:
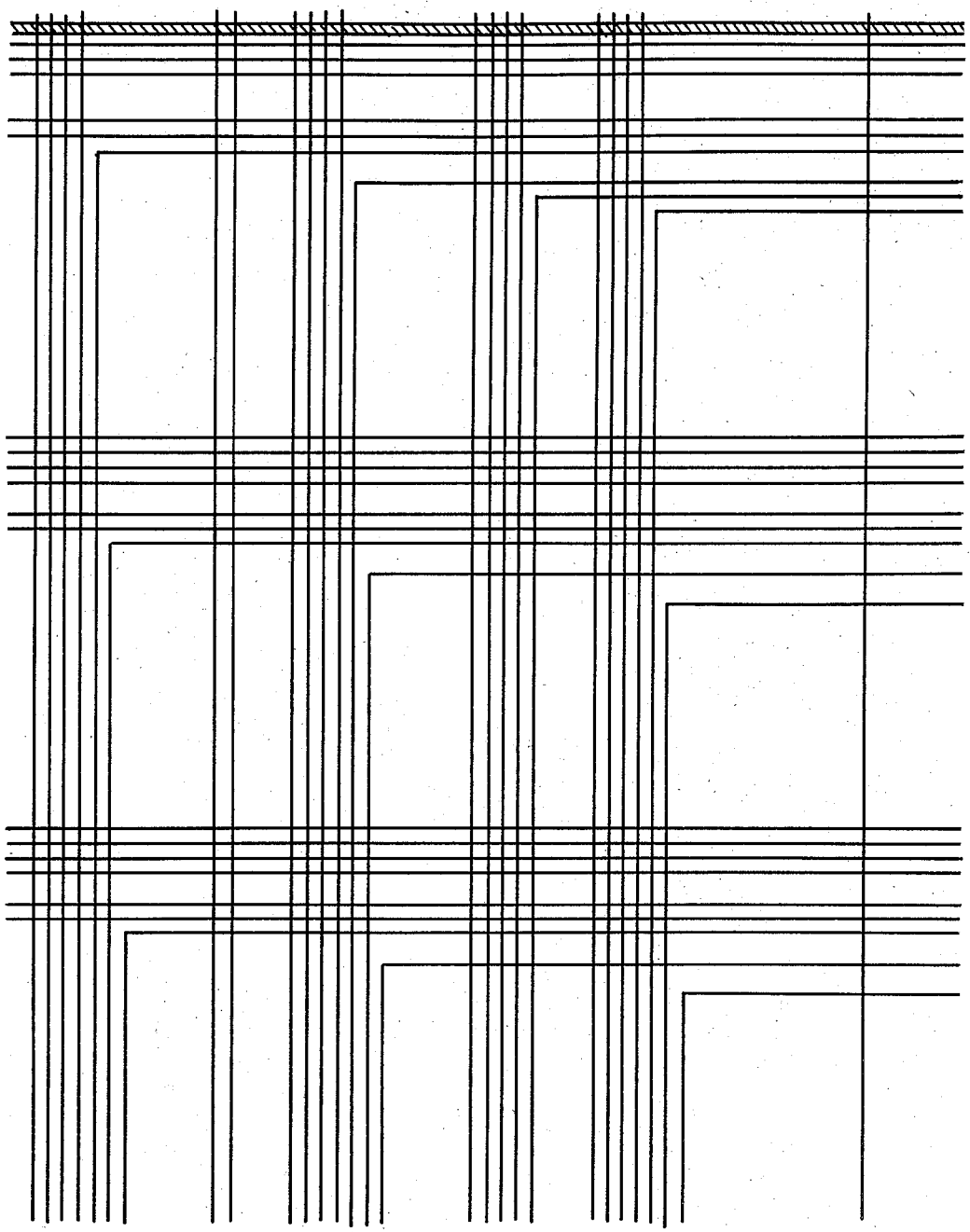
Figure 61:
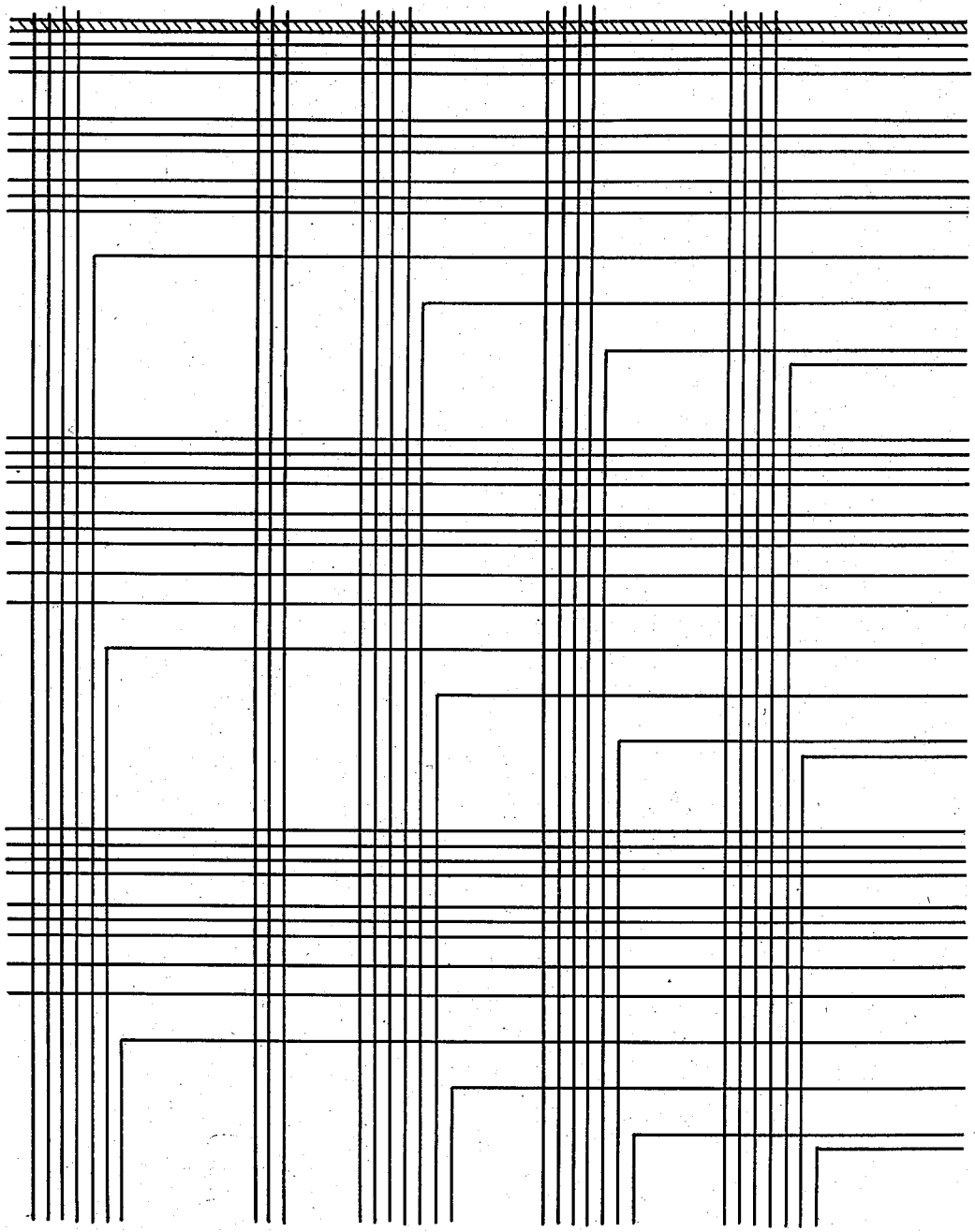

As shown in Fig. 58 of the drawings, in the first stepping position, the contacts in the second and fourth contact banks are wired directly to ground so that the wipers 5810 and 5850 are grounded. The ground applied to the wiper 5810 is transmitted through the closed contacts 6815 and is applied to the operating winding of the decoding relay 6710 to operate this relay. The operation of the relay 6710 closes the contacts 6711 and 6712. The closure of the contacts 6712 prepares a path for operating the permutation slide operating magnet 7120. The ground applied to the wiper 5850 is transmitted to the operating winding of the decoding relay 6730 through the closed contacts 6835 to operate this relay. The operation of the relay 6730 closes the contacts 6731 and 6732. The closure of the contacts 6732 prepares an operating circuit for the permutation slide operating magnet 7140.

The closure of the contacts 6711 and 6731 completes the conditioned paths for operating the magnets 7120 and 7140. This path extends from a battery conductor 7231 through the operating windings of the magnet 7120 and 7140, the closed contacts 6712 and 6732, the closed contacts 7250, 7210a, 7201, 6711 or 6731, 5031, 5012 to the normally closed and grounded contacts 4821. The operation of the magnets 7120 and 7140 releases their respectively controlled permutation slides so that, as shown in Fig. 73 of the drawings, a carriage return operation is initiated by the printer 36.

Also, the closure of the contacts 6711 and 6731 completes a circuit for energizing the clutch magnet 7180 so that the drive roll carrying the cams 7190 and 7260 is engaged with the drive motor of the printer 36 which is energized by the closure of the contacts 1933 in the playback control circuit 30. This circuit extends from the battery conductor 7231 through the operating winding of the clutch magnet 7180, the closed contacts 7250 and thence through the remainder of the circuit previously traced for operating the selected slide operating magnets 7120 and 7140. The operation of the clutch magnet 7180 initiates movement of the cams 7190 and 7260.

Referring back to the operation of the switch relay 5010, the closure of the contacts 5011 applies ground to the operating winding of the motor magnet 4950 so that this magnet is operated to condition the plurality of wipers associated with the stepping switch 5100 for movement into engagement with the contacts forming the second stepping position of this switch. The closure of the contacts 5012 completes the previously traced circuit for operating the clutch magnet 7180 and the selected permutation slide operating magnets in the internal printer control circuit 7100.

The movement of the clutch cam 7190 and the read cam 7260 initiated by the operation of the clutch magnet 7180 opens the contacts 7261 so that ground is removed from the operating winding of the switch relay 5010 thereby to release this relay to open the plurality of contacts controlled thereby. The opening of the contacts 5012 interrupts the circuits for energizing the permutation slide operating magnets 7120 and 7140 and the clutch magnet 7180. The release of the magnets 7120 and 7140 does not affect the permutation slides controlled thereby inasmuch as these slides are mechanically returned to their normal position in response to the rotation of the drive roll. The release of the clutch magnet 7180 does not affect the one-revolution clutch controlled thereby inasmuch as this clutch remains engaged until it is mechanically disengaged following the completion of a single revolution.

The opening of the contacts 5011 removes ground from the operating winding of the motor magnet 4950 so that the wipers associated with the stepping switch 5100 are moved into engagement with the contacts forming the second stepping position. However, the decoding relay circuit 7000 is not selectively operated in response to the movement of the wipers into engagement with the contacts forming the second stepping position inasmuch as this circuit is disconnected from the stepping switch 5100 by the opening of the remainder of the contacts controlled by the switch relay 5010. The opening of the remainder of the contacts controlled by the switch relay 5010 also releases the previously operated relays in the decoding relay circuit 7000.

Thereafter, the continuing rotation of the drive roll rotates the clutch cam 7190 so that the contacts 7250 are opened. The opening of the contacts 7250 produces no useful function at this time inasmuch as the prior opening of the contacts 7261 to release the switch relay 5010 interrupts all of the previously completed circuits for energizing the internal printer control circuit 7100.

After approximately one quarter of a revolution, the read cam 7260 recloses the contacts 7261 sequentially to operate the switch relay 5010 and the motor magnet 4950. As described above, the operation of the switch relay 5010 interconnects the wipers of the stepping switch 5100 with the operating windings of the decoding relays in the circuit 7000 so that these relays are selectively operated in accordance with the contacts selectively grounded in the second stepping position of the switch 5100. The operation of the motor magnet 4950 conditions the wipers in the stepping switch 5100 for movement into engagement with the contacts forming the third stepping position of this switch.

In the second stepping position (Fig. 74), the contacts in the second and ninth contact banks are grounded to represent the first alphabetical character designating the calling exchange. The ground applied to the wiper 5810 in the second contact bank is applied through the closed contacts 6815 to operate the decoding relay 6710 thereby to close the contacts 6711 and 6712. The ground applied to the wiper 6630 is transmitted to the operating winding of the decoding relay 6830 through the closed contacts 7035 to operate this relay. The operation of the decoding relay 6930 closes the contacts 6931, 6932 and 6933.

The closure of the contacts 6712 prepares an operating circuit for the permutation slide operating magnet 7120. The closure of the contacts 6932 prepares an operating path for the permutation slide operating magnet 7170. The closure of the contacts 6933 prepares an operating path for the permutation slide operating magnet 7150. The closure of either of the contacts 6711 or 6931 prepares a path for applying ground to the previously prepared paths extending to the slide magnets and also for applying ground to the operating winding of the clutch magnet 7180. Accordingly, the interconnection of the stepping switch 5100 with the decoding relay circuit 7000 prepares the decoding relay circuit 7000 for controlling the operation of the internal printer control circuit 7100 to produce a character representing the first letter designating the called exchange. At the same time as the decoding relay circuit 7000 is being thus prepared, the closure of the contacts 5011 operates the motor magnets 4950 to prepare the wipers associated with the stepping switch 5100 for movement into engagement with the contacts forming the third stepping position.

During the remaining three quarters of a cycle of revolution of the control cams 7190 and 7260, the printer 36 executes a carriage return operation to return the carriage of the printer 36 to a left marginal position and thereafter to provide three line feed operations. Accordingly, during the first cycle of revolution the information transmitted through the first stepping position of the switch 5100 is being utilized by the printer 36 and the decoding relay circuit 7000 is conditioned for operation under the control of the item of information transmitted through the contacts forming the second stepping position. The movement of the carriage of the printer 36, in response to the receipt of the carriage return code, closes the contacts 7220 so that the slow-to-release line feed relay 7200 is operated to open the contacts 7201. Opening the contacts 7201 disables the internal printer control circuit 7100 inasmuch as it interrupts the only path for applying ground from the decoding relay circuit 7000 through the internal printer control circuit 7100 and therefrom, through the prepared paths provided by the selective operation of the relays in the decoding relay circuit 7000. This interruption of ground not only prevents reoperating a new permutation of permutation magnets but also prevents the reenergization of the one revolution clutch magnet 7180, thereby insuring that the printer 36 cannot be activated until such time that the line feed relay 7200 is released. Following a suitable time delay sufficient for the printer 36 to complete three line feed operations, the slow-to-release relay 7200 releases to reclose the contacts 7201 and thereby to condition the printer 36 for an additional cycle of operation.

It is desirable to interpose the carriage return operation of the printer 36 preceding the production of any characters representing the items of information pertaining to the toll calls, inasmuch as this operation returns the carriage of the printer 36 to a proper starting position and also inserts three line feed operations to provide a proper spacing at the top of the toll ticket 7900.

Assuming that the line feeding operations incident to the carriage return operation in the printer 36 are completed prior to the time at which the clutch cam 7190 recloses the contacts 2750, this closure of the contacts 7250 applies ground to the previously conditioned circuits extending to the windings of the permutation slide magnets 7120, 7150 and 7170 to operate these magnets, and to release the permutation slides controlled thereby. The closure of the contacts 7250 also reenergizes the clutch magnet 7180 so that the drive roll is coupled to the motor for another cycle of rotation. Since neither the clutch magnet 7180 nor the conditioned permutation slide magnets can be operated until such time as the clutch cam 7190 has almost completed its cycle of rotation, a long time delay is introduced which insures the proper operation of the decoding relays in response to the information received from the stepping switch 5100. Also, since the ground applied to these conditioned permutation magnets must extend through a pair of contacts controlled by one of the decoding relays, it is impossible to actuate the internal printer control circuit 7100 prior to the time at which the decoding relay circuit 7000 has completed the translation of the information provided by the stepping switch 5100 into a form suitable for use by the printer 36.

As shown in Fig. 73 of the drawings, the release of the permutation slides controlled by the magnets 7120, 7150 and 7170 conditions a type bar carrying the alphabetical character "K" for actuation. This character is the first letter in the alphabetical designation of the exchange in which the calling subscriber is located. This information, which represents the exchange of the calling subscriber, is provided by wiring the contacts forming the second and third stepping position of the switch 5100 to ground since the playback control circuit 30 and the printer 36 are associated with only the calling exchange 7, which is assumed to be identified as "KI."

The continuing rotation of the drive roll moves the read cam 7260 beyond its normal position so that the contacts 7261 are reopened to release the switch relay 5010 and the motor magnet 4950. The release of the switch relay 5010 interrupts the energizing circuit for the decoding relays 6710 and 6930 so that these relays release and thereby deenergize the magnets 7120, 7150 and 7170. However, the permutation slides controlled by these magnets are not returned to normal inasmuch as they are returned mechanically by the operation of the drive roll during a subsequent portion of this second cycle of rotation. It is desirable to utilize contacts interposed between the decoding relays and the wipers of the stepping switch 5100 inasmuch as the circuit extending from the wipers to the decoding relays is initially interrupted at these contacts, and therefore prevents excessive arcing at the contact points of the stepping switch 5100 when the wipers are stepped into engagement with the contacts in the next stepping position.

The release of the motor magnet 4950 advances the plurality of wipers controlled thereby into engagement with the contacts forming the third stepping position. However, the movement of the wipers into engagement with the contacts in the third stepping position does not operate the decoding relay circuit 7000 at this time inasmuch as the interconnection between the stepping switch 5100 and this circuit is interrupted by the release of the switch relay 5010. Immediately following the opening of the contacts 7261, the clutch cam 7190 is rotated far enough beyond its normal position to open the clutch contacts 7250 thereby disconnecting the permutation slide magnets and the clutch magnet 7180 from the decoding relay circuit 7000.

Figure 62:
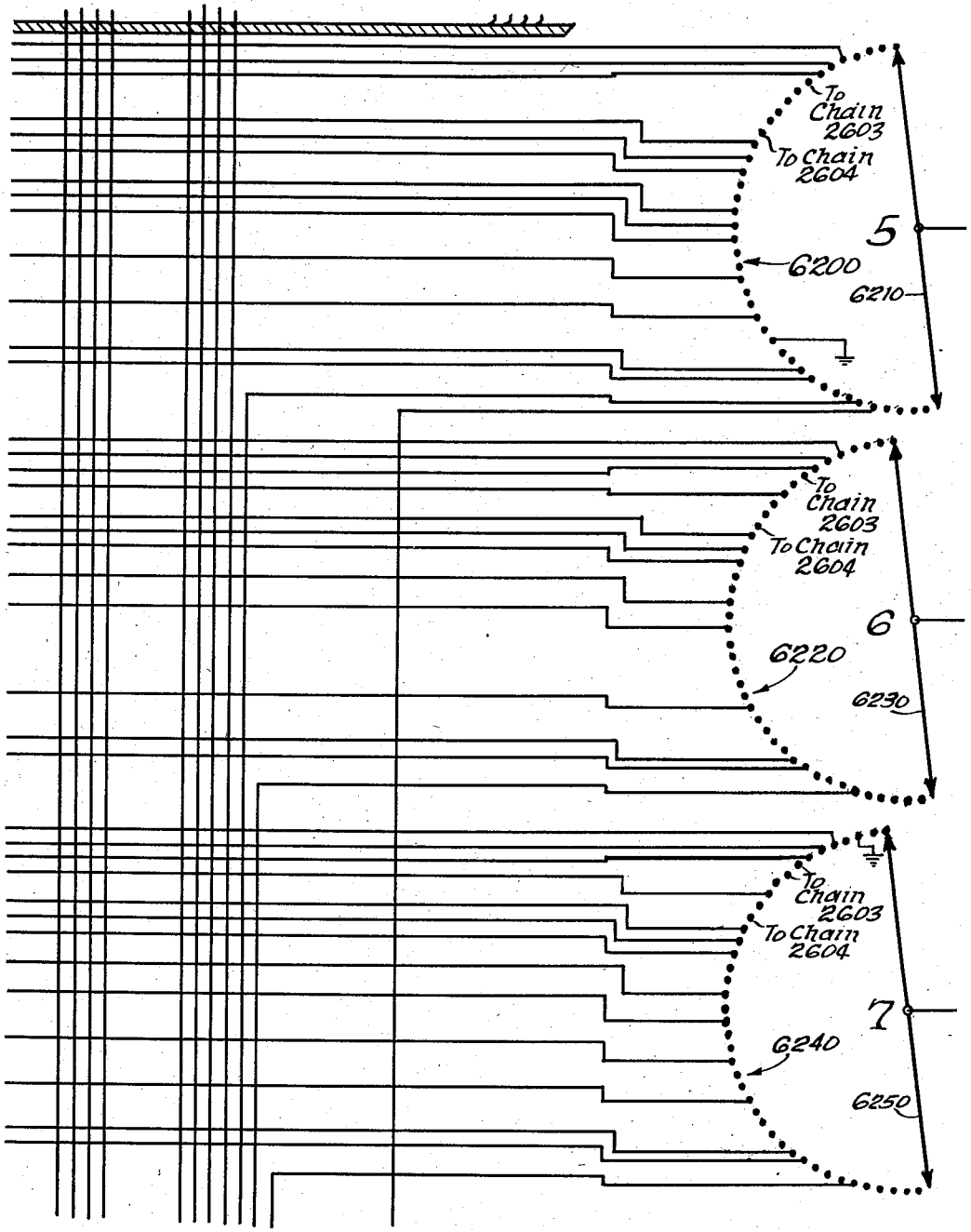
Figure 63:
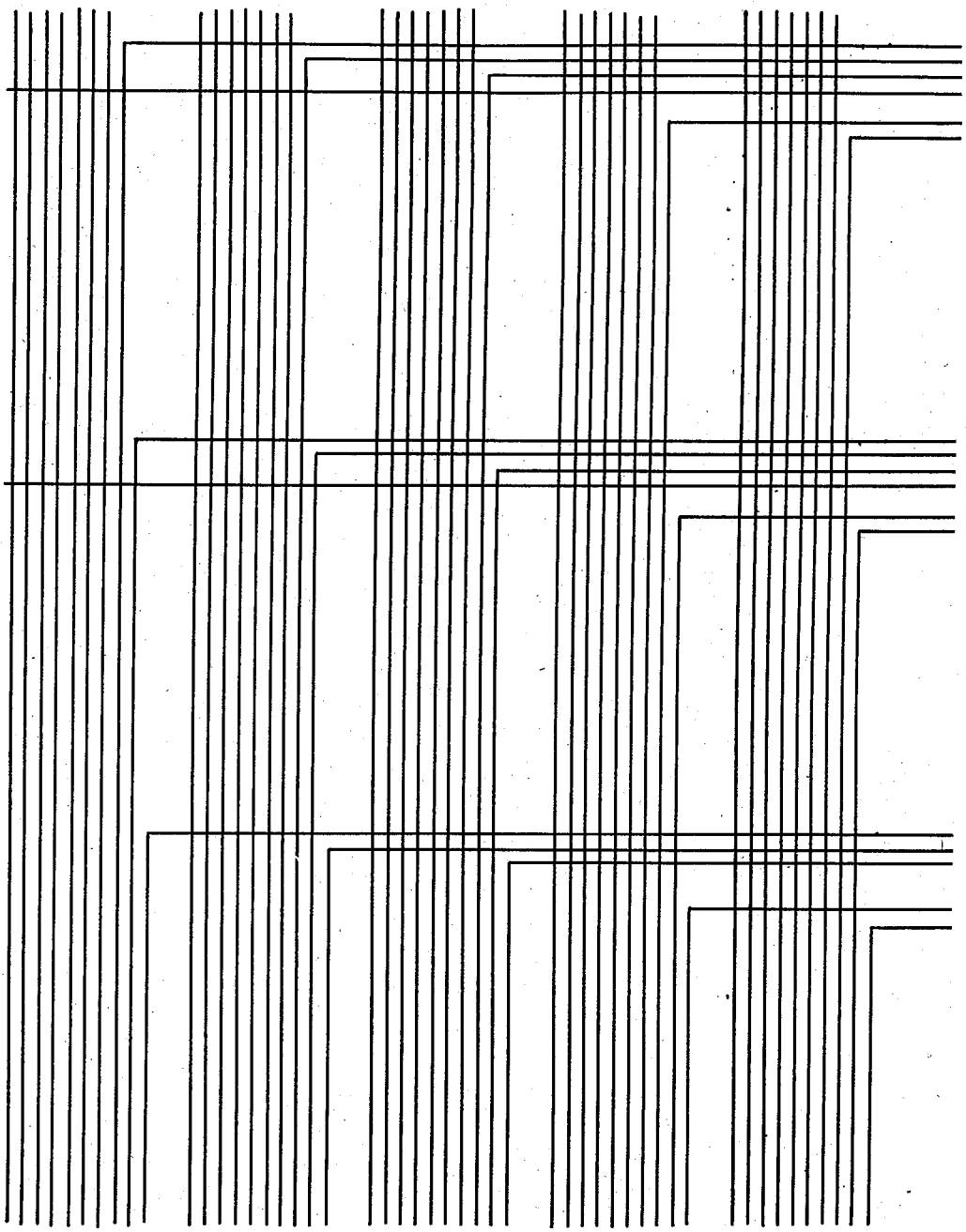
Figure 64:
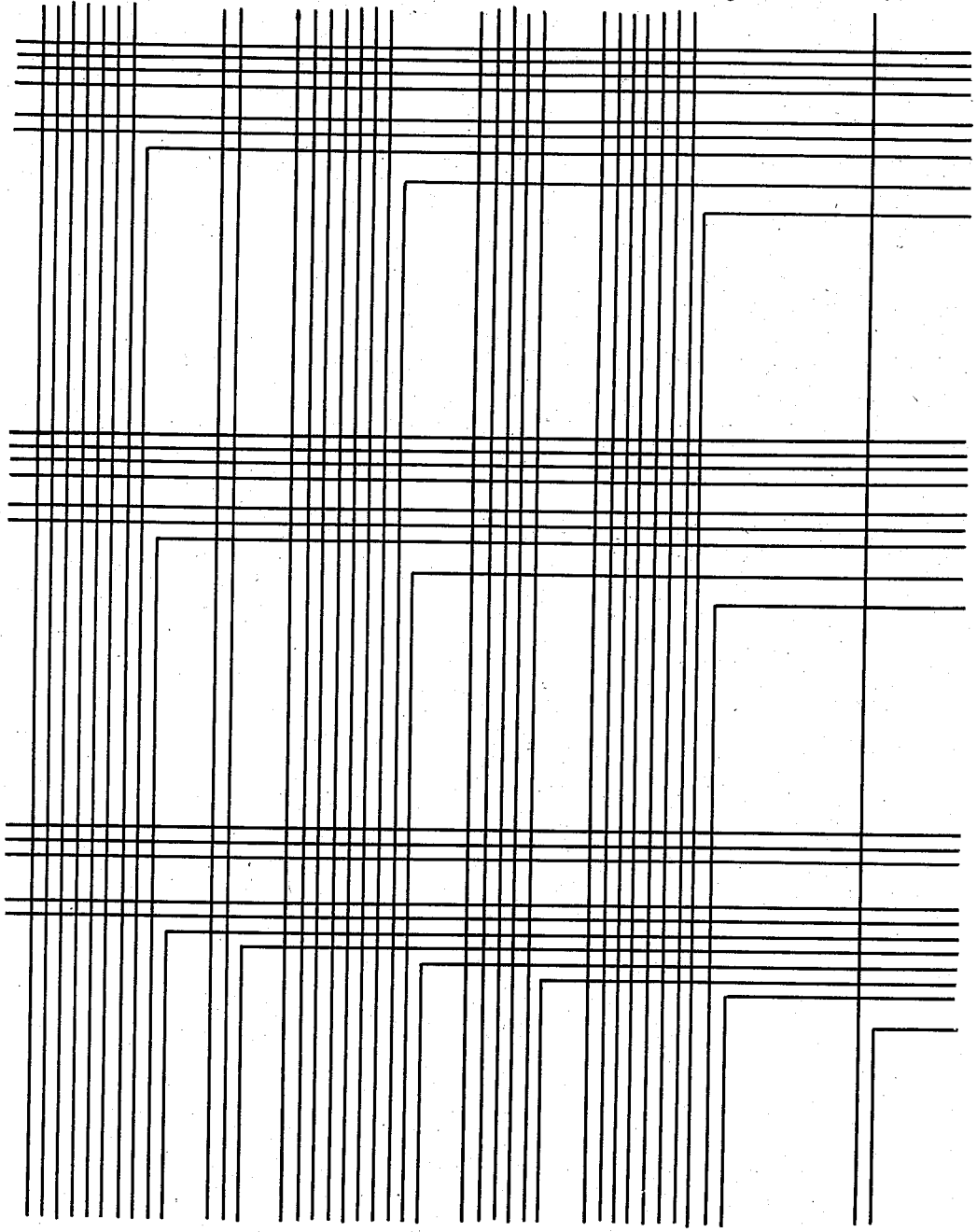
Figure 65:
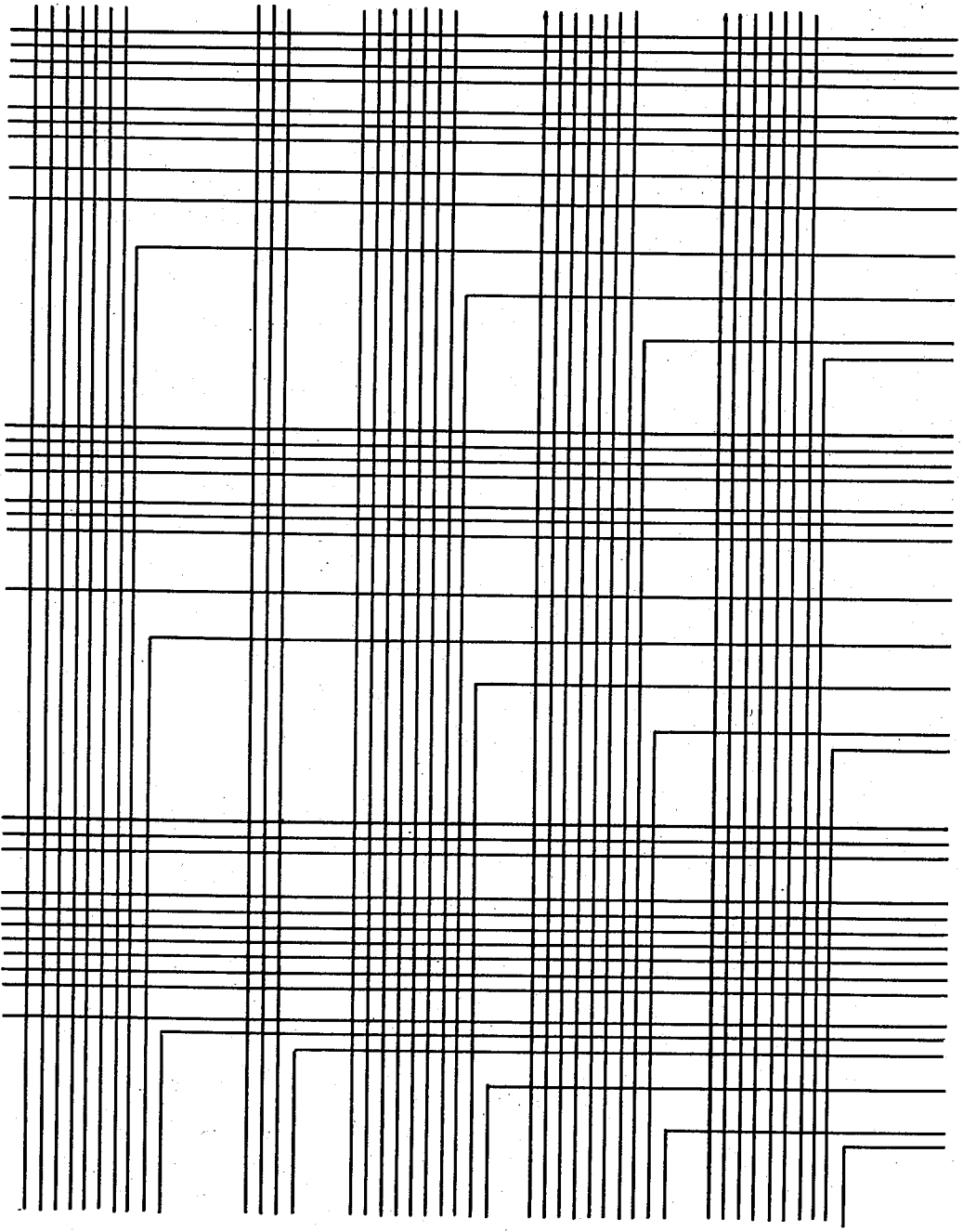
Figure 66:
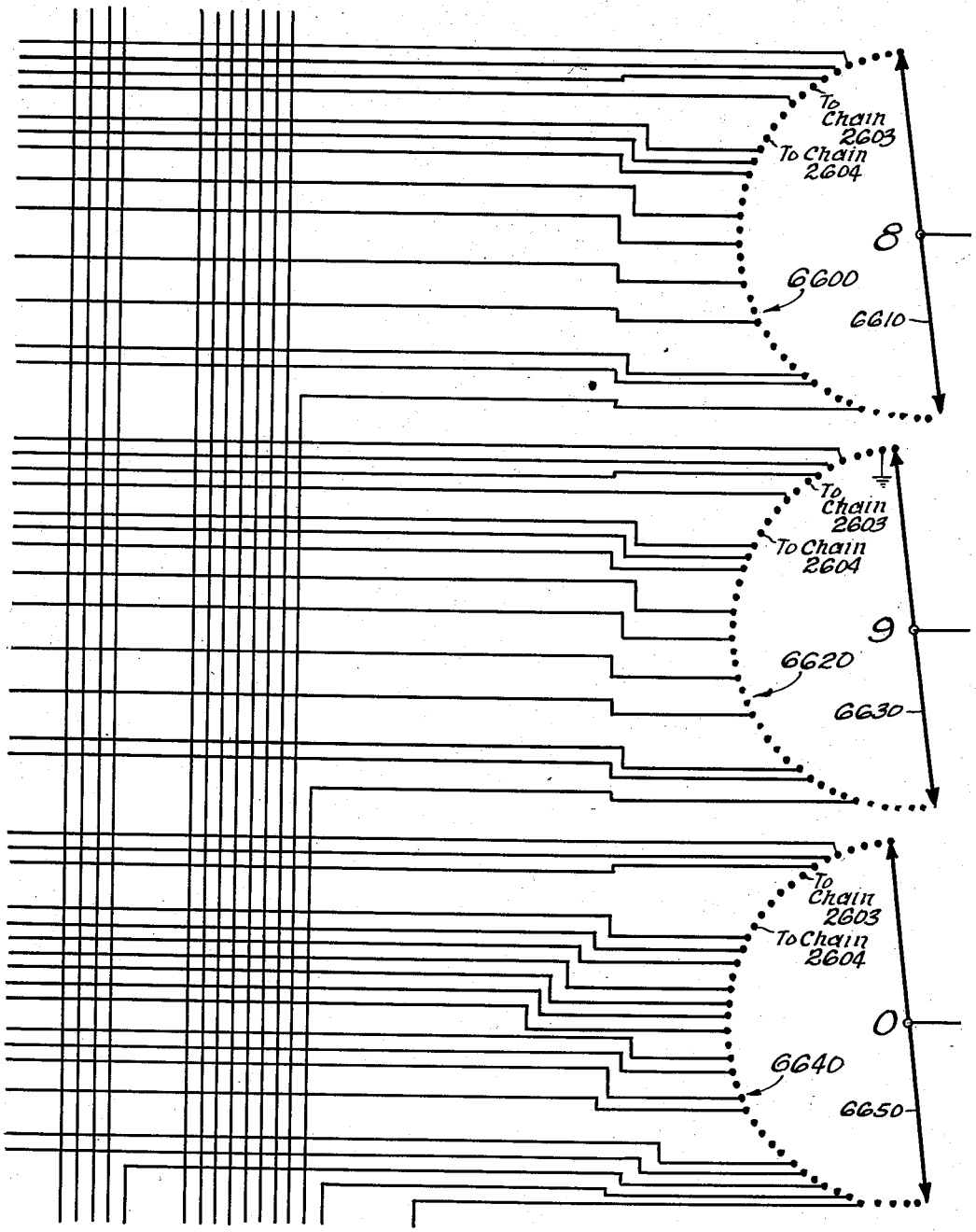
Figure 67:
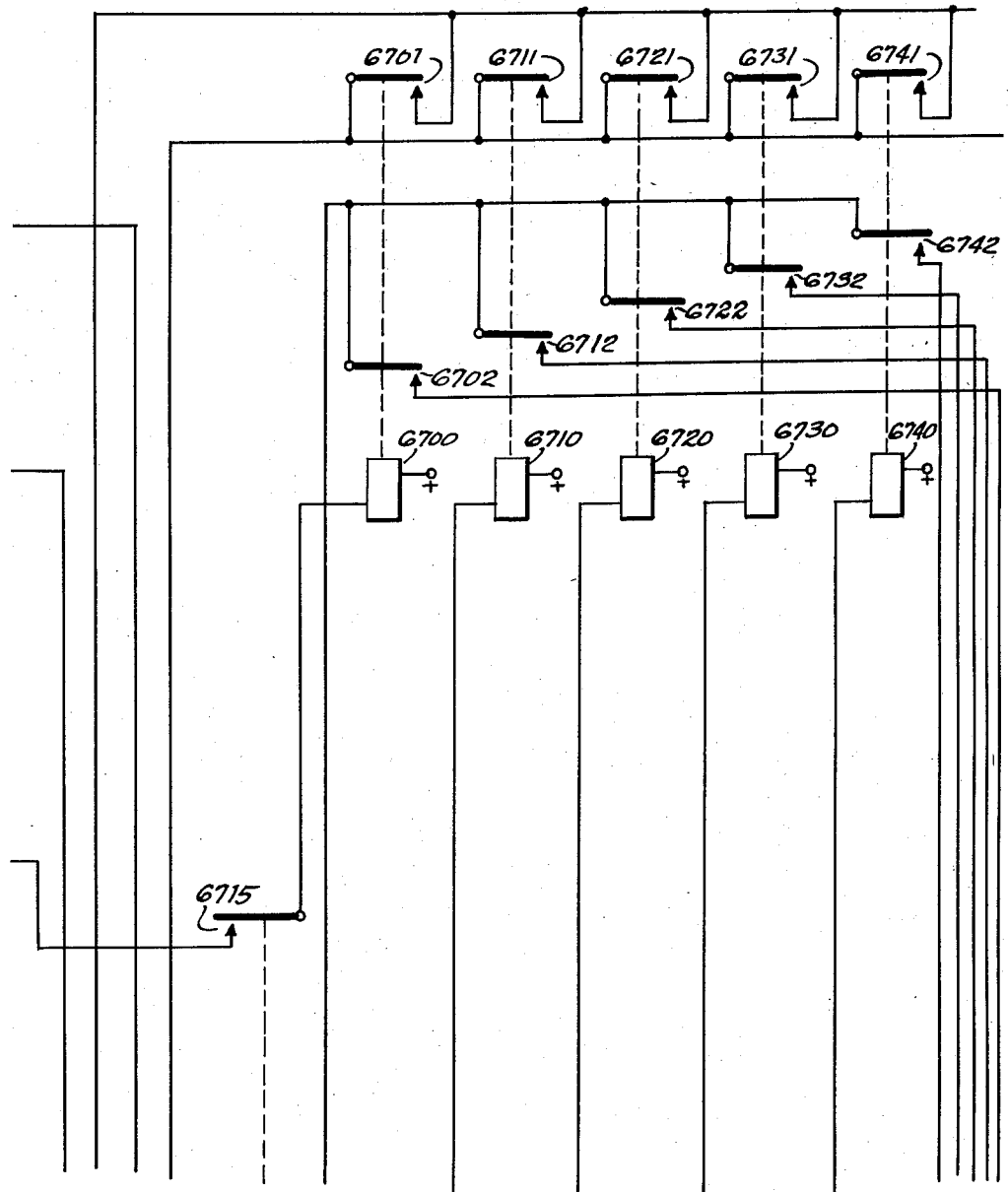
Figure 68:
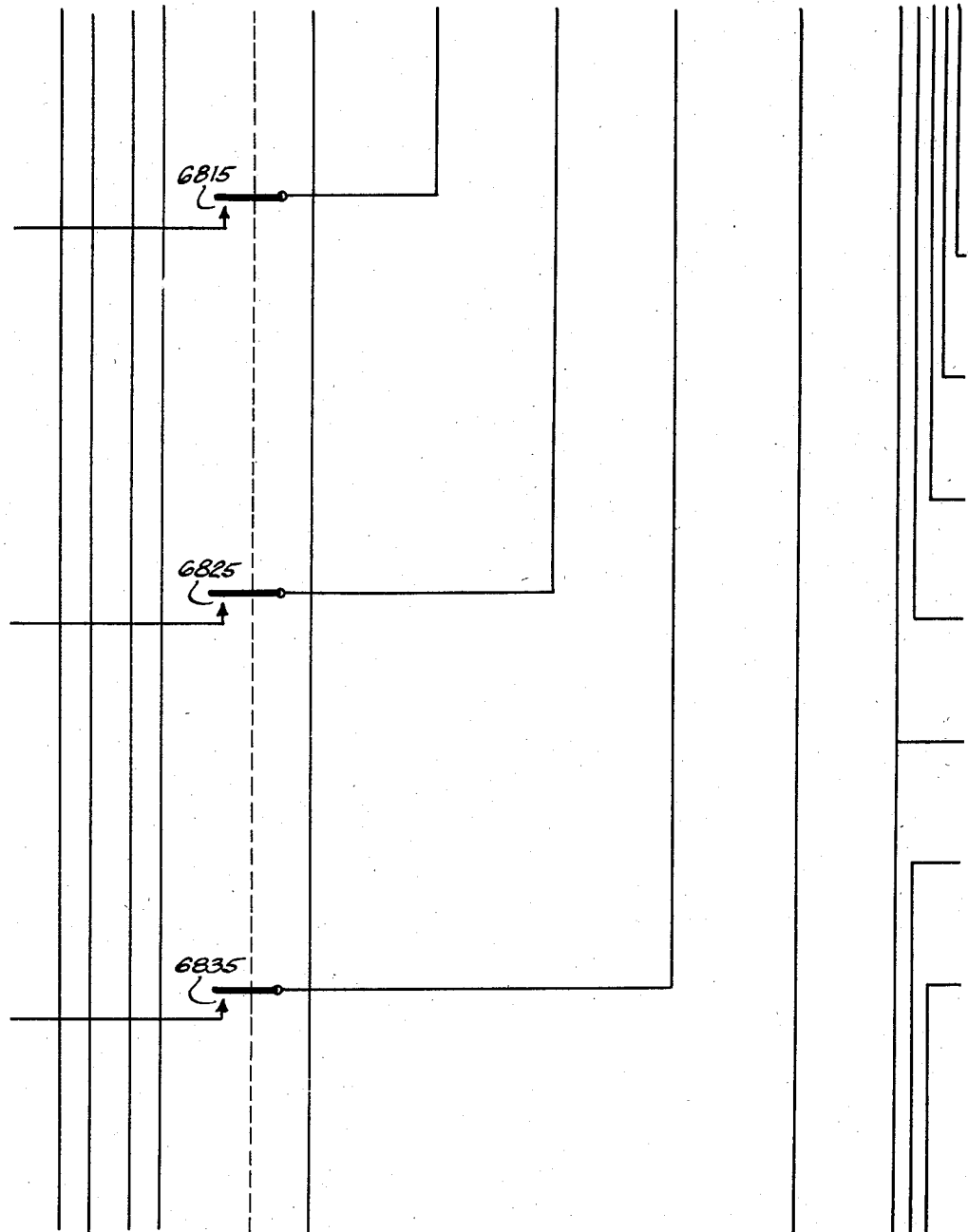
Figure 69:
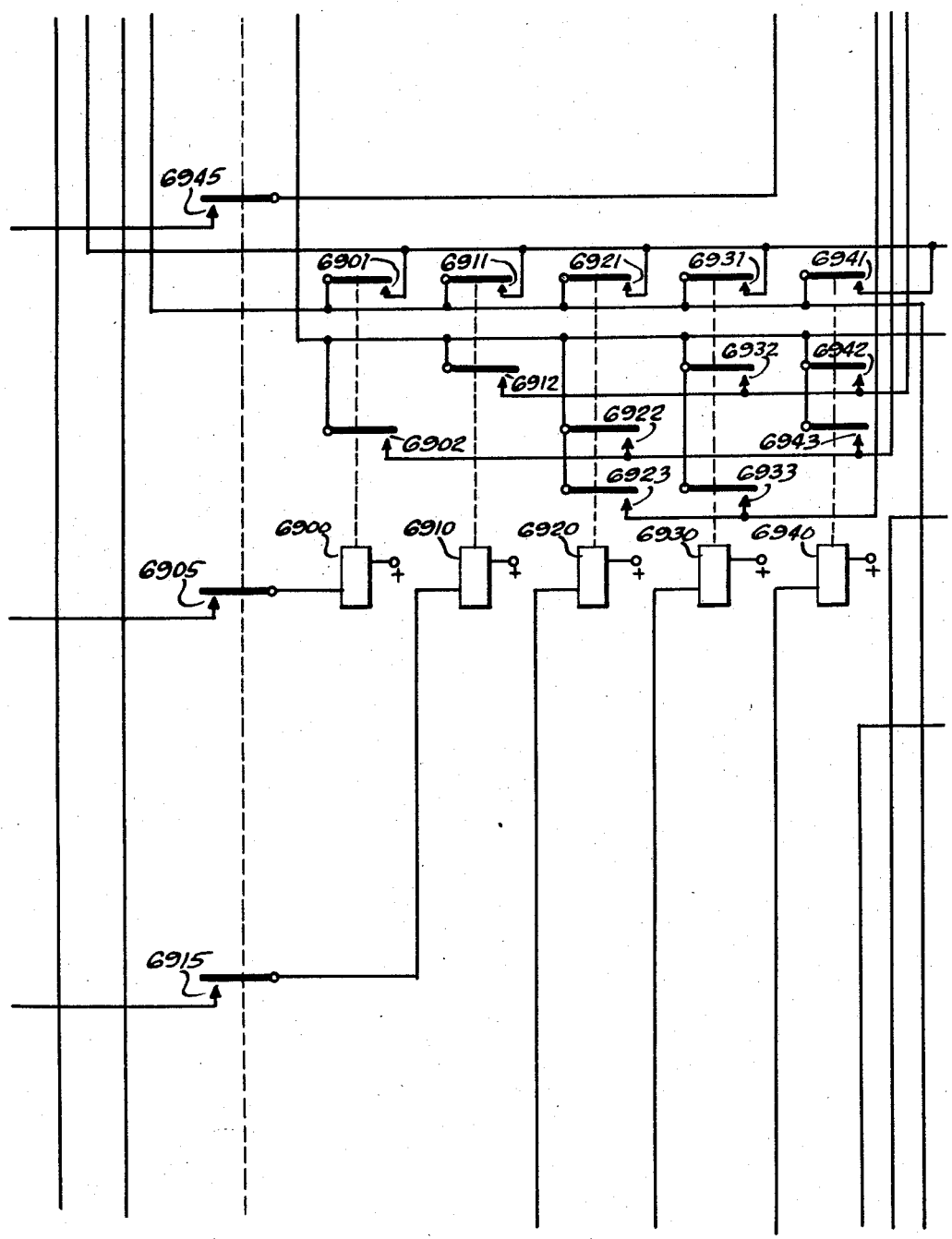
Figure 70:
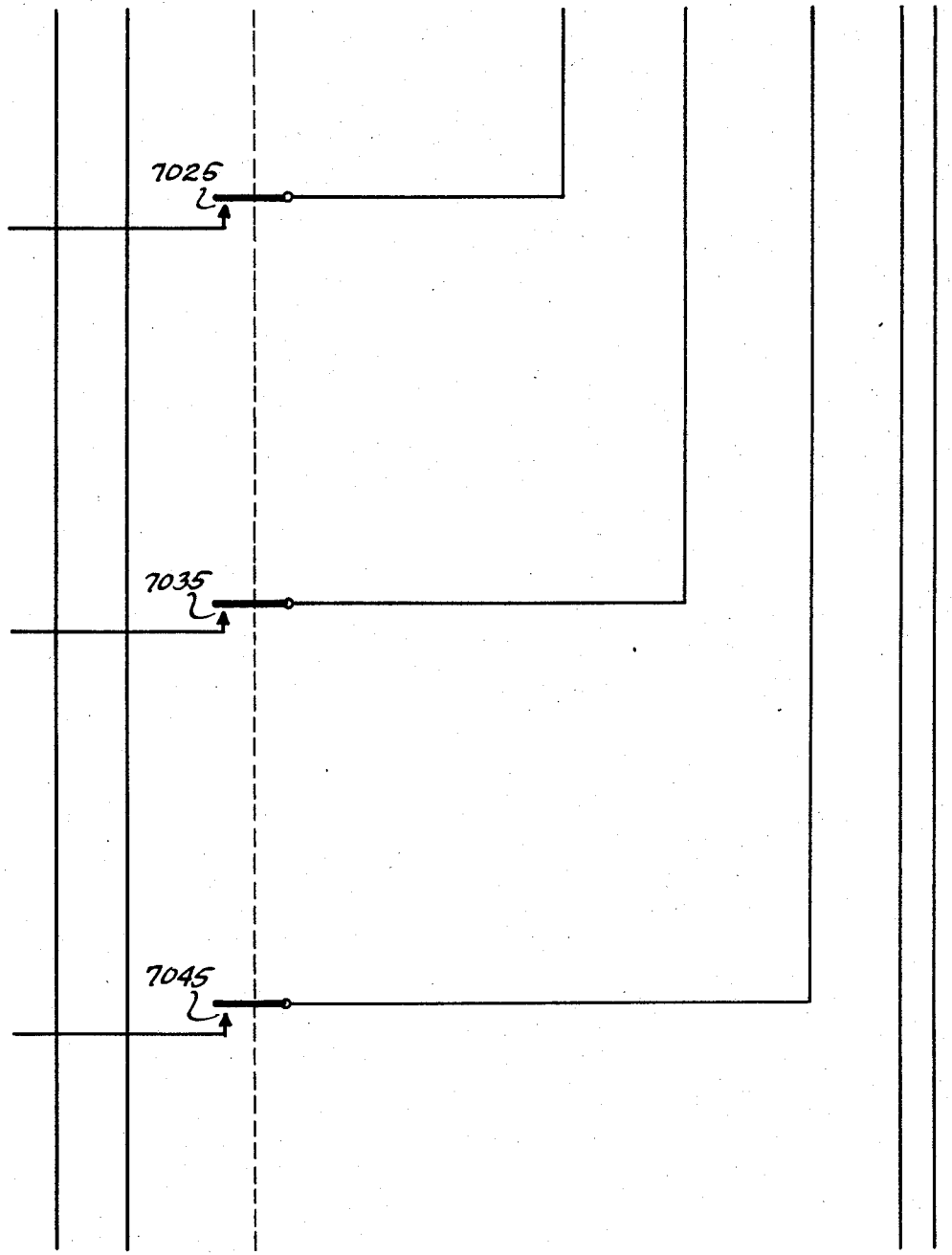

During the continuing rotation of the drive roll, the selected type bar bearing the alphabetical character "K" is struck against a tape paper 7605 (Fig. 76) to produce a visible indication thereof, as shown in Fig. 79 of the drawings. Also, this continuing rotation recloses the contacts 7261 to reoperate the switch relay 5010 and thereafter, the motor magnet 4950. The closure of the contacts controlled by the switch relay 5010 reconnects the stepping switch 5100 with the decoding relay circuit 7000. As shown in Figs. 58 and 62 of the drawings, the contacts in the second and seventh contact banks in the third stepping position of the switch 5100 are directly wired to ground so as to ground the wipers 5810 and 6250. The ground applied to these wipers operates the decoding relays 6710 and 6910 to close the contacts 6711, 6712, and 6911, 6912, respectively.

The closure of either of the contacts 6711 and 6911, together with the closure of the contacts 5012, applies ground to the open clutch contacts 7250. The closure of the contacts 6712 and 6912 conditions the operating windings of the permutation magnets 7120 and 7170, respectively, for operation by connecting them to the other side of the clutch contacts 7250. The continuing rotation of the drive roll moves the cams 7190 and 7260 to a point approaching their normal position, whereupon, the contacts 7250 are closed to simultaneously operate the clutch magnet 7180 and the conditioned permutation magnets 7120 and 7170, thus releasing the permutation slides controlled thereby.

As shown in Fig. 73 of the drawings, the release of the permutation slides controlled by the magnets 7120 and 7170 selects a type bar bearing the alphabetical character "I." The letter "I" is the second letter of the alphabetical notation designating the exchange 7 in which the toll call originated.

The movement of the read cam 7260 beyond its normal position reopens the contacts 7261 so that the switch relay 5010 and the motor magnet 4950 are released, thereby opening the connection between the decoding relay circuit 7000 and the stepping switch 5100, and releasing the stepping switch 5100 to move the wipers controlled thereby into engagement with contacts forming the fourth stepping position. The disconnection of the decoding relay circuit 7000 from the stepping switch 5100 releases the relays 6710 and 6910 previously operated under the control of the contacts grounded to represent the alphabetical character "I." Thereafter, the clutch contacts 7250 are released to condition the internal printer control circuit 7100 for operation under the control of the decoding relay circuit 7000 in response to the item of information transmitted in the fourth stepping position of the switch 5100. During the continuing rotation of the drive roll, the selected type bar carrying the character "I" is moved into engagement with the paper tape 7605 to produce a visible indication thereof adjacent the previously printed character "K."

After approximately 90 degrees of rotation, the read cam 7260 recloses the contacts 7261 to reoperate the switch relay 5010 and the motor magnet 4950. The switch relay, in closing, interconnects the decoding relay circuit 7000 with the stepping switch 5100, and the operation of the motor magnet 4950 conditions the wipers controlled thereby for movement into engagement with the contacts forming the fifth stepping position.

As shown in Fig. 74 of the drawings, the contacts in the second and fourth contact banks in the fourth stepping position are wired directly to ground so as to operate the decoding relays 6710 and 6730 to initiate a cycle of operation similar to that described hereinabove when the contacts 7250 are closed. This carriage return code operates the internal printer control circuit 7100 to return the carriage of the printer 36 to its left marginal position, and, thereafter, to produce three separate line feed operations. The carriage return of the printer 36 also operates the line feed relay 7200 to open the contacts 7201, thereby to insure that the line feeding operations are completed before ground is reapplied to the open contacts controlled by the clutch cam 7190. The completion of the carriage return operation by the carriage of the printer 36 completes the production of the first printed line, on the ticket 7900 which contains the adjacent alphabetical characters "KI" representing the designation of the exchange in which the toll call was originated.

During the carriage return movement and following the movement of the read cam 7260 past its normal position, ground is removed from the operating winding of the switch relay 5010 so that this relay and the motor magnet 4950 are released, thereby advancing the wipers controlled by the motor magnet into engagement with the contacts forming the fifth stepping position. After approximately one quarter of the revolution during which the carriage return takes place, ground is reapplied to the operating winding of the switch relay 5010 to operate this relay to interconnect the wipers with the circuit 7000. At this time, each of the wipers 5450, 5810, 5830, 5850, 6210, 6230, 6250, 6610, 6630 and 6650 is in engagement with a contact connected directly to the output anode of one of the counting tubes in the counting chain 2600 wherein is electronically manifested the magnitude of the digit comprising the first digit in the directory number of the calling subscriber.

As described above, the "3" manifesting tube 2680 in the counting chain 2600 is conductive so that ground is applied to the contact in the third contact deck of the fifth stepping position of the switch 5100 to operate the decoding relay 6720. This operating circuit extends from grounded and closed contacts 5032 through closed contacts 4823, conductor 2642, conductive tube 2680, output conductor 2681, the fifth contact in the contact bank 5820, the wiper 5850, the closed contacts 6825, the operating winding of the relay 6720 and then to grounded battery. The operation of this relay closes the contacts 6721 and 6722. Inasmuch as only a single tube in the counting chain 2600 is rendered conductive under the control of the first group of mark pulses, only a single decoding relay in the circuit 7000 is operated.

The closure of the contacts 6721 applies ground to the now open clutch contacts 7250, and the closure of the contacts 6722 conditions the operating circuit for the permutation magnet 7130. Following almost a complete cycle of rotation of the drive roll, the clutch cam 7190 is moved to close the contacts 7250 thereby simultaneously energizing the clutch magnet 7180 and the conditioned permutation magnet 7130, to release the permutation slide controlled by this magnet.

As shown in Fig 73 of the drawings, the operation of the decoding relay 6720 and, consequently, of the permutation magnet 7130 selects a type bar bearing the numerical character "3" so that this type bar is conditioned for movement into engagement with the roll of tape 7605 in the printer 36. The continuing rotation of the drive roll and the cams 7190 and 7260 carried thereon moves the read cam 7260 so that the contacts 7261 are opened, thereby releasing the switch relay 5010 to interrupt the operating circuit for the relay 6720 and to release the motor magnet 4950 so that the wipers controlled thereby are moved into engagement with the contacts forming the sixth stepping position. Thereafter, this rotation moves the clutch cam 7190 so that the contacts 7250 are opened to condition the internal printer control circuit 7100 for operation under the control of the decoding circuit 7000 in response to information pertaining to the second digit of the calling subscriber's number.

Thereafter, the next three cycles of rotation of the drive roll carrying the clutch cam 7190 and the read cam 7260 advance the wipers of the stepping switch 5100 into engagement with the contacts forming the seventh, eighth and ninth stepping position of this switch. During these three rotations of the drive roll, the decoding circuit 7000 is sequentially energized under the control of the counting chains 2601, 2602 and 2603 to cause the selective and sequential operation of the internal printer control circuit 7100 to produce numerical characters representing the second, third and fourth digits of the directory number of the calling subscriber. As shown in Figs. 79 and 80 of the drawings, it is assumed that the numerical characters "4," "5" and "6" are printed in response to the information transmitted to the decoding circuit 7000 from the contacts forming the sixth, seventh and eighth stepping positions (Fig. 74) of the switch 5100.

Following the printing of the numerical characters "4," "5" and "6" and with the wipers of the stepping switch 5100 positioned in engagement with the contacts forming the ninth stepping position, the operation of the switch relay 5010 under the control of the read cam 7260 selectively operates the decoding relays 6710 and 6730 in accordance with the prewired and grounded contacts in the second and fourth contact decks 5800 and 5840. As described above in detail, the operation of the decoding relays 6710 and 6730 operates the permutation magnets 7120 and 7140 to initiate the carriage return operation in the printer 36. During this carriage return operation, the carriage is returned to the left marginal position and the line feed relay 7200 is energized to introduce a suitable time delay for permitting the carriage to complete three line feed operations thereby to space the completed second line of printing from the third line which is to be produced as described hereinafter. Accordingly, the carriage return code transmitted to the printer 36, following the printing of the digit "6" representing the fourth digit of the calling subscriber's directory number terminates the printing of the second line on the toll ticket 7900 and returns the carriage of the printer 36 to its left marginal position in condition for receiving items of information to be printed in the third line.

Upon completion of the carriage return operation, the successive opening and closing of the contacts 7261 advances the wipers of the stepping switch 5100 into engagement with the contacts forming the tenth stepping position, and thereafter operates the switch relay 5010 to interconnect these wipers with the decoding relay circuit 7000. As described in detail above, the operation of the destination relay 2140 in the destination relay circuit 2150 closes a plurality of contacts to ground the conductors 2183 and 2241a. The conductor 2183 is connected to the tenth contact in the third contact bank and the conductor 2241a is connected to the tenth contact in the eighth contact deck so that the wipers 5830 and 6610, respectively, are grounded.

The grounding of the wiper 5830 operates the decoding relay 6720 to close the contacts 6721 and 6722. The application of ground to the wiper 6610 operates the decoding relay 6920 to close the contacts 6921, 6922 and 6923. The closure of either of the contacts 6921 or 6721 applies ground to the open contacts 7250 controlled by the clutch cam 7190. The closure of the contacts 6722, 6922 and 6923 conditions the operating circuits for the permutation slide magnets 7130, 7150 and 7160 so that, when the clutch cam 7190 recloses the contacts 7250 controlled thereby, the clutch magnet 7180 and the conditioned permutation magnets are operated to release the permutation slides controlled thereby. These released permutation slides represent the letter "P" which is the first character of the alphabetical designation of the exchange to which the call was extended.

The operation of the clutch magnet 7180 initiates another cycle of rotation of the drive roll during which the selected type bar carrying the character "P" is moved into engagement with the paper tape 7605, the wipers of the switch 5100 are moved into engagement with the contacts forming the eleventh stepping position, and the switch relay 5010 is reclosed to operate the decoding relay circuit 7000 under the control of the item of information transferred through the contacts forming the eleventh stepping position of the switch 5100. The operation of the destination relay 2140 in addition to grounding the conductors 2183 and 2241a representing the letter "P" also grounds the conductors 2184 and 2144a. The conductor 2184 is connected to the eleventh contact in the second contact bank 5800, and the conductor 2144a is connected to the eleventh contact in the seventh contact bank 6240 so that the wipers 5810 and 6250 are grounded to operate the decoding relays 6710 and 6910.

As disclosed in Fig. 73 of the drawings, the simultaneous operation of the relays 6710 and 6910 releases the permutation slides controlled by the permutation magnets 7120 and 7170 to select a type bar carrying the character "I." During the next cycle of rotation of the clutch and read cams 7190 and 7260, this selected type bar is moved into engagement with the paper tape 7605 to print the character "I" adjacent the previous printed character "P." Also, during this cycle, the switch relay 5010 is operated and the wipers of the stepping switch 5100 are moved into engagement with the contacts forming the twelfth stepping position wherein the contacts in the first and fourth contact banks are wired to ground so that the wipers 5450 and 5850 are grounded. The application of ground to these two wipers operates the decoding relays 6700 and 6730 thereby resulting in the conditioning of the circuits for the permutation magnets 7110 and 7140 (Fig. 73). When, at the end of this cycle of rotation, the clutch cam closes the contacts 7250, these two conditioned permutation magnets are operated to release their permutation slides and thereby to select a type bar bearing the character representing a dash (—).

Concurrently with the selection of this type bar, the one-way clutch magnet 7180 is reenergized to initiate another cycle of rotation of the drive roll during which the dash (—) is printed on the paper tape 7605 immediately following the previously printed character "I." During this next cycle of rotation, the stepping switch 5100 is first released to advance its wipers into engagement with the contacts forming the thirteenth stepping position of the switch 5100 and thereafter is operated to condition these wipers for movement into engagement with the contacts forming the fourteenth stepping position. The operation of the switch relay 5010 to reoperate the motor magnet 4950 closes the plurality of contacts controlled thereby so that the wipers of the stepping switch 5100 which are in engagement with the contacts forming the thirteenth stepping position are interconnected with the operating windings of the relays forming the decoding relay circuit 7000.

As shown in Fig. 74 of the drawings, the contacts forming the thirteenth stepping position are interconnected with the anodes of the tubes forming the counting chain 2604 wherein is registered the first digit of the called subscriber's directory number. As described above, the "6" manifesting tube in the chain 2604 is rendered conductive under the control of the fifth group of mark pulses. Accordingly, the decoding relay 6900 is operated through a circuit extending from closed contacts similar to the contacts 5032 through the "6" manifesting tube in the chain 2604, the output conductor associated therewith, the wiper 6230, the closed contacts 6905 and thence through the operating winding of the decoding relay 6900 to grounded battery. The operation of the decoding relay 6900 closes the contacts 6901 and 6902. The closure of the contacts 6901 prepares a circuit for operating the permutation slide operating magnet 7160. The closure of the contacts 6901 prepares a path for applying ground to the previously prepared circuit for operating the magnet 7160. When the cams 7190 and 7260 are returned to approximately their normal position, the contacts 7250 are closed to complete the circuits for energizing the operating windings of the magnet 7160 and the clutch magnet 7180. The operation of the clutch magnet 7180 conditions the drive roll for another cycle of rotation.

The operation of the magnet 7160 releases the permutation slide controlled thereby so that, during the cycle of operation initiated by the operation of the clutch magnet 7180, a type bar bearing the numerical character "6" is selected and moved into engagement with the paper tape 7605 to produce the numerical character "6" immediately following the "—" previously printed under the control of the information transmitted through the contacts forming the twelfth stepping position of the switch 5100.

During the cycle of rotation of the drive roll during which the numerical character "6" is printed, the cam 7260 is moved beyond its normal position so that the contacts 7261 are opened to release the switch relay 5010 and the motor magnet 4950. The release of the switch relay 5010 disconnects the stepping switch 5100 from the decoding relay circuit 7000. The release of the motor magnet 4950 moves the wipers controlled thereby into engagement with the contacts forming the fourteenth stepping position. As shown in Fig. 74 of the drawings, the contacts forming the fourteenth stepping position of the switch 5100 are interconnected with the output anodes of the tubes forming the subscriber digit counting chain 2605 wherein is registered the second digit of the directory number of the called subscriber. The "7" manifesting tube in the counting chain 2605 is now conducting, as explained in detail hereinabove, so that following approximately one-quarter of a revolution of the cam 7260, the contacts 7261 are reclosed to operate the switch relay 5010 and the motor magnet 4950.

The operation of the motor magnet 4950 conditions the wipers controlled thereby for movement into engagement with the contacts forming the fifteenth stepping position. The operation of the switch relay 5010 interconnects the stepping switch 5100 with the decoding relay circuit 7000 so that the decoding relay 6910 is operated in response to the grounding of the wiper 6250 by the "7" manifesting tube in the chain 2605.

The operation of the decoding relay 6910 closes the contacts 6911 and 6912. The closure of the contacts 6912 prepares a path for operating the permutation slide operating magnets 7170 and the closure of the contacts 6911 prepares a circuit for applying ground to the previously prepared path extending to the magnet 7170. When the control cams 7190 and 7260 approach their normal position, the contacts 7250 are closed to simultaneously operate the clutch magnet 7180 and the conditioned magnet 7170. The operation of the magnet 7180 re-engages the one revolution clutch so that another cycle of rotation of the drive roll is initiated.

The operation of the magnet 7170 releases the permutation slide controlled thereby so that a type bar bearing the numerical character "7" is selected and conditioned for movement into engagement with the paper tape 7605 during the newly initiated cycle of rotation of the drive roll. This numerical character is printed immediately following the numerical character "6" previously printed under the control of the information transmitted to the contacts forming the thirteenth stepping position. As the read cam 7260 moves beyond its normal position, the contacts 7261 are open to sequentially release the switch relay 5010 and the motor magnet 4950. The release of the switch relay 5010 disconnects the decoding relay circuit 7000 from the stepping switch 5100 and the release of the motor magnet 4950 moves the wipers of the stepping switch 5100 into engagement with the contacts forming the fifteenth stepping position.

Following approximately one-quarter of a revolution of the cam 7260, the contacts 7261 are reclosed to sequentially operate the switch relay 5010 and the motor magnet 4950. The operation of the motor magnet 4950 conditions the wipers controlled thereby for movement into engagement with the contacts forming the sixteenth stepping position. The operation of the switch relay 5010 interconnects the decoding relay circuit 7000 with the stepping switch 5100. In the fifteenth stepping position of the switch 5100, the contacts thereof are connected to the output anodes of the tubes forming the subscriber digit counting chain 2606 wherein is registered the third digit of the directory number of the called subscriber. As described above, the "8" manifesting tube in this chain is rendered conductive under the control of the seventh group of mark pulses. The conductive "8" manifesting tube in the chain 2606 applies ground to the wiper 6610. The application of ground to the wipers 6610 operates the decoding relay 6920 to close the contacts 6921, 6922 and 6923. The closure of the contacts 6922 and 6923 prepares operating circuits for the permutation slide operating magnets 7150 and 7160, respectively. The closure of the contacts 6921 prepares a circuit for applying ground to the previously conditioned circuits extending to the internal printer control circuit 7100.

As the control cams approach their normal positions, the contacts 7250 are reclosed to operate the conditioned magnets 7150 and 7160 and to operate the one revolution clutch magnet 7180. The operation of the magnet 7180 re-engages the drive motor with the drive roll so that another cycle of operation is initiated. The operation of the magnets 7150 and 7160 releases a pair of permutation slides to select a type bar bearing the numerical character "8."

During the next succeeding cycle of rotation of the drive roll, the selected type bar is moved into engagement with the paper tape 7605 to print the character "8" immediately following the previously printed character "7" representing the second digit of the directory number of the called subscriber. During this next succeeding cycle, as the read cam 7260 moves beyond its normal position, the contacts 7261 are opened to release the switch relay 5010 and to release the motor magnet 4950. The release of the switch relay 5010 disconnects the stepping switch 5100 from the decoding relay circuit 7000 so that the clutch magnet 7180 and the operated magnets 7150 and 7160 are released. The release of the motor magnet 4950 moves the wipers controlled thereby into engagement with the contacts forming the sixteenth stepping position. In the sixteenth stepping position, the contacts are connected to the output anodes of the plurality of tubes forming the subscriber digit counting chain 2607.

As described above, the subscriber digit counting chain 2607 is operated under the control of the eighth group of mark pulses and the "9" manifesting tube 2730 is operated in this chain. Accordingly, following approximately one-quarter of a cycle of revolution, the read cam 7260 recloses the contacts 7261 to sequentially operate the switch relay 5010 and the motor magnet 4950. The operation of the motor magnet 4950 conditions the wipers controlled thereby for movement into engagement with the contacts forming the seventeenth stepping position. The operation of the switch relay 5010 interconnects the wipers of the stepping switch 5100 with the decoding relay circuit 7000. Since the "9" manifesting tube 2730 in the counting chain 2607 is conducting, the wiper 6630 is grounded therethrough to operate the decoding relay 6930.

The operation of the decoding relay 6930 closes the contacts 6931, 6932 and 6933. The closure of the contacts 6932 and 6933 prepares operating paths for the permutation slide operating magnets 7150 and 7170. The closure of the contacts 6931 prepares a circuit for applying ground to the previously prepared circuits extending to the magnets in the printer control circuit 7100. Accordingly, when the cams 7190 and 7260 return to approximately their normal position, the magnets 7180, 7150 and 7170 are operated. The operation of the magnet 7180 initiates another cycle of rotation of the drive roll carrying the cams 7190 and 7260.

The operation of the magnets 7150 and 7170 releases the permutation slides controlled thereby so that a type bar bearing the numerical character "9" is selected. During the newly initiated cycle of rotation of the drive roll, this selected type bar is moved into engagement with the paper tape 7605 to produce the printed character "9" immediately following the previously printed character "8" and, thus prints the last or fourth digit of the directory number of the called subscriber. The printing of the last digit of the directory number of the called subscriber terminates the printing of the third line on the toll ticket 7900 (Fig. 79). The third line of printing on the toll ticket 7900, identifies both the exchange and the number of the called subscriber and includes two alphabetical characters representing the exchange in which the called subscriber is located, which characters are separated from the four numerical characters representing the directory number of the called subscriber by a "—."

The movement of the read cam 7260 beyond its normal position at the early portion of the cycle of rotation thereof during which the numerical character "9" is printed opens the contacts 7261 so that the switch relay 5010 and the motor magnet 4950 are sequentially released. The release of the switch relay 5010 disconnects the decoding relay circuit 7000 from the stepping switch 5100 so that the magnets 7150, 7170 and 7180 are released. The release of the motor magnet 4950 advances the plurality of wipers controlled thereby into engagement with the contacts forming the seventeenth stepping position of the switch 5100.

In the seventeenth stepping position the contacts in the second and fourth contact banks are wired directly to ground so that the wipers 5810 and 5850 are grounded. The selective grounding of these two wipers operates the decoding relays 6710 and 6730 to close the contacts 6711, 6712 and 6731, 6732, respectively. The closure of the contacts 6712 and 6732 prepares circuits for operating the permutation slide operating magnet 7120 and 7140, respectively. The closure of either of the contacts 6711 or 6731 prepares a circuit for applying ground to the previously prepared circuit extending to the selected permutation slide operating magnets in the internal printer control circuits 7100. Thereafter, as the control cams 7190 and 7260 are moved into approximately their normal position, the contacts 7250 are closed to operate the clutch magnet 7180 and the conditioned permutation slide operating magnets 7120 and 7140. The operation of the magnet 7180 reestablishes the connection between the drive roll and the motor so that the control cams 7190 and 7260 are rotated through an additional cycle of rotation.

The operation of the magnets 7120 and 7140 releases the permutation slides controlled thereby to initiate a carriage return operation. During this carriage return operation, the movable carriage of the printer 36 is returned to its left marginal position and thereafter actuates a means for advancing the paper tape 7605 through three line feed operations. The carriage return operation immediately following the printing of the numerical character "9" terminates the production of the third line of printing on the toll ticket 7900 and introduces a space between the printed third line and the fourth line of printing which is to be produced under the control of the contacts forming the eighteenth, nineteenth, twentieth and twenty-first stepping positions of the switch 5100.

Incident to the carriage return operation of the printer 36, the contacts 7220 are closed to operate the line feed relay 7200 whereby the contacts 7201 are opened. The opening of the contacts 7201 insures that the line feed operations are completed before the clutch magnet 7180 may be reenergized to print the numerical character represented by the selective grounding of the contacts forming the eighteenth stepping position.

As the read cam 7260 moves beyond its normal position during the cycle of rotation in which the carriage return operation is executed, the contacts 7261 are opened to sequentially release the switch relay 5010 and the motor magnet 4950. The release of the switch relay 5010 disconnects the stepping switch 5100 from the decoding relay circuit 7000 and thereby releases the magnets 7120, 7140 and 7180. The release of the motor magnet 4950 advances the wipers controlled thereby into engagement with the contacts forming the eighteenth stepping position. In the eighteenth stepping position, the contacts are connected to the output anodes of the tubes forming the tens days counting chain 3500.

Following approximately one-quarter of the revolution, the read cam 7260 recloses the contacts 7261 so that the switch relay 5010 and the motor magnet 4950 are sequentially operated. The operation of the motor magnet 4950 conditions the wipers controlled thereby for movement into engagement with the contacts forming the nineteenth stepping position. The operation of the switch relay 5010 interconnects the stepping switch 5100 with the decoding relay circuit 7000 so that the decoding relay 6940 is operated by the ground applied through the conductive "0" manifesting tube 3530 in the tens minutes counting chain 3500. The circuit for operating the decoding relay 6940 extends from the closed and grounded contacts 5024 through contacts 4825, conductor 3515, cable 4480, conductor 3515, conductive tube 3530, output conductors 3560, cable 3570, wiper 6650, contacts 7045 and thence through the operating winding of the decoding relay 6940 to grounded battery. The operation of the decoding relay 6940 closes the contacts 6941, 6942 and 6943. The closure of the contacts 6942 and 6943 prepares paths for operating the magnets 7170 and 7160, respectively. The closure of the contacts 6941 prepares a path for applying ground to the previously conditioned circuits extending to the internal printer control circuit 7100.

As the clutch cam 7190 is moved into approximately its normal position, the contacts 7250 are reclosed to operate the clutch magnet 7180 and the conditioned magnets 7160 and 7170. The operation of the clutch magnet 7180 reestablishes a driving connection between the motor and the drive roll so that an additional cycle of rotation of the control cams 7190 and 7260 is initiated.

The operation of the magnets 7160 and 7170 selects a type bar bearing the character "0" or cipher so that this type bar is moved into engagement with the paper tape 7605 during the cycle of rotation initiated by the operation of the clutch magnet 7180. The printing of the "0" initiates the printing of the fourth line on the toll ticket 7900 and represents the magnitude of the tens hours digit designating the time of day on which the toll call was terminated.

As the read cam 7260 is moved beyond its normal position, the contacts 7261 are opened to sequentially release the switch relay 5010 and the motor magnet 4950. The release of the switch relay 5010 disconnects the decoding relay circuit 7000 from the stepping switch 5100 and accordingly releases the magnets 7160, 7170 and 7180. The release of the motor magnet 4950 moves the wipers of the stepping switch 5100 into engagement with the contacts forming the nineteenth stepping position.

The contacts forming the nineteenth stepping position of the stepping switch 5100 are connected to the output anodes of the plurality of tubes forming the units hours counting chain 3700. As described hereinabove, the "2" manifesting tube 3650 in the units hours counting chain 3700 is rendered conductive under the control of the eleventh group of mark pulses.

Accordingly, when, following one-quarter of a cycle of revolution, the read cam 7260 recloses the contacts 7261 to sequentially operate the switch relay 5010 and the motor magnet 4950, the decoding relay 6710 is operated by the ground applied to the wiper 5810 in the second contact bank 5800. The operation of the decoding relay 6710 closes the contacts 6711 and 6712. The closure of the contacts 6712 prepares an operating path for the permutation slide operating magnet 7120 in the internal printer control circuit 7100. The closure of the contacts 6711 prepares a path for applying ground to the previously prepared path extending to the operating magnet 7120. The operation of the motor magnet 4950 concurrent with the operation of the decoding relay 6710 conditions the wipers of the stepping switch 5100 for movement into engagement with the contacts forming the twentieth stepping position.

At the end of this cycle of rotation of the control cams 7190 and 7260, the contacts 7250 are closed to operate the clutch magnet 7180 and the selected permutation slide operating magnet 7120. The operation of the clutch magnet 7180 initiates an additional cycle of rotation of the drive roll carying the cams 7190 and 7260. The operation of the magnet 7120 releases the permutation slide controlled thereby so that a type bar bearing the numerical character "2" is conditioned for operation under the control of the drive roll during the next succeeding cycle of rotation.

This selected type bar is moved into engagement with the paper tape 7605 to print the numerical character "2" immediately following the previously printed character "0" and thereby terminates the production of the numerical notation representing the hour at which the toll call was terminated.

As the read cam 7260 next moves beyond its normal position, the contacts 7261 are opened to sequentially release the switch relay 5010 and the motor magnet 4950. The release of the switch relay 5010 disconnects the stepping switch 5100 from the decoding relay circuit 7000 and accordingly, releases the operated magnets 7180 and 7120. The release of the motor magnet 4950 moves the wipers controlled thereby into engagement with the contacts forming the twentieth stepping position. In this stepping position, the contacts of the switch 5100 are interconnected with the output anodes of the tubes forming the tens minutes counting chain 3800. As described hereinabove, the "1" manifesting tube 3840 in this chain is rendered conductive.

When the read cam 7260 next closes the contacts 7261 to sequentially operate the advance relay 5010 and the motor magnet 4950, the decoding relay 6700 in the decoding relay circuit 7000 is operated by the ground applied through the wiper 5450 from the conductive "1" manifesting tube 3840 in the tens minutes counting chain 3800. The operation of the decoding relay 6700 closes the contacts 6701 and 6702. The closure of the contacts 6702 prepares an operating path for the permutation slide operating magnet 7110. The closure of the contacts 6701 prepares a circuit for applying ground to the previously conditioned circuit extending to the operating winding of the magnet 7110. The operation of the motor magnet 4950 conditions the wipers of the stepping switch 5100 for movement into engagement with the contacts forming the twenty-first stepping position thereof.

During the continuing rotation of the drive roll, the clutch cam 7190 is returned to approximately its normal position to close the contacts 7250. The closure of the contacts 7250 operates the clutch magnet 7180 and the conditioned magnet 7110. The operation of the clutch magnet 7180 reengages the one revolution clutch so that the control cams 7190 and 7260 are moved through an additional cycle of rotation. The operation of the magnet 7110 releases the permutation slide controlled thereby so that a type bar bearing the numerical character "1" is selected for actuation by the drive roll during the next succeeding cycle of rotation thereof.

During this next cycle of rotation, the drive roll moves the selected type bar into engagement with the paper tape 7605 so as to print the character "1" immediately following the character "2" previously printed under the control of the information transmitted through the contacts forming the nineteenth stepping position of the switch 5100. The digit "1" represents the magnitude of the tens minutes digit representing the time at which the toll call was terminated.

As the read cam 7260 moves beyond its normal position during this next succeeding cycle of rotation, the contacts 7261 are opened to sequentially release the switch relay 5010 and the motor magnet 4950. The release of the switch relay 5010 disconnects the decoding relay circuit 7000 from the stepping switch 5100 and, accordingly, releases the operated magnets 7110 and 7180. The release of the motor magnet 4950 moves the wipers controlled thereby into engagement with the contacts forming the twenty-first stepping position. In this stepping position, the contacts are connected to the output anodes of the tubes forming the units minutes counting chain 4000 in the tens and units minutes counter 3900. As described hereinabove, the units minutes counting chain 4000 is operated under the control of the thirteenth group of mark pulses to render the "7" manifesting tube 4050 conductive.

Following approximately one-quarter of a revolution, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-second stepping position of the switch 5100. The operation of the switch relay 5010 interconnects the wipers of the stepping switch 5100 with the operating windings of the decoding relay circuit 7000. Since the "7" manifesting tube 4050 in the units minutes counting chain 4000 is conducting, ground is applied to the wiper 6250 to operate the decoding relay 6910. The operation of the decoding relay 6910 closes the contacts 6911 and 6912. The closure of the contacts 6912 conditions the path for operating the permutation slide operating magnet 7170. The closure of the contacts 6911 prepares a circuit for applying ground to the previously conditioned circuit extending to the operating winding of the magnet 7170.

As the clutch cam 7190 approaches its normal position, the contacts 7250 are closed to operate the magnets 7170 and 7180. The operation of the magnet 7180 re-engages the one-revolution clutch so that the drive roll is rotated through an additional cycle of rotation. The operation of the permutation slide operating magnet 7170 releases the permutation slide controlled thereby so that a type bar bearing the numerical character "7" is selected for operation during the next succeeding cycle of rotation of the drive roll.

During this next cycle of rotation, the drive roll moves the selected type bar into engagement with the paper tape 7605 to print the numerical character "7" immediately following the previously printed character "1." The printing of the character "7" completes the production of the fourth line of printing on the toll ticket 7900 and also completes the printed representation of the time of day at which the toll call was terminated. As disclosed in Fig. 79 of the drawings, the numerical characters "0," "2," "1," "7" are printed to form the fourth line of printing on the toll ticket 7900 and thereby to indicate that the toll call extended between the previously identified subscribers was terminated at 2:17 a.m.

As the read cam 7260 moves beyond its normal position at the beginning of the cycle of rotation during which the numerical character "7" is printed on the toll ticket 7900, the contacts 7261 are opened to sequentially release the switch relay 5010 and the motor magnet 4950. The release of the switch relay 5010 disconnects the stepping switch 5100 from the decoding relay circuit 7000 and thereby releases the operated magnets 7170 and 7180. The release of the motor magnet 4950 advances the wipers controlled thereby into engagement with the contacts forming the twenty-second stepping position. As shown in Fig. 74 of the drawings, the twenty-second contacts in the second and fourth contact banks are wired directly to ground. Therefore, ground is applied to the wipers 5810 and 5850.

Following approximately one-quarter of a cycle of revolution, the read cam 7260 recloses the contacts 7261 so that the switch relay 5010 and the motor magnet 4950 are operated. The operation of the motor magnet 4950 conditions the wipers of the stepping switch 5100 for movement into engagement with the contacts forming the twenty-third stepping position of the switch 5100. The operation of the switch relay 5010 interconnects the wipers of the stepping switch 5100 with the decoding relay circuit 7000 so that the ground applied to the wipers 5810 and 5850 produces the simultaneous operation of the decoding relays 6710 and 6730. The operation of these relays closes the contacts 6711, 6712, 6731 and 6732. The closure of the contacts 6712 and 6732 prepares the operating paths for the permutation slide operating magnets 7120 and 7140, respectively, in the internal printer control circuit 7100. The closure of either of the contacts 6711 or 6731 prepares a path for extending ground to the previously prepared circuits for the selected magnets in the internal printer control circuit 7100.

As the clutch cam 7190 is rotated into approximately its normal position, the contacts 7250 are reclosed to operate the conditioned magnets 7120 and 7140 and the clutch magnet 7180. The operation of the clutch magnet 7180 re-engages the one revolution clutch so that the drive roll carrying the control cam 7190 and 7260 is rotated through and additional cycle of rotation. The operation of the magnets 7120 and 7140, as described hereinabove, initiates a carriage return operation during which the movable carriage of the printer 36 is returned to its left marginal position and also during which three line feed operations are performed by the printer 36 in order to adequately space the previously produced fourth line of printing from the fifth line of printing which is to be produced under the control of the next items of information transmitted to the printer 36.

As the read cam 7260 moves beyond its normal position during the cycle of rotation in which the carriage return operation takes place, the contacts 7261 are opened to sequentially release the switch relay 5010 and the motor magnet 4950. The release of the switch relay 5010 disconnects the decoding relay circuit 7000 from the stepping switch 5100 so that the operated magnet 7120, 7140 and 7180 are released. The release of the motor magnet 4950 moves the wipers controlled thereby into engagement with the contacts forming the twenty-third stepping position. As shown in Fig. 75 of the drawings, the contacts forming the twenty-third stepping position are connected to the output anodes of the tubes forming the tens months counting chain 4100 in the months counter 4200. As described hereinabove, the months counter 4200 is operated under the control of the fourteenth group of mark pulses to render the "6" manifesting tube 4330 in the units months counting ring 4300 conductive. Since the fourteenth group only includes six mark pulses, the tens months counting chain 4100 is not energized. Accordingly, the "0" manifesting tube 4120 remains conductive. The ground provided by the conductive tube 4120 is applied to the twenty-third contact in the contact bank 6640 in the stepping switch 5100.

After the read cam 7260 has rotated through approximately 90°, the contacts 7261 are reclosed to sequentially operate the switch relay 5010 and the motor magnet 4950. The operation of the motor magnet 4950 conditions the wipers controlled thereby for movement into engagement forming the twenty-fourth stepping position of the switch 5100. The operation of the switch relay 5010 interconnects the decoding relays circuit 7000 with the stepping switch 5100 so that the ground applied to the twenty-third contact in the "0" contact bank 6640 is applied to the wiper 6650. This ground is applied through the closed contacts 7045 to operate the decoding relay 6940. The operation of the decoding relay 6940 closes the contacts 6941, 6942 and 6943. The closure of the contacts 6942 prepares a circuit for operating the magnet 7170, and the closure of the contacts 6943 prepares a circuit for operating the magnet 7160. The closure of the contacts 6941 prepares a circuit for transmitting ground to the previously prepared circuits of the magnets in the internal printer control circuit 7100.

As the clutch cam 7190 approaches its normal position, the contacts 7250 are closed to operate the conditioned magnets 7160 and 7170, and to operate the clutch magnet 7180. The operation of the clutch magnet 7180 re-engages the one revolution clutch so that an additional cycle of rotation of the drive roll is initiated. The operation of the magnets 7160 and 7170 releases the permutation slides controlled thereby so as to select a type bar bearing the numerical character "0."

During this next succeeding cycle of operation, the selected type bar is moved into engagement with the paper tape 7605 under the control of the drive roll so as to print the character "0" as the first character in the fifth line of printing on the toll ticket 7900. During this cycle of rotation in which the character "0" is printed, the movement of the read cam 7260 beyond its normal position opens the contacts 7261 so that the switch relay 5010 and the motor magnet 4950 are sequentially released. The release of the switch relay 5010 disconnects the stepping switch 5100 from the decoding relay circuit 7000 so that the operated magnets 7160, 7170 and 7180 are released. The release of the motor magnet 4950 moves the wipers controlled thereby into engagement with the contacts forming the twenty-fourth stepping position.

As shown in Fig. 75 of the drawings, the contacts forming the twenty-fourth stepping position of the switch 5100 are interconnected with the output anodes of the plurality of tubes forming the units months counting ring 4300. As described hereinabove, the "6" manifesting tube 4330 in the months counter 4200 is rendered conductive under the control of the fourteenth group of mark pulses. The ground provided by the conductive tube 4330 is applied through the output conductor 4315, and the cables 4370 and 2750 to the twenty-fourth contact in the sixth contact deck 6220.

Following approximately 90° of rotation, the read cam 7260 recloses the contacts 7261 so that the switch relay 5010 and the motor magnet 4950 are sequentially operated. The operation of the motor magnet 4950 conditions the wipers controlled thereby for movement into engagement with the contacts forming the twenty-fifth stepping position of the switch 5100. The operation of the switch relay 5010 interconnects the wipers of the stepping switch 5100 with the decoding relay circuit 7000 so that ground is applied from the twenty-fourth contact in the contact bank 6220 to the wiper 6230. The ground applied to the wiper 6230 operates the decoding relay 6900 to close the contacts 6901 and 6902. The closure of the contacts 6902 prepares a circuit for operating the permutation slide operating magnet 7160 and the closure of the contacts 6901 prepares a circuit for applying ground to the previously conditioned circuit extending to the selected magnet in the internal printer control circuit 7100.

As the clutch cam 7190 is moved into approximately its normal position at the termination of the cycle of rotation during which the character "0" is printed on the toll ticket 7900, the contacts 7250 are closed to operate the conditioned magnet 7160 and to operate the clutch magnet 7180. The operation of the clutch magnet 7180 as described hereinabove initiates an additional cycle of rotation of the drive roll carrying the control cams 7190 and 7260. The operation of the magnet 7160 releases the permutation slide controlled thereby so that a type bar bearing the numerical character "6" is selected for actuation by the drive roll.

During this next succeeding cycle of rotation, the drive roll moves the selected type bar into engagement with the paper tape 7605 to print the character "6" immediately following the previously printed character "0." Also, during the original portion of this next cycle of rotation, the read cam 7260 is moved beyond its normal position to open the contacts 7261, thereby sequentially releasing the switch relay 5010 and the motor magnet 4950. The release of the switch relay 5010 disconnects the decoding relay circuit 7000 from the switch 5100 so that the operated magnets 7160 and 7180 are released. The release of the motor magnet 4950 moves the wipers controlled thereby into engagement with the contacts forming the twenty-fifth stepping position. As disclosed in Fig. 75 of the drawings, the twenty-fifth contacts in the first and fourth contact decks 5440 and 5840, respectively, are connected to ground.

After the read cam 7260 has rotated through approximately 90°, the contacts 7261 are reclosed to sequentially operate the switch relay 5010 and the motor magnet 4950. The operation of the motor magnet 4950 conditions the wipers of the stepping switch 5100 for movement into engagement with the contacts forming the twenty-sixth stepping position of the switch 5100. The operation of the switch relay 5010 interconnects the wipers of stepping switch 5100 with the operating windings of the relays in the decoding relay circuit 7000. The ground applied to the twenty-fifth contacts in the first and fourth contact banks is applied to the wipers 5450 and 5850 so as to operate the decoding relays 6700 and 6730, respectively. The operation of these relays closes the contacts 6701, 6702, 6731 and 6732. The closure of the contacts 6702 and 6732 prepares the operating circuits for the magnets 7110 and 7140, respectively. The closure of either of the contacts 6701 or 6731 prepares a circuit for applying ground to the previously prepared circuits extending to the selected magnets in the internal printer control circuit 7100.

When the clutch cam 7190 returns to approximately its normal position, the contacts 7250 are closed to operate the conditioned magnets 7110 and 7140, and to operate the clutch magnet 7180. The operation of the clutch magnet 7180 re-engages the one revolution clutch so that the drive roll and the cams 7190 and 7260 carried thereon are rotated through an additional cycle of rotation. The operation of the magnets 7110 and 7140 releases the permutation slides controlled thereby so that the type bar bearing the "—" character is selected for operation during the next cycle of rotation of the drive roll.

During this next succeeding cycle of rotation, the drive roll moves the selected type bar into engagement with the paper tape 7605 to produce a "—" immediately following the previously printed character "6" and thereby to separate the following information relating to the day on which the toll call was terminated from the printed information relating to the month during which the toll call was terminated. As the read cam 7260 moves beyond its normal position in the cycle of rotation during which the "—" is printed, the contacts 7261 are opened to sequentially release the switch relay 5010 and the motor magnet 4950. The release of the switch relay 5010 disconnects the decoding relay circuit 7000 from the stepping switch 5100 and, accordingly, releases the operated magnets 7110, 7140 and 7180. The release of the motor magnet 4950 moves the wipers controlled thereby into engagement with the contacts forming the twenty-sixth stepping position.

In the twenty-sixth stepping position, the contacts are connected to the output anodes of the tubes forming the tens days counting chain 4400. As described hereinabove, the tens days counting chain 4400 in the tens and units days counter 4500 is sequentially operated under the control of the fifteenth group of mark pulses to render the "2" manifesting tube 4450 conductive. The ground provided by the conductive tube 4450 is coupled through the output conductor 4431 and the cables 4470 and 2750 to the twenty-fifth contact in the second contact bank 5800 of the switch 5100.

Thereafter, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-seventh stepping position of the switch 5100. The operation of the switch relay 5010 interconnects the wipers of stepping switch 5100 with the operating windings of the relays forming the decoding relay circuit 7000 and, accordingly, the ground applied to the twenty-fifth contact in the contact deck 5800 is transmitted through the wiper 5810 and the closed contacts 6815 to operate the decoding relay 6710. The operation of the decoding relay 6710 closes the contacts 6711 and 6712. The closure of the contacts 6712 prepares a circuit for operating the permutation slide operating magnet 7120 and the closure of the contacts 6711 prepares a circuit for applying ground through the previously conditioned circuit extending to the selected magnet in the internal printer control circuit 7100. Thereafter, the clutch cam 7190 moves to approximately its normal position and, in doing so, closes the contacts 7250. The closure of the contacts 7250 operates the selected magnet 7120 and the clutch magnet 7180. The operation of the magnet 7180 re-engages the drive roll with the motor in the printer 36 for another cycle of rotation. The operation of the magnet 7120 releases the permutation slide controlled thereby to select a type bar bearing the numerical character "2."

During the next succeeding cycle of rotation of the drive roll, the selected type bar is moved into engagement with the paper tape 7605 to print the numerical character "2" immediately following the "—" separating this information from the numerical designation of the month. As the read cam 7260 moves beyond its normal position during the cycle of rotation in which the numerical character "2" is printed, the contacts 7261 are opened to sequentially release the switch relay 5010 and the motor magnet 4950. The release of the switch relay 5010 disconnects the decoding relay circuit 7000 from the wipers of the stepping switch 5100 so that the operated magnets 7120 and 7180 are released. The release of the motor magnet 4950 moves the wipers controlled thereby into engagement with the contacts forming the twenty-seventh stepping position of the switch 5100. As shown in Fig. 75 of the drawings, the contacts forming the twenty-seventh stepping position of the switch 5100 are directly connected to the output anodes of the plurality of counting tubes forming the units days counting chain 4600 in the tens and units days counter 4500. As described hereinabove, the counting chain 4600 is operated under the control of the sixteenth group of mark pulses to selectively render the "1" manifesting tube 4550 in the chain 4600 conductive. The ground provided by the conductive tube 4550 is coupled through the output conductor 4551 and the cables 4690 and 2750 to the twenty-seventh contact in the first contact bank 5440.

Following approximately 90° of rotation, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-eighth stepping position of the switch 5100. The operation of the relay 5010 interconnects the wipers of stepping switch 5100 with the operating windings of the relays in the decoding circuit 7000 so that the ground applied to the twenty-seventh contact in the first contact bank 5440 is applied through the wiper 5450 and the contacts 6715 to operate the decoding relay 6700. The operation of the decoding relay 6700 closes the contacts 6702 to prepare an operating path extending to the permutation slide operating magnet 7110, and closes the contacts 6701 to prepare a circuit for applying ground to the previously prepared circuit extending to the selected operating magnet in the internal printer control circuit 7100.

As the clutch cam 7190 approaches its normal position, the contacts 7250 are closed to operate the clutch magnet 7180 and the selected magnet 7110. The operation of the magnet 7180 conditions the printer 36 for another cycle of operation. The operation of the magnet 7110 releases the permutation slide controlled thereby so as to select a type bar bearing the numerical character "1."

During this next succeeding cycle of rotation, the drive roll moves the selected type bar into engagement with the paper tape 7605 to print the numerical character "1" immediately following the "2" previously printed. The printing of the character "1" completes the printing of the two digits representing the tens and units digits of the day on which the toll call was terminated.

As the read cam 7260 is moved beyond its normal position during the cycle of rotation in which the character "1" is printed, the contacts 7261 are opened to sequentially release the switch relay 5010 and the motor magnet 4950. The release of the switch relay 5010 disconnects the decoding relay circuit 7000 from ground so that the relays therein are released to release the operated magnets 7110 and 7180. The release of the motor magnet 4950 moves the wipers of the switch 5100 into engagement with the contacts forming the twenty-eighth stepping position. As shown in Fig. 75 of the drawings, the twenty-eighth contacts in the first and fourth contact banks 5440 and 5840 are prewired to ground, thus representing a "—" as shown in Fig. 73 of the drawings.

Following approximately 90° of rotation, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-ninth stepping position of the switch 5100. The operation of the switch relay 5010 closes the contacts controlled thereby, including the contacts 6715 and 6835, so that ground is applied through the wipers 5450 and 5850 to operate the decoding relays 6700 and 6730. As described hereinabove, the selective operation of the relays 6700 and 6730 conditions the operating paths for the magnets in the internal printer control circuit 7100 which select the type bar bearing the character "—". As the clutch cam 7190 moves into approximately its normal position, the contacts 7250 are closed to operate the selected magnets in the internal printer control circuit 7100 and the clutch magnet 7180 thereby initiating another cycle of operation.

The type bar selected by the operation of the magnets in the control circuit 7100 bears the character "—". During this next cycle of rotation of the drive roll, the selected type bar is moved into engagement with the paper tape 7605 immediately following the previously printed numerical character "1" to print a "—" for separating the designation of the day on which the toll call was terminated from the printed information relating to the year in which the toll call was terminated, which information is next to be printed under the control of the contacts forming the twenty-ninth and thirtieth stepping position of the switch 5100.

As the read cam 7260 moves beyond its normal position, the contacts 7261 are opened to sequentially release the switch relay 5010 and the motor magnet 4950. The release of the switch relay 5010 disconnects the decoding relay circuit 7000 from its source of ground so that the previously operated magnets in the printer control circuit 7100 are released. The release of the motor magnet 4950 advances the wipers controlled thereby into engagement with the contacts forming the twenty-ninth stepping position. As shown in Fig. 75 of the drawings, the only contact grounded in the twenty-ninth stepping position is the contact in the fifth contact bank 6200.

Following approximately 90° of rotation, the read cam 7260 closes the contacts 7261 so that the switch relay 5010 and the motor magnet 4950 are sequentially operated. The operation of the motor magnet 4950 conditions the wipers controlled thereby for movement into engagement with the contacts forming the thirtieth stepping position in the switch 5100. The operation of the switch relay 5010 interconnects the wipers of the stepping switch 5100 with the decoding relay circuit 7000 so that ground is applied from the grounded contact in the fifth contact bank 6200 through the wiper 6210 and the closed contacts 6945 to operate the decoding relay 6740. The operation of the decoding relay 6740 closes the contacts 6741 and 6742 thereby to prepare the internal printer control circuit 7100 for the selection of a type bar bearing the numerical character "5." Accordingly, when the clutch cam 7190 is moved into approximately its normal position to close the contacts 7250, the magnets 7180 and 7150 are operated. The operation of the magnet 7180 re-initiates another cycle of rotation of the drive roll. The operation of the magnet 7150 selects a type bar bearing the numerical character "5."

During this additional cycle of rotation of the drive roll, the selected type bar is moved into engagement with the paper tape 7605 at a position immediately following the previously printed "—" so as to print the numerical character "5" to indicate the first digit of the year in which the call was terminated. Thereafter, the opening of the contacts 7261 sequentially releases the switch relay 5010 and the motor magnet 4950. The release of the switch relay 5010 disconnects ground from the decoding relay circuit 7000 so that the operated magnets 7180 and 7150 are released. The release of the motor magnet 4950 advances the wipers controlled thereby into engagement with the contacts forming the thirtieth stepping position. As shown in Fig. 75 of the drawings, the thirtieth contact in the first contact bank 5440 is connected directly to ground to represent the units digit of the year in which the toll call was terminated.

Following approximately 90° of rotation, the contacts 7261 are reclosed to sequentially operate the switch relay 5010 and the motor magnet 4950. The operation of the motor magnet 4950 conditions the wipers controlled thereby for movement into engagement with the contacts forming the thirty-first stepping position. The operation of the switch relay 5010 interconnects the stepping switch 5100 with the decoding relay circuit 7000 so that ground is applied through the wiper 5440 and the closed contacts 6715 to operate the decoding relay 6700. The operation of this relay closes the pair of contacts controlled thereby to condition the internal printer control circuit 7100 for selecting a type bar bearing the numerical character "1," as shown in Fig. 73 of the drawings.

As the clutch cam 7190 moves into approximately its normal position, the contacts 7250 are closed to operate the magnets 7110 and 7180. The operation of the magnet 7180 initiates another cycle of operation of the printer 36. The operation of the magnet 7110 releases the permutation slide controlled thereby so that a type bar bearing the numerical character "1" is selected. During the next succeeding cycle of rotation of the drive roll, this type bar is moved into engagement with the paper tape 7605 to print the numerical character "1" immediately following the previously printed character "5." The printing of the numerical character "1" terminates the printing of the fifth line on the toll ticket 7900. This fifth line of printing represents the date on which the toll call was terminated and includes, when considered from left to right in Fig. 79 of the drawings, the digits "06" representing the month of June, a "—", the digits "21" representing the 21st day of June, a "—", and the digits "51" which represent the year in which the toll call was terminated.

Obviously, since the information provided by the twenty-ninth and thirtieth stepping positions of the switch 5100, representing the year in which the toll call was completed, is provided by prewiring to ground a single contact in one of the contact banks, the designation of the year in which the toll call was terminated may be very easily changed by varying the wiring of the program switch 5100. If it is desired to render the toll ticketing facilities completely automatic, an additional stepping switch similar to the months stepping switch in the clock and calendar circuit 27 may be provided for recording information relating to the year in which the call was terminated. In the event that this additional stepping switch is provided in the clock and calendar circuit 27, an additional register circuit similar to the months counter 4200 could be provided for registering this information prior to its transmission to control the operation of the printer 36.

The next movement of the read cam 7260 beyond its normal position opens the contacts 7261 so that the switch relay 5010 and the motor magnet 4950 are released. The release of the switch relay 5010 disconnects the decoding relay circuit 7000 from the stepping switch 5100 so that the operated relays therein and in the internal printer control circuit 7100 are released. The release of the motor magnet 4950 advances the wipers controlled thereby into engagement with the contacts forming the thirty-first stepping position. As shown in Fig. 58 of the drawings, the thirty-first contacts in the second and fourth contact banks 5800 and 5840 are connected directly to ground to provide a carriage return code.

Thereafter, the reclosure of the contacts 7261 under the control of the cam 7260 sequentially operates the switch relay 5010 and the motor magnet 4950. The operation of the motor magnet 4950 conditions the wipers controlled thereby for movement into engagement with the contacts forming the thirty-second stepping position of the switch 5100. The operation of the relay 5010 interconnects the stepping switch 5100 with the decoding relay circuit 7000 so that the decoding relays 6710 and 6730 are operated to condition the internal printer control circuit 7100 for starting a carriage return operation of the printer 36.

When the contacts 7250 are next closed, the internal printer control circuit 7100 initiates a carriage return operation of the printer 36 wherein the carriage is returned to its left marginal position and three line feed operations are performed. The carriage return operation terminates the printing of the fifth line on the toll ticket 7900 and also provides a space between the printed fifth line and the sixth line which is to be printed under the control of the contacts forming the thirty-second and thirty-third stepping positions of the switch 5100.

As the read cam 7260 moves beyond its normal position, the contacts 7261 are opened to sequentially release the switch relay 5010 and the motor magnet 4950. The release of the switch relay 5010 disconnects the stepping switch 5100 from the decoding relay circuit 7000 so that the operated relays therein are released. The release of the motor magnet 4950 moves the wipers controlled thereby into engagement with the contacts forming the thirty-second stepping position. In the thirty-second stepping position, the contacts are connected to the output anodes of the plurality of tubes forming the tens minutes counting chain 2800 of the elapsed time counter 3000.

As described hereinabove, the "2" manifesting tube 2840 in the tens minutes counting chain 2800 is selectively rendered conductive under the control of the ninth group of mark pulses. Therefore, when the contacts 7261 are reclosed to initiate sequential operation of the switch relay 5010 and the motor magnet 4950, ground is applied through the wiper 5810 and the closed contacts 6815 to operate the decoding relay 6710 whereby the contacts 6711 and 6712 are closed. As disclosed in Fig. 73 of the drawings, the operation of the decoding relay 6710 prepares the internal printer control circuits 7100 for the selection of a type bar bearing the numerical character "2." The previous operation of the motor magnet 4950 conditions the wipers controlled thereby for being advanced into engagement with the contacts forming the thirty-third stepping position of the switch 5100.

When the clutch cam 7190 approaches its normal position, the contacts 7250 are closed to operate the clutch magnet 7180 and the permutation slide operating magnet 7120. The operation of the clutch magnet 7180 initiates another cycle of rotation of the drive roll carrying the cams 7190 and 7260. The operation of the magnet 7120 selects a type bar bearing the numerical character "2."

During this additional cycle of rotation, the drive roll moves the selected type bar into engagement with the paper tape 7605 to print the numerical character "2" as the first digit in the sixth line of printing. As the read cam 7260 moves beyond its normal position in the cycle of rotation during which the numerical character "2" is printed, the contacts 7261 are opened to sequentially release the switch relay 5010 and the motor magnet 4950. The release of the switch relay 5010 disconnects the stepping switch 5100 from the decoding relay circuit 7000 so that the operated relay 6710 and the magnets 7120 and 7180 are released. The release of the motor magnet 4950 moves the wipers controlled thereby into engagement with the contacts forming the thirty-third stepping position of the switch 5100. As shown in Fig. 75 of the drawings, the contacts forming the thirty-third stepping position are directly connected to like designated output anodes of the counting tubes forming the units minutes counting ring 2900 in the elapsed time counter 3000. As described hereinabove, the "6" manifesting tube 3050 in the ring 2900 is rendered conductive by the ninth group of mark pulses transmitted thereto.

Accordingly, when the read cam 7260 is rotated through approximately 90° to reclose the contacts 7261, the switch relay 5010 and the motor magnet 4950 are sequentially operated. The operation of the motor magnet 4950 conditions the wipers controlled thereby for movement into engagement with the contacts forming the thirty-fourth stepping position of the switch 5100. The operation of the switch relay 5010 interconnects the stepping switch 5100 with the decoding relay circuit 7000 so that the decoding relay 6900 is operated by the ground applied through the wiper 6230 and the closed contacts 6905. The operation of the decoding relay 6900 prepares an operating path for a selected permutation slide operating magnet in the internal printer control circuit 7100 as shown in Fig. 73 of the drawings.

As the clutch cam 7190 approaches its normal position, the contacts 7250 are closed to operate the clutch magnet 7180 and the permutation slide operating magnet 7160. The operation of the clutch magnet 7180 initiates an additional cycle of rotation of the drive roll. The operation of the magnet 7160 selects a type bar bearing the numerical character "6."

During the next ensuing cycle of rotation of the drive roll, the selected type bar is moved into engagement with the paper tape 7605 to print the numerical character "6" immediately following the previously printed character "2." The printing of the character "6" completes the printing of the designation of the elapsed time of the toll call and the sixth line of printing, which, as shown in Fig. 79 of the drawings, includes the digits "26" representing the length of the toll call to which this ticket pertains was 26 minutes.

During the cycle of rotation in which the numerical character "6" is printed, the read cam 7260 moves beyond its normal position to open the contacts 7261 thereby initiating sequential release of the switch relay 5010 and the motor magnet 4950. The release of the switch relay 5010 disconnects the stepping switch 5100 from the decoding relay circuit 7000 so that the previously operated relay therein and also the magnets in the internal printer control circuit 7100 are released. The release of the motor magnet 4950 moves the wipers controlled thereby into engagement with the contacts forming the thirty-fourth stepping position. As shown in Fig. 58 of the drawings, the thirty-fourth contacts in the second and fourth contact decks 5800 and 5840, respectively, are wired directly to ground to provide a carriage return code.

After the read cam 7260 has rotated through approximately 90°, the contacts 7261 are reclosed to sequentially operate the switch relay 5010 and the motor magnet 4950. The operation of the motor magnet 4950 conditions the wipers controlled thereby for movement into engagement with the contacts forming the thirty-fifth stepping position of the switch 5100. The operation of the switch relay 5010 interconnects the wipers of the stepping switch 5100 with the operating windings of the decoding relays forming the circuit 7000 so that the decoding relays 6710 and 6730 are operated to close the contacts controlled thereby. The closure of the contacts controlled by these two relays conditions the internal printer control circuit 7100 to initiate a carriage return operation during the next succeeding cycle of rotation of the drive roll.

As the clutch cam 7190 approaches the termination of the cycle of rotation during which the numerical character "6" is printed, the contacts 7250 are closed to operate the magnets 7120, 7140 and the clutch magnet 7180. The operation of the clutch magnet 7180 initiates an additional cycle of rotation of the drive roll in the printer 36. The simultaneous operation of the magnets 7120 and 7140 conditions the printer 36 for a carriage return operation. During the next succeeding cycle of rotation of the drive roll, the movable carriage of the printer 36 executes a carriage return movement following which, three separate line feed operations are performed. The interposition of this carriage return operation following the production of the sixth line of printing on the toll ticket 7900 returns the carriage of the printer 36 to its left marginal position so that all of the lines of printing are initiated at the same position and also interposes adequate spacing between the sixth and seventh lines of printing produced on this ticket.

As the read cam 7260 moves beyond its normal position during the cycle of rotation in which the carriage return operation is executed, the contacts 7261 are opened to sequentially release the switch relay 5010 and the motor magnet 4950. The release of the switch relay 5010 disconnects the stepping switch 5100 from the decoding relay circuit 7000 so that the relays 6710, 6730 and the magnets 7120, 7140 and 7180 are released. The release of the motor magnet 4950 moves the wipers controlled thereby into engagement with the contacts forming the thirty-fifth stepping position. As shown in Fig. 75 of the drawings, the contacts forming the thirty-fifth stepping position are connected to the output anodes of the tubes forming the units dollars counting chain 3305 in the cost computer 39. As described hereinabove, the "1" manifesting tube 3390 in the units dollars counting chain 3305 is rendered conductive under the control of the ninth group of mark pulses. This ground is applied to the thirty-fifth contact in the first contact bank 5440 through an output conductor 3371 and the cables 3475 and 2750.

Following approximately one-quarter of a revolution, the read cam 7260 recloses the contacts 7261 so that the switch relay 5010 and the motor magnet 4950 are sequentially operated. The operation of the motor magnet 4950 conditions the wipers controlled thereby for movement into engagement with the contacts forming the thirty-sixth stepping position. The operation of the switch relay 5010 interconnects the decoding relay circuit 7000 with the stepping switch 5100 so that the ground applied to the thirty-fifth contact in the contact bank 5440 is applied through the wiper 5450 and the closed contacts 6750 to operate the decoding relay 6700. The operation of the decoding relay 6700 conditions a circuit for operating the permutation slide operating magnet 7110 in the internal printer control circuit 7100.

As the clutch cam 7190 returns to its normal position at the end of the cycle of rotation during which the carriage return operation is performed by the printer 36, and, assuming that the line feed relay 7200 has been released so that the contacts 7201 are closed, this movement of the clutch cam 7190 closes the contacts 7250 to operate the magnets 7110 and 7180. The operation of the magnet 7180 re-engages the one revolution clutch so that an additional cycle of rotation of the drive roll is initiated. The operation of the magnet 7110 releases the permutation slide controlled thereby so that a type bar bearing the numerical character "1" is selected for actuation during the next cycle of rotation.

During this next cycle of rotation, the drive roll moves the selected type bar into engagement with the paper tape 7605 to initiate the printing of the seventh line on the toll ticket 7900. Also during this cycle, as the read cam 7260 moves beyond its normal position, the contacts 7261 are opened to initiate the sequential release of the switch relay 5010 and the motor magnet 4950. The release of the switch relay 5010 disconnects the stepping switch 5100 from the decoding relay circuit 7000 so that the relay 6700 and the magnets 7110 and 7180 are released. The release of the motor magnet 4950 advances the wipers controlled thereby into engagement with the contacts forming the thirty-sixth stepping position. As shown in Fig. 75 of the drawings, the thirty-sixth contacts in the first and fourth contact banks 5440 and 5840 are wired directly to ground. The grounding of these contacts represents the character "—".

After the read cam 7260 is rotated through approximately 90° during the cycle of rotation in which the numerical character "1" is printed, the contacts 7261 are closed to initiate sequential operation of the switch relay 5010 and the motor magnet 4950. The operation of the motor magnet 4950 conditions the wipers controlled thereby for movement into engagement with the contacts forming the thirty-seventh stepping position. The operation of the switch relay 5010 interconnects the wipers of the stepping switch 5100 with the operating windings of the decoding relays in the circuit 7000 so that the relays 6700 and 6730 are operated in response to the ground applied to the wipers 5450 and 5850, respectively. The operation of these two relays, as described hereinabove, conditions the internal printer control circuit 7100 for selecting a type bar bearing the character "—." When the clutch cam 7190 next approaches its normal position, the contacts 7250 are closed to operate the selected magnets in the internal printer control circuit 7100 thereby selecting the type bar bearing the character "—" and to operate the clutch magnet 7180. The operation of the clutch magnet 7180 initiates an additional cycle of rotation of the drive roll.

During this additional cycle of rotation, the selected type bar is moved into engagement with the paper tape 7605 immediately following the previously printed character "1." This dash separates the units dollars portion of the charge to be assessed for the toll call from the tens and units cents portion thereof. As the read cam 7260 moves beyond its normal position during this cycle of rotation, the contacts 7261 are opened sequentially to release the switch relay 5010 and the motor magnet 4950. The release of the switch relay 5010 disconnects the decoding relay circuit 7000 from the wipers of the stepping switch 5100 so that the previously operated relays therein and also the operated magnets in the internal printer control circuit 7100 are released. The released of the motor magnet 4950 moves the wipers controlled thereby into engagement with the contacts forming the thirty-seventh stepping position. As shown in Fig. 75 of the drawings the contacts forming the thirty-seventh stepping position are directly connected to the output anodes of the plurality of tubes forming the tens cents counting ring 3125 in the cost computer 39. As described hereinabove, the "2" manifesting tube 3185 in this counting ring is rendered conductive under the control of the ninth group of mark pulses. The ground provided by the conductive tube 3185 is applied to the thirty-seventh contact in the second contact bank 5800 through the output conductor 3162 and the cables 3295 and 2750.

Accordingly, when the read cam 7260 recloses the contacts 7261 to sequentially operate the switch relay 5010 and the motor magnet 4950, the decoding relay 6710 is operated by the ground applied from the wiper 5810 through the closed contacts 6815. The operation of the decoding relay 6700 (Fig. 73) conditions the internal printer control circuit 7100 for the selection of a type bar bearing the numerical character "2." The operation of the motor magnet 4950 conditions the wipers controlled thereby for movement into engagement with the contacts forming the thirty-eighth stepping position of the switch 5100.

When the clutch cam 7190 approaches the end of the cycle of rotation during which the "—" is printed, the contacts 7250 are closed to operate the conditioned magnets in the internal printer control circuit 7100 and, also, the clutch magnet 7180. The operation of the conditioned magnet selects a type bar bearing the numerical character "2." The operation of the clutch magnet 7180 re-engages the one revolution clutch so that the drive roll is driven through an additional cycle of rotation.

During this cycle of rotation, the selected type bar is moved into engagement with the paper tape 7605 immediately following the previously printed "—" to print the numerical character "2" to represent the tens cents digit of the charge to be assessed for this call. Also, during the original movement of this next cycle of rotation, the read cam 7260 opens the contacts 7261 so that the switch relay 5010 and the motor magnet 4950 are sequentially released. The release of the switch relay 5010 disconnects the stepping switch 5100 from the decoding relay circuit 7000 so that the relays therein and the magnets in the internal printer control circuit 7100 are released. The release of the motor magnet 4950 moves the wipers controlled thereby into engagement with the contacts forming the thirty-eighth stepping position. As shown in Fig. 75 of the drawings, only the contacts in the fifth and the last contact banks 6220 and 6640 are connected to the output anodes of the "5" and "0" manifesting tubes in the units cents counting ring 3300 in the cost computer 39. As explained hereinabove, this counting chain is operated under the control of the ninth group of mark pulses so that the "0" manifesting tube 3350 is rendered conductive. The ground provided by the conductive tube 3350 is coupled to the thirty-eighth contact in the tenth contact bank 6640 through the output conductor 3312 and the cables 3395 and 2750.

Accordingly, when the contacts 7261 are next closed sequentially to operate the switch relay 5010 and the motor magnet 4950, ground is applied through the wiper 6650 and the closed contacts 7045 to operate the decoding relay 6940. The operation of the decoding relay 6940 conditions the internal printer control circuit 7100 for selecting a type bar bearing the numerical character "0." The operation of the motor magnet 4950 following the operation of the switch relay 5010 conditions the wipers controlled thereby for movement into engagement with the contacts forming the thirty-ninth stepping position.

The following closure of the contacts 7250 operates the conditioned magnet in the internal printer control circuit 7100 and the clutch magnet 7180 to initiate an additional cycle of rotation of the drive roll. The operation of the selected magnet in the control circuit 7100 selects a type bar bearing the numerical character "0." During this newly initiated cycle of rotation, the selected type bar is moved into engagement with the paper tape 7605 immediately following the previously printed character "2" to print the character "0." The printing of the character "0" completes the printing of the seventh line of information on the toll ticket 7900 and, as shown in Fig. 79 of the drawings, includes "1–20" which is the printed representation of the charge to be assessed for the toll call, i.e., $1.20. This charge includes the units dollars digit which is separated from the tens and units cents portion of the cost by a dash.

As the read cam 7260 moves beyond its normal position, the contacts 7261 are opened to sequentially release the switch relay 5010 and the motor magnet 4950. The release of the switch relay 5010 disconnects the decoding relay circuit 7000 from the stepping switch 5100 so that the operated relay therein and the operated magnets in the internal printer control circuit 7100 are released. The release of the motor magnet 4950 moves the wipers controlled thereby into engagement with the contacts forming the thirty-ninth stepping position of the switch 5100. As shown in Fig. 75 of the drawings, the thirty-ninth contacts in the second and fourth contact banks 5800 and 5840 are wired directly to ground to provide a carriage return code. When the read cam 7260 again closes the contacts 7261 to sequentially operate the switch relay 5010 and the motor magnet 4950, the ground applied through the wipers 5810 and 5850 operates the decoding relays 6710 and 6730 thereby to condition the internal printer control circuit 7100 for controlling a carriage return operation of the printer 36. The operation of the motor magnet 4950 which accompanies the interconnection of the decoding relay circuit 7000 with the stepping switch 5100 conditions the wipers controlled thereby for movement into engagement with the contacts forming the fortieth stepping position.

The following closure of the clutch contacts 7250 operates the selected magnets 7120 and 7140 and the clutch magnet 7180 in the internal printer control circuits 7100. The operation of the magnets 7120 and 7140 releases the permutation slides controlled thereby so that a carriage return operation of the printer 36 is initiated. The operation of the magnet 7180 re-engages the one revolution clutch so that the drive roll is driven to an additional cycle of rotation. During this additional cycle of rotation, the movable carriage of the printer 36 is returned to its left marginal position and thereafter advances the paper tape 7605 through three line feed operations during which the line feed relay 7200 is maintained operated to disable the internal printer control circuit 7100 from initiating an additional printing cycle until such time as the line feed operations have been completed.

As shown in Fig. 75 of the drawings, the contacts forming the fortieth and forty-first stepping positions include contacts in the second and fourth contact banks 5800 and 5840 which are wired directly to ground to provide carriage return codes. Accordingly, during the next two cycles of rotation of the drive roll two carriage return operations are carried out by the printer 36 under the control of the contacts forming the fortieth and forty-first stepping positions.

Figure 54:
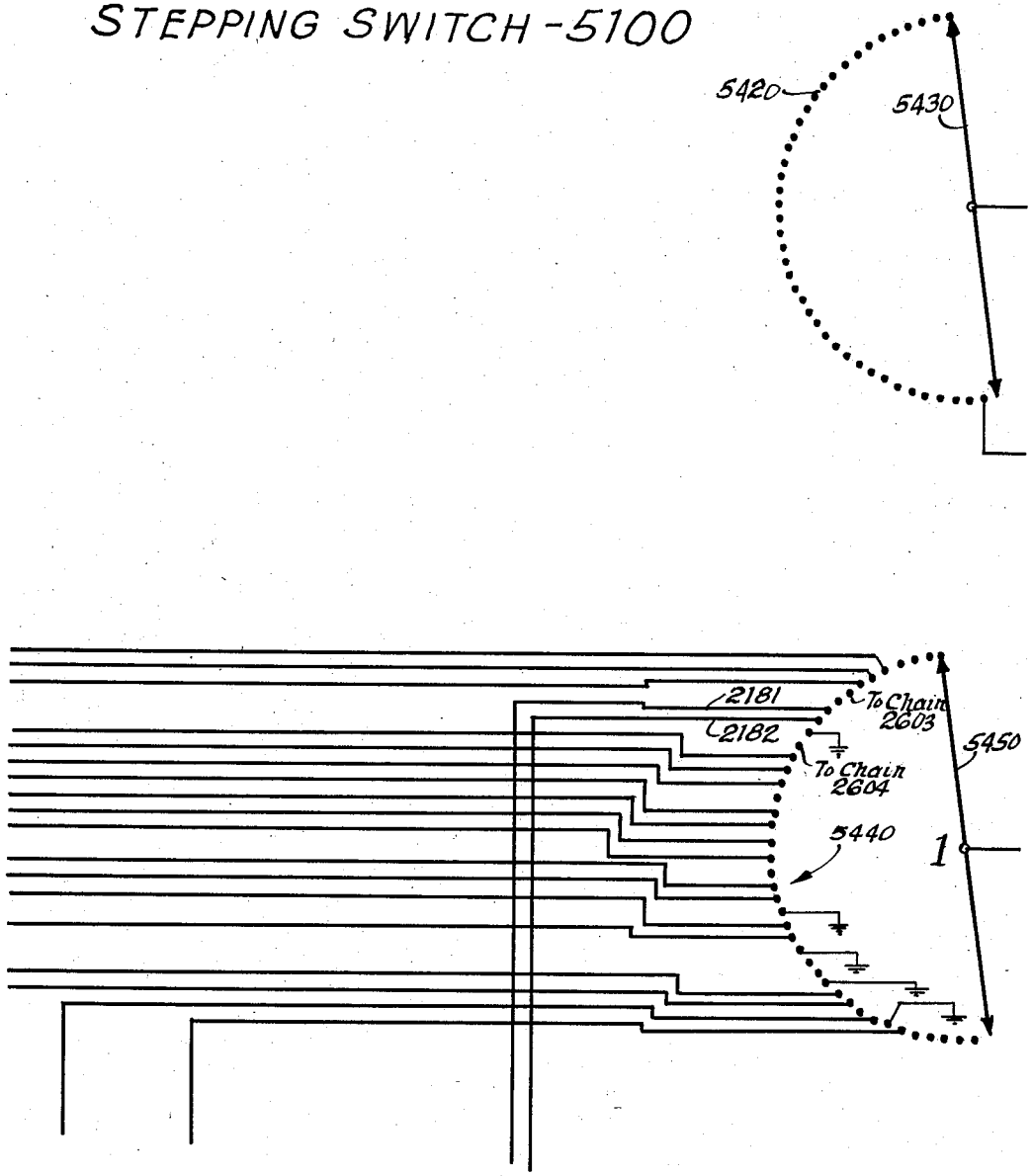
Figure 55:
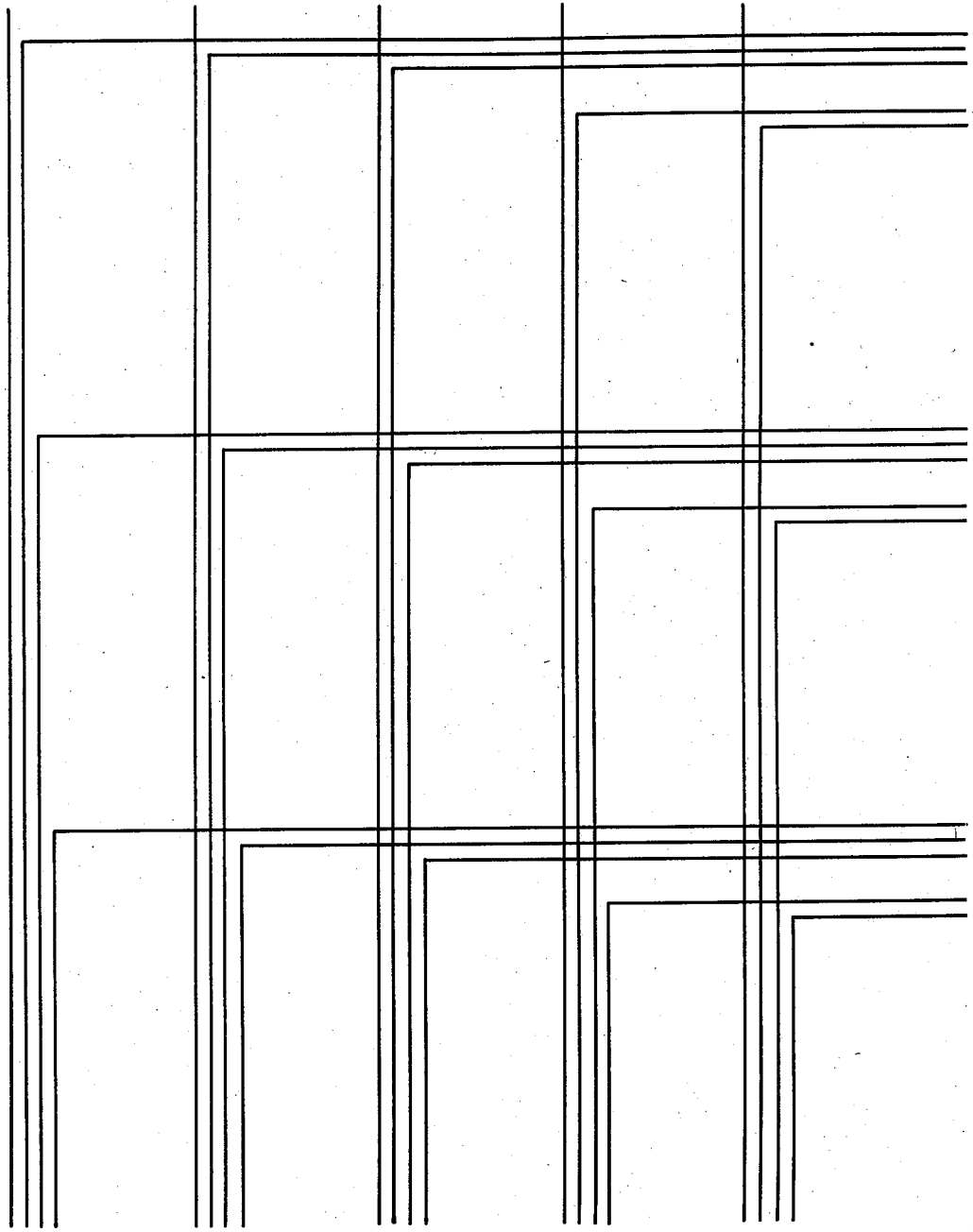
Figure 56:
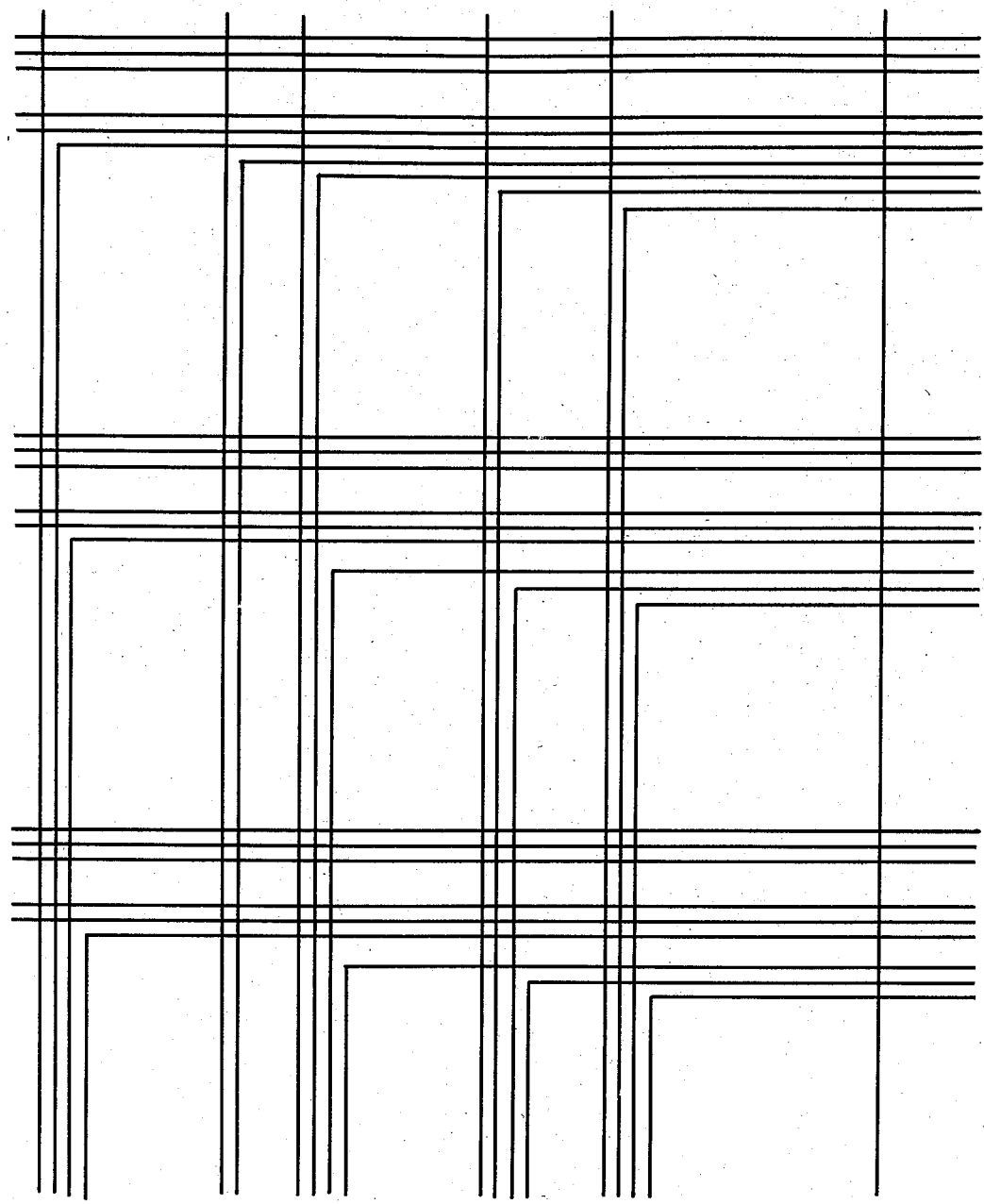
Figure 57:
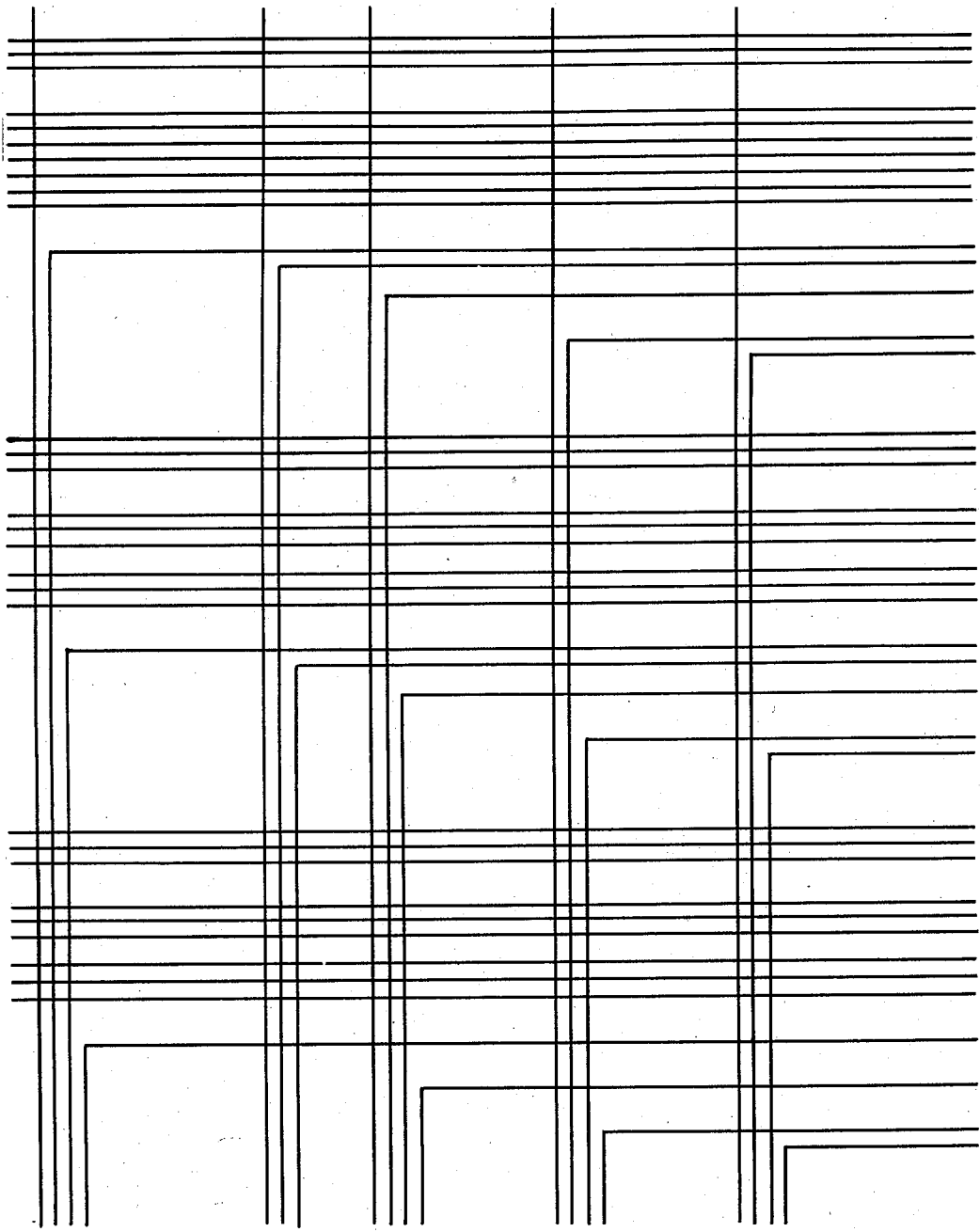

At the beginning of the cycle of rotation in which the carriage return operation controlled by the contacts forming the forty-first stepping position, the movement of the read cam 7260 beyond its normal position opens the contacts 7261 to sequentially release the switch relay 5010 and the motor magnet 4950. The release of the switch relay 5010 disconnects the wipers of the stepping switch 5100 from the operating windings of the decoding relay circuit 7000 so that the relays therein and the magnets in the internal printer control circuit 7100 operated under the control of the contacts forming the forty-first stepping position are released. The release of the motor magnet 4950 moves the wipers controlled thereby into engagement with the contacts forming the forty-second stepping position. As shown in Figs. 54 and 75 of the drawings, in the forty-second stepping position, none of the contacts forming the contact banks 5440, 5800, 5820, 5840, 6200, 6220, 6240, 6600, 6620 and 6640 are connected to ground. However, the forty-second contact in the contact bank 5420 is connected directly to the lower operating winding of the reset relay 4820. The wiper 5430 which engages the contacts forming the banks 5420 is connected directly to the contacts 5011 controlled by the switch relay 5010. Since these contacts are now open, ground is not applied to the wiper 5430.

After the read cam 7260 has rotated through approximately 90° of the cycle of rotation during which the carriage return operation initiated by the contacts forming the forty-first stepping position is executed, the contacts 7261 are reclosed. The closure of the contacts 7261 sequentially operates the switch relay 5010 and the motor magnet 4950. The operation of the motor magnet 4950 conditions the wipers controlled thereby for movement into engagement with the contacts forming the first stepping position of the switch 5100. The operation of the switch relay 5010 interconnects the wipers of the stepping switch 5100 with the operating windings of the decoding relay circuit 7000. However, the interconnection of the stepping switch 5100 with the circuit 7000 is without effect at this time inasmuch as none of the wipers associated with the contact banks one to nine inclusive, and zero are grounded. However, the closure of the contacts 5011 applies ground through the wiper 5430 and the forty-second contact in the bank 5420 to the lower operating winding of the reset relay 4820 to operate this relay. The operation of the reset relay 4830 initiates a resetting and priming operation of the printing control circuit 35.

As the cams 7190 and 7260 return to their normal position, the contacts 7250 are closed. The closure of the contacts 7250 does not operate any of the magnets in the internal printer control circuit 7100 inasmuch as none of the decoding relays in the decoding relay circuit 7000 have been operated under the control of the contacts forming the forty-second stepping position of the switch 5100. Therefore, since the one revolution clutch magnet 7180 is not operated, the clutch cam 7190 and the read cam 7260 stop in their normal positions as shown in Figs. 71 and 72 of the drawings. Since the read cam 7260 stops in its normal position the contacts 7261 are held closed so that the switch relay 5010 and the motor magnet 4950 remain operated. In the operated condition of the motor magnet 4950, the wipers of the stepping switch 5100 are conditioned for movement into engagement with the contacts forming the first stepping position but are in engagement with the contacts forming the forty-second stepping position. However, incident to the resetting operation initiated by the operation of the reset relay 4820, the switch relay 5010 and, accordingly, the motor magnet 4950 are released, as will be described in detail hereinafter, so that the wipers are moved into engagement with the contacts forming the first stepping position to condition the stepping switch 5100 for another cycle of operation identical to that described hereinabove wherein information relating to a second toll call is transferred to the printer 36 to control the operation of this printer to produce a toll ticket 7900 relating to a second toll call.

The interposition of the three carriage return operations following the production of the seventh line of printed information on the toll ticket 7900 provides a space equal to nine lines on the toll ticket 7900 immediately following the last printed line to space the end of the toll ticket 7900 from the last printed line.

In summary, the printing control circuit 35, during the portion of its cycle of operation in which the toll ticket 7900 is printed, sequentially advances the stepping switch 5100 to engage the contacts forming successive stepping positions so that the items of information provided by the destination relay circuit 2150, the cost computer 39, and the plurality of storage chains 38 are sequentially transmitted to the internal printer control circuit 7100 to control the operation of the printer 36. During each cycle of operation, the printer 36 prints the previously established item transmitted from the stepping switch 5100 while the decoding relay circuit 7000 is selectively operated to establish the next item of information which is to be printed on the next succeeding cycle of operation. The sequential operation of the printer 36 under the control of the decoding relay circuit 7000 is terminated after forty-two stepping operations of the switch 5100 by completing a circuit through the auxiliary bank of contacts 5420 to operate the reset relay 4820.

*Resetting the printing control circuit 35*

Following the production of the toll ticket 7900 containing the items of information relating to a particular toll call, the printing control circuit 35 is operated not only to reset the printing control circuit 35 but also to prepare the plurality of storage chains 38 and the cost computer 39 for receiving items of information pertaining to the next toll call registered on the magnetic tape 1601 of the seized trunk recorder 25. To accomplish this, the information previously manifested by the plurality of storage chains 38 and the cost computer 39 is removed and the cost computer 39 is primed with information pertaining to the minimum duration of the toll call and the monetary charge to be assessed for calls extending to the called exchange represented by the selective operation of one of the destination relays 2120 or 2140.

The resetting of the control circuit 35 is initiated by the application of ground through the wiper 5430 to the lower operating winding of the reset relay 4820 in response to the movement of the wipers of the stepping switch 5100 into engagement with the contacts forming the forty-second stepping position thereof. This ground operates the reset relay 4820 to open the contacts 4821, 4823, 4824, 4825, 4826, 4828, 4829 and 4821a, and to close the contacts 4822, 4827 and 4822a.

The closure of the contacts 4822 and the opening of the contacts 4823, 4825, 4826 and 4829, and the contacts (not shown), resets the storage chains 38 and conditions them for operation under the control of the groups of mark pulses representing the items of information pertaining to the next toll call recorded on the tape 1601 in the seized recorder 25 in the manner described hereinabove. The closure of the contacts 4822a, and the closure of the contacts 4827 to operate the reset relays 4840 and 4930, resets the steering circuit 37 and the cost computer 39, and conditions them for operation under the control of the next succeeding groups of mark pulses received from the seized trunk recorder 25.

The opening of the contacts 4824 interrupts the operating circuit for the lower operating winding of the end-of-call relay 4910 and also extinguishes the end-of-call tube 4810 so that this tube is in condition to receive the next pair of simultaneous mark and space pulses representing the end of the next succeeding toll call. The deenergization of the lower operating winding of the end-of-call relay 4910 does not release this relay inasmuch as it is maintained operated by the upper winding thereof through the locking circuit provided by the closed contacts 4912 and 4942. The opening of the contacts 4821a breaks the operating circuit for the call complete relay 4830 and the call complete tube 4510 so that the tube 4510 is rendered non-conductive and the call complete relay 4830 is released to close the contacts 4833 and 4831, and to open the contacts 4832.

The closure of the contacts 4833 connects ground to the conductor 1943 extending to the playback control circuit 30 to complete one portion of the locking circuit for the incomplete call relay 1940 but this relay does not operate since the contacts 1941 are open. The incomplete call relay 1940 was released to open the contacts 1941, as described hereinabove, in response to the removal of ground from the conductors 1943 and 1956, to indicate that all of the items of information necessary to produce a printed toll ticket for a single toll call had been properly registered.

The closure of the contacts 4831 applies ground from the closed contacts 4911 to the upper operating winding of the reset relay 4820 so that this relay remains operated over the locking circuit completed thereby when ground is removed from the lower operating winding thereof in response to the movement of the wipers of the switch 5100 into engagement with the contacts forming the first stepping position.

The opening of the contacts 4832 removes ground from the conductor 3419 which extends to the cost computer 39 so that the prepare-to-read relays 3410, 3430 and 3440 therein are sequentially released. The opening of the contacts 4832 also removes ground from the prepare-to-read relay 5020 so that this relay releases to open the contacts 5021, 5021a, 5021b, 5022, 5023, 5024 and 5025.

The opening of the contacts 5021 removes ground from the operating winding of the switch relay 5010 so that this relay releases to open the contacts 5011 and 5012, and the plurality of contacts interconnecting the stepping switch 5100 with the decoding relay circuit 7000. The opening of the contacts 5012 interrupts, at a second point, the circuit for applying ground from the contacts 4821 of the reset relay 4820 to the internal printer control circuit 7100. The opening of the plurality of contacts interconnecting the stepping switch 5100 with the decoding relay circuit 7000 completes the preparation of the decoding relay circuit 7000 for operation under the control of the information manifested by the selective grounding of the contacts forming the first stepping position of the switch 5100 when the printing control circuit 35 is next energized to initiate the printing of a toll ticket 7900.

The opening of the contacts 5011 removes ground from the operating winding of the motor magnet 4950 so that the wipers controlled thereby are moved into engagement with the contacts forming the first stepping position of the switch 5100. This movement does not operate the decoding relay circuit 7000 inasmuch as these wipers are disconnected therefrom in response to the release of the switch relay 5010.

The opening of the contacts 5021a and 5021b removes ground from the conductors 4115 and 2813 which extends to the control electrodes of the drive tubes 2810 and 4110 in the tens minutes elapsed time counting chain 2800 and the tens months counting chain 4100, respectively. The removal of ground therefrom conditions these drive tubes for operation under the control of the groups of mark pulses representing the items of information pertaining to the next toll call recorded in the seized trunk recorder 25.

The opening of the contacts 5023 removes the low resistance shunt from the potentiometer 2740 so that the plurality of counting tubes in the storage chains 38 are again provided with the normal positive operating bias. The opening of the contacts 5024 and 5025 removes ground from the conductors 4515 and 4535 so that the ground shunt is removed from around the cathode resistor of the plurality of prime tubes in the storage chains 38 whereby these tubes are capable of being rendered selectively conductive in the manner described above. The opening of the contacts 5022 releases the second prepare-to-read relay 5030 and the third prepare-to-read relay 5040 so that the contacts 5031, 5032 and 5041 are released. The opening of the contacts 5032 and 5041 produces the same function as the opening of the contacts 5024 and 5025 so that the ground shunt is removed from around the cathode resistor of some of the prime tubes in the plurality of storage chains 38. The opening of the contacts 5031 interrupts the previously opened circuit extending from the contacts 4821 of the reset relay 4820 to the contacts 7250 controlled by the clutch cam 7190.

After a predetermined period of time, the prime relay 3480 in the cost computer 39 is operated to open the contacts 3487 thereby removing ground from the conductor 3495. The removal of ground from the conductor 3495 releases the slow-to-release relay 4940 so that the contacts 4942 and 4943 are opened and the contacts 4941 are closed. The removal of ground from the conductor 3495 indicates that the resetting and the priming of the cost computer 39 has been initiated.

The closure of the contacts 4941 applies ground to the operating winding of a slow-to-release chopping solenoid relay 4920 so that this relay is operated to close a pair of contacts 4921. The closure of the contacts 4921 applies ground to the operating winding of a rotary chopping solenoid 7230 (Figs. 72 and 77) to operate this solenoid. The operation of the chopping solenoid 7230 rotates a cutter blade 7710 (Figs. 76–78, inclusive) to sever the paper tape 7605 adjacent the end of a guideway 7720. The guideway 7720 is equal in length to the length of a single toll ticket 7900 so that when the chopping solenoid 7230 is energized to sever the paper tape 7605, a single printed ticket 7900 is produced containing the items of information relating to the preceding toll call. The toll ticket 7900 produced by this severing operation does not include the items of information just printed inasmuch as the severing position is physically spaced from the typing position of the printer 36 by distance equal to the length of a single toll ticket 7900. The chopping solenoid 7230 is also provided with a switch 7240 which may be manually operated to actuate the severing mechanism of the printer 36.

The opening of the contacts 4943 interrupts, at a second place, the ground path for the clutch conductor 4945 extending from the open contacts 4914. The opening of the contacts 4942 removes ground from the locking circuit for the end-of-call relay 4910 which extends through the closed contacts 4912 so that this relay is released to open the contacts 4911, 4912 and 4913 and to close the contacts 4914. The opening of the contacts 4942 also removes ground from the conductor 4916 which produces no useful function at this time since the contacts 2113 are open.

The opening of the contacts 4913 removes ground from the conductor 4915 so that the end-of-call relay 1860 in the playback control circuit 30 is released, thereby closing the contacts 1861. The closure of the contacts 1861 prepares an operating circuit for the second dismiss relay 1890 and the first dismiss tube 1880 so that, as described in detail hereinabove, the playback control circuit 30 is enabled to dismiss the seized trunk recorder 25, and one-way trunk circuit 19 in response to the sequential closure of the foil contacts 1206 and 1207 if this is the last call recorded on the magnetic tape 1601 in the seized recorder 25. The closure of the contacts 4914 applies ground to the open contacts 4943 which are connected to the clutch conductor 4945.

The opening of the contacts 4912 opens the locking circuit previously opened by the opening of the contacts 4942 to condition the end-of-call relay 4910 for another cycle of operation. The opening of the contacts 4911 removes ground from the upper operating winding of the reset relay 4820 so that this relay is released. The reset relay 4820 is released in response to the opening of the contacts 4911 inasmuch as the previous movement of the wipers of the stepping switch 5100 into engagement with the contacts forming the first stepping position removed ground from the lower operating winding of the reset relay 4820.

The release of the reset relay 4820 closes the contacts 4821, 4823, 4824, 4825, 4826, 4828, 4829 and 4821a, and opens the contacts 4822, 4827 and 4822a. The opening of the contacts 4822, 4827 and 4822a and the closure of contacts 4823, 4825, 4826 and 4829 produces the same function as that described above in conjunction with the description of the release of the reset relay 4820. The closure of the contacts 4821 reapplies ground to the open contacts 5012 to condition the decoding relay circuit 7000 and the internal printer control circuit 7100 for an additional cycle of operation under the control of the items of information representing the next toll call. The closure of the contacts 4824 reconditions the lower operating winding of the end-of-call relay 4910 for operation under the control of the next pair of simultaneous mark and space pulses. The closure of the contacts 4821a connects the operating winding of the call complete relay 4830 with the output anode of the call complete tube 5510 so that this relay is conditioned for operation in response to the receipt of adequate information pertaining to the next toll call to initiate the operation of the printer 36.

After a predetermined period of time sufficient for the cost computer 39 to be reset and primed with items of information relating to the base time and the minimum charge to be assessed for calls extending to the called exchange represented by the operation of one of the destination relays in the destination relay circuit 2150, the prime relay 3480 in the cost computer 39 is released to apply ground to the conductor 3495. The application of ground to the conductor 3495 operates the relay 4940, to close the contacts 4942 and 4943, and to open the contacts 4941. The opening of the contacts 4941 removes ground from the operating winding of the chopping solenoid relay 4920 to release this relay to open the contacts 4921. The opening of the contacts 4921 removes the energization from the operating winding of the chopping solenoid 7230 so that this solenoid is returned to its normal position.

The closure of the contacts 4942 prepares the locking circuit for the end-of-call relay 4910. The closure of the contacts 4943 applies ground from the closed contacts 4914 to the clutch conductor 4945 so that the clutch magnet 1204 in the seized trunk recorder 25 is energized to initiate the advancement of the magnetic tape 1601 therein so that the items of information pertaining to the next toll call are sequentially transmitted to the storage chains 38, the steering circuit 37 and the cost computer 39.

A manual switch 4938 is provided in the printing control circuit 35 to permit the operation of the toll ticketing facilities without the inclusion of the cost computer 39. When closed, the switch 4938 interconnects the operating winding of the relay 4940 with the contacts 4828 controlled by the first reset relay 4820. Since the contacts 4828 are normally closed, the relay 4940 is maintained normally operated in a manner similar to that in which the normally closed contacts 3487 maintain this relay operated. The opening of the contacts 4828 in response to the operation of the reset relay 4820 releases the slow-to-release relay 4940 to produce the same functions as are produced by the operation of the prime relay 3480 in the cost computer 39.

Obviously, if the cost computer 39 is not utilized in the toll ticketing facilities, the need for the plurality of connections between this circuit and the destination relay circuit 2150, the elapsed counter 3000, and the printing control circuit 35 is obviated. When the cost computer 39 is utilized, the switch 4938 must be opened since it is necessary to control the operation of the relay 4940 from the contacts 3487 controlled by the prime relay 3480 in the cost computer 39 in order to insure that the cost computer is properly reset and conditioned for a cycle of operation before the re-operation of the relay 4940.

Accordingly, in response to the completion of the printing of the toll ticket 7900 containing all of the items of information relating to a complete toll call, the printing control circuit 35 is actuated under the control of the stepping switch 5100 to initiate a resetting and priming operation. During this resetting operation, the printing control circuit 35 is returned to its normal condition so that it may be selectively set in operation in response to the receipt of information from the magnetic tape 1601 of the seized recorder 25 that all of the items of information pertaining to the next recorded toll call have been transmitted to the cost computer 39 and the plurality of storage chains 38. This information is manifested in the printing control circuit 35 by the operation of the end-of-call relay 4910 in response to the application of the end-of-call code to the tube 4810. The resetting of the printing control circuit 35 also reconditions the call complete relay 4830 and the call complete tube 4510 so that these two elements may be reoperated under the control of the prime tube 4530 in the units days counting chain 4600 to indicate that all of the items of information pertaining to the next following toll call have been registered in the plurality of storage chains 38 and the cost computer 39.

The operation of the reset relay 4820 initiates the release of the prepare-to-read relays 5020, 5030 and 5040 which, together with the release of the reset relay 4820, remove the previous manifestations in the plurality of storage chains 38 and the cost computer 39 and primes the cost computer 39 with items of information pertaining to the minimum base time period and minimum charge assigned to calls extending to the called exchange represented by the selective operation of one of the destination relays 2120 or 2140. The sequential operation and release of the reset relay 4820 also conditions the steering circuit 37 so that a positive bias is applied to the control electrode of the counting chain 2600 so that this counting chain is rendered responsive to the first group of mark pulses representing the first digit of the number of the calling subscriber initiating the next toll call recorded on the magnetic tape 1601 of the seized recorder 25. Following these resetting and priming operations, the clutch conductor 4945 is grounded to operate the clutch magnet 1204 in the seized recorder 25 to initiate movement of the magnetic tape 1601 therein so that the items of information pertaining to the next toll call are transmitted to the plurality of storage chains 38, the cost computer 39 and the steering circuit 37.

*Release of the printing control circuit 35*

The printing control circuit 35, the steering circuit 37, the storage chains 38, the cost computer 39, and the printer 36 are sequentially operated under the control of the plurality of groups of mark pulses representing the items of information pertaining to the successive toll calls recorded in the seized recorder 25 until such time as a toll ticket is produced containing the items of information relating to the last call recorded on the tape 1601 of the seized recorder 25. Assuming that the last series of groups of mark pulses recorded on the tape 1601 of the seized recorder 25 representing the last toll call are terminated before the end of the magnetic tape 1601 is reached, the printing control circuit 35 is operated to reset and prime all of the plurality of circuits controlled thereby in response to the movement of the wiper 5410 into engagement with the forty-second contact in the contact bank 5400. Incident to this resetting and priming operation the end-of-call relay 4910 is released to open the contacts 4913. The opening of the contacts 4913 removes ground from the operating winding of the end-of-call relay 1860 in the playback control circuit 30 so that the contacts 1861 are closed thereby enabling the second dismiss relay 1890 in the playback control circuit 30 to complete the release of the seized trunk recorder 25 and its associated one-way trunk circuit 19.

Also incident to the resetting and priming operation of the printing control circuit 35 in response to the production of the last toll ticket 7900, the relay 4940, is released and then reoperated. In reoperating, the relay 4940 closes the contacts 4943 so that ground is applied to the clutch conductor 4945. The application of ground to this conductor operates the clutch magnet 1204 in the seized recorder 25 so that movement of the magnet tape 1601 therein is initiated. This movement of the tape continues until such time as the contacts 1206 and 1207 are sequentially closed. As described in detail hereinabove, the sequential closure of the foil contacts 1206 and 1207 initiates the operation of the playback control circuit 30 to release the seized recorder 25 and its associated one-way trunk circuit 19. This releasing operation can be completed inasmuch as the previous release of the end-of-call relay 4910 in the printing control circuit 35 releases the end-of-call relay 1860 in the playback control circuit 30 to close the contacts 1861.

Accordingly, when the magnetic tape in the seized recorder 25 is not filled with items of information thereby to initiate an emergency start condition in the playback control circuit 30, the termination of the printing of the last toll ticket by the printer 36 under the control of the printing control circuit 35 enables the playback control circuit 30 to release the seized recorder 25 and its associated one-way trunk circuit 19 when the end of the tape 1601, as signified by the sequential closing of the foil contacts 1206 and 1207, is reached.

However, when the printing control circuit 35, the steering circuit 37, the storage chains 38 and the cost computer 39 are connected to a filled trunk recorder 25 in response to an emergency start condition in the playback control circuit 30, the foil contacts 1206 and 1207 are sequentially closed to indicate that the end of the magnetic tape 1601 in the seized recorder 25 has been reached before the items of information pertaining to the last toll call recorded thereon have been transmitted to the steering circuit 37, the storage chains 38 and the cost computer 39. Inasmuch as these items of information have not been transmitted, the production of a toll ticket containing these items of information cannot be completed if the seized trunk recorder 25 is dismissed in response to the closure of the contacts 1206 and 1207. Therefore, the playback control circuit 30 must be instructed to hold the seized one-way trunk circuit 19 and its associated trunk recorder 25 until such time as the items of information have been completely removed from the tape 1601 and utilized by the printer 36 to produce a printed record containing these items of information.

As shown on the tape segment 1601b in Fig. 80 of the drawings, during the time that the information relating to the last toll call recorded on the seized and filled recorder 25 is being transmitted to the storage chains 38, the cost computer 39, and the steering circuit 37, the foil contacts 1206 and 1207 are sequentially closed in response to the movement of the foils 1650 and 1651 past the contact fingers 1652, 1653 and 1654. Normally, the sequential closure of these contacts initiates the operation of the playback control circuit 30 to release the seized recorder 25 and its associated one-way trunk circuit 19. However, to complete this releasing operation, the dismiss relay 1890 in the playback control circuit 30 is operated in response to the firing of the tube 1880 after a time delay determined by the size of the capacitor 1882 and the resistor 1881. The time delay required to charge the condenser 1882 is greater than the time needed to record the time and date information following the forced disconnect of the call in response to the closure of the foil contacts 1207. Accordingly, the closure of the contacts 1206 and 1207 during the playback of a filled recorder 25 initiates the charging of the condenser 1882 for the period of time equal to the length of time required to transmit the time and date information pertaining to the forcibly disconnected call on the magnetic tape 1601 of the seized recorder 25. Following the transmission of this date and time information, an end-of-call code is transmitted to the printing control circuit 35 from the filled recorder 25 to fire the tube 4810.

Rendering the tube 4810 conductive operates the end-of-call relay 4910 so that the contacts 4914 are opened and the contacts 4911, 4912 and 4913 are closed. The closure of the contacts 4911 and 4912 produce the same functions described above to initiate the normal printing operation of the printing control circuit 35. The closure of the contacts 4913 applies ground to the operating winding of the end-of-call relay 1860 so that this relay operates to open the contacts 1861. The opening of the contacts 1861 interrupts the charging circuit for the condenser 1882 so that the tube 1880 and, accordingly, the second dismiss relay 1890 cannot be operated to release the seized recorder 25 and its associated one-way trunk circuit 19. The opening of the contacts 4914 interrupts the energizing circuit for the clutch magnet 1204 in the seized recorder 25 so that the magnetic tape 1601 is no longer advanced.

Following the closure of the contacts 4911 and 4912, the printing control circuit 35, the stepping switch 5100, the decoding relay circuit 7000, the internal printer control circuit 7100, and the printer 36 operate, as described in detail hereinabove, to produce a printed toll ticket containing all of the items of information relating to the last toll call recorded in the filled and seized trunk recorder 25. In response to the termination of the printing of this last toll ticket, a resetting and priming operation of the printing control circuit 35 is initiated. Incident to this resetting and priming operation, the end-of-call relay 4910 is released to open the contacts 4911, 4912, 4913 and to close the contacts 4914. The opening of the contacts 4911 and 4912 performs the same functions as described hereinabove in conjunction with the resetting of the printing control circuit 35 upon completion of the printing of the ticket containing items of information relating to a normal toll call. The opening of the contacts 4913 releases the end-of-call relay 1860 so that the contacts 1861 are reclosed. This closure of the contacts 1861 reestablishes the charging circuit for the condenser 1882 so that a charge is added to the charge originally established on this condenser prior to the opening of the contacts 1861 so that following the predetermined time interval indicated in Fig. 80 of the drawings, this tube fires to operate the second dismiss relay 1891 and thereby completes the release of the seized one-way trunk circuit 19 and its associated trunk recorder 25.

The closure of the contacts 4914 together with the operation of the relay 4940 to close the contacts 4943, applies ground to the clutch conductor 4945 so that the magnetic tape 1601 in the seized recorder 25 is advanced through the remainder of the predetermined distance indicated at C in Fig. 80 of the drawings whereby the magnetic tape 1601 in the recorder 25 is spaced from the heads 1201 and 1202 a sufficient distance to prevent the first call recorded on this tape from being distorted by the application of mark and space pulses thereto in the event that this recorder is again filled to initiate an emergency start condition in the playback control circuit 30.

Accordingly, when a trunk recorder 25 is filled with items of information pertaining to toll calls to initiate an emergency start condition in the playback control circuit 30, the end-of-call relay 1860 which is controlled by the printing control circuit 35 positively prevents the release of this seized recorder 25 and its associated one-way trunk circuit 19 until such time as the printing control circuit 35 informs the playback control circuit 30 that a printed ticket has been produced containing the items of information relating to the last call recorded on the magnetic tape 1601 of the seized and filled recorder 25.

The resetting and priming of the printing control circuit 35 following the production of a toll ticket containing the items of information relating to the last toll call recorded in either a completely or partially filled and seized trunk recorder 25 primes the cost computer 39 with items of information pertaining to the minimum base time and the minimum base charge to be assessed for calls extending to the particular called exchange represented by the selective operation of one of the destination relays in the destination relay circuit 2150. Since this seized trunk recorder and its associated one-way trunk circuit, which extends to a particular called exchange, are released following the production of the last toll ticket, the information primed into the cost computer 39 is incorrect if the next seized trunk recorder 25 is associated with a one-way trunk circuit extending to a called exchange other than that identified by the previously operated destination relay in the relay circuit 2150.

More particularly, in the example described above, it was assumed that the operated destination relay 2140 represented a called exchange designated by the alphabetical characters "PI." The operation of this relay provided the cost computer 39 with information indicating that the minimum base time period assigned to calls extending to the exchange "PI" is three minutes and further, that the charge to be assessed for a call of three minutes duration is ten cents. If, following the release of the one-way trunk circuit 19 and its associated recorder 25, the playback control circuit 30 seizes a one-way trunk circuit and its associated recorder which extends to a called exchange designated by the alphabetical characters "EB," the relay 2120 is operated. For calls extending to the called exchange designated by the alphabetical characters "EB," the minimum base time period is five minutes, and the charge to be assessed for a call having this duration is fifteen cents, but, the cost computer 39 is now primed with information relating to the three minute call duration and the charge of ten cents.

The cost computer 39, therefore, is primed with incorrect information for controlling the production of the first toll ticket for the first call extending to the called exchange designated by the alphabetical characters "EB." However, this information does not produce an inaccurate toll ticket in response to the receipt of the groups of mark pulses representing the first toll call registered in the newly seized recorder 25 inasmuch as the operation of one of the destination relays in the destination relay circuit 2150 initiates a resetting and priming operation of the printing control circuit 35 in response to the seizure of each one-way trunk circuit. This resetting operation removes the incorrect information primed into the cost computer 39 and conditions the cost computer 39 in accordance with the information provided by the operation of the destination relay corresponding to the destination to which the newly seized one-way trunk circuit extends.

In summary, when the toll ticketing facilities are associated with a seized recorder 25 which has been only partially filled with items of information relating to successively placed toll calls, the completion of the printing of the last toll ticket initiates a resetting operation of the circuit 35, following which ground is applied to the clutch conductor 4945. The application of ground to the conductor 4945 operates the clutch magnet 1204 in the seized recorder to advance the tape 1601 to initiate sequential closure of the contacts 1206 and 1207. The closure of the contacts 1206 and 1207 operates the playback control circuit 30 as described in detail hereinabove to dismiss the seized recorder 25 and its associated one-way trunk circuit.

When the toll ticketing facilities are associated with a filled trunk recorder 25 thereby indicating that the operation of the printing control circuit 35 was initiated under emergency start conditions, the sequential closure of the contacts 1206 and 1207 during the playback of the items of information relating to the last call recorded on the tape of the seized recorder does not immediately release the seized trunk recorder. The sequential closure of the contacts 1206 and 1207 initiates a releasing operation of the playback control circuit 30, but this operation is not completed inasmuch as the printing control circuit 35 interrupts the charging of the condenser 1882 until such time as a ticket has been printed by the printer 36 containing the items of information relating to the last call recorded on the tape of the seized and filled recorder 25. Following the production of this toll ticket, the printing control circuit 35 permits the playback control circuit 30 to complete the releasing operation and to initiate the cyclic stepping of the stepping switch therein to search for and seize an additional idle one-way trunk circuit in the manner described hereinabove.

197

*Operation of the printing control circuit 35 during the playback of information relating to incomplete calls*

When a call which is extended to the called subscriber is not completed, as indicated by the failure to receive an answering signal from the called subscriber, it is not desired to print a toll ticket since such a ticket has no value for accounting purposes. As explained hereinabove, the trunk recorder 25 records the plurality of groups of mark pulses representing the magnitude of the digits forming the directory numbers of the called and calling subscribers even when the call is not completed. However, during these calls the clock and calendar circuit 27, the scanning circuit 28, and the timing source 36 are not connected to the trunk recorder 25 inasmuch as no duration of call information and no information pertaining to the time and date of the completion of the call is required. Therefore, as described hereinabove, following the eighth group of mark pulses representing the fourth digit of the called subscriber's number the one-way trunk circuit 19 produces an end-of-call code signal which is recorded on the magnetic tape 1601 of the recorder 25 immediately following the eighth group of mark pulses.

During a playback operation, when information pertaining to an incomplete call is transmitted from the seized recorder 25 to the steering circuit 37 and the storage chains 38, the steering circuit 37 and the counting chains 2601 to 2607, inclusive, are sequentially and selectively operated to electronically manifest the magnitude of the digits forming the directory numbers of the calling and called subscribers in the manner described above. However, in an incomplete call, the next item of information transmitted from the seized recorder 25 following the eighth group of mark pulses is an end-of-call signal.

This end-of-call signal comprises simultaneous pulses on the mark and space conductors 2080 and 2070, respectively, and renders the tube 4810 conductive. The firing of the tube 4810 operates the end-of-call relay 4910 to close the contacts 4911, 4912 and 4913 and to open the contacts 4914. The closure of the contacts 4912 completes the locking circuit for the end-of-call relay 4910 so that this relay remains operated.

The opening of the contacts 4914 removes ground from the conductor 4945 and, accordingly, from the operating winding of the clutch magnet 1204 in the seized recorder 25 so that the advance of the magnetic tape 1601 is stopped. The closure of the contacts 4913 operates the end-of-call relay 1860 in the playback control circuit 1830 which produces no useful function at this time.

The closure of the contacts 4911 applies ground through the closed contacts 4831 to energize the upper operating winding of the reset relay 4820 to operate this relay. Since the call complete tube 4510 and the relay 4830, and, accordingly, the contacts 4831 are controlled by the conductive or non-conductive state of the prime tube 4530 in the units days counting chain 4600, the fact that the tube 4510 is not rendered conductive is representative of the fact that all of the items of information necessary to produce a complete toll ticket have not been registered in the storage chains 38 and in the cost computer 39. Therefore, when the call complete relay 4830 is not operated, thus indicating that all of the items of information necessary to produce a complete toll ticket have not been registered, the operation of the end-of-call relay 4910 in response to the receipt of an end-of-call signal from the seized recorder 25 operates the reset relay 4820.

The operation of the reset relay 4820 initiates a resetting operation to remove the manifestations produced in the subscriber digit counting chains 2600 to 2607, inclusive, which manifestations are representative of the directory numbers of the calling and called subscribers involved in the incomplete call. The operation of the reset relay also conditions the cost computer 39, the steering circuit 37 and the remainder of the storage chains 38, for utilizing the next groups of mark pulses representing the items of information relating to the next toll call recorded in the seized trunk recorder 25.

Accordingly, the printing control circuit 35 prevents the production of a printed toll ticket when all of the items of information pertaining to a particular tool call are not properly registered. This is accomplished in the printing control circuit 35 by applying the ground pulse normally applied to initiate the sequential operation of the prepare-to-read relays 5020, 5030 and 5040 to the operating winding of the reset relay 4820 so that the steering circuit 37, the storage chains 38 and the cost computer 39 are reset to remove the manifestations produced therein of items of information relating to the incomplete call, and are conditioned for the receipt of the groups of mark pulses representing the items of information pertaining to the next toll call.

In the event that the incomplete call appears as the last call on the tape 1601 of the seized trunk recorder 25, the operation of the end-of-call relay 4910 to operate the reset relay 4820 resets the printing control circuit 35, the steering circuit 37, the storage chains 38 and the cost computer 39 and enables the playback control circuit 30 to release the seized recorder and the seized one-way trunk circuit in the manner described hereinabove.

Referring back to the initial operation of the printing control circuit 35 at the time when the trunk recorder 25 is first seized, the first item of information transmitted by the recorder 25 following the completion of the initial resetting operation is the end-of-call signal. Since the call complete relay 4830 is also in a released condition at this time, a second resetting operation is performed prior to the storage of the data pertaining to the first call which is stored on the tape of the seized recorder 25. This second resetting operation is similar to that performed on incomplete calls except that data will not be stored in any of the storage chains 38 at the time that this second resetting operation takes place.

In summary, therefore, the printing control circuit 35 including the destination relay circuit 2150, the stepping switch 5100, the decoding relay circuit 7000, and the internal printer control circuit 7100 receives the control over the seized trunk recorder 25 in response to the completion of the seizure thereof by the playback control circuit 30. Coincident with the seizure of the trunk recorder 25 and its associated one-way trunk circuit 19, a single relay is operated in the destination relay circuit 2150 to provide the cost computer 39 with information pertaining to the minimum time period and the charge to be assessed for this time period for calls extending to the exchange in which the seized one-way trunk circuit 19 is terminated. Upon receiving the control of the seized trunk recorder 25, the printing control circuit 35 initiates a series of cyclic operations during which the items of information pertaining to each of the plurality of toll calls are printed to provide discrete toll ticket containing all of the items of information pertaining to each completed toll call.

To accomplish this, the printing control circuit 35, simultaneously with the operation of one of the destination relays, initiates a resetting operation in which all of the storage chains 38, the cost computer 39, and the steering circuit 37 are cleared of any previous electronic manifestations. Thereafter, the cost computer 39 is provided with the information manifested by the selective operation of one of the destination relays in the circuit 2150 representing a minimum base time period and a minimum charge to be assessed for calls having a duration equal to or less than the recorded minimum period. The steering circuit 37 sequentially renders the plurality of storage chains 38 and the cost computer 39 effective to receive the groups of mark pulses representative of the items of information pertaining to the toll calls.

Upon the completion of the transmission and registration of this information, the end-of-call relay 4910 is operated to interrupt the movement of the magnetic tape 1601 in the seized recorder 25 and the call complete relay 4830 is operated to initiate the sequential operation of the prepare-to-read relays 5020, 5030 and 5040. In response to the operation of these relays, the plurality of counting chains forming the storage chains 38 are conditioned for transmitting the information electronically manifested therein to the stepping switch 5100. The operation of the prepare-to-read relays also initiates rotation of the control cams 7190 and 7260 in the internal printer control circuit 7100 so that, under the control of these cams, the stepping switch 5100 is advanced to sequentially engage the contacts forming each of forty-two separate stepping positions.

As the wipers of the stepping switch 5100 are moved into engagement with the contacts forming each of the stepping positions, they are connected to the decoding relay circuit 7000 so that the information provided by the stepping switch 5100 in the form of selectively grounded wipers is decoded in this circuit and transmitted to the internal printer control circuit 7100 to control the operation of the printer 36 to print a visible record of the items of information pertaining to each of the toll calls. The stepping switch 5100 is provided with information from the destination relay circuit 2150, which is representative of the alphabetical designation of the called exchange, the storage chains 38 and cost computer 39, which is manifested by the conductive state of one of a plurality of tubes forming each of the counting chains in the storage chains 38, and from certain contacts of the contact banks associated with the stepping switch 5100 which are wired directly to ground to represent such information as a carriage return operation for the printer 36, or the year in which the toll calls are completed.

Following the completion of the printing of each toll ticket, the printing control circuit 35 is reset, and in doing so, resets and primes the plurality of storage chains 38, the steering circuit 37, and the cost computer 39. The printing control circuit 35 continues to control the operation of the printer 36 to produce the toll tickets until such time as the last information recorded in the seized trunk recorder 25 has been utilized to produce a complete toll ticket. At this time, the printing control circuit 35, together with the playback control circuit 30, dismisses the seized trunk recorder 25 and its associated one-way trunk circuit 19 so that the playback control circuit 30 can search for and seize an additional idle one-way trunk circuit and its associated recorder.

The printing control circuit 35 is also provided with information from the units days counting chain 4600 indicating that all of the items of information representing a complete call has been properly registered. The lack of an indication from the call complete tube 4510 prevents the printing control circuit 35 from initiating a printing operation and thereby positively prevents the production of toll tickets in response to calls which are not completed. In addition, the printing control circuit 35 controls the incomplete call relay 1940 in the playback control circuit 30 so that this relay is released in response to the completion of the registration of all of the items pertaining to a single toll call during the seizure of a particular trunk recorder 25 thereby indicating that the printing control circuit 35 and the circuits associated therewith are operating properly. During the emergency playback of a filled trunk recorder 25, the printing control circuit 35 and the playback control circuit 30 are so interlocked that all of the items of information pertaining to the last call on the filled tape are utilized to produce a printed ticket before the playback control circuit 30 is enabled to release the seized recorder and its associated one-way trunk circuit.

TICKET SEVERING AND STACKING MECHANISM
7600

The ticket severing and stacking mechanism 7600 (Figs. 76 to 78, inclusive) receives the printed end of the paper tape 7605, which is intermittently advanced through the printer 36, and severs the end portion of the tape 7605 to produce a toll ticket 7900. This mechanism is disclosed and also claimed in the copending application of Howard S. Gleason, Serial No. 397,185, filed December 9, 1953, and entitled, "Toll Ticket Cutting and Stacking Apparatus." Generally, the mechanism 7600 includes a severing means, which is selectively operated under the control of the printing control circuit 35, and a ticket ejecting and stacking mechanism indicated generally by the reference numeral 7602. The ticket ejecting and stacking mechanism 7602 removes the completed toll ticket 7900 from the severing position and, thereafter, discharges the ticket into a receptacle 7604 which is adapted to receive the plurality of toll tickets formed by the toll ticketing facilities.

In Fig. 76, the paper tape 7605 is fed from a supply roll (not shown) over a guide roller 7606 to a platen 7608 in the printer 36. The selected type bars in the printer 36 are moved into engagement with the paper tape 7605 in the position generally indicated as 7610 to print the selected characters thereon. A guide roller 7612 is provided for maintaining the paper tape 7605 in engagement with the resilient surface of the platen 7608. As described hereinabove, the platen 7608 is intermittently rotated to advance the paper tape 7605 through a plurality of line feed operations. As the paper tape 7605 is advanced beyond the platen 7608, it passes through the guideway 7720 which includes a pair of lip portions 7722 and 7724 which are adapted to maintain the paper tape in alignment with the severing and ejecting mechanism. As described hereinabove, the guideway 7720 is equal in length to the physical length of the toll tickets produced so that each printed ticket, upon completion of the printing thereof, extends between the printing position 7610 and the cutter bar 7710.

To provide a means for severing the tape 7605, the cutter bar 7710 cooperates with a fixed cutter bar 7626 which is positioned on a frame or supporting structure 7628. The movable cutter bar 7710 is rotated under the control of the rotary solenoid 7230 in a clockwise direction, as shown in Fig. 78 of the drawings, to sever the paper tape 7605. To provide a means for rotating the cutter blade 7710 under the control of the rotary solenoid 7230, the solenoid 7230 is provided with a shaft 7630 having a pin 7632 extending through one end thereof. The pin 7632 is received within a pair of slots 7634 in a sleeve 7636 which is formed integral with the cutter blade 7710. The pin 7632 is maintained in the slots 7634 by means of a compression spring 7638 which is interposed between the supporting structure 7628 and a stop member (not shown) on the shaft 7630. Accordingly, when the rotary solenoid 7230 is operated, the rotary motion thereof is transferred through the shaft 7630 to rotate the cutter blade 7710 in a clockwise direction to sever the paper tape 7605 immediately adjacent the fixed cutter blade 7626. A spring 7640 which is secured to the frame structure 7628 and to the cutter blade 7710 returns this cutter blade to its normal position following the removal of the energization from the solenoid 7230.

The upper surface of the frame member 7628 is provided with a pair of curved guide members 7642 and 7644 which are adapted to guide the paper tape fed from the guideway 7720 between a pair of rollers 7646 and 7648. The roller 7648 is continuously driven by a shaft 7650 which is connected to a continuously rotating motor 7652. The guide roller 7646 maintains the paper tape 7605 in engagement with the resilient outer surface of the roller 7648.

When the end of the tape 7605 is advanced into position between the rollers 7646 and 7648, the continuously driven roller 7648 tends to advance the tape 7605. However, the engagement of the guide roller 7612 with the paper tape 7605 prevents the paper tape 7605 from being advanced other than in response to the step-by-step rotation of the platen 7608. However, when the solenoid 7230 is energized to sever the tape 7605, the driven roller 7648 ejects the toll ticket produced by the severing action to the right as shown in Fig. 76 of the drawings. The severed toll ticket 7900, upon discharge by the ejecting means 7602, falls into the ticket stacking receptacle 7604.

The receptacle 7604 includes a supporting member 7660 which is resiliently supported from the bottom surface of the receptacle 7604 by a pair of springs 7662 and 7664. When the toll tickets are ejected into the receptacle 7604, they are stacked in a pile, as shown in Fig. 76 of the drawings, and, as the number of toll tickets 7900 increases, the springs 7662 and 7664 are compressed by the weight thereof to permit the receptacle 7604 to receive additional toll tickets 7900. One of the side walls of the receptacle 7604 is provided with an opening 7666 which extends through the entire height thereof and permits the pile of toll tickets to be removed from the receptacle 7604.

In operation, the platen 7608 is intermittently operated under the control of the internal printer control circuit 7100 to advance the paper tape 7605 over the guide roller 7606 and around the platen 7608 in a step-by-step manner in response to each carriage return and line feed operation of the printer 36. Between these advancing movements, the paper tape 7605 is imprinted by the printer 36 with visible characters representing the items of information pertaining to the toll calls. After a complete ticket 7900 has been printed by the printer 36, this ticket is positioned in the guideway 7720 between the printing position indicated at 7610 and the severing position formed by the cooperating cutter blades 7710 and 7626.

As described hereinabove, in response to the completion of the printing of a toll ticket, the chopping solenoid relay 4920 is energized to close the contacts 4921. The closure of the contacts 4921 energizes the rotary solenoid 7230 so that the shaft 7630 and the cutter blade 7710 are rotated in a clockwise direction. This clockwise rotation of the blade 7710 severs the paper tape 7605 adjacent the fixed cutter blade 7626 to produce the toll ticket 7900. The toll ticket produced by this severing action is not the toll ticket whose printing initiated energization of the solenoid 7230 but is the toll ticket previously produced under the control of the items of information pertaining to the next preceding toll call.

In response to the severing of the paper tape 7605, the continuously driven roller 7648 ejects the severed segment of the paper tape 7605 to the right, as shown in Fig. 76 of the drawings, so that the ticket drops into the receptacle 7604 as shown in dot-dash outline.

As described hereinabove, following a predetermined period of time the chopping solenoid relay 4920 is released to open the contacts 4921 thereby releasing the rotary solenoid 7230. When the solenoid 7230 is released, the spring 7640 rotates the cutter blade 7710 in a counterclockwise direction to return the blade to the position shown in Fig. 78 whereby the severing and stacking mechanism 7600 is conditioned for another cycle of operation identical to that described above in response to the completion of the printing of the next toll ticket. In summary, therefore, the ticket severing and stacking mechanism 7600 provides a means for severing the paper tape 7605 immediately following the printing of a toll ticket by the printer 36 and for thereafter ejecting the ticket produced by the severing action into a receptacle 7604 wherein this ticket is stored.

GENERAL SUMMARY

The toll ticketing facilities described hereinabove provide a completely automatic system for producing permanent records of items of information relating to telephone calls having an accounting value which is compatible with all types of automatic telephone equipment. The subscriber controlled verification means provides an economical manner of identifying the calling subscriber without the added expense of introducing automatic line identification equipment.

In this system, all of the information relating to calls extending to a particular called exchange is recorded in a single trunk recorder so that, when tickets are produced in response to the playback of this recorder, the volume of traffic directed to the called exchange is easily determined. Further, since all of the data is permanently recorded on a magnetically susceptible tape during each of the operations of the toll ticketing facilities, there is little opportunity for the loss of important information due to inadvertently released relays. Since the trunk recorder records the digits identifying the calling and called subscriber only for incomplete toll calls, a minimum amount of magnetic tape is expended for other than complete calls having an accounting value.

Since each of the trunk recorders 25 is capable of storing the items of information relating to a large number of toll calls, there is no need for printing the recorded information immediately following the completion of each toll call. Therefore, the trunk circuits extending to the called exchanges are released immediately following the recording of the items of information pertaining thereto so that these trunks are withheld from service for a minimum period of time. Also, since the conversion of the recorded information into printed toll tickets may be initiated at any selected time, due to the large storage capacity of the trunk recorders 25, it is possible to initiate the printing of the toll tickets at a selected time at which the volume of traffic is low so that the trunk circuits are always available for service during the periods of the day in which the volume of traffic is the highest. Even in the event that one of the trunk recorders 25 becomes filled with items of information before the predetermined time at which the playback operations are set to begin, the trunk circuit associated therewith is not withheld from service inasmuch as the filling of any of the trunk recorders 25 immediately initiates a playback of the filled recorder so that the trunk circuit associated therewith is returned to normal service without a costly delay.

Further, since the conversion of the recorded information is accomplished primarily through the use of electronic components, the magnetic tape in the recorders may be played back at a high rate of speed thus reducing the time during which the associated trunk circuit is out of service, even though the playback, or conversion, operations take place during the periods of time during which the volume of traffic is the lowest. This use of electronic components also reduces the physical size of the toll ticketing installation and, accordingly, reduces the amount of overhead charges inherent in large electromechanical installations of this type.

Although the conversion facilities utilize electronic components for the purpose of increasing the speed at which the conversion of the recorded information takes place, the recording of the information in the trunk recorders 25 is accomplished under the control of equipment which is adapted to operate on the conventional battery supply provided in all telephone exchanges. Since the recording equipment operates on the conventional battery supply, there is no need to provide any additional stand-by power supply equipment in order to maintain the recording facilities in an operating condition during power failure.

The equipment for converting the information recorded in the trunk recorders 25 into printed toll tickets is extremely flexible and may be varied or adapted to meet the different requirements of commercial application. For instance, the sequence in which the recorded information is printed on toll tickets by the printer 36 may be varied to provide a printed ticket with the information arranged in different lines or in different positions. Also, the nature of the cost computer 39 which is utilized in the conversion of the recorded information is inherently flexible in design to permit the assessment of varying charges in accordance with the called exchange and, further, to permit charges to be assessed at different rate bases for either selected minimum base periods of time or overtime periods.

We claim:

1. A telephone system comprising calling lines, called lines, means for establishing telephonic connections between said lines, register means controllable from said establishing means and including a storage medium for storing items of information relating to said telephonic connections, control indicia on the storage medium, recording means controlled by said register means and operative to produce a permanent record in accordance with the stored information, clock means for periodically rendering the recording means responsive to control by said register means, and means operated by the control indicia for also rendering the recording means responsive to control by said register means thereby to produce the permanent record.

2. In a telephone system, means for establishing a telephonic connection, storage means including magnetic means for storing items of information pertaining to a call placed over said connection, means controllable from said establishing means for recording said items on said magnetic means as a plurality of groups of discrete signals, a plurality of separate electronic registers each comprising a plurality of electronic devices operable to patterns of off and on conductive conditions representing an entered item, means for seizing said storage means and for converting the magnetically stored groups of discrete signals on said magnetic means into corresponding discrete groups of electrical signals, means for applying each of said discrete groups of electrical signals to a different one of said electronic registers to operate the electronic devices therein to a distinctive pattern of on and off conductive conditions representing the entered item of information and recording means controlled by said plurality of registers and operated in accordance with the on and off conductive patterns therein for producing a permanent record of the items of information.

3. In a telephone system, means for establishing a telephonic connection, recording means controllable from said establishing means for storing items of information pertaining to a call completed through said connection and for storing control signals, a plurality of means for registering the stored information, circuit means for disabling the control of said recording means from said establishing means and for operating said recording means to transmit said stored items and said control signals, means operated in response to the transmitted control signals for rendering the registering means operative in a predetermined sequence, and means operated in accordance with the stored information for operating the plurality of registering means in said sequence to register said items of information.

4. In a telephone system, means for establishing telephonic connections, means controlled from said establishing means for storing information relating to more than one call completed through said connections and for storing a reproducible control signal following each call, recording means controlled in accordance with the stored information for producing a permanent record thereof, an information channel interconnecting the storing means with the recording means, circuit means for rendering said storing means nonresponsive to control from said establishing means and for operating said storing means to transmit the stored information to said channel and to transmit said control signals, and means under the control of each transmitted control signal for controlling the transfer of the stored information relating to successive calls through the channel.

5. In a telephone system, means for establishing a telephonic connection, data storing means controlled by said connection establishing means for establishing coexisting registrations of items of information pertaining to a plurality of calls placed over said establishing means, register means including a plurality of electronic tubes, means controlled by said data storing means for operating said register means to render a selected group of said tubes conductive in accordance with items of information relating to one call completed through said connection, a recorder, means for operating said recorder in accordance with the conductive tubes to produce a permanent record of the items of information pertaining to said one call, and means controlled by the recorder following the production of the permanent record for rendering said tubes non-conductive and for initiating operation of the register means under the control of said data storing means to register the items of information relating to another call.

6. In a telephone system, means for establishing telephonic connections, register means controlled from said connection establishing means for registering items of information relating to a plurality of calls completed over said connections, the items of information pertaining to each call being followed by registered control indicia, recording means, means for rendering said register means nonresponsive to control from said connection establishing means and operative to supply the registered items to said recording means so that said recording means produces a permanent record thereof, and means controlled by said control indicia for intermittently operating said register means sequentially to transmit the items of information relating to each call to said recording means.

7. In a telephone system, means for establishing telephonic connections, first register means including a movable sensible medium means controlled from said establishing means for recording items of information relating to successive calls completed through said connections on said sensible medium, means for automatically recording control indicia on said sensible medium, following the recorded items pertaining to each of said successive toll calls, sensing means for sensing said medium and for reproducing said items of information and said indicia, recording means connected to said sensing means and operated in accordance with said reproduced information for producing a permanent record thereof, and control means connected to said sensing means and operated by the reproduced indicia for controlling the movement of the sensible medium thereby to render the recording means responsive to the registered information.

8. In a telephone system, means for establishing a plurality of telephonic connections, an endless loop of sensible medium, means controlled from said establishing means for storing items of information relating to all of a group of calls completed through said connections on said medium, means for storing control signals on said medium signifying the completion of the storage of the items pertaining to each of said calls, recording means operable to produce a permanent record of the stored items, a signaling link connected to said recorder, sensing means controlled by said medium and connected to said link, control means for preventing the storage of information on said medium and for rendering said sensing means responsive to control by said medium, means controlled by the stored control signals for intermittently moving the medium relative to the sensing means to successively transmit the items pertaining to each call over the link to operate the recording means, and means for removing the stored control signals and items of information from the medium following the transmission thereof.

9. In a telephone system, means for establishing a telephonic connection, a sensible medium, first means for recording signals representing successive items of information relating to a call completed over said connection on a first channel of said medium, second means controlled by said first means for recording a control signal on a second channel of said medium in conjunction with each of said successive recorded items, a plurality of register means, sensing means disposed adjacent said medium and operable to reproduce said recorded item representing signals and control signals, means connected to said sensing means for applying said reproduced item representing signals to said register means, and means operated by the reproduced control signals for applying the reproduced item representing signals to selected ones of the registers in sequence.

10. In a telephone system, means for establishing a telephonic connection, a magnetically susceptible medium having first and second effective data storing channels, first means controlled from said establishing means for recording items of information relating to a call completed through said connection on the first channel of said medium, second means operated in conjunction with said first means for recording control indicia on the second channel of said medium, sensing means for simultaneously sensing both channels of said medium to produce information pulses and control pulses, means for arresting operation of said first and second means when said medium is being sensed, a plurality of electronic tube registers having input means, means controlled by said sensing means for applying the information pulses in common to the input means of all of the registers, and means controlled by said sensing means and sequentially operated by the control pulses to successively render the input means responsive to the information pulses whereby the registers are sequentially operated to store the recorded items of information.

11. In a telephone system, means for establishing and releasing a telephonic connection, register means including a plurality of electron tubes connected to form separate counting circuits, means operated in response to the release of said connection for providing a plurality of pulses representative of the date and clock time of said release, means for operating the counting circuits in said register means in accordance with said pulses to render a group of said tubes conductive, and recording means operative in accordance with said conductive tubes for producing a permanent record of the date and clock time of said release.

12. In a telephone system, a plurality of means for establishing telephonic connections, a plurality of first register means, each of said first register means being connected to and controlled by one of the establishing means to store the items of information relating to calls completed through the connected establishing means, a second register means operative to store the items of information pertaining to one call, means for interconnecting the second register means with each of the first register means in a predetermined order, means for intermittently operating the second register means in accordance with the items stored in the interconnected first register means to sequentially register in said second register means the items of information relating to each of the plurality of calls stored in the connected first register means, a recorder controlled in accordance with the information registered in the second register means for producing a permanent record thereof, means controlled by the recorder for removing the stored information from the second register means following the production of the permanent record relating thereto, and means operative in response to the production of the permanent record relating to information pertaining to the last call stored in the interconnected first register means for initiating operation of the interconnecting means whereby another of the first register means is interconnected with the second register means.

13. In a telephone system, a plurality of trunk circuits, a magnetic tape recorder connected to and controlled by each of said trunk circuits and including a magnetic tape for storing items of information relating to calls completed through the connected trunk circuit, register means for storing items of information relating to one call, means connected to the register means for selectively interconnecting the register means with one of the magnetic tape recorders, means for intermittently advancing the tape in the connected magnetic recorder to operate the register means to store the items of information relating to each call recorded on the tape of the connected magnetic recorder, a ticket printer operative in accordance with the items of information registered in the register means for producing a printed ticket relating to each call, means controlled by the ticket printer following the printing of each ticket for operating the connected magnetic recorder to transmit the items of information relating to the next recorded call, means operative in response to the printing of the ticket relating to the last call recorded in the connected magnetic recorder for releasing the connected magnetic recorder and for initiating operation of the connecting means, and means controlled in response to the printing of the last ticket in the last of the selectively connected magnetic recorders for terminating operation of the connecting means.

14. In a multi-office automatic telephone system including at least two offices each having a plurality of lines terminating thereat, means including a trunk circuit for repeating the switch directing impulses making up two or more digits from one of said two offices to the second of said two offices in setting up a connection between two lines respectively terminating at the two offices, a recorder controlled by said trunk circuit and using a record medium, said recorder including a pulse responsive stepping mechanism for advancing the record medium step by step and mark and space recording heads for distinctively recording mark and space pulses on the record medium, means in said trunk circuit for transmitting pulses alternately to said mark head and said stepping mechanism as said impulses are repeated from said one office to said second office, and digit responsive means in said trunk circuit for transmitting a pulse to said space head at the conclusion of each digit.

15. In a multi-office automatic telephone system including at least two offices each having a plurality of lines terminating thereat, means including a trunk circuit for repeating the switch directing impulses making up two or more digits from one of said two offices to the second of said two offices in setting up a connection between two lines respectively terminating at the two offices, a recorder controlled by said trunk circuit and using a record medium, said recorder including a pulse responsive stepping mechanism for advancing the record medium step by step and mark and space recording heads for distinctively recording mark and space pulses on the record medium, circuits for transmitting pulses from said trunk circuit to said mark and space heads and said stepping mechanism, an impulse repeating relay in said trunk circuit for repeating the switch directing impulses from said one office to said second office and for concurrently transmitting pulses alternately to said mark head and said stepping mechanism over said circuits, and digit responsive means in said trunk circuit and controlled by said impulse repeating relay for transmitting pulses successively to said space head and said stepping mechanism over certain of said circuits at the conclusion of each digit.

16. In a multi-office automatic telephone system including at least two offices each having a plurality of lines terminating thereat, means including a trunk circuit for setting up a connection between two lines respectively terminating at the two offices, an impulse repeating relay in said trunk circuit for repeating switch directing impulses making up at least two digits from one of said two offices to the other of said two offices incident to the setting up of said connection, said relay being operated during the closed circuit period of each impulse and released during the open circuit period of each impulse, a recorder controlled by said trunk circuit and using a record medium, said recorder including a pulse responsive stepping mechanism for advancing the record medium of the recorder step by step and mark and space heads for distinctively recording mark and space pulses on the record medium, means for transmitting a pulse to said mark head each time said relay releases during an impulse repeating operation, means for transmitting a pulse to said stepping mechanism each time said relay reoperates during an impulse repeating operation, a plurality of digit responsive relays controlled by said impulse repeating relay for succesively transmitting pulses to said space head and said stepping mechanism at the conclusion of each digit, a timing circuit, and means controlled by said timing circuit and in part comprising a portion of said digit responsive relays for transmitting a series of pulses to said stepping mechanism after the connection between said two lines is released.

17. In a multi-office automatic telephone system including at least two offices each having a plurality of lines terminating thereat, means including a trunk circuit for repeating switch directing impulses from one of said two offices to the other of said two offices in setting up a connection between two lines respectively terminating at the two offices, a recorder controlled by said trunk circuit and using a record medium, said recorder including a pulse responsive stepping mechanism for advancing said record medium step by step and mark and space heads for distinctively recording mark and space pulses on the record medium, means for transmitting pulses alternately to said mark head and said stepping mechanism as said impulses are repeated from said one office to said second office, and control means responsive to the release of said trunk circuit for simultaneous transmitting pulses to said mark and space heads.

18. In a multi-office automatic telephone system including at least two offices each having a plurality of lines terminating thereat, means including a trunk circuit for repeating switch directing impulses from one of said two offices to the second of said two offices in setting up a connection between two lines respectively terminating at the two offices, a recorder associated with said trunk circuit and including a pulse responsive stepping mechanism for advancing the record medium of the recorder step by step and mark and space heads for recording distinctive mark and space pulses on the record medium, means in said trunk circuit for transmitting a pulse to said mark head each time a switch directing impulse is repeated to said second office, a time pulse generator, means in said trunk circuit responsive to the completion of said connection and controlled by said generator for transmitting duration of call pulses to said mark head so long as said connection is maintained, time and date pulse generating circuits, means in said trunk circuit responsive to the release of said connection and controlled by said time and date pulse generating circuits for transmitting pulses representative of the time and date of call termination to said mark head, all of the above-mentioned pulses transmitted to said mark head being transmitted in sets, means in said trunk circuit for transmitting a pulse to said space head after each set of pulses is transmitted to said mark head, means in said trunk circuit for simultaneously transmitting pulses to said mark and space heads after the last of the above-mentioned sets of pulses is transmitted to said mark head, means in said trunk circuit for transmitting a single pulse to said stepping mechanism immediately after the transmission of each of said pulses to said mark and space heads, and means including at least a part of said last-named means for transmitting a series of pulses to said stepping mechanism immediately after the simultaneous transmission of pulses to said mark and space heads.

19. In a telephone system, means for establishing a telephonic connection, storage means including magnetic means for storing items of information pertaining to a call placed over said connection, signaling means for recording said items on said magnetic means as a plurality of groups of discrete signals, means controllable from said establishing means for operating said signaling means to record a given number of said groups on said magnetic means when a call is completed over said connection and for operating said signaling means to record a number of said groups on said magnetic means that is less than said given number when an incomplete call is placed over said connection, a plurality of separate electronic registers each comprising a plurality of electronic devices operable to patterns of off and on conductive conditions representing an entered item, means for seizing said storage means and for converting the magnetically stored groups of discrete signals on said magnetic means into corresponding discrete groups of electrical signals, means for applying each of said discrete groups of electrical signals to a different one of said electronic registers to operate the electronic devices therein to a distinctive pattern of on and off conductive conditions representing the entered item of information, recording means controlled by said plurality of registers and operated in accordance with the on and off conductive patterns therein for producing a permanent record of the items of information, and detecting means responsive to the number of groups of electrical signals applied to said plurality of electronic registers for rendering said recording means responsive to control by said electronic registers when said given number of groups of electrical signals are applied to said electronic registers and for clearing the stored items from said electronic registers when a number of groups of electrical signals less than said given number is applied to said electronic registers.

20. A telephone system comprising a plurality of trunk circuits, magnetic storage means including a plurality of magnetic channel portions each individual to one of said trunk circuits for storing digital items of information pertaining to a call placed over the related trunk circuit, means connected to said magnetic storage means and controllable from a given trunk circuit incident to the extension of a connection therethrough for recording the digital items pertaining to a call placed over said connection on the magnetic channel portion individual to said given trunk circuit as a plurality of groups of discrete magnetically stored signals, a recorder for producing a record of the items stored in said magnetic storage means, channel selecting means connected to said recorder and operable to automatically scan said magnetic channel portions in said magnetic storage means in sequence and to automatically render selected ones of said magnetic channel portions effective in sequence to control said recorder, means for converting the magnetically stored groups of discrete signals on the selected channel portions representing items pertaining to calls into corresponding groups of electrical signals, and means for applying the groups of electrical signals to said recorder to produce a record of the items pertaining to the call.

21. In a telephone systems, means for establishing a telephonic connection, storage means including magnetic means for storing items of information pertaining to a call placed over said connection, signaling means for recording said items on said magnetic means as a plurality of groups of discrete signals, means controllable from said establishing means for operating said signaling means to record a given number of said groups on said magnetic means when a call is completed over said connection and for operating said signaling means to record a number of said groups on said magnetic means that is less than said given number when an incomplete call is placed over said connection, a plurality of separate electronic registers each comprising a plurality of electronic devices operable to patterns of off and on conductive conditions representing an entered item, means for seizing said storage means and for converting the magnetically stored groups of discrete signals on said magnetic means into corresponding discrete groups of electrical signals, means for applying each of said discrete groups of electrical signals to a different one of said electronic registers to operate the electronic devices therein to a distinctive pattern of on and off conductive conditions representing the entered item of information, recording means operated in accordance with the on and off conductive patterns in said electronic registers for producing a record of the items of information, switching means for sequentially connecting said plurality of electronic registers to said recording means, and detecting means responsive to the number of groups of electrical signals applied to said plurality of electronic registers for initiating operation of said switching means when said given number of groups of electrical signals is applied to said electronic registers and for preventing the operation of said switching means when a number of groups of electrical signals less than said given number is applied to said electronic registers.

22. In a telephone system, means for establishing telephonic connections, data storing means for establishing coexisting registrations of items of information pertaining to a plurality of calls placed over said establishing means, means controlled from said establishing means for storing a selected number of items in said data storing means pertaining to each of the calls completed over said establishing means and for storing a number of items in said data storing means less than said selected number for each of the calls that is not completed over said establishing means so that said data storing means includes co-existing registrations including different numbers of items in accordance with the number of complete and incomplete calls placed over said establishing means, register means including a plurality of electronic tubes, means controlled by said data storing means for operating said register means to render a selected group of said tubes conductive in accordance with the stored items of information relating to one call, a recorder, means for operating said recorder in accordance with the conductive tubes to produce a permanent record of the items of information pertaining to said one call when the number of items stored in said register means is as great as said selected number, reset means for rendering said tubes non-conductive and for initiating operation of the register means under the control of said data storing means to register the items of information relating to another call, means for operating said reset means when a permanent record is produced by said recorder, and means for operating said reset means when the number of items stored in said register means pertaining to a call is less than said selected number.

23. In a telephone system, means for establishing a telephonic connection; a magnetically susceptible medium having first and second effective data storing channels; first means controlled from said establishing means for recording items of information relating to a call completed through said connection on the first channel of said medium; second means operated in conjunction with said first means for recording a control signal on the second channel of said medium for each of the items recorded on the first channel; third means controllable from said establishing means for recording an end of entry signal on said medium at the end of the call to indicate the completion of the recording of the items pertaining to the call; sensing means for sensing said medium to produce information pulses, control pulses, and an end of entry signal; means for arresting operation of said first, second and third means when said medium is being sensed; a plurality of electronic tube registers having input means; means controlled by said sensing means for applying the information pulses in common to the input means of all of the registers; means controlled by said sensing means and sequentially operated by the control pulses to successively render the input means responsive to the information pulses whereby the registers are sequentially operated to store the recorded items of information; an output recorder; and means controlled by the end of entry signal provided by said sensing means for initiating the operation of said output recorder under the control of said electronic registers.

24. In a communication system, means for establishing a communication path, register means controllable at least in part from said communication path for storing data pertaining to a call placed over said communication path, an output recorder for producing a permanent record of the stored data, control means connected to said output recorder for rendering said output recorder responsive to control from said register means, clock means continuously operable to successive settings representing instant time, a data transfer link, and means controlled by said clock means for automatically initiating operation of said control means at selected times to extend said data transfer link from said output recorder to said register means independently of control by said establishing means, said link including means for transferring said stored data from said register means to said output recorder.

25. In a telephone system, means for establishing communication paths, register means controllable at least in part from said communication paths for storing coexisting registrations of data pertaining to more than one call placed over said communication paths, a recorder for producing permanent records of the data stored in said register means, means for automatically connecting said recorder to said register means, control means for operating said register means to transfer the stored data pertaining to one call to said recorder and for then arresting the operation of said register means, and means for operating said control means in synchronism with the operation of said recorder as said recorder produces permanent records of the data transferred from said register means representing successive calls.

26. The system set forth in claim 25 including clock means operable to successive settings representing time, and means controlled by said clock means for initiating operation of said control means at selected times.

27. In a telephone system, means for establishing telephonic connections, a plurality of register means controllable at least in part from said establishing means for storing items of information relating to calls completed through said connections, each of said register means being adapted to store all of the items pertaining to a call, recording means for producing a permanent record of the registered information, and automatically operated control means controllable from said recording means for sequentially scanning said plurality of register means and for rendering each of the plurality of register means effective in sequence to control the recording means so that the registered items pertaining to the different calls in the different register means are recorded in sequence.

28. The system set forth in claim 27 including clock means continuously operable to settings representing time, and means controlled by said clock means for initiating scanning operation of said control means at selected times of the day.

29. The system set forth in claim 28 in which each of said plurality of register means includes a magnetic recorder including a magnetic member on which coexisting registrations of items of information pertaining to a plurality of different calls can be established, and in which said control means includes means for sequentially transferring the stored items pertaining to each call from each effective magnetic recorder to said recording means.

30. The system set forth in claim 27 in which each of said plurality of register means stores the items pertaining to more than one call, said system also including means for transferring the stored items pertaining to successive calls from the effective register means to the recording means in sequence and for then operating said control means to resume the scanning of said plurality of register means after all of the stored items have been transferred from said effective register means.

31. In a telephone system, means for establishing communication paths, a plurality of magnetic registers each including at least one magnetic channel having a given capacity for data, means controlled at least in part from said communication paths for storing data in said magnetic registers relating to calls placed over said paths, a recorder for recording the data stored in all of said magnetic registers, control means for rendering a selected one of said magnetic registers effective to transfer the data stored therein to said recorder, first means normally effective to place said control means in operation to render each of said magnetic registers effective in sequence to transfer its stored data to said recorder, and second means controlled when the available storage capacity of one of the magnetic channels is reduced to a particular amount for placing said control means in operation.

32. The telephone system set forth in claim 31 including means controlled by said second means for rendering said first means ineffective.

33. The telephone system set forth in claim 31 including continuously operative clock means, and means controlled by said clock means for operating said first means.

34. In a telephone system, a plurality of trunk circuits for extending communication paths, a magnetic register individual to each of said trunk circuits, means in each of said trunk circuits for storing data pertaining to calls in the associated magnetic register, a recorder for re-recording the data stored in the magnetic register, first means normally effective to render each idle one of said magnetic registers effective in sequence to transfer its stored data to said recorder, second means operated when a magnetic register becomes filled with data, busy means controlled by said second means to mark the trunk circuit connected to said filled magnetic register as busy, and means controlled by said second means for operating said first means to immediately render said filled magnetic register effective to transfer its stored data it said recorder and for releasing said busy means when the stored data has been transferred from said filled magnetic register.

35. The telephone system set forth in claim 34 including means controlled by said second means for automatically releasing a communication path using a trunk circuit connected to a filled magnetic register.

36. The system set forth in claim 2 in which each of said groups of discrete signals contains a number of signals proportional to the value of the stored digit, in which each of said plurality of electronic registers includes circuit means connecting the electronic devices therein into a counting circuit, and in which said applying means includes means for causing each of said counting circuits to advance through a number of steps individually determined by the number of the stored signals in the related group of discrete signals.

37. The system set forth in claim 2 including a switching means connected to said recording means, and means operated in synchronism with said recording means for operating said switching means to connect each of said electronic registers to said recording means in sequence.

38. The system set forth in claim 5 including switching means connected to said register means, first means for operating said switching means to disconnect said data storing means from said connection establishing means and for connecting said data storing means to said register means so that data is transferred from said data storing means to said register means, and second means operated following the production of the permanent record of the items pertaining to the last call stored in said data storing means for operating said switching means to disconnect said data storing means from said register means and to connect said data storing means to said connection establishing means.

39. In a telephone system, means for establishing a telephonic connection, a magnetic member having a data storing portion and a control storing portion, first means controlled from said establishing means for recording digital signals representing data relating to a call completed through said connection on said data storing portion, second means operated under the control of said first means for recording a control signal on said control storing portion for each digit stored on said data storing portion, sensing means for sensing both of the portions of said member to reproduce said magnetically recorded digital and control signals as corresponding electrical signals, a plurality of electronic registers for storing the data relating to a call, each of said electronic registers including input means and a plurality of electronic devices operable to different patterns of on and off conductive conditions representing the value of an entered digit in accordance with the signals applied to the input means, means controlled by said sensing means for applying the reproduced digital signals in common to the input means of all of the registers, an electronic counter including a plurality of separate stages each connected to the input means of one of said registers, and means controlled by said sensing means for applying the reproduced control signals to said electronic counter so that said counter is operated to successively render the plurality of input means responsive in sequence to the reproduced digital signals whereby the registers are sequentially operated to various conductive patterns to store the recorded digital data.

40. The system set forth in claim 7 including drive means for moving said medium relative to said sensing means, and in which said control means includes first means controlled by the reproduced indicia for arresting operation of said drive means after the transmission of the registered items pertaining to one call, and second means controlled by said recording means for again initiating operation of said drive means after the transmitted items have been recorded.

41. The system set forth in claim 7 including second register means for storing the items of information pertaining to one call, said second register means being operated to store items of information derived from said medium in said first register means by said sensing means, and means connected to said sensing means and controlled by said reproduced indicia for rendering said second register means effective to transfer the items of information stored in said second register means to said recording means.

42. In a telephone system, means for establishing a telephonic connection, a register including a sensible medium, means controlled by said connection establishing means for storing items of information pertaining to a call placed over said connection on said medium, recorder means, switching means connected to said recorder means for connecting said register to said recorder means, first control means for transmitting the items stored on said medium to said recorder means to control the operation thereof, means for operating said switching means to release said register following the transmission of the stored items to said recorder means, and second control means operated incident to the release of said register to record a control signal on said medium in said register.

43. The telephone system set forth in claim 42 including resetting means for setting said recorder means to a normal condition, and means controlled by said control signal for operating said resetting means.

44. In a telephone system, means for establishing a telephonic connection, a magnetic member having a data storing portion and a control storing portion, first means controlled from said establishing means for recording digital signals representing data relating to a call completed through said connection on said data storing portion, second means operated under the control of said first means for recording a control signal on said control storing portion for each digit stored on said data storing portion, third means for recording an end-of-call signal on said member after all of the data pertaining to the call has been recorded, sensing means for sensing both of the portions of said member to reproduce said magnetically recorded digital, control, and end-of-call signals as corresponding electrical signals, a plurality of electronic registers for storing the data relating to a call, each of said electronic registers including input means and a plurality of electronic devices operable to different patterns of on and off conductive conditions representing the value of an entered digit in accordance with the signals applied to the input means, means controlled by said sensing means for applying the reproduced digital signals in common to the input means of all of the registers, an electronic counter including a plurality of separate stages each connected to the input means of one of said registers, means controlled by said sensing means for applying the reproduced control signals to said electronic counter so that said counter is operated to successively render the plurality of input means responsive to the reproduced digital signals in sequence whereby the registers are sequentially operated to various conductive patterns to store the recorded digital data, an output recorder operable in accordance with the conductive patterns in said electronic registers to record the digital data therein, control means for rendering said electronic registers effective to control said output recorder, and means responsive to the reproduction of said end-of-call signal by said sensing means for placing said control means in operation.

45. In a telephone system, pulse generating means for producing time spaced pulses, means for establishing a telephonic connection, a recorder adapted to be operated by said pulses, first control means controlled by said establishing means for rendering said pulse generating means effective to supply pulses to said recorder for a period of time proportional to the duration of a connection so that said recorder stores a discrete number of said pulses representing the duration of the connection, counting means, and second control means operated after the release of the connection for automatically connecting the recorder to the counting means and for reproducing the stored pulses to operate the counting means to a setting representing the duration of the connection.

46. The system set forth in claim 45 in which said recorder includes a magnetic member and a sensing means, in which said first control means magnetically records said discrete number of pulses on said magnetic member, in which said counting means includes a plurality of electronic devices operable to different patterns of on and off conductive conditions representing an entered number, and in which said second control means includes means for rendering said sensing means effective to convert the magnetically recorded pulses on said magnetic member into corresponding electrical signals for operating said electronic devices to a conductive pattern representing the duration of the call expressed as a numerical quantity.

47. In a telephone system, first means for registering date and clock time, a counting chain controlled by said first registering means, a second registering means including a plurality of electron tubes connected to form a plurality of counting circuits, means for extending a telephonic connection, means operative in response to the extension of said connection for operating said counting chain to produce a plurality of pulses representing the date and clock time of said connection, and means controlled in accordance with said pulses for selectively operating said counting circuits to render a group of said tubes conductive to manifest the date and clock time of said connection.

48. The system set forth in claim 47 including a magnetic recorder connected to said counting chain for storing said plurality of pulses representing date and clock time, and sensing means for reproducing the pulses stored in said magnetic recorder and for applying said reproduced pulses to said plurality of counting circuits.

49. A telephone system comprising a plurality of telephone offices each having an individual identity, means for selectively extending communication paths between selected ones of said offices, a plurality of register means, means controllable at least in part from said communication paths for storing data in said register means pertaining to calls placed over said paths, data recording and translating means for producing records of the stored data, selecting means for rendering one of said register means effective to supply stored data to said data translating and recording means, and control means operated in dependence on the one of the register means rendered effective for establishing the identity of at least one of the telephone offices linked by the communication path in said data translating and recording means independent of any data stored in said effective register means.

50. The telephone system set forth in claim 49 in which said selecting means includes switching means operable to different settings each individual to one of said register means and in which said control means includes a register operated to store the designation of one of said telephone offices in accordance with the setting to which said switching means has been operated.

51. The telephone system set forth in claim 14 including a pulse repeating relay in said trunk circuit for concurrently repeating switch directing impulses between said offices and controlling the transmission of alternate pulses to said mark head and said stepping mechanism, and means controlled by said pulse repeating relay for controlling said digit responsive means.

52. The telephone system set forth in claim 17 including means responsive to said control means for transmitting a series of pulses to said stepping mechanism.

References Cited in the file of this patent

UNITED STATES PATENTS

| | | |
|---|---|---|
| 1,917,008 | Beck | July 4, 1933 |
| 2,112,375 | Mead | Mar. 29, 1938 |
| 2,273,165 | Wright | Feb. 17, 1942 |
| 2,300,829 | Gooderham | Nov. 3, 1942 |
| 2,316,238 | Haigh | Apr. 13, 1943 |
| 2,437,118 | Ostline | Mar. 2, 1948 |
| 2,484,612 | Dehn et al. | Oct. 11, 1949 |
| 2,513,112 | Shepherd | June 27, 1950 |
| 2,522,000 | Shepherd | Sept. 12, 1950 |
| 2,535,512 | Ostline | Dec. 26, 1950 |
| 2,540,654 | Cohen et al. | Feb. 6, 1951 |
| 2,562,717 | Holden | July 31, 1951 |
| 2,594,495 | Retallack | Apr. 29, 1952 |
| 2,603,715 | Vaughan | July 15, 1952 |
| 2,629,016 | Gooderham | Feb. 17, 1953 |
| 2,629,861 | Begun | Feb. 24, 1953 |
| 2,651,718 | Levy | Sept. 8, 1953 |
| 2,656,460 | McMillan | Oct. 20, 1953 |
| 2,668,931 | Hall et al. | Feb. 9, 1954 |
| 2,698,880 | Shepherd | Jan. 4, 1955 |
| 2,767,246 | Retallack | Oct. 16, 1956 |
| 2,782,257 | Blashfield et al. | Feb. 19, 1957 |
| 2,794,070 | Ostline | May 28, 1957 |